(12) United States Patent
Wood et al.

(10) Patent No.: US 12,724,530 B2
(45) Date of Patent: Sep. 1, 2026

(54) USER INTERFACES FOR VIEWING AND ACCESSING CONTENT ON AN ELECTRONIC DEVICE

(71) Applicant: Apple Inc., Cupertino, CA (US)

(72) Inventors: Policarpo B. Wood, San Jose, CA (US); Jeff Tan-Ang, San Jose, CA (US); Florian M. Ponson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/665,420

(22) Filed: May 15, 2024

(65) Prior Publication Data

US 2024/0302952 A1 Sep. 12, 2024

Related U.S. Application Data

(63) Continuation of application No. 16/827,926, filed on Mar. 24, 2020, now Pat. No. 12,008,232.
(Continued)

(51) Int. Cl.
*G06F 3/04883* (2022.01)
*G06F 3/04817* (2022.01)
(Continued)

(52) U.S. Cl.
CPC ...... *G06F 3/04883* (2013.01); *G06F 3/04817* (2013.01); *G06F 3/0482* (2013.01);
(Continued)

(58) Field of Classification Search
CPC ............. G06F 3/04883; G06F 3/04817; G06F 3/0482; G06F 3/0488; G06F 9/451;
(Continued)

(56) References Cited

U.S. PATENT DOCUMENTS 2,718,550 A 9/1955 Hoyt et al.
4,672,677 A 6/1987 Yamakawa
(Continued)

FOREIGN PATENT DOCUMENTS

AU 2009255409 B2 7/2012
AU 2016100476 A4 5/2016
(Continued)

OTHER PUBLICATIONS

Advisory Action received for U.S. Appl. No. 15/167,801, mailed on Feb. 16, 2018, 4 pages.
(Continued)

*Primary Examiner* — Andrey Belousov
(74) *Attorney, Agent, or Firm* — Kubota & Basol LLP

(57) ABSTRACT

In some embodiments, an electronic device presents representations of items of content available for playback on the electronic device. In some embodiments, an electronic device presents selectable options for playing an item of content in accordance with the manners in which the item of content is available to be played on the electronic device. In some embodiments, an electronic device presents representations of episodes in a series of episodic content. In some embodiments, an electronic device presents an enhanced preview of content. In some embodiments, an electronic device presents a control panel. In some embodiments, an electronic device switches the active user profile of a device. In some embodiments, an electronic device enters into a picture-in-picture mode.

36 Claims, 332 Drawing Sheets

Related U.S. Application Data

(60) Provisional application No. 62/855,867, filed on May 31, 2019, provisional application No. 62/822,966, filed on Mar. 24, 2019.

(51) Int. Cl.
*G06F 3/0482* (2013.01)
*G06F 3/0488* (2022.01)
*G06F 9/451* (2018.01)
*H04N 21/472* (2011.01)
*H04N 21/8549* (2011.01)

(52) U.S. Cl.
CPC ............ *G06F 3/0488* (2013.01); *G06F 9/451* (2018.02); *H04N 21/47217* (2013.01); *H04N 21/8549* (2013.01)

(58) Field of Classification Search
CPC ......... H04N 21/47217; H04N 21/8549; H04N 21/42224; H04N 21/4314; H04N 21/4438; H04N 21/4532; H04N 21/4622; H04N 21/47202; H04N 21/4722; H04N 21/4821; H04N 21/431; H04N 21/422; H04N 21/4316
See application file for complete search history.

(56) References Cited

U.S. PATENT DOCUMENTS 5,029,223 A 7/1991 Fujisaki
5,483,261 A 1/1996 Yasutake
5,488,204 A 1/1996 Mead et al.
5,537,153 A 7/1996 Shigihara
5,585,866 A 12/1996 Miller et al.
5,596,373 A 1/1997 White et al.
5,621,456 A 4/1997 Florin et al.
5,677,708 A 10/1997 Matthews et al.
5,818,439 A 10/1998 Nagasaka et al.
5,825,352 A 10/1998 Bisset et al.
5,835,079 A 11/1998 Shieh
5,880,411 A 3/1999 Gillespie et al.
5,886,690 A 3/1999 Pond et al.
5,926,230 A 7/1999 Niijima et al.
6,021,320 A 2/2000 Bickford et al.
6,028,600 A 2/2000 Rosin et al.
6,049,333 A 4/2000 Lajoie et al.
6,188,391 B1 2/2001 Seely et al.
6,310,610 B1 10/2001 Beaton et al.
6,323,846 B1 11/2001 Westerman et al.
6,405,371 B1 6/2002 Oosterhout et al.
6,487,722 B1 11/2002 Okura et al.
6,570,557 B1 5/2003 Westerman et al.
6,628,304 B2 9/2003 Mitchell et al.
6,677,932 B1 1/2004 Westerman
6,690,387 B2 2/2004 Zimmerman et al.
6,745,391 B1 6/2004 Macrae et al.
6,909,837 B1 6/2005 Unger
6,928,433 B2 8/2005 Goodman et al.
7,015,894 B2 3/2006 Morohoshi
7,039,879 B2 5/2006 Bergsten et al.
7,103,906 B1 9/2006 Katz et al.
7,134,089 B2 11/2006 Celik et al.
7,184,064 B2 2/2007 Zimmerman et al.
7,213,255 B2 5/2007 Markel et al.
7,293,275 B1 11/2007 Krieger et al.
7,324,953 B1 1/2008 Murphy
7,330,192 B2 2/2008 Brunner et al.
7,596,761 B2 9/2009 Lemay et al.
7,614,008 B2 11/2009 Ording
7,631,278 B2 12/2009 Miksovsky et al.
7,633,076 B2 12/2009 Huppi et al.
7,636,897 B2 12/2009 Koralski et al.
7,649,526 B2 1/2010 Ording et al.
7,650,569 B1 1/2010 Allen et al.
7,653,883 B2 1/2010 Hotelling et al.
7,657,849 B2 2/2010 Chaudhri et al.
7,663,607 B2 2/2010 Hotelling et al.
7,665,022 B1 2/2010 Bednarz, Jr.
7,694,231 B2 4/2010 Kocienda et al.
7,712,051 B2 5/2010 Chadzelek et al.
7,783,892 B2 8/2010 Russell et al.
7,810,043 B2 10/2010 Ostojic et al.
7,814,023 B1 10/2010 Rao et al.
7,827,483 B2 11/2010 Unbedacht et al.
7,836,475 B2 11/2010 Angiolillo et al.
7,844,914 B2 11/2010 Andre et al.
7,849,487 B1 12/2010 Vosseller
7,856,605 B2 12/2010 Ording et al.
7,917,477 B2 3/2011 Hutson et al.
7,956,846 B2 6/2011 Ording et al.
7,957,762 B2 6/2011 Herz et al.
7,970,379 B2 6/2011 White et al.
8,006,002 B2 8/2011 Kalayjian et al.
8,026,805 B1 9/2011 Rowe
8,082,523 B2 12/2011 Forstall et al.
8,094,132 B1 1/2012 Frischling et al.
8,115,731 B2 2/2012 Varanda
8,145,617 B1 3/2012 Verstak et al.
8,170,931 B2 5/2012 Ross et al.
8,205,240 B2 6/2012 Ansari et al.
8,239,784 B2 8/2012 Hotelling et al.
8,279,180 B2 10/2012 Hotelling et al.
8,291,452 B1 10/2012 Yong et al.
8,299,889 B2 10/2012 Kumar et al.
8,301,484 B1 10/2012 Kumar
8,312,484 B1 11/2012 Mccarty et al.
8,312,486 B1 11/2012 Briggs et al.
8,316,394 B2 11/2012 Yates
8,325,160 B2 12/2012 St. Pierre et al.
8,346,798 B2 1/2013 Spiegelman et al.
8,370,874 B1 2/2013 Chang et al.
8,381,135 B2 2/2013 Hotelling et al.
8,386,588 B1 2/2013 Cooley
8,407,737 B1 3/2013 Ellis
8,416,217 B1 4/2013 Eriksson et al.
8,418,202 B2 4/2013 Ahmad-Taylor
8,424,048 B1 4/2013 Lyren et al.
8,479,122 B2 7/2013 Hotelling et al.
8,495,499 B1 7/2013 Denise
8,509,599 B2 8/2013 Itakura
8,516,063 B2 8/2013 Fletcher
8,516,525 B1 8/2013 Jerding et al.
8,560,398 B1 10/2013 Few et al.
8,584,165 B1 11/2013 Kane et al.
8,589,977 B1 11/2013 Frusciano
8,607,163 B2 12/2013 Plummer
8,607,268 B2 12/2013 Migos
8,613,015 B2 12/2013 Gordon et al.
8,613,023 B2 12/2013 Narahara et al.
8,625,974 B1 1/2014 Pinson
8,674,958 B1 3/2014 Kravets et al.
8,683,362 B2 3/2014 Shiplacoff et al.
8,683,517 B2 3/2014 Carpenter et al.
8,730,190 B2 5/2014 Moloney
8,742,885 B2 6/2014 Brodersen et al.
8,754,862 B2 6/2014 Zaliva
8,762,852 B2 6/2014 Davis et al.
8,769,408 B2 7/2014 Madden et al.
8,782,706 B2 7/2014 Ellis
8,850,471 B2 9/2014 Kilar et al.
8,850,490 B1 9/2014 Thomas et al.
8,869,207 B1 10/2014 Earle
8,887,202 B2 11/2014 Hunter et al.
8,930,839 B2 1/2015 He et al.
8,952,987 B2 2/2015 Momeyer et al.
8,963,847 B2 2/2015 Hunt
8,983,950 B2 3/2015 Askey et al.
8,988,356 B2 3/2015 Tseng
8,990,857 B2 3/2015 Yong et al.
9,007,322 B1 4/2015 Young
9,043,938 B1 5/2015 Raghu et al.
9,066,146 B2 6/2015 Suh et al.
9,081,421 B1 7/2015 Lai et al.

(56) References Cited

U.S. PATENT DOCUMENTS 9,092,057 B2 7/2015 Varela et al.
9,116,569 B2 8/2015 Stacy et al.
9,118,967 B2 8/2015 Sirpal et al.
9,129,656 B2 9/2015 Prather et al.
9,141,200 B2 9/2015 Bernstein et al.
9,196,309 B2 11/2015 Schultz et al.
9,214,290 B2 12/2015 Xie et al.
9,215,273 B2 12/2015 Jonnala et al.
9,219,634 B1 12/2015 Morse et al.
9,235,317 B2 1/2016 Matas et al.
9,241,121 B2 1/2016 Rudolph
9,244,600 B2 1/2016 Mcintosh et al.
9,247,014 B1 1/2016 Rao
9,247,174 B2 1/2016 Sirpal et al.
9,285,977 B1 3/2016 Greenberg et al.
9,319,727 B2 4/2016 Phipps et al.
9,348,458 B2 5/2016 Hotelling et al.
9,357,250 B1 5/2016 Newman et al.
9,380,343 B2 6/2016 Webster et al.
9,414,108 B2 8/2016 Sirpal et al.
9,454,288 B2 9/2016 Raffle et al.
9,509,798 B1 11/2016 Thomas et al.
9,514,476 B2 12/2016 Kay et al.
9,532,111 B1 12/2016 Christie et al.
9,538,310 B2 1/2017 Fjeldsoe-nielsen et al.
9,542,060 B1 1/2017 Brenner et al.
9,560,399 B2 1/2017 Kaya et al.
9,575,944 B2 2/2017 Neil et al.
9,591,339 B1 3/2017 Christie et al.
9,600,159 B2 3/2017 Lawson et al.
9,602,566 B1 3/2017 Lewis et al.
9,639,241 B2 5/2017 Penha et al.
9,652,118 B2 5/2017 Hill et al.
9,652,448 B2 5/2017 Pasquero et al.
9,658,740 B2 5/2017 Chaudhri
9,774,917 B1 9/2017 Christie et al.
9,792,018 B2 10/2017 Van Os et al.
9,807,462 B2 10/2017 Wood
9,864,508 B2 1/2018 Dixon et al.
9,864,509 B2 1/2018 Howard et al.
9,871,905 B1 1/2018 Habiger et al.
9,913,142 B2 3/2018 Folse et al.
9,933,937 B2 4/2018 Lemay et al.
9,940,454 B2 4/2018 Richardson et al.
9,973,800 B2 5/2018 Yellin et al.
9,992,025 B2 6/2018 Mahaffey et al.
10,019,142 B2 7/2018 Van Os et al.
10,025,499 B2 7/2018 Howard et al.
10,079,872 B1 9/2018 Thomas et al.
10,091,558 B2 10/2018 Christie et al.
10,114,631 B2 10/2018 Shin
10,116,996 B1 10/2018 Christie et al.
10,126,904 B2 11/2018 Agnetta et al.
10,168,871 B2 1/2019 Wallters et al.
10,200,761 B1 2/2019 Christie et al.
10,205,985 B2 2/2019 Lue-Sang et al.
10,209,866 B2 2/2019 Johnston et al.
10,237,599 B1 3/2019 Gravino et al.
10,275,148 B2 4/2019 Matas et al.
10,282,088 B2 5/2019 Kim et al.
10,289,660 B2 5/2019 Karunamuni et al.
10,303,422 B1 5/2019 Woo et al.
10,373,479 B2 8/2019 Banfi
10,405,015 B2 9/2019 Kite et al.
10,521,188 B1 12/2019 Christie et al.
10,551,995 B1 2/2020 Ho et al.
10,552,470 B2 2/2020 Todd et al.
10,564,823 B1 2/2020 Dennis et al.
10,601,808 B1 3/2020 Nijim et al.
10,606,539 B2 3/2020 Bernstein et al.
10,616,155 B2 4/2020 Choi et al.
10,631,042 B2 4/2020 Zerr et al.
10,650,052 B2 5/2020 Van Os et al.
10,795,490 B2 10/2020 Chaudhri et al.
10,827,007 B2 11/2020 Kode et al.
11,062,358 B1 7/2021 Lewis et al.
11,461,397 B2 10/2022 Van Os et al.
11,706,263 B2 7/2023 Warrick et al.
11,843,838 B2 12/2023 Ellingford et al.
11,863,837 B2 1/2024 Payne
11,962,836 B2 4/2024 Domm et al.
2002/0015024 A1 2/2002 Westerman et al.
2002/0026637 A1 2/2002 Markel et al.
2002/0029170 A1 3/2002 Gasser et al.
2002/0042920 A1 4/2002 Thomas et al.
2002/0060750 A1 5/2002 Istvan et al.
2002/0085045 A1 7/2002 Vong et al.
2002/0100063 A1 7/2002 Herigstad et al.
2002/0112239 A1 8/2002 Goldman
2002/0113816 A1 8/2002 Mitchell et al.
2002/0144269 A1 10/2002 Connelly
2002/0171686 A1 11/2002 Kamen et al.
2002/0178446 A1 11/2002 Sie et al.
2003/0001907 A1 1/2003 Bergsten et al.
2003/0005445 A1 1/2003 Schein et al.
2003/0009757 A1 1/2003 Kikinis
2003/0011641 A1 1/2003 Totman et al.
2003/0013483 A1 1/2003 Ausems et al.
2003/0044162 A1 3/2003 Angel
2003/0088872 A1 5/2003 Maissel et al.
2003/0093790 A1 5/2003 Logan et al.
2003/0126600 A1 7/2003 Heuvelman
2003/0149628 A1 8/2003 Abbosh et al.
2003/0158950 A1 8/2003 Sako
2003/0167471 A1 9/2003 Roth et al.
2003/0177075 A1 9/2003 Burke
2003/0177498 A1 9/2003 Ellis et al.
2003/0192060 A1 10/2003 Levy
2003/0196202 A1 10/2003 Barrett et al.
2003/0221191 A1 11/2003 Khusheim
2003/0228130 A1 12/2003 Tanikawa et al.
2003/0234804 A1 12/2003 Parker et al.
2004/0019497 A1 1/2004 Volk et al.
2004/0046801 A1 3/2004 Lin et al.
2004/0070573 A1 4/2004 Graham
2004/0088328 A1 5/2004 Cook et al.
2004/0090463 A1 5/2004 Celik et al.
2004/0093262 A1 5/2004 Weston et al.
2004/0133909 A1 7/2004 Ma
2004/0139401 A1 7/2004 Unbedacht et al.
2004/0161151 A1 8/2004 Iwayama et al.
2004/0168184 A1 8/2004 Steenkamp et al.
2004/0193421 A1 9/2004 Blass
2004/0252120 A1 12/2004 Hunleth et al.
2004/0254883 A1 12/2004 Kondrk et al.
2004/0254958 A1 12/2004 Volk
2004/0267715 A1 12/2004 Polson et al.
2004/0268417 A1* 12/2004 Gray .................. H04N 21/4532
348/E7.071
2005/0012599 A1 1/2005 Dematteo
2005/0024545 A1 2/2005 Borden
2005/0055710 A1 3/2005 Aoki et al.
2005/0063670 A1 3/2005 Arai
2005/0071761 A1 3/2005 Kontio
2005/0071785 A1 3/2005 Chadzelek et al.
2005/0076363 A1 4/2005 Dukes et al.
2005/0091254 A1 4/2005 Stabb et al.
2005/0091597 A1 4/2005 Ackley
2005/0134625 A1 6/2005 Kubota
2005/0162398 A1 7/2005 Eliasson et al.
2005/0162402 A1 7/2005 Watanachote
2005/0186988 A1 8/2005 Lim et al.
2005/0190059 A1 9/2005 Wehrenberg
2005/0223335 A1 10/2005 Ichikawa
2005/0235316 A1 10/2005 Ahmad-Taylor
2005/0257166 A1 11/2005 Tu
2005/0283358 A1 12/2005 Stephanick et al.
2006/0017692 A1 1/2006 Wehrenberg et al.
2006/0020904 A1 1/2006 Aaltonen et al.
2006/0026521 A1 2/2006 Hotelling et al.
2006/0029374 A1 2/2006 Park
2006/0031872 A1 2/2006 Hsiao et al.
2006/0033724 A1 2/2006 Chaudhri et al.
2006/0053449 A1 3/2006 Gutta

(56) References Cited

U.S. PATENT DOCUMENTS

2006/0053470 A1 3/2006 Colter et al.
2006/0069998 A1 3/2006 Artman et al.
2006/0071905 A1 4/2006 Varanda
2006/0080352 A1 4/2006 Boubez et al.
2006/0097991 A1 5/2006 Hotelling et al.
2006/0107304 A1 5/2006 Cleron et al.
2006/0112346 A1 5/2006 Miksovsky et al.
2006/0112352 A1 5/2006 Tseng et al.
2006/0117267 A1 6/2006 Koralski et al.
2006/0120624 A1 6/2006 Jojic et al.
2006/0195479 A1 8/2006 Spiegelman et al.
2006/0195512 A1 8/2006 Rogers et al.
2006/0197753 A1 9/2006 Hotelling
2006/0200842 A1* 9/2006 Chapman ............ H04N 21/235 348/E7.061
2006/0224987 A1 10/2006 Caffarelli
2006/0236847 A1 10/2006 Withop
2006/0248113 A1 11/2006 Leffert et al.
2006/0265637 A1 11/2006 Marriott et al.
2006/0271968 A1 11/2006 Zellner
2006/0282856 A1 12/2006 Errico et al.
2006/0288848 A1 12/2006 Gould et al.
2006/0294545 A1 12/2006 Morris et al.
2007/0005569 A1 1/2007 Hurst-hiller et al.
2007/0009229 A1 1/2007 Liu
2007/0011702 A1 1/2007 Vaysman
2007/0024594 A1 2/2007 Sakata et al.
2007/0028267 A1 2/2007 Ostojic et al.
2007/0038957 A1 2/2007 White
2007/0073596 A1 3/2007 Alexander et al.
2007/0092204 A1 4/2007 Wagner et al.
2007/0094602 A1 4/2007 Murabayashi
2007/0150802 A1 6/2007 Wan et al.
2007/0150918 A1 6/2007 Carpenter et al.
2007/0154163 A1 7/2007 Cordray
2007/0157220 A1 7/2007 Cordray et al.
2007/0157248 A1 7/2007 Ellis
2007/0157249 A1 7/2007 Cordray et al.
2007/0168413 A1 7/2007 Barletta et al.
2007/0186254 A1 8/2007 Tsutsui et al.
2007/0199035 A1 8/2007 Schwartz et al.
2007/0204057 A1 8/2007 Shaver et al.
2007/0220580 A1 9/2007 Putterman et al.
2007/0229465 A1 10/2007 Sakai et al.
2007/0233880 A1 10/2007 Nieh et al.
2007/0244902 A1 10/2007 Seide et al.
2007/0248317 A1 10/2007 Bahn
2008/0046928 A1 2/2008 Poling et al.
2008/0046931 A1 2/2008 Corbett et al.
2008/0059884 A1 3/2008 Ellis et al.
2008/0065989 A1 3/2008 Conroy et al.
2008/0066010 A1 3/2008 Brodersen et al.
2008/0077562 A1 3/2008 Schleppe
2008/0092168 A1 4/2008 Logan et al.
2008/0092173 A1 4/2008 Shannon et al.
2008/0111822 A1 5/2008 Horowitz et al.
2008/0120668 A1 5/2008 Yau
2008/0127281 A1 5/2008 Van et al.
2008/0155475 A1 6/2008 Duhig
2008/0163053 A1 7/2008 Hwang et al.
2008/0189740 A1 8/2008 Carpenter et al.
2008/0189742 A1 8/2008 Ellis et al.
2008/0208844 A1 8/2008 Jenkins
2008/0216020 A1 9/2008 Plummer
2008/0222677 A1 9/2008 Woo et al.
2008/0235331 A1 9/2008 Melamed et al.
2008/0235588 A1 9/2008 Gonze et al.
2008/0243817 A1 10/2008 Chan et al.
2008/0250312 A1 10/2008 Curtis
2008/0260252 A1 10/2008 Borgaonkar et al.
2008/0270886 A1 10/2008 Gossweiler et al.
2008/0276278 A1 11/2008 Krieger et al.
2008/0276279 A1 11/2008 Gossweiler et al.
2008/0301260 A1 12/2008 Goldeen et al.
2008/0301579 A1 12/2008 Jonasson et al.
2008/0301734 A1 12/2008 Goldeen et al.
2008/0307343 A1 12/2008 Robert et al.
2008/0307458 A1 12/2008 Kim et al.
2008/0307459 A1 12/2008 Migos
2008/0320391 A1 12/2008 Lemay et al.
2008/0320532 A1 12/2008 Lee
2009/0055385 A1 2/2009 Jeon et al.
2009/0055873 A1 2/2009 Kim et al.
2009/0063521 A1 3/2009 Bull et al.
2009/0063975 A1 3/2009 Rottler et al.
2009/0089837 A1 4/2009 Momosaki
2009/0094662 A1 4/2009 Chang et al.
2009/0106110 A1 4/2009 Stannard et al.
2009/0119754 A1 5/2009 Schubert
2009/0158325 A1 6/2009 Johnson
2009/0158326 A1 6/2009 Hunt et al.
2009/0161868 A1 6/2009 Chaudhry
2009/0164944 A1 6/2009 Webster et al.
2009/0165054 A1 6/2009 Rudolph
2009/0174679 A1 7/2009 Westerman
2009/0177301 A1 7/2009 Hayes
2009/0177989 A1 7/2009 Ma et al.
2009/0178083 A1 7/2009 Carr et al.
2009/0228491 A1 9/2009 Malik
2009/0228807 A1 9/2009 Lemay
2009/0228919 A1 9/2009 Zott et al.
2009/0239587 A1 9/2009 Negron et al.
2009/0256807 A1 10/2009 Nurmi
2009/0259957 A1 10/2009 Slocum et al.
2009/0278916 A1 11/2009 Ito
2009/0282444 A1 11/2009 Laksono et al.
2009/0288079 A1 11/2009 Zuber et al.
2009/0313100 A1 12/2009 Ingleshwar
2009/0322962 A1 12/2009 Weeks
2009/0327952 A1 12/2009 Karas et al.
2010/0003007 A1 1/2010 Itakura
2010/0009629 A1 1/2010 Jung et al.
2010/0009719 A1 1/2010 Oh et al.
2010/0017713 A1 1/2010 Igarashi
2010/0031162 A1 2/2010 Wiser et al.
2010/0046608 A1 2/2010 Mccrossan et al.
2010/0053220 A1 3/2010 Ozawa et al.
2010/0053432 A1 3/2010 Cheng et al.
2010/0057696 A1 3/2010 Miyazawa et al.
2010/0064313 A1 3/2010 Beyabani
2010/0080163 A1 4/2010 Krishnamoorthi et al.
2010/0083181 A1 4/2010 Matsushima et al.
2010/0095240 A1 4/2010 Shiplacoff et al.
2010/0100899 A1 4/2010 Bradbury et al.
2010/0104269 A1 4/2010 Prestenback et al.
2010/0115060 A1 5/2010 Julia et al.
2010/0115592 A1 5/2010 Belz et al.
2010/0121714 A1 5/2010 Bryant et al.
2010/0146422 A1 6/2010 Seong et al.
2010/0146442 A1 6/2010 Nagasaka et al.
2010/0153881 A1 6/2010 Dinn
2010/0153999 A1 6/2010 Yates
2010/0159898 A1 6/2010 Krzyzanowski et al.
2010/0162172 A1 6/2010 Aroner
2010/0175079 A1 7/2010 Braun et al.
2010/0194998 A1 8/2010 Lee et al.
2010/0198822 A1 8/2010 Glennon et al.
2010/0205628 A1 8/2010 Davis et al.
2010/0211636 A1 8/2010 Starkenburg et al.
2010/0211884 A1 8/2010 Kashyap et al.
2010/0223646 A1 9/2010 Goldeen et al.
2010/0229194 A1 9/2010 Blanchard et al.
2010/0235744 A1 9/2010 Schultz et al.
2010/0251304 A1 9/2010 Donoghue et al.
2010/0257005 A1 10/2010 Phenner et al.
2010/0269145 A1 10/2010 Ingrassia et al.
2010/0275143 A1 10/2010 Fu et al.
2010/0277337 A1 11/2010 Brodersen et al.
2010/0293190 A1 11/2010 Kaiser et al.
2010/0293586 A1 11/2010 Simoes et al.
2010/0299606 A1 11/2010 Morita
2010/0312824 A1 12/2010 Smith et al.
2010/0325660 A1 12/2010 Holden
2010/0333142 A1 12/2010 Busse et al.

(56) References Cited

U.S. PATENT DOCUMENTS

2010/0333143 A1 12/2010 Civanlar et al.
2011/0004831 A1 1/2011 Steinberg et al.
2011/0033168 A1 2/2011 Tyer
2011/0047513 A1 2/2011 Onogi et al.
2011/0052146 A1 3/2011 Murthy et al.
2011/0054649 A1 3/2011 Sarkis et al.
2011/0055762 A1 3/2011 Jung et al.
2011/0055870 A1 3/2011 Yum et al.
2011/0071977 A1 3/2011 Nakajima et al.
2011/0078739 A1 3/2011 Grad
2011/0080935 A1 4/2011 Kim et al.
2011/0087992 A1 4/2011 Wang et al.
2011/0090402 A1 4/2011 Huntington et al.
2011/0093415 A1 4/2011 Rhee et al.
2011/0099519 A1 4/2011 Ma et al.
2011/0107220 A1 5/2011 Perlman
2011/0119710 A1 5/2011 Jang et al.
2011/0119715 A1 5/2011 Chang et al.
2011/0122315 A1 5/2011 Schweiger et al.
2011/0126102 A1 5/2011 Archer
2011/0131607 A1 6/2011 Thomas et al.
2011/0154194 A1 6/2011 Mathai et al.
2011/0154305 A1 6/2011 Leroux et al.
2011/0157029 A1 6/2011 Tseng
2011/0162022 A1 6/2011 Xia
2011/0163971 A1 7/2011 Wagner et al.
2011/0167339 A1 7/2011 Lemay
2011/0175930 A1 7/2011 Hwang et al.
2011/0179388 A1 7/2011 Fleizach et al.
2011/0179453 A1 7/2011 Poniatowski
2011/0197153 A1 8/2011 King et al.
2011/0209177 A1 8/2011 Sela et al.
2011/0218948 A1 9/2011 De et al.
2011/0231280 A1 9/2011 Farah
2011/0231823 A1 9/2011 Fryc et al.
2011/0231872 A1 9/2011 Gharachorloo et al.
2011/0231878 A1 9/2011 Hunter et al.
2011/0246332 A1 10/2011 Alcodray et al.
2011/0255840 A1 10/2011 Bornsen
2011/0281517 A1 11/2011 Ukkadam
2011/0283304 A1 11/2011 Roberts et al.
2011/0283333 A1 11/2011 Ukkadam
2011/0289064 A1 11/2011 Lebeau et al.
2011/0289317 A1 11/2011 Darapu et al.
2011/0289419 A1 11/2011 Yu et al.
2011/0289421 A1 11/2011 Jordan et al.
2011/0289452 A1 11/2011 Jordan et al.
2011/0289531 A1 11/2011 Moonka et al.
2011/0289534 A1 11/2011 Jordan et al.
2011/0296351 A1 12/2011 Ewing et al.
2011/0302532 A1 12/2011 Missig
2011/0307631 A1 12/2011 Park et al.
2011/0312278 A1 12/2011 Matsushita et al.
2011/0314497 A1 12/2011 Warrick et al.
2011/0321072 A1 12/2011 Patterson et al.
2012/0019674 A1 1/2012 Ohnishi et al.
2012/0023450 A1 1/2012 Noto et al.
2012/0036552 A1 2/2012 Dare et al.
2012/0042245 A1 2/2012 Askey et al.
2012/0042343 A1 2/2012 Laligand et al.
2012/0053887 A1 3/2012 Nurmi
2012/0054178 A1 3/2012 Tran et al.
2012/0054642 A1 3/2012 Balsiger et al.
2012/0054679 A1 3/2012 Ma et al.
2012/0054797 A1 3/2012 Skog et al.
2012/0059910 A1 3/2012 Cassidy
2012/0060092 A1 3/2012 Hill et al.
2012/0064204 A1 3/2012 Davila et al.
2012/0084136 A1 4/2012 Seth et al.
2012/0093481 A1 4/2012 Mcdowell et al.
2012/0096011 A1 4/2012 Kay et al.
2012/0102573 A1 4/2012 Spooner et al.
2012/0105367 A1 5/2012 Son et al.
2012/0110616 A1 5/2012 Kilar et al.
2012/0110621 A1 5/2012 Gossweiler, III
2012/0114303 A1 5/2012 Chung et al.
2012/0117584 A1 5/2012 Gordon
2012/0124615 A1 5/2012 Lee
2012/0131615 A1 5/2012 Kobayashi et al.
2012/0139938 A1 6/2012 Khedouri et al.
2012/0141095 A1 6/2012 Schwesinger et al.
2012/0144003 A1 6/2012 Rosenbaum et al.
2012/0158524 A1 6/2012 Hintz et al.
2012/0159543 A1 6/2012 Jin et al.
2012/0166998 A1 6/2012 Cotterill et al.
2012/0173991 A1 7/2012 Roberts et al.
2012/0174157 A1 7/2012 Stinson et al.
2012/0198020 A1 8/2012 Parker et al.
2012/0198336 A1 8/2012 Novotny et al.
2012/0210366 A1 8/2012 Wong et al.
2012/0215684 A1 8/2012 Kidron
2012/0216113 A1 8/2012 Li
2012/0216117 A1 8/2012 Arriola et al.
2012/0216296 A1 8/2012 Kidron
2012/0221498 A1 8/2012 Kaszynski et al.
2012/0222056 A1 8/2012 Donoghue et al.
2012/0233640 A1 9/2012 Odryna et al.
2012/0236173 A1 9/2012 Telek et al.
2012/0242704 A1 9/2012 Bamford et al.
2012/0260291 A1 10/2012 Wood
2012/0260293 A1 10/2012 Young et al.
2012/0262371 A1 10/2012 Lee et al.
2012/0262407 A1 10/2012 Hinckley et al.
2012/0266069 A1 10/2012 Moshiri et al.
2012/0272261 A1 10/2012 Reynolds et al.
2012/0284753 A1 11/2012 Roberts et al.
2012/0290933 A1 11/2012 Rajaraman et al.
2012/0291079 A1 11/2012 Gordon et al.
2012/0308143 A1 12/2012 Bellegarda et al.
2012/0311443 A1 12/2012 Chaudhri et al.
2012/0311638 A1 12/2012 Reyna et al.
2012/0317482 A1 12/2012 Barraclough et al.
2012/0323938 A1 12/2012 Skeen et al.
2012/0324504 A1 12/2012 Archer et al.
2012/0327125 A1 12/2012 Kutliroff et al.
2013/0007656 A1 1/2013 Li et al.
2013/0014150 A1 1/2013 Seo et al.
2013/0014159 A1 1/2013 Wiser et al.
2013/0021288 A1 1/2013 Kaerkkaeinen et al.
2013/0024895 A1 1/2013 Yong et al.
2013/0031585 A1 1/2013 Itagaki et al.
2013/0033643 A1 2/2013 Kim et al.
2013/0042271 A1 2/2013 Yellin et al.
2013/0061234 A1 3/2013 Piira et al.
2013/0061267 A1 3/2013 Cansino et al.
2013/0067366 A1 3/2013 Almosnino
2013/0073403 A1 3/2013 Tuchman et al.
2013/0076681 A1* 3/2013 Sirpal .................... G06F 16/54
345/173
2013/0080968 A1 3/2013 Hanson et al.
2013/0083076 A1 4/2013 Liu et al.
2013/0088455 A1 4/2013 Jeong
2013/0097009 A1 4/2013 Akadiri
2013/0110978 A1 5/2013 Gordon et al.
2013/0124998 A1 5/2013 Pendergast et al.
2013/0132874 A1 5/2013 He et al.
2013/0132966 A1 5/2013 Chanda et al.
2013/0151300 A1 6/2013 Le et al.
2013/0173034 A1 7/2013 Reimann et al.
2013/0174193 A1 7/2013 Yu et al.
2013/0179812 A1 7/2013 Bianrosa et al.
2013/0179995 A1 7/2013 Basile et al.
2013/0198686 A1 8/2013 Kawai et al.
2013/0205312 A1 8/2013 Huang
2013/0212531 A1 8/2013 Yoshida
2013/0227482 A1 8/2013 Thorsander et al.
2013/0247105 A1 9/2013 Jovanovski et al.
2013/0254308 A1 9/2013 Rose et al.
2013/0262431 A1 10/2013 Garner et al.
2013/0262558 A1 10/2013 Wood et al.
2013/0262619 A1 10/2013 Goodwin et al.
2013/0262633 A1 10/2013 Goodwin et al.
2013/0263189 A1 10/2013 Garner
2013/0283154 A1 10/2013 Sasakura

(56) References Cited

U.S. PATENT DOCUMENTS

2013/0283168 A1 10/2013 Brown et al.
2013/0283301 A1* 10/2013 Avedissian ......... H04N 21/4223 725/5
2013/0283317 A1 10/2013 Guntupalli et al.
2013/0283318 A1 10/2013 Wannamaker
2013/0285937 A1 10/2013 Billings et al.
2013/0290233 A1 10/2013 Ferren et al.
2013/0290848 A1 10/2013 Billings et al.
2013/0291018 A1 10/2013 Billings et al.
2013/0291037 A1 10/2013 Im et al.
2013/0294755 A1 11/2013 Arme et al.
2013/0312044 A1 11/2013 Itagaki
2013/0326499 A1 12/2013 Mowatt et al.
2013/0326554 A1 12/2013 Shkedi
2013/0326561 A1 12/2013 Pandey
2013/0332838 A1 12/2013 Naggar et al.
2013/0332871 A1 12/2013 Bucur et al.
2013/0332960 A1 12/2013 Young et al.
2013/0339877 A1 12/2013 Skeen et al.
2013/0340006 A1 12/2013 Kwan
2013/0346564 A1 12/2013 Warrick et al.
2013/0347044 A1 12/2013 Lee et al.
2014/0006635 A1 1/2014 Braness et al.
2014/0006795 A1 1/2014 Han et al.
2014/0006951 A1 1/2014 Hunter
2014/0012859 A1 1/2014 Heilprin et al.
2014/0013283 A1 1/2014 Matas et al.
2014/0020017 A1 1/2014 Stern et al.
2014/0024341 A1 1/2014 Johan
2014/0028780 A1 1/2014 Croen et al.
2014/0033245 A1 1/2014 Barton et al.
2014/0049692 A1 2/2014 Sirpal et al.
2014/0052683 A1 2/2014 Kirkham et al.
2014/0053116 A1 2/2014 Smith et al.
2014/0053195 A1 2/2014 Sirpal et al.
2014/0059605 A1 2/2014 Sirpal et al.
2014/0059615 A1 2/2014 Sirpal et al.
2014/0059625 A1 2/2014 Dourado et al.
2014/0059635 A1 2/2014 Sirpal et al.
2014/0067425 A1 3/2014 Dudar et al.
2014/0068654 A1 3/2014 Marlow et al.
2014/0071068 A1 3/2014 Shih et al.
2014/0074454 A1 3/2014 Brown et al.
2014/0075313 A1 3/2014 Bachman et al.
2014/0075316 A1 3/2014 Li
2014/0075394 A1 3/2014 Nawle et al.
2014/0075574 A1 3/2014 Zheng et al.
2014/0082497 A1 3/2014 Chalouhi et al.
2014/0082660 A1 3/2014 Zhang et al.
2014/0088952 A1 3/2014 Fife et al.
2014/0089816 A1 3/2014 Dipersia et al.
2014/0098102 A1 4/2014 Raffle et al.
2014/0101706 A1 4/2014 Kardatzke
2014/0104646 A1 4/2014 Nishiyama
2014/0109204 A1 4/2014 Papillon et al.
2014/0111416 A1 4/2014 Sugiura
2014/0115636 A1 4/2014 Stuckman
2014/0123006 A1 5/2014 Chen et al.
2014/0129232 A1 5/2014 Jones et al.
2014/0130097 A1 5/2014 Londero
2014/0136946 A1 5/2014 Matas
2014/0137029 A1 5/2014 Stephenson et al.
2014/0137030 A1 5/2014 Matas
2014/0143260 A1 5/2014 Simonson et al.
2014/0143683 A1 5/2014 Underwood et al.
2014/0156792 A1 6/2014 Roberts et al.
2014/0157204 A1 6/2014 Roberts et al.
2014/0157329 A1 6/2014 Roberts et al.
2014/0164966 A1 6/2014 Kim et al.
2014/0168071 A1 6/2014 Ahmed et al.
2014/0171153 A1 6/2014 Kienzle et al.
2014/0172622 A1 6/2014 Baronshin
2014/0172953 A1 6/2014 Blanksteen
2014/0173660 A1 6/2014 Correa et al.
2014/0184471 A1 7/2014 Martynov et al.
2014/0189523 A1 7/2014 Shuttleworth et al.
2014/0189574 A1 7/2014 Stallings et al.
2014/0189606 A1 7/2014 Shuttleworth et al.
2014/0196064 A1 7/2014 Kennedy et al.
2014/0196069 A1 7/2014 Ahmed et al.
2014/0208268 A1 7/2014 Jimenez
2014/0208360 A1 7/2014 Kardatzke
2014/0219637 A1 8/2014 Mcintosh et al.
2014/0224867 A1 8/2014 Werner et al.
2014/0244751 A1 8/2014 Tseng
2014/0245148 A1 8/2014 Silva et al.
2014/0245186 A1 8/2014 Tseng
2014/0245222 A1 8/2014 Kovacevic et al.
2014/0250465 A1 9/2014 Mulholland et al.
2014/0250479 A1 9/2014 Lee et al.
2014/0253463 A1 9/2014 Hicks
2014/0253803 A1* 9/2014 Jiang ........................ H04N 5/45 348/565
2014/0259074 A1 9/2014 Ansari et al.
2014/0278072 A1 9/2014 Fino et al.
2014/0278940 A1 9/2014 Wade
2014/0280728 A1 9/2014 Szerlip Joyce et al.
2014/0282208 A1 9/2014 Chaudhri
2014/0282636 A1 9/2014 Petander et al.
2014/0282677 A1 9/2014 Mantell et al.
2014/0288686 A1 9/2014 Sant et al.
2014/0289226 A1 9/2014 English et al.
2014/0289751 A1 9/2014 Hsu et al.
2014/0310742 A1 10/2014 Kim
2014/0317653 A1 10/2014 Mlodzinski
2014/0325357 A1 10/2014 Sant et al.
2014/0333530 A1 11/2014 Agnetta et al.
2014/0337607 A1 11/2014 Peterson et al.
2014/0340358 A1 11/2014 Martinoli
2014/0341109 A1 11/2014 Cartmell et al.
2014/0344247 A1 11/2014 Procopio et al.
2014/0344291 A9 11/2014 Simonson et al.
2014/0344294 A1 11/2014 Skeen et al.
2014/0351691 A1 11/2014 Neil et al.
2014/0359598 A1 12/2014 Oliver et al.
2014/0364056 A1 12/2014 Belk et al.
2014/0365479 A1 12/2014 Lyons et al.
2014/0365481 A1 12/2014 Novosel et al.
2014/0365604 A1 12/2014 Lewis et al.
2014/0365919 A1 12/2014 Shaw et al.
2014/0366040 A1 12/2014 Parker et al.
2014/0366047 A1 12/2014 Thomas et al.
2015/0020127 A1 1/2015 Doshi et al.
2015/0022481 A1 1/2015 Andersson et al.
2015/0039685 A1 2/2015 Lewis et al.
2015/0046866 A1 2/2015 Shimadate
2015/0062069 A1 3/2015 Shin et al.
2015/0067582 A1 3/2015 Donnelly et al.
2015/0067724 A1 3/2015 Johnson et al.
2015/0074522 A1 3/2015 Harned et al.
2015/0074552 A1 3/2015 Chai et al.
2015/0074603 A1 3/2015 Abe et al.
2015/0082187 A1 3/2015 Wallters et al.
2015/0095460 A1 4/2015 Berger et al.
2015/0095845 A1 4/2015 Chun et al.
2015/0106856 A1 4/2015 Rankine
2015/0113000 A1 4/2015 Scheer et al.
2015/0113429 A1 4/2015 Edwards et al.
2015/0121408 A1 4/2015 Jacoby et al.
2015/0134653 A1 5/2015 Bayer et al.
2015/0135049 A1 5/2015 Murphy
2015/0135071 A1 5/2015 Glotzer
2015/0150049 A1 5/2015 White
2015/0150066 A1 5/2015 Park et al.
2015/0153571 A1 6/2015 Ballard et al.
2015/0154151 A1 6/2015 Xue et al.
2015/0161251 A1 6/2015 Ramanarayanan et al.
2015/0169705 A1 6/2015 Korbecki et al.
2015/0169975 A1 6/2015 Kienzle et al.
2015/0186002 A1 7/2015 Suzuki et al.
2015/0189347 A1 7/2015 Oztaskent et al.
2015/0193119 A1 7/2015 Chai et al.
2015/0193192 A1 7/2015 Kidron
2015/0195624 A1 7/2015 Gossweiler

(56) References Cited

U.S. PATENT DOCUMENTS

2015/0205591 A1 7/2015 Jitkoff et al.
2015/0237389 A1 8/2015 Grouf et al.
2015/0277720 A1 10/2015 Thorson et al.
2015/0296072 A1 10/2015 Zhou et al.
2015/0301729 A1 10/2015 Wang et al.
2015/0309670 A1 10/2015 Wheeler et al.
2015/0312603 A1 10/2015 Singh et al.
2015/0317343 A1 11/2015 Cselle et al.
2015/0318020 A1 11/2015 Pribula
2015/0331685 A1 11/2015 Bourke
2015/0334464 A1 11/2015 Shin
2015/0346975 A1 12/2015 Lee et al.
2015/0350741 A1 12/2015 Rajaraman et al.
2015/0355816 A1 12/2015 Shim
2015/0363035 A1 12/2015 Hinckley et al.
2015/0365306 A1* 12/2015 Chaudhri ......... H04N 21/47205 715/753
2015/0365729 A1 12/2015 Kaya et al.
2015/0370435 A1 12/2015 Kirmse et al.
2015/0370455 A1 12/2015 Van Os et al.
2015/0370920 A1 12/2015 Van Os et al.
2015/0373107 A1 12/2015 Chan et al.
2015/0379021 A1 12/2015 Kuper
2015/0382047 A1 12/2015 Van Os et al.
2015/0382066 A1 12/2015 Heeter et al.
2016/0004425 A1 1/2016 Yoon et al.
2016/0004772 A1 1/2016 Kim et al.
2016/0004773 A1 1/2016 Jannink et al.
2016/0005013 A1 1/2016 Perry
2016/0014461 A1 1/2016 Leech et al.
2016/0021412 A1 1/2016 Zito, Jr.
2016/0035119 A1 2/2016 Lee et al.
2016/0036897 A1 2/2016 Kim et al.
2016/0041702 A1 2/2016 Wang
2016/0043962 A1 2/2016 Kim et al.
2016/0066004 A1 3/2016 Lieu et al.
2016/0066021 A1 3/2016 Thomas et al.
2016/0066040 A1 3/2016 Webster et al.
2016/0066049 A1 3/2016 Mountain
2016/0078465 A1 3/2016 Chai et al.
2016/0078526 A1 3/2016 Nations et al.
2016/0080815 A1 3/2016 Ruffini et al.
2016/0092042 A1 3/2016 Yenigalla et al.
2016/0092559 A1 3/2016 Lind et al.
2016/0096113 A1 4/2016 Decoufle
2016/0099991 A1 4/2016 Lonkar et al.
2016/0105540 A1 4/2016 Kwon et al.
2016/0110064 A1 4/2016 Shapira
2016/0127783 A1 5/2016 Garcia Navarro
2016/0127789 A1 5/2016 Roberts et al.
2016/0133230 A1 5/2016 Daniels et al.
2016/0142783 A1 5/2016 Bagga et al.
2016/0146935 A1 5/2016 Lee et al.
2016/0165307 A1 6/2016 Lavender et al.
2016/0188902 A1 6/2016 Jin
2016/0191639 A1 6/2016 Dai et al.
2016/0192017 A1 6/2016 Tirpak
2016/0231885 A1 8/2016 Lee et al.
2016/0249105 A1 8/2016 Carney Landow
2016/0255379 A1 9/2016 Langan et al.
2016/0277785 A1 9/2016 Newman et al.
2016/0334935 A1 11/2016 Jeon
2016/0345070 A1 11/2016 Beeson et al.
2016/0357305 A1 12/2016 Wells et al.
2016/0357352 A1 12/2016 Matas et al.
2016/0357355 A1 12/2016 Carrigan et al.
2016/0357366 A1 12/2016 Migos et al.
2016/0370982 A1 12/2016 Penha et al.
2016/0378283 A1 12/2016 Cockcroft et al.
2017/0003879 A1 1/2017 Tamai et al.
2017/0010846 A1 1/2017 Bernstein et al.
2017/0010847 A1 1/2017 Bernstein et al.
2017/0013295 A1 1/2017 Wertheimer et al.
2017/0024587 A1 1/2017 Nonogaki et al.
2017/0046039 A1 2/2017 Karunamuni et al.
2017/0046339 A1 2/2017 Bhat et al.
2017/0068402 A1 3/2017 Lochhead et al.
2017/0068511 A1 3/2017 Brown et al.
2017/0070786 A1 3/2017 Keene et al.
2017/0094360 A1 3/2017 Keighran et al.
2017/0097969 A1 4/2017 Stein et al.
2017/0115867 A1 4/2017 Bargmann
2017/0124594 A1 5/2017 Naiga et al.
2017/0132659 A1 5/2017 Dirks et al.
2017/0132829 A1 5/2017 Blas et al.
2017/0134778 A1 5/2017 Christie et al.
2017/0140748 A1 5/2017 Roberts et al.
2017/0185240 A1 6/2017 Delrosario et al.
2017/0188116 A1 6/2017 Major et al.
2017/0192642 A1 7/2017 Fishman et al.
2017/0195736 A1 7/2017 Chai et al.
2017/0201618 A1 7/2017 Schmidt
2017/0201850 A1 7/2017 Raleigh et al.
2017/0214975 A1 7/2017 Schmidt et al.
2017/0220228 A1 8/2017 Sang et al.
2017/0242913 A1 8/2017 Tijssen et al.
2017/0243244 A1 8/2017 Trabelsi et al.
2017/0243471 A1 8/2017 Banfi
2017/0245017 A1 8/2017 Chaudhri et al.
2017/0251257 A1 8/2017 Obrien
2017/0272543 A1 9/2017 Lo et al.
2017/0300151 A1 10/2017 Lue-Sang et al.
2017/0339443 A1 11/2017 Lue-Sang et al.
2017/0344553 A1 11/2017 Evnine et al.
2017/0345040 A1 11/2017 Pirnack et al.
2017/0353603 A1 12/2017 Grunewald et al.
2017/0357387 A1 12/2017 Clarke
2017/0359722 A1 12/2017 Folse et al.
2017/0364246 A1 12/2017 Van Os et al.
2017/0364274 A1 12/2017 Hammons et al.
2018/0011580 A1 1/2018 Lebowitz et al.
2018/0027279 A1 1/2018 Templeman
2018/0041814 A1 2/2018 Christie et al.
2018/0053094 A1 2/2018 Patel et al.
2018/0059872 A1 3/2018 Iida
2018/0063591 A1 3/2018 Newman et al.
2018/0070121 A1 3/2018 Zimmerman et al.
2018/0070138 A1 3/2018 Chai et al.
2018/0107353 A1 4/2018 Lee
2018/0113579 A1 4/2018 Johnston et al.
2018/0130097 A1 5/2018 Tran et al.
2018/0136800 A1 5/2018 Johnston et al.
2018/0146377 A1 5/2018 Folse et al.
2018/0157368 A1 6/2018 Park et al.
2018/0189076 A1 7/2018 Liston et al.
2018/0253900 A1 9/2018 Finding et al.
2018/0260070 A1 9/2018 Mun et al.
2018/0275855 A1 9/2018 Van Os et al.
2018/0293210 A1 10/2018 Xue et al.
2018/0293771 A1 10/2018 Piemonte et al.
2018/0295403 A1 10/2018 Christie et al.
2018/0302680 A1 10/2018 Cormican
2018/0343497 A1 11/2018 Brown et al.
2018/0349509 A1 12/2018 Abou Mahmoud et al.
2018/0364872 A1 12/2018 Miura et al.
2018/0367834 A1 12/2018 Carpenter et al.
2018/0367863 A1 12/2018 Newman et al.
2019/0012048 A1 1/2019 Johnston et al.
2019/0020925 A1 1/2019 Christie et al.
2019/0028769 A1 1/2019 Jeon et al.
2019/0045271 A1 2/2019 Christie et al.
2019/0052744 A1 2/2019 Jung et al.
2019/0058921 A1 2/2019 Christie et al.
2019/0064998 A1 2/2019 Chowdhury et al.
2019/0066672 A1 2/2019 Wood et al.
2019/0073104 A1 3/2019 Wang
2019/0073680 A1 3/2019 Knox
2019/0129588 A1 5/2019 Johnston et al.
2019/0138163 A1 5/2019 Howland et al.
2019/0141399 A1 5/2019 Auxer et al.
2019/0246060 A1 8/2019 Tanabe et al.
2019/0258373 A1 8/2019 Davydov et al.
2019/0272853 A1 9/2019 Moore
2019/0324614 A1 10/2019 Brillon et al.

(56) References Cited

U.S. PATENT DOCUMENTS

2019/0324640 A1 10/2019 Park et al.
2019/0342616 A1 11/2019 Domm et al.
2019/0354264 A1 11/2019 Van Os et al.
2019/0373320 A1 12/2019 Balsamo
2020/0034792 A1 1/2020 Rogers et al.
2020/0068274 A1 2/2020 Aher et al.
2020/0084488 A1 3/2020 Christie et al.
2020/0099985 A1 3/2020 Keighran et al.
2020/0104021 A1 4/2020 Bylenok et al.
2020/0133631 A1 4/2020 Christie et al.
2020/0137175 A1 4/2020 Ganci et al.
2020/0145726 A1 5/2020 Ciuca et al.
2020/0213642 A1 7/2020 Bartos et al.
2020/0257415 A1 8/2020 Clarke
2020/0264825 A1* 8/2020 Itou ........................ G06F 9/451
2020/0272666 A1 8/2020 Van Os et al.
2020/0301567 A1 9/2020 Park et al.
2020/0301575 A1 9/2020 Lindholm et al.
2020/0304863 A1 9/2020 Domm et al.
2020/0304876 A1 9/2020 Cielak et al.
2020/0304879 A1 9/2020 Ellingford
2020/0304880 A1 9/2020 Diaz Delgado et al.
2020/0344531 A1 10/2020 Soundararajan et al.
2020/0356160 A1 11/2020 Kosugi et al.
2020/0363934 A1 11/2020 Van Os et al.
2020/0374595 A1 11/2020 Yang et al.
2020/0380029 A1 12/2020 Chen
2020/0382845 A1 12/2020 Payne
2020/0396507 A1 12/2020 Balsamo
2021/0021903 A1 1/2021 Christie et al.
2021/0092489 A1 3/2021 Dutta et al.
2021/0168424 A1 6/2021 Sharma
2021/0181901 A1 6/2021 Johnston et al.
2021/0195277 A1 6/2021 Thurlow et al.
2021/0223925 A1 7/2021 Bylenok et al.
2021/0286454 A1 9/2021 Beaumier et al.
2021/0306711 A1 9/2021 Ellingford et al.
2021/0337280 A1 10/2021 Diaz Delgado et al.
2021/0345004 A1 11/2021 Christie et al.
2021/0365134 A1 11/2021 Beaumier et al.
2021/0397306 A1 12/2021 Rajam et al.
2021/0406995 A1 12/2021 Peters et al.
2021/0409822 A1 12/2021 Aher et al.
2022/0057984 A1 2/2022 Yang et al.
2022/0132215 A1 4/2022 Venugopal et al.
2022/0179526 A1 6/2022 Schöberl
2022/0244824 A1 8/2022 Cielak
2022/0321940 A1 10/2022 Christie et al.
2022/0329891 A1 10/2022 Christie et al.
2022/0337914 A1 10/2022 Christie et al.
2022/0360858 A1 11/2022 Christie et al.
2022/0413796 A1 12/2022 Christie et al.
2023/0022781 A1 1/2023 Lindholm et al.
2023/0033604 A1 2/2023 Diaz Delgado et al.
2023/0096458 A1 3/2023 Van Os et al.
2023/0127228 A1 4/2023 Clarke
2023/0132595 A1 5/2023 Van Os et al.
2023/0300415 A1 9/2023 Balsamo
2023/0328327 A1 10/2023 Cielak et al.
2024/0037144 A1 2/2024 Chen
2024/0089550 A1 3/2024 Ellingford et al.
2024/0089553 A1 3/2024 Payne
2024/0126401 A1 4/2024 Rajam et al.
2024/0220195 A1 7/2024 Christie et al.
2024/0267583 A1 8/2024 Domm et al.
2024/0323473 A1 9/2024 Newman et al.
2024/0388761 A1 11/2024 Christie et al.
2024/0402899 A1 12/2024 Sart et al.
2024/0419736 A1 12/2024 Van Os et al.
2024/0422394 A1 12/2024 Keighran et al.
2025/0021218 A1 1/2025 Van Os et al.
2025/0138725 A1 5/2025 Lindholm
2025/0142175 A1 5/2025 Christie et al.
2025/0147722 A1 5/2025 Christie et al.
2025/0150659 A1 5/2025 Christie et al.
2025/0156036 A1 5/2025 Johnston et al.
2025/0156051 A1 5/2025 Van Os et al.
2025/0159298 A1 5/2025 Keighran et al.
2025/0165534 A1 5/2025 Van Os et al.
2025/0168443 A1 5/2025 Christie et al.
2025/0168460 A1 5/2025 Christie et al.
2025/0168461 A1 5/2025 Christie et al.
2025/0217009 A1 7/2025 Clarke
2025/0310613 A1 10/2025 Payne
2025/0365466 A1 11/2025 Domm et al.

FOREIGN PATENT DOCUMENTS

AU 2017101431 A4 11/2017
AU 2018100810 A4 7/2018
CN 1295419 A 5/2001
CN 1391765 A 1/2003
CN 1985277 A 6/2007
CN 1985327 A 6/2007
CN 101160932 A 4/2008
CN 101228570 A 7/2008
CN 101317149 A 12/2008
CN 101370104 A 2/2009
CN 101405679 A 4/2009
CN 101436110 A 5/2009
CN 101465993 A 6/2009
CN 101529437 A 9/2009
CN 101641662 A 2/2010
CN 101699505 A 4/2010
CN 101706704 A 5/2010
CN 101719125 A 6/2010
CN 101860447 A 10/2010
CN 102098537 A 6/2011
CN 102103460 A 6/2011
CN 102187338 A 9/2011
CN 102265586 A 11/2011
CN 102325144 A 1/2012
CN 102541419 A 7/2012
CN 102819715 A 12/2012
CN 102859484 A 1/2013
CN 102880404 A 1/2013
CN 102890615 A 1/2013
CN 102939515 A 2/2013
CN 102955653 A 3/2013
CN 102981695 A 3/2013
CN 103037265 A 4/2013
CN 103177738 A 6/2013
CN 103399967 A 11/2013
CN 103516933 A 1/2014
CN 103546816 A 1/2014
CN 103562848 A 2/2014
CN 103562947 A 2/2014
CN 103620531 A 3/2014
CN 103620541 A 3/2014
CN 103620639 A 3/2014
CN 103686418 A 3/2014
CN 103985045 A 8/2014
CN 103999017 A 8/2014
CN 104508618 A 4/2015
CN 104822098 A 8/2015
CN 105190590 A 12/2015
CN 105247526 A 1/2016
CN 105264479 A 1/2016
CN 105303372 A 2/2016
CN 105308634 A 2/2016
CN 105308923 A 2/2016
CN 105336350 A 2/2016
CN 105657554 A 6/2016
CN 105812849 A 7/2016
CN 105828098 A 8/2016
CN 105955520 A 9/2016
CN 105955607 A 9/2016
CN 105989085 A 10/2016
CN 105992068 A 10/2016
CN 106101982 A 11/2016
CN 107710131 A 2/2018
CN 108292190 A 7/2018
CN 109313491 A 2/2019
CN 109313651 A 2/2019

(56) References Cited

FOREIGN PATENT DOCUMENTS

| | | | |
|---|---|---|---|
| DE | 202016003233 | U1 | 8/2016 |
| EP | 0608708 | A2 | 8/1994 |
| EP | 0624853 | A2 | 11/1994 |
| EP | 2386984 | A2 | 11/2011 |
| EP | 2453667 | A1 | 5/2012 |
| EP | 2535844 | A2 | 12/2012 |
| EP | 2574089 | A1 | 3/2013 |
| EP | 2605203 | A1 | 6/2013 |
| EP | 2642402 | A2 | 9/2013 |
| EP | 2672703 | A1 | 12/2013 |
| EP | 2679017 | A2 | 1/2014 |
| EP | 2704032 | A2 | 3/2014 |
| EP | 2725531 | A1 | 4/2014 |
| EP | 2879398 | A1 | 6/2015 |
| EP | 2947905 | A1 | 11/2015 |
| JP | 2000-112977 | A | 4/2000 |
| JP | 2000-163031 | A | 6/2000 |
| JP | 2001-197445 | A | 7/2001 |
| JP | 2002-27381 | A | 1/2002 |
| JP | 2002-342033 | A | 11/2002 |
| JP | 2003-99452 | A | 4/2003 |
| JP | 2003-534737 | A | 11/2003 |
| JP | 2004-62237 | A | 2/2004 |
| JP | 2006-31219 | A | 2/2006 |
| JP | 2007-124465 | A | 5/2007 |
| JP | 2007-512640 | A | 5/2007 |
| JP | 2007-140910 | A | 6/2007 |
| JP | 2007-294068 | A | 11/2007 |
| JP | 2008-71112 | A | 3/2008 |
| JP | 2008-135911 | A | 6/2008 |
| JP | 2009-60328 | A | 3/2009 |
| JP | 2009-206957 | A | 9/2009 |
| JP | 2009-260947 | A | 11/2009 |
| JP | 2009-276557 | A | 11/2009 |
| JP | 2010-28437 | A | 2/2010 |
| JP | 2010-56595 | A | 3/2010 |
| JP | 2010-509684 | A | 3/2010 |
| JP | 2010-114733 | A | 5/2010 |
| JP | 2011-076588 | A | 4/2011 |
| JP | 2011-512701 | A | 4/2011 |
| JP | 2011-123750 | A | 6/2011 |
| JP | 2011-154455 | A | 8/2011 |
| JP | 2011-182146 | A | 9/2011 |
| JP | 2011-205562 | A | 10/2011 |
| JP | 2011-257930 | A | 12/2011 |
| JP | 2012-95123 | A | 5/2012 |
| JP | 2012-123685 | A | 6/2012 |
| JP | 2012-208622 | A | 10/2012 |
| JP | 2013-8369 | A | 1/2013 |
| JP | 2013-12021 | A | 1/2013 |
| JP | 2013-223150 | A | 10/2013 |
| JP | 2013-235523 | A | 11/2013 |
| JP | 2013-242610 | A | 12/2013 |
| JP | 2014-81740 | A | 5/2014 |
| JP | 2014-102660 | A | 6/2014 |
| JP | 2015-50655 | A | 3/2015 |
| JP | 2015-70404 | A | 4/2015 |
| KR | 10-2001-0005939 | A | 1/2001 |
| KR | 10-2001-0035356 | A | 5/2001 |
| KR | 10-2002-0010151 | A | 2/2002 |
| KR | 10-2007-0114329 | A | 12/2007 |
| KR | 10-2009-0106104 | A | 10/2009 |
| KR | 10-2010-0039194 | A | 4/2010 |
| KR | 10-2011-0036408 | A | 4/2011 |
| KR | 10-2011-0061811 | A | 6/2011 |
| KR | 10-2012-0076682 | A | 7/2012 |
| KR | 10-2012-0124445 | A | 11/2012 |
| KR | 10-2013-0014712 | A | 2/2013 |
| KR | 10-2013-0058034 | A | 6/2013 |
| KR | 10-2013-0137969 | A | 12/2013 |
| KR | 10-2014-0041939 | A | 4/2014 |
| KR | 10-2019-0033658 | A | 3/2019 |
| KR | 10-2022-0041231 | A | 3/2022 |
| TW | 200622893 | A | 7/2006 |
| TW | 200719204 | A | 5/2007 |
| TW | 201337717 | A | 9/2013 |
| TW | 201349049 | A | 12/2013 |
| TW | 201351261 | A | 12/2013 |
| WO | 1994/009438 | A2 | 4/1994 |
| WO | 1999/040728 | A1 | 8/1999 |
| WO | 2004/063862 | A2 | 7/2004 |
| WO | 2004/102285 | A2 | 11/2004 |
| WO | 2005/050652 | A1 | 6/2005 |
| WO | 2005/109345 | A1 | 11/2005 |
| WO | 2007/078623 | A2 | 7/2007 |
| WO | 2008/005135 | A1 | 1/2008 |
| WO | 2008/060486 | A2 | 5/2008 |
| WO | 2009/016607 | A2 | 2/2009 |
| WO | 2009/039786 | A1 | 4/2009 |
| WO | 2009/148781 | A1 | 12/2009 |
| WO | 2010/022570 | A1 | 3/2010 |
| WO | 2010/025168 | A1 | 3/2010 |
| WO | 2010/118690 | A1 | 10/2010 |
| WO | 2011/095693 | A1 | 8/2011 |
| WO | 2011/158475 | A1 | 12/2011 |
| WO | 2012/012446 | A2 | 1/2012 |
| WO | 2012/061760 | A2 | 5/2012 |
| WO | 2012/088665 | A1 | 7/2012 |
| WO | 2013/000741 | A1 | 1/2013 |
| WO | 2013/149128 | A2 | 10/2013 |
| WO | 2013/169849 | A2 | 11/2013 |
| WO | 2013/169877 | A2 | 11/2013 |
| WO | 2013/187370 | A1 | 12/2013 |
| WO | 2013/149128 | A3 | 2/2014 |
| WO | 2014/105276 | A1 | 7/2014 |
| WO | 2014/144908 | A1 | 9/2014 |
| WO | 2014/177929 | A2 | 11/2014 |
| WO | 2014/200730 | A1 | 12/2014 |
| WO | 2015/200227 | A1 | 12/2015 |
| WO | 2015/200228 | A1 | 12/2015 |
| WO | 2015/200537 | A2 | 12/2015 |
| WO | 2016/030437 | A1 | 3/2016 |
| WO | 2016/048308 | A1 | 3/2016 |
| WO | 2016/048310 | A1 | 3/2016 |
| WO | 2016/111065 | A1 | 7/2016 |
| WO | 2017/008079 | A1 | 1/2017 |
| WO | 2017/124116 | A1 | 7/2017 |
| WO | 2017/200923 | A1 | 11/2017 |
| WO | 2017/218104 | A1 | 12/2017 |
| WO | 2018/081157 | A1 | 5/2018 |

OTHER PUBLICATIONS

Advisory Action received for U.S. Appl. No. 18/060,902, mailed on Nov. 13, 2023, 2 pages.

Applicant Initiated Interview Summary received for U.S. Appl. No. 15/167,801, mailed on Apr. 23, 2018, 3 pages.

Applicant Initiated Interview Summary received for U.S. Appl. No. 15/167,801, mailed on Jul. 29, 2019, 3 pages.

Applicant Initiated Interview Summary received for U.S. Appl. No. 17/210,352, mailed on Feb. 28, 2022, 4 pages.

Corrected Notice of Allowability received for U.S. Appl. No. 16/108,519, mailed on Dec. 22, 2021, 3 pages.

Notice of Allowance received for U.S. Appl. No. 14/242,575, mailed on Dec. 15, 2016, 7 pages.

Notice of Allowance received for U.S. Appl. No. 14/242,575, mailed on Nov. 16, 2016, 7 pages.

Notice of Allowance received for U.S. Appl. No. 14/255,664, mailed on Aug. 29, 2017, 4 pages.

Notice of Allowance received for U.S. Appl. No. 14/267,671, mailed on Nov. 29, 2018, 3 pages.

Notice of Allowance received for U.S. Appl. No. 14/749,288, mailed on Sep. 21, 2017, 5 pages.

Notice of Allowance received for U.S. Appl. No. 15/276,633, mailed on Sep. 10, 2019, 7 pages.

Corrected Notice of Allowance received for U.S. Appl. No. 15/695,880, mailed on Jun. 11, 2018, 6 pages.

Corrected Notice of Allowance received for U.S. Appl. No. 15/714,904, mailed on Sep. 7, 2018, 5 pages.

Corrected Notice of Allowance received for U.S. Appl. No. 15/876,715, mailed on Apr. 11, 2022, 4 Pages.

(56) References Cited

OTHER PUBLICATIONS

Corrected Notice of Allowance received for U.S. Appl. No. 15/876,715, mailed on Apr. 19, 2022, 4 Pages.
Corrected Notice of Allowance received for U.S. Appl. No. 15/876,715, mailed on Oct. 20, 2021, 2 pages.
Corrected Notice of Allowance received for U.S. Appl. No. 16/010,280, mailed on Aug. 6, 2019, 2 pages.
Corrected Notice of Allowance received for U.S. Appl. No. 16/036,810, mailed on Nov. 19, 2018, 6 pages.
Corrected Notice of Allowance received for U.S. Appl. No. 16/142,635, mailed on Mar. 10, 2022, 2 Pages.
Corrected Notice of Allowance received for U.S. Appl. No. 16/233,990, mailed on Mar. 8, 2022, 4 pages.
Corrected Notice of Allowance received for U.S. Appl. No. 16/233,990, mailed on Oct. 20, 2022, 2 pages.
Corrected Notice of Allowance received for U.S. Appl. No. 16/827,931, mailed on Dec. 6, 2021, 4 pages.
Corrected Notice of Allowance received for U.S. Appl. No. 16/872,274, mailed on Aug. 12, 2022, 5 pages.
Corrected Notice of Allowance received for U.S. Appl. No. 16/888,453, mailed on Jul. 26, 2023, 5 pages.
Corrected Notice of Allowance received for U.S. Appl. No. 16/888,478, mailed on Oct. 31, 2023, 6 pages.
Corrected Notice of Allowance received for U.S. Appl. No. 16/945,724, mailed on Aug. 31, 2022, 2 pages.
Corrected Notice of Allowance received for U.S. Appl. No. 17/000,112, mailed on Jun. 17, 2022, 2 pages.
Corrected Notice of Allowance received for U.S. Appl. No. 17/065,387, mailed on Mar. 30, 2022, 2 Pages.
Corrected Notice of Allowance received for U.S. Appl. No. 17/210,352, mailed on Sep. 20, 2023, 5 pages.
Corrected Notice of Allowance received for U.S. Appl. No. 17/367,227, mailed on Jul. 27, 2023, 2 pages.
Cover Flow, Wikipedia, Available online at: <https://en.wikipedia.org/w/index.php?title=Cover_Flow&oldid=879285208>, Jan. 20, 2019, 3 pages.
Examiner Initiated Interview Summary received for U.S. Appl. No. 15/390,377, mailed on Oct. 30, 2017, 2 pages.
Examiner's Answer to Appeal Brief received for U.S. Appl. No. 15/876,715, mailed on Aug. 18, 2020, 16 pages.
Examiner's Answer to Appeal Brief received for U.S. Appl. No. 16/175,565, mailed on Dec. 15, 2023, 27 pages.
Examiner's Answer to Appeal Brief received for U.S. Appl. No. 16/697,090, mailed on Oct. 26, 2023, 10 pages.
Extended European Search Report received for European Patent Application No. 17813728.7, mailed on Feb. 11, 2019, 8 pages.
Extended European Search Report received for European Patent Application No. 20190698.9, mailed on Oct. 30, 2020, 6 pages.
Extended European Search Report received for European Patent Application No. 20199219.5, mailed on Apr. 22, 2021, 8 pages.
Extended European Search Report received for European Patent Application No. 22167405.4, mailed on Jul. 4, 2022, 11 pages.
Final Office Action received for U.S. Appl. No. 14/255,664, mailed on Oct. 17, 2016, 16 pages.
Final Office Action received for U.S. Appl. No. 14/267,671, mailed on May 23, 2018, 17 pages.
Final Office Action received for U.S. Appl. No. 14/267,671, mailed on Oct. 26, 2016, 21 pages.
Final Office Action received for U.S. Appl. No. 14/271,179, mailed on Dec. 15, 2016, 10 pages.
Final Office Action received for U.S. Appl. No. 14/271,179, mailed on Jun. 20, 2019, 15 pages.
Final Office Action received for U.S. Appl. No. 14/271,179, mailed on Jun. 21, 2018, 14 pages.
Final Office Action received for U.S. Appl. No. 14/746,095, mailed on Jul. 16, 2018, 33 pages.
Final Office Action received for U.S. Appl. No. 14/746,662, mailed on Apr. 24, 2017, 8 pages.
Final Office Action received for U.S. Appl. No. 14/746,662, mailed on Jun. 27, 2017, 9 pages.
Final Office Action received for U.S. Appl. No. 15/167,801, mailed on Apr. 5, 2019, 18 pages.
Final Office Action received for U.S. Appl. No. 15/167,801, mailed on May 28, 2020, 17 pages.
Final Office Action received for U.S. Appl. No. 15/167,801, mailed on Nov. 29, 2017, 12 pages.
Final Office Action received for U.S. Appl. No. 15/167,801, mailed on Sep. 19, 2023, 19 pages.
Final Office Action received for U.S. Appl. No. 15/235,000, mailed on Dec. 19, 2018, 33 pages.
Final Office Action received for U.S. Appl. No. 15/235,000, mailed on Mar. 13, 2018, 31 pages.
Final Office Action received for U.S. Appl. No. 15/272,393, mailed on Mar. 25, 2019, 54 pages.
Final Office Action received for U.S. Appl. No. 15/272,397, mailed on Mar. 7, 2017, 23 pages.
Final Office Action received for U.S. Appl. No. 15/276,633, mailed on Jul. 26, 2017, 15 pages.
Final Office Action received for U.S. Appl. No. 15/276,633, mailed on Oct. 29, 2018, 12 pages.
Final Office Action received for U.S. Appl. No. 15/390,377, mailed on Nov. 9, 2017, 18 pages.
Final Office Action received for U.S. Appl. No. 15/507,229, mailed on Jul. 15, 2020, 20 pages.
Final Office Action received for U.S. Appl. No. 15/507,229, mailed on Sep. 18, 2019, 15 pages.
Final Office Action received for U.S. Appl. No. 15/719,404, mailed on Aug. 8, 2019, 19 pages.
Final Office Action received for U.S. Appl. No. 15/719,404, mailed on Mar. 30, 2021, 19 pages.
Final Office Action received for U.S. Appl. No. 15/876,715, mailed on Nov. 5, 2018, 15 pages.
Final Office Action received for U.S. Appl. No. 16/108,519, mailed on Dec. 12, 2019, 10 pages.
Final Office Action received for U.S. Appl. No. 16/108,519, mailed on Nov. 25, 2020, 12 pages.
Final Office Action received for U.S. Appl. No. 16/126,962, mailed on Apr. 8, 2020, 20 pages.
Final Office Action received for U.S. Appl. No. 16/136,005, mailed on Mar. 9, 2020, 9 pages.
Final Office Action received for U.S. Appl. No. 16/142,635, mailed on Feb. 3, 2021, 23 pages.
Final Office Action received for U.S. Appl. No. 16/144,077, mailed on Jul. 12, 2019, 22 pages.
Final Office Action received for U.S. Appl. No. 16/175,565, mailed on May 27, 2022, 33 pages.
Final Office Action received for U.S. Appl. No. 16/175,565, mailed on Nov. 12, 2020, 40 pages.
Final Office Action received for U.S. Appl. No. 16/222,619, mailed on Jul. 27, 2020, 11 pages.
Final Office Action received for U.S. Appl. No. 16/233,990, mailed on Jan. 11, 2021, 17 pages.
Final Office Action received for U.S. Appl. No. 16/584,790, mailed on Jun. 14, 2022, 37 pages.
Final Office Action received for U.S. Appl. No. 16/584,790, mailed on Jun. 15, 2021, 30 pages.
Final Office Action received for U.S. Appl. No. 16/584,790, mailed on May 27, 2020, 27 pages.
Final Office Action received for U.S. Appl. No. 16/682,443, mailed on Mar. 9, 2021, 9 pages.
Final Office Action received for U.S. Appl. No. 16/697,090, mailed on Dec. 14, 2022, 28 pages.
Final Office Action received for U.S. Appl. No. 16/697,090, mailed on Feb. 23, 2022, 25 pages.
Final Office Action received for U.S. Appl. No. 16/697,090, mailed on Jan. 27, 2021, 18 pages.
Final Office Action received for U.S. Appl. No. 16/827,910, mailed on Feb. 28, 2022, 17 pages.
Final Office Action received for U.S. Appl. No. 16/827,910, mailed on Mar. 15, 2023, 18 pages.
Final Office Action received for U.S. Appl. No. 16/827,918, mailed on Jul. 8, 2021, 31 pages.

(56) References Cited

OTHER PUBLICATIONS

Final Office Action received for U.S. Appl. No. 16/827,926, mailed on Apr. 18, 2023, 32 pages.
Final Office Action received for U.S. Appl. No. 16/827,926, mailed on Mar. 17, 2021, 44 pages.
Final Office Action received for U.S. Appl. No. 16/865,172, mailed on Feb. 12, 2021, 29 pages.
Final Office Action received for U.S. Appl. No. 16/872,274, mailed on Dec. 23, 2021, 20 pages.
Final Office Action received for U.S. Appl. No. 16/888,453, mailed on Apr. 8, 2022, 39 pages.
Final Office Action received for U.S. Appl. No. 16/888,478, mailed on Feb. 13, 2023, 27 pages.
Final Office Action received for U.S. Appl. No. 16/888,478, mailed on Nov. 15, 2021, 27 pages.
Final Office Action received for U.S. Appl. No. 17/133,550, mailed on Feb. 11, 2022, 18 pages.
Final Office Action received for U.S. Appl. No. 17/133,550, mailed on Feb. 15, 2023, 22 pages.
Final Office Action received for U.S. Appl. No. 17/210,352, mailed on Jun. 3, 2022, 21 pages.
Final Office Action received for U.S. Appl. No. 17/353,527, mailed on May 11, 2022, 17 Pages.
Final Office Action received for U.S. Appl. No. 17/379,785, mailed on Aug. 23, 2023, 13 pages.
Final Office Action received for U.S. Appl. No. 17/379,785, mailed on Oct. 28, 2022, 14 pages.
Final Office Action received for U.S. Appl. No. 17/586,625, mailed on May 4, 2023, 15 pages.
Final Office Action received for U.S. Appl. No. 17/660,622, mailed on May 24, 2023, 20 pages.
Final Office Action received for U.S. Appl. No. 17/937,410, mailed on Aug. 3, 2023, 15 pages.
Final Office Action received for U.S. Appl. No. 17/937,704, mailed on Aug. 31, 2023, 18 pages.
Final Office Action received for U.S. Appl. No. 18/060,902, mailed on Aug. 25, 2023, 8 pages.
International Search Report received for PCT Patent Application No. PCT/US2014/057272, mailed on May 28, 2015, 4 pages.
International Search Report received for PCT Patent Application No. PCT/US2014/057280, mailed on May 27, 2015, 4 pages.
International Search Report received for PCT Patent Application No. PCT/US2015/037027, mailed on Sep. 28, 2015, 3 pages.
International Search Report received for PCT Patent Application No. PCT/US2015/037030, mailed on Dec. 10, 2015, 6 pages.
International Search Report received for PCT Patent Application No. PCT/US2015/037520, mailed on Mar. 7, 2016, 6 pages.
International Search Report received for PCT Patent Application No. PCT/US2017/029448, mailed on Jul. 13, 2017, 3 pages.
International Search Report received for PCT Patent Application No. PCT/US2017/031764, mailed on Aug. 7, 2017, 2 pages.
International Search Report received for PCT Patent Application No. PCT/US2017/058132, mailed on Mar. 27, 2018, 6 pages.
International Search Report received for PCT Patent Application No. PCT/US2019/034921, mailed on Nov. 19, 2019, 5 pages.
International Search Report received for PCT Patent Application No. PCT/US2020/024452, mailed on Aug. 6, 2020, 6 pages.
International Search Report received for PCT Patent Application No. PCT/US2020/024485, mailed on Aug. 3, 2020, 6 pages.
International Search Report received for PCT Patent Application No. PCT/US2020/024486, mailed on Aug. 11, 2020, 6 pages.
International Search Report received for PCT Patent Application No. PCT/US2020/024492, mailed on Aug. 10, 2020, 6 pages.
International Search Report received for PCT Patent Application No. PCT/US2020/035423, mailed on Oct. 13, 2020, 4 pages.
Invitation to Pay Additional Fees received for PCT Patent Application No. PCT/US2019/034921, mailed on Sep. 24, 2019, 12 pages.
Invitation to Pay Additional Fees received for PCT Patent Application No. PCT/US2020/024452, mailed on Jun. 15, 2020, 13 pages.
Invitation to Pay Additional Fees received for PCT Patent Application No. PCT/US2020/024485, mailed on Jun. 8, 2020, 11 pages.
Invitation to Pay Additional Fees received for PCT Patent Application No. PCT/US2020/024486, mailed on Jun. 3, 2020, 11 pages.
Invitation to Pay Additional Fees received for PCT Patent Application No. PCT/US2020/024492, mailed on Jun. 8, 2020, 10 pages.
Non-Final Office Action received for U.S. Appl. No. 14/208,099, mailed on Jun. 25, 2015, 12 pages.
Non-Final Office Action received for U.S. Appl. No. 14/242,575, mailed on Mar. 21, 2016, 12 pages.
Non-Final Office Action received for U.S. Appl. No. 14/255,664, mailed on Apr. 1, 2016, 15 pages.
Office Action received for U.S. Appl. No. 14/262,435, mailed on Feb. 22, 2016, 22 pages.
Office Action received for U.S. Appl. No. 14/267,671, mailed on Apr. 1, 2016, 16 pages.
Office Action received for U.S. Appl. No. 14/267,671, mailed on Dec. 1, 2017, 18 pages.
Office Action received for U.S. Appl. No. 14/267,671, mailed on May 26, 2017, 18 pages.
Office Action received for U.S. Appl. No. 14/271,179, mailed on May 29, 2015, 25 pages.
Office Action received for U.S. Appl. No. 14/271,179, mailed on Oct. 5, 2018, 15 pages.
Office Action received for U.S. Appl. No. 14/271,179, mailed on Sep. 21, 2017, 12 pages.
Office Action received for U.S. Appl. No. 14/746,095, mailed on Dec. 1, 2017, 34 pages.
Office Action received for U.S. Appl. No. 14/746,095, mailed on Jul. 25, 2019, 33 pages.
Office Action received for U.S. Appl. No. 14/746,620, mailed on Jan. 11, 2017, 16 pages.
Office Action received for U.S. Appl. No. 14/746,662, mailed on Aug. 9, 2016, 8 pages.
Office Action received for U.S. Appl. No. 14/749,288, mailed on Oct. 12, 2016, 11 pages.
Non-Final Office Action received for U.S. Appl. No. 15/167,801 mailed on Mar. 24, 2017, 12 pages.
Non-Final Office Action received for U.S. Appl. No. 15/167,801, mailed on Aug. 30, 2018, 15 pages.
Non-Final Office Action received for U.S. Appl. No. 15/167,801, mailed on Dec. 11, 2020, 18 pages.
Non-Final Office Action received for U.S. Appl. No. 15/167,801, mailed on Feb. 8, 2023, 23 pages.
Non-Final Office Action received for U.S. Appl. No. 15/167,801, mailed on May 18, 2022, 17 Pages.
Non-Final Office Action received for U.S. Appl. No. 15/167,801, mailed on Sep. 3, 2021, 17 pages.
Non-Final Office Action received for U.S. Appl. No. 15/167,801, mailed on Sep. 26, 2019, 18 pages.
Non-Final Office Action received for U.S. Appl. No. 15/224,370, mailed on Oct. 3, 2017, 14 pages.
Non-Final Office Action received for U.S. Appl. No. 15/235,000, mailed on Jul. 14, 2017, 31 pages.
Non-Final Office Action received for U.S. Appl. No. 15/235,000, mailed on Jul. 25, 2018, 31 pages.
Non-Final Office Action received for U.S. Appl. No. 15/235,000, mailed on Jun. 26, 2019, 31 pages.
Non-Final Office Action received for U.S. Appl. No. 15/272,393, mailed on Oct. 2, 2018, 52 pages.
Non-Final Office Action received for U.S. Appl. No. 15/272,397, mailed on Nov. 22, 2016, 20 pages.
Non-Final Office Action received for U.S. Appl. No. 15/276,633, mailed on Feb. 23, 2018, 12 pages.
Non-Final Office Action received for U.S. Appl. No. 15/276,633, mailed on Mar. 5, 2019, 16 pages.
Non-Final Office Action received for U.S. Appl. No. 15/276,633, mailed on Nov. 17, 2016, 12 pages.
Non-Final Office Action received for U.S. Appl. No. 15/390,377, mailed on Apr. 5, 2017, 17 pages.

(56) References Cited

OTHER PUBLICATIONS

Non-Final Office Action received for U.S. Appl. No. 15/414,493, mailed on Oct. 6, 2017, 15 pages.
Non-Final Office Action received for U.S. Appl. No. 15/507,229, mailed on Feb. 27, 2020, 16 pages.
Non-Final Office Action received for U.S. Appl. No. 15/507,229, mailed on Jun. 3, 2019, 14 pages.
Non-Final Office Action received for U.S. Appl. No. 15/674,992, mailed on May 11, 2018, 8 pages.
Non-Final Office Action received for U.S. Appl. No. 15/719,404, mailed on Dec. 14, 2018, 14 pages.
Non-Final Office Action received for U.S. Appl. No. 15/719,404, mailed on May 10, 2023, 14 pages.
Non-Final Office Action received for U.S. Appl. No. 15/719,404, mailed on Nov. 26, 2021, 19 pages.
Non-Final Office Action received for U.S. Appl. No. 15/719,404, mailed on Oct. 16, 2020, 18 pages.
Non-Final Office Action received for U.S. Appl. No. 15/798,092, mailed on Dec. 20, 2017, 20 pages.
Non-Final Office Action received for U.S. Appl. No. 15/876,715, mailed on Jun. 4, 2018, 12 pages.
Non-Final Office Action received for U.S. Appl. No. 15/876,715, mailed on Sep. 10, 2019, 13 pages.
Non-Final Office Action received for U.S. Appl. No. 15/990,327, mailed on Jul. 31, 2018, 8 pages.
Non-Final Office Action received for U.S. Appl. No. 16/010,280, mailed on Mar. 7, 2019, 5 pages.
Non-Final Office Action received for U.S. Appl. No. 16/108,519, mailed on Apr. 5, 2021, 13 pages.
Non-Final Office Action received for U.S. Appl. No. 16/108,519, mailed on Aug. 2, 2019, 10 pages.
Non-Final Office Action received for U.S. Appl. No. 16/108,519, mailed on May 8, 2020, 11 pages.
Non-Final Office Action received for U.S. Appl. No. 16/126,962, mailed on Aug. 25, 2020, 22 pages.
Non-Final Office Action received for U.S. Appl. No. 16/126,962, mailed on Sep. 3, 2019, 16 pages.
Non-Final Office Action received for U.S. Appl. No. 16/136,005, mailed on Sep. 9, 2020, 10 pages.
Non-Final Office Action received for U.S. Appl. No. 16/142,635, mailed on Sep. 18, 2019, 9 pages.
Non-Final Office Action received for U.S. Appl. No. 16/142,635, mailed on Jun. 8, 2020, 19 pages.
Non-Final Office Action received for U.S. Appl. No. 16/142,635, mailed on Jun. 11, 2021, 23 pages.
Non-Final Office Action received for U.S. Appl. No. 16/144,077, mailed on Feb. 19, 2019, 24 pages.
Non-Final Office Action received for U.S. Appl. No. 16/144,077, mailed on Nov. 27, 2019, 40 pages.
Non-Final Office Action received for U.S. Appl. No. 16/175,565, mailed on Feb. 17, 2023, 33 pages.
Non-Final Office Action received for U.S. Appl. No. 16/175,565, mailed on Sep. 20, 2021, 33 pages.
Non-Final Office Action received for U.S. Appl. No. 16/222,619, mailed on Mar. 19, 2020, 16 pages.
Non-Final Office Action received for U.S. Appl. No. 16/233,990, mailed on Jul. 9, 2021, 18 pages.
Non-Final Office Action received for U.S. Appl. No. 16/233,990, mailed on Jun. 18, 2020, 17 pages.
Non-Final Office Action received for U.S. Appl. No. 16/392,467, mailed on Sep. 27, 2019, 5 pages.
Non-Final Office Action received for U.S. Appl. No. 16/584,790, mailed on Dec. 23, 2020, 30 pages.
Non-Final Office Action received for U.S. Appl. No. 16/584,790, mailed on Dec. 26, 2019, 24 pages.
Non-Final Office Action received for U.S. Appl. No. 16/584,790, mailed on Feb. 1, 2022, 33 pages.
Non-Final Office Action received for U.S. Appl. No. 16/682,443, mailed on Sep. 23, 2020, 10 pages.
Non-Final Office Action received for U.S. Appl. No. 16/697,090, mailed on Aug. 3, 2021, 16 pages.
Non-Final Office Action received for U.S. Appl. No. 16/697,090, mailed on Jul. 6, 2020, 14 pages.
Non-Final Office Action received for U.S. Appl. No. 16/697,090, mailed on Jul. 7, 2022, 25 pages.
Non-Final Office Action received for U.S. Appl. No. 16/827,910, mailed on Jun. 17, 2021, 16 pages.
Non-Final Office Action received for U.S. Appl. No. 16/827,910, mailed on Sep. 14, 2022, 18 pages.
Non-Final Office Action received for U.S. Appl. No. 16/827,918, mailed on Dec. 10, 2020, 28 pages.
Non-Final Office Action received for U.S. Appl. No. 16/827,926, mailed on Apr. 25, 2022, 27 pages.
Non-Final Office Action received for U.S. Appl. No. 16/827,926, mailed on Oct. 29, 2020, 45 pages.
Non-Final Office Action received for U.S. Appl. No. 16/827,931, mailed on Mar. 3, 2021, 24 pages.
Non-Final Office Action received for U.S. Appl. No. 16/865,172 mailed on Jun. 29, 2021, 29 pages.
Non-Final Office Action received for U.S. Appl. No. 16/865,172, mailed on Aug. 20, 2020, 19 pages.
Non-Final Office Action received for U.S. Appl. No. 16/872,274, mailed on Jul. 9, 2021, 19 pages.
Non-Final Office Action received for U.S. Appl. No. 16/888,453, mailed on Jun. 4, 2021, 37 pages.
Non-Final Office Action received for U.S. Appl. No. 16/888,478, mailed on Feb. 8, 2021, 24 pages.
Non-Final Office Action received for U.S. Appl. No. 16/888,478, mailed on May 2, 2022, 29 pages.
Non-Final Office Action received for U.S. Appl. No. 16/945,724, mailed on Jul. 19, 2021, 8 pages.
Non-Final Office Action received for U.S. Appl. No. 17/000,112, mailed on Dec. 7, 2021, 15 pages.
Non-Final Office Action received for U.S. Appl. No. 17/065,387, mailed on Jan. 28, 2021, 28 pages.
Non-Final Office Action received for U.S. Appl. No. 17/065,387, mailed on Jun. 1, 2021, 25 pages.
Non-Final Office Action received for U.S. Appl. No. 17/133,550, mailed on Dec. 18, 2023, 25 pages.
Non-Final Office Action received for U.S. Appl. No. 17/133,550, mailed on Jun. 8, 2021, 23 pages.
Non-Final Office Action received for U.S. Appl. No. 17/133,550, mailed on Sep. 9, 2022, 23 pages.
Non-Final Office Action received for U.S. Appl. No. 17/210,352, mailed on Oct. 18, 2021, 18 pages.
Non-Final Office Action received for U.S. Appl. No. 17/353,527, mailed on Dec. 8, 2022, 17 pages.
Non-Final Office Action received for U.S. Appl. No. 17/353,527, mailed on Oct. 5, 2021, 14 pages.
Non-Final Office Action received for U.S. Appl. No. 17/379,785, mailed on Mar. 9, 2023, 14 pages.
Non-Final Office Action received for U.S. Appl. No. 17/379,785, mailed on Mar. 30, 2022, 18 pages.
Non-Final Office Action received for U.S. Appl. No. 17/457,901, mailed on Apr. 28, 2022, 24 pages.
Non-Final Office Action received for U.S. Appl. No. 17/586,625, mailed on Sep. 1, 2022, 13 pages.
Non-Final Office Action received for U.S. Appl. No. 17/651,731, mailed on Apr. 25, 2023, 9 pages.
Non-Final Office Action received for U.S. Appl. No. 17/656,610, mailed on Feb. 6, 2023, 10 pages.
Non-Final Office Action received for U.S. Appl. No. 17/656,610, mailed on Jul. 26, 2023, 10 pages.
Non-Final Office Action received for U.S. Appl. No. 17/657,913, mailed on Jul. 21, 2023, 16 pages.
Non-Final Office Action received for U.S. Appl. No. 17/660,622, mailed on Dec. 20, 2022, 17 pages.
Non-Final Office Action received for U.S. Appl. No. 17/937,410, mailed on Mar. 2, 2023, 15 pages.
Non-Final Office Action received for U.S. Appl. No. 17/937,704, mailed on Mar. 30, 2023, 18 pages.

(56) References Cited

OTHER PUBLICATIONS

Non-Final Office Action received for U.S. Appl. No. 18/060,902, mailed on Dec. 1, 2023, 9 pages.
Non-Final Office Action received for U.S. Appl. No. 18/060,902, mailed on Mar. 10, 2023, 8 pages.
Non-Final Office Action received for U.S. Appl. No. 18/146,336, mailed on Aug. 3, 2023, 23 pages.
Non-Final Office Action received for U.S. Appl. No. 16/175,565, mailed on Mar. 4, 2020, 36 pages.
Notice of Allowability received for U.S. Appl. No. 17/457,901, mailed on Mar. 8, 2023, 9 pages.
Notice of Allowance received for U.S. Appl. No. 14/208,099, mailed on Feb. 3, 2016, 10 pages.
Notice of Allowance received for U.S. Appl. No. 14/242,575, mailed on Oct. 27, 2016, 11 pages.
Notice of Allowance received for U.S. Appl. No. 14/255,664, mailed on May 5, 2017, 7 pages.
Notice of Allowance received for U.S. Appl. No. 14/262,435, mailed on Aug. 16, 2016, 6 pages.
Notice of Allowance received for U.S. Appl. No. 14/267,671, mailed on Sep. 19, 2018, 8 pages.
Notice of Allowance received for U.S. Appl. No. 14/746,095, mailed on Dec. 31, 2019, 8 pages.
Notice of Allowance received for U.S. Appl. No. 14/746,620, mailed on Sep. 25, 2017, 8 pages.
Notice of Allowance received for U.S. Appl. No. 14/746,662, mailed on Sep. 25, 2017, 7 pages.
Notice of Allowance received for U.S. Appl. No. 14/749,288, mailed on May 25, 2017, 8 pages.
Notice of Allowance received for U.S. Appl. No. 15/272,393, mailed on Jan. 15, 2020, 7 pages.
Notice of Allowance received for U.S. Appl. No. 15/272,393, mailed on Sep. 18, 2019, 10 pages.
Notice of Allowance received for U.S. Appl. No. 15/272,397, mailed on Oct. 18, 2017, 8 pages.
Notice of Allowance received for U.S. Appl. No. 15/276,633, mailed on Aug. 26, 2019, 8 pages.
Notice of Allowance received for U.S. Appl. No. 15/390,377, mailed on Jul. 2, 2018, 9 pages.
Notice of Allowance received for U.S. Appl. No. 15/414,493, mailed on Mar. 14, 2018, 7 pages.
Notice of Allowance received for U.S. Appl. No. 15/674,992, mailed on Oct. 1, 2018, 7 pages.
Notice of Allowance received for U.S. Appl. No. 15/695,880, mailed on Feb. 28, 2018, 10 pages.
Notice of Allowance received for U.S. Appl. No. 15/695,880, mailed on Oct. 18, 2017, 9 pages.
Notice of Allowance received for U.S. Appl. No. 15/714,904, mailed on May 22, 2018, 8 pages.
Notice of Allowance received for U.S. Appl. No. 15/719,404, mailed on Dec. 8, 2023, 10 pages.
Notice of Allowance received for U.S. Appl. No. 15/719,404, mailed on Jul. 13, 2022, 8 pages.
Notice of Allowance received for U.S. Appl. No. 15/719,404, mailed on Nov. 9, 2022, 7 pages.
Notice of Allowance received for U.S. Appl. No. 15/798,092, mailed on Jun. 7, 2018, 9 pages.
Notice of Allowance received for U.S. Appl. No. 15/798,092, mailed on Oct. 9, 2018, 5 pages.
Notice of Allowance received for U.S. Appl. No. 15/833,618, mailed on Mar. 14, 2018, 9 pages.
Notice of Allowance received for U.S. Appl. No. 15/876,715, mailed on Apr. 4, 2022, 7 pages.
Notice of Allowance received for U.S. Appl. No. 15/876,715, mailed on Aug. 3, 2022, 7 pages.
Notice of Allowance received for U.S. Appl. No. 15/876,715, mailed on Oct. 14, 2021, 7 pages.
Notice of Allowance received for U.S. Appl. No. 15/990,327, mailed on Jan. 11, 2019, 7 pages.
Notice of Allowance received for U.S. Appl. No. 16/010,280, mailed on Jul. 29, 2019, 7 pages.
Notice of Allowance received for U.S. Appl. No. 16/036,810, mailed on Oct. 31, 2018, 9 pages.
Notice of Allowance received for U.S. Appl. No. 16/108,519, mailed on Sep. 21, 2021, 8 pages.
Notice of Allowance received for U.S. Appl. No. 16/136,005, mailed on Feb. 24, 2021, 8 pages.
Notice of Allowance received for U.S. Appl. No. 16/136,005, mailed on Jun. 9, 2021, 7 pages.
Notice of Allowance received for U.S. Appl. No. 16/142,635, mailed on Nov. 10, 2021, 8 pages.
Notice of Allowance received for U.S. Appl. No. 16/144,077, mailed on May 8, 2020, 15 pages.
Notice of Allowance received for U.S. Appl. No. 16/222,619, mailed on Nov. 20, 2020, 9 pages.
Notice of Allowance received for U.S. Appl. No. 16/233,990, mailed on Feb. 22, 2022, 8 pages.
Notice of Allowance received for U.S. Appl. No. 16/233,990, mailed on Jan. 31, 2023, 5 pages.
Notice of Allowance received for U.S. Appl. No. 16/233,990, mailed on May 26, 2022, 5 pages.
Notice of Allowance received for U.S. Appl. No. 16/233,990, mailed on Oct. 5, 2022, 5 pages.
Notice of Allowance received for U.S. Appl. No. 16/392,467, mailed on Mar. 23, 2020, 9 pages.
Notice of Allowance received for U.S. Appl. No. 16/584,790, mailed on Feb. 3, 2023, 9 pages.
Notice of Allowance received for U.S. Appl. No. 16/682,443, mailed on Aug. 20, 2021, 7 pages.
Notice of Allowance received for U.S. Appl. No. 16/682,443, mailed on Nov. 17, 2021, 8 pages.
Notice of Allowance received for U.S. Appl. No. 16/726,179, mailed on Jun. 17, 2021, 9 pages.
Notice of Allowance received for U.S. Appl. No. 16/726,179, mailed on Sep. 30, 2021, 8 pages.
Notice of Allowance received for U.S. Appl. No. 16/827,910, mailed on Aug. 3, 2023, 21 pages.
Notice of Allowance received for U.S. Appl. No. 16/827,910, mailed on Dec. 13, 2023, 19 pages.
Notice of Allowance received for U.S. Appl. No. 16/827,918, mailed on Feb. 7, 2022, 9 pages.
Notice of Allowance received for U.S. Appl. No. 16/827,918, mailed on Jun. 8, 2022, 9 Pages.
Notice of Allowance received for U.S. Appl. No. 16/827,926, mailed on Feb. 2, 2024, 8 pages.
Notice of Allowance received for U.S. Appl. No. 16/827,926, mailed on Nov. 1, 2021, 35 pages.
Notice of Allowance received for U.S. Appl. No. 16/827,926, mailed on Sep. 13, 2023, 9 pages.
Notice of Allowance received for U.S. Appl. No. 16/827,931, mailed on Apr. 19, 2022, 7 Pages.
Notice of Allowance received for U.S. Appl. No. 16/827,931, mailed on Jan. 5, 2022, 7 pages.
Notice of Allowance received for U.S. Appl. No. 16/827,931, mailed on Sep. 15, 2021, 11 pages.
Notice of Allowance received for U.S. Appl. No. 16/827,942, mailed on Apr. 28, 2021, 5 pages.
Notice of Allowance received for U.S. Appl. No. 16/827,942, mailed on Jan. 22, 2021, 5 pages.
Notice of Allowance received for U.S. Appl. No. 16/827,942, mailed on Oct. 5, 2020, 10 pages.
Notice of Allowance received for U.S. Appl. No. 16/865,172, mailed on Apr. 13, 2022, 8 pages.
Notice of Allowance received for U.S. Appl. No. 16/865,172, mailed on Aug. 25, 2022, 8 pages.
Notice of Allowance received for U.S. Appl. No. 16/865,172, mailed on Dec. 16, 2021, 10 pages.
Notice of Allowance received for U.S. Appl. No. 16/872,274, mailed on Apr. 19, 2022, 10 Pages.
Notice of Allowance received for U.S. Appl. No. 16/888,453, mailed on Jun. 21, 2023, 7 pages.

(56) References Cited

OTHER PUBLICATIONS

Notice of Allowance received for U.S. Appl. No. 16/888,453, mailed on Mar. 1, 2023, 8 pages.
Notice of Allowance received for U.S. Appl. No. 16/888,478, mailed on Aug. 2, 2023, 9 pages.
Notice of Allowance received for U.S. Appl. No. 16/945,724, mailed on Apr. 4, 2022, 8 Pages.
Notice of Allowance received for U.S. Appl. No. 16/945,724, mailed on Dec. 20, 2021, 7 pages.
Notice of Allowance received for U.S. Appl. No. 16/945,724, mailed on Jul. 20, 2022, 8 pages.
Notice of Allowance received for U.S. Appl. No. 17/000,112, mailed on Jun. 3, 2022, 14 pages.
Notice of Allowance received for U.S. Appl. No. 17/000,112, mailed on Oct. 18, 2022, 10 pages.
Notice of Allowance received for U.S. Appl. No. 17/065,387, mailed on Dec. 1, 2021, 10 pages.
Notice of Allowance received for U.S. Appl. No. 17/210,352, mailed on Dec. 5, 2022, 9 pages.
Notice of Allowance received for U.S. Appl. No. 17/210,352, mailed on Mar. 16, 2023, 7 pages.
Notice of Allowance received for U.S. Appl. No. 17/353,527, mailed on Jul. 21, 2023, 7 pages.
Notice of Allowance received for U.S. Appl. No. 17/353,527, mailed on Oct. 4, 2023, 7 pages.
Notice of Allowance received for U.S. Appl. No. 17/367,227, mailed on Mar. 23, 2023, 12 pages.
Notice of Allowance received for U.S. Appl. No. 17/457,901, mailed on Nov. 16, 2022, 9 pages.
Notice of Allowance received for U.S. Appl. No. 17/586,625, mailed on Oct. 26, 2023, 7 pages.
Notice of Allowance received for U.S. Appl. No. 17/651,731, mailed on Oct. 3, 2023, 5 pages.
Notice of Allowance received for U.S. Appl. No. 17/654,578, mailed on Feb. 15, 2023, 8 pages.
Notice of Allowance received for U.S. Appl. No. 17/654,578, mailed on Jun. 13, 2023, 7 pages.
Notice of Allowance received for U.S. Appl. No. 17/654,578, mailed on Oct. 25, 2022, 8 pages.
Patent Board Decision received for U.S. Appl. No. 15/876,715, mailed on Aug. 3, 2021, 8 pages.
Restriction Requirement received for U.S. Appl. No. 14/208,099, mailed on Feb. 24, 2015, 5 pages.
Search Report received for Chinese Patent Application No. 201580028382.1, mailed on Oct. 12, 2018, 5 pages (2 pages of English Translation & 3 pages of Official copy).
Search Report received for Chinese Patent Application No. 201680050096.X, mailed on Jan. 10, 2022, 4 pages (2 pages of English Translation and 2 pages of Official Copy).
Search Report received for Chinese Patent Application No. 201780033590.X, mailed on Mar. 24, 2021, 4 pages (2 page of English Translation and 2 pages of Official Copy).
Search Report received for Chinese Patent Application No. 201780066823.6, mailed on Nov. 1, 2022, 4 pages (2 pages of English Translation and 2 pages of Official Copy).
Search Report received for Chinese Patent Application No. 201811143102.3, mailed on Nov. 2, 2023, 5 pages (3 pages of English Translation and 2 pages of Official Copy).
Search Report received for Chinese Patent Application No. 201811143102.3, mailed on Nov. 22, 2022, 5 pages (2 pages of English Translation and 3 pages of Official Copy).
Search Report received for Chinese Patent Application No. 201910469185.3, mailed on Feb. 23, 2021, 6 pages (3 page of English Translation and 3 page of Official Copy).
Search Report received for Chinese Patent Application No. 201910587972.8, mailed on Jan. 4, 2022, 4 pages (2 pages of English Translation and 2 pages of Official Copy).
Search Report received for Chinese Patent Application No. 201911313480.6, mailed on Jan. 20, 2023, 4 pages (2 pages of English Translation and 2 pages of Official Copy).
Search Report received for Chinese Patent Application No. 201911313496.7, mailed on Jan. 20, 2023, 4 pages (2 pages of English Translation and 2 pages of Official Copy).
Search Report received for Chinese Patent Application No. 201911313497.1, mailed on Apr. 11, 2023, 5 pages (2 pages of English Translation and 3 pages of Official Copy).
Search Report received for Chinese Patent Application No. 201911313497.1, mailed on Dec. 14, 2022, 3 pages (1 page of English Translation and 2 pages of Official Copy).
Search Report received for Chinese Patent Application No. 202010011436.6 mailed on Aug. 30, 2023, 4 pages (2 pages of English Translation and 2 pages of Official Copy).
Search Report received for Chinese Patent Application No. 202010011436.6, mailed on Dec. 15, 2022, 9 pages (4 pages of English Translation and 5 pages of Official Copy).
Search Report received for Chinese Patent Application No. 202010662190.9, mailed on Apr. 28, 2023, 5 pages (2 pages of English Translation and 3 pages of Official Copy).
Search Report received for Chinese Patent Application No. 202010662206.6, mailed on Apr. 28, 2023, 5 pages (2 pages of English Translation and 3 pages of Official Copy).
Search Report received for Chinese Patent Application No. 202010662994.9, mailed on Apr. 28, 2023, 5 pages (2 pages of English Translation and 3 pages of Official Copy).
Search Report received for Chinese Patent Application No. 202010662994.9, mailed on Sep. 28, 2023, 3 pages (1 page of English Translation and 2 pages of Official Copy).
Search Report received for Chinese Patent Application No. 202110201931.8, mailed on Oct. 16, 2023, 3 pages (1 page of English Translation and 2 pages of Official Copy).
Search Report received for Chinese Patent Application No. 202210799020.4, mailed on Jul. 27, 2023, 5 pages (1 page of English Translation and 4 pages of Official Copy).
Search Report received for Danish Patent Application No. PA 201670581, mailed on Apr. 4, 2017, 2 pages.
Search Report received for Danish Patent Application No. PA 201670581, mailed on Feb. 5, 2018, 1 page.
Search Report received for Danish Patent Application No. PA 201670581, mailed on Nov. 3, 2016, 1 page.
Search Report received for Danish Patent Application No. PA 201670582, mailed on Feb. 9, 2017, 1 page.
Search Report received for Danish Patent Application No. PA 201870354, mailed on Sep. 26, 2018, 4 pages.
Search Report received for Danish Patent Application No. PA201670582, mailed on Mar. 6, 2018, 2 pages.
Search Report received for Danish Patent Application No. PA201670582, mailed on Oct. 28, 2016, 4 pages.
Search Report received for Danish Patent Application No. PA201770200, Completed on Jul. 12, 2017, 4 pages.
Search Report received for European Patent Application No. 20718506.7, mailed on Mar. 21, 2023, 2 pages.
Search Report received for Taiwanese Patent Application No. 104120369, mailed on Aug. 8, 2016, 2 Pages (1 page of official copy & 1 page of English translation).
Search Report received for Taiwanese Patent Application No. 104120385, mailed on Nov. 25, 2016, 2 pages (1 page of official copy & 1 page of English translation).
Supplemental Notice of Allowability received for U.S. Appl. No. 16/222,619, mailed on Mar. 8, 2021, 3 pages.
Supplemental Notice of Allowability received for U.S. Appl. No. 16/827,942, mailed on Nov. 4, 2020, 3 pages.
Supplemental Notice of Allowance received for U.S. Appl. No. 15/798,092, mailed on Jan. 9, 2019, 2 pages.
Akhtar Iyaz, "Movies Anywhere: Everything You Need to Know", Available online at: <https://www.cnet.com/how-to/movies-anywhere-ultraviolet-movies-locker-streaming-redeem-faq/>, [Retrieved May 4, 2020], 2017, 8 pages.
Alvarez Edgar, "Sling TV Redesign Makes It Easy to Find Your Favorite Content", Engadget, Available online at: <https://www.engadget.com/2016/01/05/sling-tv-major- redesign/>, [Retrieved Aug. 5, 2019], May 1, 2016, pp. 1-12.
Anonymous, "Video Progress Bar—YouTube Help", Retrieved from the Internet: <URL:https://web.archive.org/web/20190317001501/

(56) References Cited

OTHER PUBLICATIONS https://support.google.com/youtube/answer/7174115?hl=en>, [retrieved on Mar. 22, 2023], Mar. 17, 2019, 2 pages.
Apple, "The control is all yours", Available online at : <https://www.apple.com.cn/privacy/control/>, [Retrieved Dec. 29, 2022], Nov. 30, 2022, 12 pages.
Beer et al., "The Odds of Running a Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Budhraja et al., "Probability Based Playlist Generation Based on Music Similarity and User Customization", National Conference on Computing and Communication Systems, 2012, 5 pages.
Cai Chongshan, "Analysis of Copyright Infringement Problems of Video Aggregation App", China Copyright, vol. 02, [retrieved on Oct. 6, 2023], Available online at: <http://www.cqvip.com/qk/81889a/2015002/90716681504849534850485048.html>, Apr. 15, 2015, 2 pages (1 page English Translation and 1 page Official Copy).
Chen et al., "What a Juke! A Collaborative Music Sharing System", IEEE, 2012, 6 pages.
Cheng Luo, "The Designing of Dynamic Play-list Based on Flash Streaming Media Technology", Computer and Telecommunication, 2008, 3 pages.
Cheredar Tom, "Verizon's Viewdini Lets You Watch Netflix, Comcast, & Hulu Videos from a Single App", Available online at: <venturebeat.com>, [Retrieved Jun. 10, 2021], May 22, 2012, 6 pages.
Cunningham et al., "An Ethnographic Study of Music Information Seeking: Implications for the Design of a Music Digital Library", IEEE, 2003, 13 pages.
Drews et al., "Virtual Jukebox—Reviving a Classic", Proceedings of the 35th Hawaii International Conference on System Sciences, 2022, 7 pages.
episodecalendar.com, "Keep track of your favorite TV shows!—TV Episode Calendar", Available Online at: <https://web.archive.org/web/20140517060612/https://episodecalendar.com/>, [Retrieved Oct. 18, 2017], May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Jin et al., "Pricing Sponsored Content in Wireless Networks with Multiple Content Providers", The Fourth IEEE Workshop on Smart Data Pricing 2015, 2015, pp. 668-673.
Kaijser Martijn, "Mimic Skin for Kodi 15.x: Installation and Showcase", Time 2:23-2:28, Available online at: <https://www.youtube.com/watch?v=RGfpbUWVkgQ&t=143s>, [Retrieved Jun. 10, 2021], Aug. 3, 2015, 1 page.
Kimbler Kristofer, "App Store Strategies for Service Providers", 2010 4th International Conference on Intelligence in Next Generation Networks, Nov. 18, 2010, 5 pages.
Lee et al., "A Multi-Touch Three Dimensional Touch-Sensitive Tablet", CHI'85 Proceedings, Apr. 1985, pp. 21-25.
Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158.
Liu Chang, "Functions and Design of Multi-Screen Playing System in TV Variety Studio", Modern TV Technology, 2013, 5 pages.
Meng et al., "Role Authorization Based Web Service Access Control Model", Journal of Lanzhou University (Natural Science Edition), vol. 42, No. 2, 2007, pp. 84-88.
Ng Gary, "New Netflix User Interface Coming This Month, First Redesign in Four Years", iPhone in Canada, Available online at: <https://www.iphoneincanada.ca/news/new-netflix-user-interface/>, [Retrieved Jul. 7, 2020], Jun. 1, 2015, 3 pages.
Panzarino Matthew, "Apple Announces Voice Activated Siri Assistant Feature for iOS 5, Integrates Wolfram Alpha and Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, [Retrieved Mar. 10, 2016], Mar. 10, 2016, pp. 1-4.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Tinari George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 22, 2023], Nov. 10, 2016, 9 pages.
Wang et al., "Authorization Management Mechanism of Web Application System", Network and Information Technology, vol. 25, No. 11, 2006, 3 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Zhang et al., "Music Playlist Prediction Via Detecting Song Moods", IEEE China Summit and International Conference on Signal and Information Processing, 2013, pp. 174-178.
Advisory Action received for U.S. Appl. No. 14/208,963, mailed on Feb. 17, 2017, 3 pages.
Applicant Initiated Interview Summary received for U.S. Appl. No. 17/656,610, mailed on Apr. 10, 2024, 2 pages.
Corrected Notice of Allowability received for U.S. Appl. No. 15/719,404, mailed on Mar. 22, 2024, 2 pages.
Corrected Notice of Allowability received for U.S. Appl. No. 17/586,625, mailed on Feb. 20, 2024, 2 pages.
Decision on Appeal received for U.S. Appl. No. 14/208,963, mailed on Dec. 22, 2021, 12 pages.
Decision on Appeal received for U.S. Appl. No. 15/943,316, mailed on Jan. 11, 2022, 19 pages.
Examiner's Answer to Appeal Brief received for U.S. Appl. No. 14/208,963, mailed on Jun. 24, 2021, 20 pages.
Examiner's Answer to Appeal Brief received for U.S. Appl. No. 15/943,316, mailed on Jun. 16, 2021, 9 pages.
Final Office Action received for U.S. Appl. No. 14/208,963, mailed on Aug. 13, 2015, 16 pages.
Final Office Action received for U.S. Appl. No. 14/208,963, mailed on Aug. 18, 2016, 17 pages.
Final Office Action received for U.S. Appl. No. 15/943,316, mailed on Apr. 27, 2020, 19 pages.
Final Office Action received for U.S. Appl. No. 15/943,316, mailed on Mar. 6, 2019, 8 pages.
Final Office Action received for U.S. Appl. No. 17/656,610, mailed on Jan. 16, 2024, 12 pages.
Final Office Action received for U.S. Appl. No. 18/146,336, mailed on Feb. 23, 2024, 23 pages.
Non-Final Office Action received for U.S. Appl. No. 14/208,963 mailed on Nov. 3, 2014, 17 pages.
Non-Final Office Action received for U.S. Appl. No. 14/208,963, mailed on Apr. 21, 2017, 19 pages.

(56) References Cited

OTHER PUBLICATIONS

Non-Final Office Action received for U.S. Appl. No. 14/208,963, mailed on Jan. 29, 2016, 17 pages.
Non-Final Office Action received for U.S. Appl. No. 14/208,963, mailed on Jun. 30, 2020, 20 pages.
Non-Final Office Action received for U.S. Appl. No. 15/943,316, mailed on Aug. 20, 2019, 11 pages.
Non-Final Office Action received for U.S. Appl. No. 15/943,316, mailed on Jul. 23, 2018, 9 pages.
Non-Final Office Action received for U.S. Appl. No. 17/379,785, mailed on Feb. 15, 2024, 14 pages.
Non-Final Office Action received for U.S. Appl. No. 17/656,610, mailed on Apr. 30, 2024, 12 pages.
Non-Final Office Action received for U.S. Appl. No. 17/657,913, mailed on Jan. 11, 2024, 20 pages.
Non-Final Office Action received for U.S. Appl. No. 17/930,703, mailed on May 16, 2024, 36 pages.
Non-Final Office Action received for U.S. Appl. No. 17/937,410, mailed on Feb. 29, 2024, 16 pages.
Non-Final Office Action received for U.S. Appl. No. 17/937,704, mailed on Feb. 1, 2024, 21 pages.
Notice of Allowance received for U.S. Appl. No. 17/651,731, mailed on Jan. 25, 2024, 5 pages.
Notice of Allowance received for U.S. Appl. No. 17/660,622, mailed on Jan. 24, 2024, 11 pages.
Notice of Allowance received for U.S. Appl. No. 17/937,704, mailed on Apr. 25, 2024, 12 pages.
Notice of Allowance received for U.S. Appl. No. 18/060,902, mailed on May 21, 2024, 8 pages.
Search Report received for Chinese Patent Application No. 202111293833.8, mailed on Dec. 9, 2023, 4 pages (2 pages of English Translation and 2 pages of Official Copy).
Search Report received for Chinese Patent Application No. 202111635535.2, mailed on Dec. 21, 2023, 5 pages (2 pages of English Translation and 3 pages of Official Copy).
Usainbolt.com, Available online at: <https://usainbolt.com/>; <https://web.archive.org>, Archived on Mar. 15, 2015 in Wayback Machine, 2015, 4 pages.
Kim et al., "Towards Optimal Navigation Through Video Content on Interactive TV", Interacting with Computers, vol. 18, No. 4 (2006): (Year: 2006), Mar. 3, 2006, pp. 723-746.
Matejka et al., "Swifter: Improved Online Video Scrubbing", Proceedings of the SIGCHI Conference on Human Factors in Computing Systems, Apr. 27-May 2, 2013, 10 pages.
Schmidt, Alexander, "Graphical User Interface for Video on Demand Navigation from an IPTV Set Top Box", Jun. 16, 2009, 52 pages.
Corrected Notice of Allowability received for U.S. Appl. No. 18/060,902, mailed on Sep. 5, 2024, 4 pages.
Corrected Notice of Allowability received for U.S. Appl. No. 17/657,913, mailed on Sep. 16, 2024, 2 pages.
Corrected Notice of Allowability received for U.S. Appl. No. 17/657,913, mailed on Sep. 26, 2024, 2 pages.
Corrected Notice of Allowability received for U.S. Appl. No. 17/937,704, mailed on Jul. 31, 2024, 8 pages.
European Search Report received for European Patent Application No. 20718505.9, mailed on Sep. 27, 2024, 5 pages.
Examiner's Answer to Appeal Brief received for U.S. Appl. No. 17/133,550, mailed on Sep. 23, 2024, 26 pages.
Extended European Search Report received for European Patent Application No. 24152097.2, mailed on Jul. 23, 2024, 9 pages.
Extended European Search Report received for European Patent Application No. 24195286.0, mailed on Nov. 5, 2024, 9 pages.
Final Office Action received for U.S. Appl. No. 17/379,785, mailed on Aug. 16, 2024, 14 pages.
Final Office Action received for U.S. Appl. No. 17/930,703, mailed on Nov. 6, 2024, 39 pages.
Non-Final Office Action received for U.S. Appl. No. 18/168,490, mailed on Jun. 27, 2024, 19 pages.
Non-Final Office Action received for U.S. Appl. No. 18/336,569, mailed on Oct. 23, 2024, 22 pages.
Non-Final Office Action received for U.S. Appl. No. 18/391,448, mailed on Sep. 24, 2024, 12 pages.
Non-Final Office Action received for U.S. Appl. No. 18/518,109, mailed on Jul. 9, 2024, 26 pages.
Non-Final Office Action received for U.S. Appl. No. 18/602,342 mailed on Sep. 24, 2024, 19 pages.
Notice of Allowance received for U.S. Appl. No. 17/656,610, mailed on Sep. 11, 2024, 7 pages.
Notice of Allowance received for U.S. Appl. No. 17/657,913, mailed on Aug. 30, 2024, 7 pages.
Notice of Allowance received for U.S. Appl. No. 17/660,622, mailed on Aug. 22, 2024, 9 pages.
Notice of Allowance received for U.S. Appl. No. 18/168,490, mailed on Sep. 18, 2024, 10 pages.
Notice of Allowance received for U.S. Appl. No. 16/175,565, mailed on Oct. 24, 2024, 5 pages.
Notice of Allowance received for U.S. Appl. No. 17/651,731, mailed on Jul. 10, 2024, 5 pages.
Notice of Allowance received for U.S. Appl. No. 17/937,410, mailed on Sep. 26, 2024, 8 pages.
Notice of Allowance received for U.S. Appl. No. 18/487,837, mailed on May 30, 2024, 8 pages.
Notice of Allowance received for U.S. Appl. No. 18/487,837, mailed on Nov. 8, 2024, 7 pages.
Notice of Allowance received for U.S. Appl. No. 18/503,515, mailed on Jun. 13, 2024, 8 pages.
Notice of Allowance received for U.S. Appl. No. 18/503,515, mailed on Oct. 1, 2024, 8 pages.
Notice of Allowance received for U.S. Appl. No. 18/518,365, mailed on Jul. 3, 2024, 8 pages.
Notice of Allowance received for U.S. Appl. No. 18/518,365, mailed on Nov. 6, 2024, 8 pages.
Patent Board Decision received for U.S. Appl. No. 16/175,565, mailed on Jul. 31, 2024, 19 pages.
Patent Board Decision received for U.S. Appl. No. 16/697,090, mailed on Jul. 26, 2024, 33 pages.
Search Report received for Chinese Patent Application No. 202080040260.5, mailed on Apr. 4, 2024, 8 pages (4 pages of English Translation and 4 pages of Official Copy).
Search Report received for Chinese Patent Application No. 202111314528.2, mailed on Mar. 30, 2024, 4 pages (2 pages of English Translation and 2 pages of Official Copy).
Search Report received for Chinese Patent Application No. 202210608296.X, mailed on Aug. 15, 2024, 4 pages (1 page of English Translation and 3 pages of Official Copy).
Anonymous, YouTube(TM) On Hover :: add0n. com, Retrieved from the Internet: <URL: https://web.archive.org/web/20180713134812/https://add0n.com/youtube-hover.html>, [retrieved on Nov. 8, 2024], Jul. 13, 2018, 4 pages.
Leonard, Sengere, You can now hover over videos on Youtube to get GIF like previews—Techzim, Retrieved from the Internet: URL: <https://web.archive.org/web/20171007193435/https://www.techzim.co.zw/2017/07/can-now-hover-videos-youtube-get-gif-like-previews/>, [retrieved on Nov. 8, 2024], Oct. 7, 2017, 6 pages.
Tech Life Unity, How to Use Netflix | Netflix Guide Part 2, Available online at: <https://www.youtube.com/watch?v=Hg4IC_BIHss> [Retrieved Sep. 16, 2024], Aug. 19, 2017, 2 pages.
Extended European Search Report received for European Patent Application No. 24217869.7, mailed on Feb. 28, 2025, 10 pages.
Non-Final Office Action received for U.S. Appl. No. 18/391,448, mailed on May 7, 2025, 16 pages.
Notice of Allowance received for U.S. Appl. No. 18/602,342, mailed on May 9, 2025, 16 pages.
Corrected Notice of Allowability received for U.S. Appl. No. 18/168,490, mailed on May 28, 2025, 2 pages.
Corrected Notice of Allowability received for U.S. Appl. No. 18/518,109, mailed on Apr. 18, 2025, 2 pages.
Corrected Notice of Allowability received for U.S. Appl. No. 18/602,342, mailed on May 29, 2025, 2 pages.
Patent Board Decision received for U.S. Appl. No. 17/133,550, mailed on Mar. 27, 2025, 27 pages.
European Search Report received for European Patent Application No. 20718500.0, mailed on Feb. 11, 2025, 5 pages.

(56) References Cited

OTHER PUBLICATIONS

Notice of Allowance received for U.S. Appl. No. 18/902,473, mailed on Jun. 3, 2025, 9 pages.
Corrected Notice of Allowability received for U.S. Appl. No. 17/656,610, mailed on Dec. 19, 2024, 2 pages.
Corrected Notice of Allowability received for U.S. Appl. No. 17/656,610, mailed on Jan. 13, 2025, 2 pages.
Corrected Notice of Allowability received for U.S. Appl. No. 17/657,913, mailed on Jan. 23, 2025, 2 pages.
Corrected Notice of Allowability received for U.S. Appl. No. 18/168,490, mailed on Mar. 4, 2025, 2 pages.
Final Office Action received for U.S. Appl. No. 18/336,569, mailed on Feb. 4, 2025, 24 pages.
Final Office Action received for U.S. Appl. No. 18/391,448, mailed on Jan. 29, 2025, 14 pages.
Non-Final Office Action received for U.S. Appl. No. 18/668,008, mailed on Feb. 11, 2025, 14 pages.
Notice of Allowance received for U.S. Appl. No. 17/657,913, mailed on Jan. 14, 2025, 5 pages.
Notice of Allowance received for U.S. Appl. No. 16/175,565, mailed on Feb. 12, 2025, 5 pages.
Notice of Allowance received for U.S. Appl. No. 17/379,785, mailed on Feb. 20, 2025, 9 pages.
Notice of Allowance received for U.S. Appl. No. 17/937,410, mailed on Jan. 29, 2025, 8 pages.
Notice of Allowance received for U.S. Appl. No. 18/146,336, mailed on Nov. 22, 2024, 11 pages.
Notice of Allowance received for U.S. Appl. No. 18/168,490, mailed on Feb. 21, 2025, 9 pages.
Notice of Allowance received for U.S. Appl. No. 18/395,268, mailed on Dec. 2, 2024, 8 pages.
Notice of Allowance received for U.S. Appl. No. 18/518,109, mailed on Jan. 17, 2025, 8 pages.
Pai, Aditi, “38 More Health and Wellness Apps That Connect to Apple’s HealthKit”, MobiHealthNews, Oct. 16, 2024 [online]. Retrieved from <http://www.mobihealthnews.com/37340/38-more-health-and-wellness-apps-that-connect-to-apples-healthkit>, 3 pages.
Corrected Notice of Allowability received for U.S. Appl. No. 18/602,342, mailed on Sep. 5, 2025, 11 pages.
Extended European Search Report received for European Patent Application No. 25159269.7, mailed on Sep. 8, 2025, 12 pages.
Non-Final Office Action received for U.S. Appl. No. 18/391,448, mailed on Nov. 6, 2025, 16 pages.
Corrected Notice of Allowability received for U.S. Appl. No. 18/668,008, mailed on Dec. 3, 2025, 2 pages.
Corrected Notice of Allowability received for U.S. Appl. No. 18/902,473, mailed on Sep. 23, 2025, 2 pages.
Non-Final Office Action received for U.S. Appl. No. 18/817,126, mailed on Dec. 10, 2025, 41 pages.
Notice of Allowance received for U.S. Appl. No. 18/668,008, mailed on Nov. 7, 2025, 7 pages.
Non-Final Office Action received for U.S. Appl. No. 19/025,368, mailed on Sep. 24, 2025, 8 pages.
Notice of Allowance received for U.S. Appl. No. 18/336,569, mailed on Nov. 25, 2025, 8 pages.
Notice of Allowance received for U.S. Appl. No. 18/336,569, mailed on Jul. 9, 2025, 9 pages.
Notice of Allowance received for U.S. Appl. No. 18/902,473, mailed on Sep. 18, 2025, 9 pages.

* cited by examiner

Figure 7A:
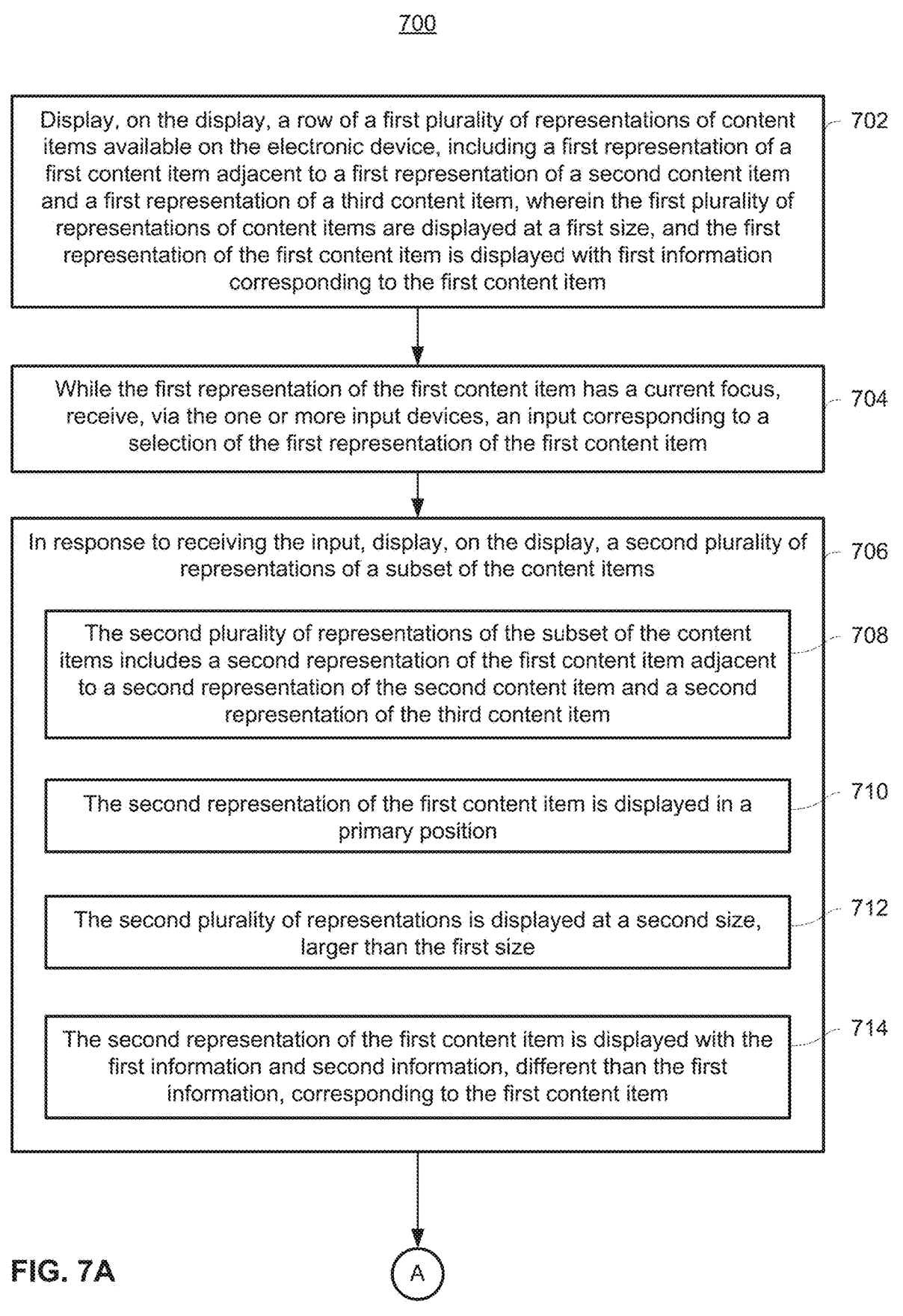

700

Display, on the display, a row of a first plurality of representations of content items available on the electronic device, including a first representation of a first content item adjacent to a first representation of a second content item and a first representation of a third content item, wherein the first plurality of representations of content items are displayed at a first size, and the first representation of the first content item is displayed with first information corresponding to the first content item — 702

While the first representation of the first content item has a current focus, receive, via the one or more input devices, an input corresponding to a selection of the first representation of the first content item — 704

In response to receiving the input, display, on the display, a second plurality of representations of a subset of the content items — 706

The second plurality of representations of the subset of the content items includes a second representation of the first content item adjacent to a second representation of the second content item and a second representation of the third content item — 708

The second representation of the first content item is displayed in a primary position — 710

The second plurality of representations is displayed at a second size, larger than the first size — 712

The second representation of the first content item is displayed with the first information and second information, different than the first information, corresponding to the first content item — 714

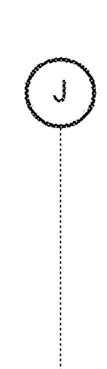

798-8

In accordance with a determination that the first representation of the respective content item was displayed on the display in the row of the first plurality of representations of content items when the input corresponding to the selection of the first representation of the first content item was received, redisplaying the row of the first plurality of representations of content items includes redisplaying the row of the first plurality of representations not having been scrolled 798-10

In accordance with a determination that the first representation of the respective content item was not displayed on the display in the row of the first plurality of representations of content items when the input corresponding to the selection of the first representation of the first content item was received, redisplaying the row of the first plurality of representations of content items includes redisplaying the row of the first plurality of representations having been scrolled such that the first representation of the respective content item is at a first position in the row

Figure 9A:
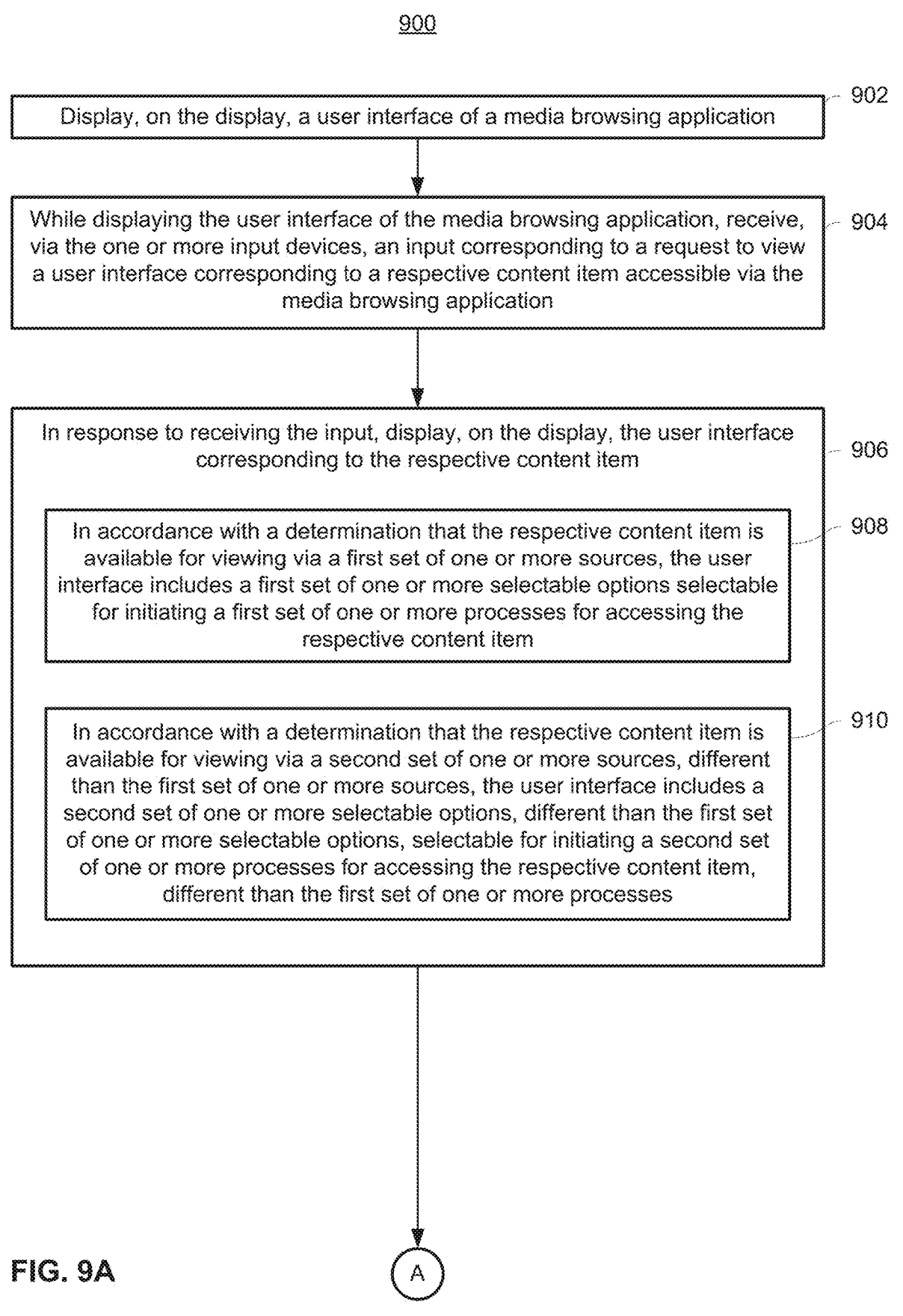

902 Display, on the display, a user interface of a media browsing application

904 While displaying the user interface of the media browsing application, receive, via the one or more input devices, an input corresponding to a request to view a user interface corresponding to a respective content item accessible via the media browsing application 906 In response to receiving the input, display, on the display, the user interface corresponding to the respective content item 908 In accordance with a determination that the respective content item is available for viewing via a first set of one or more sources, the user interface includes a first set of one or more selectable options selectable for initiating a first set of one or more processes for accessing the respective content item 910 In accordance with a determination that the respective content item is available for viewing via a second set of one or more sources, different than the first set of one or more sources, the user interface includes a second set of one or more selectable options, different than the first set of one or more selectable options, selectable for initiating a second set of one or more processes for accessing the respective content item, different than the first set of one or more processes

The respective content item is available for viewing via the first set of sources, the first set of sources includes more than a threshold number of sources, and the first set of selectable options consists of no more selectable options than the threshold number of sources

912

In accordance with a determination that the user of the electronic device is entitled to access the respective content item using a first source, and the respective content item is additionally available for viewing from one or more second sources, the user interface corresponding to the respective content item includes a selectable option for initiating a process to access the respective content item from the first source, but does not include one or more selectable options for accessing the respective content item from the one or more second sources

914

In accordance with a determination that content from the first source is available to be played within the media browsing application, the selectable option is displayed with a visual indication of an identity of the first source

Figure 11A:
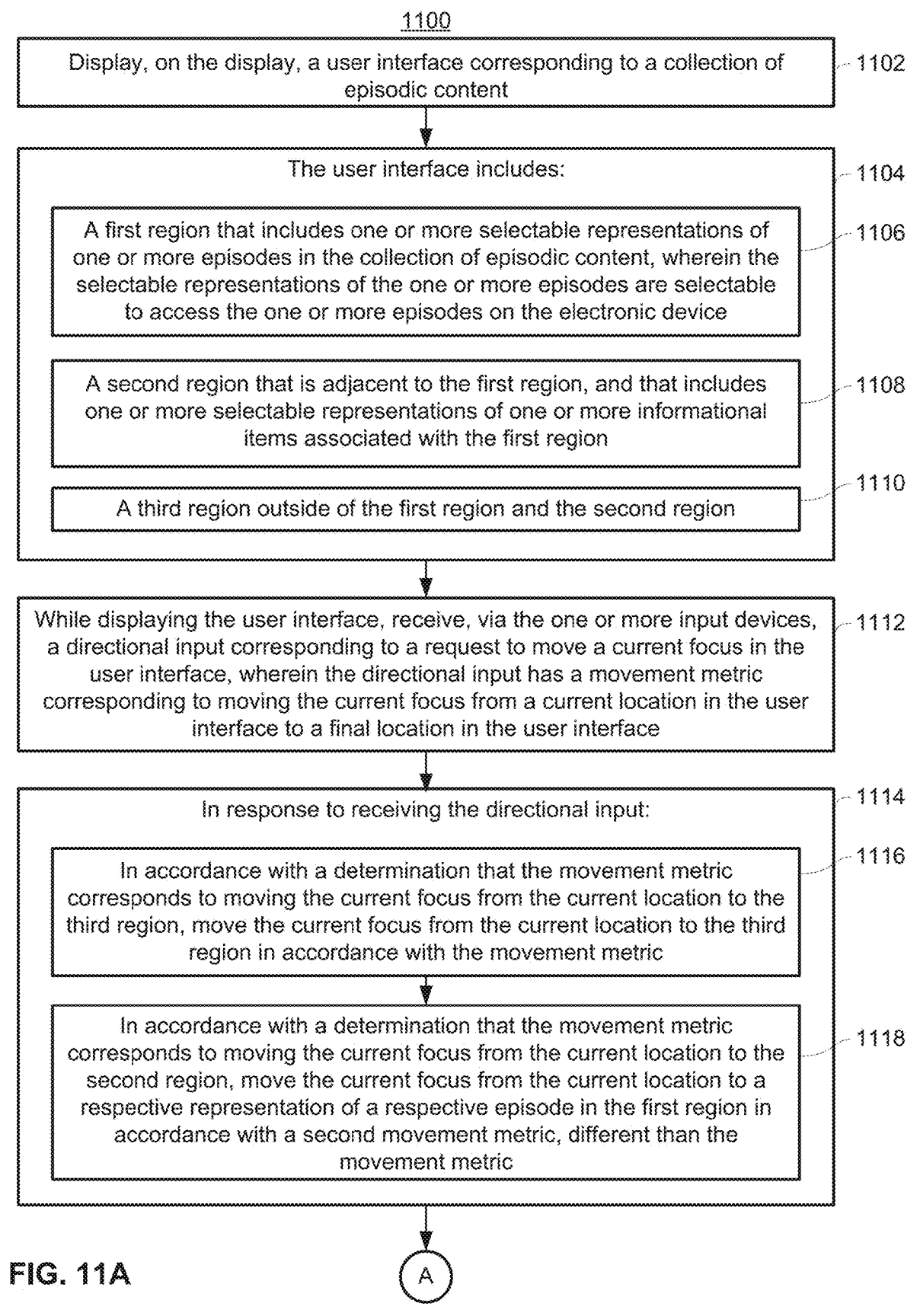

Display, on the display, a user interface corresponding to a collection of episodic content — 1102

The user interface includes: — 1104

A first region that includes one or more selectable representations of one or more episodes in the collection of episodic content, wherein the selectable representations of the one or more episodes are selectable to access the one or more episodes on the electronic device — 1106

A second region that is adjacent to the first region, and that includes one or more selectable representations of one or more informational items associated with the first region — 1108

A third region outside of the first region and the second region — 1110

While displaying the user interface, receive, via the one or more input devices, a directional input corresponding to a request to move a current focus in the user interface, wherein the directional input has a movement metric corresponding to moving the current focus from a current location in the user interface to a final location in the user interface — 1112

In response to receiving the directional input: — 1114

In accordance with a determination that the movement metric corresponds to moving the current focus from the current location to the third region, move the current focus from the current location to the third region in accordance with the movement metric — 1116

In accordance with a determination that the movement metric corresponds to moving the current focus from the current location to the second region, move the current focus from the current location to a respective representation of a respective episode in the first region in accordance with a second movement metric, different than the movement metric — 1118

The user interface corresponding to the collection of episodic content includes an access section that includes one or more representations of manners of accessing one or more episodes of the collection of episodic content that are selectable to initiate processes to access the one or more episodes of the collection of episodic content

1168

In accordance with a determination that a user of the electronic device has purchased one or more episodes of the collection of episodic content, the access section includes a first representation that corresponds to the purchased one or more episodes of the collection of episodic content, and is selectable to play the one or more episodes of the collection of episodic content

1170

In accordance with a determination that one or more episodes of the collection of episodic content are available for purchase, the access section includes a representation of the purchase that is selectable to initiate a process to purchase the one or more episodes of the collection of episodic content

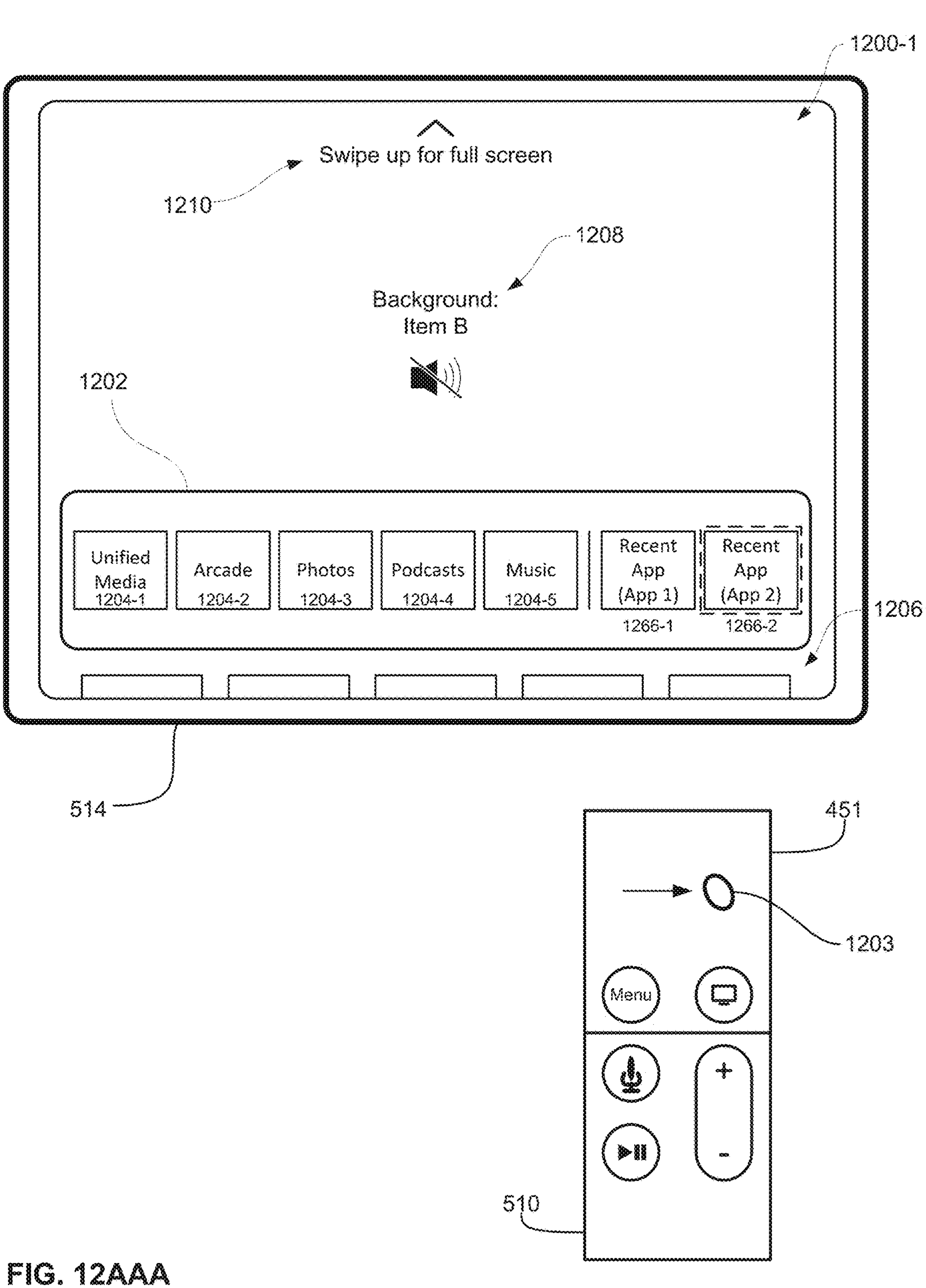
FIG. 12AAA

Figure 17A:
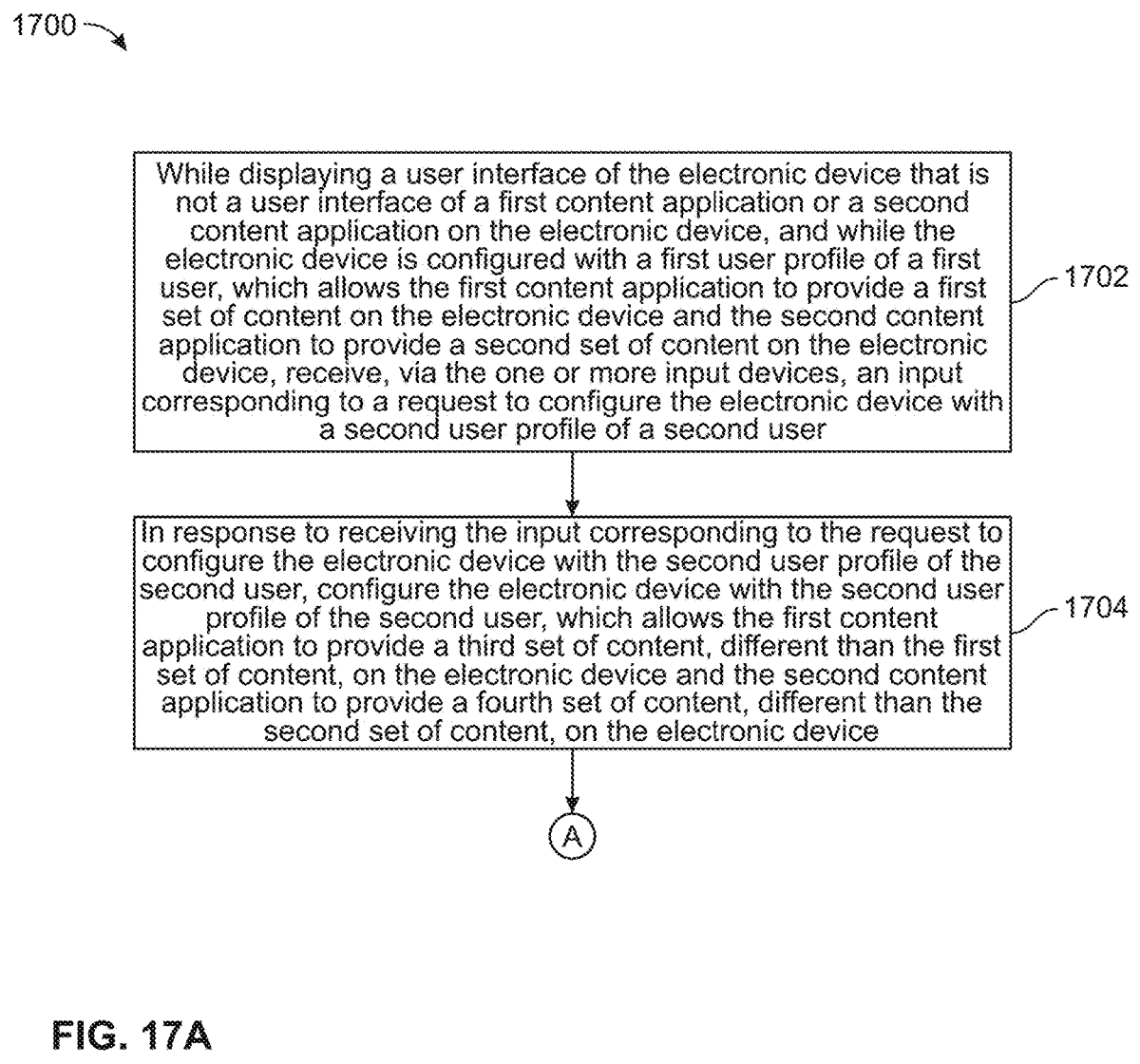

1700

While displaying a user interface of the electronic device that is not a user interface of a first content application or a second content application on the electronic device, and while the electronic device is configured with a first user profile of a first user, which allows the first content application to provide a first set of content on the electronic device and the second content application to provide a second set of content on the electronic device, receive, via the one or more input devices, an input corresponding to a request to configure the electronic device with a second user profile of a second user

1702

In response to receiving the input corresponding to the request to configure the electronic device with the second user profile of the second user, configure the electronic device with the second user profile of the second user, which allows the first content application to provide a third set of content, different than the first set of content, on the electronic device and the second content application to provide a fourth set of content, different than the second set of content, on the electronic device

USER INTERFACES FOR VIEWING AND ACCESSING CONTENT ON AN ELECTRONIC DEVICE

CROSS REFERENCE TO RELATED APPLICATIONS

This application is a continuation of U.S. application Ser. No. 16/827,926, filed Mar. 24, 2020 and published on Sep. 24, 2020 as U.S. Publication No. 2020-0301567, which claims the benefit under 35 USC 119(e) of U.S. Provisional Patent Application No. 62/822,966, filed Mar. 24, 2019 and U.S. Provisional Patent Application No. 62/855,867, filed May 31, 2019, the contents of which are incorporated herein by reference in their entireties for all purposes.

FIELD OF THE DISCLOSURE

This relates generally to user interfaces that present information and selectable options related to items of content on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device presents an item of content. In some circumstances, the electronic device presents information about the item of content in a user interface specific to the item of content. In some circumstances, the electronic device presents user interfaces for interacting with the electronic device. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to presenting representations of items of content available for playback on the electronic device. Some embodiments described in this disclosure are directed to presenting selectable options for initiating a process to access an item of content based on the available ways of accessing the content. Some embodiments described in this disclosure are directed to presenting representations of episodes in a series of episodic content. Some embodiments described in this disclosure are directed to presenting an enhanced preview of content. Some embodiments described in this disclosure are directed to presenting a control panel. Some embodiments described in this disclosure are directed to switching the active user profile of a device. Some embodiments described in this disclosure are directed to a picture-in-picture mode. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7M are flow diagrams illustrating a method of presenting representations of items of content available for playback on the electronic device in accordance with some embodiments of the disclosure.

FIGS. 9A-9E are flow diagrams illustrating a method of presenting selectable options for initiating a process to access an item of content based on the available ways of accessing the content in accordance with some embodiments of the disclosure.

FIGS. 11A-11K are flow diagrams illustrating a method of presenting representations of episodes in a series of episodic content in accordance with some embodiments of the disclosure.

FIGS. 17A-17F are flow diagrams illustrating a method of switching the active user profile of the device in accordance with some embodiments of the disclosure FIGS. 18A-18JJ illustrate exemplary ways in which an electronic device displays a content item in picture-in-picture mode in accordance with some embodiments of the disclosure

DETAILED DESCRIPTION

Figure 1A:
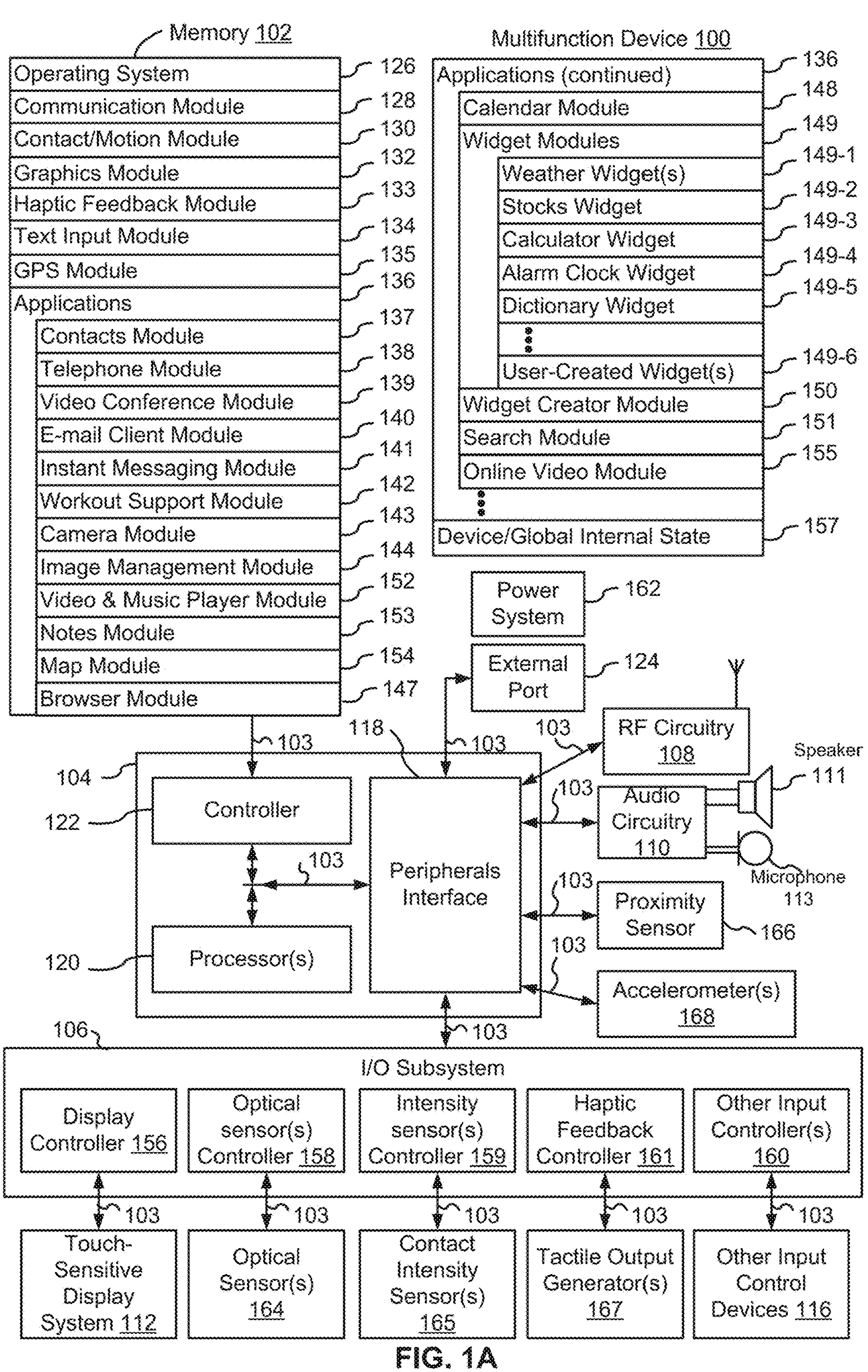
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's car (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
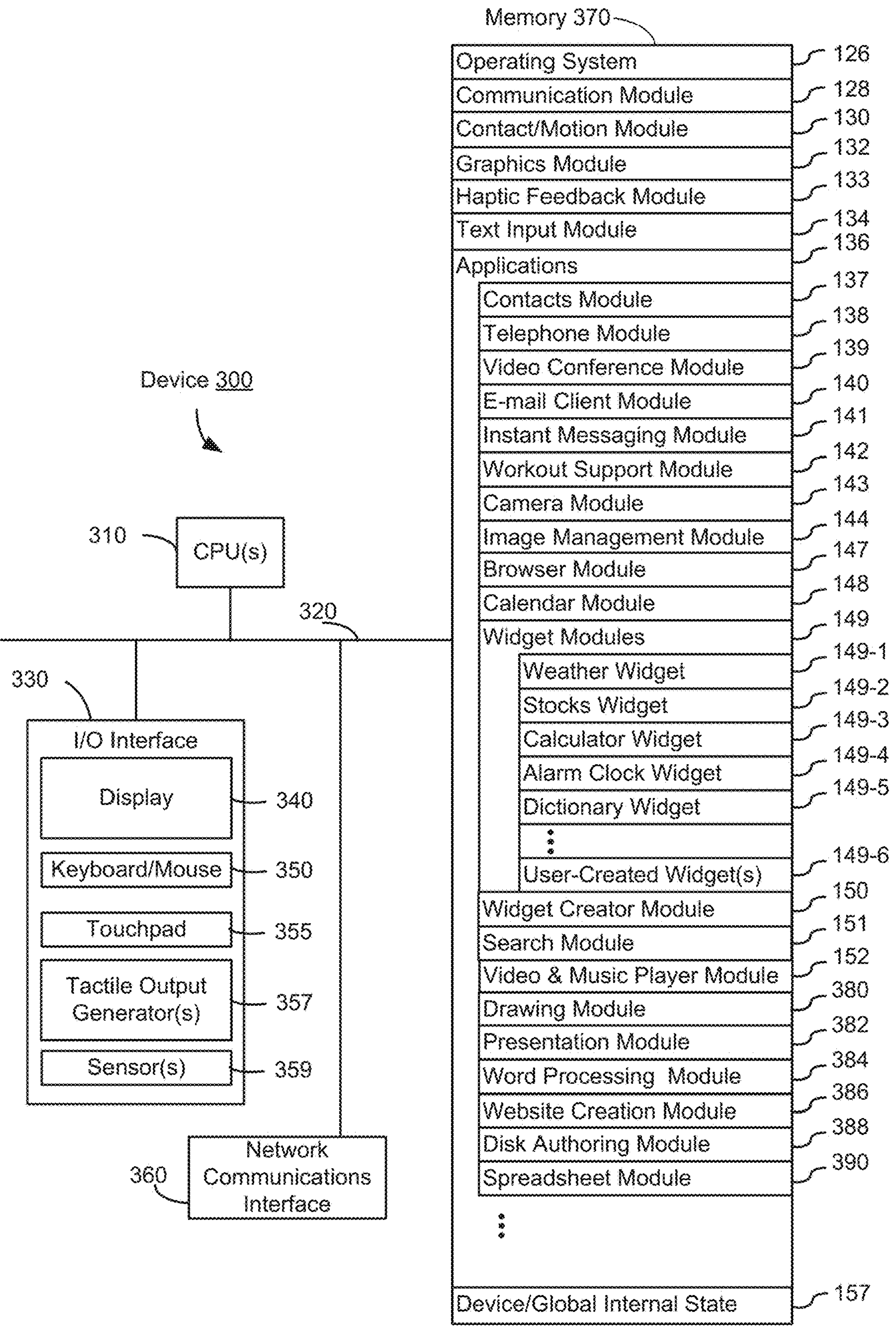
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
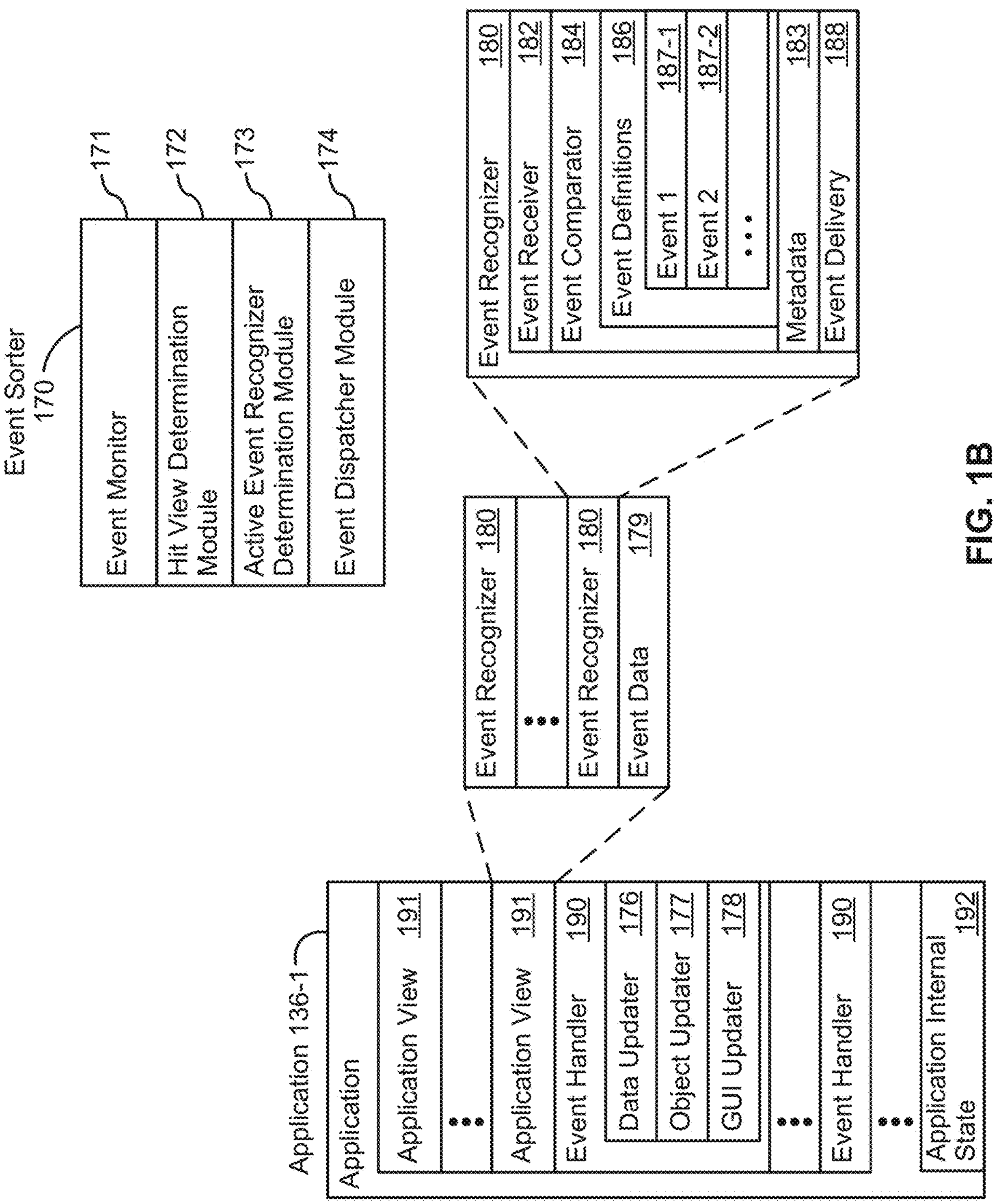
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
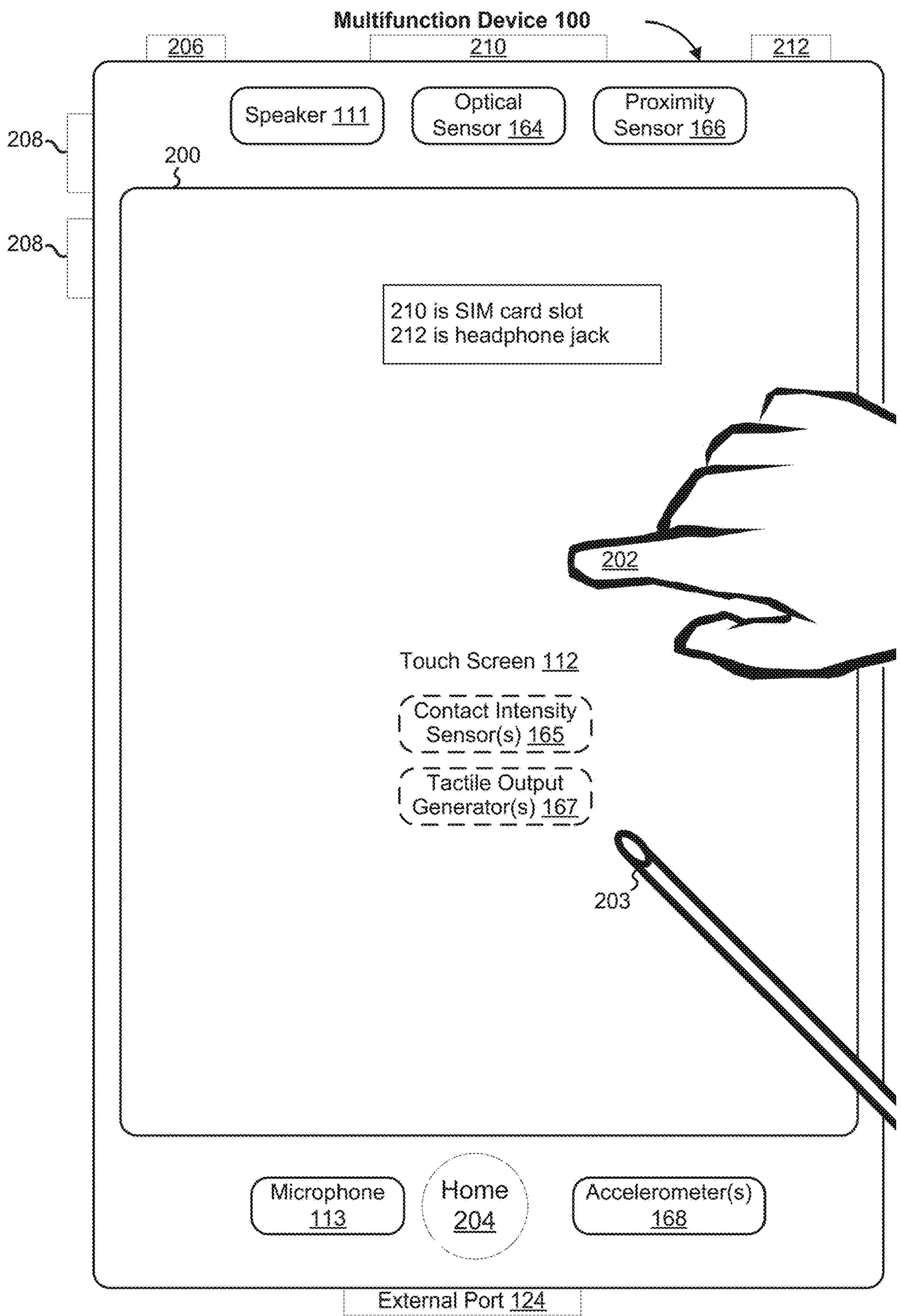
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
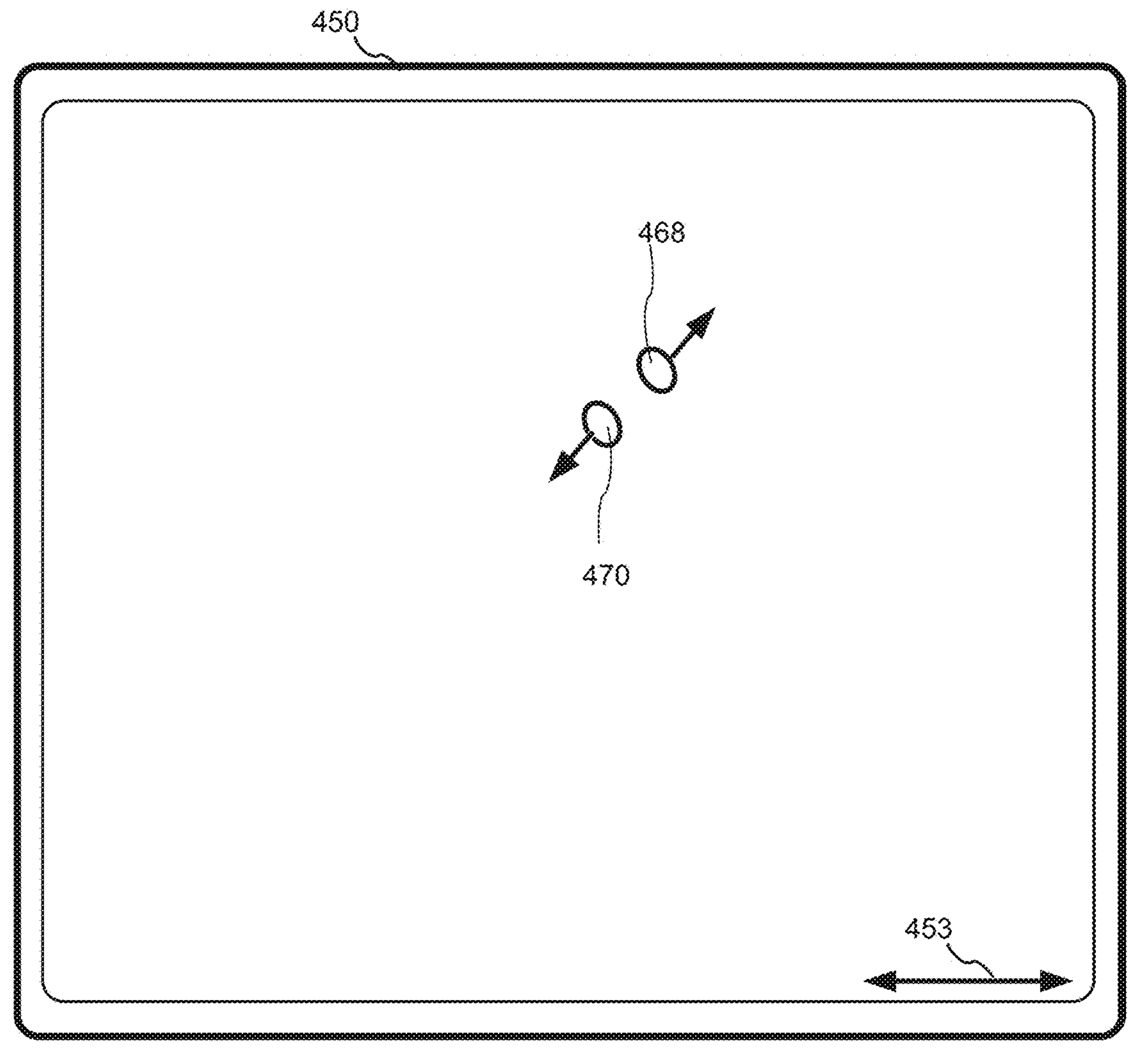
FIG. 4 illustrates an exemplary user interface for a multifunction device with a touch-sensitive surface that is separate from the display in accordance with some embodiments of the disclosure.
Figure 4:
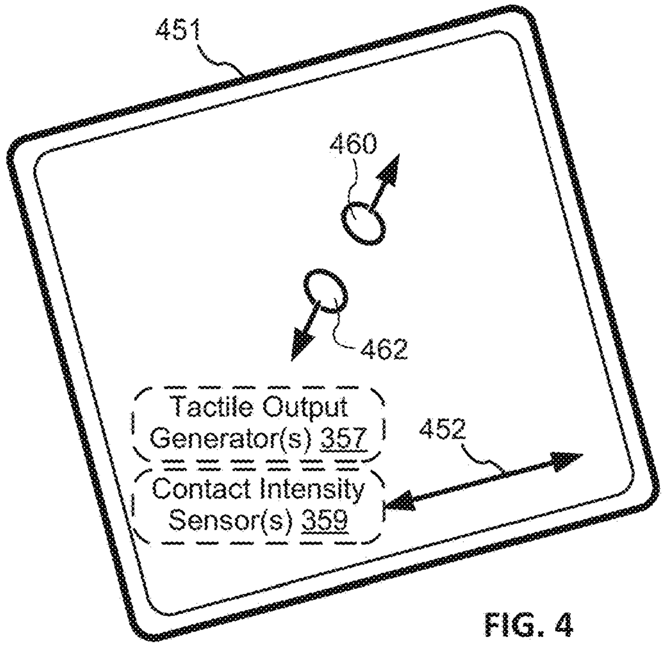

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
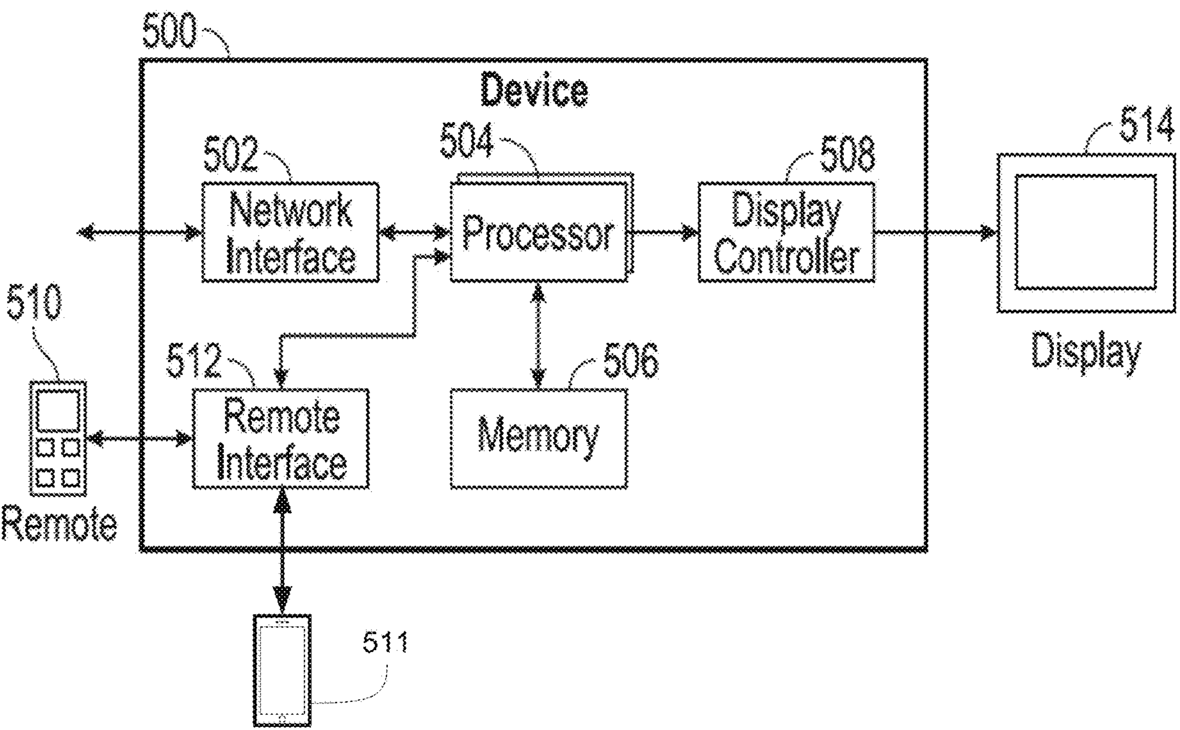
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, 1100, 1300, 1500, 1700, and 1900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
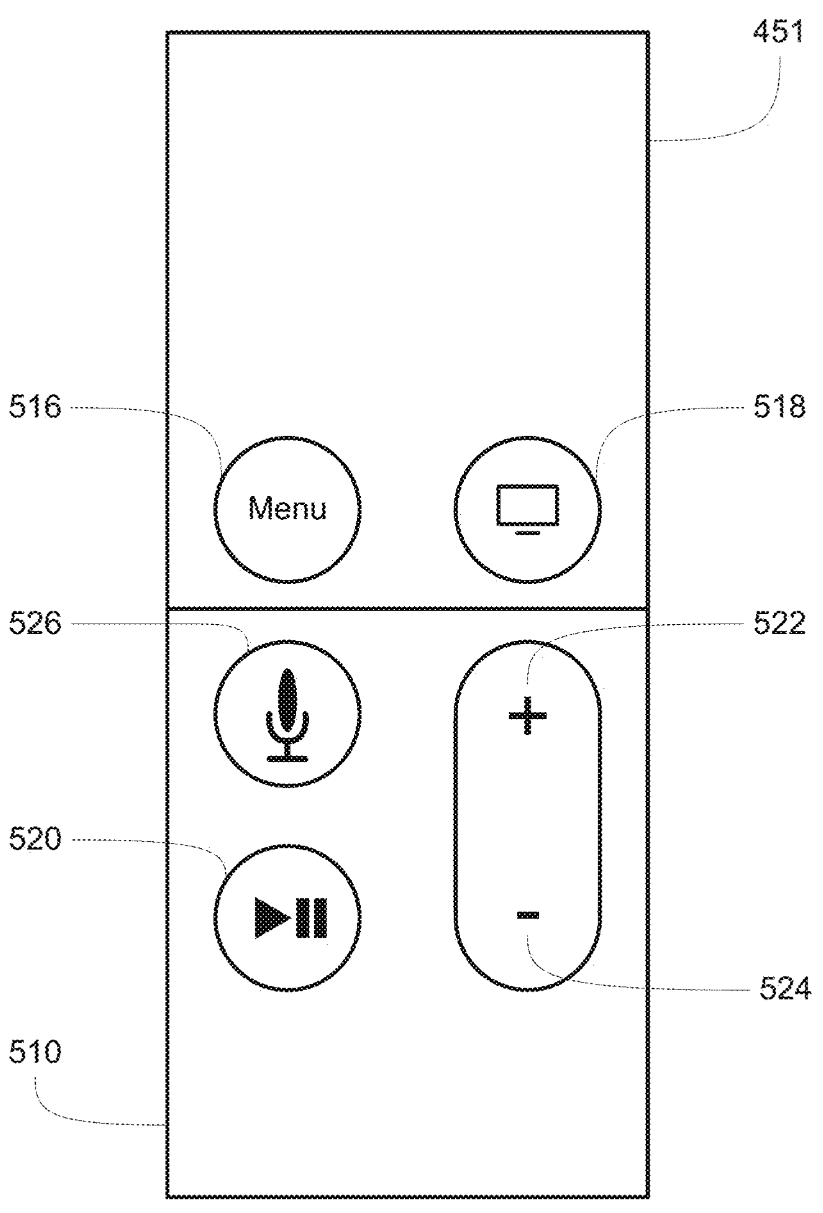

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
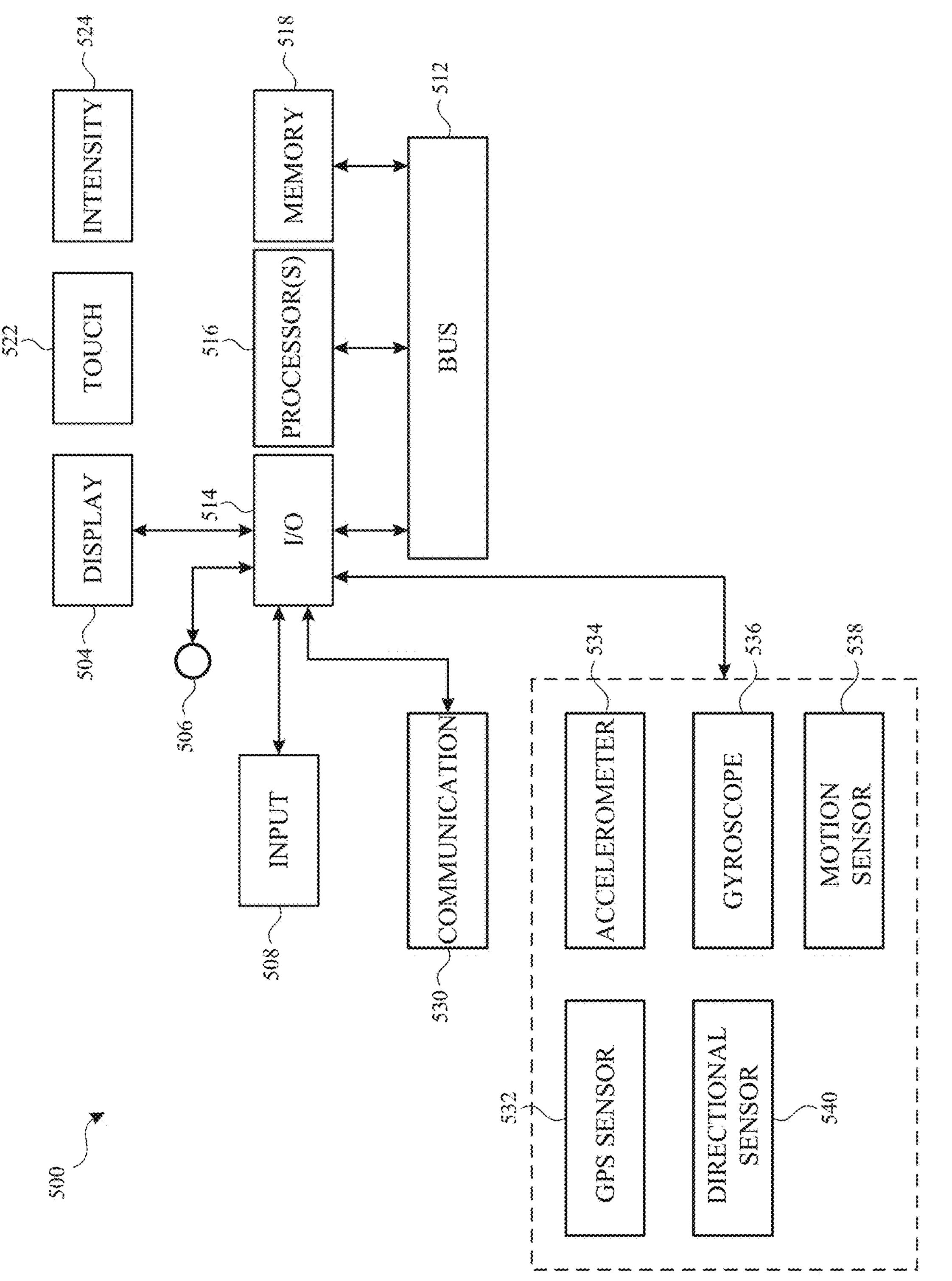

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-19. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" (U.S. Patent Application No. 62/822,952, filed Mar. 24, 2019), "User Interfaces For a Media Browsing Application" (U.S. Patent Application No. 62/822,948, filed Mar. 24, 2019), and "User Interfaces Including Selectable Representations of Content Items" (U.S. Patent Application No. 62/822,942, filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

Presenting Representations of Items of Content

Users interact with electronic devices in many different manners, including using an electronic device to browse items of content available for playback on the electronic device. In some embodiments, an electronic device is able to present representations of items of content that are available for playback on the electronic device. The embodiments described below provide ways in which an electronic device presents first and second representations of items of content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
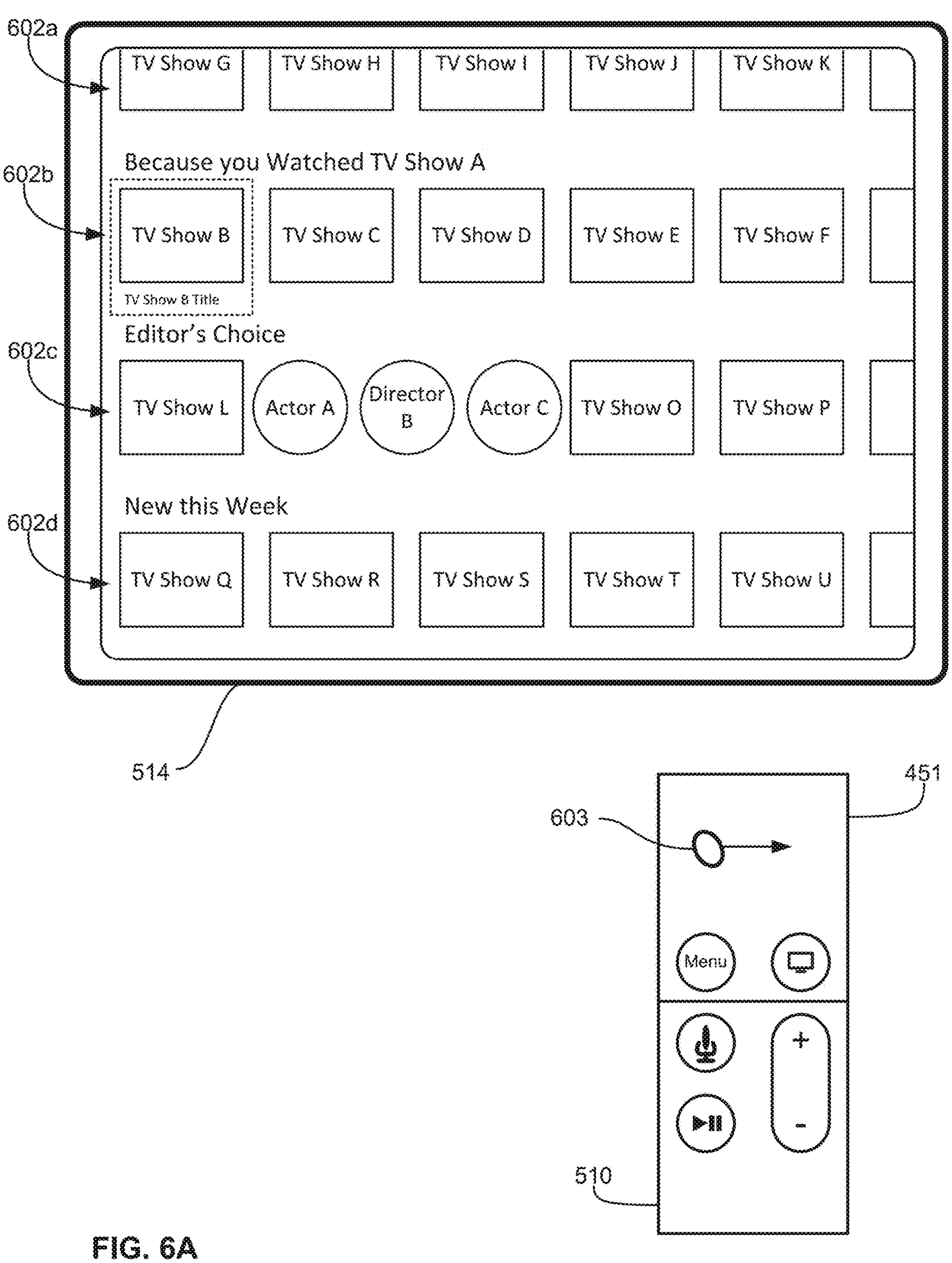
FIGS. 6A-6Z illustrate exemplary ways in which an electronic device presents representations of items of content available for playback on the electronic device in accordance with some embodiments of the disclosure.
Figure 6B:
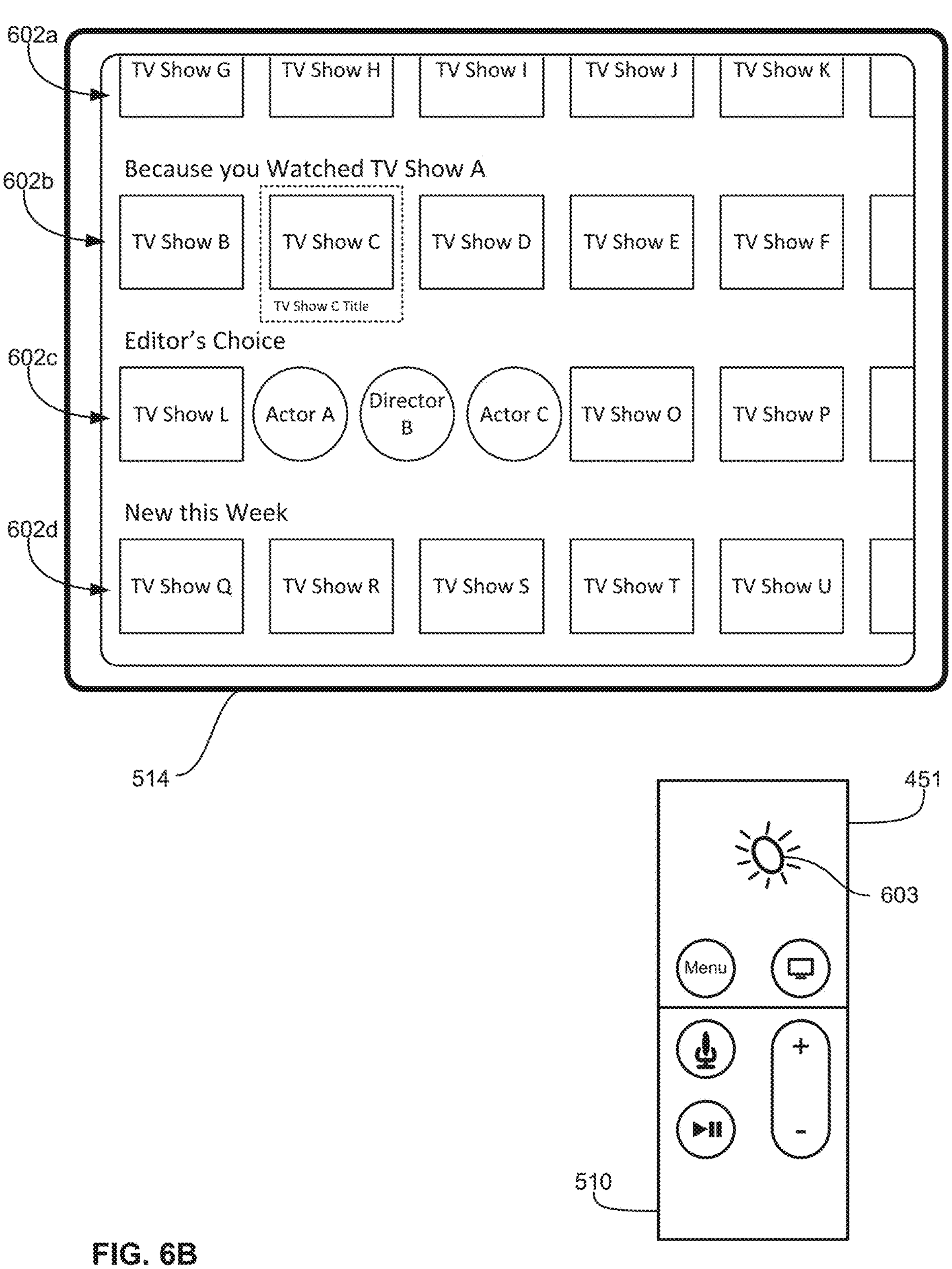
Figure 6C:
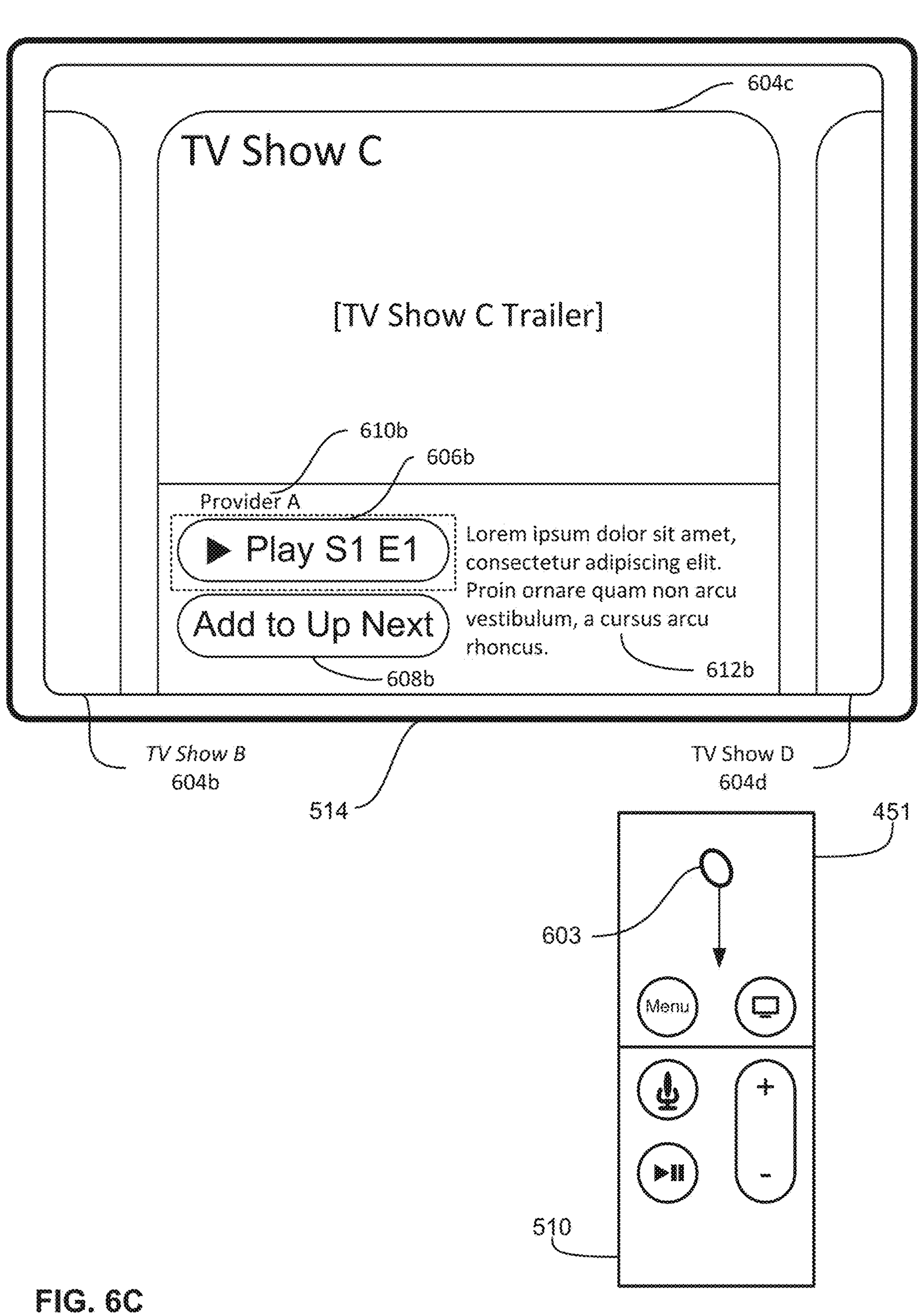
Figure 6D:
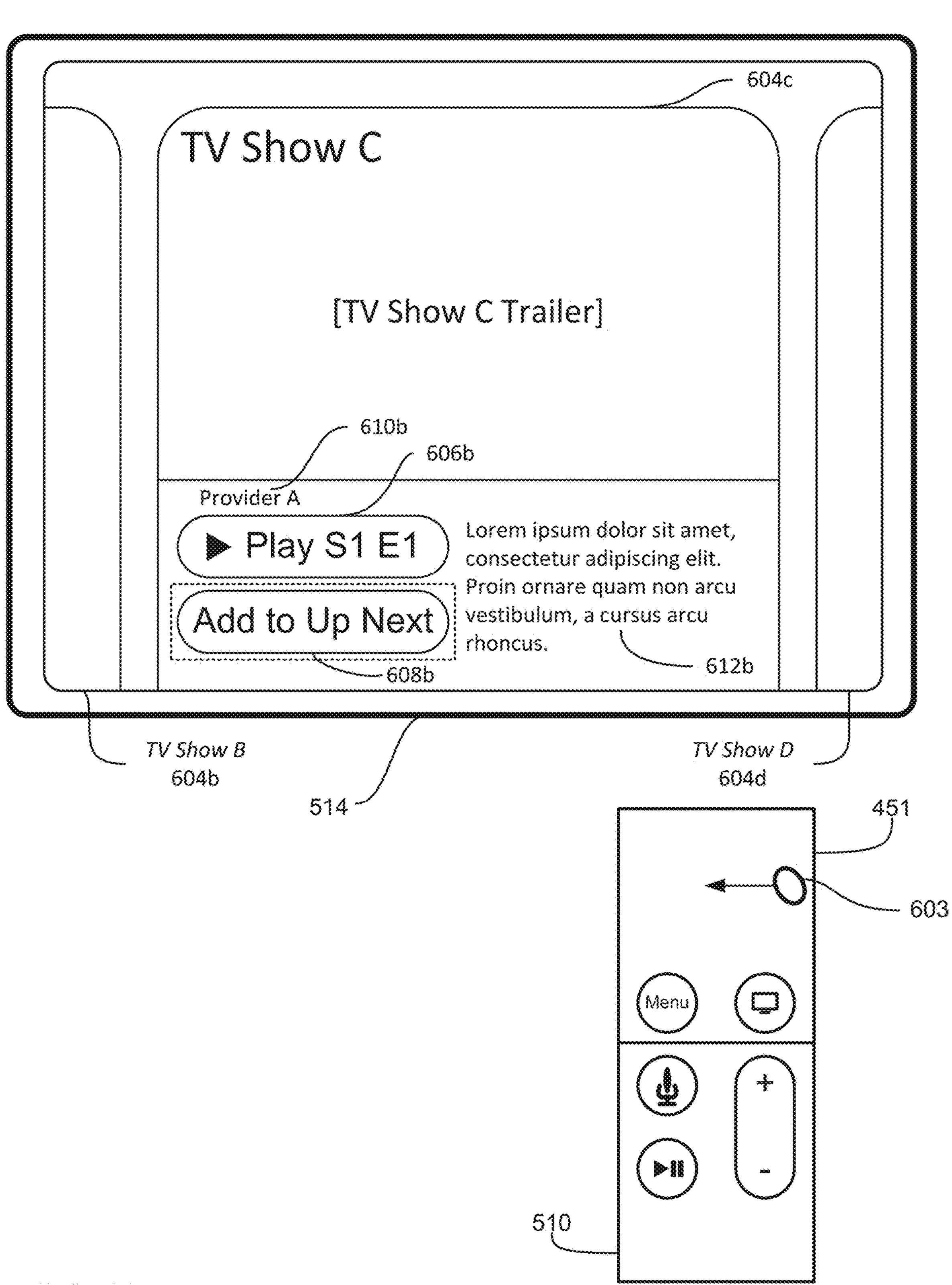
Figure 6E:
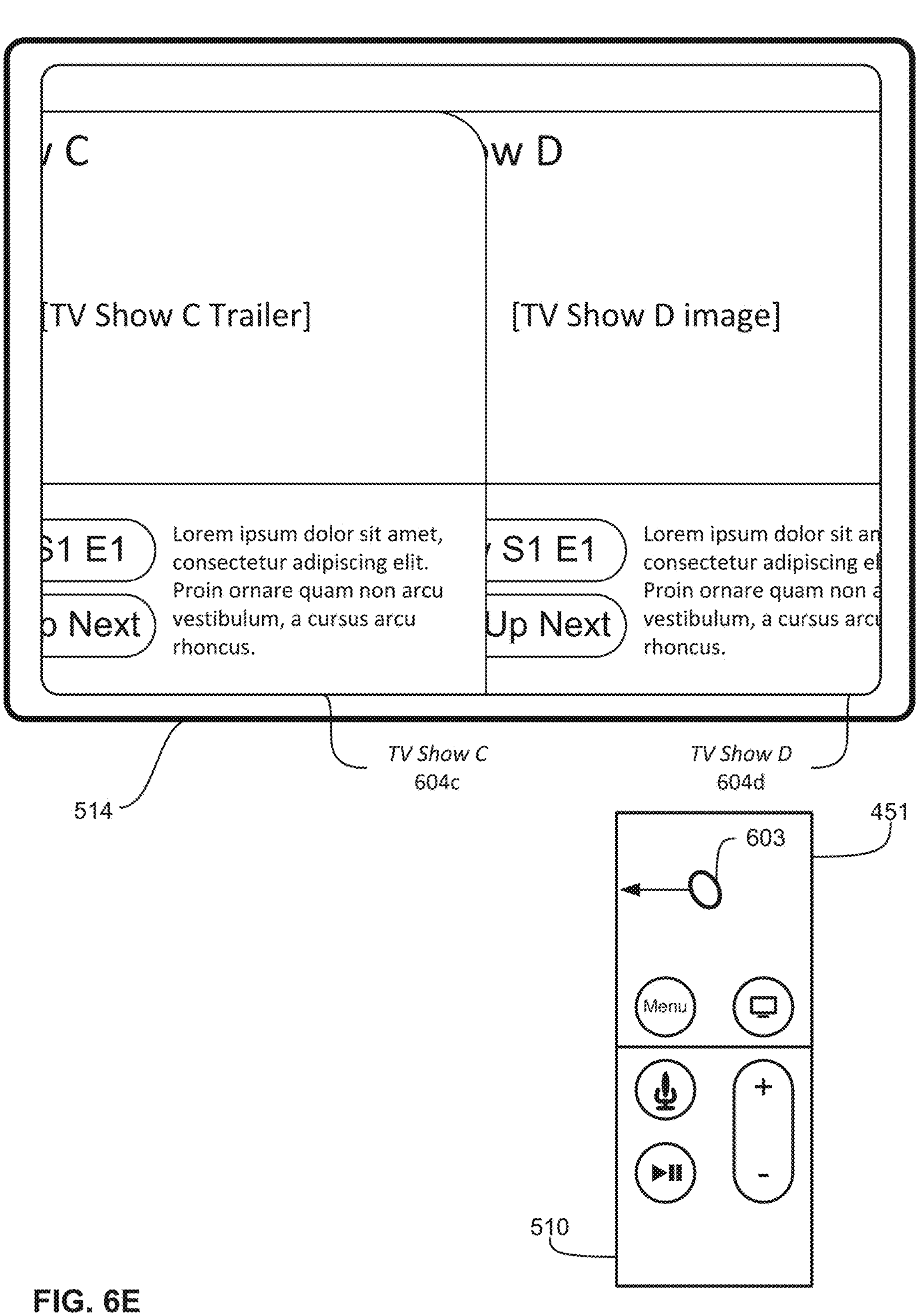
Figure 6F:
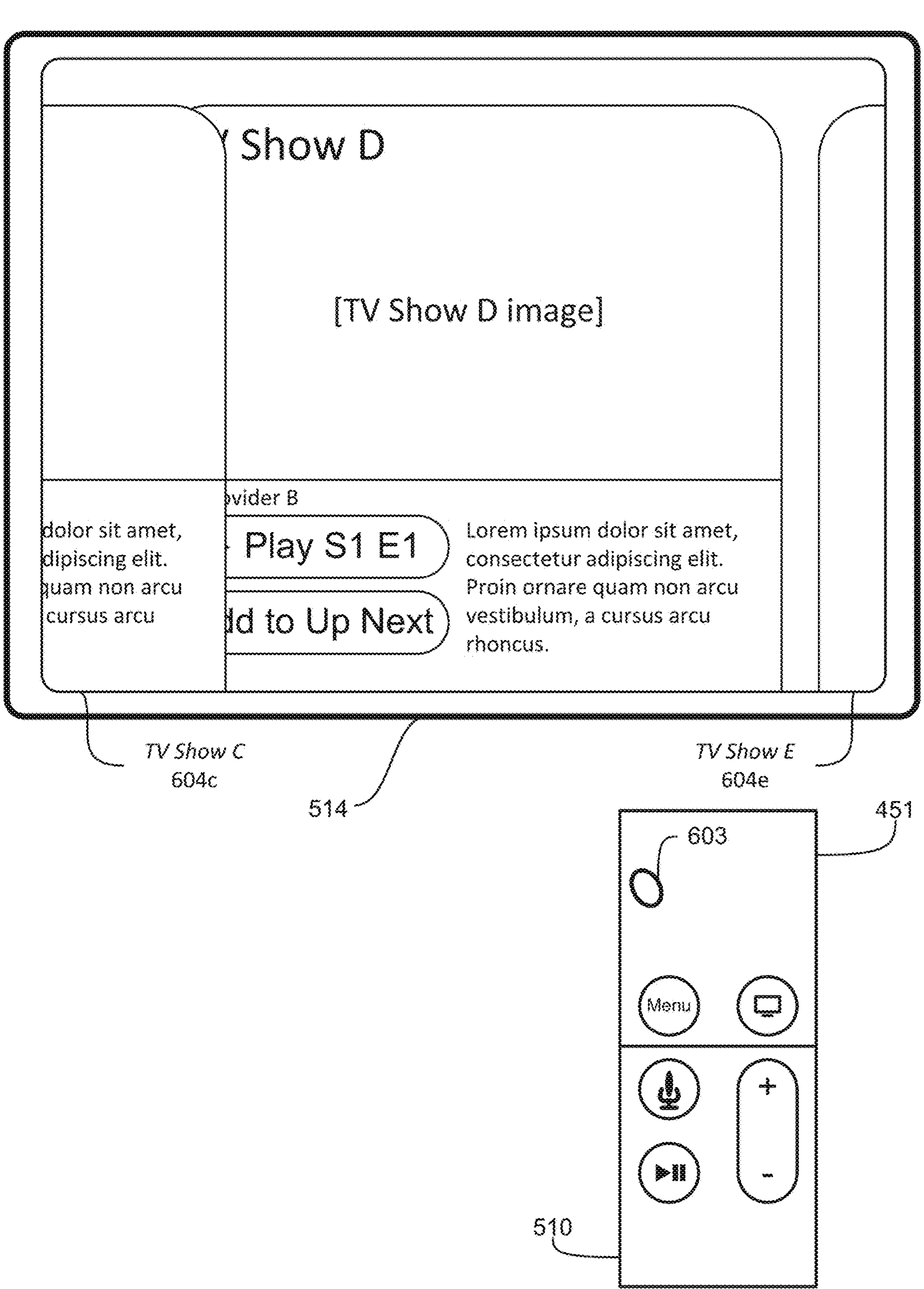
Figure 6G:
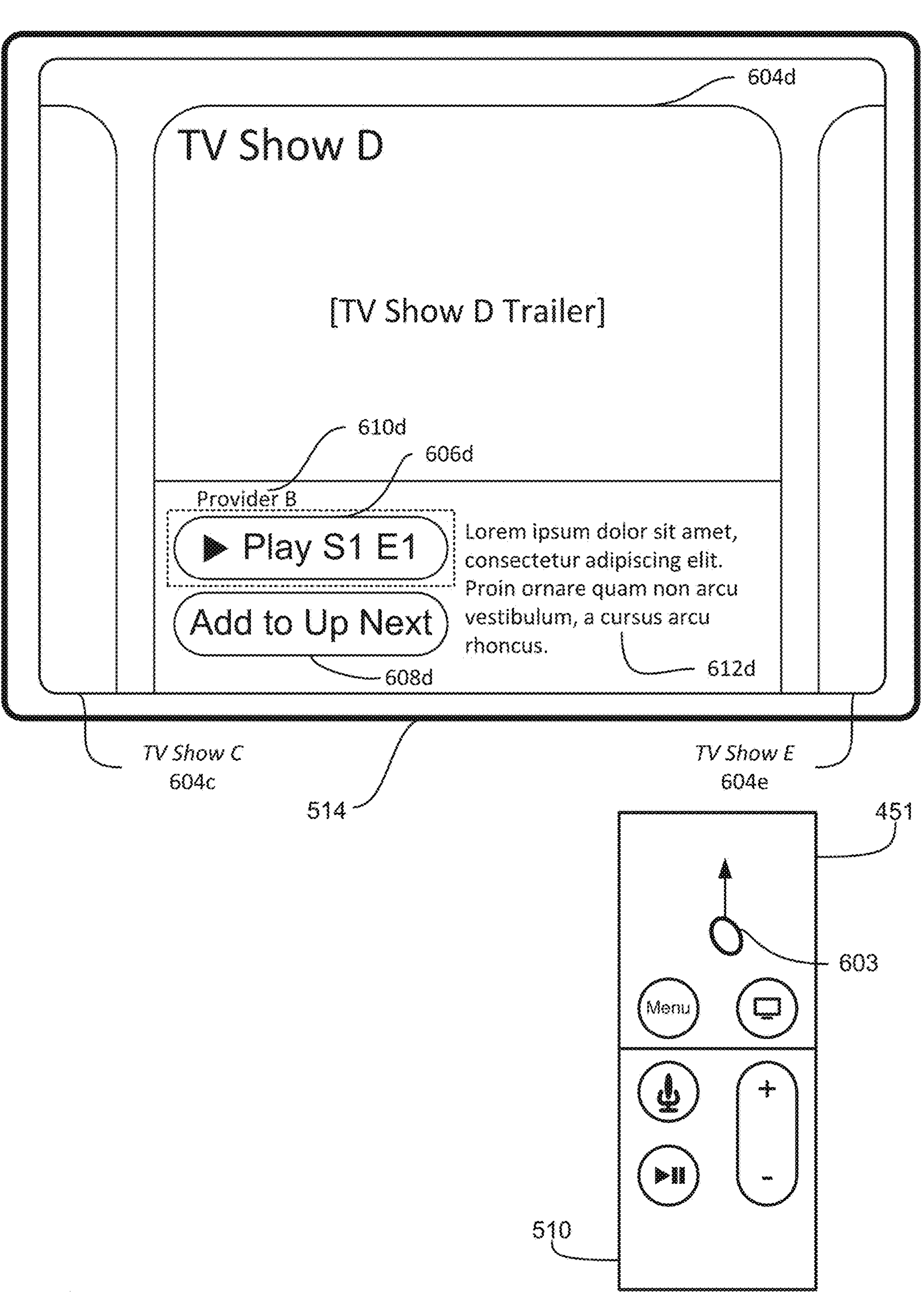
Figure 6H:
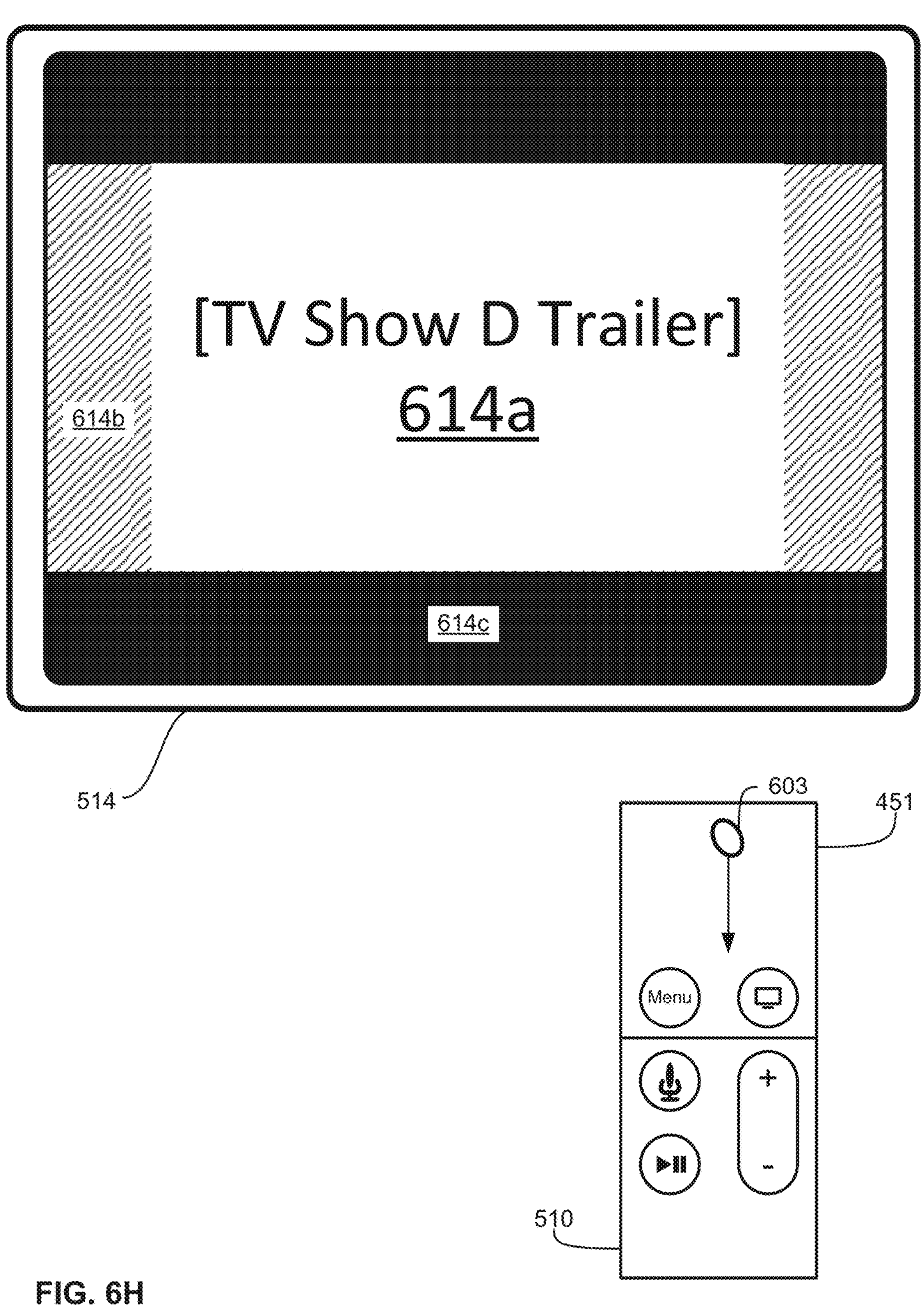
Figure 6I:
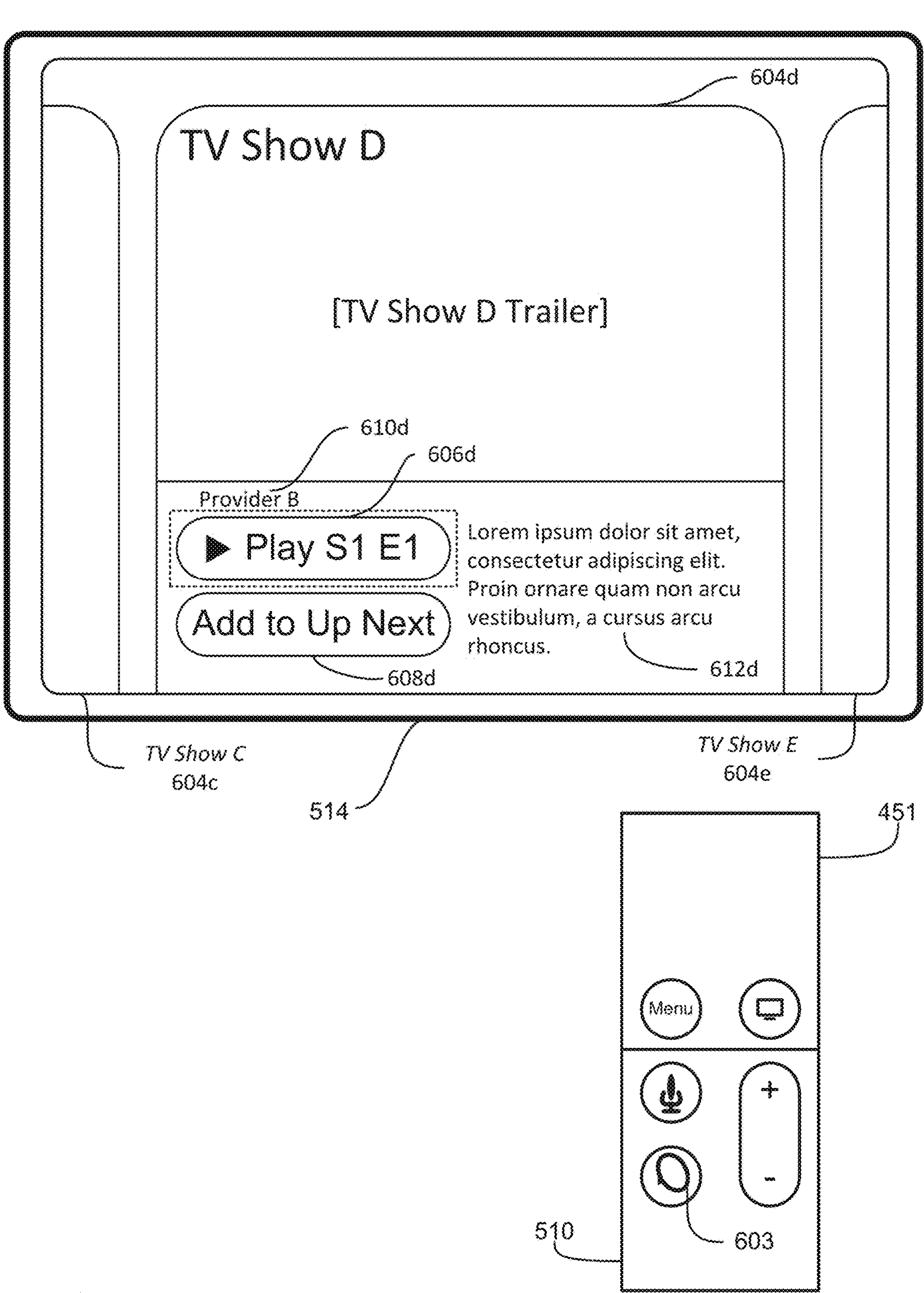
Figure 6J:
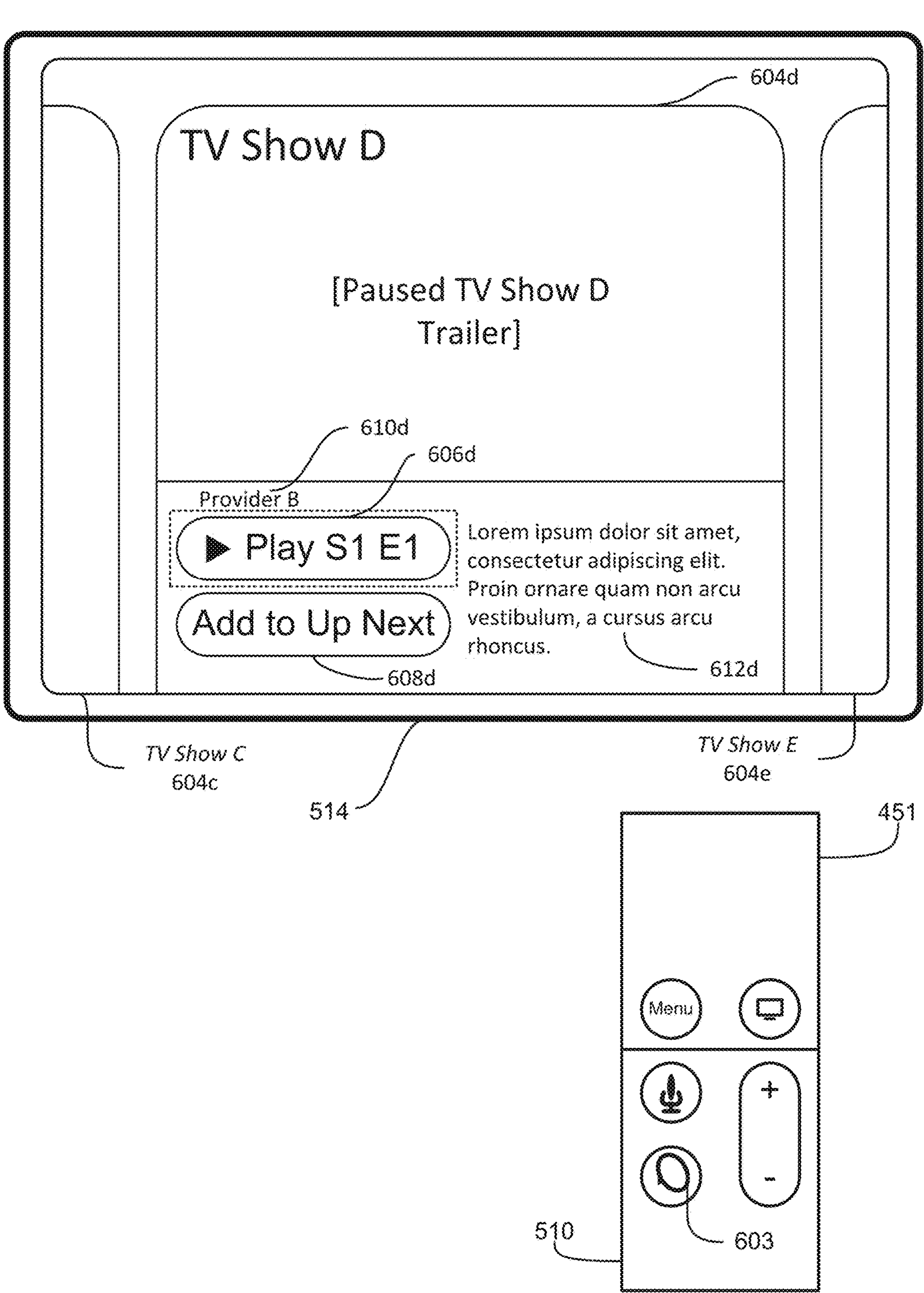
Figure 6K:
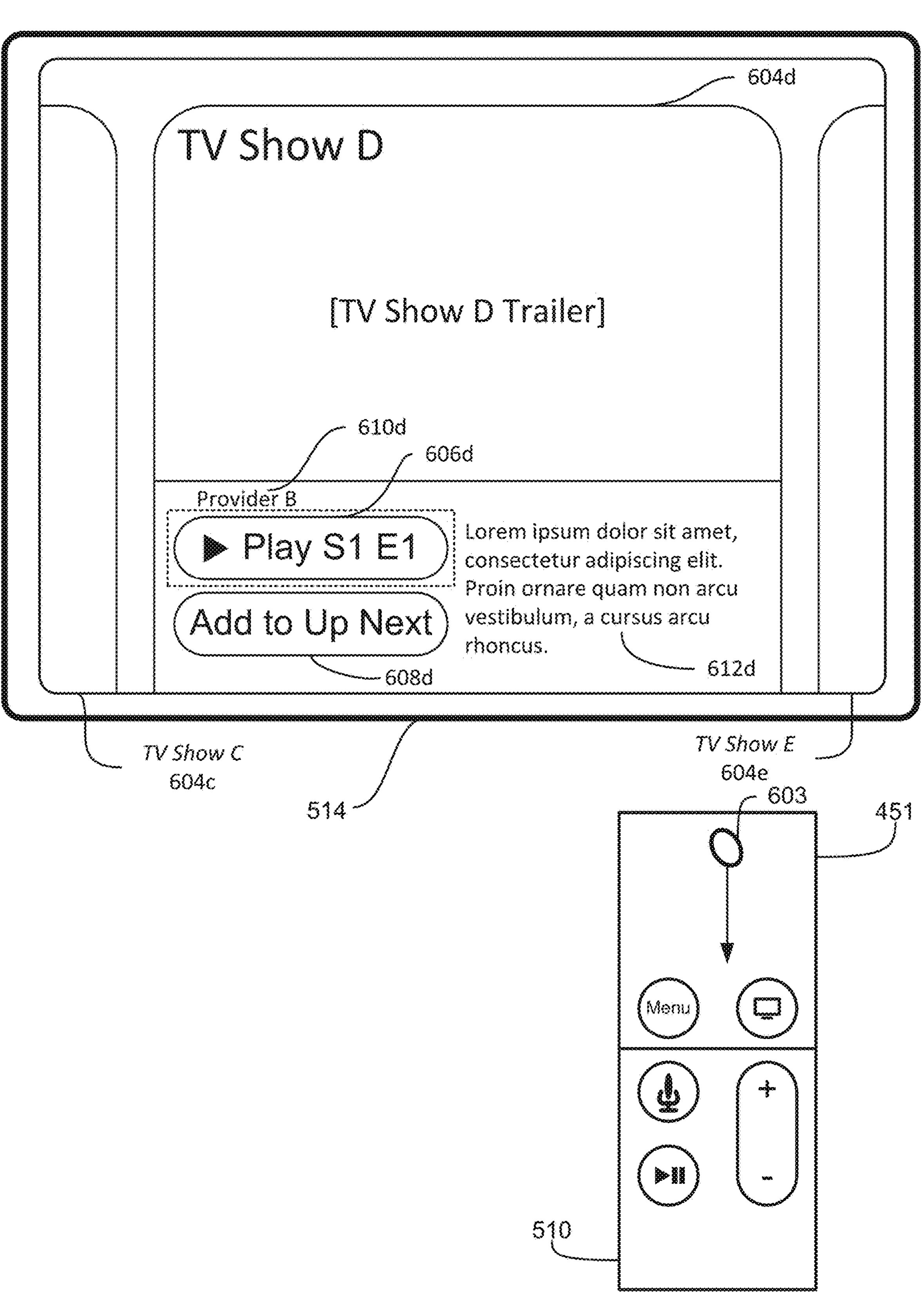
Figure 6L:
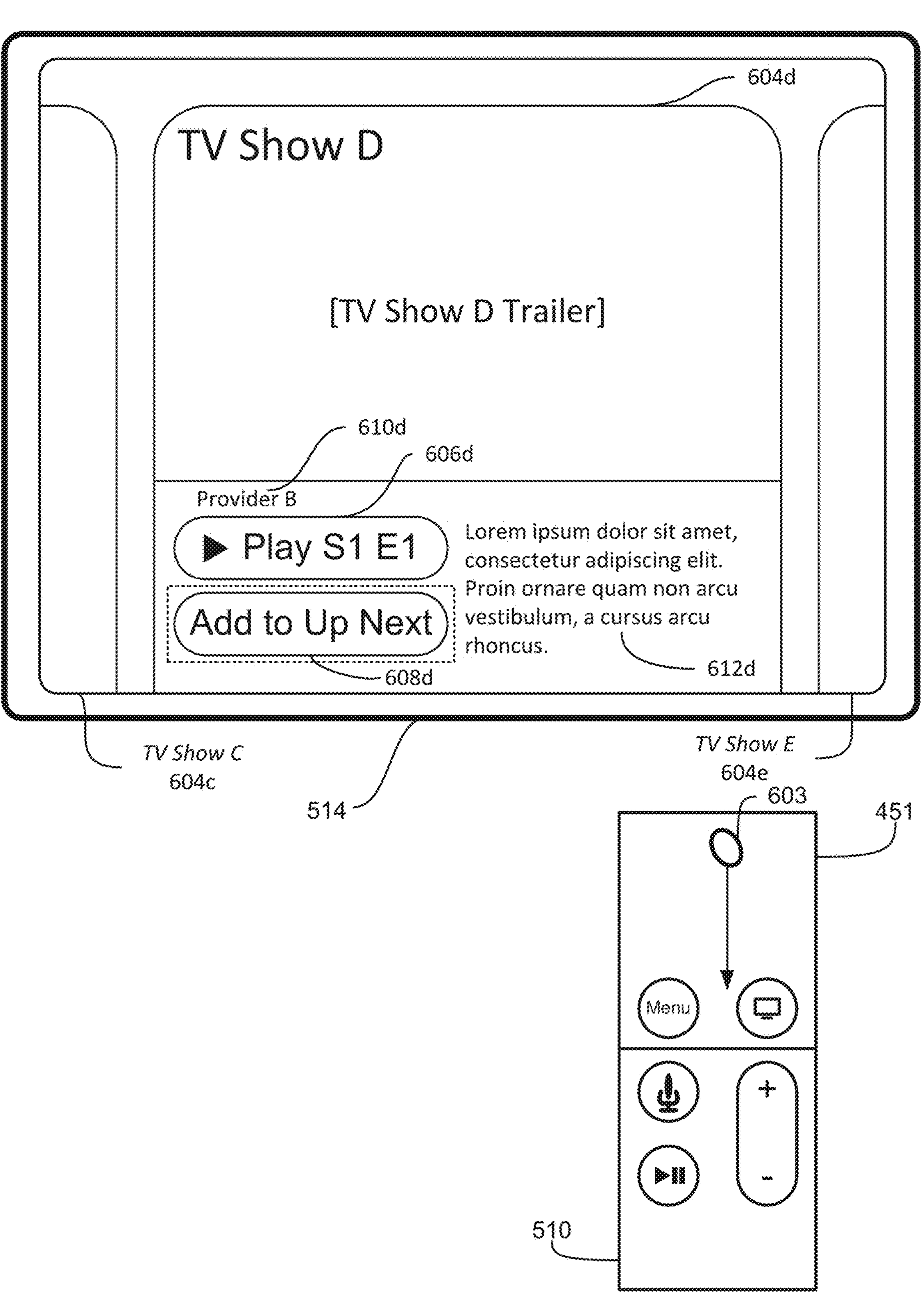
Figure 6M:
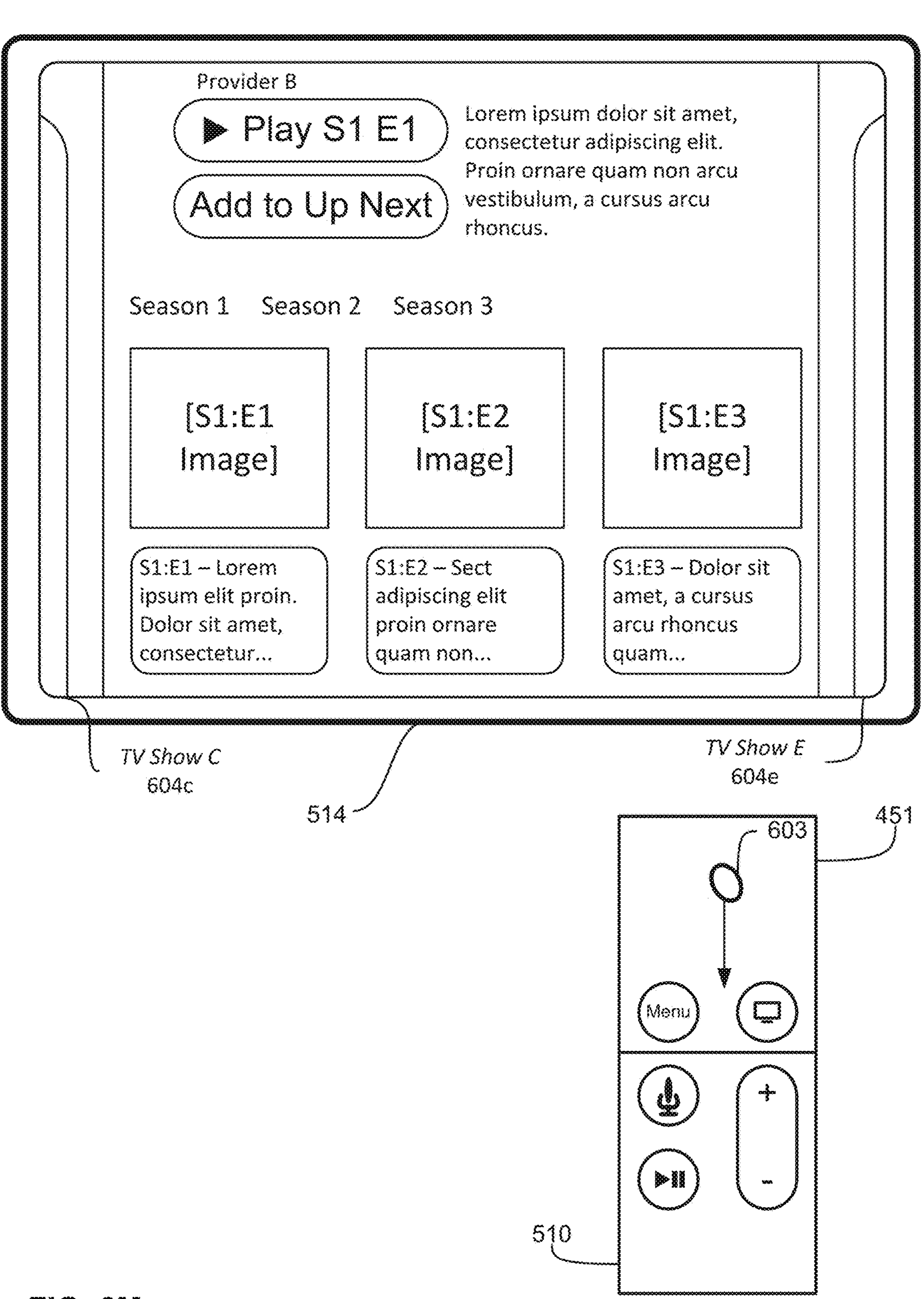
Figure 6N:
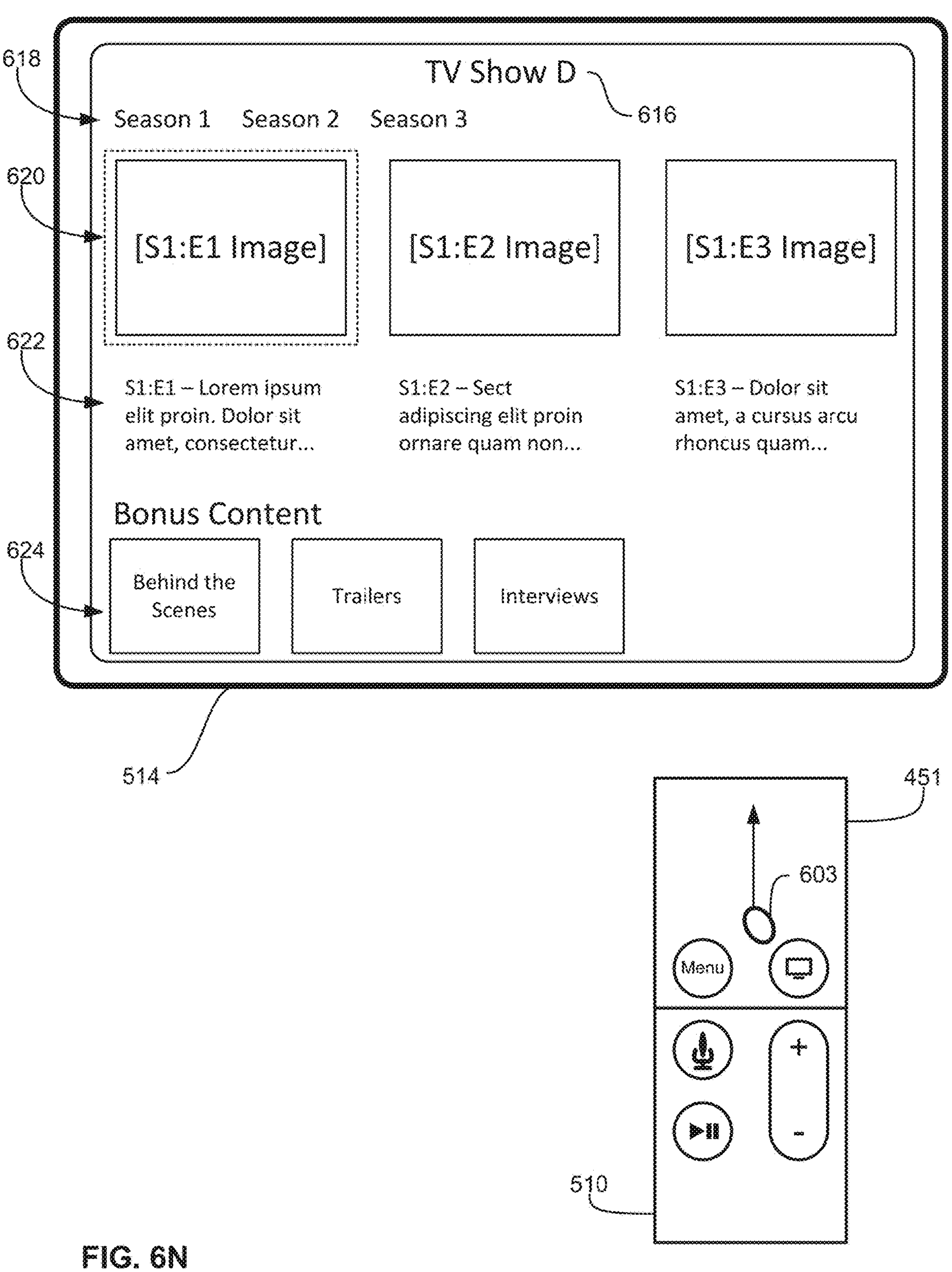
Figure 6O:
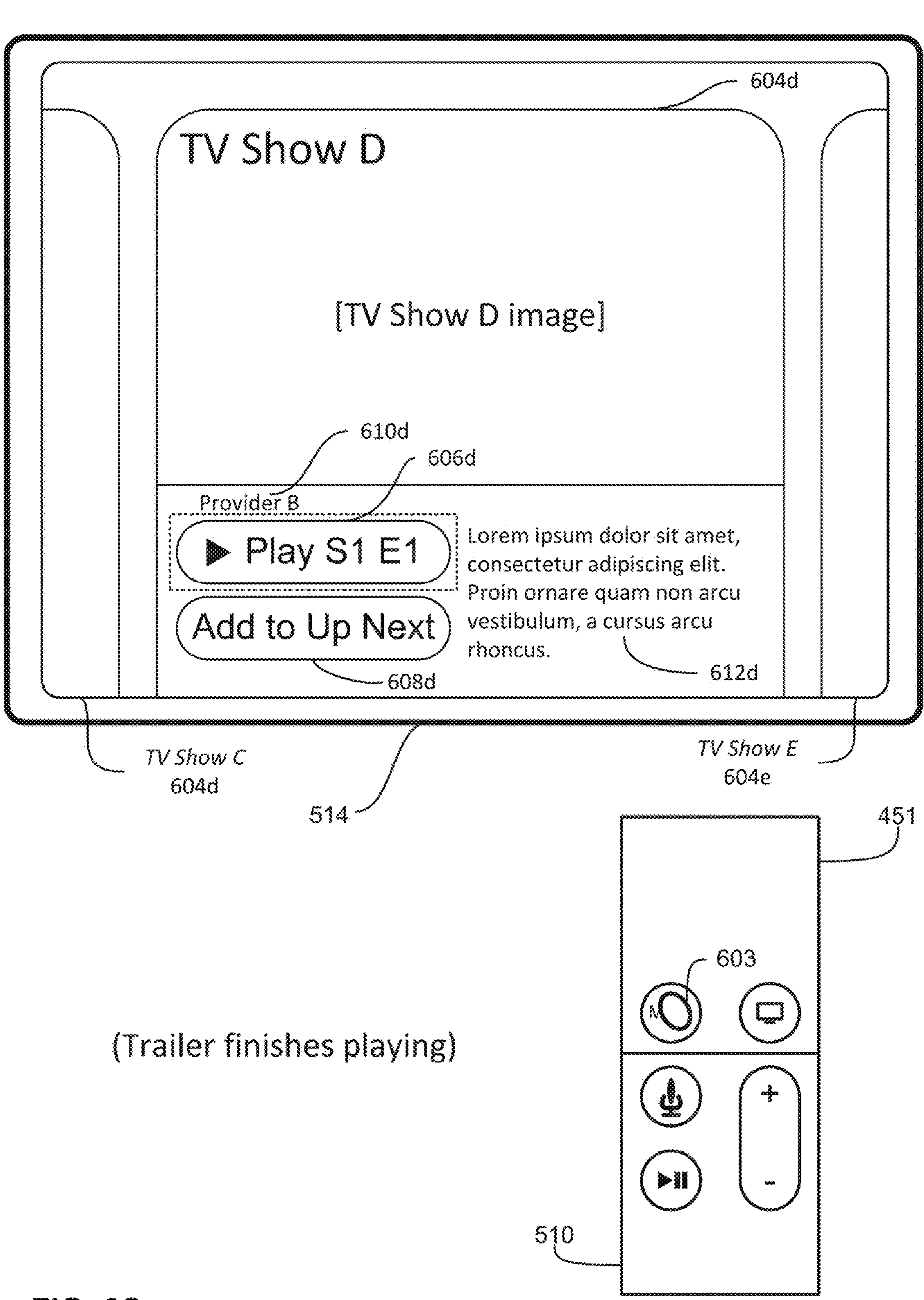
Figure 6P:
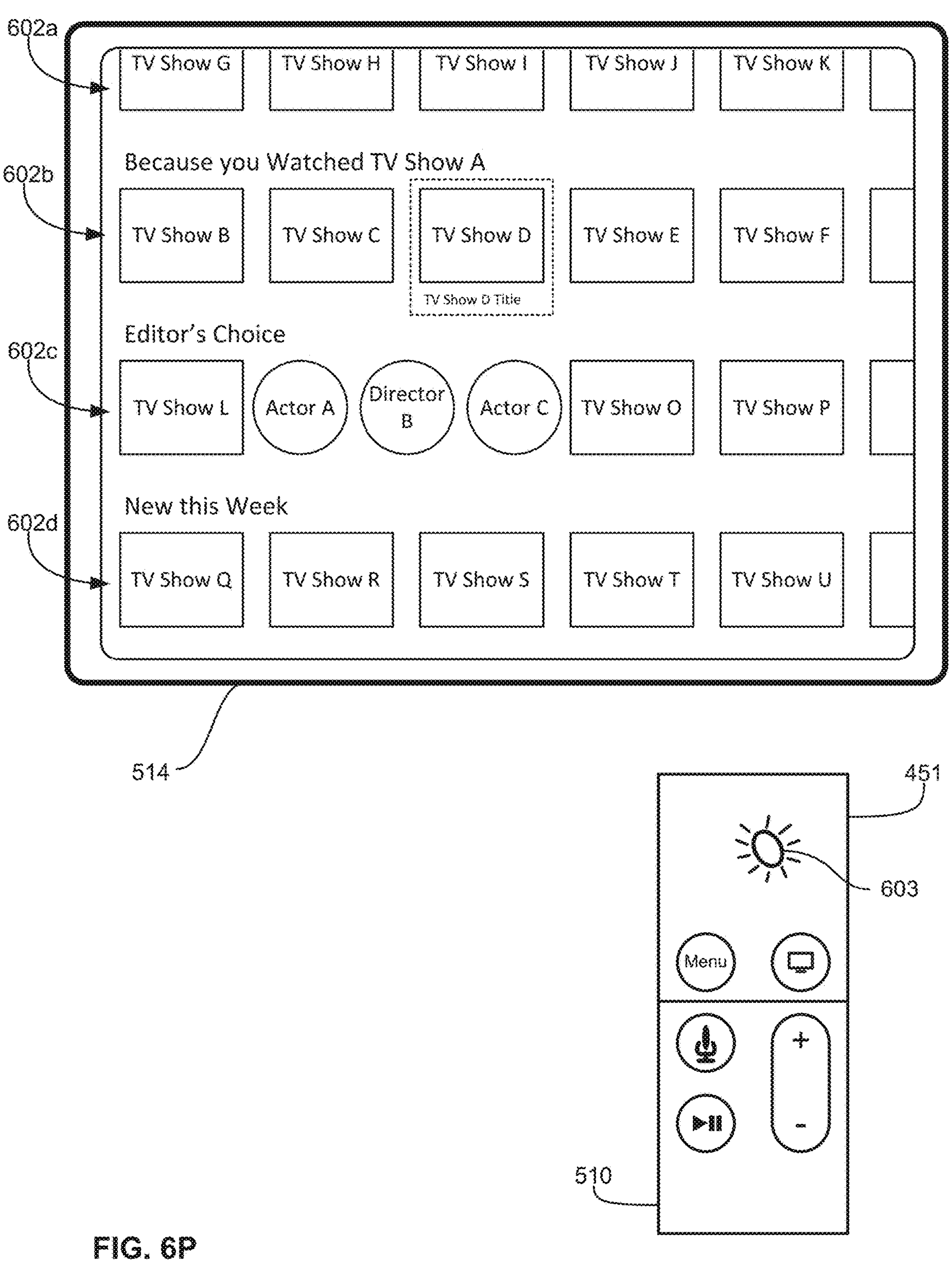
Figure 6Q:
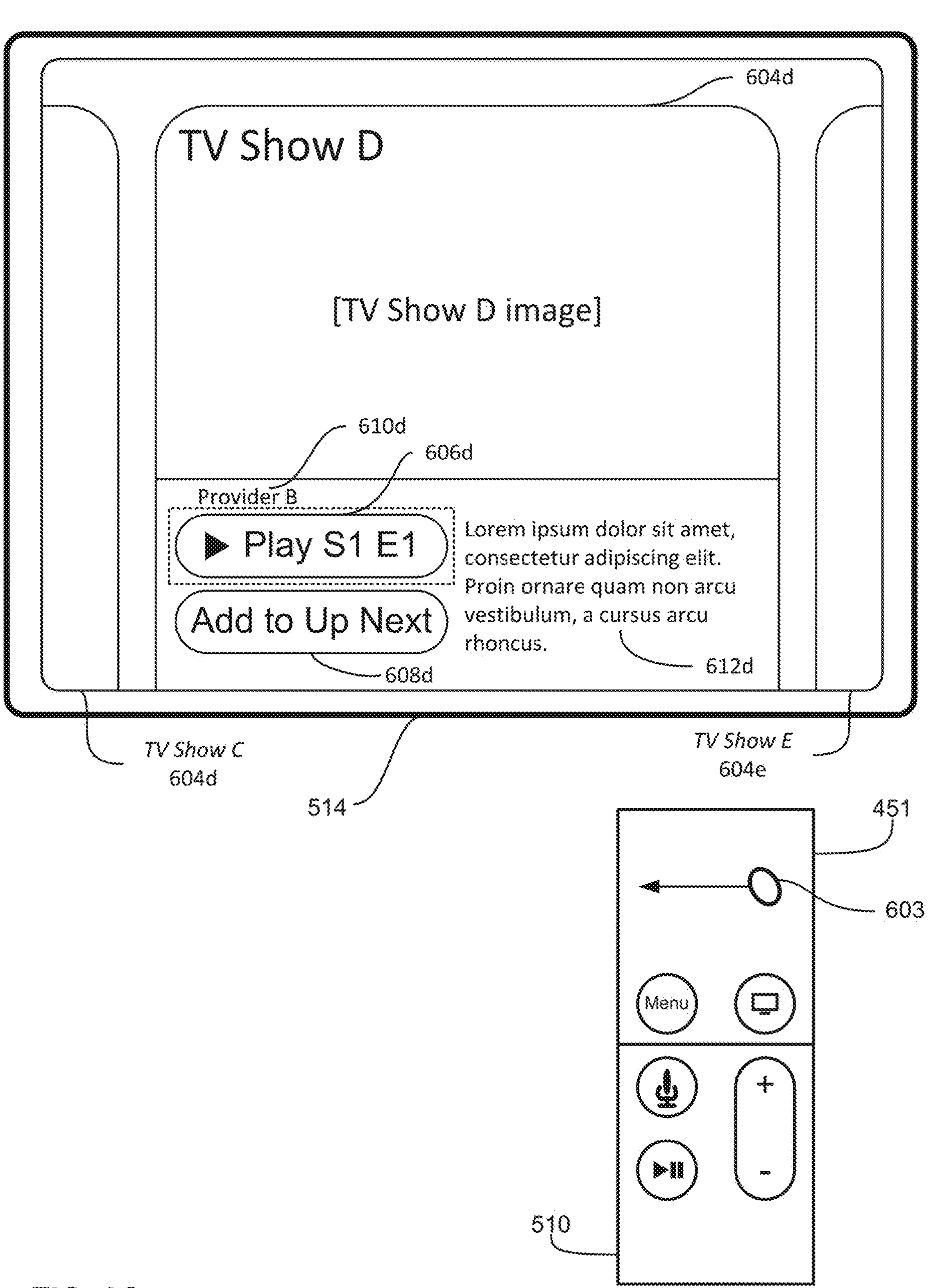
Figure 6R:
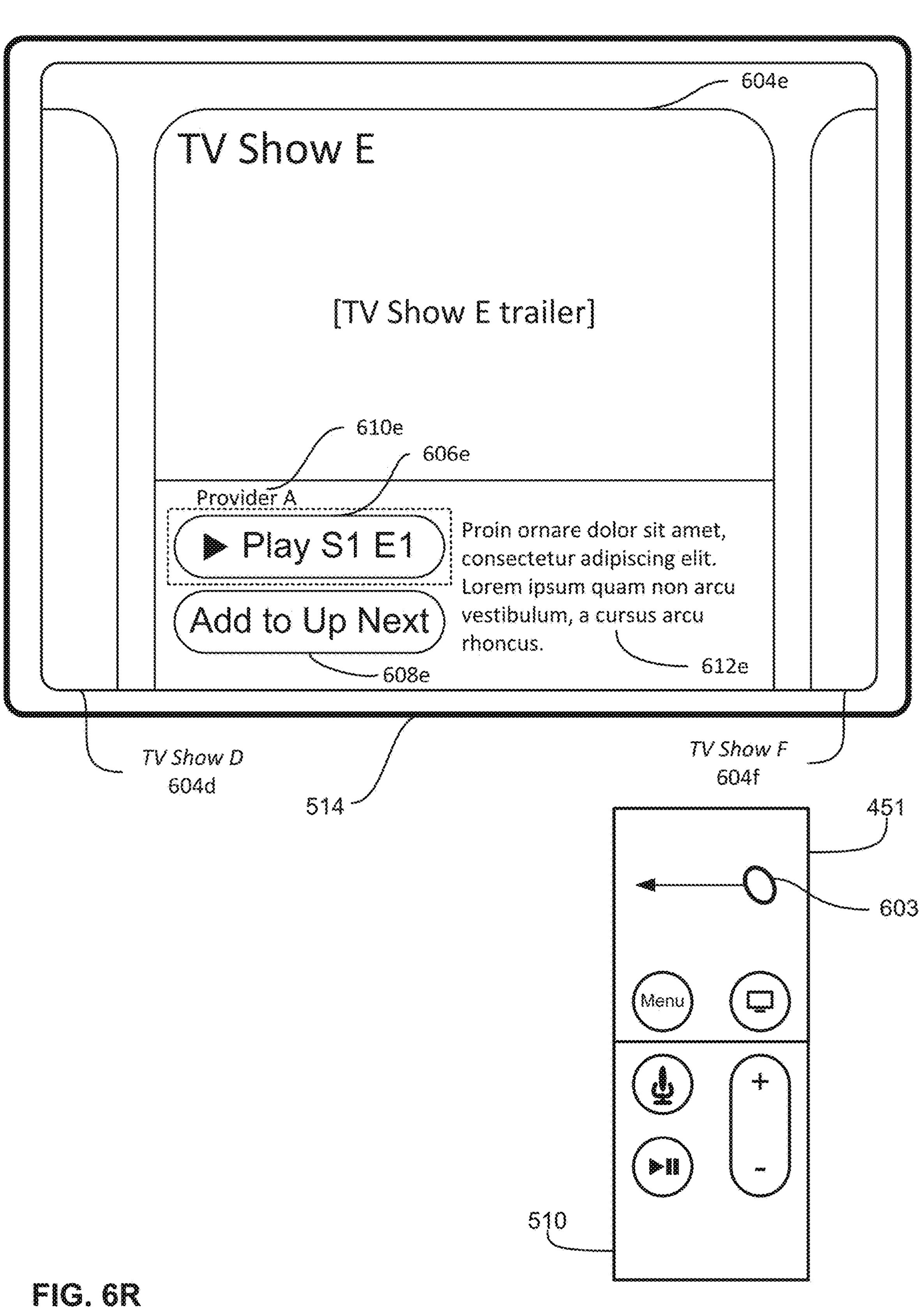
Figure 6S:
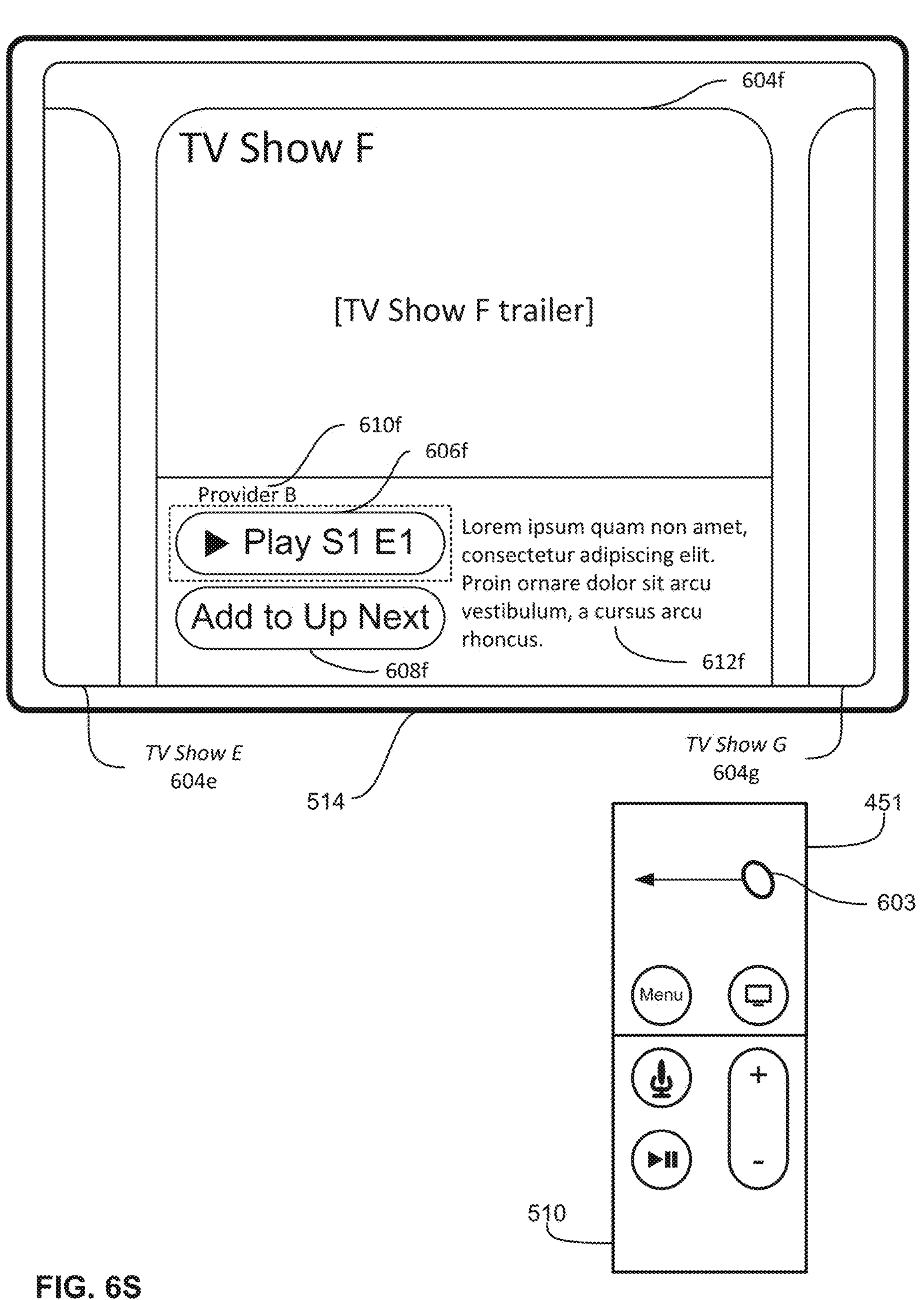
Figure 6T:
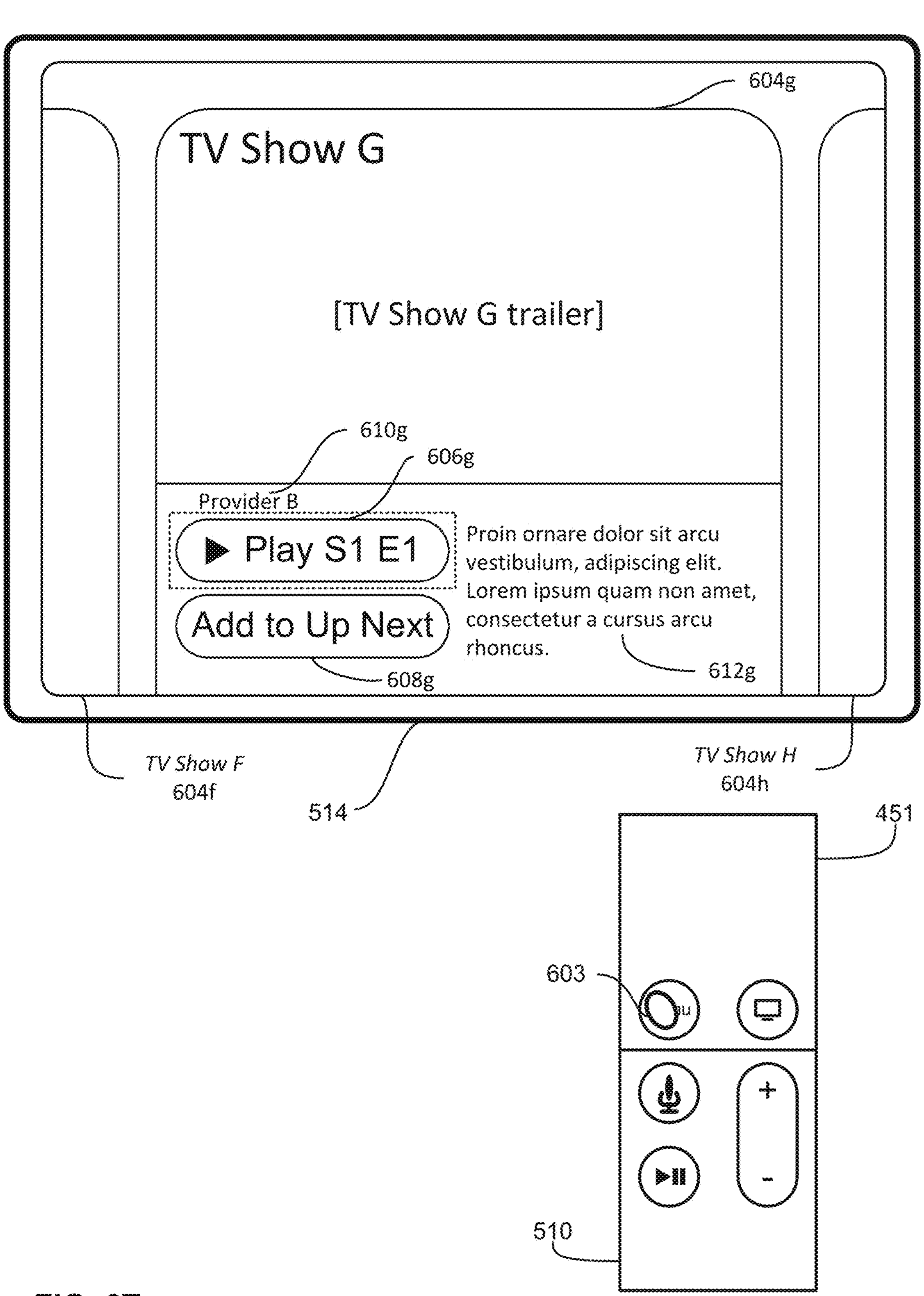
Figure 6U:
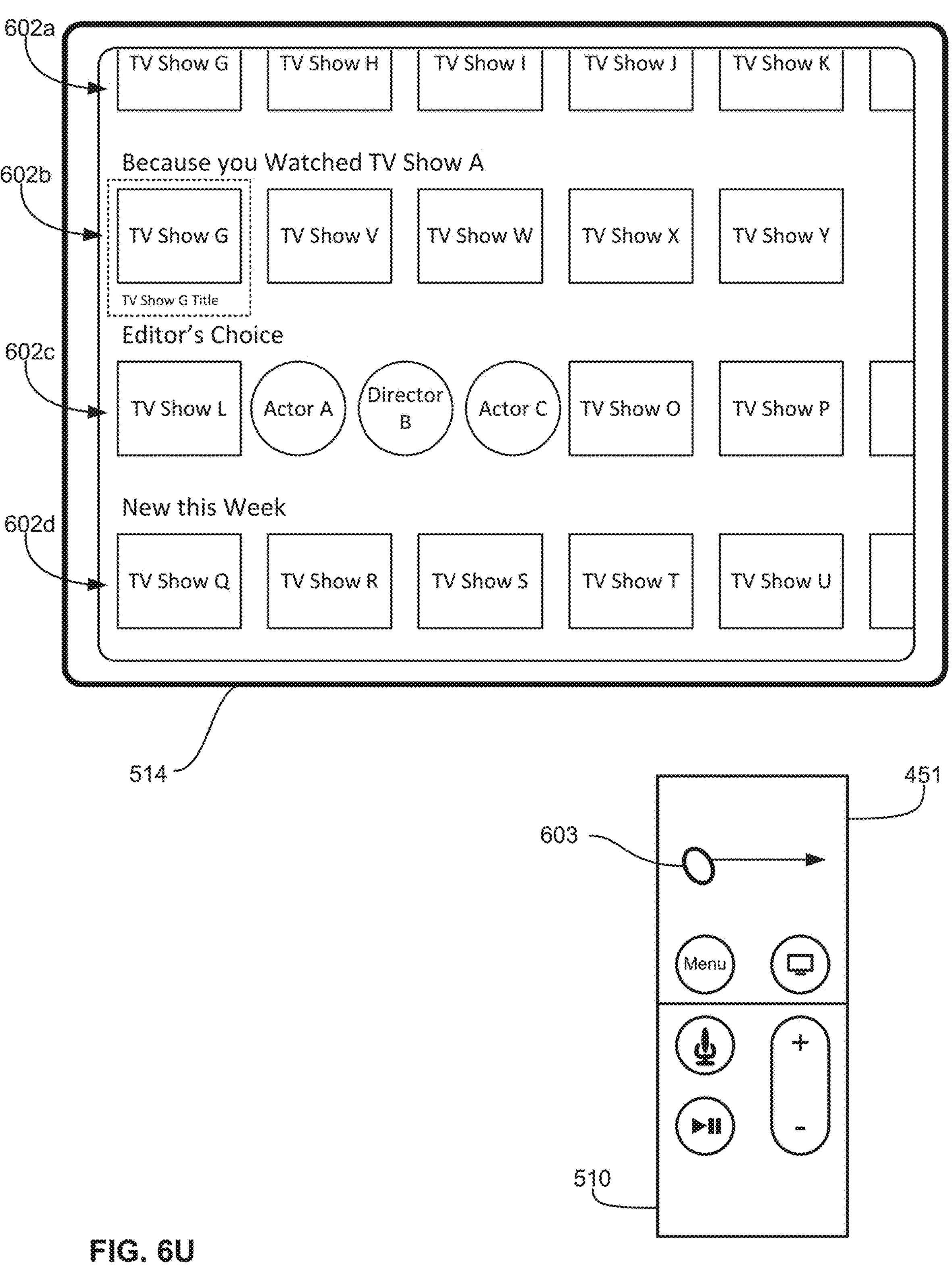
Figure 6V:
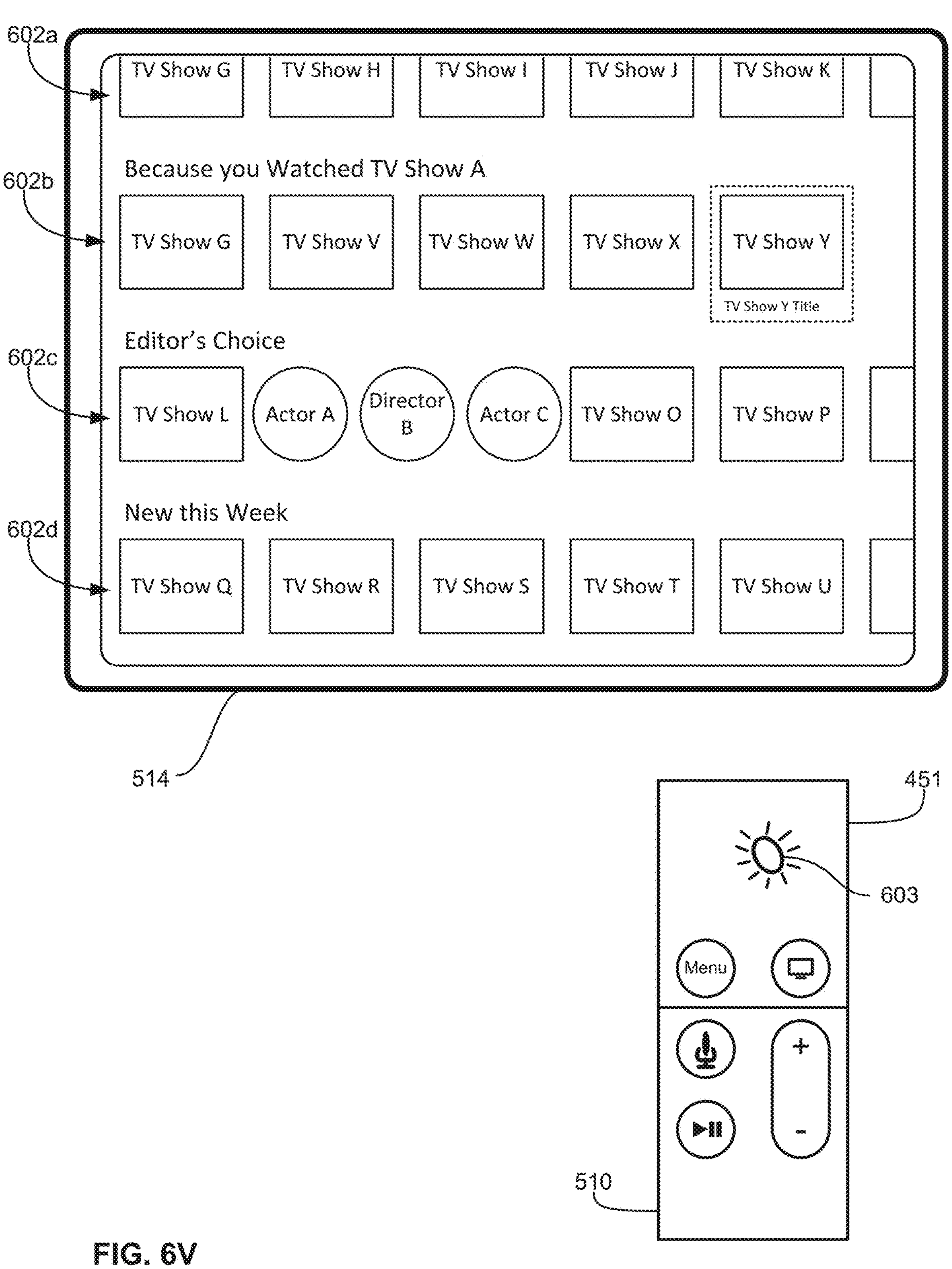
Figure 6W:
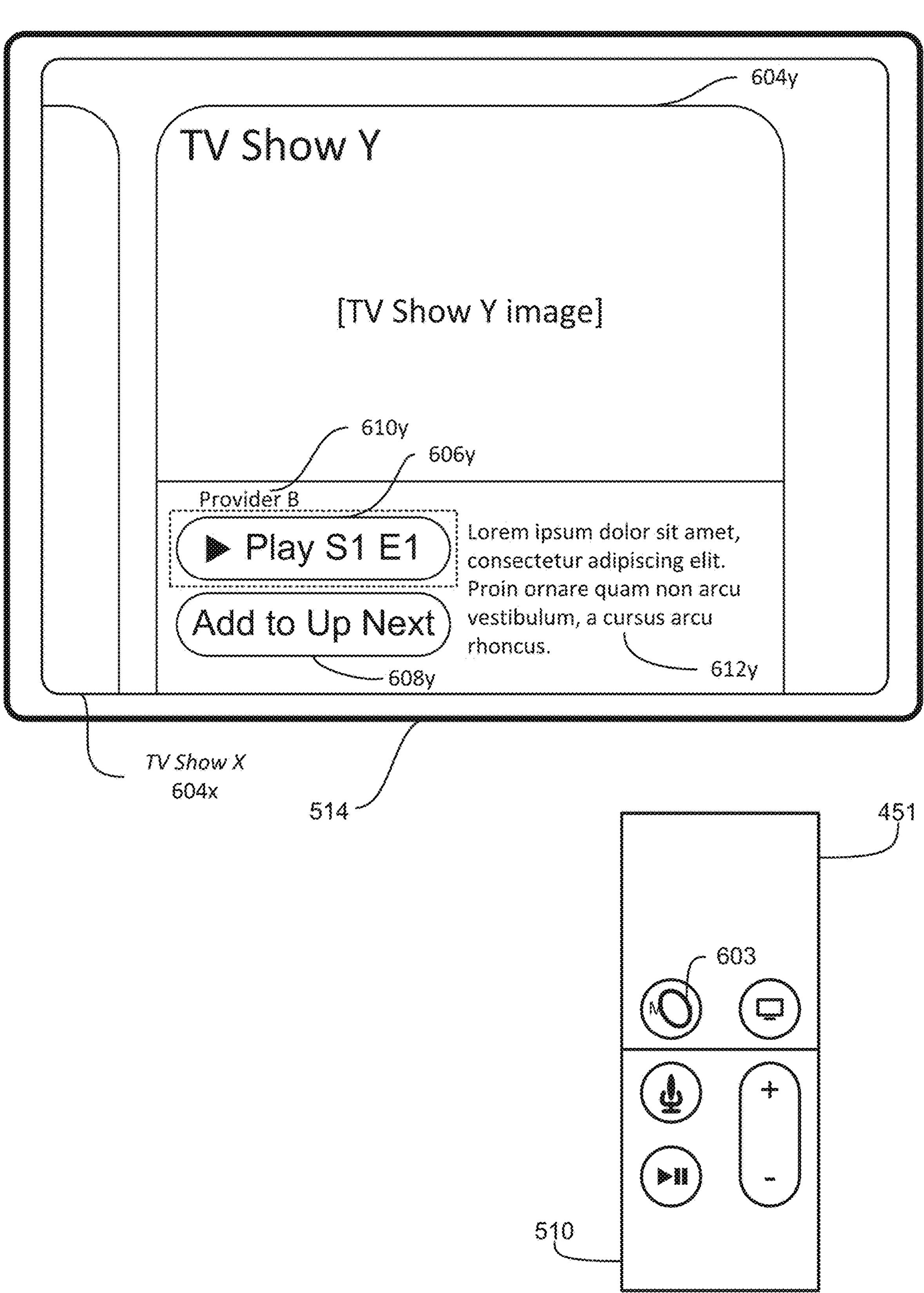
Figure 6X:
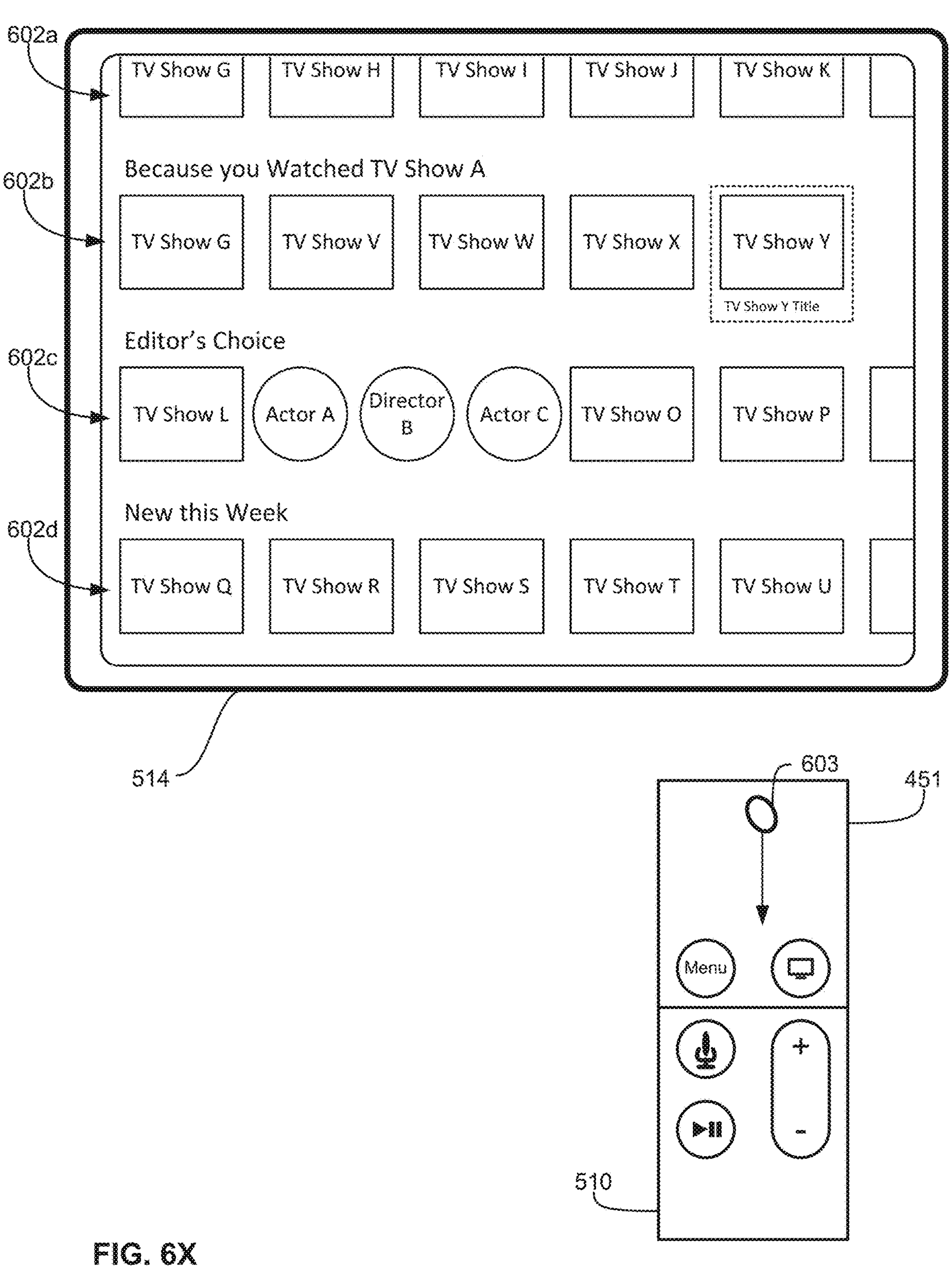
Figure 6Y:
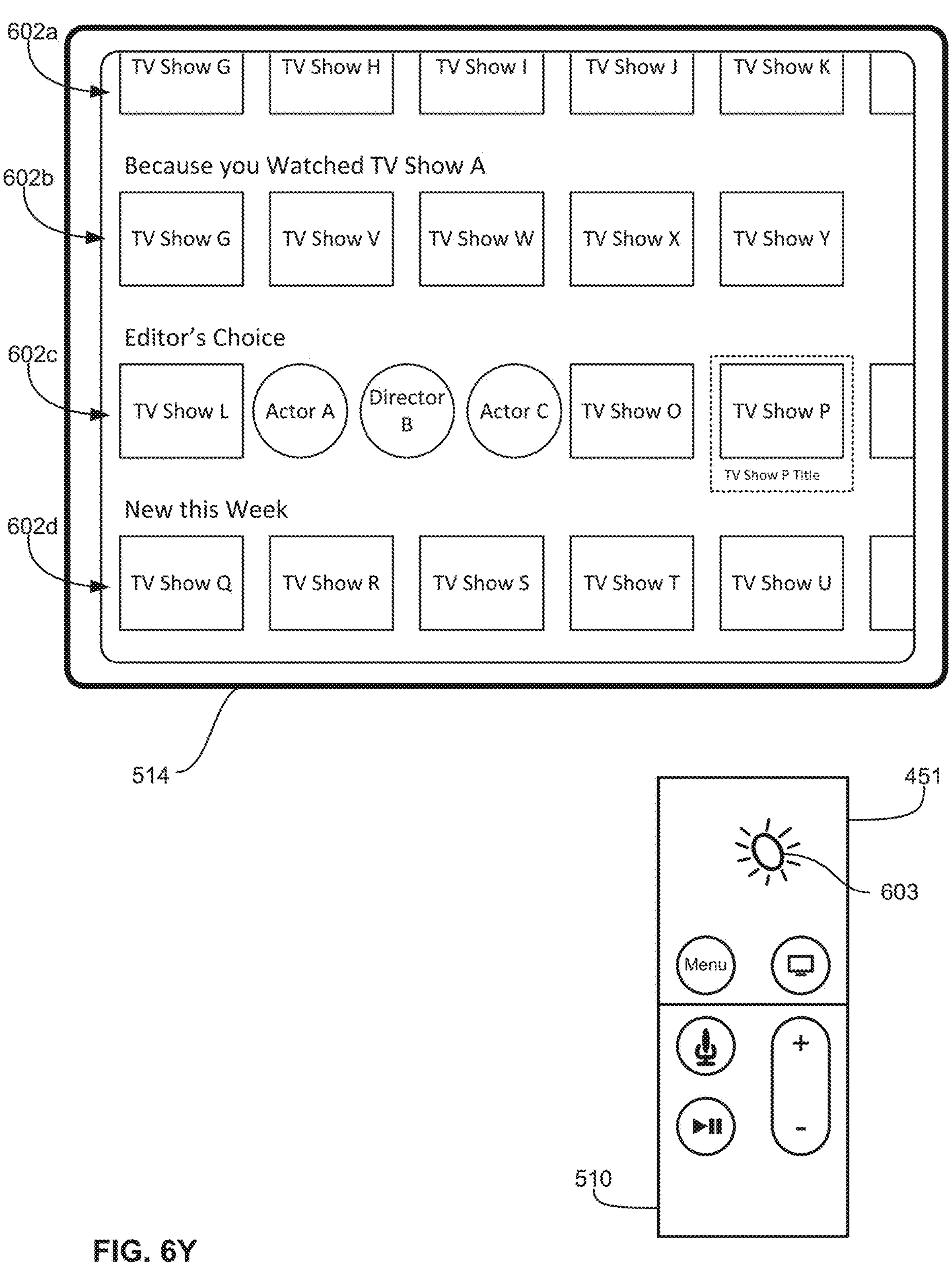
Figure 6Z:
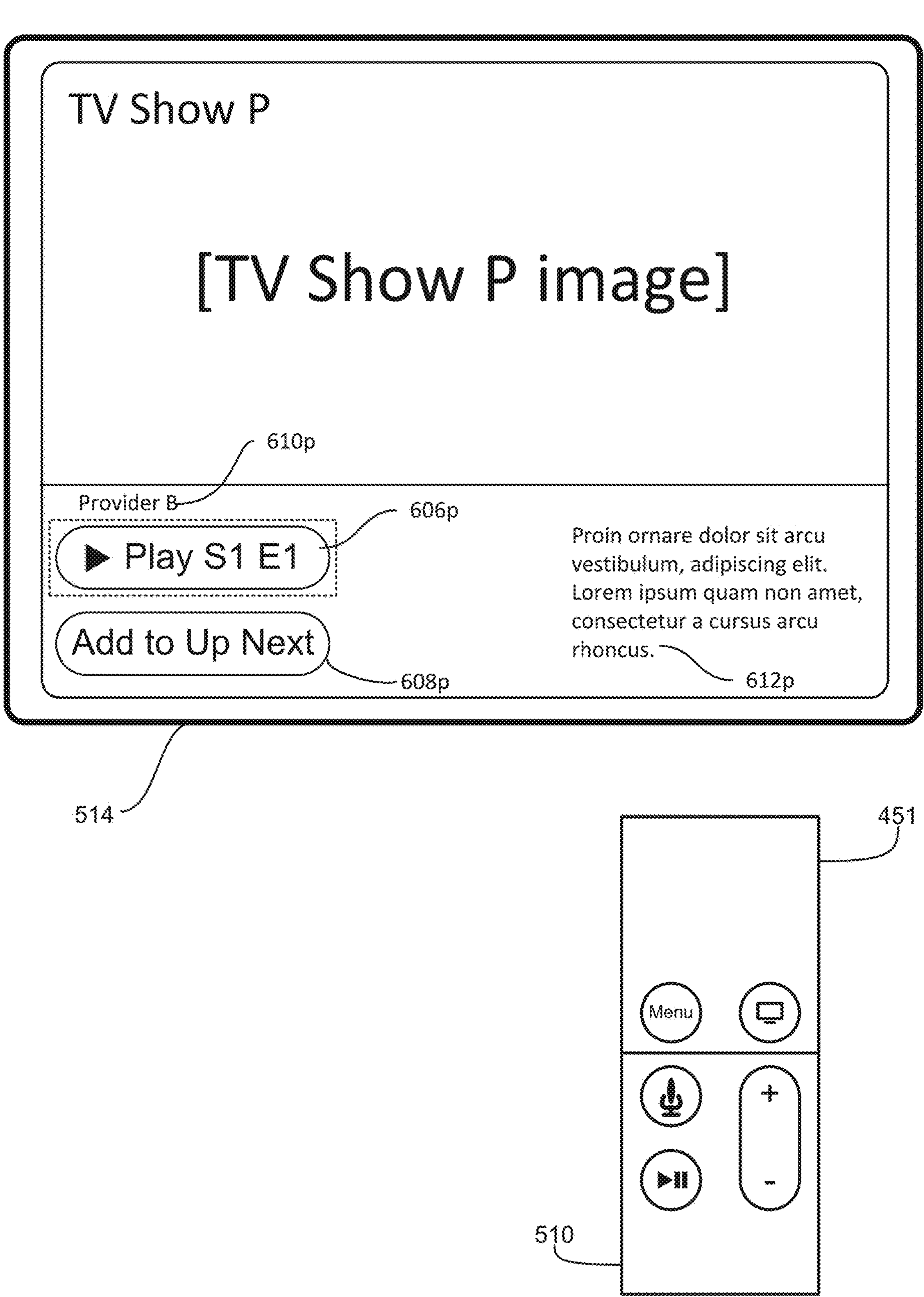
Figure 7B:
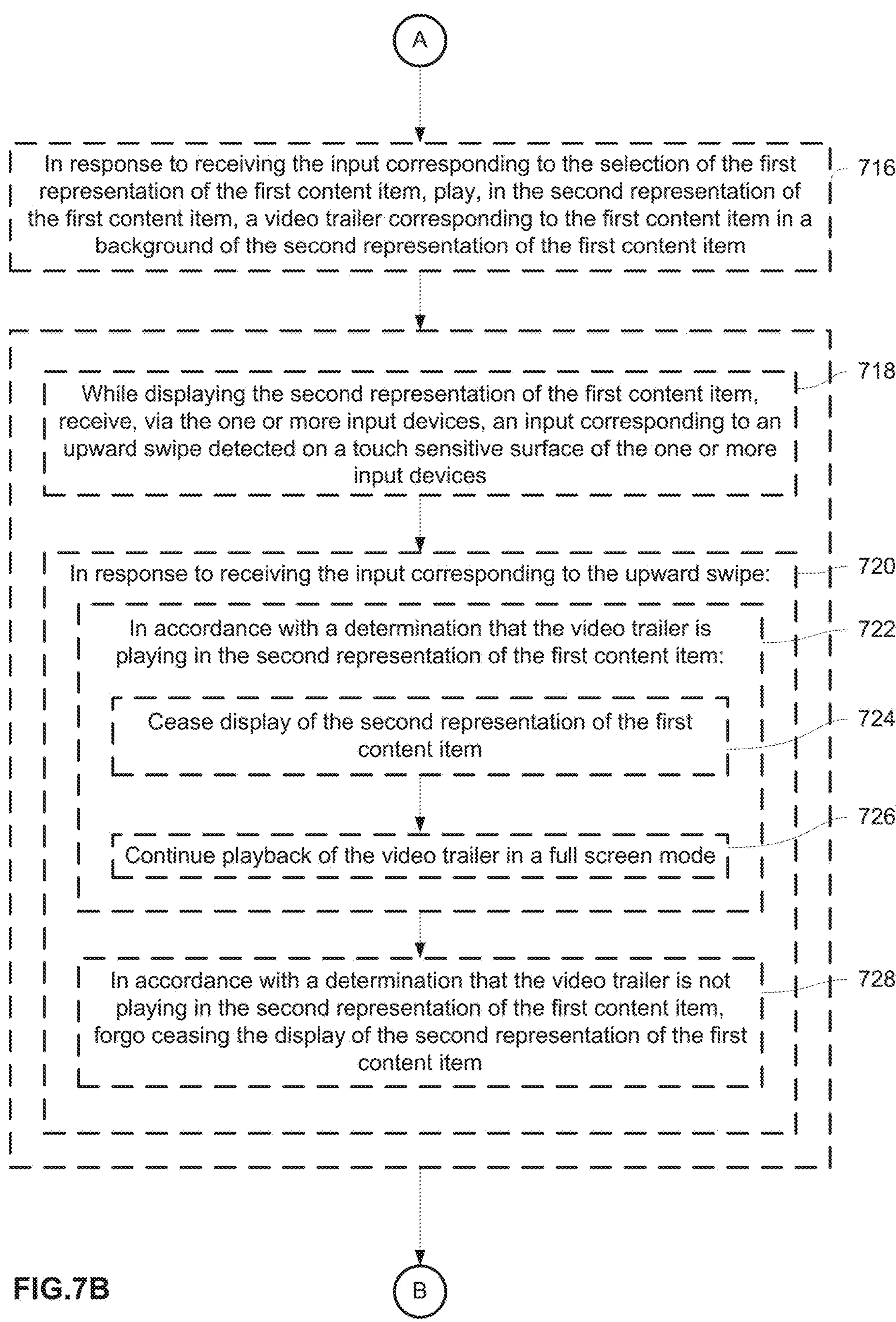
Figure 7C:
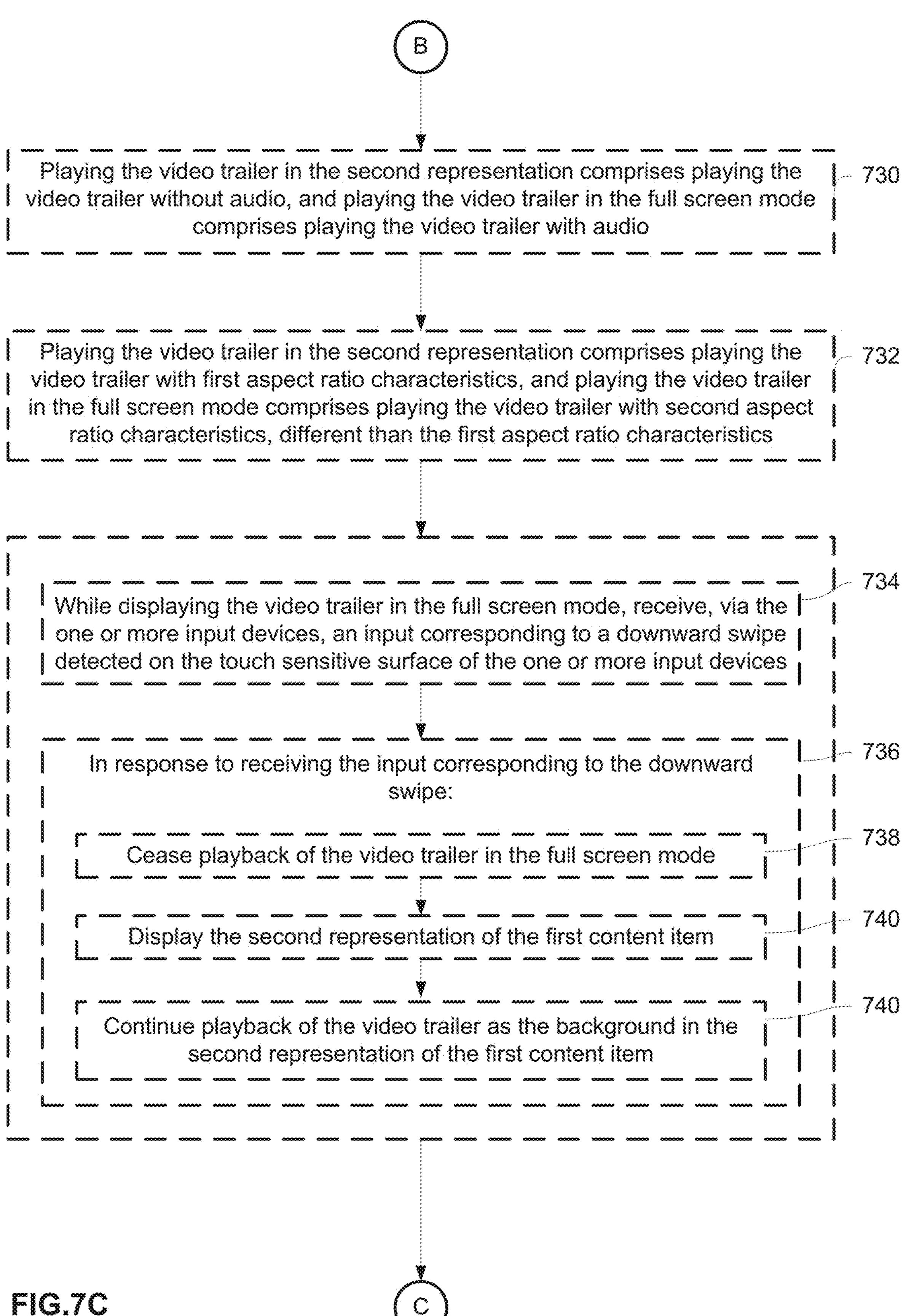
Figure 7D:
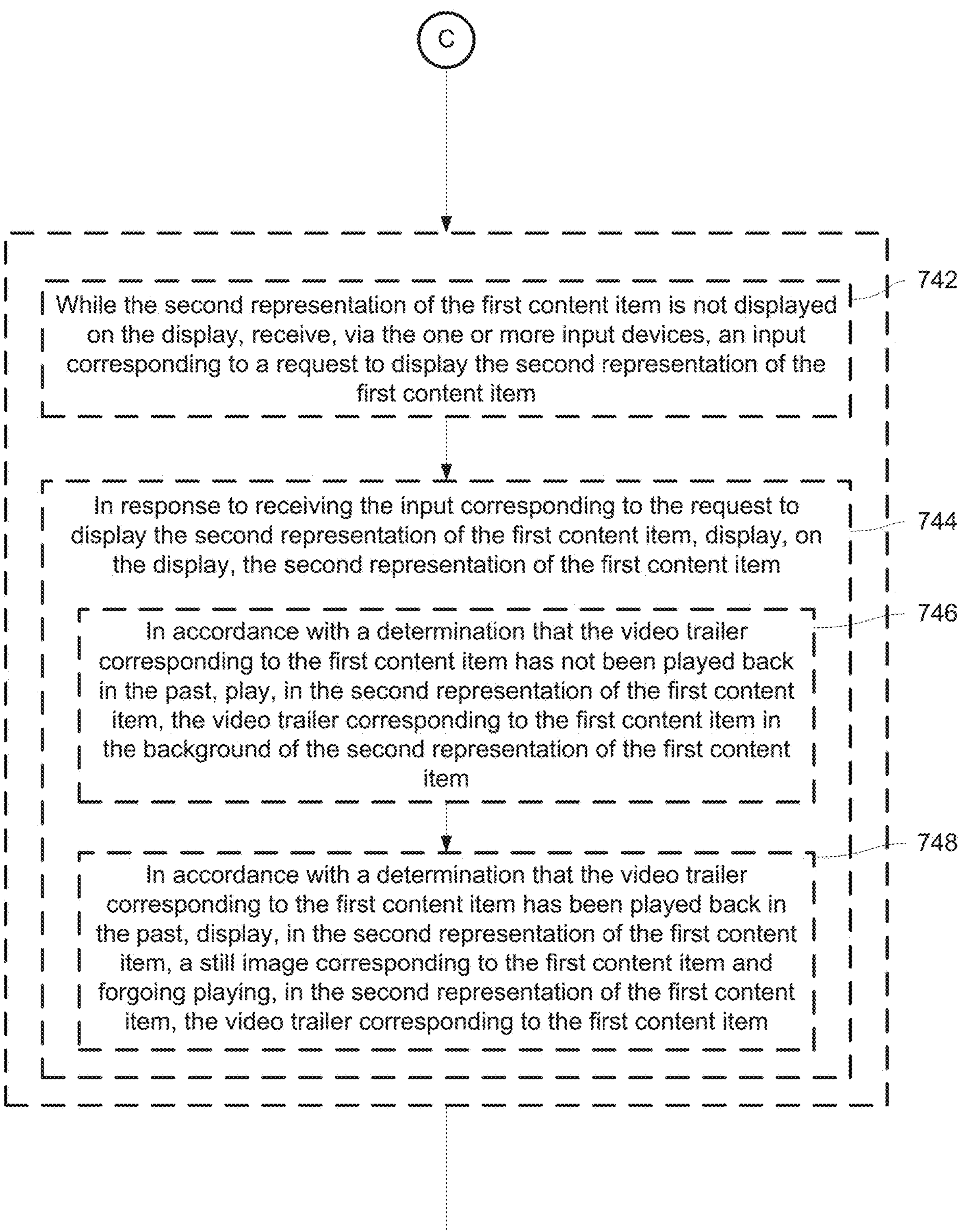
Figure 7E:
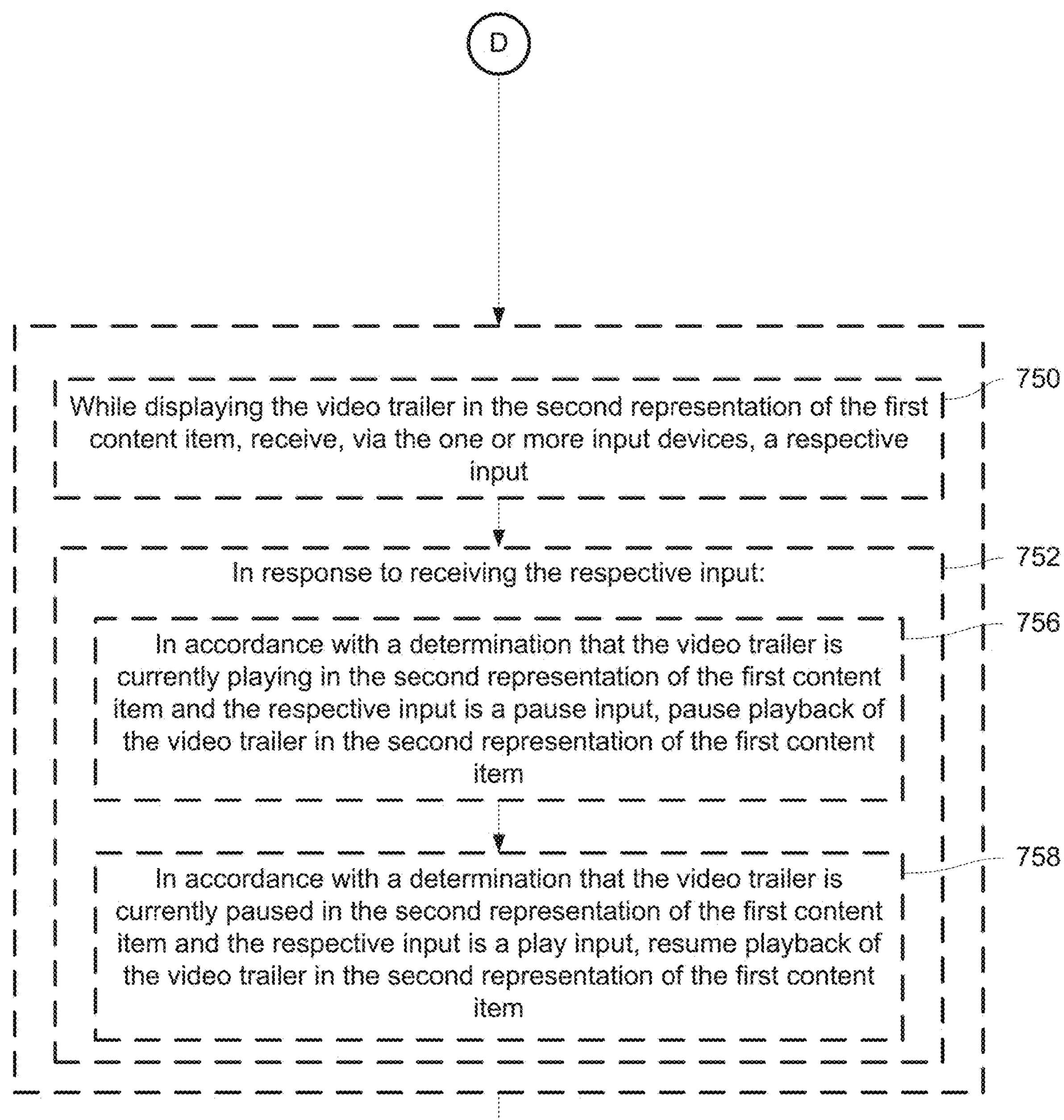
Figure 7F:
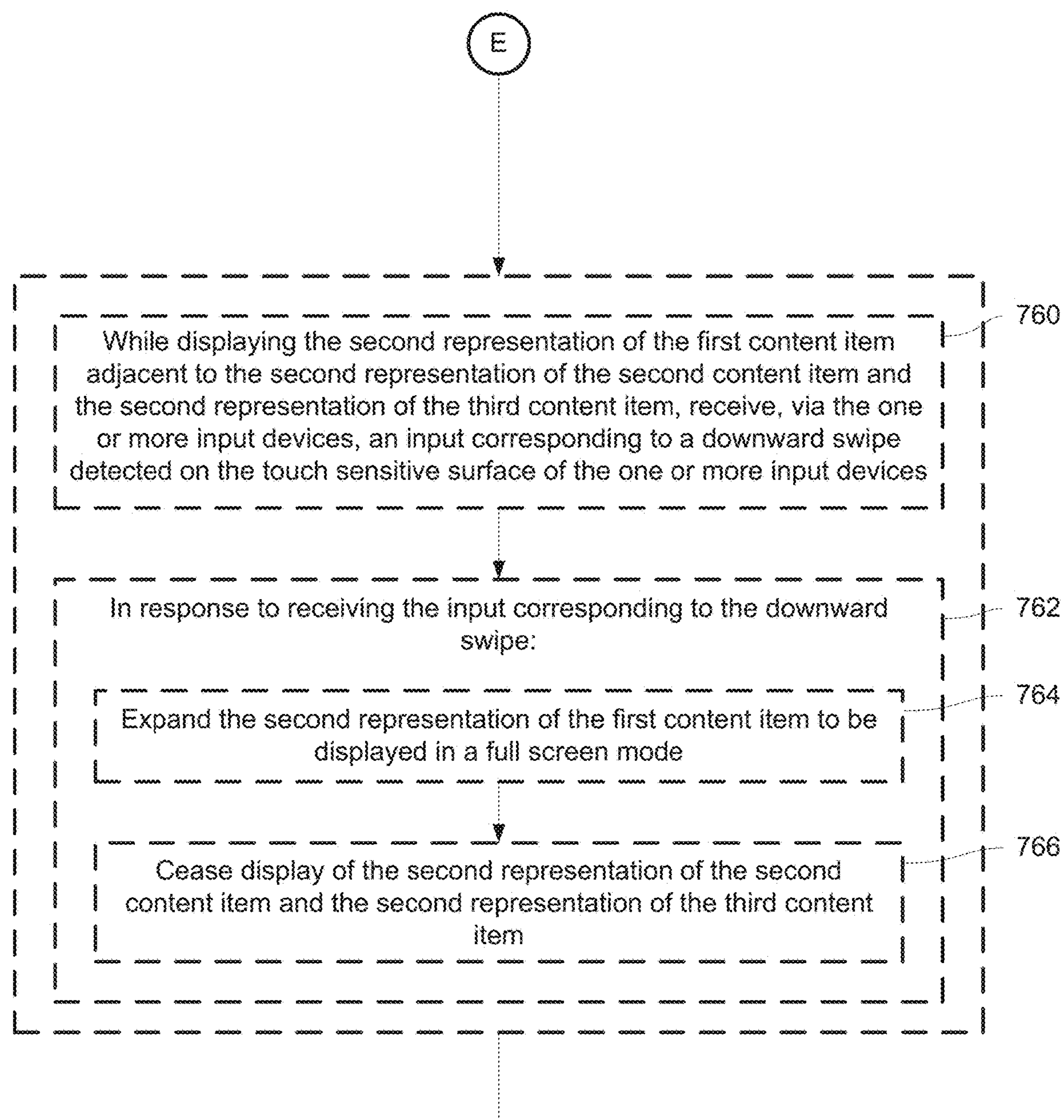
Figure 7G:
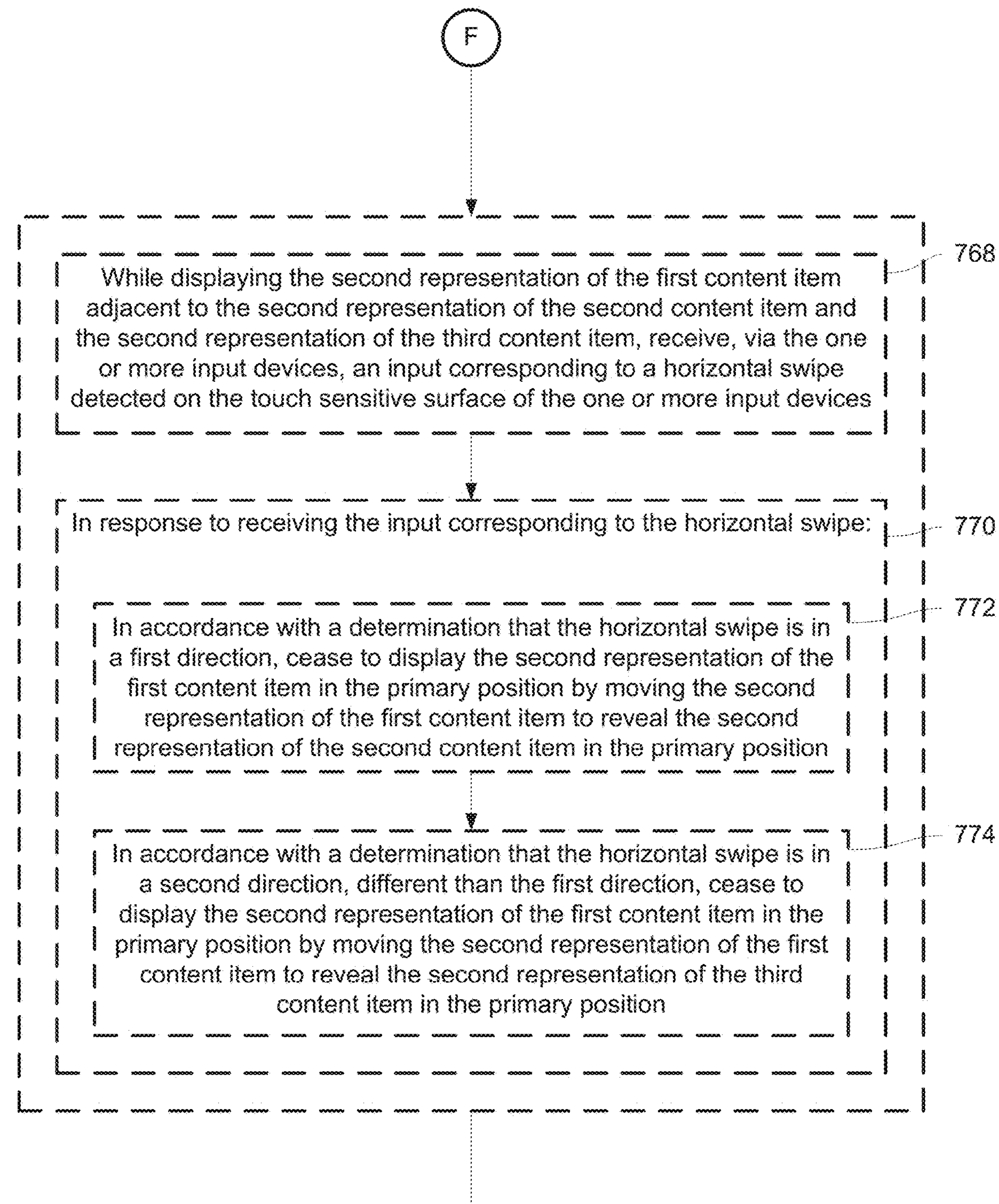
Figure 7H:
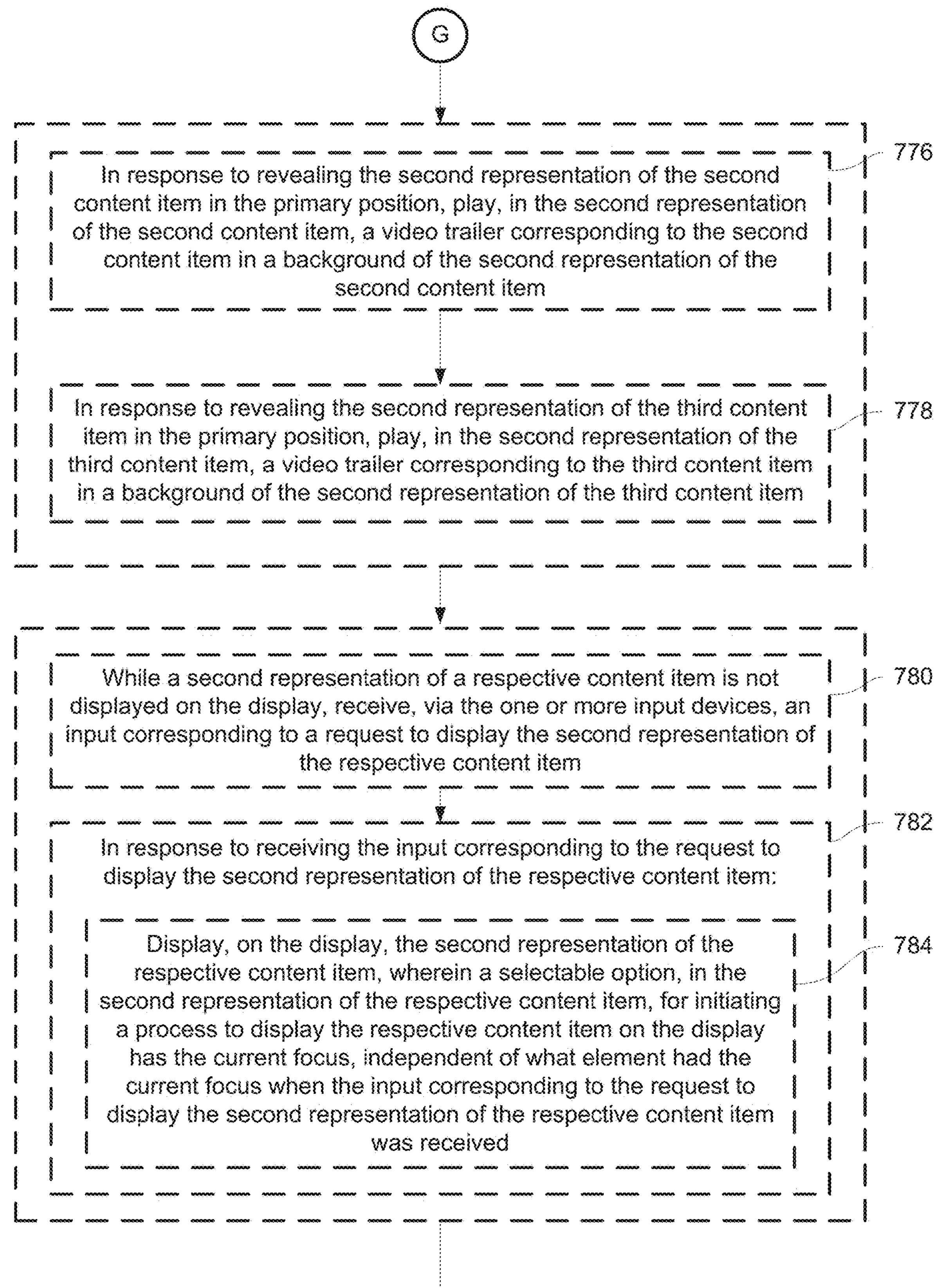
Figure 7I:
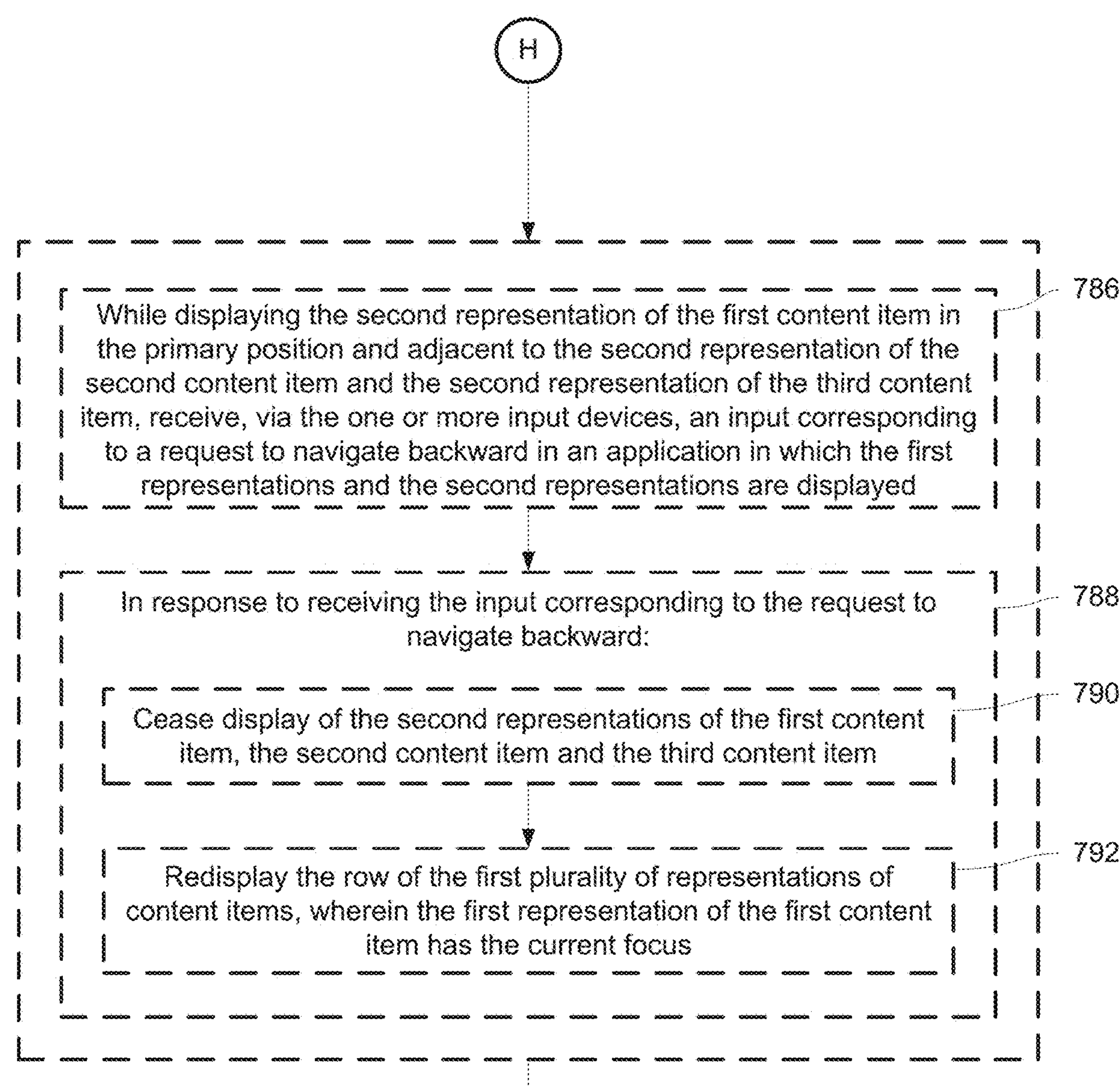
Figure 7J:
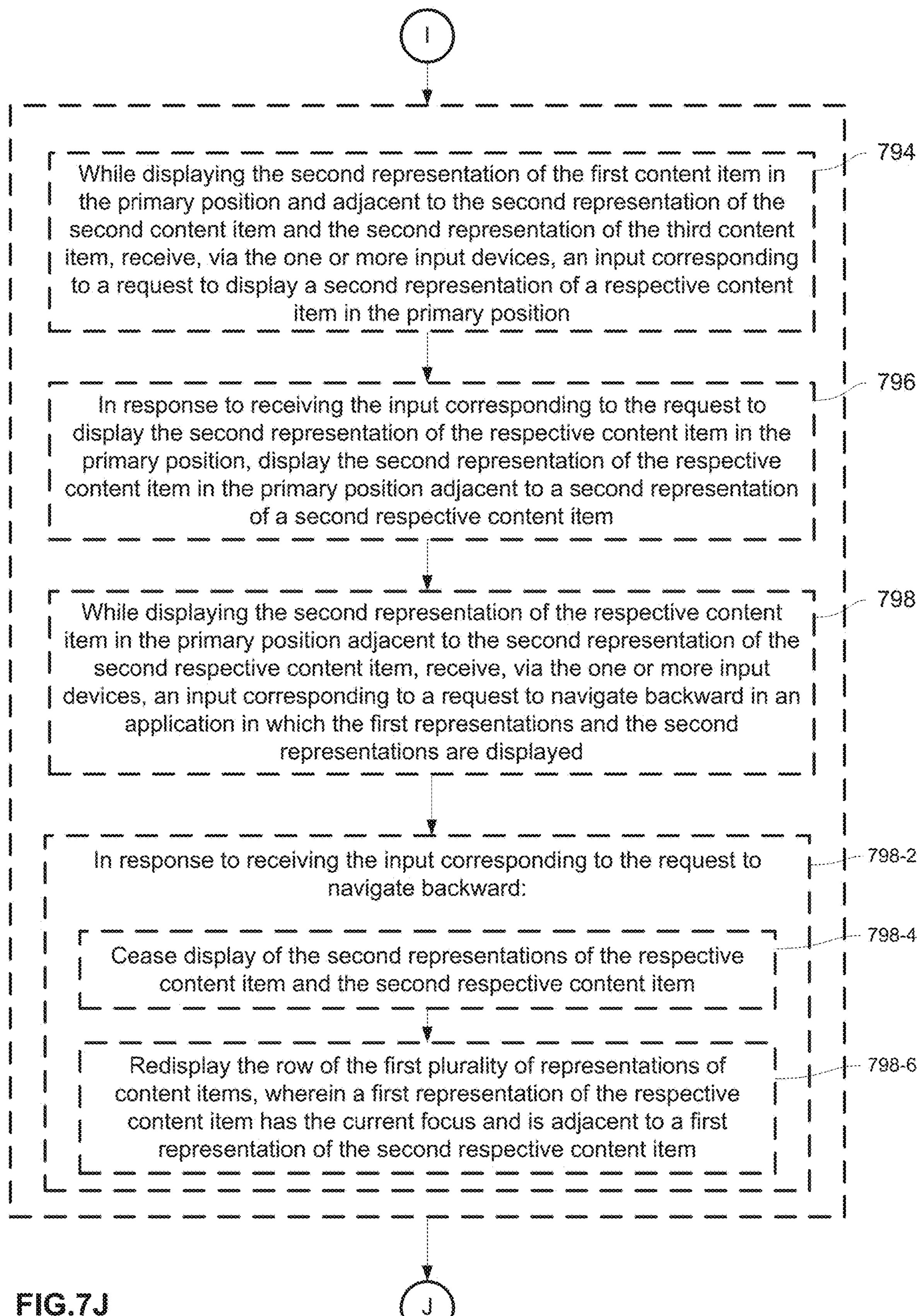
Figure 7L:
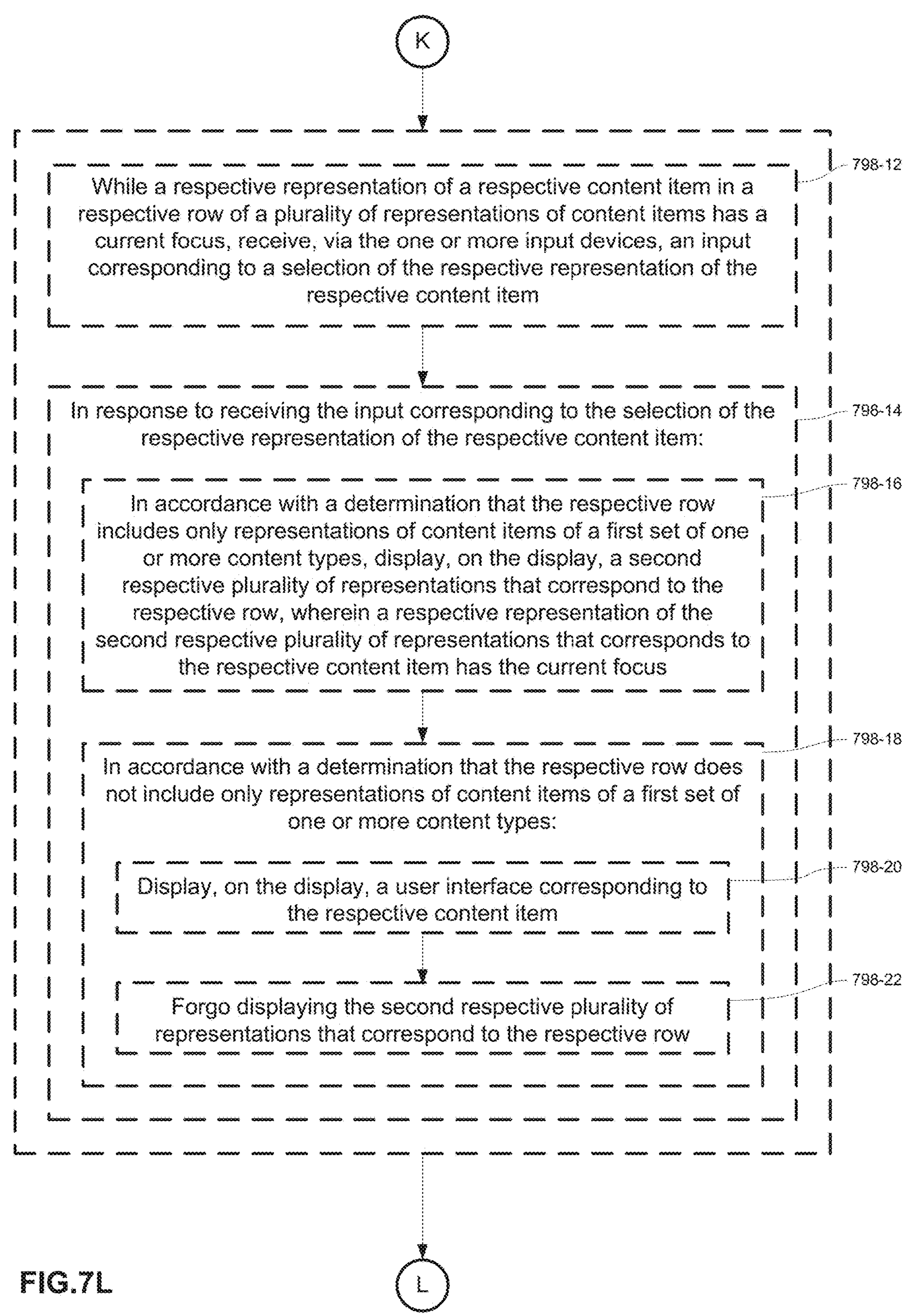
Figure 7M:
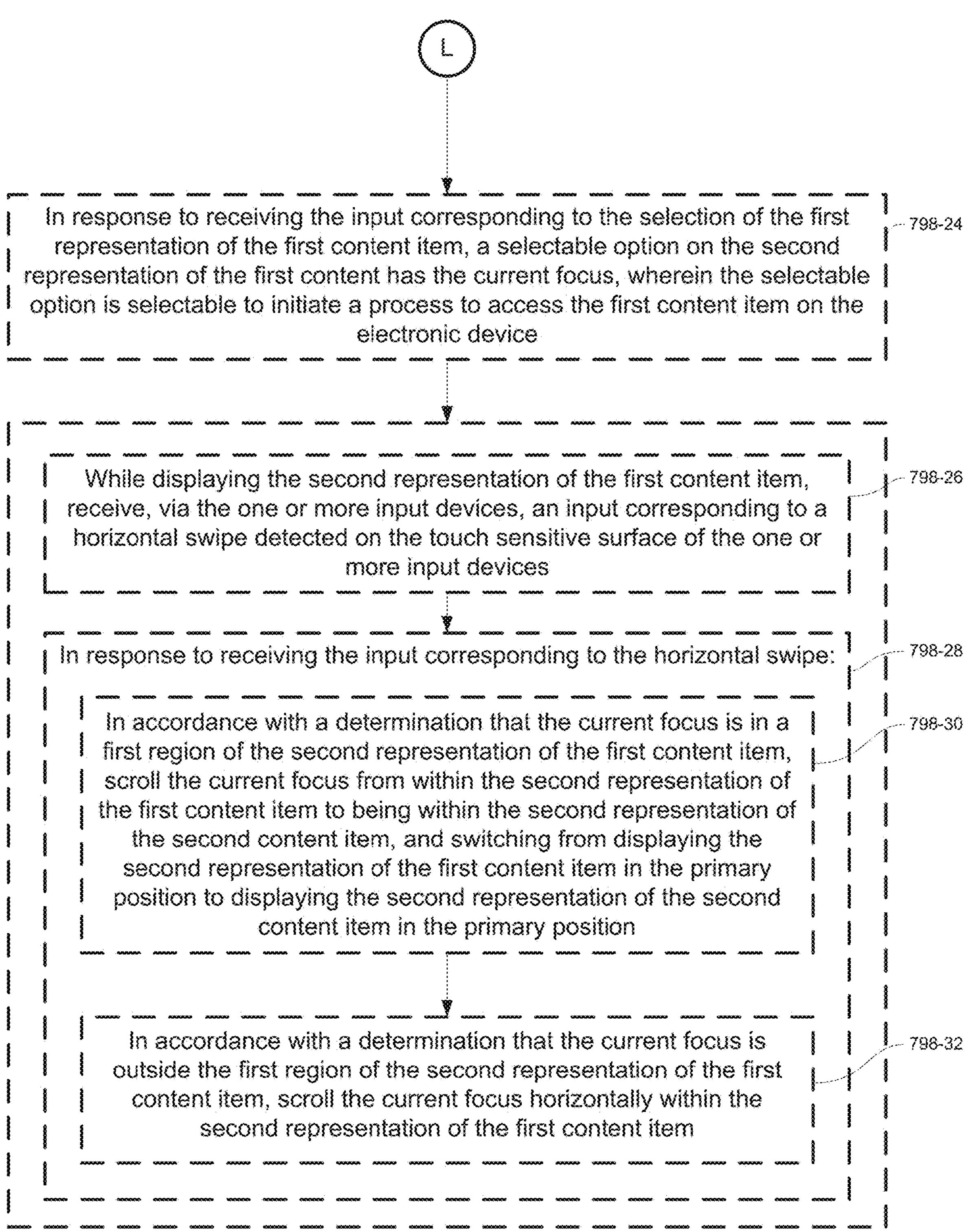

FIGS. 6A-6Z illustrate exemplary ways in which an electronic device 500 presents representations of items of content available for playback on the electronic device 500 in accordance with some embodiments of the disclosure. The embodiments in these figures are used to illustrate the processes described below, including the processes described with reference to FIGS. 7A-7M.

FIGS. 6A-6M illustrate the presentation of first and second representations of items of content on the electronic device 500 and ways in which the electronic device 500 facilitates browsing the items of content with the first and second representations. The electronic device 500 presents a plurality of first representations of content in a media browsing application user interface that enables the user to quickly view multiple representations of content to facilitate browsing. In response to selection of one of the first representations, the electronic device 500 presents a second, larger representation of the selected item of content that includes further information about the item of content. The larger representations of items of content are horizontally scrollable in the same row that the first representations of items of content were presented in, allowing the user to continue to browse while viewing more detailed information about each item of content. This design allows the user to quickly browse the items of content with less information about each item of content with the first representations or more slowly browse the items of content with more information about each item of content with the second representations. Presenting the second representations in an ordered row that has the same order as the row in which the first representations are presented provides continuity between the first and second representations of the arrangement of items of content within rows of the representations.

In FIG. 6A, the electronic device 500 presents a user interface that includes a plurality of rows 602*a-d* of first representations of items of content. The representations include representations of collections of episodic content (e.g., television shows) and, in row 602*c*, representations of people involved in creating content. The first representations of items of content are selectable to present second representations of items of content or user interfaces specific to the selected item of content, as will be described in more detail below. The representations of people are selectable to present representations of items of content the selected person was involved in creating. As shown in FIG. 6A, the user scrolls (e.g., with contact 603) horizontally across row 602*b*. In response to the user's scrolling, the electronic device 500 moves the current focus in accordance with movement of contact 603.

As shown in FIG. 6B, in response to the user input, the electronic device 500 moves the current focus within row 602*b* from a representation of "TV Show B" to a representation of "TV Show C". The user selects (e.g., with contact 603) the first representation of "TV Show C". In response to the user's selection, the electronic device 500 presents a second representation of TV Show C, as will be shown in FIG. 6C.

FIG. 6C illustrates a second representation 604*c* of an item of content that is presented in response to the user's selection in FIG. 6B. The representation 604*c* of the item of content is presented with partial representations 604*b* and 604*d* of other items of content in the user interface. The representation 604*c* of the item of content includes a selectable option 606*b* for initiating a process to play the content, a selectable option 608*b* to add the item of content to a content queue of the electronic device 500, a text description 612*b* of the content, and an indication 610*b* of the means with which the electronic device 500 accesses the content.

The selectable option 606*b* for initiating playback of the content, when selected, causes the electronic device 500 to play the content if the electronic device 500 is entitled to the content (e.g., has purchased or rented the content from a content store, is subscribed to a channel or provider that provides access to the content, etc.) or initiates a process for gaining access to the content (e.g., purchasing or renting the content from the content store or subscribing to the channel or provider). The selectable option 606*b* is presented in accordance with one or more steps of method 900.

The selectable option 608*b* for adding the content to a playback queue of the electronic device 500 optionally includes an icon representing the playback queue. For example, the option 608*b* includes an icon representing adding an item to a list and the text "Up Next."

The description 612*b* of the content optionally includes two columns of information. The first column includes information such as title, release date, rating, genre, language and accessibility information, and the like. The second column includes information about the cast and crew that created the content.

As shown in FIG. 6C, the second representation 604*c* of the item of content includes a video trailer as the background of the representation 604*c*. When the representation 604*c* is initially presented, the electronic device 500 presents an image that represents the collection of episodic content and, after a predetermined amount of time (e.g., 3, 5, or 10 seconds), the electronic device 500 plays the video trailer. If the user has viewed the trailer or the content previously, the trailer is not presented and an image representing the content is presented instead. If the content item is not yet available from the content provider (e.g., the content item is "coming soon"), then the electronic device 500 presents the image related to the content series, followed by the trailer, every time the user views the representation 604*c* of the item of content, even if the user has watched the trailer before. The selectable options 606*b* and 608*b* and information 612*b* are overlaid on a portion of the video trailer that has a different visual appearance from the video trailer itself, such as a blurred, reflected, faded, and/or otherwise modified version of the trailer.

As shown in FIG. 6C, the user scrolls (e.g., with contact 603) down. In response to the user's scrolling, the electronic device 500 moves the current focus in accordance with the movement of contact 603. As shown in FIG. 6D, in response to the user input, the electronic device 500 moves the current focus to the selectable option 608*b*. The user scrolls (e.g., with contact 603) horizontally in the user interface. In response to the user's scrolling, the electronic device 500 scrolls the row of second representations 604*b-d* of items of content in accordance with movement of contact 603.

FIGS. 6E-6F illustrate the animation of scrolling the representations 604*b-c* in response to the user's input. As shown in FIGS. 6E-6F, the representation 604*c* moves to the left to reveal, from underneath the representation 604*c*, a representation 604*d* of another item of content. While presenting the animation, the representation 604*c* moves a distance the same as or equal to the width of representation 604*c* and the representation 604*d* moves a shorter distance to create an animation of the representation 604*c* moving to reveal the representation 604*d.*

As shown in FIG. 6G, the representation 604*d* includes the same respective components of representation 604*c*. The electronic device 500 presents the representation 604*d* with the current focus on selectable option 606*d* even though the current focus had been on selectable option 608*b* when the horizontal swipe was received in FIG. 6D. Returning to FIG. 6D, the electronic device 500 presents a video trailer in the background of representation 604*d* because the user has not yet viewed the content or not yet viewed the trailer. If the user had already viewed the content or the trailer, a still image representing the content would be presented instead of the video trailer. While the video trailer of "TV Show D" is playing in the background of representation 604*d*, the electronic device 500 detects an upward swipe (e.g., movement of contact 603) on the input device 510. In response to the user input, the electronic device 500 presents the video trailer in a full screen mode. If the electronic device 500 were presenting representation 604*d* without presenting the video trailer, as described above, an upward swipe input received while the current focus is on selectable option 606*d* would not cause the electronic device 500 to perform an action.

FIG. 6H illustrates presentation of the video trailer 614*a* in a full screen mode in response to the upward swipe illustrated in FIG. 6G. The video trailer 614*a* includes portions 614*b* that had been cropped out while the video trailer was presented as the background of representation 604*c*. The full screen mode further includes cropping bars 614*c* that change the aspect ratio of the available display 514 area to match the aspect ratio of the video trailer 614*a*. While in the full screen mode, the electronic device 500 plays the audio content of the trailer. While presenting the second representation 604*d* of the item of content, the electronic device 500 optionally presents the video trailer without sound. As shown in FIG. 6H, while presenting the video trailer in the full screen mode, the electronic device 500 detects a downward swipe input (e.g., movement of contact 603). In response to the user's input, the electronic device 500 exits the full screen mode and continues to play the trailer within the representation 604*d* of the item of content, as shown in FIG. 6I.

FIG. 6I illustrates the presentation of the representation 604*d* of the item of content in response to the user's input illustrated in FIG. 6H. The video trailer continues playing in the background of the representation 604*d* of the item of content. While the electronic device 500 plays the video trailer, the electronic device 500 detects selection (e.g., with contact 603) of a play/pause button on input device 510. In response to the user's input, the electronic device 500 pauses the video trailer, as shown in FIG. 6J.

As shown in FIG. 6J, while presenting the representation 604*d* of the item of content, the electronic device 500 detects selection (e.g., with contact 603) of the play/pause button. In response to the user's input, the electronic device 500 resumes playing the video trailer, as shown in FIG. 6K.

As shown in FIG. 6K, while presenting the representation 604*d*, the electronic device 500 detects a swipe input (e.g., movement of contact 603) at the input device 510. In response the input, the electronic device 500 moves the current focus in accordance with the movement of contact 603.

As shown in FIG. 6L, in response to the user's input illustrated in FIG. 6K, the electronic device 500 moves the current focus from selectable option 606*d* to selectable option 608*d*. As shown in FIG. 6L, the electronic device 500 detects another swipe input (e.g., movement of contact 603). In response to the swipe input, the electronic device 500 presents an animation of a transition to show a product page user interface specific to the item of content, as shown in FIGS. 6M-6N.

FIG. 6M illustrates an animation of scrolling the second representation to reveal the product page user interface illustrated in FIG. 6N.

FIG. 6N illustrates a product page user interface specific to an item of content. While presenting the product page user interface, the electronic device 500 pauses the video trailer of the content (e.g., if a downward swipe is detected that causes the current focus to move below option 608*d* on the product page while the trailer is playing, the device pauses playback of the trailer and expands the product page user interface as shown in FIGS. 6M-6N to become a full screen product page).

The product page user interface includes an indication 616 of the title of the content, a row 618 of representations of seasons of the content, a row 620 of representations of episodes of the content, a row 622 of descriptions of the episodes of the content, and a row 624 of bonus content. The descriptions of episodes in row 622 include the title of the episode, the text about the episode, the original air date of the episode, and other information about the episode. In some embodiments, rows 620 and 622 include a peek of the next representations 620 and 622 of another episode and information about the episode. The remainder of the product page is presented in accordance with method 1100. While displaying the product page user interface, in response to detecting a horizontal swipe, the electronic device 500 moves the current focus (e.g., from one item in row 620 to another item row 620) in accordance with the swipe input, as opposed to navigating to a representation or product page related to a different item of content. As shown in FIG. 6N, the electronic device 500 detects an upward swipe (e.g., movement of contact 603). In response to the user's input, the electronic device 500 presents the representation 604*d* of the content and resumes playing the video trailer in the background of the representation 604*d.*

After the user swipes up from the product page user interface, as shown in FIG. 6N, the electronic device 500 resumes playing the video trailer. Once the video trailer is finished playing, the electronic device 500 presents an image in the background of representation 604*d*, as shown in FIG.

6O. The electronic device 500 detects selection (e.g., with contact 603) of the "Menu" button at the input device 510. In response to the user input, the electronic device 500 presents the user interface including the multiple rows of first representations of items of content, as shown in FIG. 6P.

FIG. 6P illustrates the user interface including rows 602*a-d* of representations of items of content. As shown in FIG. 6P, when the electronic device 500 presents the user interface, the current focus is on a representation of the same content item that was represented by representation 604*d* that was presented when the user input was received. The user selects (e.g., with contact 603) the representation in row 602*b* and, in response to the user's selection, the electronic device 500 presents the representation 604*d* again, as shown in FIG. 6Q.

FIG. 6Q illustrates presentation of the representation 604*d* of the item of content. While presenting the representation 604*d* of the item of content, the electronic device 500 detects a leftward swipe input (e.g., movement of contact 603) at input device 510. In response to the user's input, the electronic device 500 scrolls the representations 604 of the items of content.

As shown in FIGS. 6R and 6S, the user continues to scroll through the representations of items of content. As the user scrolls through the items of content, as shown in FIGS. 6Q-S, the electronic device 500 presents an animation similar to the animation illustrated in FIGS. 6E-6F.

As shown in FIG. 6T, the electronic device 500 presents a representation 604*g* of an item of content. The item of content was not presented in full in the row 602*c* of representations of items of content illustrated in FIG. 6P. As shown in FIG. 6T, the electronic device 500 detects selection (e.g., with contact 603) of the "Menu" button on the input device 510. In response to the user input, the electronic device 500 presents the user interface including the plurality of rows 602*a-d* of representations of items of content, as shown in FIG. 6U.

FIG. 6U illustrates the user interface that includes the plurality of rows 602*a-d* of representations of items of content. The user interface is presented with the current focus on a representation in row 602*b* that represents the item of content represented by representation 604*g* that was presented when the user input to navigate backward was received. The row 602*b* of representations is scrolled such that the representation with the current focus is presented at the start of the row 602*b*. As shown in FIG. 6U, the user swipes (e.g., with movement of contact 603) to move the current focus rightward along row 602*b*.

As shown in FIG. 6V, in response to the user input in FIG. 6U (and possibly additional swipe inputs), the electronic device 500 moves the current focus to a different representation in row 602*b* that is at the end of the row 602*b*. The user selects (e.g., with contact 603) the representation. In response to the user's selection, the electronic device 500 presents a second representation of the item of content, as shown in FIG. 6W.

As shown in FIG. 6W, the electronic device 500 presents a second representation 604*y* of the representation of content and a portion of a representation 604*x* of another item of content. Representation 604*y* includes the same components as representation 604*c* described above with reference to FIG. 6C. The user interface illustrated in FIG. 6W does not include a representation of an item of content to the right of representation 604*y* because the item of content represented by the representation 604*y* was presented at the end of row 602*b*, as shown in FIG. 6V. As shown in FIG. 6W, the user selects (e.g., with contact 603) the "Menu" button of the input device 510. In response to the user's selection, the electronic device presents the user interface illustrated in FIG. 6X.

As shown in FIG. 6X, the user interface includes the rows 602*a-d* of representations of items of content with the current focus on a representation that represents the same item of content represented by the representation 604*y* illustrated in FIG. 6W. As shown in FIG. 6X, the user swipes (e.g., with contact 603) down to move the current focus to row 602*c*.

As shown in FIG. 6Y, the electronic device 500 moves the current focus to an item of content in row 602*c*. Rows 602*c* includes representations of items of content that are collections of episodic content as well as representations of people who create content. The user selects (e.g., with contact 603) the representation in row 602*c* that has the current focus. In response to the user's selection, the electronic device presents a product page user interface specific to the item of content illustrated in FIG. 6Z.

FIG. 6Z illustrates a product page user interface presented in response to the user's selection in FIG. 6Y. The electronic device presents the product page user interface instead of a second representation of the item of content (e.g., such as was shown in response to selection of representations in row 602*b*) because row 602*c* includes representations that are not items of content (e.g., are not movies or TV shows). As shown in FIG. 6Y, the row 602*c* includes representations of people (e.g., actors and directors). In some embodiments, rows of representations include other non-content items such as representations of text, representations of channels or applications that provide access to content, representations of collections or compilations of content, representations of one or more settings of the media browsing application, and the like. Although FIG. 6Z illustrates an image representing the content as the background of the product page user interface, if the user has not yet interacted with the content (e.g., viewed the content or viewed a video trailer of the content), after a predetermined amount of time (e.g., 3, 5, or 10 seconds), the electronic device 500 presents a video trailer of the item of content in the background of the product page user interface. The product page user interface includes components similar to the representation 604*c* described above with reference to FIG. 6C.

FIGS. 7A-7M are flow diagrams illustrating a method of presenting representations of items of content available for playback on the electronic device 500 in accordance with some embodiments of the disclosure. The method 700 is optionally performed at an electronic device such as device 100, device 300, device 500, device 501, device 510, and device 511 as described above with reference to FIGS. 1A-1B, 2-3, 4A-4B and 5A-5C. Some operations in method 700 are, optionally combined and/or order of some operations is, optionally, changed.

As described below, the method 700 provides ways to present representations of items of content available for playback on the electronic device 500. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6B, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510 displays (702), on the display, a row 602*b* of a first plurality of representations of content items (e.g., movies, TV shows, TV episodes) available on the electronic device 500, including a first representation of a first content item (e.g., "TV Show C") adjacent to a first representation of a second content item (e.g., "TV Show B") and a first representation of a third content item (e.g., "TV Show D") (e.g., an image and/or text that corresponds to the respective content item), wherein the first plurality of representations of content items are displayed at a first size, and the first representation of the first content item is displayed with first information corresponding to the first content item, such as an image and a title of the content item. In some embodiments, the first size is a size at which a number (e.g., 3, 4, 5, 6, etc.) of content items are concurrently presented in a row of a user interface of the electronic device. In some embodiments, the first representation includes a title of the content, text or an image indicating a channel that provides the content, text or an image indicating playback position of the content, an indication that the content is live, an indication that the user has a subscription that enables the electronic device to present the content, etc. For example, the electronic device presents a user interface that includes a plurality of rows of representations of content, including a row that has the first plurality of representations of content items.

In some embodiments, such as in FIG. 6B, while the first representation of the first content item has a current focus, the electronic device 500 receives (704), via the one or more input devices 510, an input corresponding to a selection (e.g., with contact 603) of the first representation of the first content item.

In some embodiments, such as in FIG. 6C, in response to receiving the input, the electronic device 500 displays (706), on the display 514, a second plurality of representations 604*b-d* of a subset of the content items. In some embodiments, the representations include a representation of the first content item and representations or parts of representations of content items to the side (or sides) of the representation of the first content item.

In some embodiments, such as in FIG. 6C, the second plurality of representations 614*b-d* of the subset of the content items includes a second representation 604*c* of the first content item adjacent to a second representation 604*b* of the second content item and a second representation 604*d* of the third content item (708). In some embodiments, only part of the second representation of the second content item and part of the second representation of the third content item are presented. For example, the second representation of the first content item is presented in the middle of the display and is shown in its entirety, whereas the second representation of the second content item and the second representation of the third content item are only partially shown.

In some embodiments, such as in FIG. 6C, the second representation 604*c* of the first content item is displayed in a primary position (710). The second representation of the first content item is optionally presented in between the second representations of the second and third content items. In some embodiments, while in the primary position, one or more selectable options related to the first content item and information about the first content item that are included in the second representation of the first content item are fully visible on the display. In some embodiments, while presenting the second representations of the first, second, and third content items, one of the selectable options included in the second representation of the first content item has the current focus of the electronic device. In response to detecting a user input corresponding to a selection, the electronic device optionally performs an action with respect to the second representation of the first content item (e.g., initiating process to play the first content item).

In some embodiments, such as in FIG. 6C, the second plurality of representations 604*b-d* is displayed at a second size, larger than the first size (712). The second size is optionally large enough such that there is not enough room for the second representation of the second content item and the second representation of the third content item to be displayed in their entirety.

In some embodiments, such as in FIG. 6C, the second representation 604*c* of the first content item is displayed with the first information and second information 606*b*-612*b*, different than the first information, corresponding to the first content item (714). In some embodiments, the second representation includes additional information about the first content item, such as multiple ways to access the content, a text description of the content, a trailer of the content, an image of the content not included in the first representation, etc. For example, while presenting a user interface that includes multiple rows of first representations of content that are sized to allow a plurality of representations to be displayed in their entirety in each row, the electronic device detects selection of one of the representations. In response to detecting selection of one of the representations, the electronic device optionally presents a second representation of the selected item of content and portions of representations of other items of content. In some embodiments, the second representations of the items of content are a size that is large enough that only the representation of the first item of content is displayed in its entirety.

The above-described manner of presenting the second representation of the first content item including second information and the first information allows the electronic device to present additional information about a content item while enabling the user to continue to browse content (e.g., by presenting the second representations of the second and third content items while presenting the second representation of the first content item), which simplifies the interaction between the user and the electronic device and enhances the operability of the electronic device and makes the user-device interface more efficient (e.g., by reducing the user inputs needed to switch between a user interface for browsing content and a user interface for presenting the second information), which additionally reduces power usage and improves battery life of the electronic device by enabling the user to use the electronic device more quickly and efficiency.

In some embodiments, such as in FIG. 6C, in response to receiving the input corresponding to the selection of the first representation of the first content item, the electronic device 500 plays (716) (e.g., automatically playing, without further user input), in the second representation 604*c* of the first content item, a video trailer corresponding to the first content item in a background of the second representation 604*c* of the first content item. While the trailer is playing, the second information is optionally overlaid on a portion of the trailer that is presented with a blurred and/or mirrored visual effect.

The above-described manner of presenting the video trailer in the background of the second representation allows the electronic device to refrain from playing the trailer while the first representations of the items of content are being presented, which reduces power usage and improves battery life of the electronic device by conserving computing resources while the user is browsing the items of content with the first representations of content.

In some embodiments, such as in FIG. 6G, while displaying the second representation 604*d* of the first content item (e.g., and while the current focus is on a selectable element that is at the top of the second representation), the electronic device 500 receives (718), via the one or more input devices 510, an input corresponding to an upward swipe detected on a touch sensitive surface of the one or more input devices 510 (e.g., or a tap in an upper section of the touch sensitive surface). In some embodiments, such as in FIG. 6H, in response to receiving the input corresponding to the upward swipe (720): in accordance with a determination that the video trailer is playing in the second representation 604*d* of the first content item (722): the electronic device 500 ceases (724) display of the second representation 604*d* of the first content item; and continues (726) playback of the video trailer in a full screen mode, such as in FIG. 6H. In some embodiments, in accordance with a determination that the video trailer is not playing in the second representation 604*d* of the first content item, the electronic device forgoes (728) ceasing the display of the second representation of the first content item. In some embodiments, the video trailer is playing in the background of the second representation of the first content item. In some embodiments, ceasing the display of the second representations further includes ceasing display of the second representations of the second and third content items. When the current focus is not on the selectable element that is at the top of the second representation, the electronic device optionally moves the current focus up in response to detecting the upward swipe, regardless of whether or not the video trailer is playing in the background of the second representation of the first content item. In some embodiments, when the video trailer is not playing in the second representation of the first content item and the current focus is on the selectable element at the top of the second representation, in response to the upward swipe, the electronic device takes no action.

The above-described manner of presenting the video trailer in the full screen mode in response to an upward swipe that is detected while the second representation of the first content item is displayed allows the electronic device to conserve display area for the first and second information and selectable options of the second representation until the upward swipe is received, which simplifies the interaction between the user and the electronic device and enhances the operability of the electronic device and makes the user-device interface more efficient (e.g., by enabling the user to view the information, selectable options, and trailer at the same time until the user decides to enter an input to view the trailer full screen), which additionally reduces power usage and improves battery life of the electronic device by enabling the user to use the electronic device more quickly and efficiency, such as by reducing the number of inputs needed to view the first and second information and selectable options while viewing the trailer in the second representation of the first content item.

In some embodiments, playing the video trailer in the second representation 604*d*, such as in FIG. 6G, comprises playing the video trailer without audio, and playing the video trailer 614*a* in the full screen mode, such as in FIG. 6H, comprises playing the video trailer with audio (730). In some embodiments, in response to detecting the upward swipe while playing the video trailer in the second representation of the first item of content, the electronic device presents the audio of the video trailer with the video trailer in the full-screen mode.

The above-described manner of presenting the video trailer without audio in the second representation of the first content item and presenting the video trailer with audio in the full-screen mode allows the electronic device to conserve computing resources while presenting the second representation of the first content item by forgoing playing the audio of the video content in the second representation of the first content item, which reduces power usage and improves battery life of the electronic device by enabling the user to use the electronic device more quickly and efficiency.

In some embodiments, such as in FIG. 6G, playing the video trailer in the second representation 604*d* comprises playing the video trailer with first aspect ratio characteristics, and playing the video trailer 614*a* in the full screen mode, such as in FIG. 6H, comprises playing the video trailer 614*d* with second aspect ratio characteristics, different than the first aspect ratio characteristics (732). In some embodiments, while playing the video trailer in the second representation of the first content item, the video trailer is played with an aspect ratio that fits the region of the second representation in which the trailer is to be played. The region in which the video trailer is to be played optionally does not include areas of the display where the first and second information of the second representation of the first content item are displayed and regions of the display where the second representations of the second and third content items are displayed. The electronic device optionally crops the video trailer while playing the video trailer in the second representation of the first content item. In some embodiments, when the video trailer is playing in the full-screen mode, the video trailer is presented with no cropping. While playing the video trailer in full-screen mode, the display optionally includes regions of black bars if the display aspect ratio is different from the aspect ratio of the video trailer.

The above-described manner of presenting the video trailer with a first aspect ratio in the second representation of the first content item and presenting the video trailer with a second aspect ratio in the full screen mode allows the electronic device to present the video trailer in a predetermined region of the second representation of the first content item that allows the electronic device to concurrently present the video trailer with the first and second information in the second representation of the first content item and the second representations of the first content item and second content item, which simplifies the interaction between the user and the electronic device and enhances the operability of the electronic device and makes the user-device interface more efficient (e.g., by enabling the user to concurrently view the trailer, the first and second information, and the second representations of the second and third content items without navigating between different user interfaces), which additionally reduces power usage and improves battery life of the electronic device by enabling the user to use the electronic device more quickly and efficiency.

In some embodiments, such as in FIG. 6H, while displaying the video trailer 614*a* in the full screen mode, the electronic device 500 receives (734), via the one or more input devices 510, an input corresponding to a downward swipe detected on the touch sensitive surface of the one or more input devices 510 (e.g., or a tap in a lower region of the touch sensitive surface). In some embodiments, such as in FIG. 6I, in response to receiving the input corresponding to the downward swipe (736), the electronic device 500 ceases (738) playback of the video trailer in the full screen mode, displays (740) the second representation 604*d* of the first content item, and continues (742) playback of the video trailer as the background in the second representation 604*d* of the first content item. In some embodiments, the video trailer continues to play from the same playback position the video trailer had reached when the downward swipe was received. In some embodiments, the audio portion of the video trailer continues to play or ceases playing after the downward swipe was received.

The above-described manner of presenting the video trailer in the second representation of the first content item in response to a downward swipe that is received while the video trailer is playing in the full screen mode allows the electronic device to continue playing the trailer while also presenting the first and second information and the second representations of the second and third content items, which simplifies the interaction between the user and the electronic device and enhances the operability of the electronic device and makes the user-device interface more efficient (e.g., by enabling the user to concurrently view the trailer, the first and second information, and the second representations of the second and third content items), which additionally reduces power usage and improves battery life of the electronic device by enabling the user to use the electronic device more quickly and efficiency.

In some embodiments, such as in FIG. 6B, while the second representation 604*c* of the first content item is not displayed on the display, the electronic device 500 receives (742), via the one or more input devices 510, an input (e.g., contact 603) corresponding to a request to display the second representation 604*c* of the first content item. In some embodiments, the input includes selection of the first representation of the first item of content or a directional swipe towards the second representation of the first item of content while displaying the second representation of the second or third item of content. In some embodiments, such as in FIG. 6C, in response to receiving the input corresponding to the request to display the second representation 604*c* of the first content item, the electronic device 500 displays (744), on the display 514, the second representation 604*c* of the first content item. In some embodiments, such as in FIG. 6C, in accordance with a determination that the video trailer corresponding to the first content item has not been played back in the past, the electronic device 500 plays (746) (e.g., automatically playing, without further user input), in the second representation 604*c* of the first content item, the video trailer corresponding to the first content item in the background of the second representation 604*c* of the first content item. The first and second information included in the second representation of the first content item is optionally displayed overlaid on the video trailer of the first content item. In some embodiments, such as in FIG. 6O, in accordance with a determination that the video trailer corresponding to the first content item has been played back in the past, the electronic device 500 displays (748), in the second representation 604*d* of the first content item, a still image corresponding to the first content item and forgoes (748) playing, in the second representation 604*d* of the first content item, the video trailer corresponding to the first content item. That is to say, the user interface presented in FIG. 6O would be presented each time the user requests to view the second representation 604*d* of "TV Show D" after having already viewed the video trailer of "TV Show D". In some embodiments, the electronic device forgoes presenting the video trailer of the first content item if the video trailer has previously been played back in full. In some embodiments, the electronic device forgoes presenting the video trailer of the first content item if the video trailer has previously been played back in part.

The above-described manner of forgoing playing the video trailer of the first content item if the video trailer has previously been presented allows the electronic device to conserve resources if the trailer has already been presented (e.g., by forgoing playing the video trailer if it has already been presented previously), which reduces power usage and improves battery life of the electronic device by enabling the user to use the electronic device more quickly and efficiency.

In some embodiments, such as in FIG. 6I, while displaying the video trailer in the second representation 604*d* of the first content item, the electronic device 500 receives (750), via the one or more input devices 510, a respective input (e.g., an input (e.g., a contact, a swipe, or a selection) detected on a touch-sensitive surface of an input device or selection of a button on an input device). In some embodiments, such as in FIG. 6J, in response to receiving the respective input (752), in accordance with a determination that the video trailer is currently playing in the second representation 604*d* of the first content item and the respective input is a pause input (e.g., selection of a play/pause button on the input device), the electronic device 500 pauses (756) playback of the video trailer in the second representation 604*d* of the first content item. In some embodiments, the paused frame of the video trailer continues to be presented in the background of the second representation of the first content item. In some embodiments, such as in FIG. 6J, in accordance with a determination that the video trailer is currently paused in the second representation 604*d* of the first content item and the respective input is a play input (e.g., selection of the play/pause button on the input device), the electronic device 500 resumes (758) playback of the video trailer in the second representation 604*d* of the first content item. In some embodiments, the video trailer continues playing from the playback position where the video trailer was paused. The video trailer is optionally presented as the background of the second representation of the first content item. In some embodiments, the electronic device plays the first content in response to detecting selection of a selectable option to play the content, rather than playing the first content in response to the play input (e.g., selection of a play button on the input device).

The above-described manner of pausing the video trailer in response to the pause input and playing the video trailer in response to the play input allows the electronic device to enable the user to pause and play the trailer regardless of the location of the current focus in the user interface, which simplifies the interaction between the user and the electronic device and enhances the operability of the electronic device and makes the user-device interface more efficient (e.g., by reducing the number of inputs needed to play or pause the trailer), which additionally reduces power usage and improves battery life of the electronic device by enabling the user to use the electronic device more quickly and efficiency.

In some embodiments, such as in FIG. 6L, while displaying the second representation 604*d* of the first content item adjacent to the second representation 604*c* of the second content item and the second representation 604*e* of the third content item (e.g., or portions of the second representations of the second and third content items), the electronic device 500 receives (760), via the one or more input devices 510, an input corresponding to a downward swipe detected on the touch sensitive surface of the one or more input devices 510 (e.g., or a tap in a lower region of the touch sensitive surface or some other downward directional input). In some embodiments, such as in FIG. 6N, in response to receiving the input corresponding to the downward swipe (762) (e.g., and while the current focus is on a selectable element that is at the bottom of the visible portion of the second representation of the first content item), the electronic device 500 expands (764) the second representation 604*d* of the first content item to be displayed in a full screen mode and ceases (766) display of the second representation 604*c* of the second content item and the second representation 604*e* of the third content item. In some embodiments, the electronic device expands the second representation such that any edges of the second representation that were not at the edge of the display are now at the edge of the display. The electronic device optionally scrolls the second representation of the first content item to reveal third information that was not presented while the electronic device was presenting the second representations of the second and third content items.

The above-described manner of presenting the second representation of the first content item while presenting the second representations of the second and third content items before the downward swipe is detected allows the electronic device to concurrently display the second representations of the first, second, and third content items until the user enters an input to view the second representation of the first content item in the full screen mode, which simplifies the interaction between the user and the electronic device and enhances the operability of the electronic device and makes the user-device interface more efficient (e.g., by reducing the number of inputs needed to view the second representation of the first content item and browse the other content items), which additionally reduces power usage and improves battery life of the electronic device by enabling the user to use the electronic device more quickly and efficiency.

In some embodiments, such as in FIG. 6D, while displaying the second representation 604*c* of the first content item adjacent to the second representation 604*d* of the second content item and the second representation 604*b* of the third content item, the electronic device 500 receives (768), via the one or more input devices 510, an input corresponding to a horizontal swipe detected on the touch sensitive surface of the one or more input devices 510 (e.g., or a tap on a horizontal edge of the touch sensitive surface or some other horizontal directional input). In some embodiments, such as in FIGS. 6E-6G, in response to receiving the input corresponding to the horizontal swipe (770), in accordance with a determination that the horizontal swipe is in a first direction, the electronic device ceases (772) to display the second representation of the first content item 604*c* in the primary position by moving the second representation 604*c* of the first content item to reveal the second representation 604*d* of the second content item in the primary position. In some embodiments, the second representation of the first content item moves a distance that is the width of the primary position and the second representation of the second content item does not move or only moves a distance less than the width of the primary position to move to the primary position. In some embodiments, in accordance with a determination that the horizontal swipe is in a second direction, different than the first direction, the electronic device ceases (774) to display the second representation of the first content item in the primary position by moving the second representation of the first content item to reveal the second representation of the third content item in the primary position. For example, if the horizontal swipe illustrated in FIG. 6D were in the other direction, the electronic device 500 would present an animation similar to the animation illustrated in FIGS. 6E-6F to reveal the representation 604*b* of the other content item. In some embodiments, the second representation of the first content item moves a distance that is the width of the primary position and the second representation of the third content item does not move or only moves a distance less than the width of the primary position to move to the primary position. In some embodiments, while the electronic device presents the first representations of the items of content and receives a horizontal swipe or other horizontal directional input, the electronic device either moves the current focus without moving the first representations of content items or moves all of the first representations of content items in the same row together in a direction in accordance with the directional input.

The above-described manner of revealing the second representation of the second or third content item in the primary position in response to the horizontal directional input allows the electronic device to present movement of the second representations of the content items in response to the user's input while moving fewer display pixels than would be required if the second representation of the second or third content item moved a distance equal to or greater than the width of the primary position, which reduces power usage and improves battery life of the electronic device by reducing the complexity of the movement animation.

In some embodiments, such as in FIG. 6G, in response to revealing the second representation 604*d* of the second content item in the primary position, the electronic device 500 plays (776) (e.g., automatically playing, without further user input), in the second representation 604*d* of the second content item, a video trailer corresponding to the second content item in a background of the second representation 604*d* of the second content item. In some embodiments, when the second representation of the second content item is accessed by swiping horizontally from the second representation of the first content item, the trailer of the second content item plays in the second representation of the second content item. The electronic device optionally forgoes playing the trailer of the second content item if the trailer of the second content item has been previously played and/or if the second content item has previously been viewed. In some embodiments, in response to revealing the second representation of the third content item in the primary position, the electronic device plays (778) (e.g., automatically playing, without further user input), in the second representation of the third content item, a video trailer corresponding to the third content item in a background of the second representation of the third content item. For example, if the horizontal swipe illustrated in FIG. 6D were in the other direction, the electronic device 500 would present a trailer in the background of representation 604*b* in a manner similar to the presentation of the trailer in the background of representation 604*d* illustrated in FIG. 6G. In some embodiments, when the second representation of the third content item is accessed by swiping horizontally from the second representation of the first content item, the trailer of the third content item plays in the second representation of the third content item. The electronic device optionally forgoes playing the trailer of the third content item if the trailer of the third content item has been previously played and/or if the third content item has previously been viewed.

The above-described manner of playing the trailer of the second or third content item when the second representation of the second or third content item is presented allows the electronic device to reduce the number of inputs required to play the trailer of the second or third content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, such as in FIG. 6D, while a second representation 604*d* of a respective content item is not displayed on the display (or is only displayed in part), the electronic device 500 receives (780), via the one or more input devices 510, an input corresponding to a request to display the second representation 604*d* of the respective content item. For example, while the electronic device presents a plurality of first representations of content items, the electronic device detects selection of the first representation of the respective item and presents the second representation of the first content item in response. As another example, while the electronic device presents the second representation of a different content item and a portion of the second representation of the respective content item and receives a swipe input in the direction corresponding to the second representation of the respective content item, in response to the detected swipe input, the electronic device presents the second representation of the respective content item. In some embodiments, such as in FIG. 6G, in response to receiving the input corresponding to the request to display the second representation 604*d* of the respective content item (782), the electronic device 500 displays (784), on the display 514, the second representation 604*d* of the respective content item, wherein a selectable option 606*d*, in the second representation 604*d* of the respective content item, for initiating a process to display the respective content item on the display has the current focus, independent of what element had the current focus when the input corresponding to the request to display the second representation of the respective content item was received. For example, while presenting the second representation of a different content item and a portion of the second representation of the respective content item, the current focus is on a selectable element in the second representation of the different content item that is not the selectable option to play the different content item. In response to detecting the swipe input for presenting the second representation of the respective content item, the electronic device presents the second representation of the different content item and moves the current focus to a selectable option to play the respective content item that is included in the second representation of the respective content item.

The above-described manner of moving the current focus to the selectable option to play the respective item of content when the second representation of the respective item of content is displayed allows the electronic device to reduce the number of inputs needed to play the respective item of content, which simplifies the interaction between the user and the electronic device and enhances the operability of the electronic device and makes the user-device interface more efficient (e.g., by reducing the number of inputs needed to move the current focus to the selectable option to play the respective content item), which additionally reduces power usage and improves battery life of the electronic device by enabling the user to use the electronic device more quickly and efficiency.

In some embodiments, such as in FIG. 6O, while displaying the second representation 604*d* of the first content item in the primary position and adjacent to the second representation 604*c* of the second content item and the second representation 604*c* of the third content item, the electronic device 500 receives (786), via the one or more input devices 510, an input corresponding to a request to navigate backward in an application in which the first representations 602 and the second representations 604 are displayed (e.g., selection of a "back" or "menu" button on an input device or some other input corresponding to the request to navigate backward). In some embodiments, such as in FIG. 6P, in response to receiving the input corresponding to the request to navigate backward (788), the electronic device 500 ceases (790) display of the second representations 604 of the first content item, the second content item and the third content item and redisplays (792) the row 602*b* of the first plurality of representations of content items, wherein the first representation of the first content item has the current focus. For example, while displaying the second representation of the first content item, the electronic device receives an input to navigate back in the user interface. In response to the input, the electronic device optionally ceases displaying the second representations of the content item and optionally presents the row of the first plurality of representations of content items, including the first representation of the first content item with the current focus on the first reorientation of the first content item.

The above-described manner of presenting the first plurality of representations of content items with the current focus on the first representation of the first content item in response to an input to navigate backward in a user interface that is received while presenting the second representations of the content items allows the electronic device to keep the current focus on a representation of the first content item which enables the user to select the first representation of the first content item if the input to navigate backward was entered in error, which simplifies the interaction between the user and the electronic device and enhances the operability of the electronic device and makes the user-device interface more efficient (e.g., by reducing the number of inputs needed to go back to the second representation of the first content item), which additionally reduces power usage and improves battery life of the electronic device by enabling the user to use the electronic device more quickly and efficiency.

In some embodiments, such as in FIG. 6D, while displaying the second representation 604*c* of the first content item in the primary position and adjacent to the second representation 604*b* of the second content item and the second representation 604*d* of the third content item, the electronic device 500 receives (794), via the one or more input devices 510, an input corresponding to a request to display a second representation 604*d* of a respective content item in the primary position. In some embodiments, while presenting the second representations of the first, second, and third content items, the electronic device detects an input, such as a horizontal scrolling input or another horizontal directional input. In response to the input, the electronic device optionally scrolls the second representations such that one of the second representations of the second or third content items is presented in the primary position. In some embodiments, the electronic device detects further scrolling or further directional inputs to present a second representation of a different respective content item in the primary position. In some embodiments, such as in FIG. 6G, in response to receiving the input corresponding to the request to display the second representation 604*d* of the respective content item in the primary position, the electronic device 500 displays (796) the second representation 604*d* of the respective content item in the primary position adjacent to a second representation 604*c* of a second respective content item. In some embodiments, in response to the one or more horizontal scrolling or other directional inputs, the electronic device presents second representations of first and second respective content items. For example, the second representation of the first respective content item is presented in the primary position such that first and second information about the first respective content item included in the second representation of the first respective content item is visible on the display. In some embodiments, the second representation of the second content item is only partially visible on the display. In some embodiments, such as in FIG. 6O, while displaying the second representation 604*d* of the respective content item in the primary position adjacent to the second representation 604*c* of the second respective content item, the electronic device 500 receives (798), via the one or more input devices 510, an input corresponding to a request to navigate backward in an application in which the first representations 602 and the second representations 604 are displayed (e.g., an input to navigate back to the user interface that includes the first plurality of representations of content items). In some embodiments, such as in FIG. 6P, in response to receiving the input corresponding to the request to navigate backward (798-2), the electronic device 500 ceases (798-4) display of the second representations 604 of the respective content item and the second respective content item and redisplays (798-6) the row 602*b* of the first plurality of representations of content items, wherein a first representation of the respective content item has the current focus and is adjacent to a first representation of the second respective content item. When the electronic device changes which second representation of an item of content is presented on the display and receives an input to navigate back to the user interface that includes the first plurality of representations of content items, the electronic device optionally maintains current focus on a first representation of the item of content for which the second representation had been presented in the primary position when the input was received. For example, while the electronic device presents the first plurality of representations of content items, the user selects a first representation of a first content item. In response to the user's selection, the electronic device optionally presents the second representation of the first content item in the primary position. As another example, the user scrolls the second representations horizontally until a second representation of a second content item is presented in the primary position in the user interface. While the second representation of the second content item is presented in the primary position in the user interface, the electronic device optionally detects an input to navigate backward in the user interface. In some embodiments, in response to input, the electronic device presents the user interface that includes the first plurality of representations with the current focus on the first representation of the second item of content.

The above-described manner of scrolling the second representations of content items until a second representation of a respective item of content is in the primary position and then presenting the first plurality of representations of content items with the current focus on the first representation of the respective content item in response to an input to navigate backward in a user interface that is received while presenting the second representations of the content items allows the electronic device to keep the current focus on a representation of the respective content item which enables the user to select the first representation of the respective content item if the input to navigate backward was entered in error, which simplifies the interaction between the user and the electronic device and enhances the operability of the electronic device and makes the user-device interface more efficient (e.g., by reducing the number of inputs needed to go back to the second representation of the respective content item), which additionally reduces power usage and improves battery life of the electronic device by enabling the user to use the electronic device more quickly and efficiency.

In some embodiments, such as in FIG. 6P, in accordance with a determination that the first representation of the respective content item was displayed on the display in the row 602*b* of the first plurality of representations of content items when the input corresponding to the selection of the first representation of the first content item was received, such as in FIG. 6B, redisplaying the row 602*b* of the first plurality of representations of content items includes redisplaying the row of the first plurality of representations not having been scrolled (798-8). For example, the electronic device presents the first plurality of representations of content items that includes first representations of first, second, third, and fourth content items. in first positions within a row of first representations of content items. In response to detecting selection of the first representation of the first item of content, the electronic device optionally presents the second representation of the first item of content. In some embodiments, while presenting the second representation of the first item of content, the electronic device receives a user input to scroll the second representations of the content items horizontally. In response to the user's scrolling, the electronic device optionally presents a second representation of the fourth content item. In some embodiments, while presenting the second representation of the fourth content item, the electronic device detects a user input to navigate backward in the user interface. In response to the user's input, the electronic device optionally presents the first plurality of representations of content items, including the first representations of the first, second, third, and fourth content items in the first positions within the row of first representations of content items, with the current focus on the first representation of the fourth content item. In some embodiments, such as in FIG. 6U, in accordance with a determination that the first representation 602 of the respective content item was not displayed on the display in the row of the first plurality of representations of content items when the input corresponding to the selection of the first representation of the first content item was received, such as in FIG. 6P, redisplaying the row 602*b* of the first plurality of representations of content items includes redisplaying the row 602*b* of the first plurality of representations having been scrolled such that the first representation of the respective content item is at a first position in the row 602*b* (798-10). For example, the electronic device presents the first plurality of representations of content items that includes first representations of first, second, and third, content items. in first positions within a row of first representations of content items without presenting a first representation of a fourth content item that is in the same row of first representations. In response to detecting selection of the first representation of the first item of content, the electronic device optionally presents the second representation of the first item of content. In some embodiments, while presenting the second representation of the first item of content, the electronic device receives a user input to scroll the second representations of the content items horizontally. In response to the user's scrolling, the electronic device optionally presents a second representation of the fourth content item. In some embodiments, while presenting the second representation of the fourth content item, the electronic device detects a user input to navigate backward in the user interface. In response to the user's input, the electronic device optionally presents the first plurality of representations of content items, including the first representation of the fourth content item at the start (e.g., the left) of the row with the current focus on the first representation of the fourth content item.

The above-described manner of not scrolling the first plurality of representations when the first representation of the respective content item was displayed on the display in the row of the first plurality of representations when the selection of the first representation of the first content item was received and scrolling the first plurality of representations when the first representation of the respective content item was not displayed on the display in the row of the first plurality of representations when the selection of the first representation of the first content item was received allows the electronic device to continue to present a representation of the respective content item when the input to navigate backwards in the user interface is received while presenting the second representation of the respective content item, which simplifies the interaction between the user and the electronic device and enhances the operability of the electronic device and makes the user-device interface more efficient (e.g., by reducing the number of inputs required to continue viewing a representation of the respective content item), which additionally reduces power usage and improves battery life of the electronic device by enabling the user to use the electronic device more quickly and efficiency.

In some embodiments, such as in FIG. 6P, while a respective representation of a respective content item in a respective row 602*b* of a plurality of representations of content items has a current focus, the electronic device 500 receives (798-12), via the one or more input devices 510, an input corresponding to a selection of the respective representation of the respective content item (e.g., while presenting the user interface that includes the row of the first plurality of representations of content items). In some embodiments, such as in FIG. 6Q, in response to receiving the input corresponding to the selection of the respective representation 602 of the respective content item (798-14), in accordance with a determination that the respective row 602*b* includes only representations of content items of a first set of one or more content types (e.g., television shows, movies), the electronic device 500 displays (798-16), on the display, a second respective plurality of representations 604*c-e* that correspond to the respective row 602*b*, wherein a respective representation 604*d* of the second respective plurality of representations that corresponds to the respective content item has the current focus (e.g., a selectable element included in the respective second representation has the current focus). In some embodiments, such as in FIG. 6Y, in accordance with a determination that the respective row 602*c* does not include only representations of content items of a first set of one or more content types (798-18), the electronic device 500 displays (798-20), on the display 514, a user interface corresponding to the respective content item, such as in FIG. 6Z. In some embodiments, the respective row further included other types of content, such as selectable options to view information about people (e.g., actors, directors, other crew) or blocks of text that optionally describe one of the representations in the row. In some embodiments, a product page user interface including information and selectable options that when selected cause the electronic device to perform an operation with respect to the respective content item. In some embodiments, the product page user interface includes first and second information about the respective content item that corresponds to the first and second information about the first content item that is presented in the second representation of the first content item. In some embodiments, such as in FIG. 6Z the electronic device 500 forgoes (798-22) displaying the second respective plurality of representations that correspond to the respective row 602*c* (e.g., For example, while displaying the user interface including the first plurality of representations of content items, the electronic device receives a user input selecting a representation of an item of content. In some embodiments, in response to determining that the selected representation of the item of content is presented in a row that includes only representations of movies and television shows, the electronic device presents the second representation of the selected item of content and portions of one or more second representations of other items of content. In some embodiments, in accordance with a determination that the selected representation is presented in a row that includes representations of information and/or content other than television shows and movies, the electronic device presents a product page user interface of the selected item of content.

The above-described manner of presenting second representations of items of content in rows that only include content items of a type that is in the first set of one or more content types and presenting product pages corresponding to items of content presented in rows including content of types other than types in the first set of content types allows the electronic device to enable the user to continue to browse content items from the second representations when the selected representation of content is in a row of content in the first set of content types and enables the user to view information about content items that are presented in a row of content including representations of items of content that are not of a type in the first set of content types even if content of a type not in the first set of content types does not have a second representation, which simplifies the interaction between the user and the electronic device and enhances the operability of the electronic device and makes the user-device interface more efficient (e.g., by enabling the user to view information about items of content in response to selection even if the row in which the content is presented does not have second representations of the content items), which additionally reduces power usage and improves battery life of the electronic device by enabling the user to use the electronic device more quickly and efficiency.

In some embodiments, such as in FIG. 6W, in response to receiving the input corresponding to the selection of the first representation 602 of the first content item, a selectable option 606*y* on the second representation 604*y* of the first content has the current focus, wherein the selectable option 606*y* is selectable to initiate a process to access the first content item on the electronic device (798-24). If the user has access to the item of content (e.g., via a content store or a subscription to a channel or application), then in response to detecting selection of the selectable option, the electronic device optionally plays the content. In some embodiments, if the user does not have access to the item of content, the electronic device optionally initiates a process to gain access to the item of content (e.g., by initiating a process to purchase or rent the content from a content store or by subscribing to a channel that provides the content) and then, upon successfully gaining access to the content, plays the content.

The above-described manner of moving the current focus to a selectable option that, when selected, causes the electronic device to play the content in response to the selection of the first representation of the first content item allows the electronic device to reduce the number of inputs needed to play the content, which simplifies the interaction between the user and the electronic device and enhances the operability of the electronic device and makes the user-device interface more efficient (e.g., by reducing the number of inputs to move the current focus to the selectable option that, when selected, causes the electronic device to play the content), which additionally reduces power usage and improves battery life of the electronic device by enabling the user to use the electronic device more quickly and efficiency.

In some embodiments, such as in FIG. 6D, while displaying the second representation 604*c* of the first content item (e.g., and while presenting the second representations of the second and third content items and while the current focus is on a selectable option that is visible while the second representations of the second and third content items are being presented), the electronic device 500 receives (798-26), via the one or more input devices 510, an input corresponding to a horizontal swipe (e.g., or some other horizontal directional input) detected on the touch sensitive surface of the one or more input devices 510. In some embodiments, in response to receiving the input corresponding to the horizontal swipe (798-28), in accordance with a determination that the current focus is in a first region of the second representation 604*c* of the first content item, such as in FIG. 6D, the electronic device 500 scrolls (798-30) the current focus from within the second representation 604*c* of the first content item to being within the second representation 604*d* of the second content item, and switching from displaying the second representation 604*c* of the first content item in the primary position to displaying the second representation 604*d* of the second content item in the primary position, such as in FIG. 6G. In some embodiments, the current focus is on a selectable option that is visible while the second representations of the second and third content items are being presented. For example, while the current focus is on an element that appears in a top region of the second representation of the first content item that is presented while the second representations of the second and third content items are presented, the electronic device detects a horizontal swipe input that corresponds to a request to present the second representation of the second content item in the primary position. In some embodiments, in response to the input, the electronic device presents the second representation of the second content item in the primary position in the user interface and presents the second representation of the first content item in a secondary position in the user interface. In some embodiments, in accordance with a determination that the current focus is outside the first region of the second representation of the first content item, the electronic device scrolls (798-32) the current focus horizontally within the second representation of the first content item, such as receiving a horizontal swipe while presenting the user interface illustrated in FIG. 6N. In some embodiments, after the user scrolls down from the first region of the second representation, the electronic device ceases displaying the second representations of the second and third content items. For example, once the current focus is outside the first region of the second representation, the electronic device detects a horizontal directional input at an input device and moves the current focus in a direction in accordance with the horizontal directional input to an element within the second representation of the first content item.

The above-described manner of moving the focus to a different second representation if the horizontal directional input is received while the current focus is in the first region and moving the current focus within the second representation of the first content item if the horizontal directional input is received while the current focus is outside of the first region allows the electronic device to present a plurality of selectable options in a horizontal layout within the second representation of the first content outside of the first region, which simplifies the interaction between the user and the electronic device and enhances the operability of the electronic device and makes the user-device interface more efficient (e.g., by utilizing the horizontal space on the display to present more selectable options at once to reduce the number of inputs needed to see all the options), which additionally reduces power usage and improves battery life of the electronic device by enabling the user to use the electronic device more quickly and efficiency.

It should be understood that the particular order in which the operations in FIGS. 7A-7M have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, 1700, and 1900) are also applicable in an analogous manner to method 700 described above with respect to FIGS. 7A-7M. For example, the operation of the electronic device to present representations of items of content with reference to method 700 optionally has one or more of the characteristics of presenting options for accessing the content based on available means for accessing items of content, presenting representations of episodes of collections of episodic content, presenting an enhanced preview of an items of content, presenting a control panel, switching the active user of the device, and entering into a picture-in-picture mode, etc., described herein with reference to other methods described herein (e.g., methods 900, 1100, 1300, 1500, 1700, and 1900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIGS. 7A-7M are, optionally, implemented by components depicted in FIGS. 1A-1B. For example, displaying operations 702, 706, 710, 712, 714, 718, 724, 728, 734, 740, 742, 744, 748, 750, 760, 764, 766, 768, 772, 774, 780, 782, 784, 786, 790, 792, 796, 798, 798-4, 974-6, 798-8, 798-10, 798-16, 798-20, 798-22, 798-26, and 798-30, receiving operations 704, 706, 716, 718, 720, 734, 736, 742, 744, 750, 752, 760, 762, 768, 770, 782, 784, 786, 788, 794, 796, 798, 798-2, 798-10, 798-12, 798-14, 798-24, 798-26, and 798-28 and initiating operations 784 and 798-24 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selectable Options for Presenting Content

Users interact with electronic devices in many different manners, including using an electronic device to play various media items. In some embodiments, an electronic device is able to access items of content in a media browsing application through several different ways. The embodiments described below provide ways in which an electronic device presents selectable options for accessing items of content that reflect the ways in which the respective item of content is available. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8LL illustrate exemplary ways in which an electronic device 500 presents selectable options for initiating a process to access an item of content based on the available ways of accessing the content in accordance with some embodiments of the disclosure. The embodiments in these figures are used to illustrate the processes described below, including the processes described with reference to FIGS. 9A-9E.

Figure 8A:
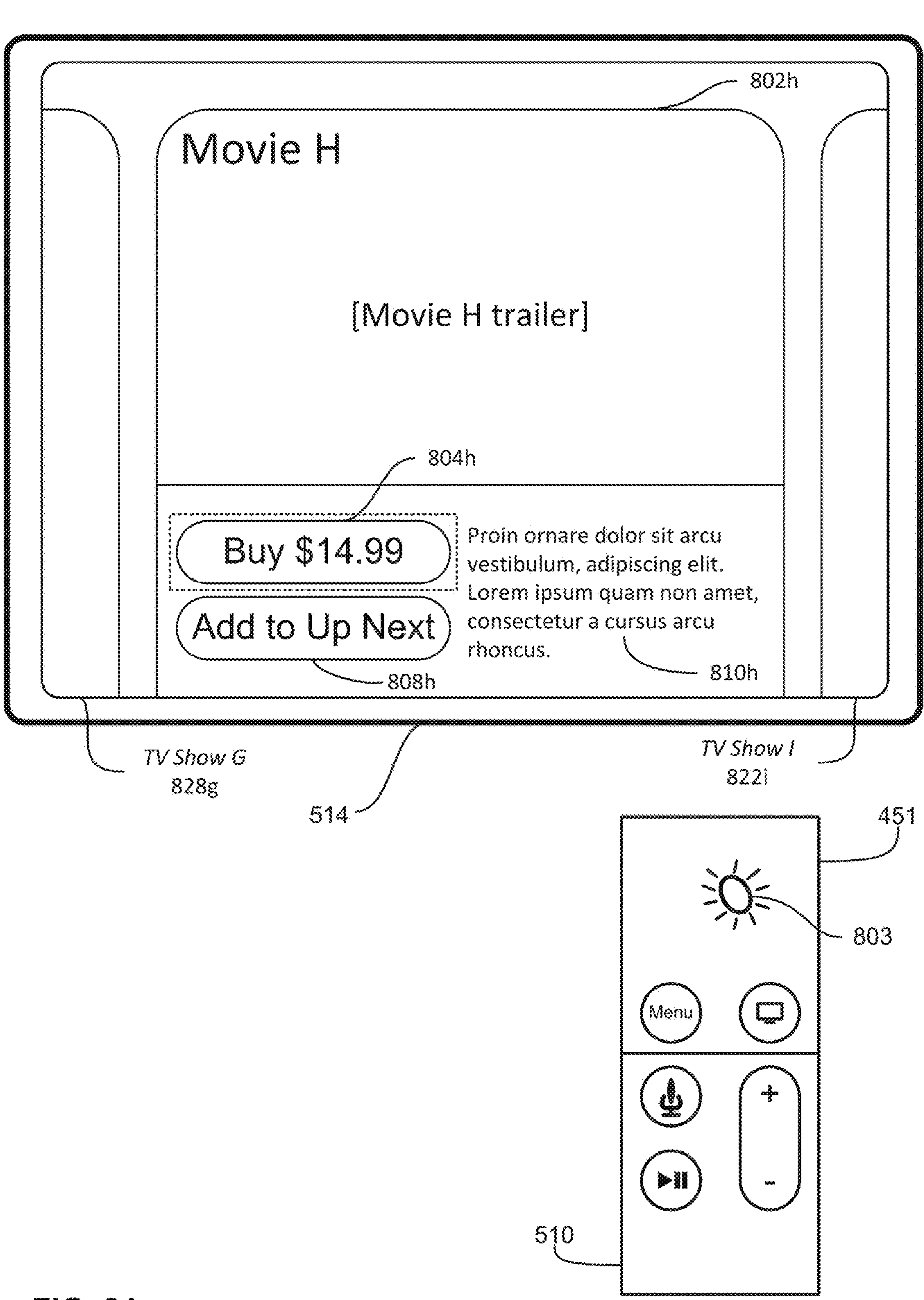
FIGS. 8A-8LL illustrate exemplary ways in which an electronic device presents selectable options for initiating a process to access an item of content based on the available ways of accessing the content in accordance with some embodiments of the disclosure.

FIGS. 8A-8F illustrate the presentation of selectable options for accessing content that is available for purchase via a content store application. FIG. 8A illustrates a representation 802*h* of an item of content. The representation 802*h* of the item of content includes a selectable option 804*h* for accessing the item of content, a selectable option 808*h* for adding the item of content to a playback queue of the electronic device 500, and information 810*h* about the item of content. The representation 802*h* and other representations 802 of items of content described with reference to FIGS. 8A-8LL are presented in accordance with one or more steps of method 700.

The information 810*h* about the item of content includes two columns of information. The first column includes information such as the content title, genre, runtime, format, languages, and accessibility options. The second column includes information about the cast and crew of the content.

The selectable option 808*h* for adding the content to a playback queue of the electronic device 500 is optionally presented with an icon that represents adding an item of content to the queue with the words "Up Next".

The item of content represented by representation 802*h* is a movie that is available on the electronic device 500 by purchasing the movie from a content store. Thus, the electronic device 500 presents a selectable option 804*h* to initiate a process to purchase the content from the content store. As shown in FIG. 8A, while the current focus is on the selectable option 804*h*, the user makes a selection with contact 803. In response to the user's selection, the electronic device 500 initiates a process to purchase the item of content, as shown in FIG. 8B.

Figure 8B:
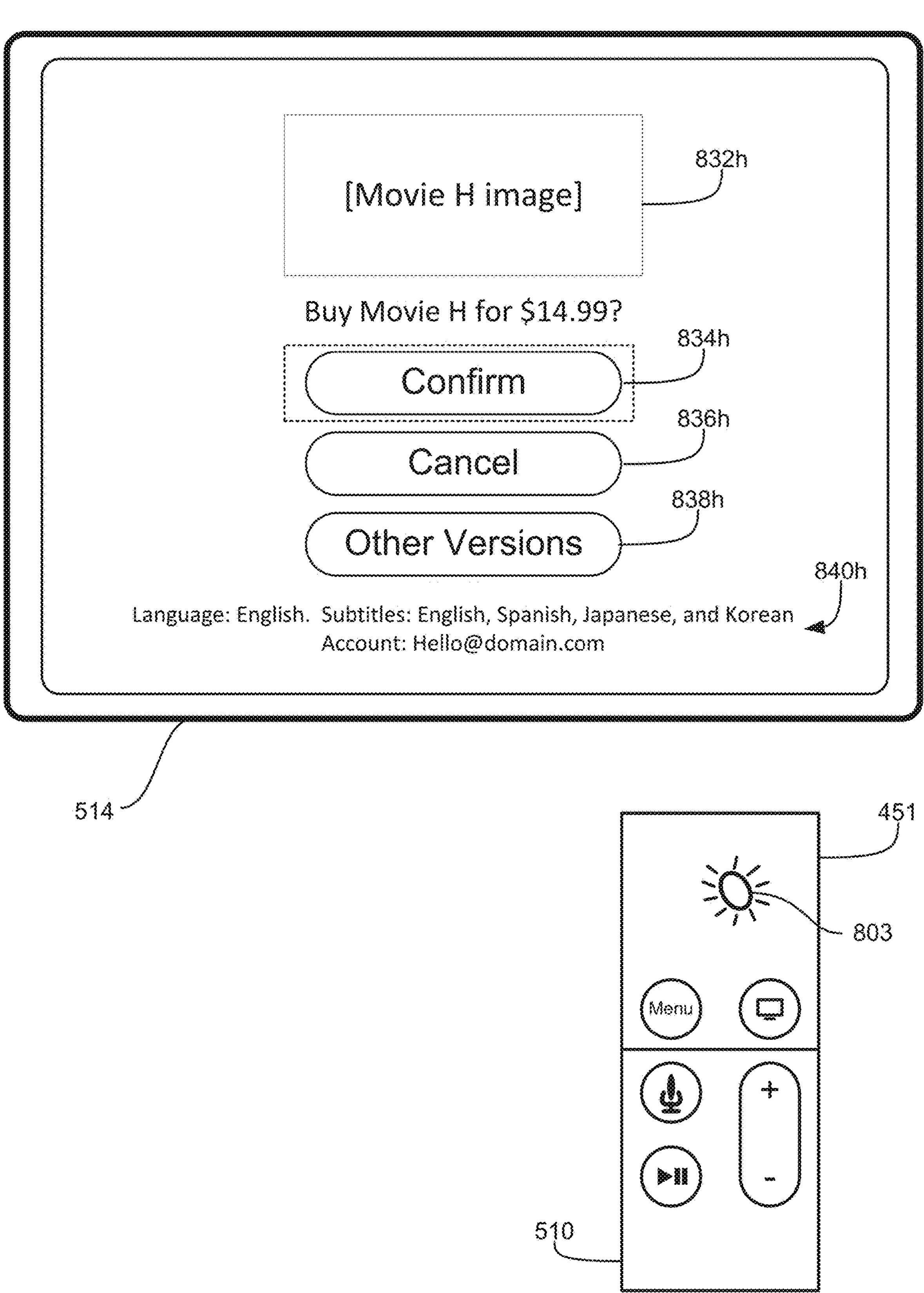

FIG. 8B illustrates a user interface for purchasing an item of content. The user interface includes an image 832*h* representing the item of content, a selectable option 834*h* to confirm the purchase of the item of content, a selectable option 836*h* to cancel the process to purchase the item of content, a selectable option 838*h* to view other versions of the content (e.g., versions of the content with different language, subtitles, or accessibility options), and an indication 840*h* of the languages and subtitles of the content and the user account with which the content will be purchased. As shown in FIG. 8B, the user selects (e.g., with contact 803) the option 834*h* to purchase the content. In response to the user's selection, the electronic device 500 purchases the content and presents the content on the display 514, as shown in FIG. 8C.

Figure 8C:
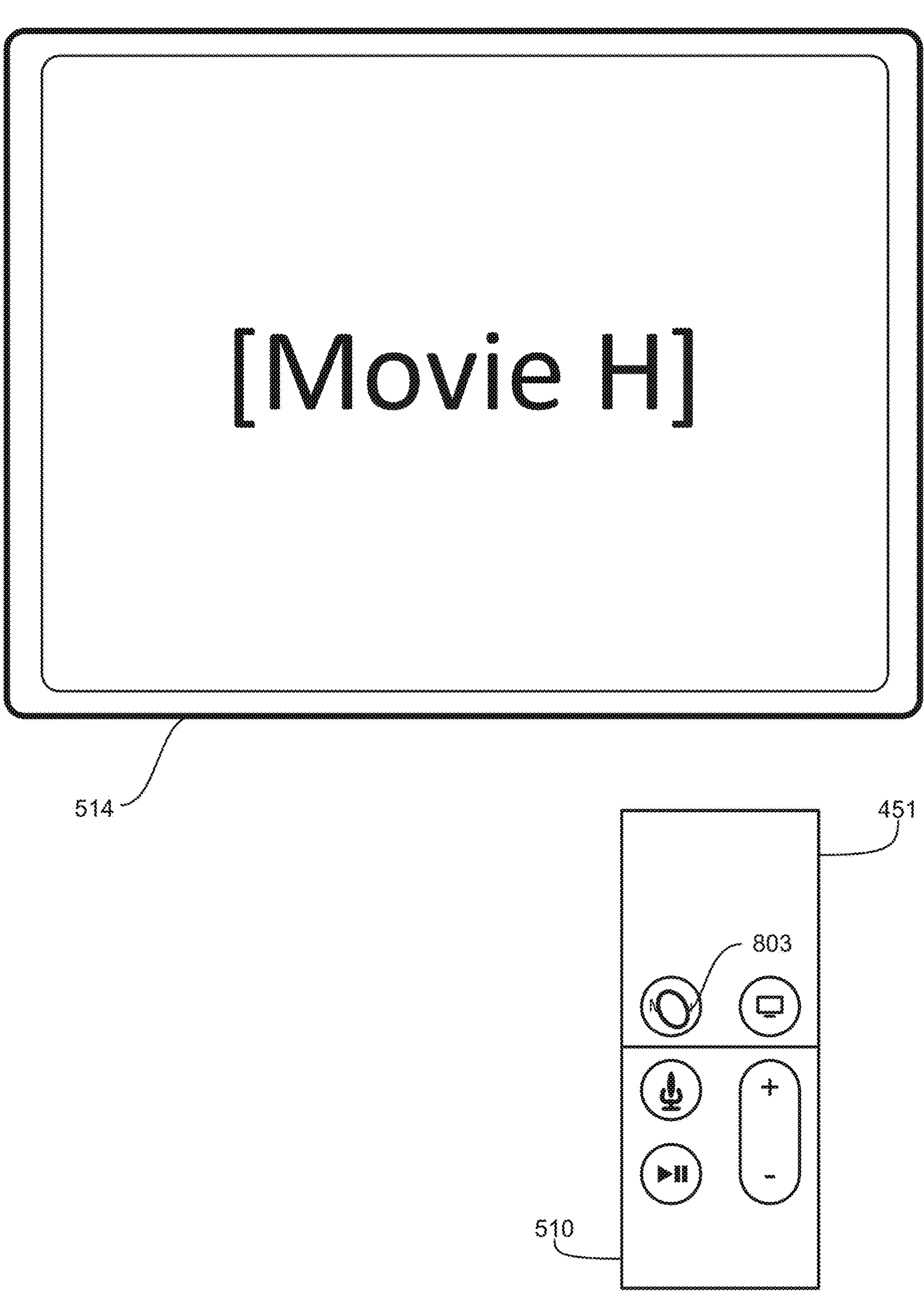

FIG. 8C illustrates the presentation of the content on display 514. While presenting the content, the electronic device 500 detects selection of a "Menu" button on input device 510 (e.g., with contact 803). In response to the user's selection, the electronic device 500 ceases presenting the content and displays the representation 802*h* of the item of content, as shown in FIG. 8D.

Figure 8D:
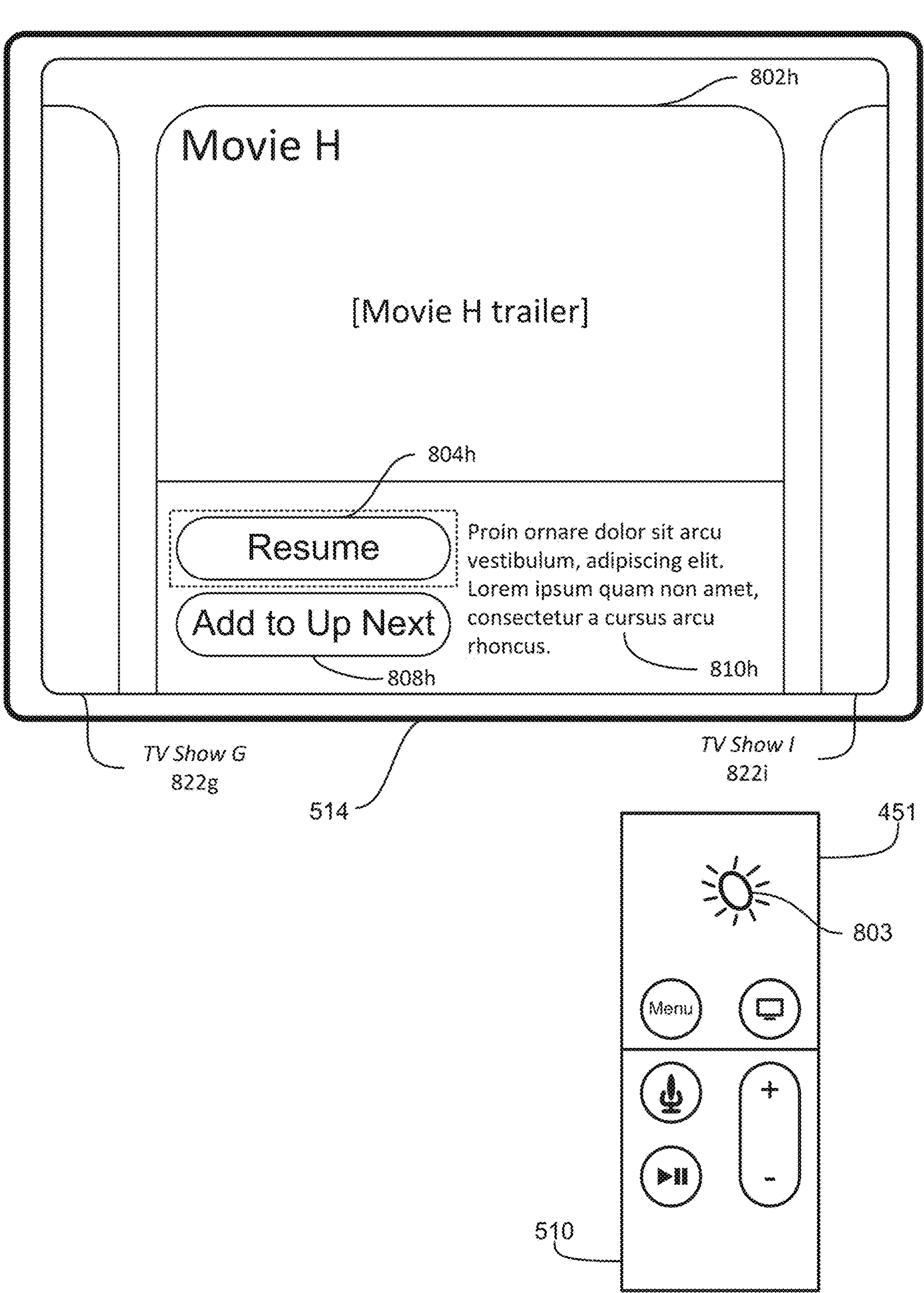

In FIG. 8D, the electronic device 500 presents the representation 802*h* of the item of content in a similar manner to that described above with reference to FIG. 8A. Unlike the user interface illustrated in FIG. 8A, the selectable option 804*h* now includes the text "Resume" and is selectable to resume playback of the content from the playback position at which time the input to exit the item of content was received. As shown in FIG. 8D, the user selects the selectable option 804*h* to resume playback of the item of content, as shown in FIG. 8E.

Figure 8E:
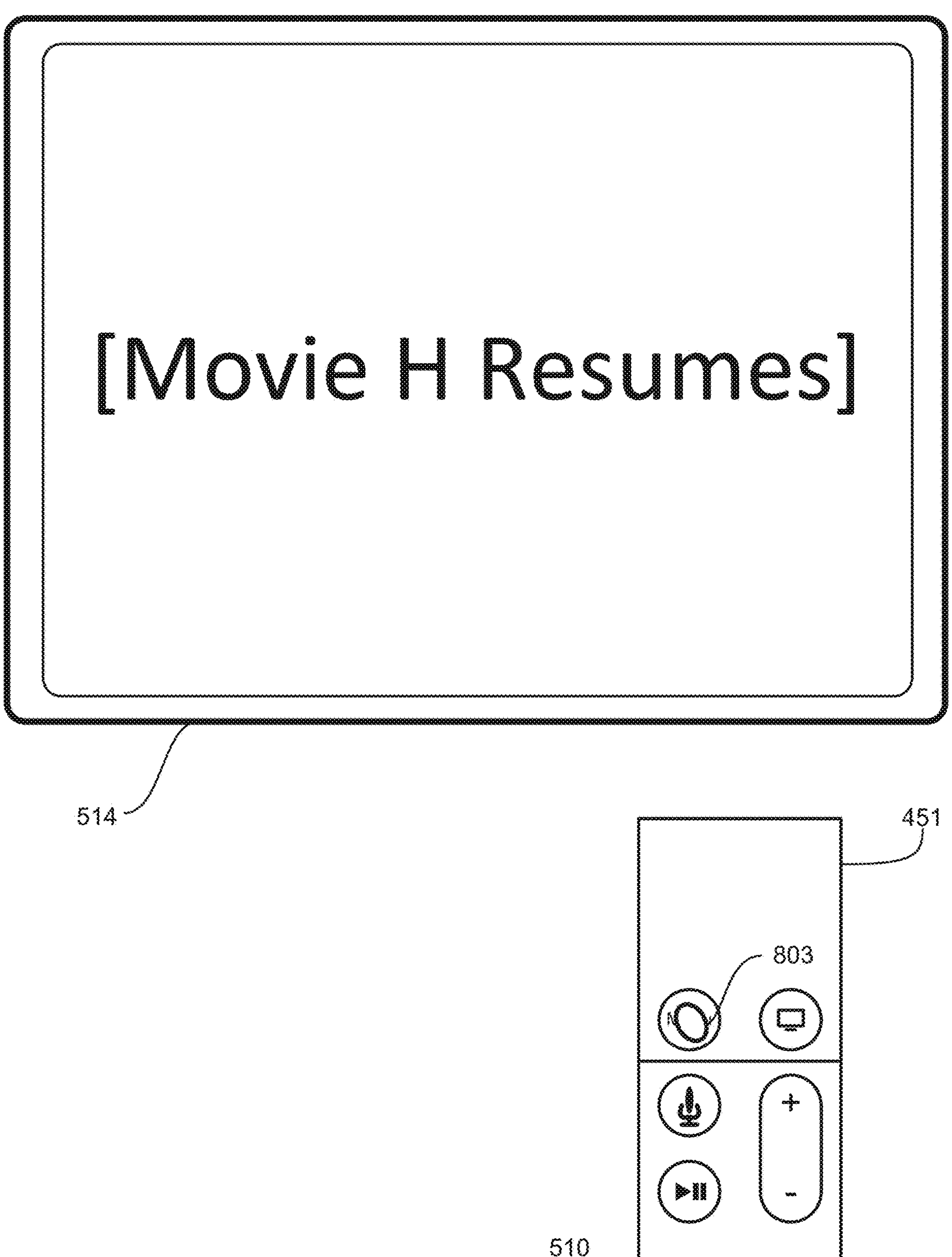

FIG. 8E illustrates playback of the content from the last playback position. As shown in FIG. 8E, the user enters an input to navigate backward in the user interface. In response to the input, if the content has not played completely through, the electronic device 500 presents the user interface illustrated in FIG. 8D. If the content has played completely through, the electronic device 500 presents the user interface illustrated in FIG. 8F.

Figure 8F:
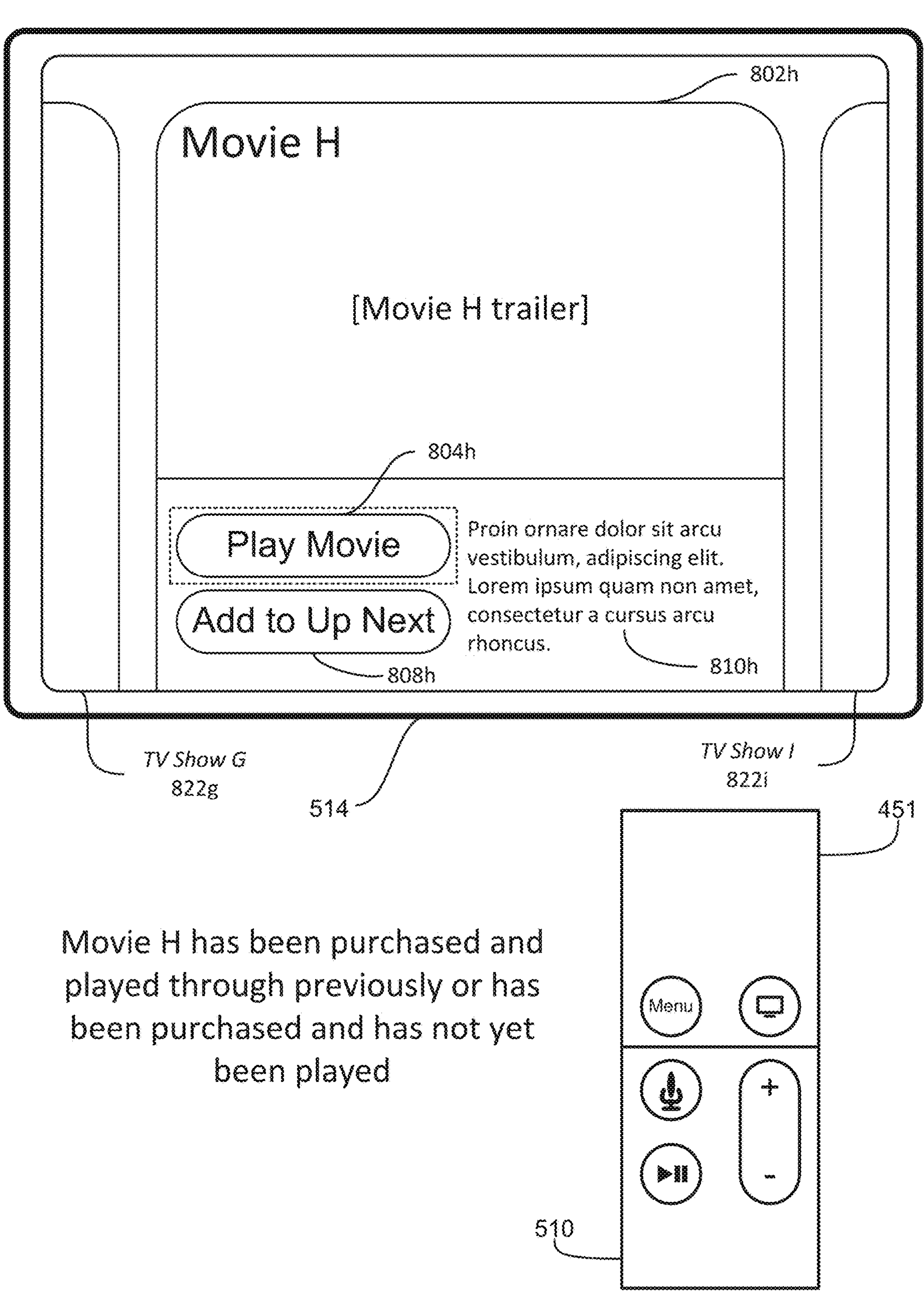

FIG. 8F illustrates the representation 802*h* of the content if the content has played completely through or has not yet been played and has been previously purchased by the user. As shown in FIG. 8F, selectable option 804*h* includes the text "Play Movie". If the user were to select the selectable option 804*h*, the electronic device 500 initiates playback of the content from the beginning without first initiating a process to purchase the content because the content is already purchased.

Figure 8G:
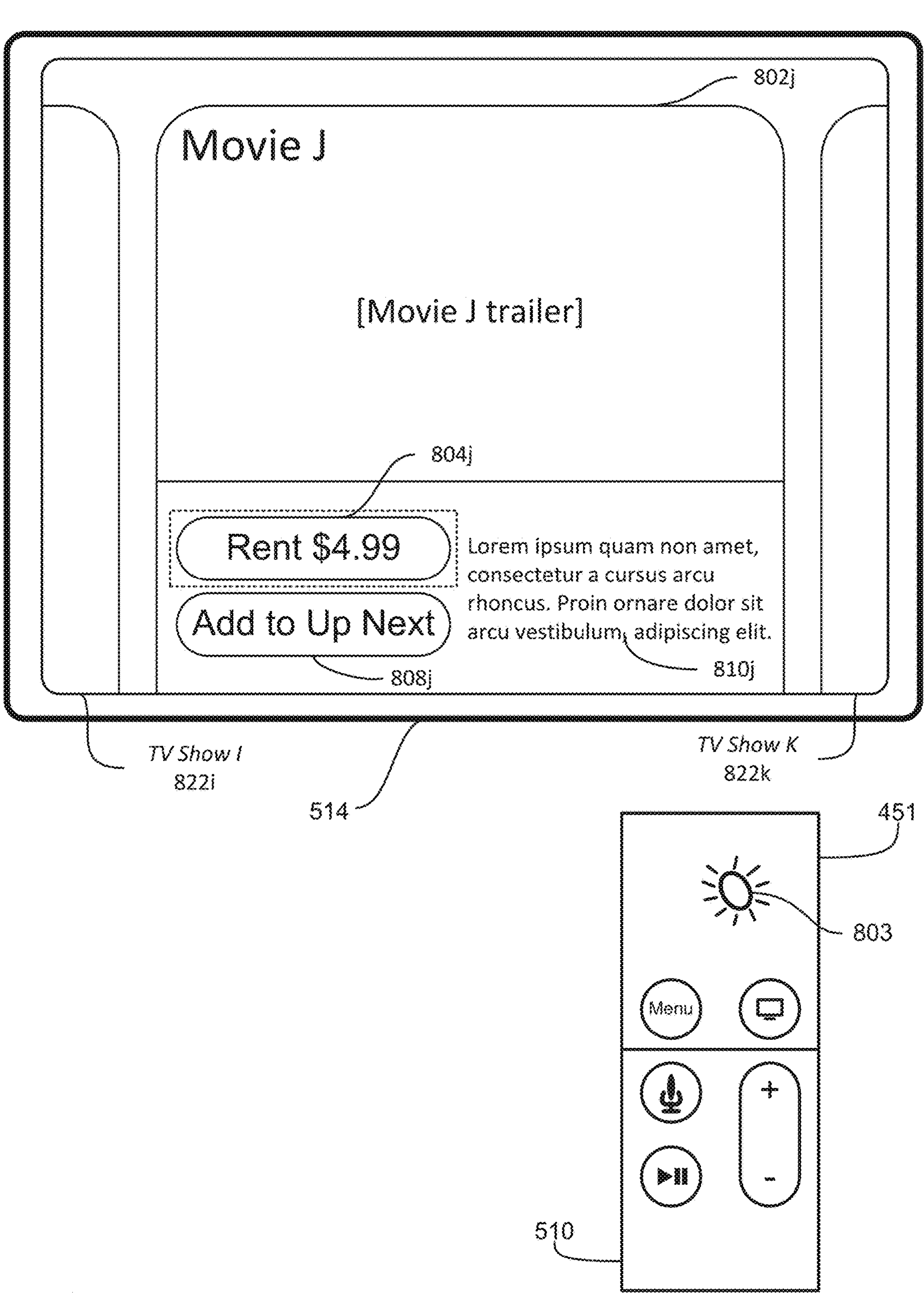
Figure 8H:
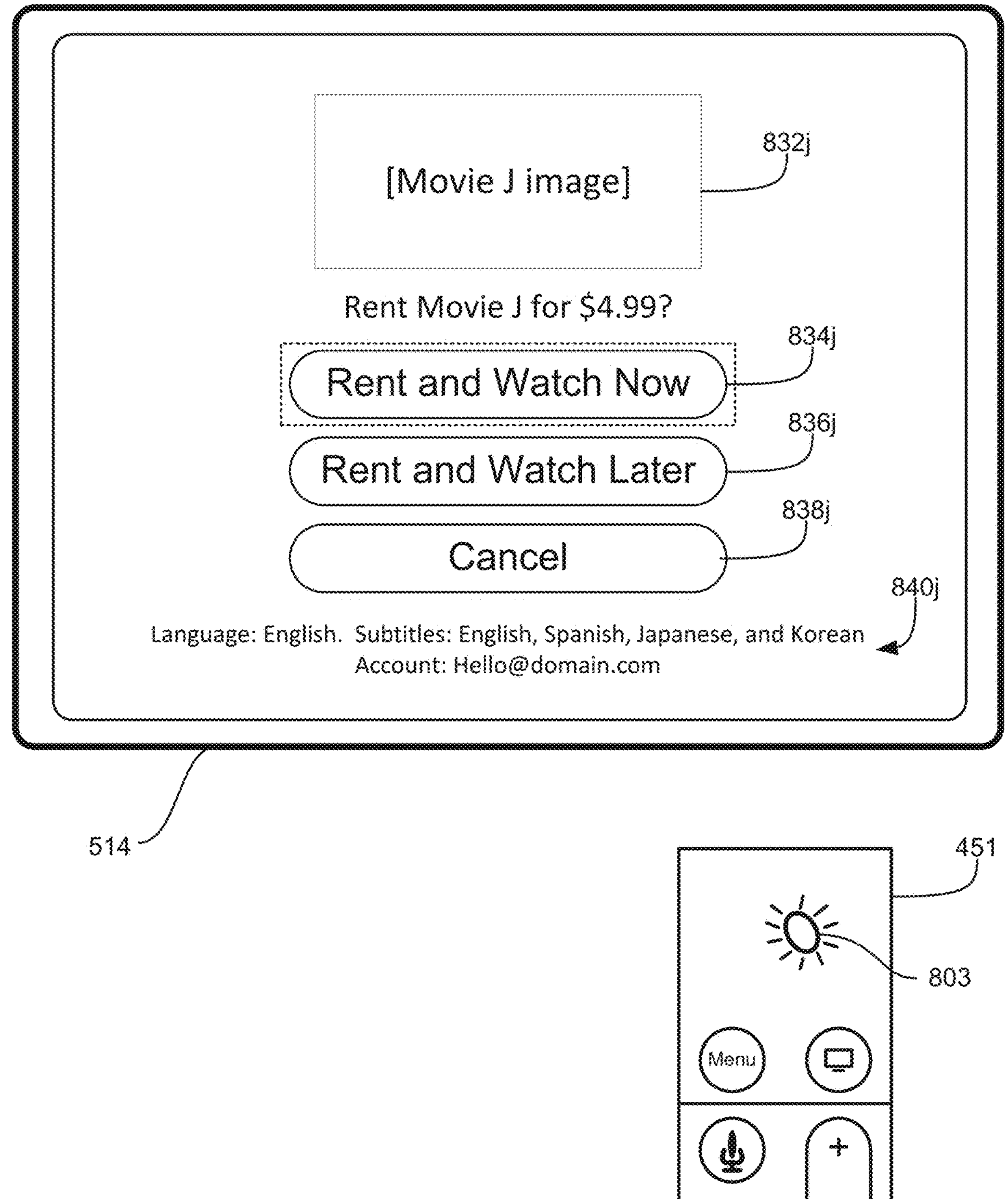

FIGS. 8G-8J illustrate the presentation of selectable options for accessing content that is available to rent via a content store. As shown in FIG. 8G, the electronic device 500 presents a representation 802*j* of an item of content. The representation 802*j* is similar to the representation illustrated in FIG. 8A, except representation 802*j* includes a selectable option 804*j* to initiate a process to access the content by renting the content from a content store. As shown in FIG. 8G, the user selects the selectable option 804*j*. In response to the user's selection, the electronic device 500 initiates a process to rent the content from the content store, as shown in FIG. 8H.

FIG. 8H illustrates a user interface for renting the item of content from the content store. The user interface includes an image 832*j* representing the content, a selectable option 834*j* to rent the content and begin playback of the content, a selectable option 836*j* to rent the content without beginning playback of the content (e.g., to enable the user to watch the content later), a selectable option 838*j* to cancel the process of renting the content, and information 840*j* including the languages and subtitles of the content and the user account with which the content will be rented from the content store. As shown in FIG. 8H, the user selects (e.g., with contact 803) the option 834*j* to rent the content and initiate playback of the content, as shown in FIG. 8I.

Figure 8I:
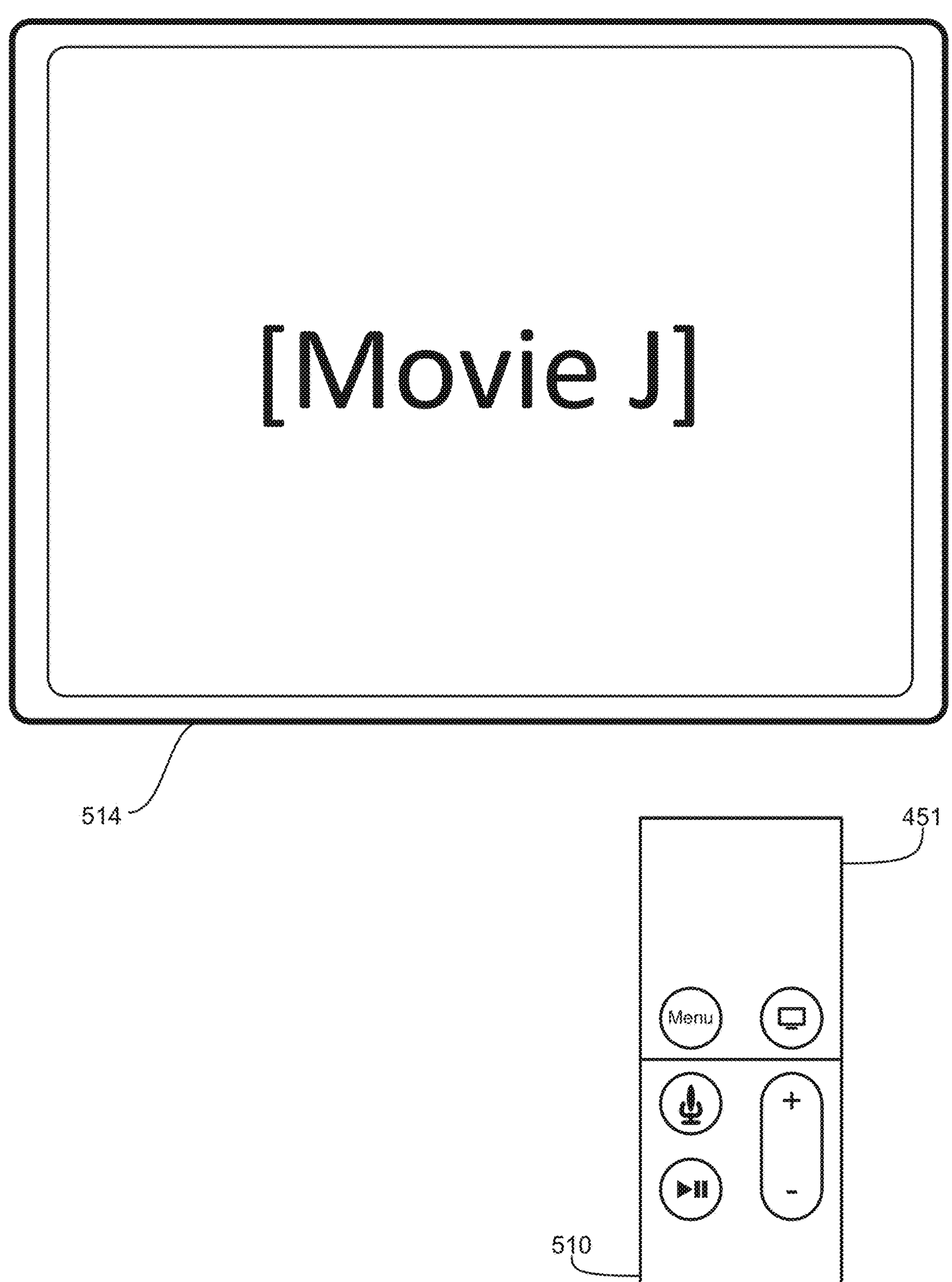

FIG. 8I illustrates presentation of the content in response to the user's selection in FIG. 8H.

Figure 8J:
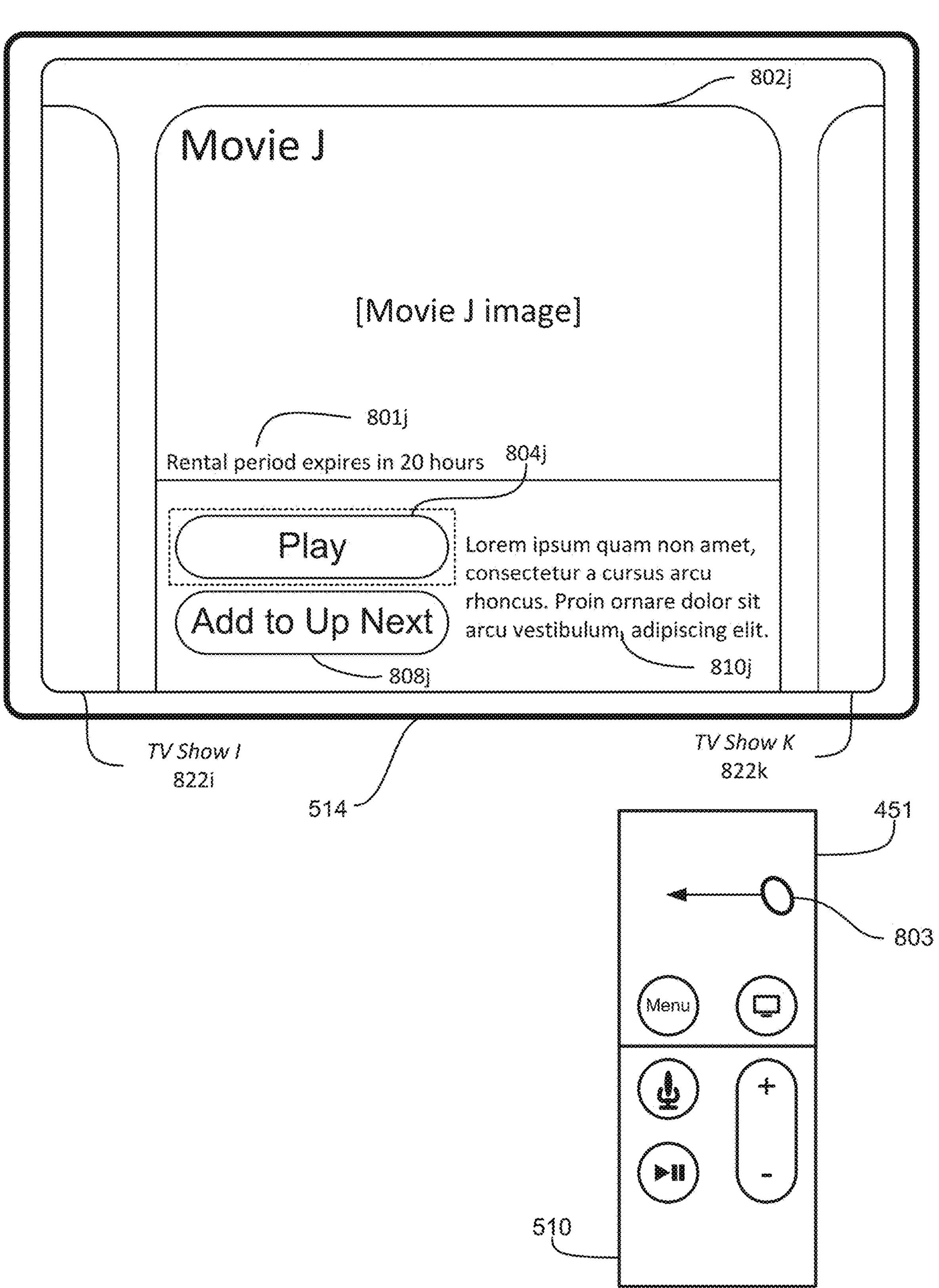

FIG. 8J illustrates the representation 802*j* of the item of content after some time has passed since the rental period of the content began. The representation 802*j* includes a selectable option 804*j* to play the content because the user is still entitled to view the content for the remainder of the rental period and the rental period has not yet expired. The representation 802*j* further includes an indication 801*j* of how much time remains in the rental period. As shown in FIG. 8J, the user swipes (e.g., with contact 803) to dismiss the representation 802*j* and present a representation 822*k* of a different item of content, as shown in FIG. 8K.

Figure 8K:
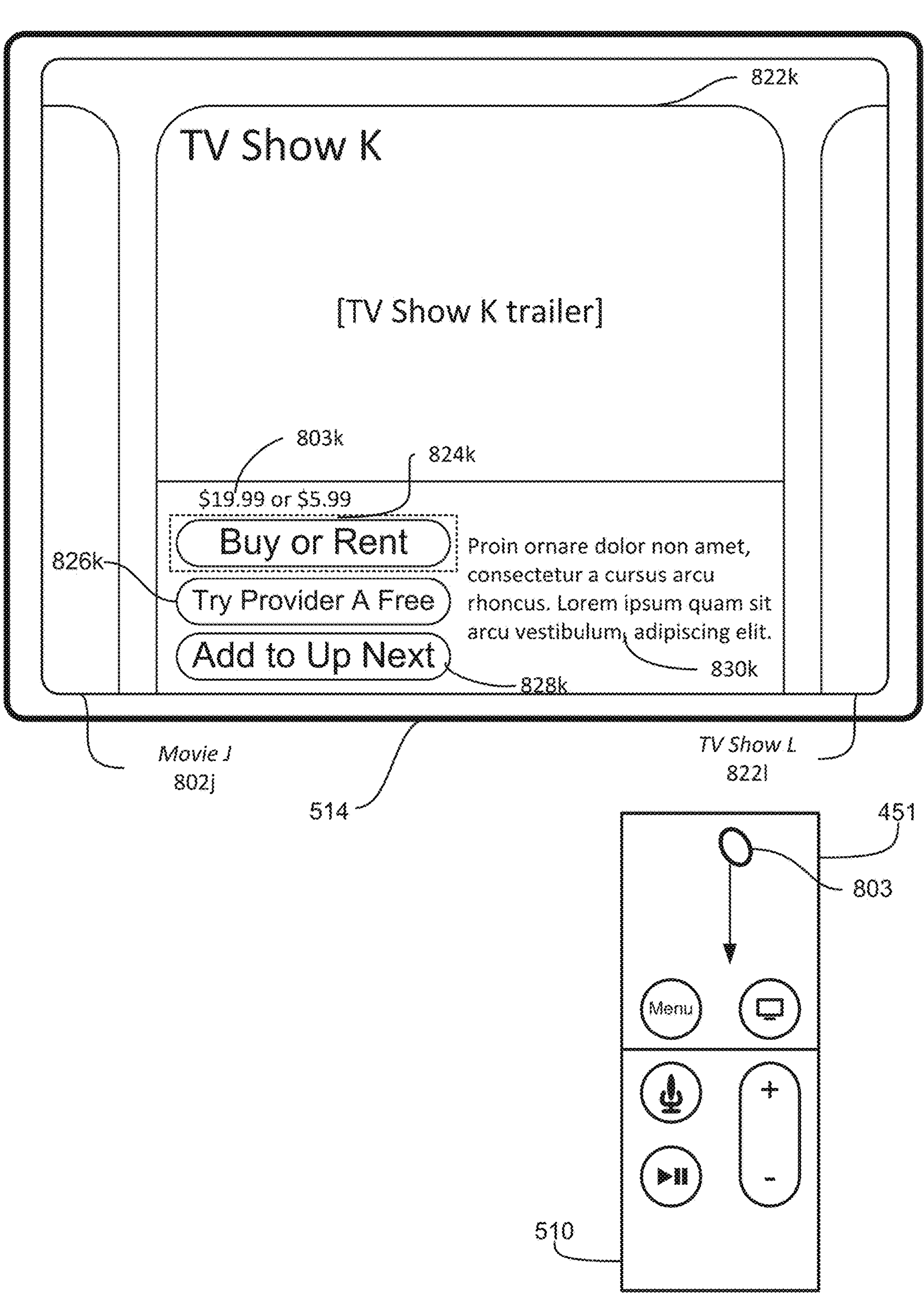
Figure 8L:
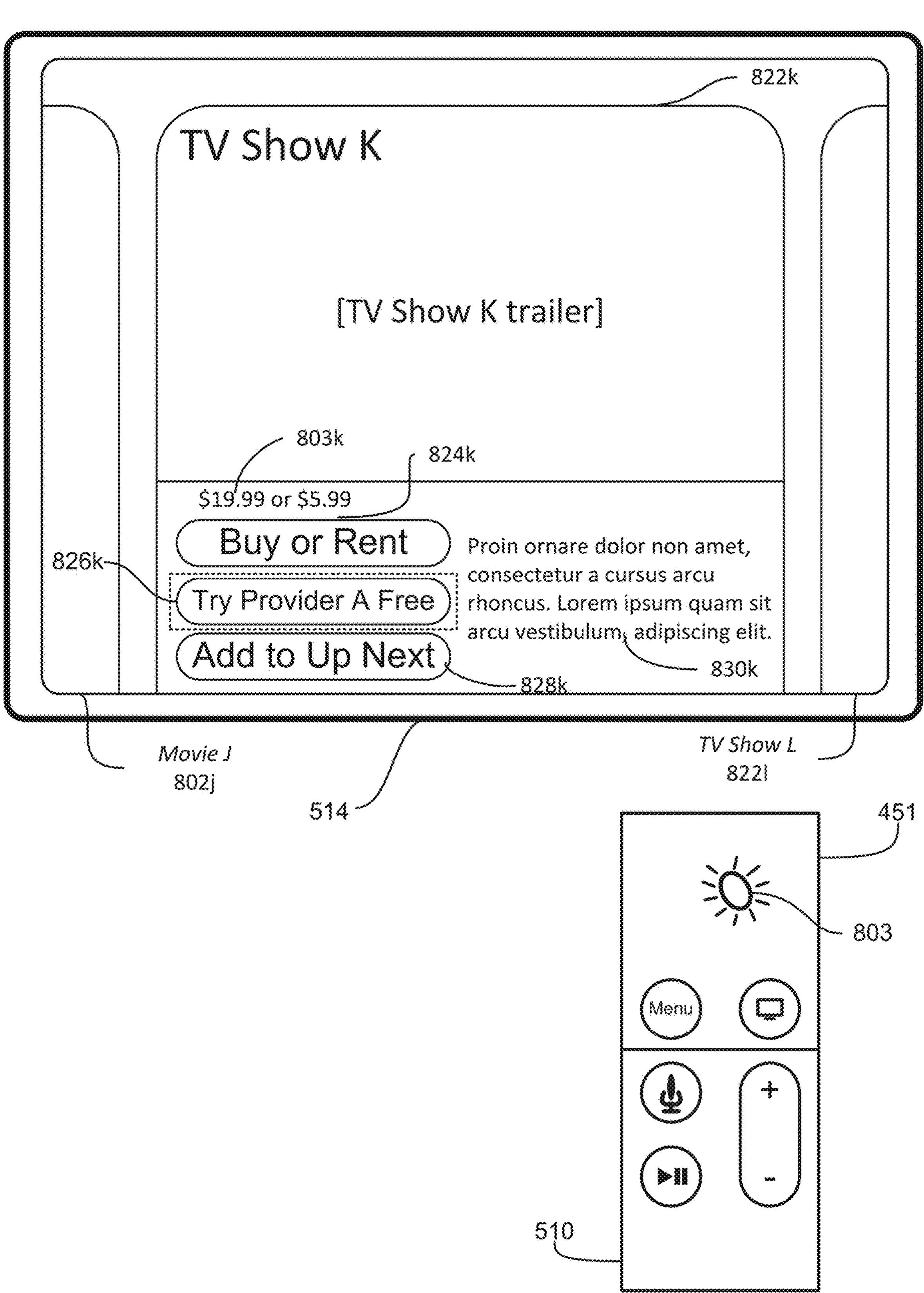

FIGS. 8K-8L illustrate presentation of selectable options for accessing an item of content from the content store and for accessing an item of content through a channel that provides content that plays in the media browsing application. As shown in FIG. 8K, the electronic device 500 presents a representation 822*k* of the content with a selectable option 824*k* to buy or rent the content from the content store and a selectable option 826*k* to access the content through a channel that provides content to the media browsing application, but to which the user is not yet subscribed. The representation 822*k* further includes an indication 803*k* of the price to buy the content and a price to rent the content. As shown in FIG. 8K, the user swipes (e.g., with movement of contact 803) down to move the current focus from the option 824*k* to the option 826*k*, as shown in FIG. 8L.

As shown in FIG. 8L, the electronic device 500 moves the current focus to the selectable option 836*k* for accessing the content through a channel that provides content that plays in the media browsing application. As shown in FIG. 8L, the user selects (e.g., with contact 803) the option 826*k* to initiate the process for accessing the content through the channel, as shown in FIG. 8M.

Figure 8M:
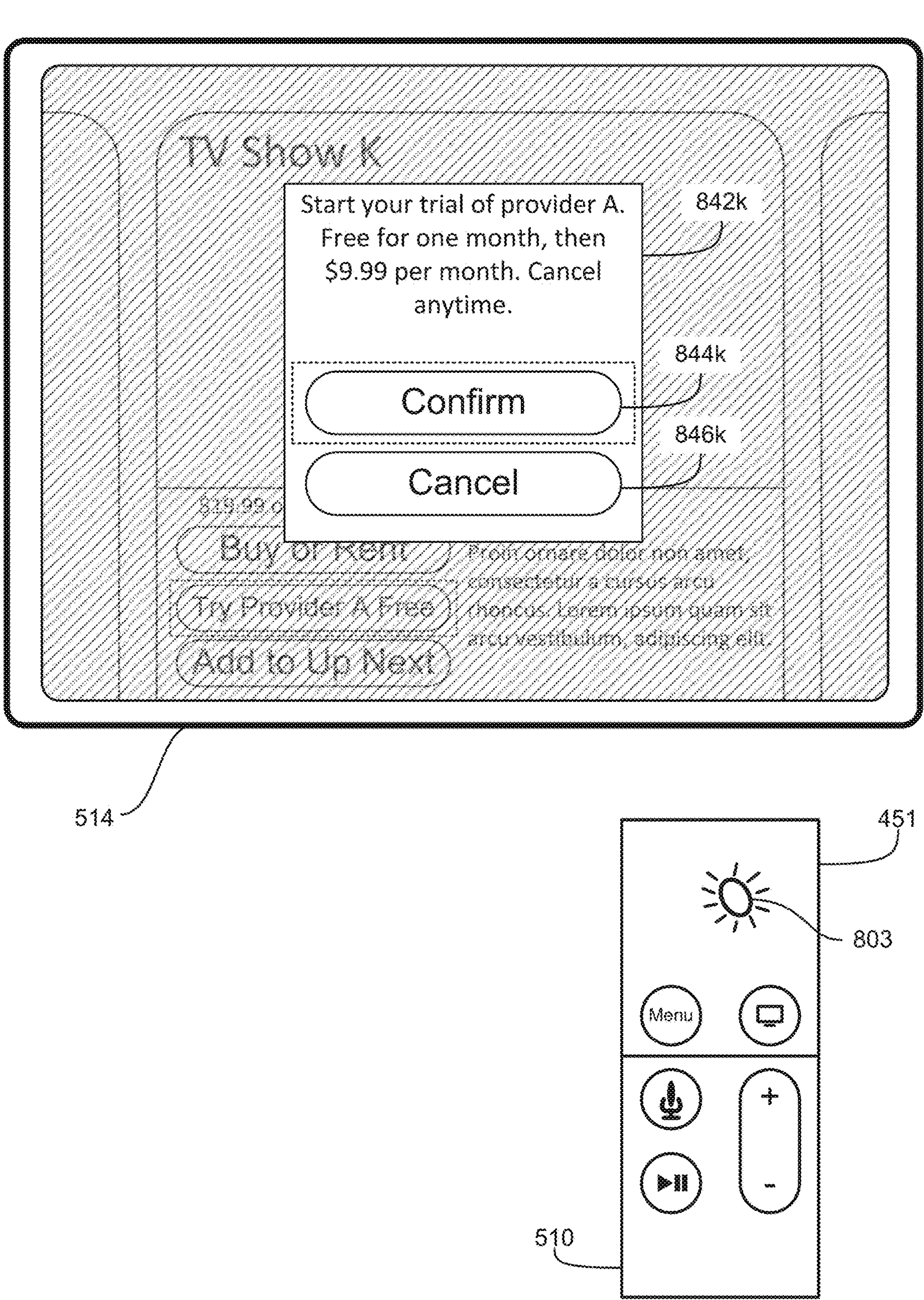

FIG. 8M illustrates a user interface for initiating a process to access content through a channel that provides content that plays in the media browsing application of the electronic device 500. The user interface includes information 842*k* about the terms of the channel subscription, a selectable option 844*k* to confirm subscription to the channel, and a selectable option 846*k* to cancel the process of subscribing to the channel. As shown in FIG. 8M, the user selects the option 844*k* to subscribe to the channel. In response to the user's selection, the electronic device 500 subscribes to the channel and presents the content, as shown in FIG. 8N.

Figure 8N:
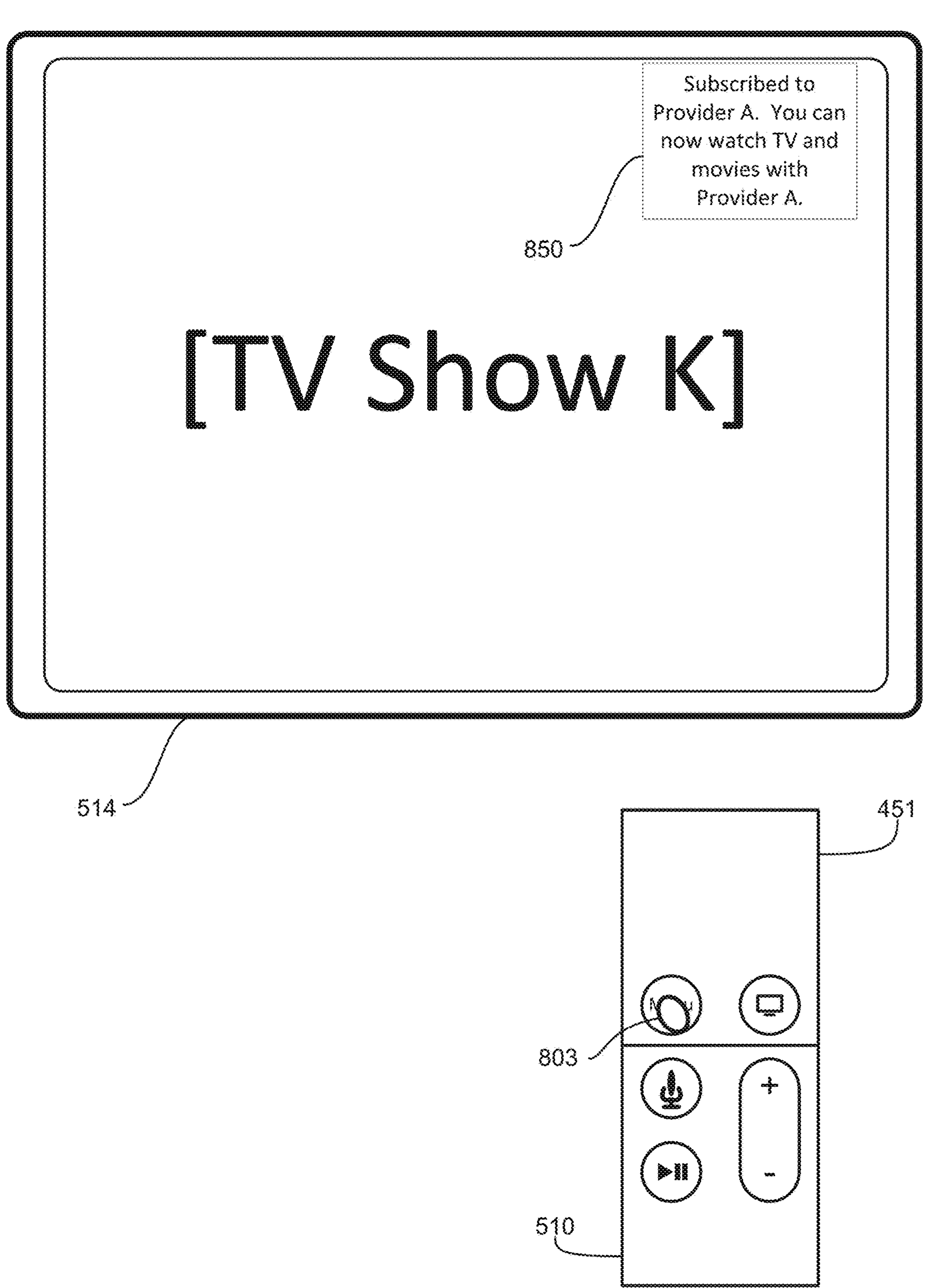

FIG. 8N illustrates presentation of the item of content in response to successfully subscribing to the channel that provides the content. As shown in FIG. 8N, the electronic device 500 presents the content with an indication 850 that subscription to the channel was successful. The indication 850 is presented for a predetermined amount of time (e.g., 1, 3, 5, 10 seconds) before auto-dismissing. While presenting the content, the electronic device 500 detects an input at input device 510 for ceasing the presentation of the content and navigating backward in the user interface, as shown in FIG. 8O.

Figure 8O:
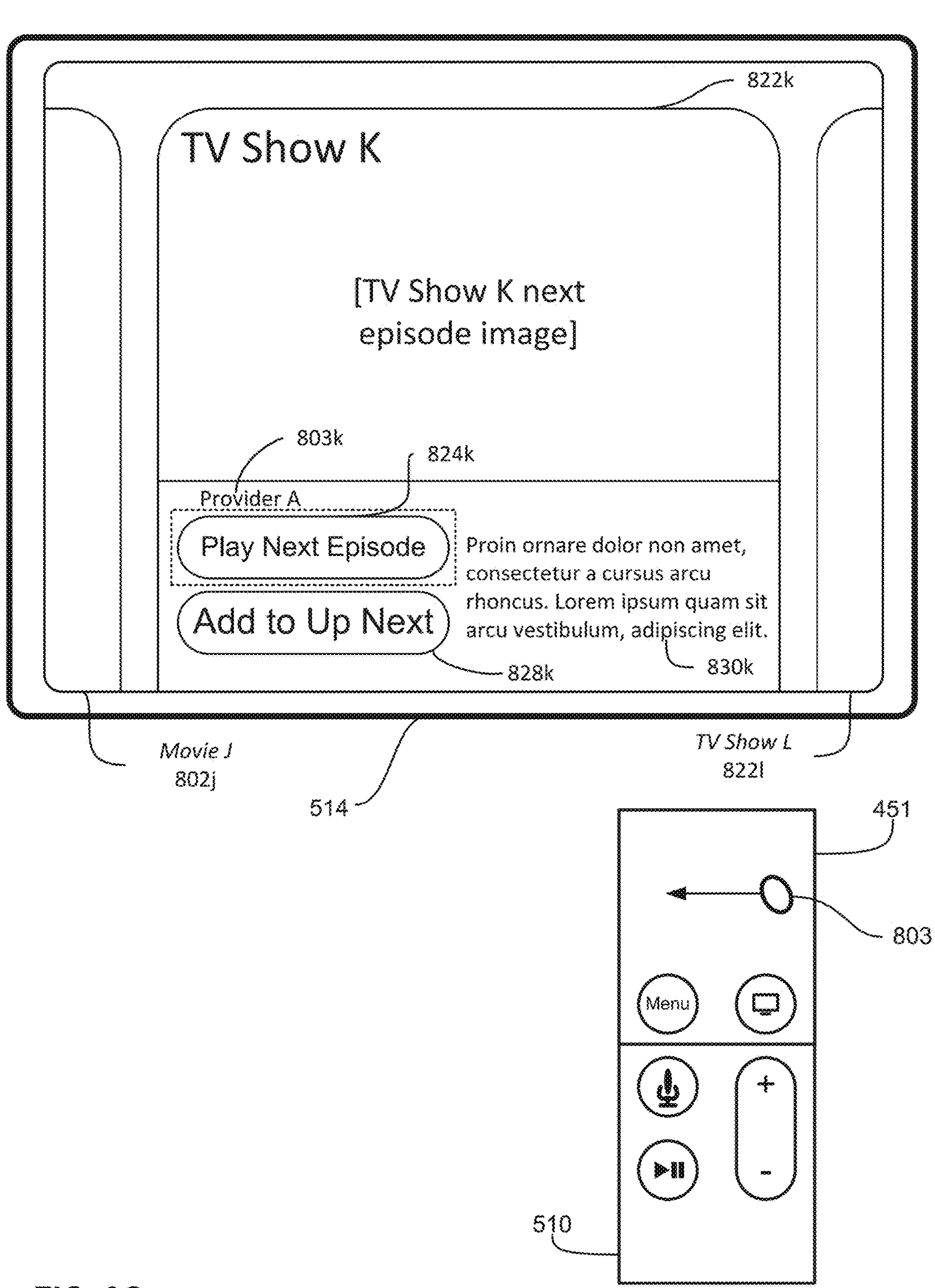

FIG. 8O illustrates a representation 822*k* of the item of content once the user has started watching episodes included in the collection of episodic content represented by representation 822*k*. The representation 822*k* includes an image that represents the next episode in the series and a selectable option 824*k* to initiate playback of the next episode. Although the content is accessible through the content store, because the electronic device 500 is subscribed to a channel (e.g., "Provider A") that enables the electronic device 500 to access the content, the representation 822*k* only presents a selectable option 824*k* to watch the content using the channel (e.g., and does not include the previously-displayed option to buy or rent the content from the content store). The selectable option 824*k* includes the text "Play Next Episode" because the user has started watching the series so selection of option 824*k* will play the next episode in the series. The representation 822*k* includes an indication 803*k* of the channel that provides access to the content because the selectable option 824*k* is selectable to access the content with the indicated channel.

Figure 8P:
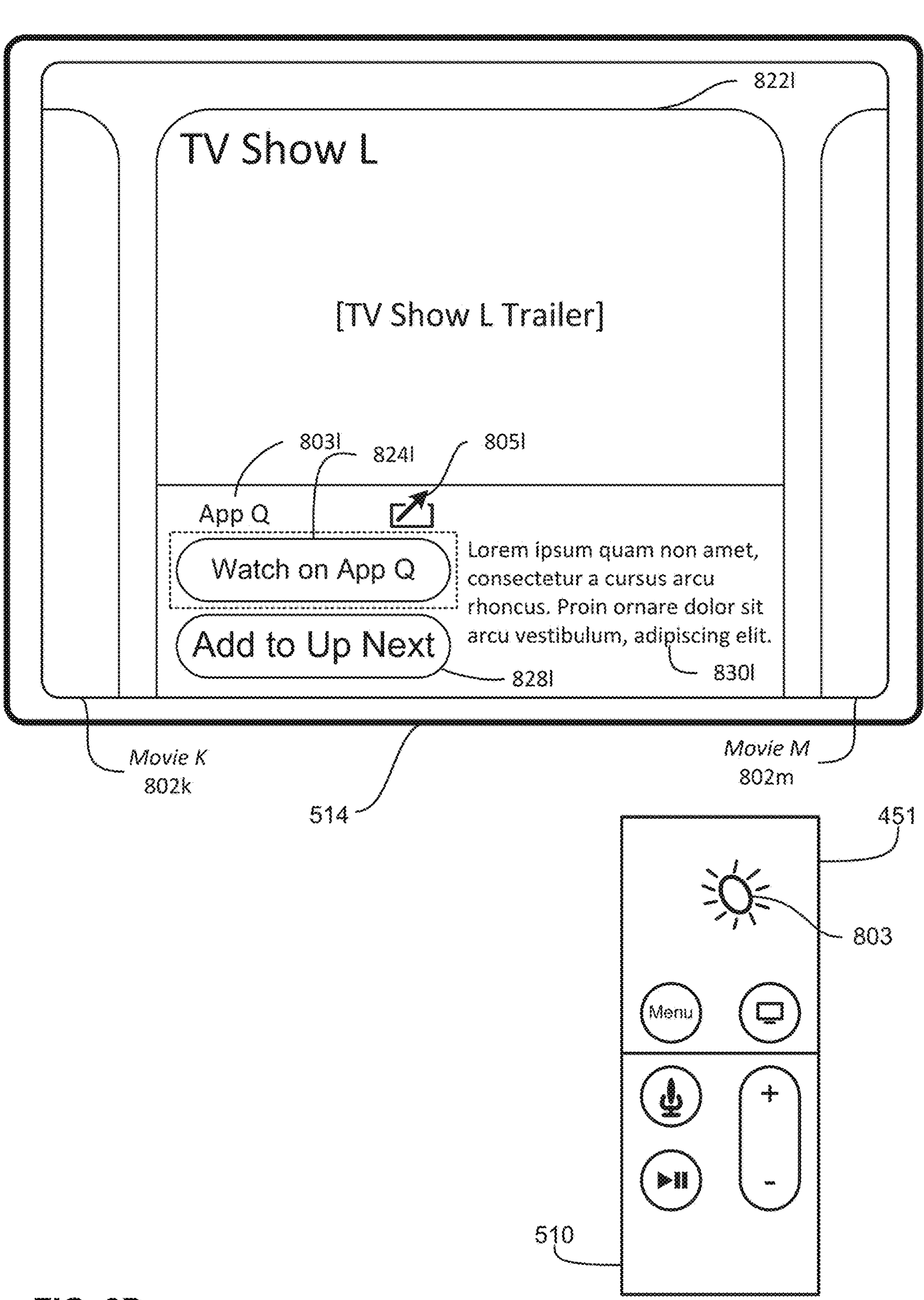

As shown in FIG. 8O, the user swipes (e.g., with movement of contact 803) to cease presenting the representation 822*k* and present representation 822*l*, as shown in FIG. 8P. The representation 822*l* includes a selectable option 824*l* to access the content through Application Q. The representation 822*l* further includes an indication 803*l* of Application Q and an indication 805*l* that selecting option 824*l* will cause the electronic device 500 to open a different application (different than the media browsing application in which representations 822 are displayed) to present the content. As shown in FIG. 8P, the user selects (e.g., with contact 803) option 824*l*. In response the user's selection, the electronic device 500 ceases presenting the media browsing application that presents the representation 822*l* and presents the content in application Q, as shown in FIG. 8Q.

Figure 8Q:
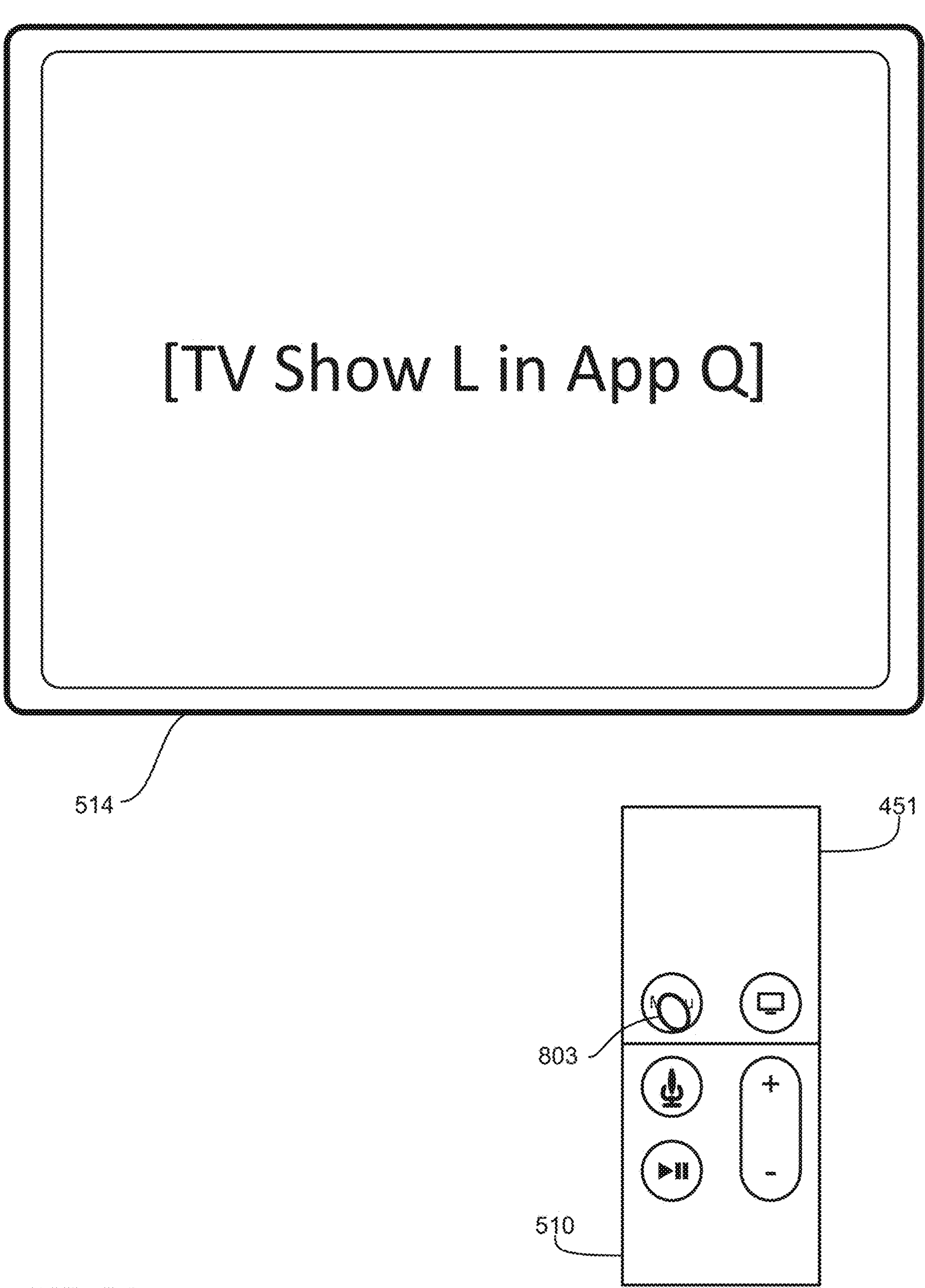
Figure 8R:
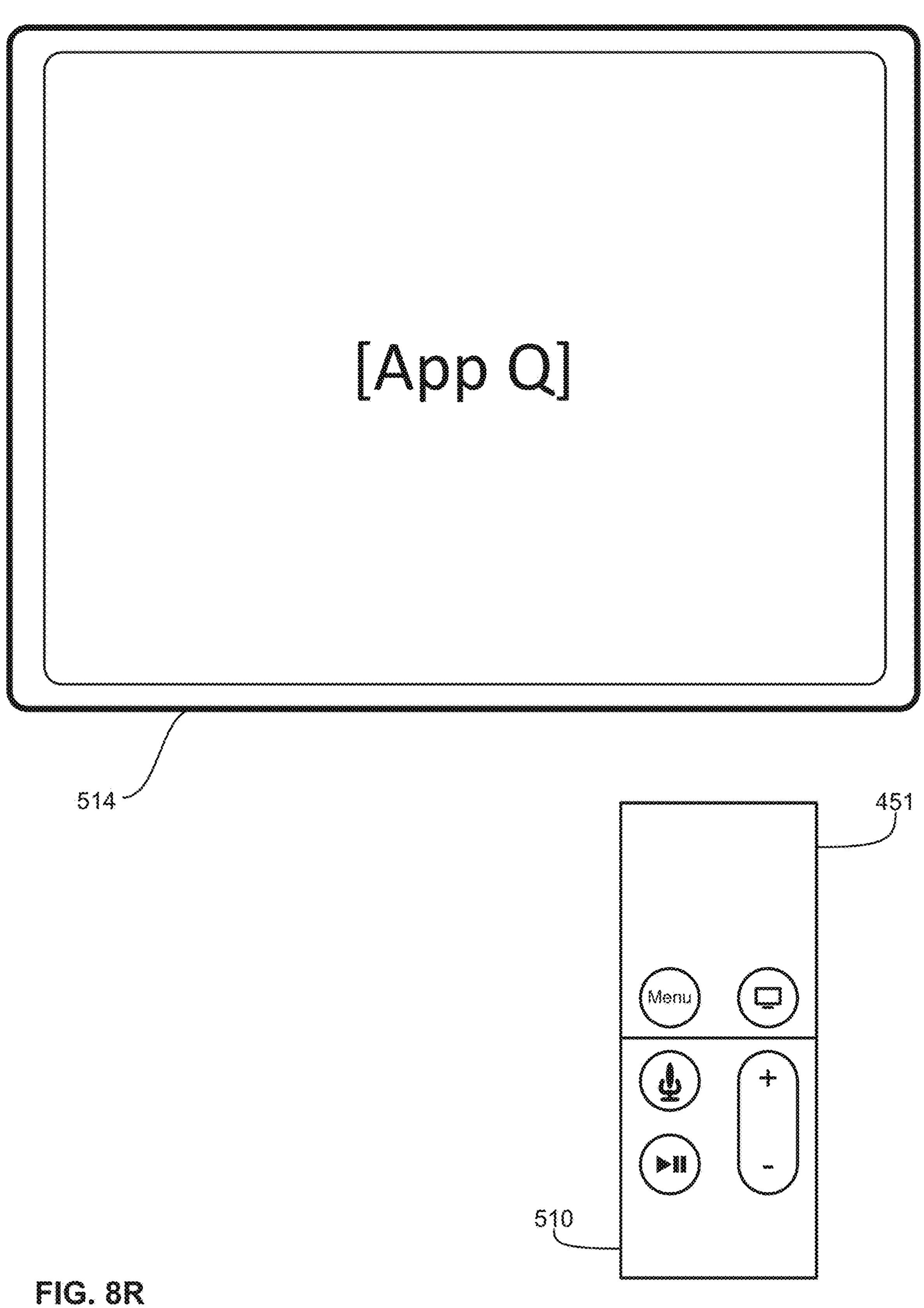

As shown in FIG. 8Q, in response to the user's selection in FIG. 8P, the electronic device 500 presents the content in application Q. While presenting the content in application Q, the user selects (e.g., with contact 803) the "Menu" button on input device 510. In response to the user's selection, the electronic device 500 presents a user interface of Application Q (as opposed to navigating back to the user interface of FIG. 8P), as shown in FIG. 8R, because the content is playing in Application Q so the user interface of application Q is the result of backwards navigation while playing the content.

Figure 8S:
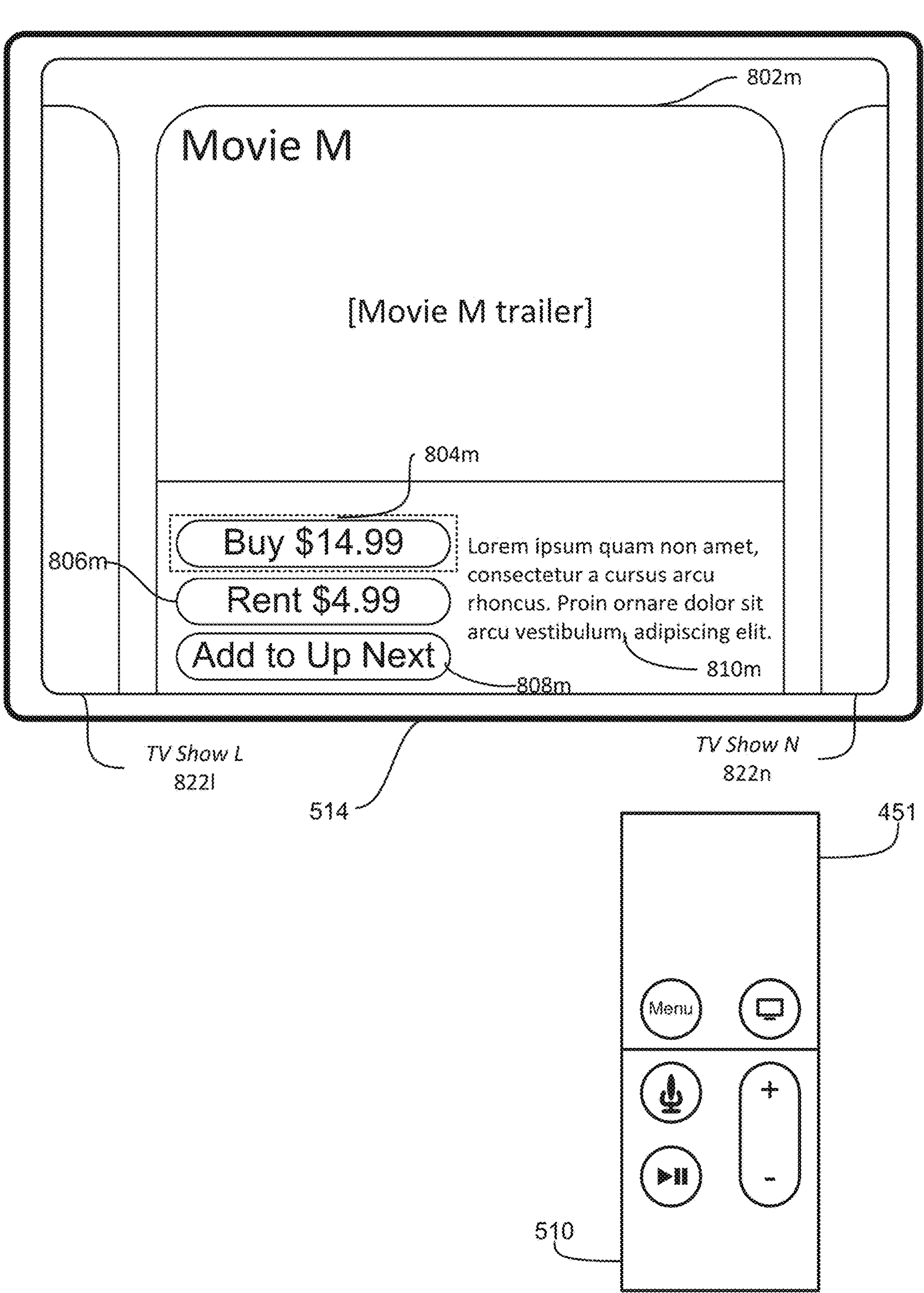

FIG. 8S illustrates a representation 802*m* of an item of content that is available through buying the content from the content store or renting the content from the content store. Thus, representation 802*m* includes a selectable option 804*m* that, when selected, causes the electronic device 500 to present a user interface for buying the content, such as the user interface illustrated in FIG. 8B and a selectable option 806*m* that, when selected, causes the electronic device 500 the present a user interface for renting the content, such as the user interface illustrated in FIG. 8H.

Figure 8T:
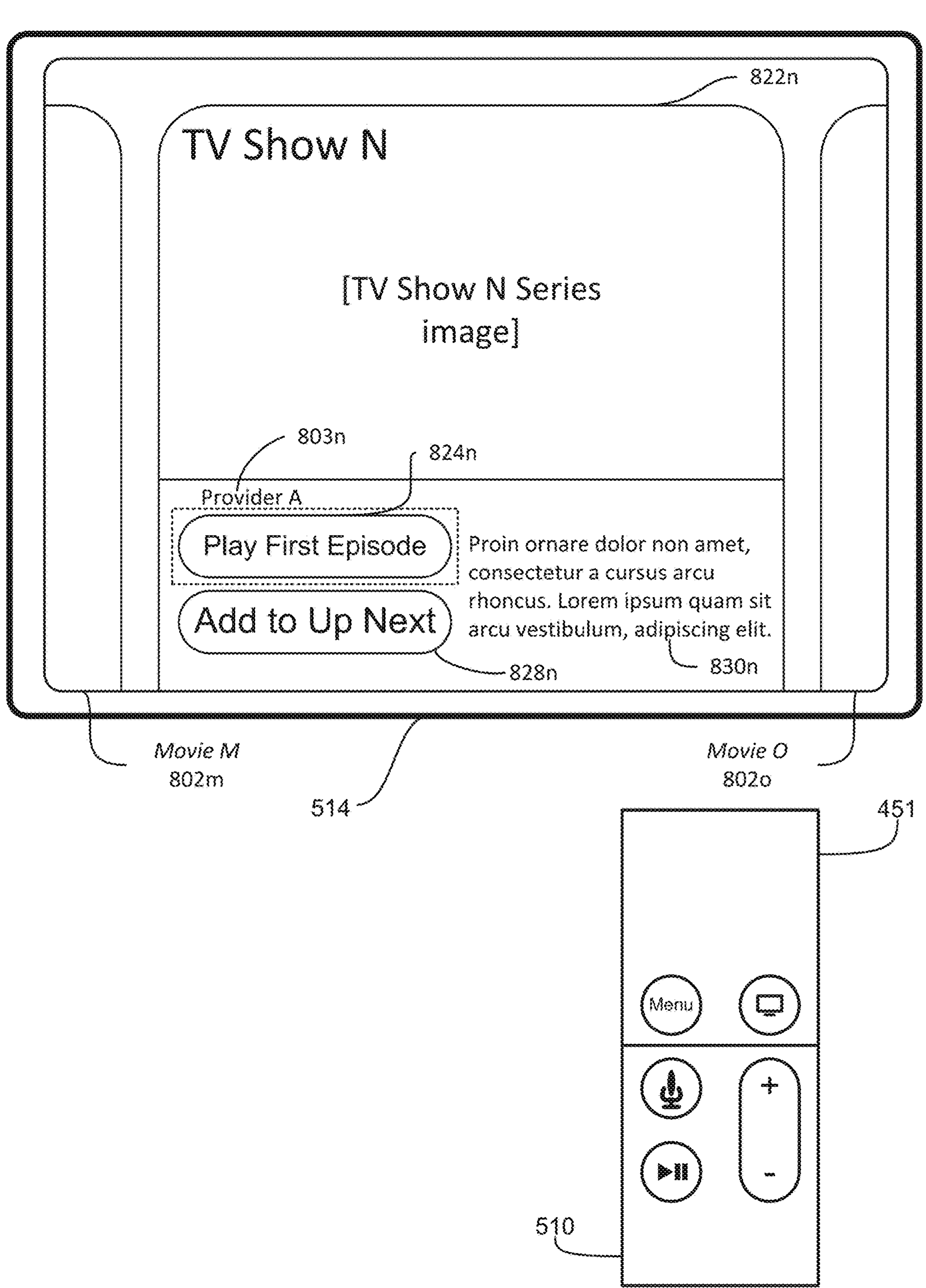

FIG. 8T illustrates a representation 822*n* of an item of content that is available from a channel to which the electronic device 500 is subscribed. The representation 822*n* includes an indication 803*n* of the channel that provides access to the content and a selectable option 824*n* to play the first episode of the content, which is a series of episodic content items. Even if the content is accessible through other means (e.g., content store, other applications, other channels), the electronic device 500 presents only the option 824*n* because selection of the option 824*n* will play the content without purchasing the content or subscribing to a new channel.

Figure 8U:
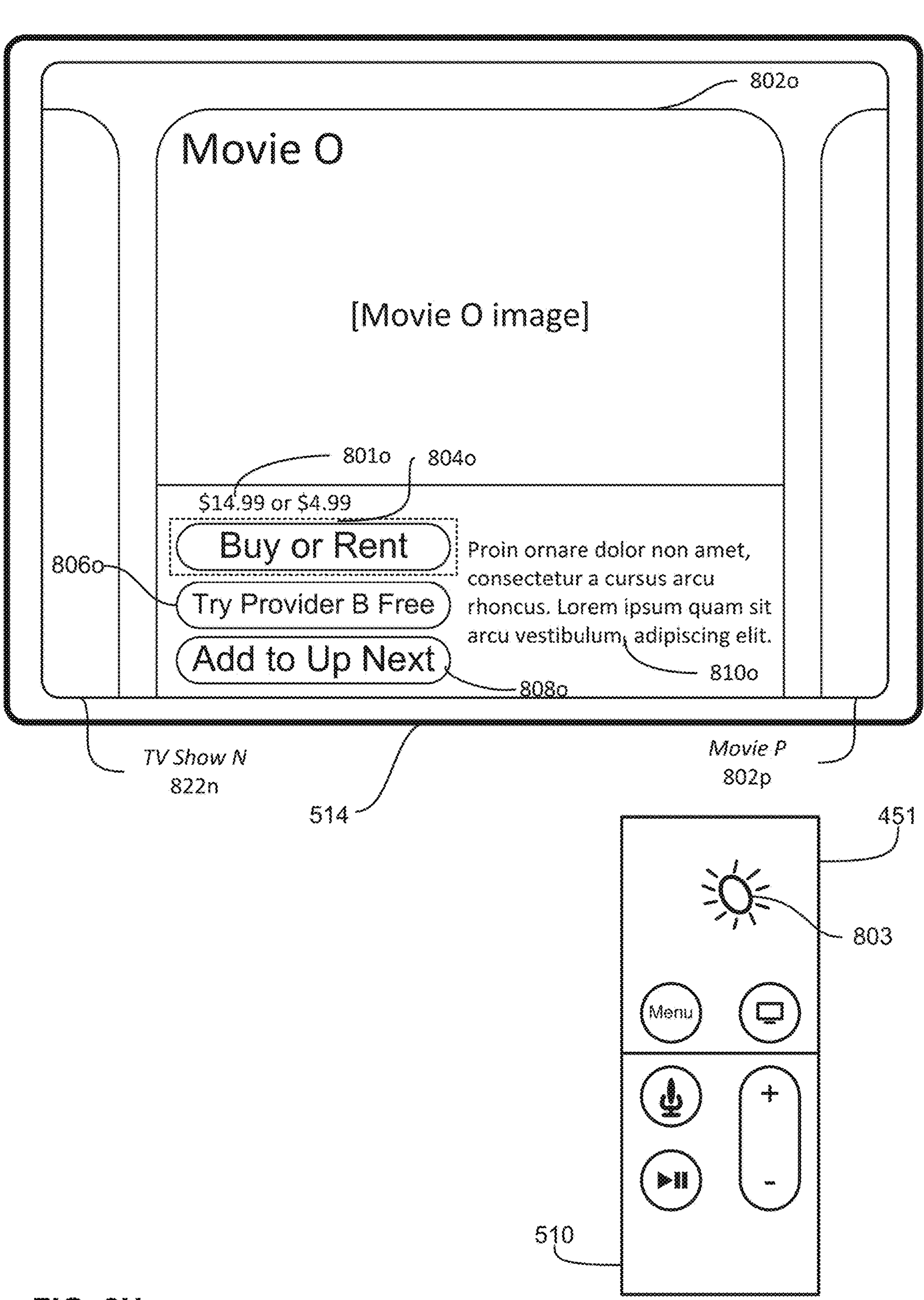

FIG. 8U illustrates a representation 802*o* of an item of content that is accessible through the content store or through a channel that provides items of content for playback in the media browsing application. The representation includes an indication 801*o* of the price of purchasing or renting the content, a selectable option 804*o* to present a user interface to buy or rent the content, and a selectable option 806*o* to access the content by subscribing to the channel. As shown in FIG. 8U, the user selects (e.g., with contact 803) the option 804*o* to initiate a process to buy or rent the content from the content store, as shown in FIG. 8V.

Figure 8V:
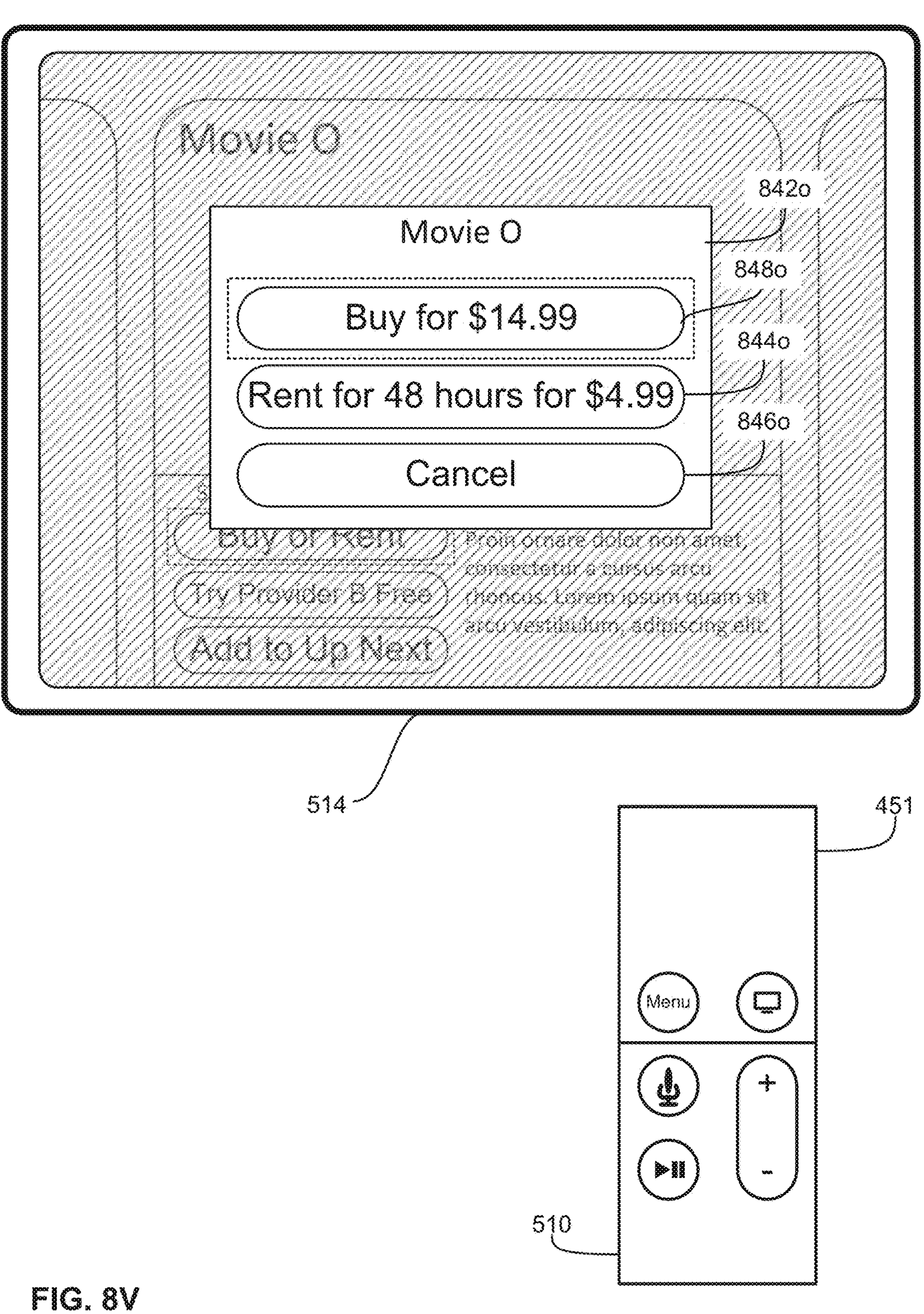

FIG. 8V illustrates a user interface for buying or renting the content from the content store. The user interface includes an indication 842*o* of the item of content, a selectable option 848*o* to buy the content, a selectable option 844*o* to rent the content, and a selectable option 846*o* to cancel the process of buying or renting the content. In response to detecting selection of selectable option 848*o*, the electronic device 500 presents a user interface similar to the user interface illustrated in FIG. 8B. In response to detecting selection of selectable option 844*o*, the electronic device 500 presents a user interface similar to the user interface illustrated in FIG. 8H.

Figure 8W:
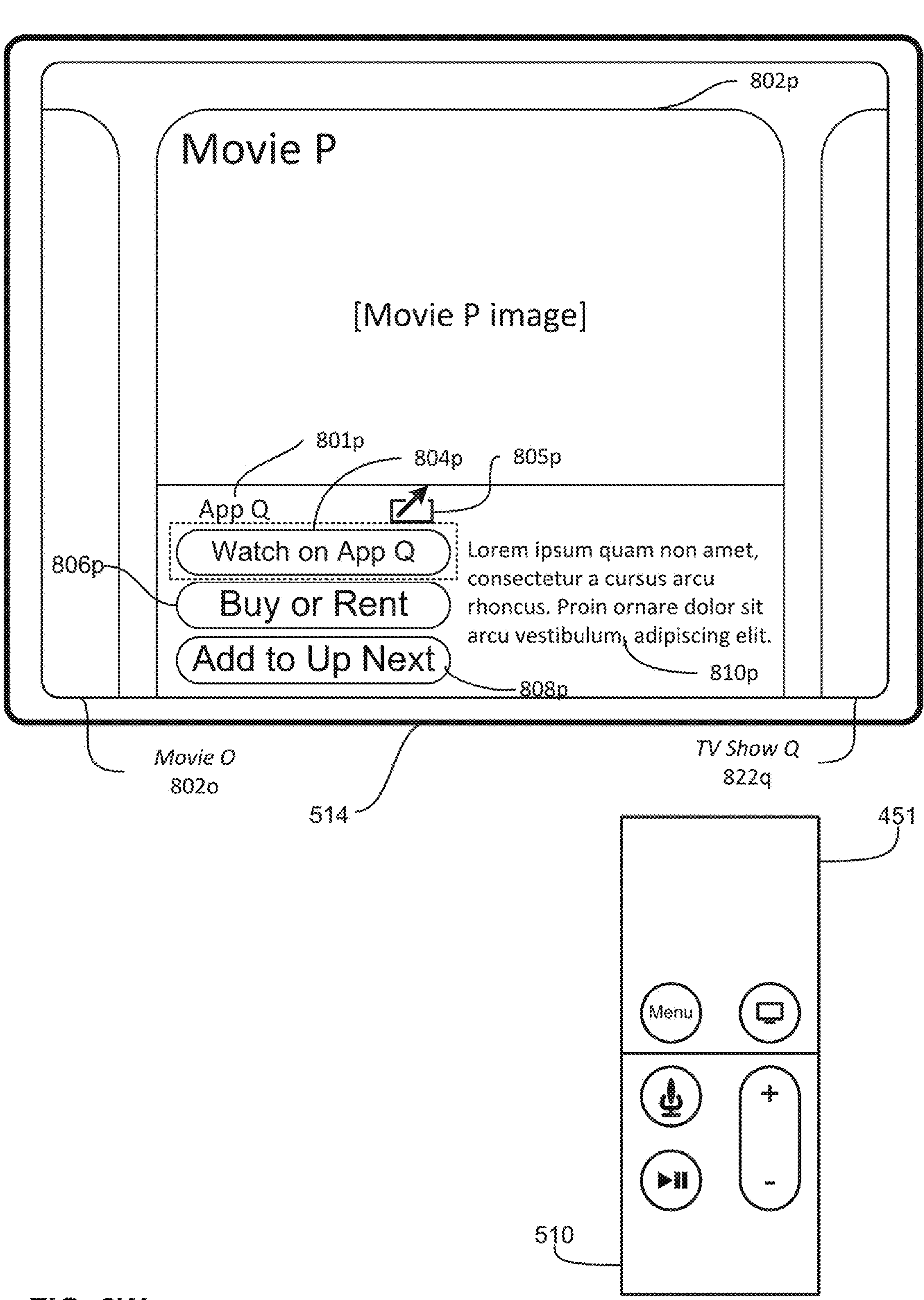

FIG. 8W illustrates a representation 802*p* of an item of content that is available through an application other than the media browsing application and for purchase or rent from the content store The representation 802*p* includes a selectable option 804*p* to watch the content with the other application, a selectable option 806*p* to buy or rent the content, an indication 801*p* of the application that provides access to the content and an indication 805*p* that selecting portion 804*p* will play the content in a different application. In response to detecting selection of selectable option 804*p*, the electronic device 500 presents the content in the other application, similar to the manner described above with reference to FIG. 8Q. In response to detecting selection of selectable option 806*p*, the electronic device 500 presents a user interface similar to the user interface illustrated in FIG. 8V.

Figure 8X:
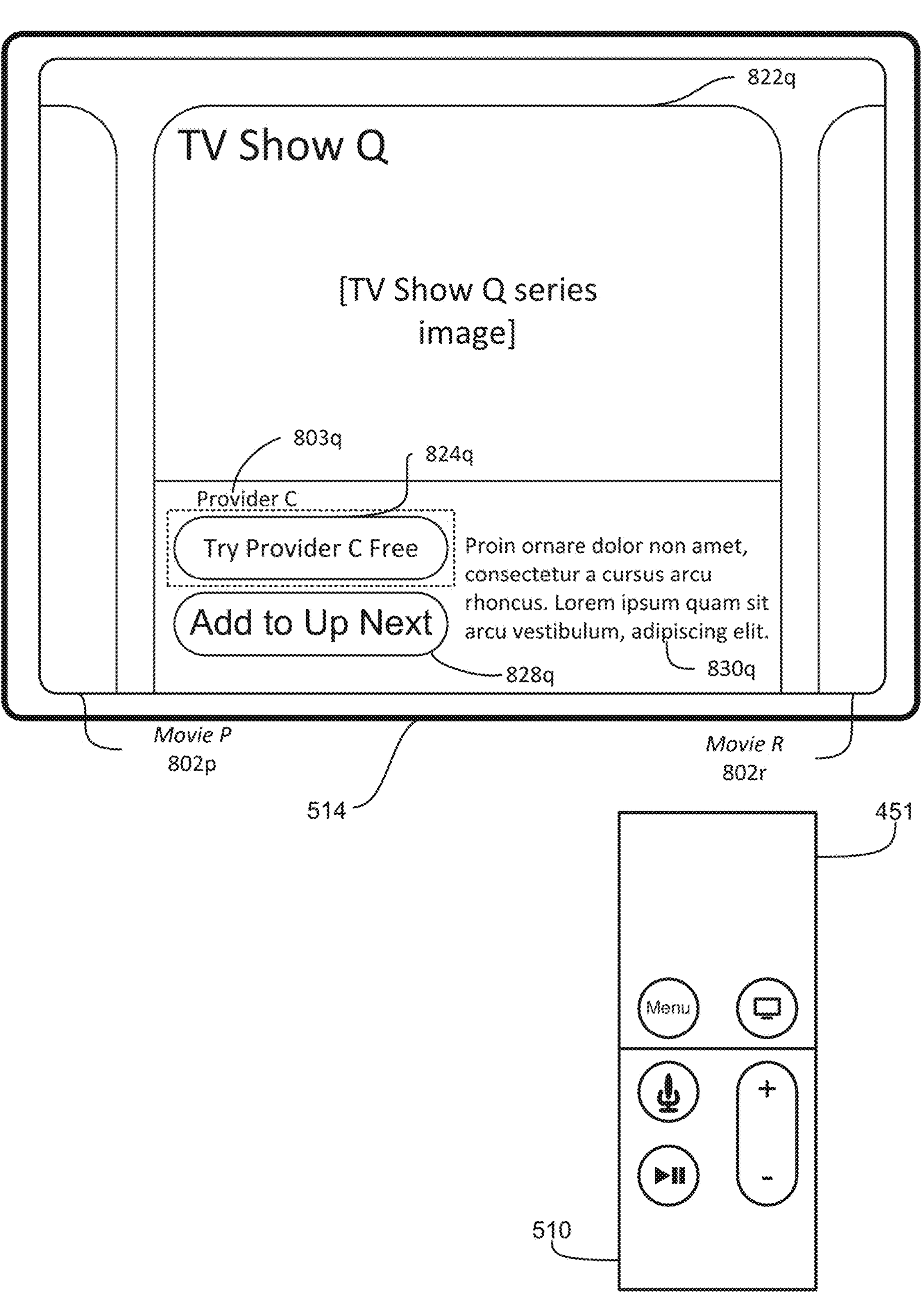

FIG. 8X illustrates representation 822*q* of an item of content that is only available through a channel to which the electronic device 500 is not yet subscribed. The representation 822*q* includes an indication 803*q* of the channel that provides access to the content and a selectable option 824*q* to initiate a process to subscribe to the channel and access the content. In response to detecting selection of selectable option 824*q*, the electronic device 500 presents a user interface similar to the user interface illustrated in FIG. 8M.

Figure 8Y:
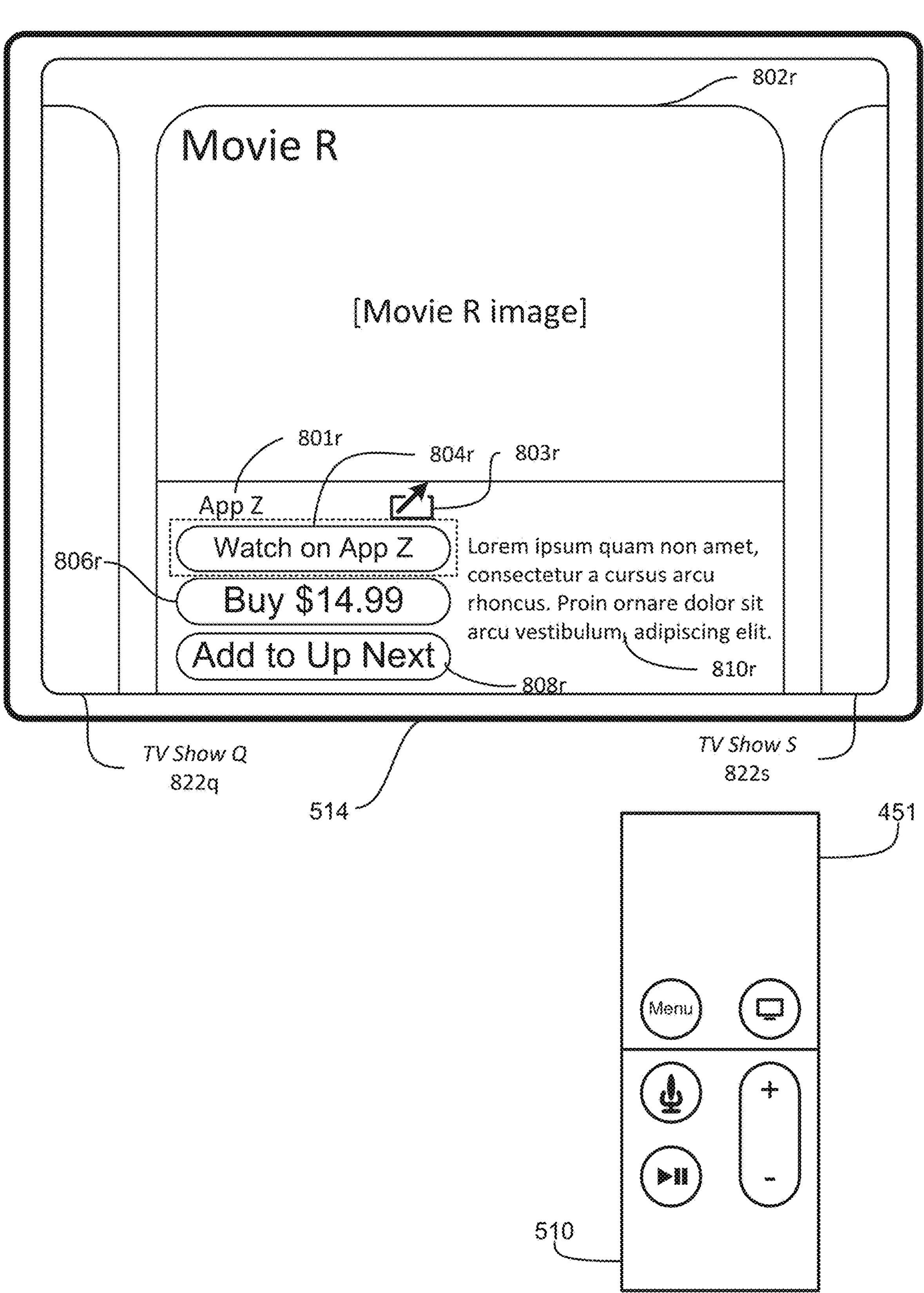

FIG. 8Y illustrates a representation 802*r* of an item of content that is available from an application other than the media browsing application and for purchase from the content store. The representation 802*r* includes a selectable option 804*r* to watch the content with the other application, a selectable option 806*r* to buy the content, an indication 801*r* of the application that provides access to the content and an indication 805*r* that selecting portion 804*r* will play the content in a different application. In response to detecting selection of selectable option 804*r*, the electronic device 500 presents the content in the other application, in a manner similar to the manner described above with reference to FIG. 8Q. In response to detecting selection of selectable option 806*r*, the electronic device 500 presents a user interface similar to the user interface illustrated in FIG. 8V.

Figure 8Z:
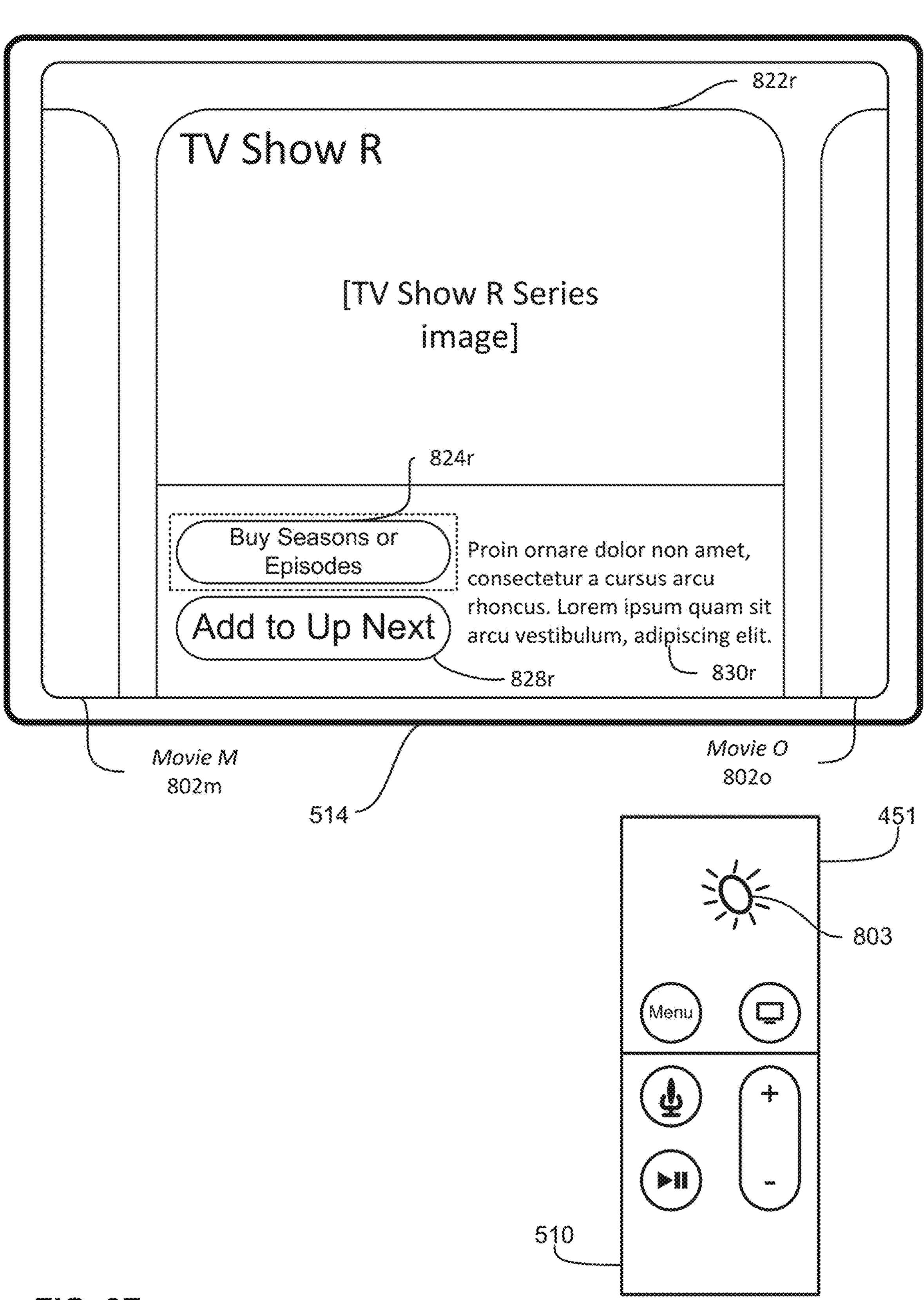
Figure 8A:
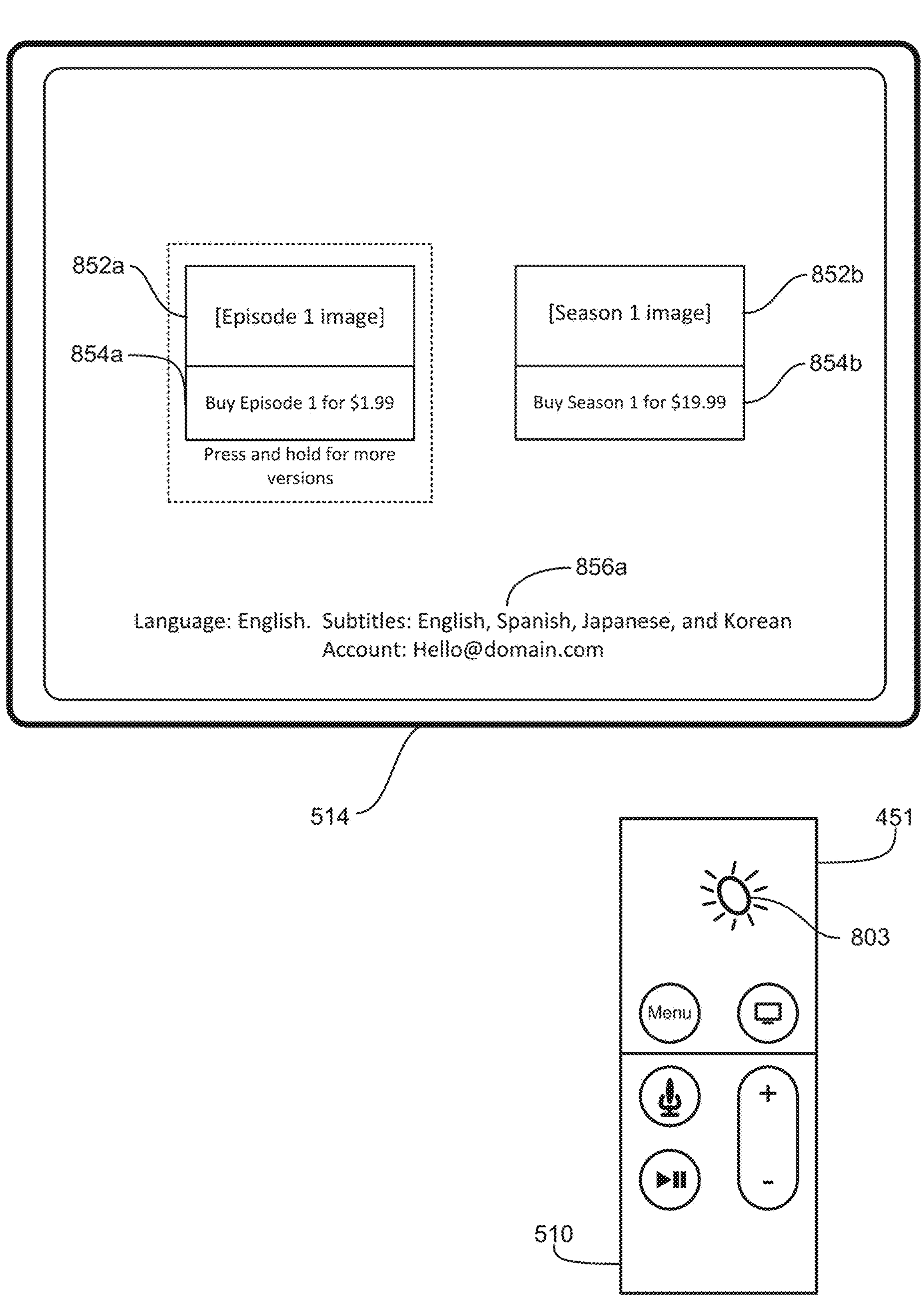
Figure 8B:
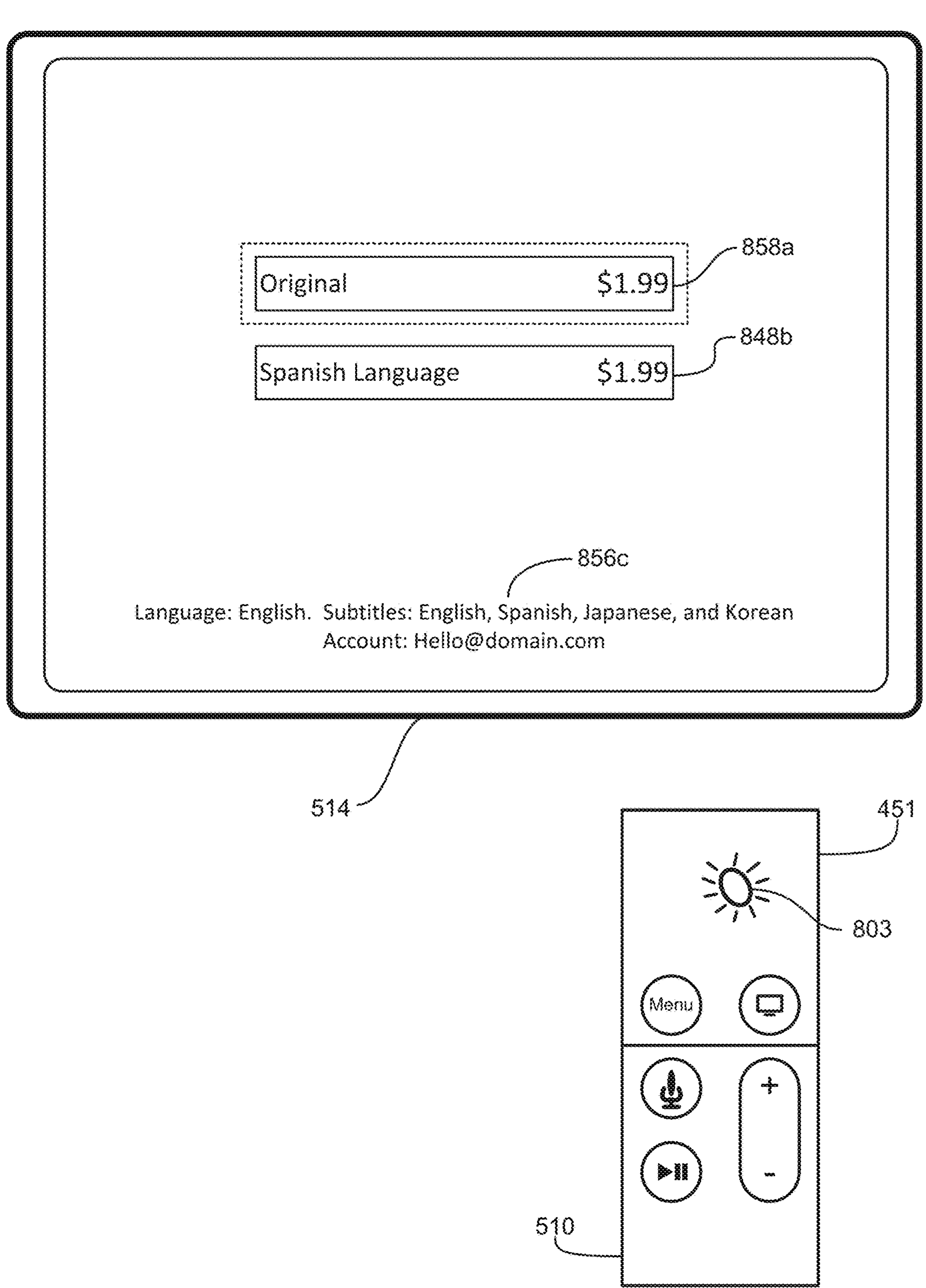
Figure 8C:
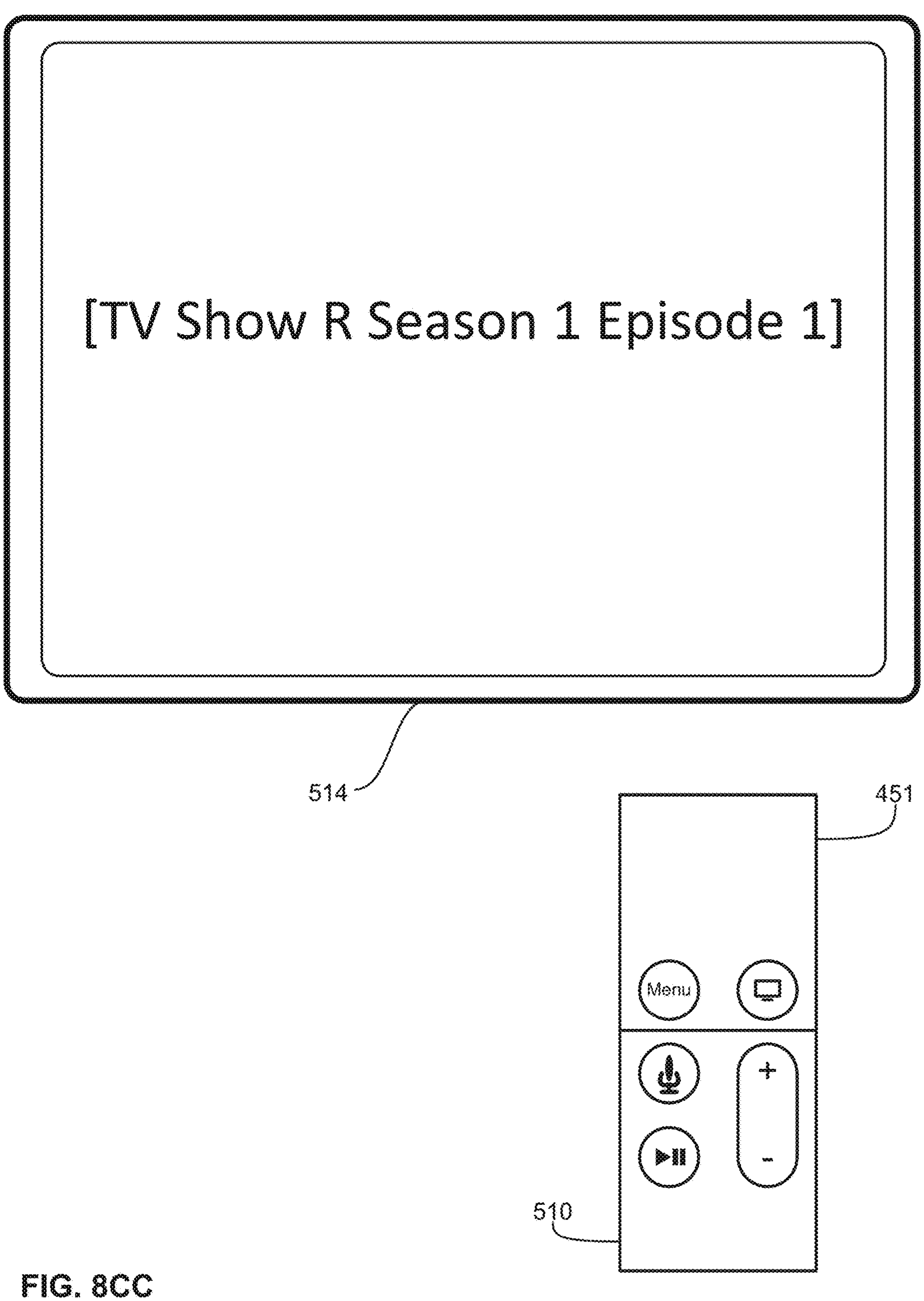
Figure 8D:
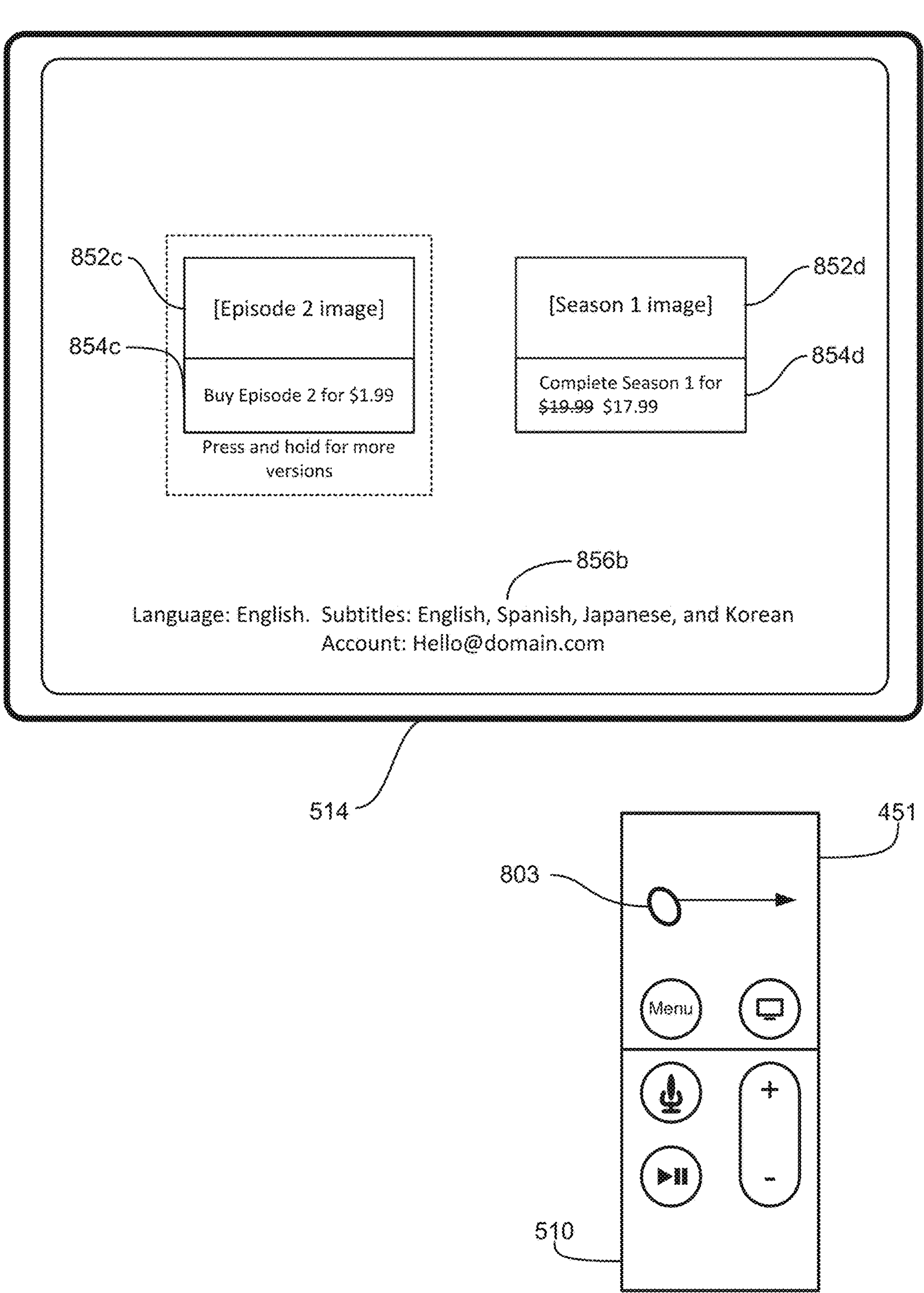
Figure 8E:
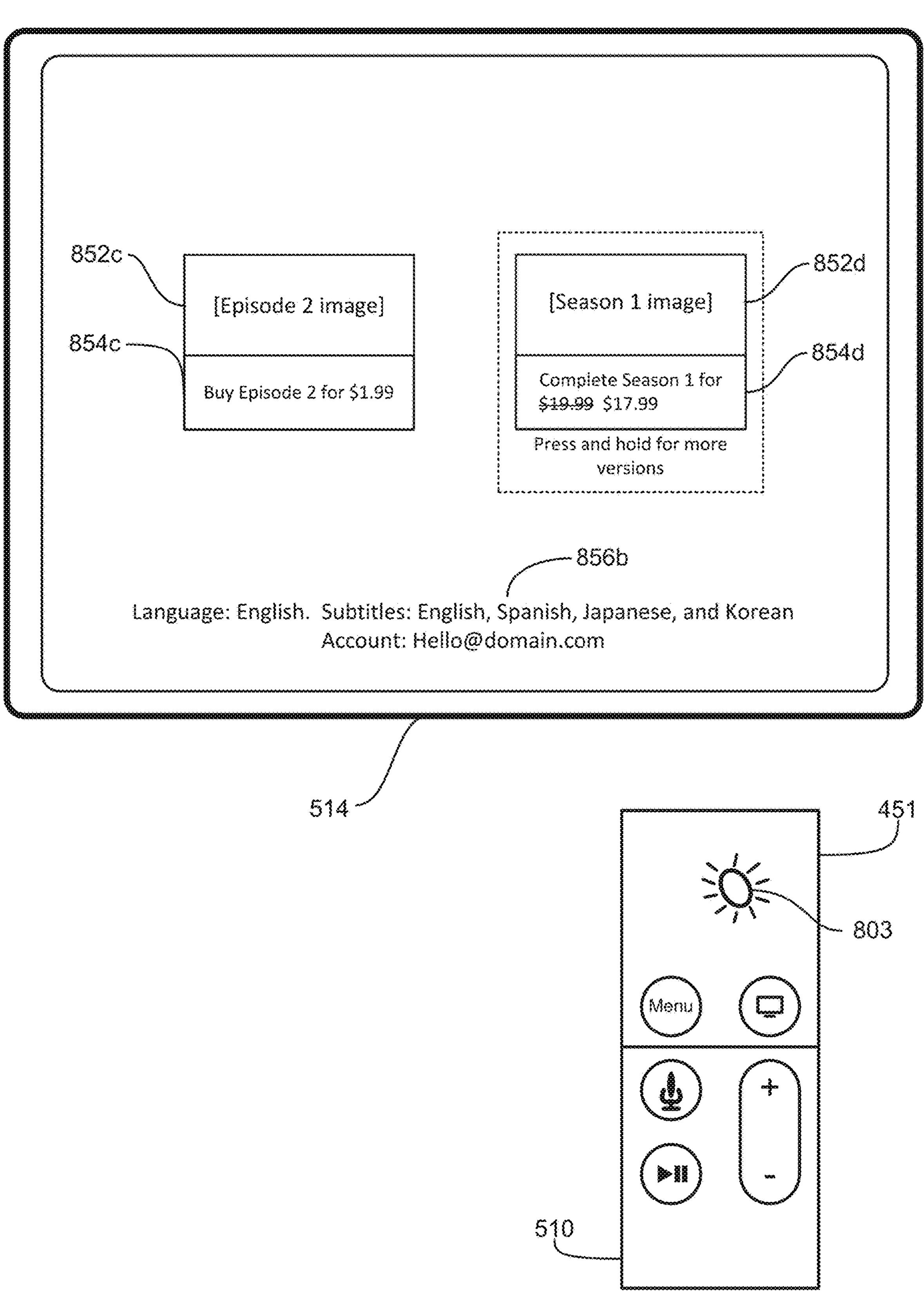
Figure 8F:
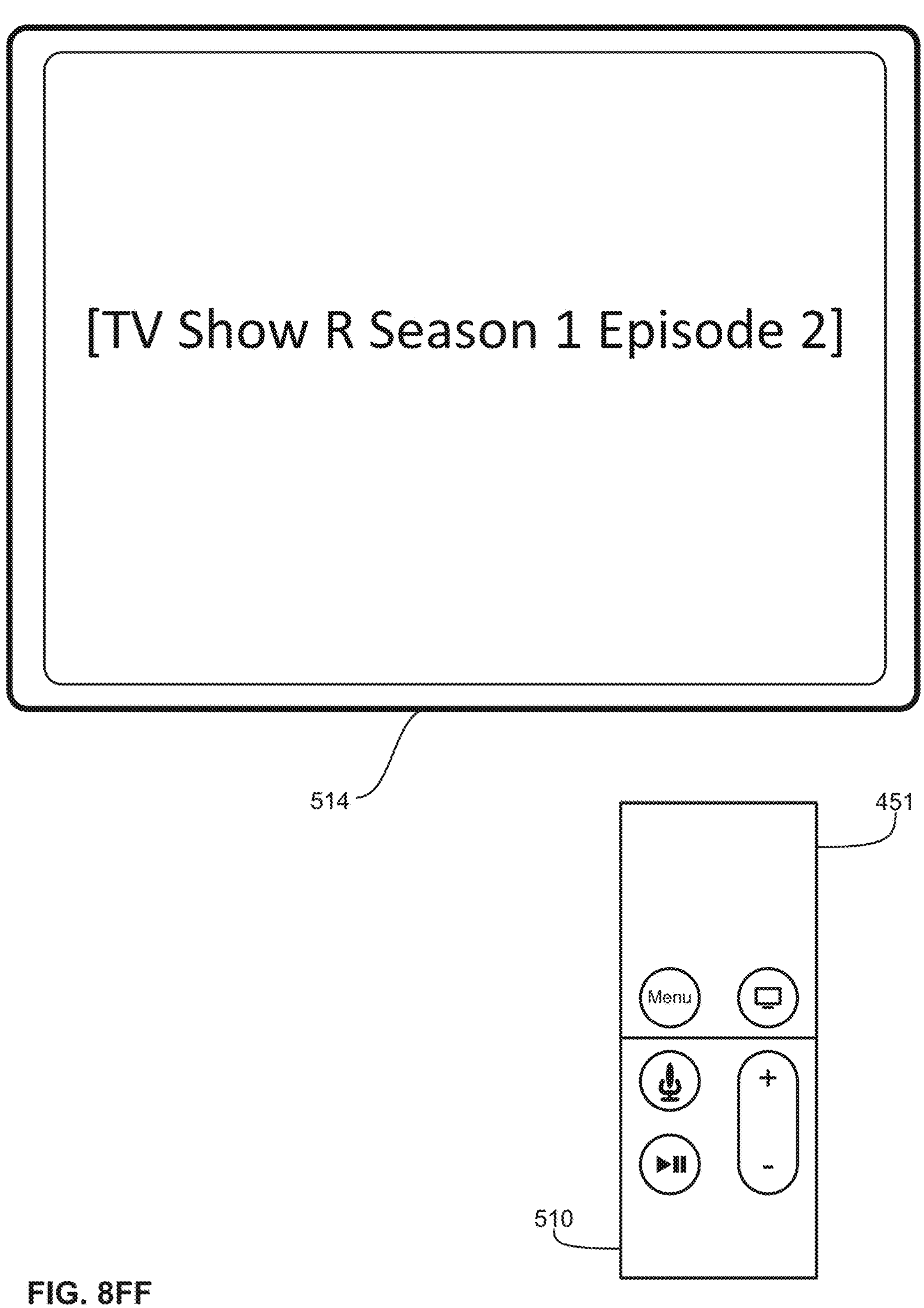
Figure 8G:
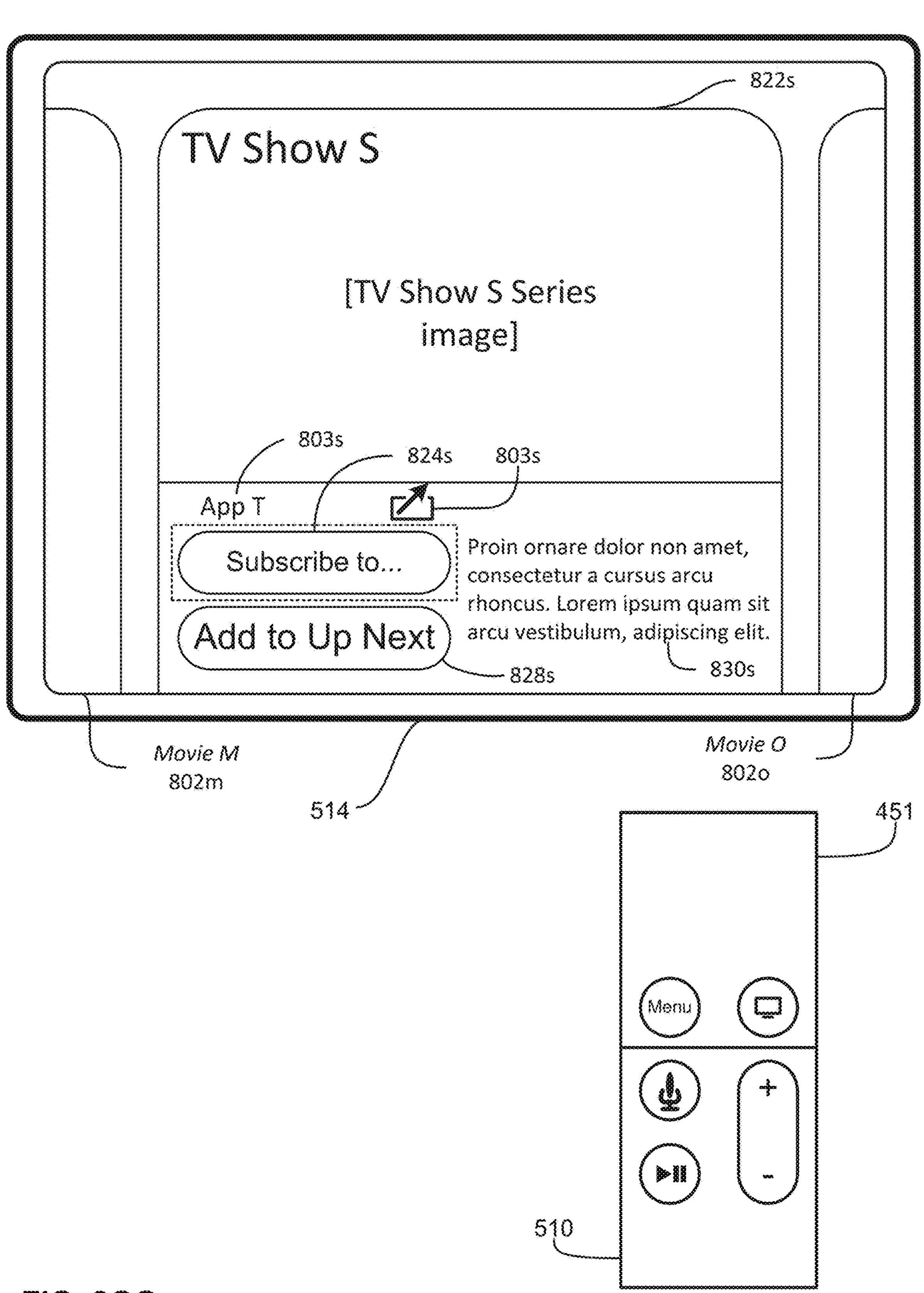
Figure 8H:
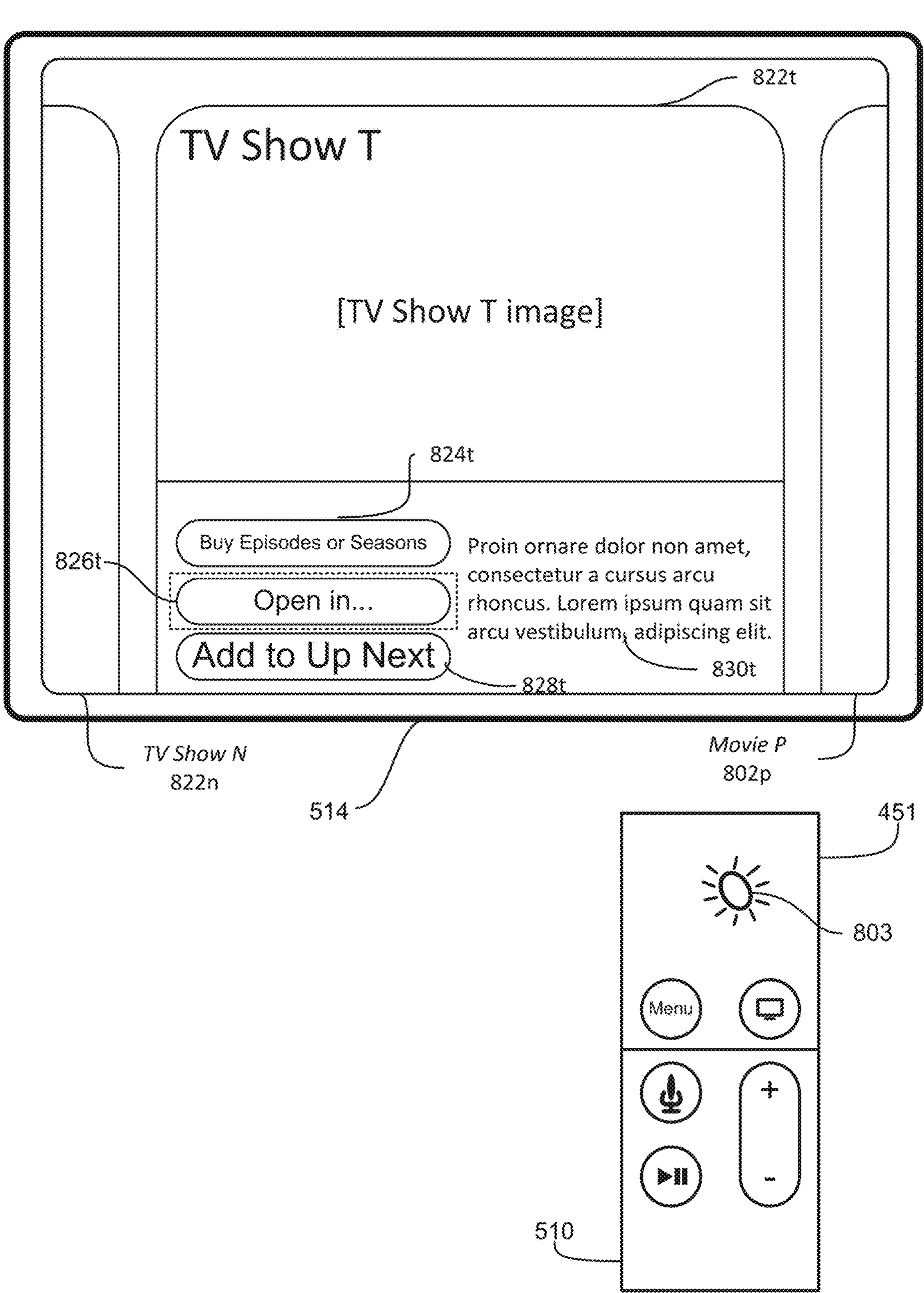
Figure 8I:
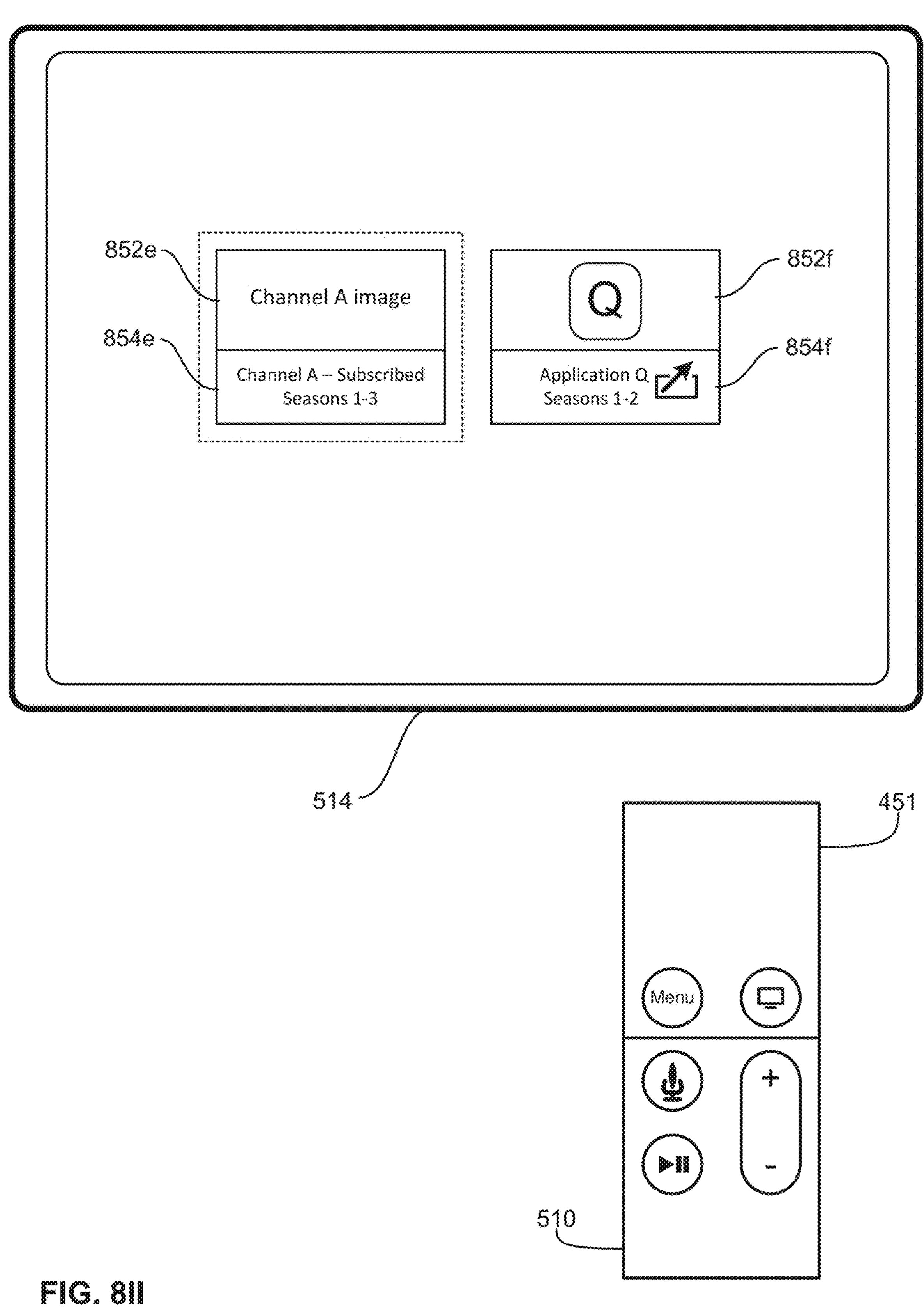
Figure 8J:
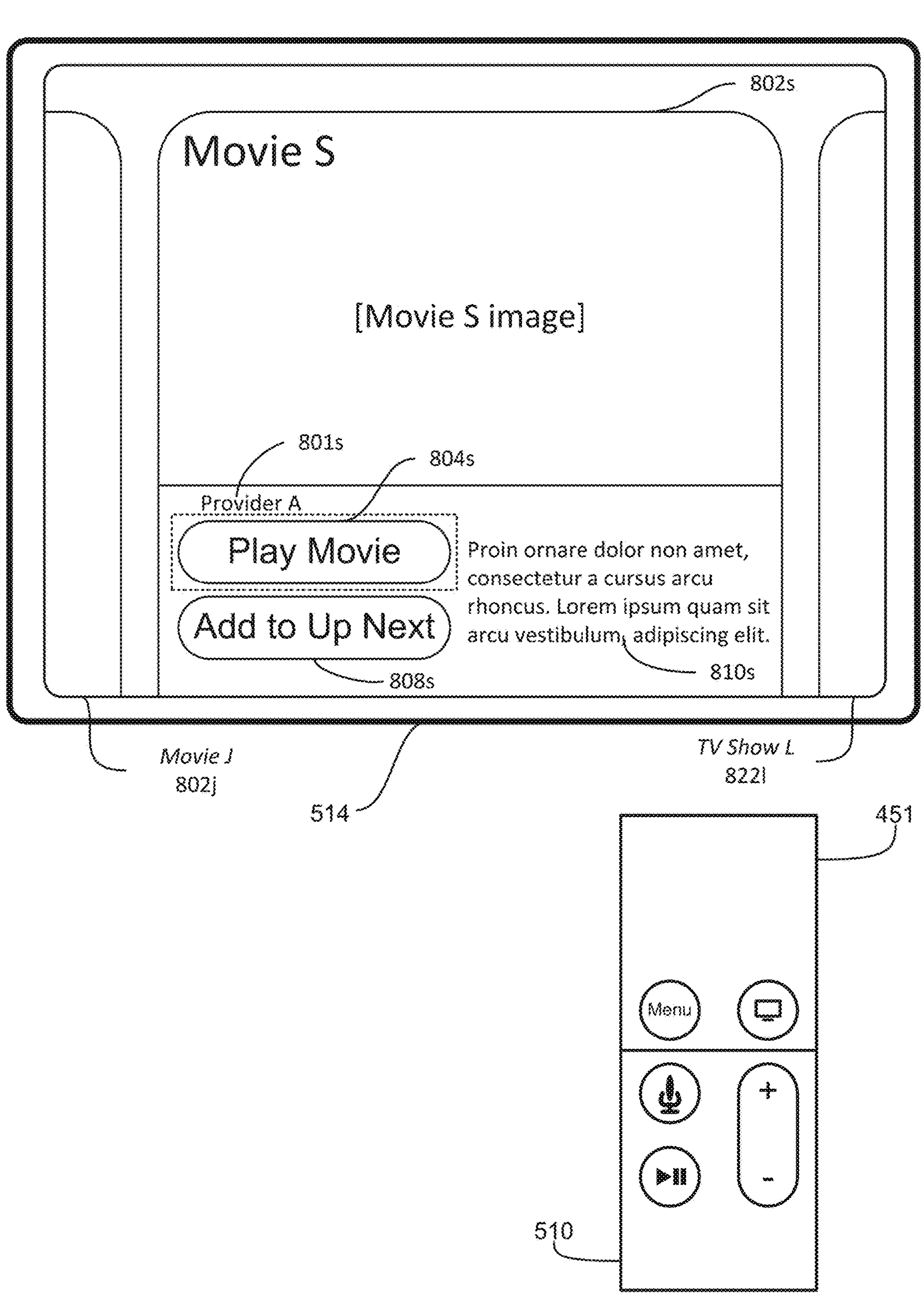
Figure 8K:
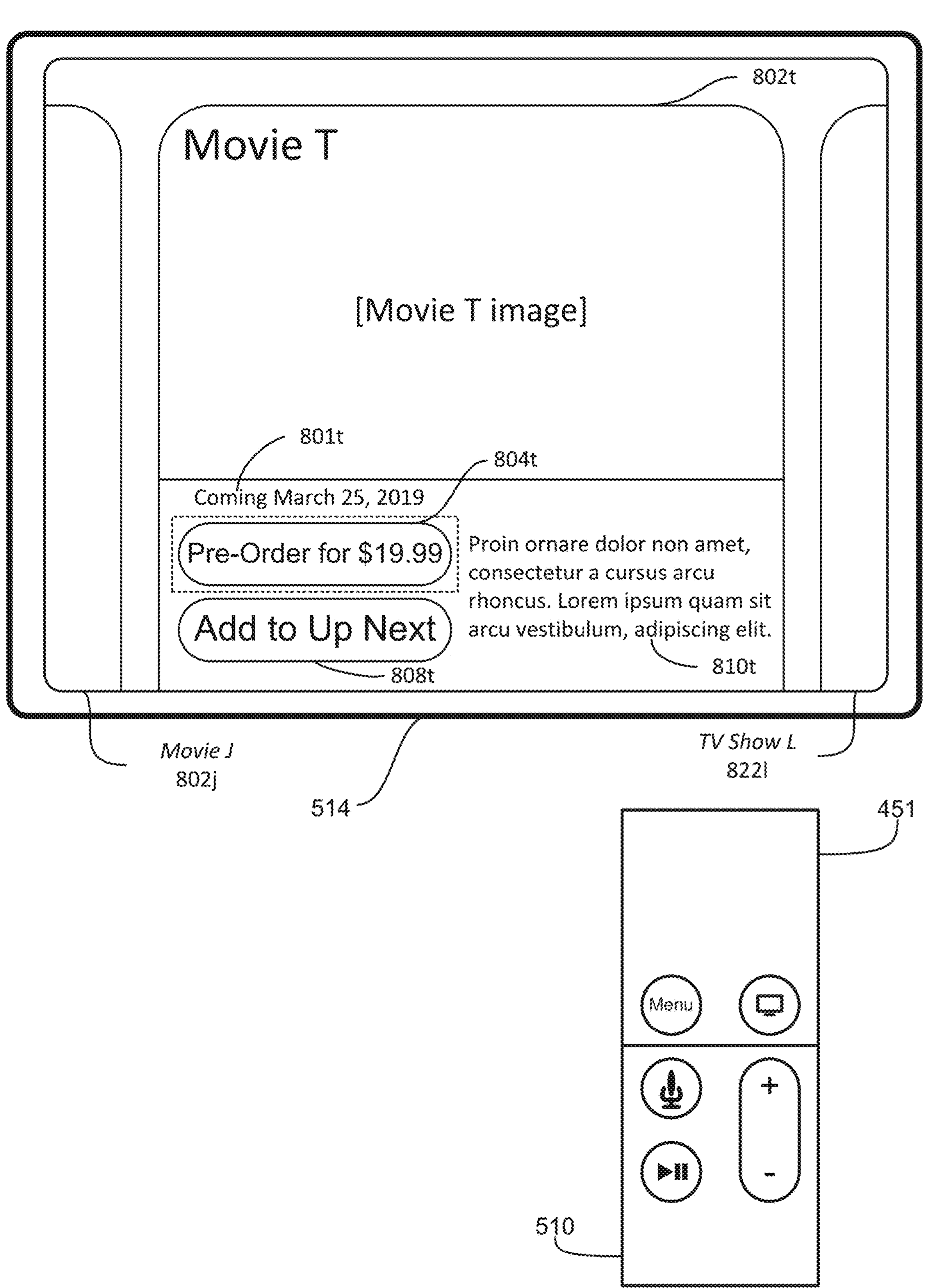
Figure 8L:
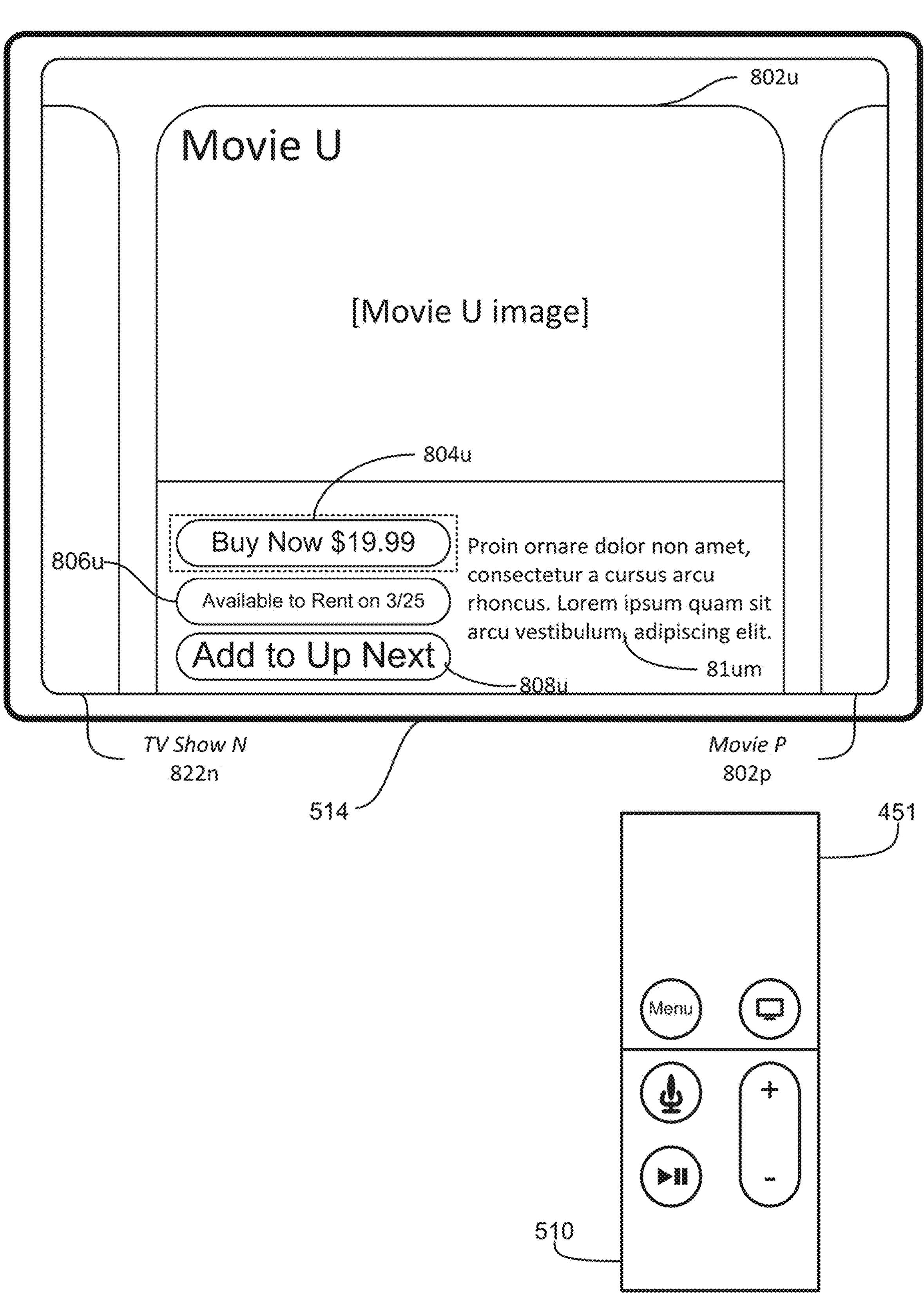
Figure 9C:
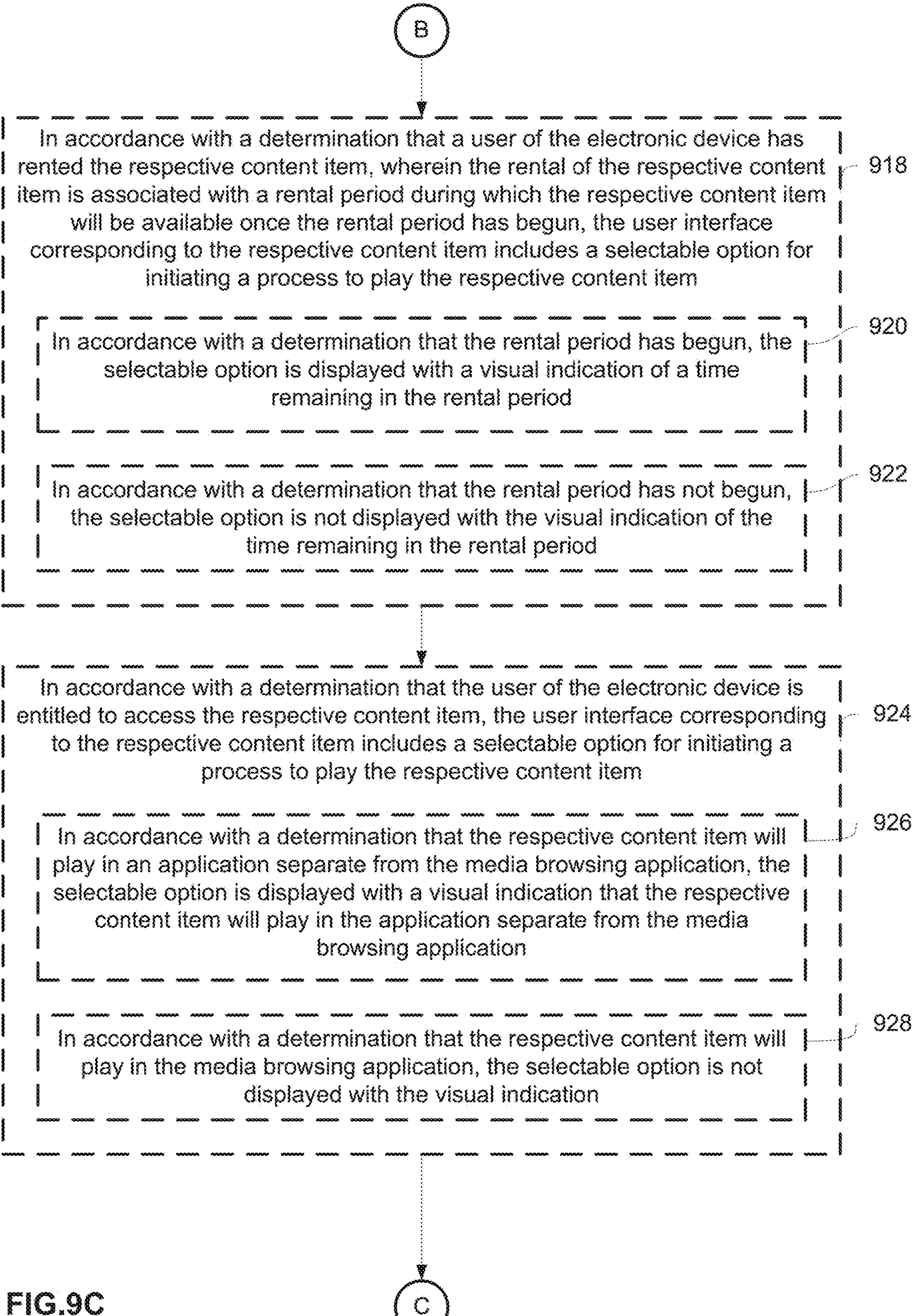
Figure 9D:
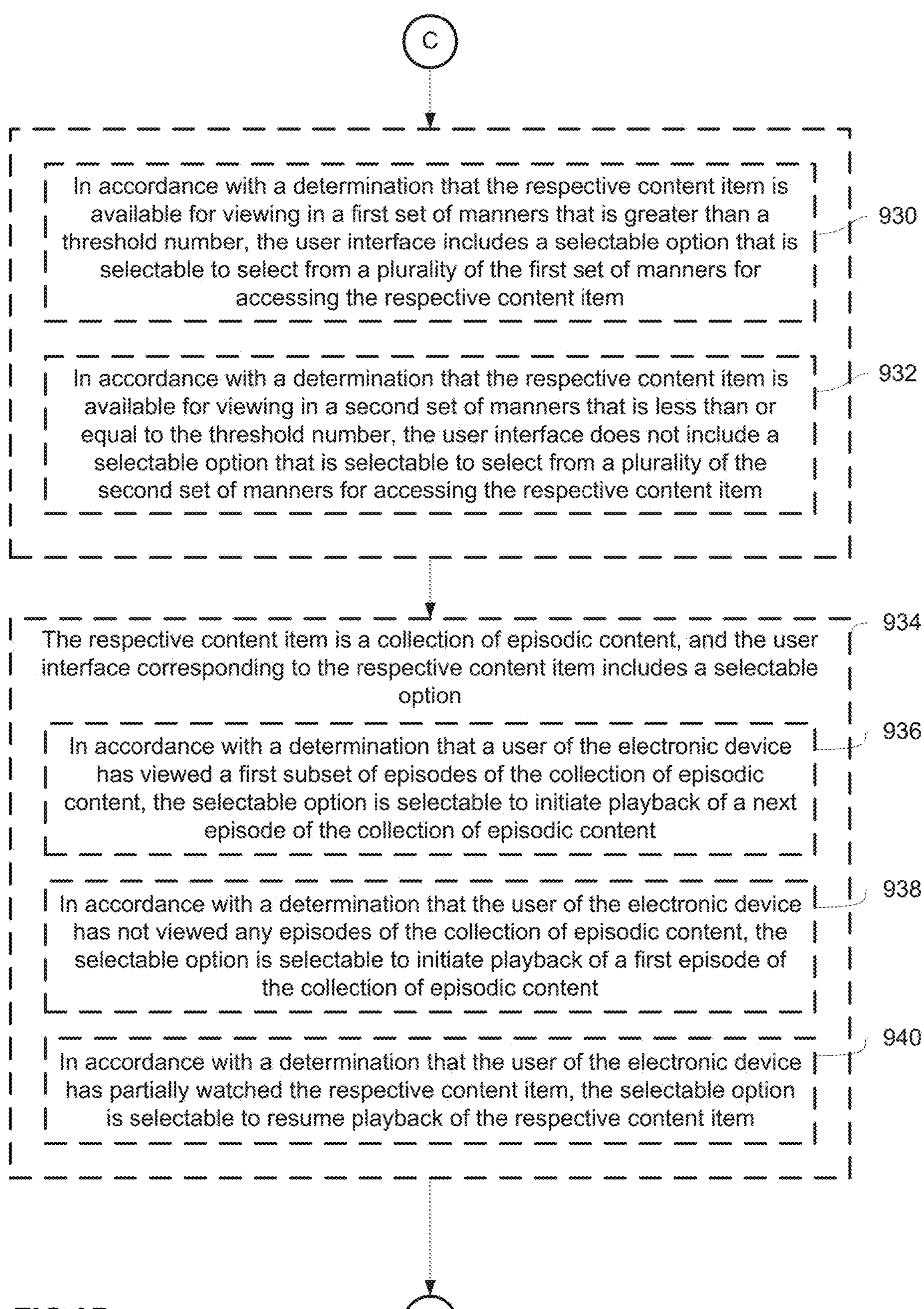
Figure 9E:
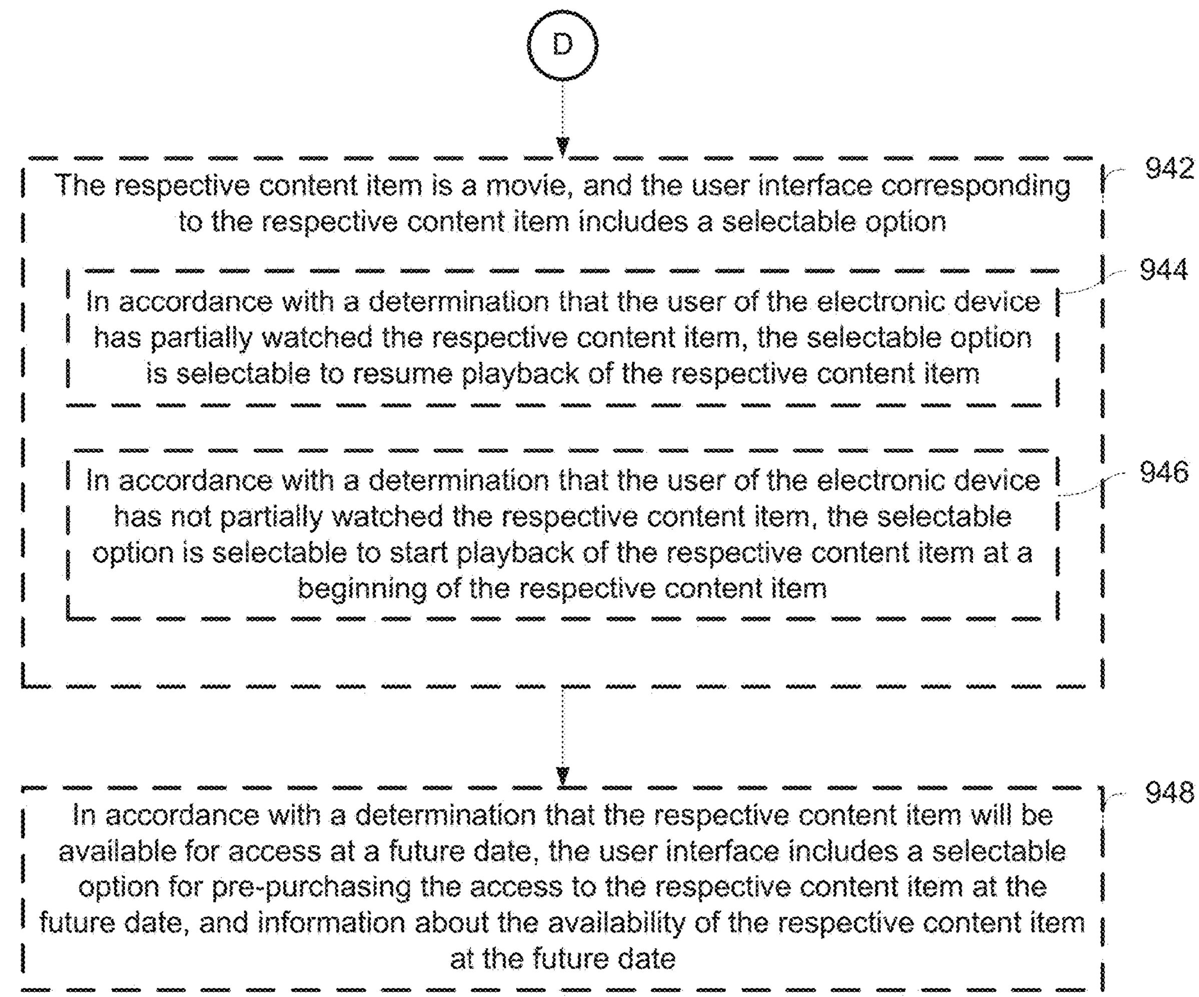

FIG. 8Z illustrates a representation 822*r* of a series of episodic content that is available for purchase through the content store. The representation 822*r* includes a selectable option 824*r* to present a user interface including purchasing options for the series of episodic content. The user selects (e.g., with contact 803) the representation 824*r* and, in response to the user's selection, the electronic device 500 presents the user interface illustrated in FIG. 8AA.

FIG. 8AA illustrates a user interface for purchasing an episode or a season of episodic content. The user interface includes a selectable option 852*a* to purchase an episode of the series and a selectable option 842*b* to purchase a season of the series. Selectable option 852*a* includes an image representing the episode and text 854*a* that indicates the terms of purchasing the episode of the series. Selectable option 852*b* includes an image representing the series and text 854*b* that indicates the terms of purchasing the series. The user interface further includes an indication 856*a* of the language and subtitles available for the content and an indication of the account with which the content will be purchased from the content store. If the user were to select option 852*a* or 852*b*, the electronic device 500 initiates a process to purchase the respective item of content in a manner similar to that described below with reference to FIGS. 8EE-8FF. As shown in FIG. 8AA, the user selects and holds (e.g., for longer than a threshold time, such as 1, 3 or 5 seconds) selection of the option 852*a*. In response, the electronic device 500 presents a user interface for selecting a version of the content to purchase, as shown in FIG. 8BB.

FIG. 8BB illustrates a user interface for selecting a version of content to purchase. The user interface includes a selectable option 858*a* indicating a first version of the content and a selectable option 848*b* indicating a second version of the content. While the current focus is on option 858*a*, the electronic device presents an indication 856*c* of the language and subtitles of the first version of content. If the user were to swipe down to move the focus to the other option 848*b*, the user interface would update to present the language and subtitles of the second version.

A user interface similar to the user interface illustrated in FIG. 8BB is presented in response to selection of option 838*h* illustrated in FIG. 8B. In some embodiments, the user interface presented in FIG. 8H includes a mechanism (e.g., a selectable option or the ability to select and hold option 834*j* or 836*j*) for presenting a user interface similar to the user interface illustrated in FIG. 8BB.

Returning to FIG. 8BB, the user selects (e.g., with contact 803) option 858*a*. In response to the user's selection, the electronic device 500 plays the first episode of the content series, which was purchased by the user, as shown in FIG. 8CC.

Returning to FIG. 8Z, if the user were to select selectable option 824*r* again after purchasing and watching the first episode in the series of episodic content, the electronic device presents the user interface illustrated in FIG. 8DD.

As shown in FIG. 8DD, the user interface includes a selectable option 852*c* to purchase the next episode in the series of content and a selectable option 852*d* to purchase a season of the series of content. As shown in FIG. 8DD, because the user has already purchased an episode from the season of the series of content, the electronic device 500 is able to purchase the rest of the season for a discounted price, which is reflected in the selectable option 852*d* for purchasing the season of content. Also shown in FIG. 8DD, the user swipes (e.g., with contact 803) horizontally in the user interface. In response to the user's input, the electronic device 500 moves the current focus to the option 852*d* to purchase the rest of the season, as shown in FIG. 8EE.

In FIG. 8EE, the user selects (e.g., with contact 803) the option 852*d* to purchase the rest of the series of content. In response to the user's selection, as shown in FIG. 8FF, the electronic device 500 presents the next episode in the series of episodic content. If the user were to press and hold option 852*c* or 852*d*, the electronic device 500 presents a version selection user interface similar to the version selection user interface described above with reference to FIG. 8BB.

FIG. 8GG illustrates a representation 822*s* of an item of content that is accessible via an application (other than the media browsing application in which representations 822 are displayed) to which the user is not subscribed. The user interface includes a selectable option 824*s* to initiate the process of downloading, opening, and subscribing to the other application, an indication 803*s* of the other application, and an indication 803*s* that selecting option 824*s* will cause the electronic device 500 to cease displaying the media browsing application and display the other application instead.

FIG. 8HH illustrates a representation 822*t* of an item of content that is accessible by purchasing seasons or episodes from the content store or through one or more channels or other applications (other than the media browsing application in which representations 822 are displayed). The user interface includes a selectable option 824*t* to buy seasons or episodes of the content and a selectable option 826*t* to view other options for accessing the content. In response to detecting selection of option 824*t*, the electronic device 500 presents a user interface similar to the user interface illustrated in FIG. 8AA. As shown in FIG. 8HH, the user selects (e.g., with contact 803) the option 826*t* to view the other options for accessing the content. In response to detecting the user's selection, the electronic device presents the user interface illustrated in FIG. 8II.

As shown in FIG. 8II, in response to the user's selection in FIG. 8HH, the electronic device 500 presents a selectable option 852*e* to access the content through a channel to which the user is subscribed and a selectable option 852*f* to access the content through another application (other than the media browsing application). Option 852*e* includes an indication 854*e* of the subscription status of the channel and which seasons of the content are available via the channel, as well as an image representing the channel. Option 852*f* includes an indication 854*f* of the application, which seasons of the content are available through the application, an indication that selecting option 852*f* will cause the electronic device 500 to open a different application, and an icon that represents the other application.

FIG. 8JJ illustrates a representation 802*s* of an item of content that is accessible via a channel to which the user is subscribed. The representation 802*s* includes an indication 801*s* of the channel that provides access to the content and a selectable option 804*s* to play the content.

FIG. 8KK illustrates a representation 802*t* of an item of content that is available for pre-order from the content store. The representation 802*t* includes an indication 801*t* of the date when the content will be available for viewing and a selectable option 804*t* to pre-order the content. In response to detecting selection of selectable option 804*t*, the electronic device 500 presents a user interface for purchasing the content that is similar to the user interface illustrated in FIG. 8B. In response to successfully purchasing the content, the electronic device 500 does not play the content because the content is not yet available. Pre-ordering the content entitles the user to view the content on and after the day it is available.

FIG. 8LL illustrates a representation 802*u* of an item of content that is currently available to purchase from the content store and will become available to rent from the content store on a future date. The representation 802*u* includes a selectable option 804*u* to buy the content from the content store and an indication 806*u* of the date on which the content is available to rent.

FIGS. 9A-9E are flow diagrams illustrating a method of presenting selectable options for initiating a process to access an item of content based on the available ways of accessing the content in accordance with some embodiments of the disclosure. The method 900 is optionally performed at an electronic device such as device 100, device 300, device 500, device 501, device 510, and device 511 as described above with reference to FIGS. 1A-1B, 2-3, 4A-4B and 5A-5C. Some operations in method 900 are, optionally combined and/or order of some operations is, optionally, changed.

As described below, the method 900 provides ways to present selectable options for initiating a process to access an item of content based on the available ways of accessing the content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 8J an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510 displays (902), on the display, a user interface of a media browsing application. In some embodiments, the user interface includes a plurality of representations of items of content that, when selected, cause the electronic device to present a user interface specific to the selected item of content.

In some embodiments, such as in FIG. 8J, while displaying the user interface of the media browsing application, the electronic device receives (904), via the one or more input devices 510, an input corresponding to a request to view a user interface corresponding to a respective content item accessible via the media browsing application (e.g., the swipe input illustrated in FIG. 8J). In some embodiments, the input includes selection of one of the representations of items of content.

In some embodiments, such as in FIG. 8K, in response to receiving the input, the electronic device 500 displays (906), on the display 514, the user interface corresponding to the respective content item. In some embodiments, the user interface includes information about the item of content, including information about accessing the item of content, a trailer of the item of content, a summary of the item of content, etc.

In some embodiments, such as in FIG. 8K, in accordance with a determination that the respective content item is available for viewing via a first set of one or more sources, the user interface includes a first set of one or more selectable options 824*k* and 826*k* selectable for initiating a first set of one or more processes for accessing the respective content item (908). In some embodiments, the first set of one or more sources include channels that provide content that plays in the media browsing application, applications other than the media browsing application that provide content, a content store that enables users to purchase content to play in the media browsing application. For example, if the content is available for purchase through the content store, the user interface includes a selectable option for purchasing the content. As another example, if the content is available for rent through the content store, the user interface includes a selectable option for renting the content. As another example, if the content is available through a channel that provides content that plays in the media browsing application, the user interface includes a selectable option to subscribe to the channel if the user is not yet subscribed or an option to play the content with the channel if the user is already subscribed to the channel.

In some embodiments, such as in FIG. 8P, in accordance with a determination that the respective content item is available for viewing via a second set of one or more sources, different than the first set of one or more sources, the user interface includes a second set of one or more selectable options 824*l*, different than the first set of one or more selectable options, selectable for initiating a second set of one or more processes for accessing the respective content item, different than the first set of one or more processes (910). In some embodiments, the first set of selectable options and the second set of selectable options each include a selectable option to add the item of content to a content playback queue.

The above-described manner of presenting a set of one or more selectable options that correspond to the sources of the content allows the electronic device to indicate to the user the ways in which the content is available and provide selectable options for gaining access to the content in the ways the content is available, which simplifies the interaction between the user and the electronic device and enhances the operability of the electronic device and makes the user-device interface more efficient (e.g., by informing the user how the content will be accessed before the user accesses the content), which additionally reduces power usage and improves battery life of the electronic device by enabling the user to use the electronic device more quickly and efficiency, such as by reducing user error of viewing content through a source the user does not intend to access (e.g., accidentally starting a subscription to a channel or accidentally purchasing content.

In some embodiments, such as in FIG. 8U, the respective content item is available for viewing via the first set of sources (e.g., one or more channels, one or more applications other than the media browsing application, and/or a content store application), the first set of sources includes more than a threshold number of sources, and the first set of selectable options 804*o* and 806*o* consists of no more selectable options than the threshold number of sources (912) (e.g., 1, 2, 3, etc.). For example, the respective content item is available for viewing via Channel A, Application Q, and by purchasing the respective content item using the content store. The electronic device optionally presents no more than two selectable options for accessing the respective item of content. In some embodiments, the electronic device presents an option to buy the content from the content store and an option to view the other ways in which the content is accessible (e.g., Channel A and Application Q). In response to detecting selection of the option to view the other ways in which the content is accessible, the electronic device optionally presents a user interface that includes a selectable option to access the content using Channel A and a selectable option to access the content using application Q.

The above-described manner of presenting no more than a maximum number of selectable options for viewing the content allows the electronic device to conserve display space for other information about the respective content item, which simplifies the interaction between the user and the electronic device and enhances the operability of the electronic device and makes the user-device interface more efficient (e.g., by increasing the amount of information that the user is able to view in the user interface that is specific to the respective content item, thereby reducing the number of user inputs needed to access the information), which additionally reduces power usage and improves battery life of the electronic device by enabling the user to use the electronic device more quickly and efficiency.

In some embodiments, such as in FIG. 8O, in accordance with a determination that the user of the electronic device 500 is entitled to access the respective content item using a first source, and the respective content item is additionally available for viewing from one or more second sources, the user interface corresponding to the respective content item includes a selectable option 824*k* for initiating a process to access the respective content item from the first source, but does not include one or more selectable options 824*k* illustrated in FIG. 8L for accessing the respective content item from the one or more second sources (914). In some embodiments, the user subscribes to a channel that provides the content, the user subscribes to an application other than the media browsing application that provides the content, the user has purchased the content from a content store, or the user rented the content item from the content store and the rental period is still active. For example, the item of content is accessible via a subscription to Channel A and accessible if purchased from the content store and the user is subscribed to Channel A and has not purchased the content item from the content store. The electronic device optionally presents a selectable option to play the content in the media browsing application with Channel A and optionally does not present a selectable option to purchase the content from the content store even though the content is available via the content store.

The above-described manner of presenting a selectable option to play the content through a source the user is entitled to access and forgoing presenting a selectable option to play the content through a source the user is not entitled to access allows the electronic device to reduce the chance of the user making an error of selecting the selectable option associated with a source the user is not entitled to access when a source the user is entitled to access is available, which simplifies the interaction between the user and the electronic device and enhances the operability of the electronic device and makes the user-device interface more efficient (e.g., by reducing the chance for user error), which additionally reduces power usage and improves battery life of the electronic device by enabling the user to use the electronic device more quickly and efficiency.

In some embodiments, such as in FIG. 8O, in accordance with a determination that content from the first source is available to be played within the media browsing application (e.g., a channel that provides content that plays in the media browsing application), the selectable option 824*k* is displayed with a visual indication 830*k* of an identity of the first source (916). In some embodiments, the electronic device presents text or an image representing the source on or adjacent to the selectable option to play the content.

The above-described manner of presenting an indication of the first source of the content item allows the electronic device to communicate to the user the source of the content in the user interface including a selectable option to access the content, which simplifies the interaction between the user and the electronic device and enhances the operability of the electronic device and makes the user-device interface more efficient (e.g., by reducing the number of inputs needed to navigate between a user interface that includes a selectable option to play the content and a user interface that includes an indication of the source of the content), which additionally reduces power usage and improves battery life of the electronic device by enabling the user to use the electronic device more quickly and efficiency.

In some embodiments, such as in FIG. 8J, in accordance with a determination that a user of the electronic device 500 has rented the respective content item (e.g., from the content store), wherein the rental of the respective content item is associated with a rental period during which the respective content item will be available once the rental period has begun (e.g., 24 hours, 48 hours, 36 hours, etc.), the user interface corresponding to the respective content item includes a selectable option **804*j* for initiating a process to play the respective content item (918). In some embodiments, such as in FIG. 8J, in accordance with a determination that the rental period has begun, the selectable option 804*j* is displayed with a visual indication 801*j* of a time remaining in the rental period (920). In some embodiments, the indication is presented on or adjacent to the selectable option to play the content. For example, the user has rented the content item from the content store and the rental period has begun and has some amount of time remaining. The electronic device optionally presents an indication of how much time is remaining in the rental period with the selectable option for initiating the process to play the respective content item. In some embodiments, in response to detecting selection of the selectable option, the electronic device plays the respective content item. In some embodiments, in accordance with a determination that the rental period has not begun, the selectable option is not displayed with the visual indication of the time remaining in the rental period (922), such as presenting FIG. 8J without indication 801*j*** if the user had rented the content but not began the rental period yet. In some embodiments, in response to detecting selection of the selectable option, the electronic device optionally plays the respective content item and begins the rental period.

The above-described manner of presenting an indication of how much time is remaining in the rental period of the respective content item allows the electronic device to communicate to the user how much time the user has to play the content item in a user interface that includes a selectable option to play the content item, which simplifies the interaction between the user and the electronic device and enhances the operability of the electronic device and makes the user-device interface more efficient (e.g., by reducing the number of inputs required to navigate between a user interface that includes an indication of the amount of time remaining in the rental period and a user interface that includes a selectable option to play the respective item of content), which additionally reduces power usage and improves battery life of the electronic device by enabling the user to use the electronic device more quickly and efficiency.

In some embodiments, such as in FIG. 8J, in accordance with a determination that the user of the electronic device 500 is entitled to access the respective content item, the user interface corresponding to the respective content item includes a selectable option **804*j* for initiating a process to play the respective content item (924). In some embodiments, the user is subscribed to a channel that provide access to the content item in the media browsing application, the user has purchased or rented the respective content item from the content store, or the user has access to an application that plays the content. In some embodiments, in response to detecting selection of the selectable option, the electronic device plays the respective content item. In some embodiments, such as in FIG. 8P, in accordance with a determination that the respective content item will play in an application separate from the media browsing application, the selectable option 824*l* is displayed with a visual indication 805*l* that the respective content item will play in the application separate from the media browsing application (926) (e.g., an icon representing opening an application other than the media browsing application). For example, if the respective item of content is accessible via a second application that is different from the media browsing application, the selectable option to play the respective item of content includes or is presented adjacent to the icon that represents that the electronic device will open a different application to play the content in response to selection of the selectable option. In some embodiments, such as in FIG. 8O, in accordance with a determination that the respective content item will play in the media browsing application, the selectable option 824*k* is not displayed with the visual indication (928**). In some embodiments, if the respective content item is provided by the content store or by a channel that provides content that plays in the media browsing application, the selectable option is presented without the icon that indicates that the electronic device will open a different application to play the content because the electronic device will play the content in the media browsing application in response to detecting selection of the selectable option.

The above-described manner of presenting a visual indication when the electronic device will open a different application to play the respective content item allows the electronic device to indicate to the user that a different application will be opened to play the respective content item, which simplifies the interaction between the user and the electronic device and enhances the operability of the electronic device and makes the user-device interface more efficient (e.g., by present the option to play the respective content item in the media browsing application rather than requiring the user to navigate to the other application to play the respective content item), which additionally reduces power usage and improves battery life of the electronic device by enabling the user to use the electronic device more quickly and efficiency.

In some embodiments, such as in FIG. 8HH, in accordance with a determination that the respective content item is available for viewing in a first set of manners (e.g., channels, applications, the content store) that is greater than a threshold number (e.g., 2, 3, etc.), the user interface includes a selectable option **826*t* that is selectable to select from a plurality of the first set of manners for accessing the respective content item (930). For example, the respective item of content is available to rent from the content store, to buy from the content store, and to view via a subscription to Channel A. In some embodiments, the electronic device presents a selectable option to view the respective content item with Channel A and a selectable option to buy or rent the respective item of content from the content store. In some embodiments, in response to detecting selection of the selectable option to buy or rent the respective item of content from the content store, the electronic device presents a user interface that includes a selectable option to rent the content and a selectable option to buy the content. In some embodiments, such as in FIG. 8X, in accordance with a determination that the respective content item is available for viewing in a second set of manners that is less than or equal to the threshold number, the user interface does not include a selectable option that is selectable to select from a plurality of the second set of manners for accessing the respective content item (932). FIG. 8X includes one option 824*q*** for accessing the content in one manner. If the number of manners of viewing the content is less than or equal to the threshold, the electronic device optionally presents a selectable option corresponding to each of the manners. For example, if the respective content item is available to purchase from the content store or to watch on Channel A, and is not available in any other manner and the threshold number of manners is two, the electronic device presents a selectable option to buy the content and a selectable option to watch the content on Channel A.

The above-described manner of combining two or more manners of accessing the content into one selectable option when the number of manners of accessing the content exceeds a predetermined threshold allows the electronic device to provide more manners of accessing the content than the predetermined threshold while presenting no more than the predetermined threshold number of selectable options, which simplifies the interaction between the user and the electronic device and enhances the operability of the electronic device and makes the user-device interface more efficient (e.g., by reducing the number of inputs needed to traverse all of the selectable options), which additionally reduces power usage and improves battery life of the electronic device by enabling the user to use the electronic device more quickly and efficiency, such as by reducing the number of inputs needed to access other information and content in the user interface.

In some embodiments, such as in FIG. 8O, the respective content item is a collection of episodic content (e.g., a television show), and the user interface corresponding to the respective content item includes a selectable option 924*k* (934) (e.g., a selectable option that, when selected, causes the electronic device to play the episodic content). In some embodiments, such as in FIG. 8O, in accordance with a determination that a user of the electronic device has viewed a first subset of episodes of the collection of episodic content, the selectable option 824*k* is selectable to initiate playback of a next episode of the collection of episodic content (936). For example, if the user has viewed the first three episodes of the episodic content, in response to detecting selection of the selectable option, the electronic device initiates playback of the fourth episode of the episodic content. In some embodiments, the selectable option includes text that indicates "Play next episode," or text that includes the episode number of the next episode, such as "Play episode 4," or "Play S1:E4". In some embodiments, such as in FIG. 8T, in accordance with a determination that the user of the electronic device 500 has not viewed any episodes of the collection of episodic content, the selectable option 824*n* is selectable to initiate playback of a first episode of the collection of episodic content (938). In some embodiments, in response to detecting selection of the selectable option, the electronic device initiates playback of the first episode of the episodic content. The selectable option optionally includes text indicating that selection of the selectable option will play the first episode of the content, such as "Play first episode" or "Play S1:E1". In some embodiments, such as in FIG. 8D, in accordance with a determination that the user of the electronic device 500 has partially watched the respective content item, the selectable option 804*h* is selectable to resume playback of the respective content item (940). In some embodiments, if the user has played an episode and left off at a playback position within the episode, in response to detecting selection of the selectable option, the electronic device initiates playback of the content at the playback position at which the user previously left off. The selectable option optionally includes text that indicates that selection of the selectable option will initiate playback at the previous playback position, such as text that says "Resume."

The above-described manner of playing the content at the previous playback position within the series or within an episode of the episodic content in response to detecting selection of the selectable option allows the electronic device to present the episodic content at the playback position at which the user left off without requiring additional inputs from the user to select the playback position, which simplifies the interaction between the user and the electronic device and enhances the operability of the electronic device and makes the user-device interface more efficient (e.g., by reducing the number of inputs needed to play the content at the previous playback position), which additionally reduces power usage and improves battery life of the electronic device by enabling the user to use the electronic device more quickly and efficiency.

In some embodiments, such as in FIG. 8D, the respective content item is a movie, and the user interface corresponding to the respective content item includes a selectable option 804*h* (942) (e.g., a selectable option that, when selected, causes the electronic device to play the respective content item). In some embodiments, such as in FIG. 8D, in accordance with a determination that the user of the electronic device 500 has partially watched the respective content item, the selectable option 804*h* is selectable to resume playback of the respective content item (944). In some embodiments, the selectable option is selectable to play the respective content item from the last playback position. The selectable option optionally includes text that indicates that selection of the selectable option will cause the electronic device to play the content from the previous playback position, such as "Resume." In some embodiments, such as in FIG. 8JJ, in accordance with a determination that the user of the electronic device 500 has not partially watched the respective content item, the selectable option 804*s* is selectable to start playback of the respective content item at a beginning of the respective content item (946). In some embodiments, the selectable option includes text that indicates that selection of the selectable option will cause the electronic device to play the content from the beginning, such as "Play."

The above-described manner of playing the content from the last playback position if the user has partially watched the content and playing the content from the beginning if the user has not watched the content allows the electronic device to reduce the number of inputs needed to play the content from the playback position at which the user left off without requiring additional user inputs to do so, which simplifies the interaction between the user and the electronic device and enhances the operability of the electronic device and makes the user-device interface more efficient (e.g., by reducing the number of user inputs needed to resume playing the content), which additionally reduces power usage and improves battery life of the electronic device by enabling the user to use the electronic device more quickly and efficiency.

In some embodiments, such as in FIG. 8KK, in accordance with a determination that the respective content item will be available for access at a future date, the user interface includes a selectable option 804*t* for pre-purchasing the access to the respective content item at the future date, and information 801*t* about the availability of the respective content item at the future date (948). In some embodiments, the selectable option includes text that indicates that selection of the selectable option will pre-purchase the content to provide access at a later date. For example, the selectable option includes text that says "Pre-order" and the price to pre-order the content and the user interface further includes an indication of the date at which the content will become available that is presented proximate to the selectable option.

The above-described manner of presenting the selectable option to pre-purchase the content along with an indication of when the content will become available for viewing allows the electronic device to present information about when the content will become available while presenting the selectable option to pre-order the content, which simplifies the interaction between the user and the electronic device and enhances the operability of the electronic device and makes the user-device interface more efficient (e.g., by reducing the number of inputs needed to navigate between a user interface that includes information about when the content will become available and a user interface that includes the selectable option to pre-purchase the content), which additionally reduces power usage and improves battery life of the electronic device by enabling the user to use the electronic device more quickly and efficiency.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, 1700, and 1900) are also applicable in an analogous manner to method 900 described above with respect to FIGS. 9A-9E. For example, the operation of the electronic device to present selectable options for accessing the content based on the available manners of accessing the content described above with reference to method 900 optionally has one or more of the characteristics of the presentation of presenting representations of content items, presenting representations of episodes of collections of episodic content, presenting an enhanced preview of an items of content, presenting a control panel, switching the active user of the device, and entering into a picture-in-picture mode, etc., described herein with reference to other methods described herein (e.g., methods 700, 1100, 1300, 1500, 1700, and 1900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIGS. 9A-9J are, optionally, implemented by components depicted in FIGS. 1A-1B. For example, displaying operations 902, 906, 916, 920, 922, 926, and 928 receiving operation 904 and initiating operations 908, 910, 914, 918, 924, 936, and 938 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Representations of Episodes in a Series of Episodic Content

Users interact with electronic devices in many different manners, including using an electronic device to view information about a series of episodic content. In some embodiments, an electronic device is able to present representations of the episodes in the series of episodic content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
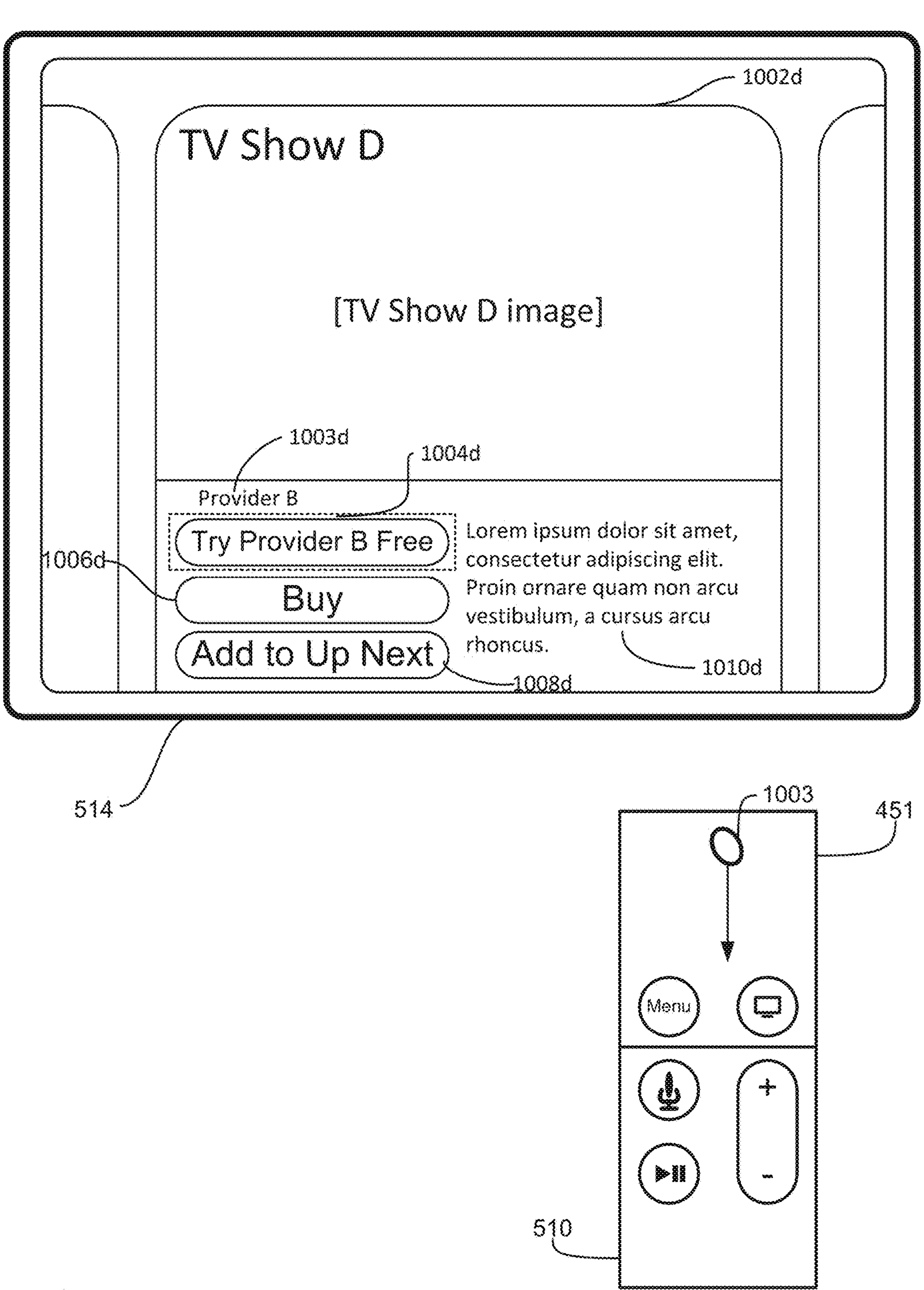
FIGS. 10A-10QQ illustrate exemplary ways in which an electronic device presents representations of episodes in a series of episodic content in accordance with some embodiments of the disclosure.
Figure 10B:
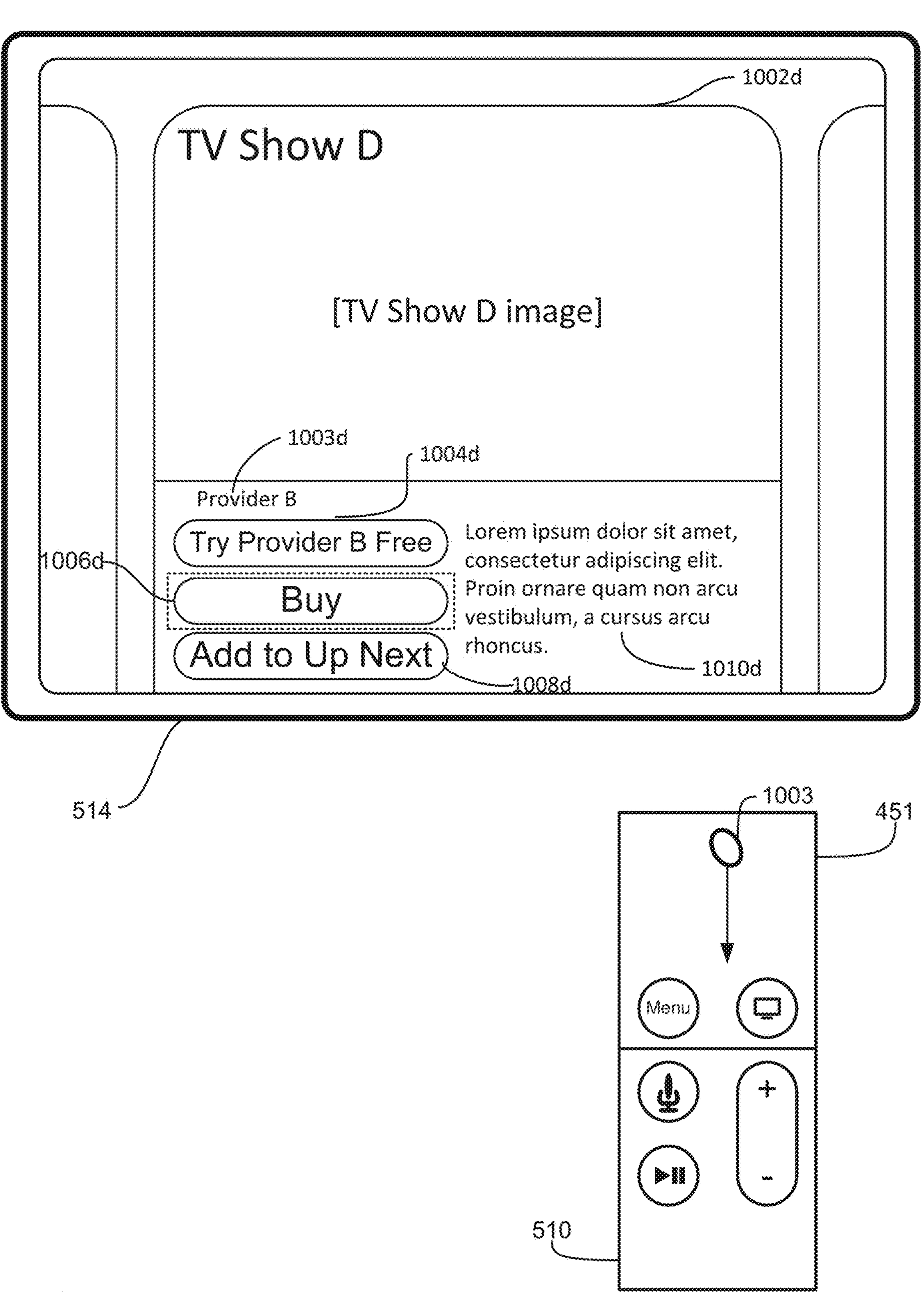
Figure 10C:
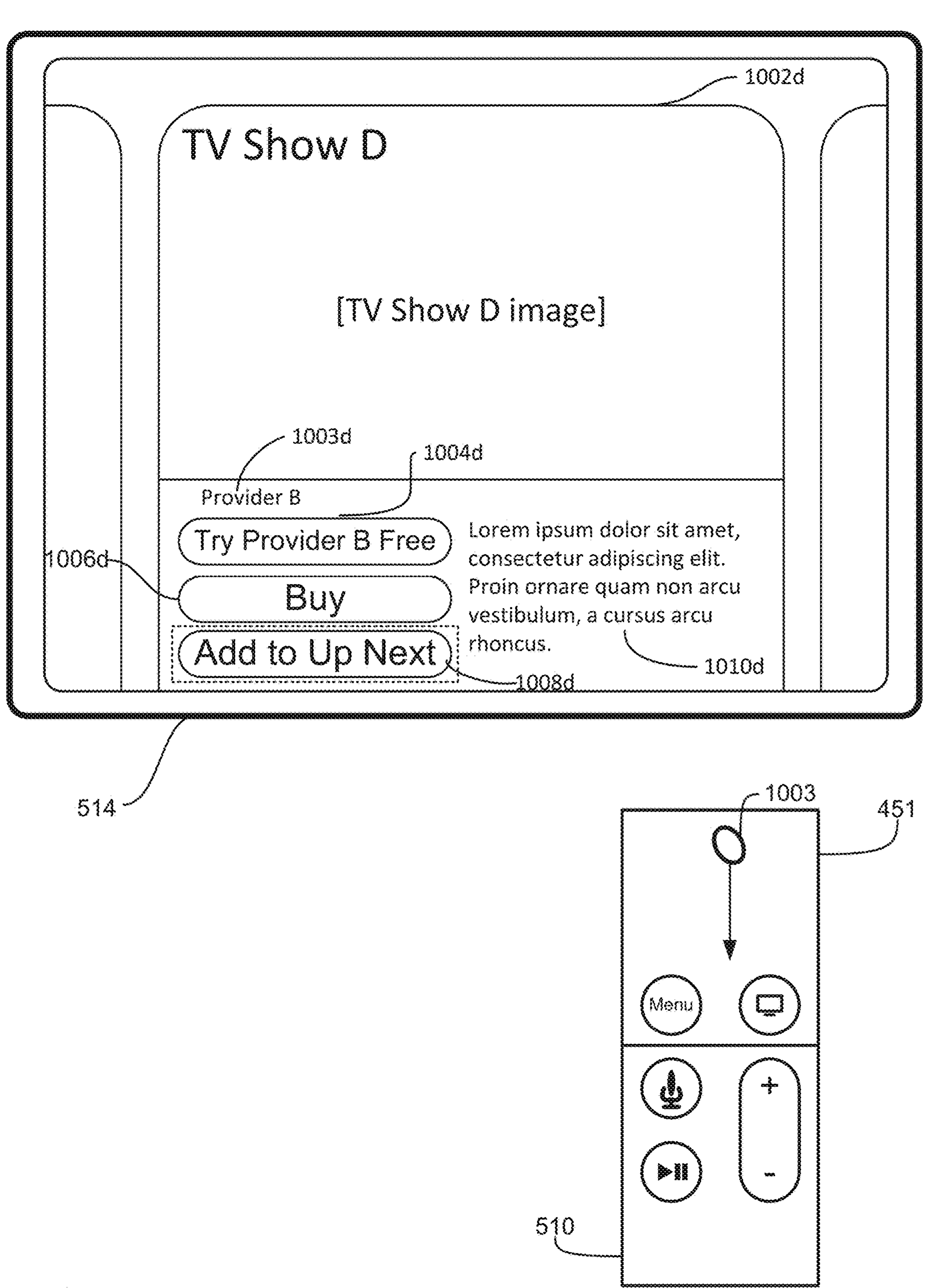
Figure 10D:
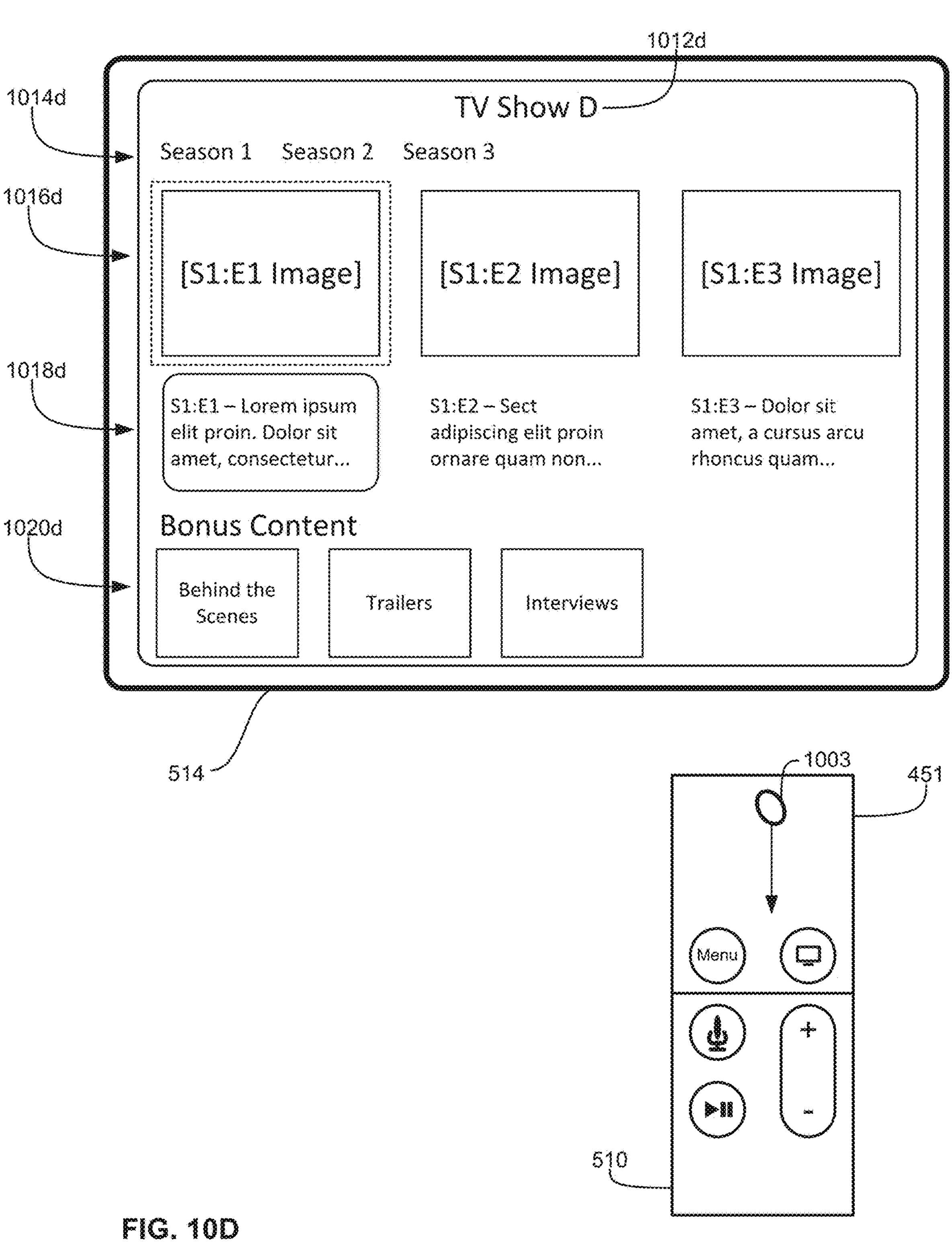
Figure 10E:
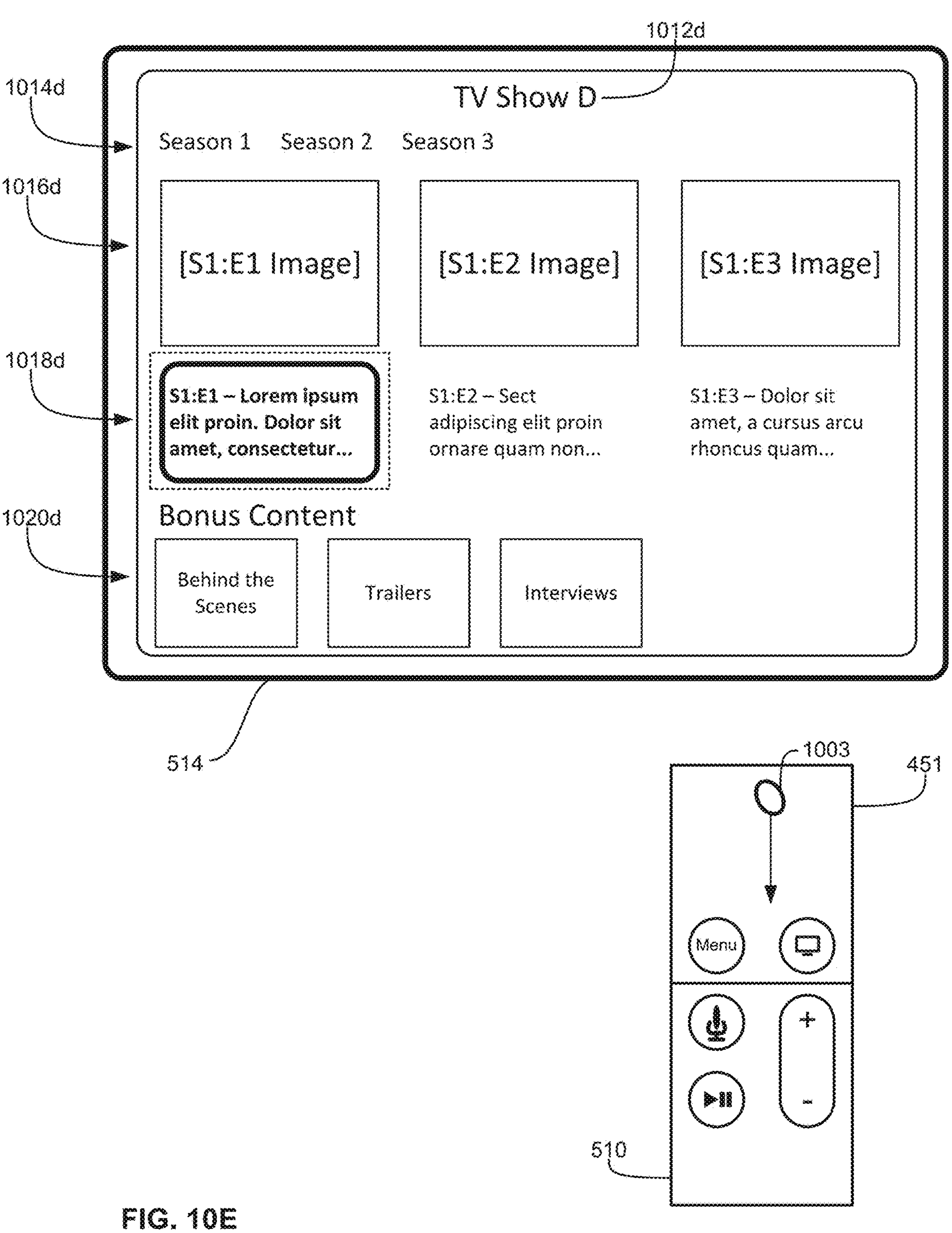
Figure 10F:
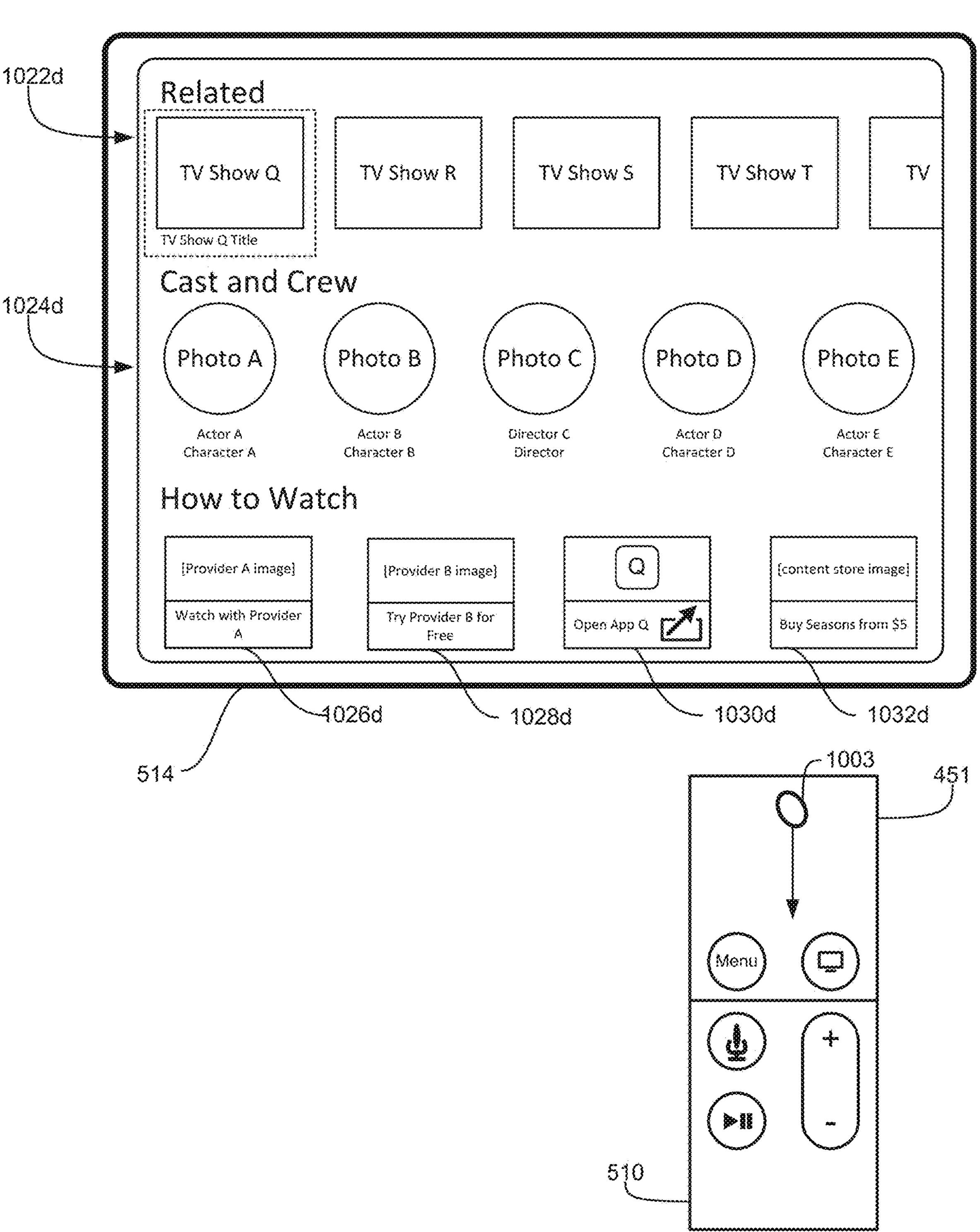
Figure 10G:
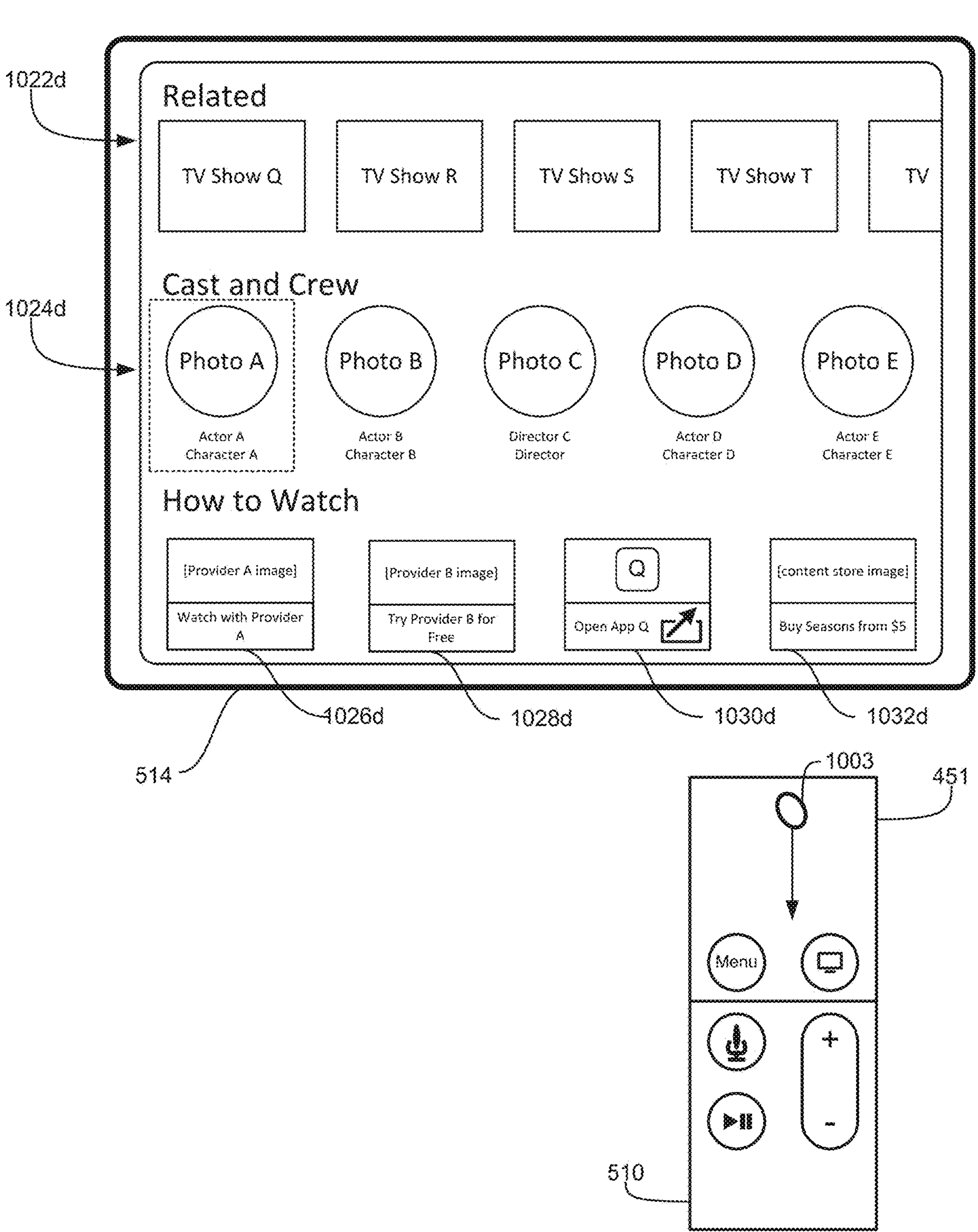
Figure 10H:
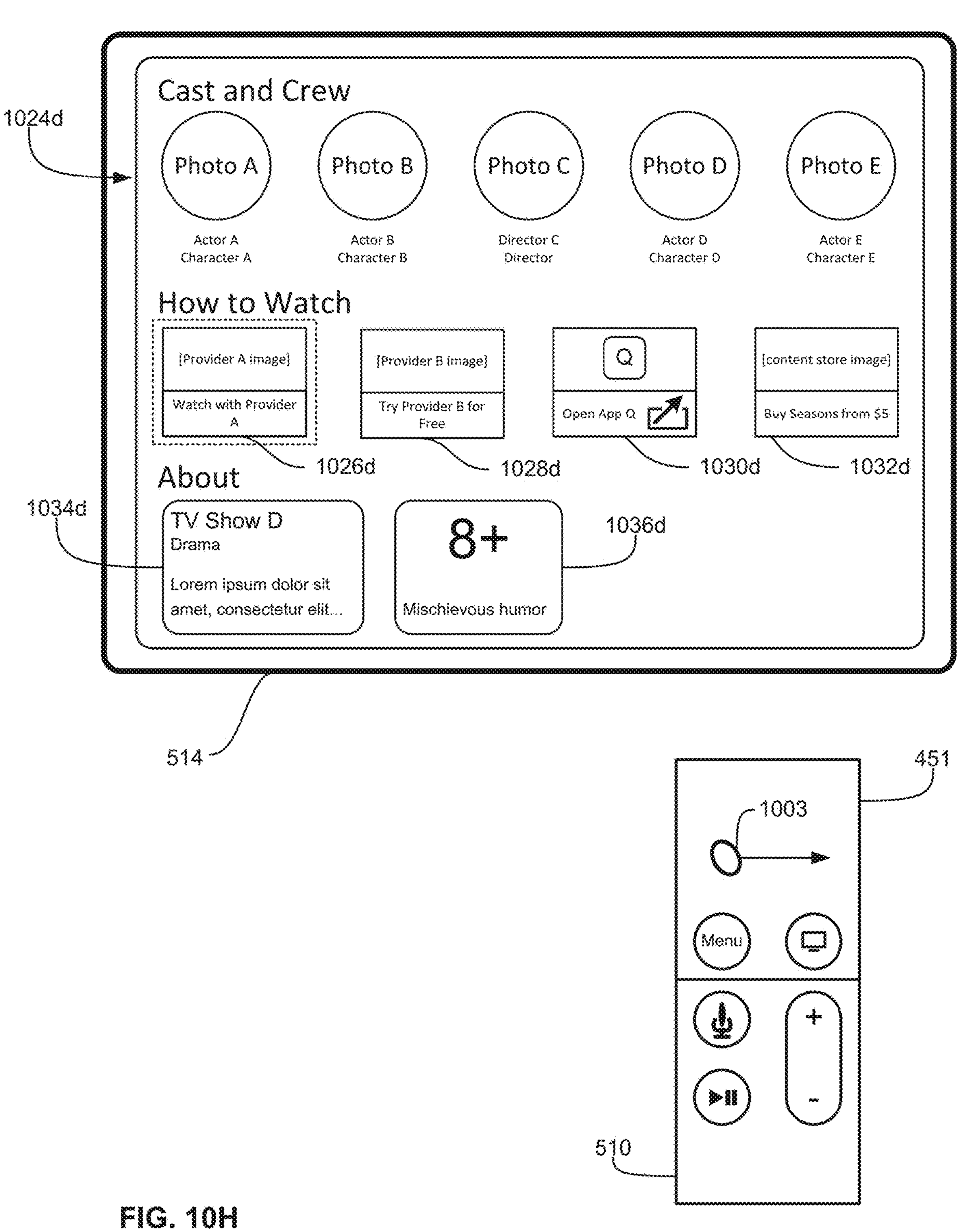
Figure 10I:
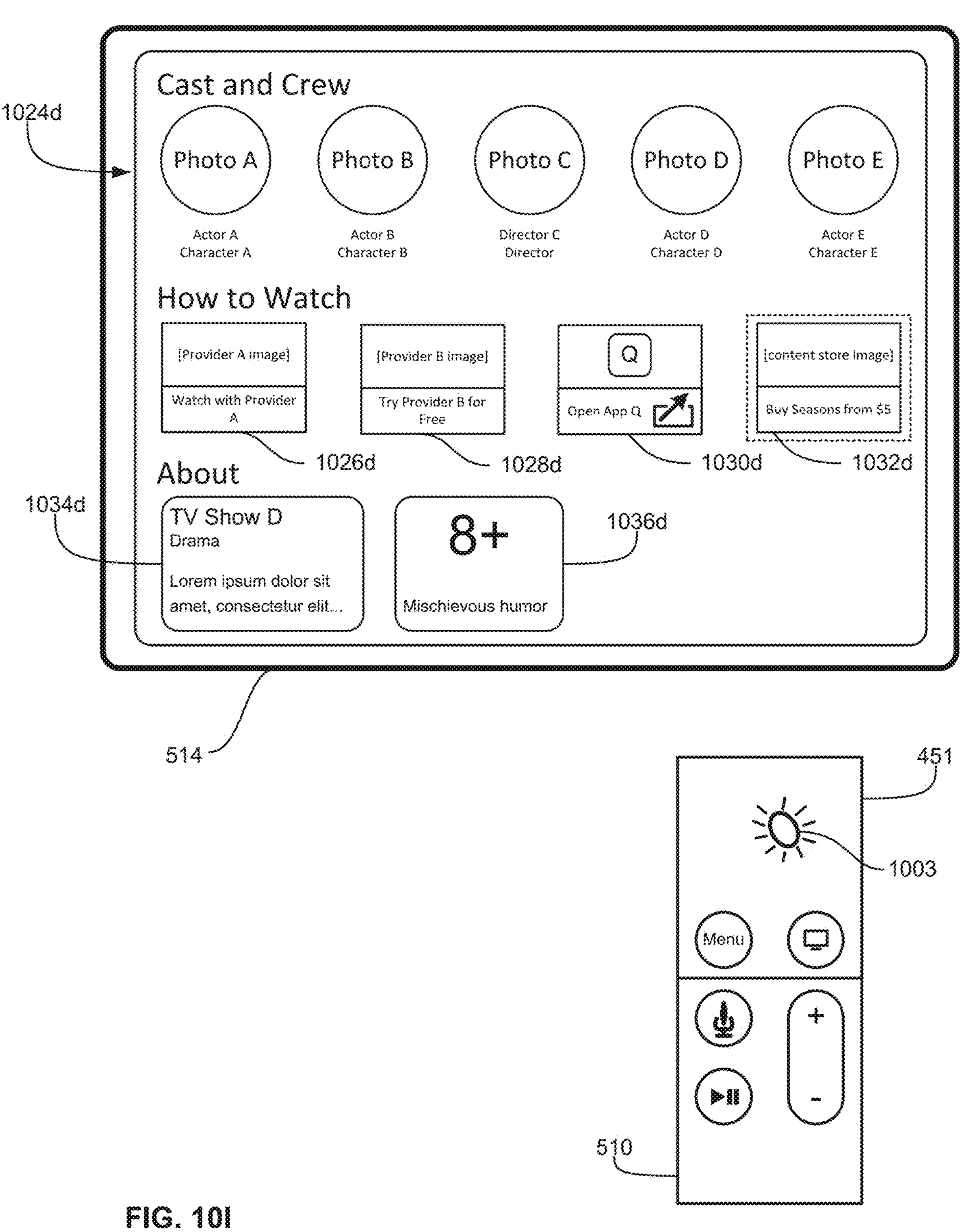
Figure 10J:
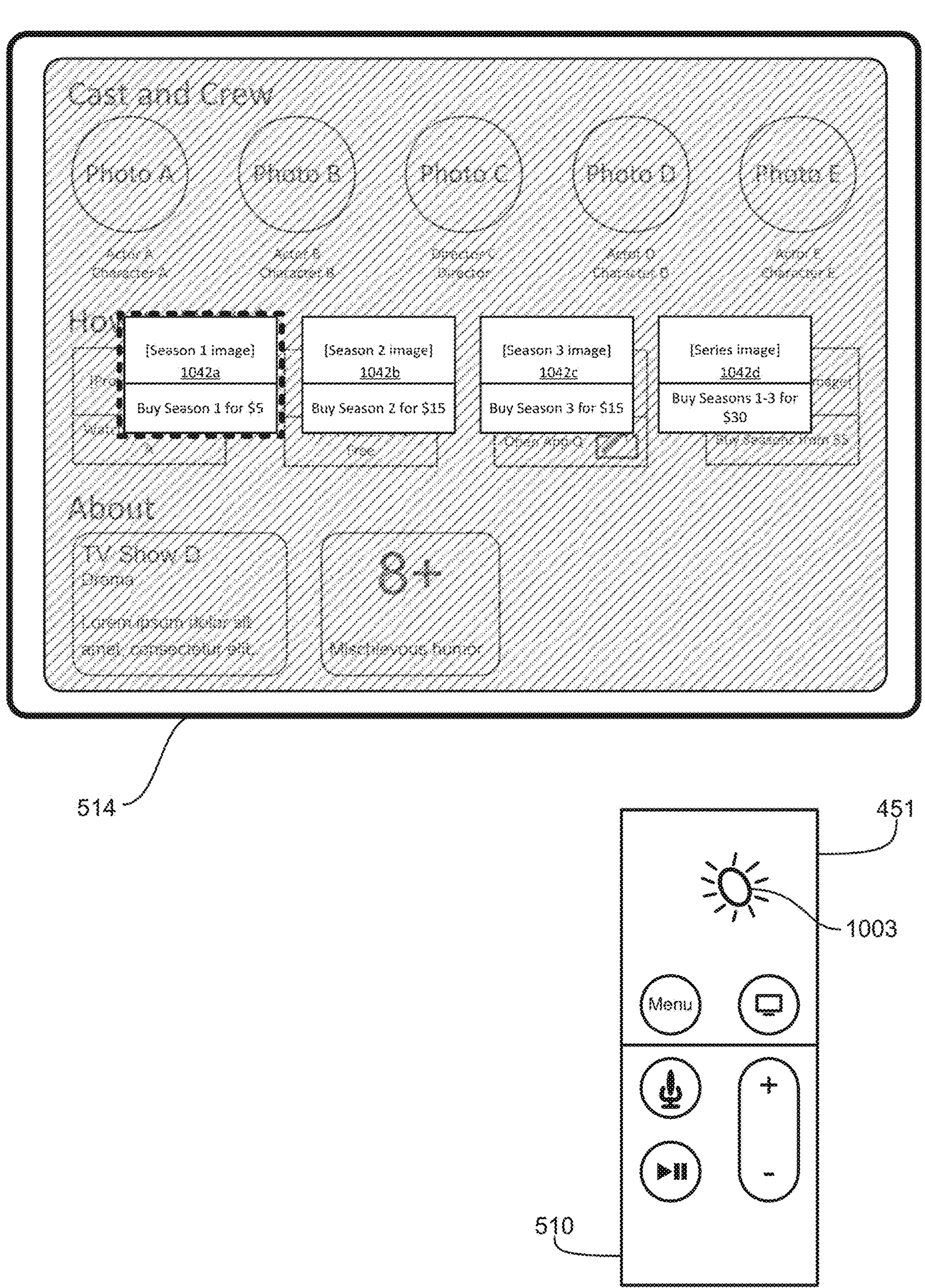
Figure 10K:
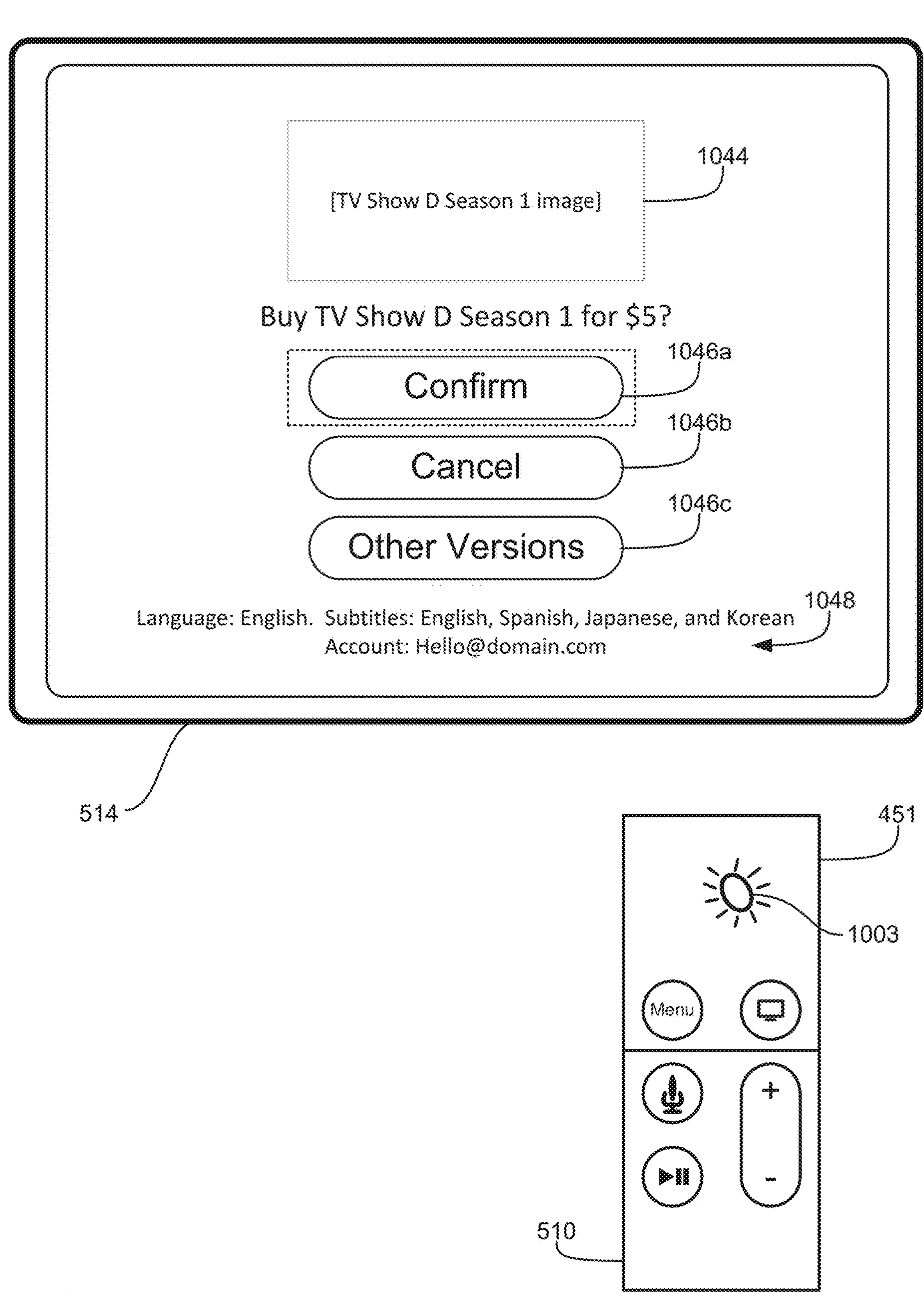
Figure 10L:
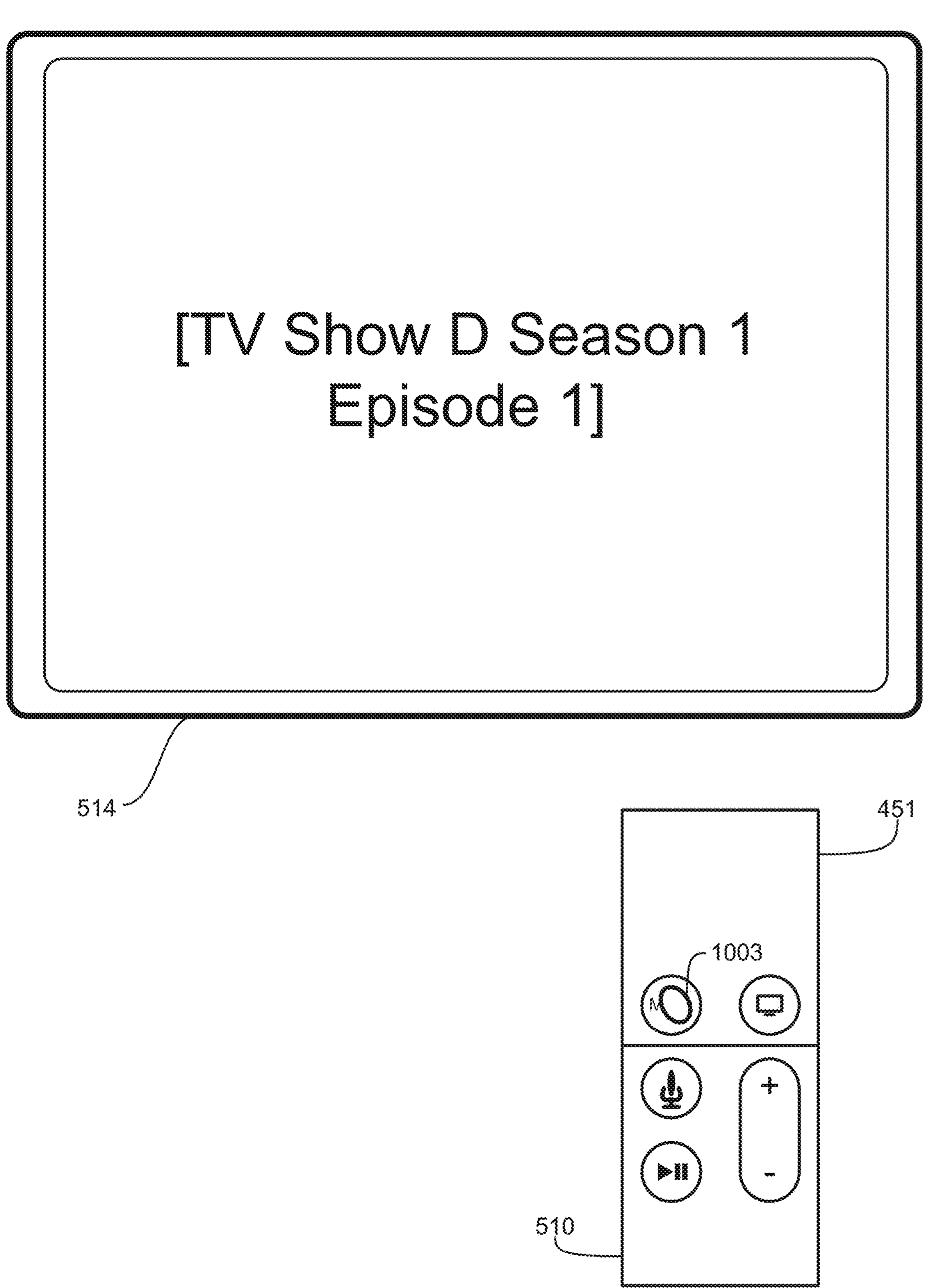
Figure 10M:
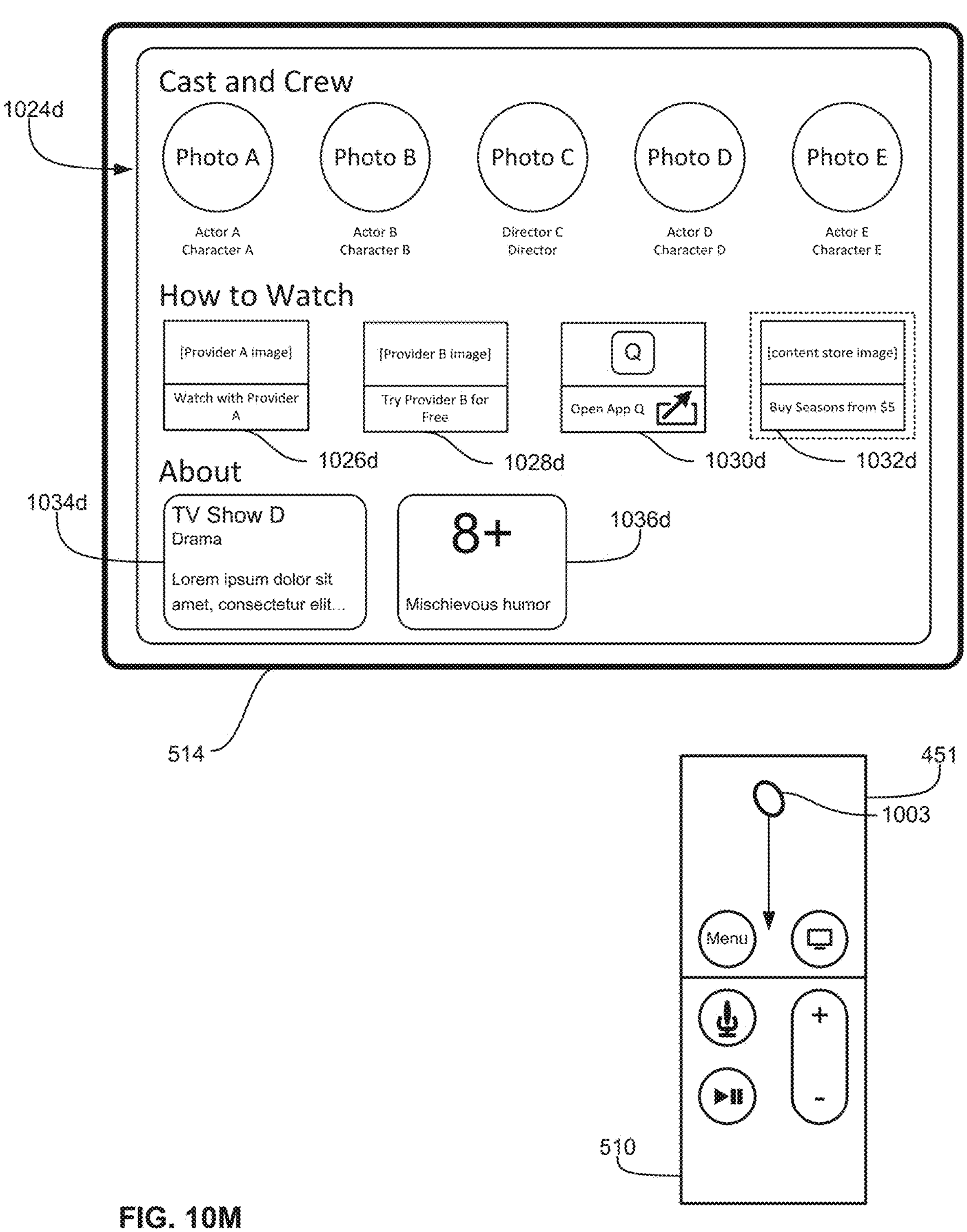
Figure 10N:
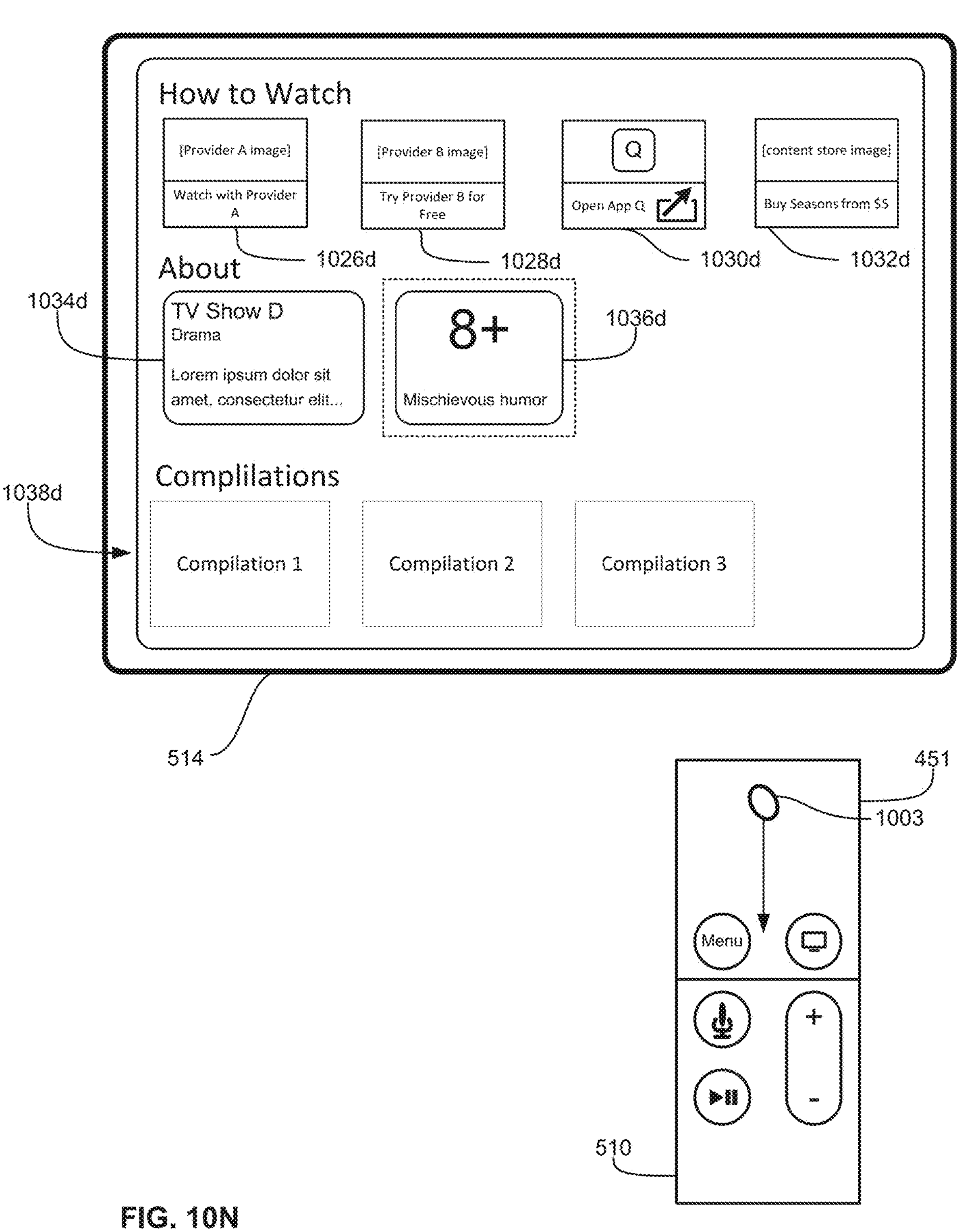
Figure 10O:
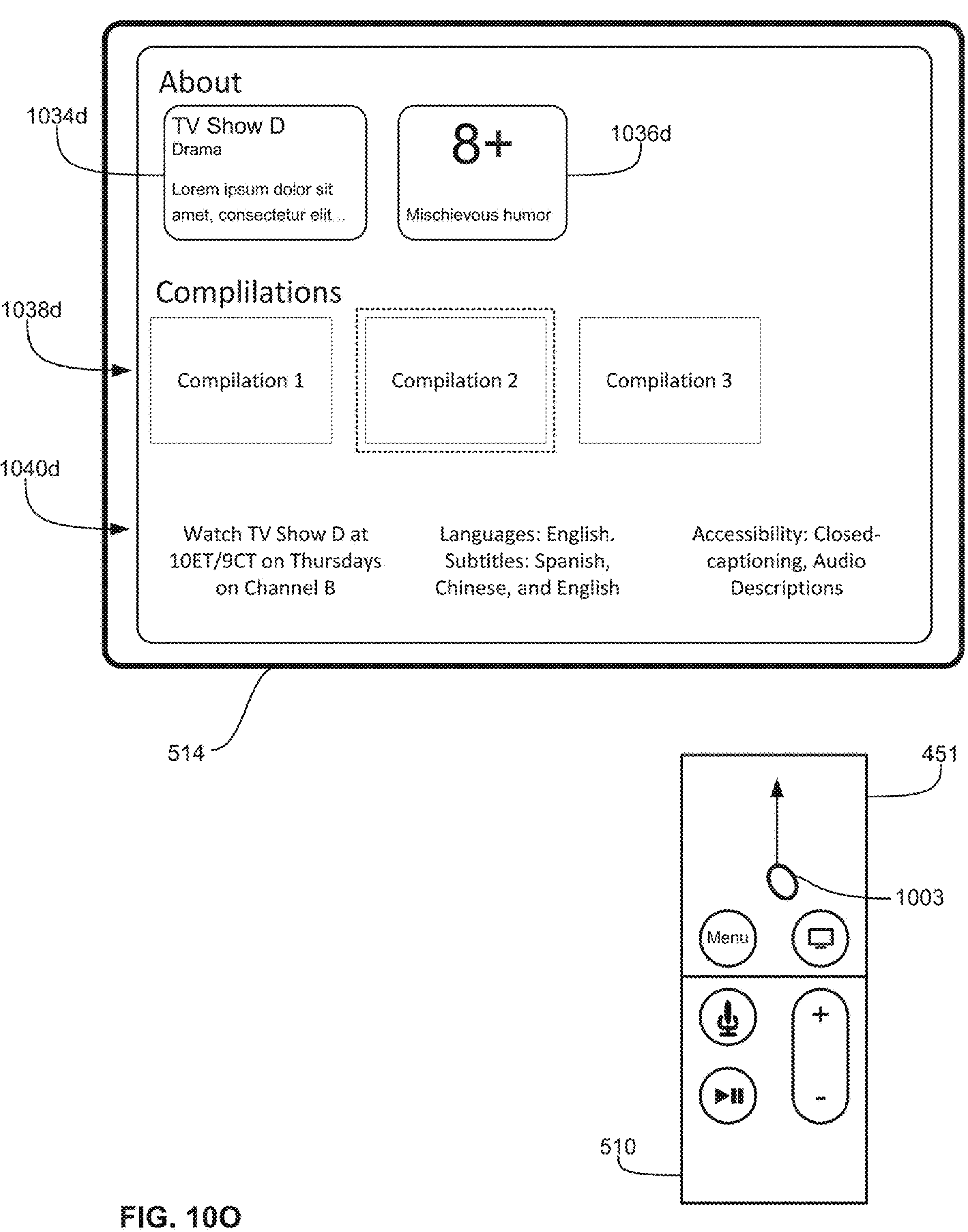
Figure 10P:
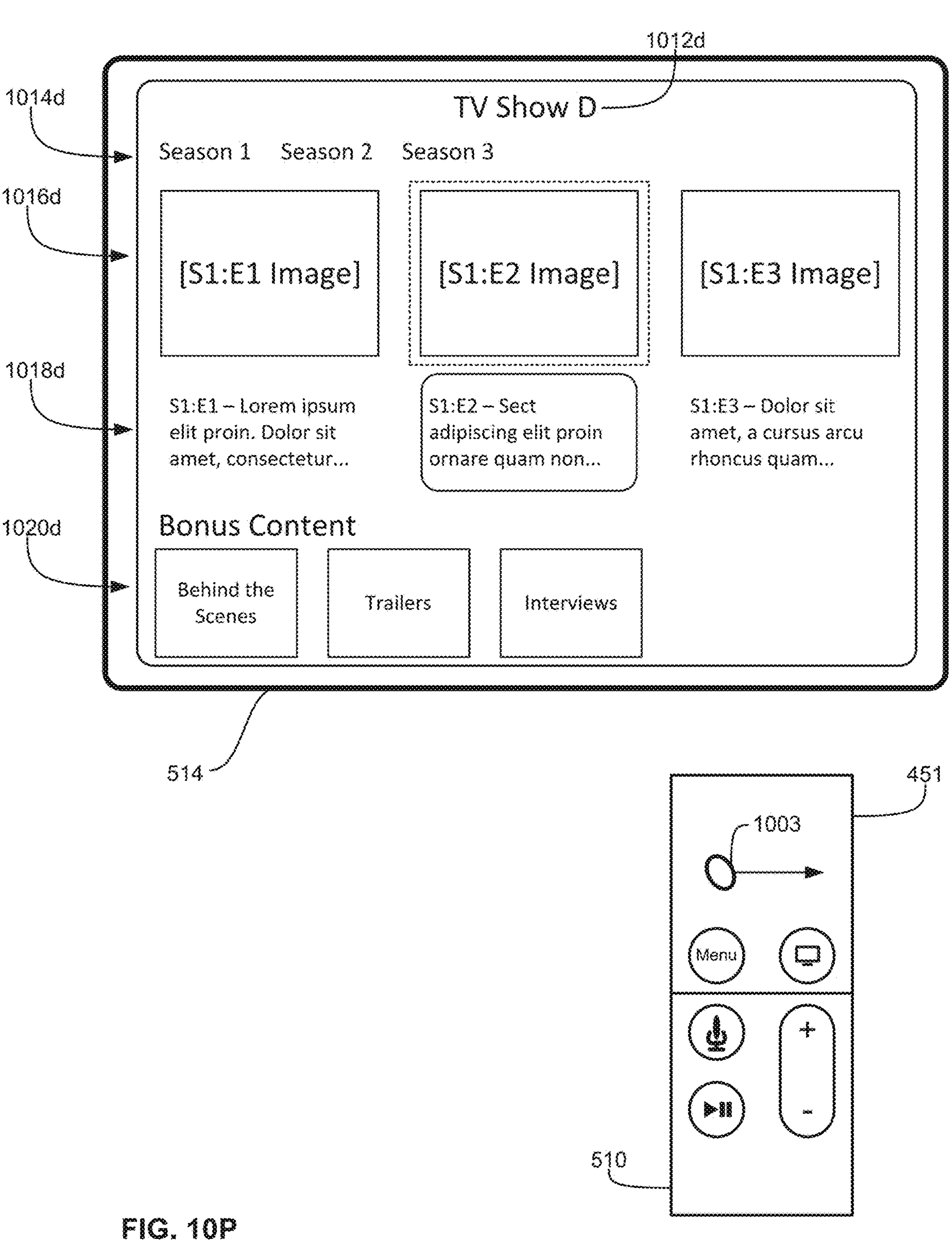
Figure 10Q:
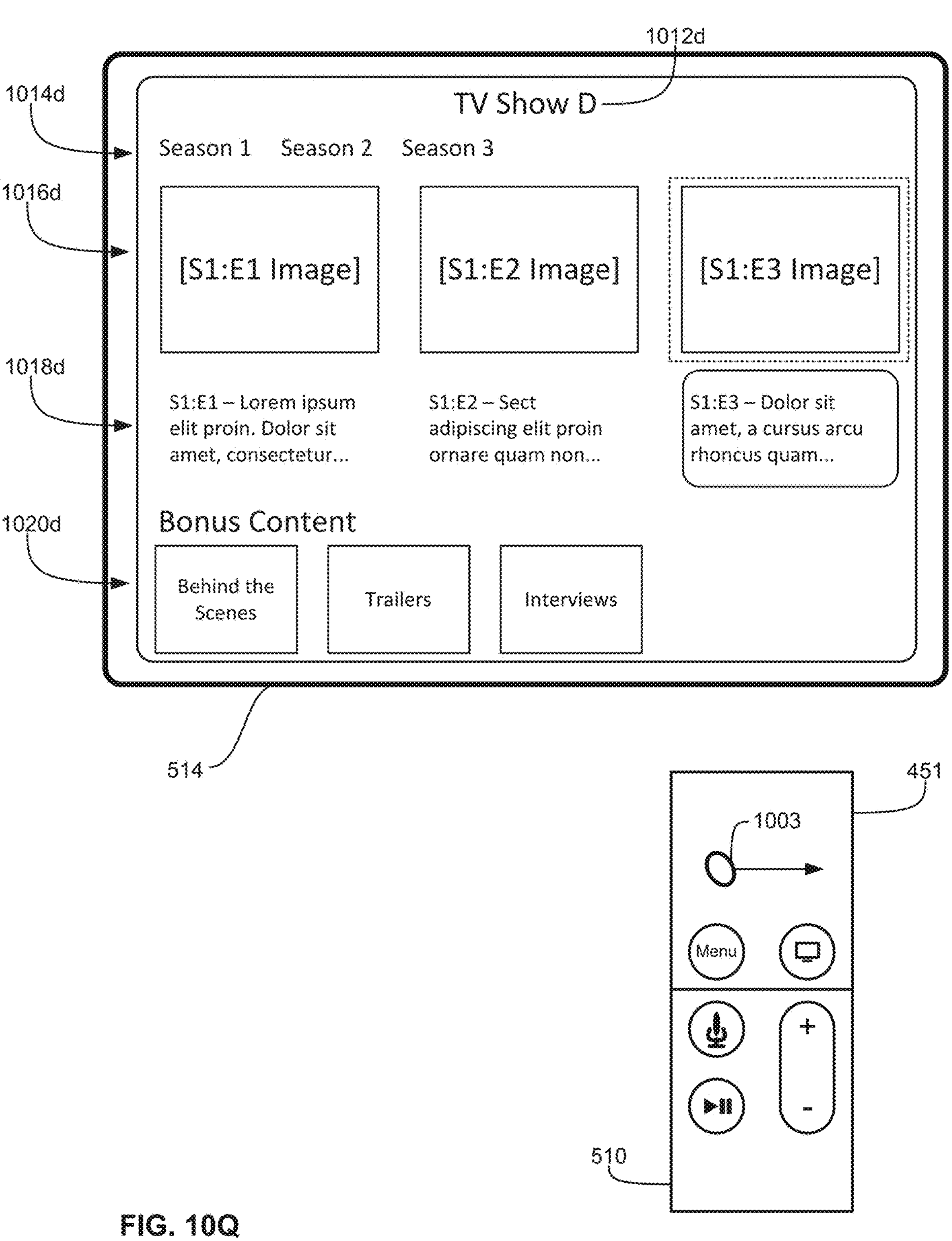

FIGS. 10A-10QQ illustrate exemplary ways in which an electronic device presents representations of episodes in a series of episodic content in accordance with some embodiments of the disclosure. The embodiments in these figures are used to illustrate the processes described below, including the processes described with reference to FIGS. 11A-11K.

FIGS. 10A-10BB illustrate a user interface including information about a series of episodic content. FIGS. 10A-10B illustrate a representation 1002*d* of a series of episodic content. Representation 1002*d* is presented according to one or more steps of method 700. As shown in FIGS. 10A-10C, the user scrolls down (e.g., with contact 1003) in the representation 1002*d* of the series of episodic content. In response to the user's scrolling, the electronic device 500 moves the input focus one element at a time until the focus is on selectable option 1008*d*.

As shown in FIG. 10C, the user scrolls (e.g., with contact 1003) down while the current focus is on option 1008*d*. In response to the user's scrolling, the electronic device presents the user interface including information about the series of episodic content in a full screen mode, as shown in FIG. 10D.

As shown in FIG. 10D, the user interface includes an indication 1012*d* of the series of content, a row 1014*d* of representations of seasons of the content, a row 1016*d* of representations of episodes of the content, a row 1018*d* of representations of information about episodes of the content, and row 1020*d* of representations of bonus content related to the episodic content. Though not shown in FIG. 10D, in some embodiments, the rows 1016*d* and 1018*d* of representations of episodes and information about the episodes include part of a representation of another episode at the end of the row (e.g., peeking from off screen).

As shown in FIG. 10D, upon presenting the user interface in full screen mode, the electronic device 500 moves the current focus to a representation of an episode, skipping the row 1014*d* of representations of seasons. The representations of episodes in row 1016*d* are selectable to present the selected episode. Thus, skipping the row 1014*d* of seasons enables the user to more quickly select an episode for playback. While one of the representations 1016*d* of episodes has the current focus, the representation 1018*d* of information about the respective episode with the current focus is presented with a different appearance from the appearance of the other representations 1016*d* of information about episodes. As shown in FIG. 10D, the user scrolls (e.g., with contact 1003) down. In response to the user input, the electronic device 500 moves the current focus to an item in the row 1018*d* of representations of information about the episodes, as shown in FIG. 10E.

As shown in FIG. 10E, in response to the user's scrolling in FIG. 10E, the electronic device 500 moves the current focus from the an item in the row 1016*d* of representations of episodes to an item in the row 1018*d* of representations of information about episodes. The item with the current focus is presented with a focused visual appearance that is different from the visual appearance of the representations 1018*d* without the current focus and different from the visual appearance of the representation while the current focus was on an item in the row 1016*d* of representations of episodes.

As shown in FIG. 10E, the user scrolls (e.g., with contact 1003) down. In response the user's scrolling, the electronic device 500 moves the current focus and scrolls the user interface, as shown in FIG. 10F.

In FIG. 10F, the electronic device 500 presents a row 1022*d* of representations of content items related to the series of episodic content, a row 1024*d* of representations of members of the cast and crew of the series of episodic content, and a plurality of selectable representations 1026*d*-1032*d* for accessing the series of episodic content. As shown in FIGS. 10F-10G, the user scrolls (e.g., with contact 1003) down. In response the user's scrolling, the electronic device 500 moves the current focus and scrolls the user interface, as shown in FIG. 10H.

In FIG. 10H, the electronic device 500 continues to present the row 1025*d* of representations of the cast and crew of the series of episodic content and selectable options 1026*d*-1032*d* for accessing the content. The user interface further includes a representation 1034*d* of information about the series of content and a representation 1036*d* of information about parental guidance information about the series of content.

The selectable options 1026*d*-1032*d* for accessing the content include an option 1026*d* to access the content with a channel to which the electronic device 500 is subscribed, an option 1028*d* to access the content with a channel to which the electronic device 500 is not subscribed, an option 1030*d* to access the content with another application, and an option 1032*d* to purchase seasons of the content through the content store. While the current focus is on option 1026*d*, the electronic device 500 detects a horizontal rightward swipe (e.g., movement of contact 1003). In response to the swipe, the electronic device 500 moves the current focus to option 1032*d*, as shown in FIG. 10I.

In FIG. 10I, the user selects (e.g., with contact 1003) the option 1032*d* to purchase seasons of the content from the content store. In response to the user's selection, as shown in FIG. 10J, the electronic device presents an options 1042*a-c* to purchase each season of content and an option 1042*d* to purchase the entire series of content. As shown in FIG. 10J, the user selects (e.g., with contact 1003) the option 1042*a* to purchase Season 1 of the series of content. In response to the user's selection, the electronic device 500 presents a user interface for completing the purchase, as shown in FIG. 10K.

FIG. 10K illustrates a user interface for purchasing the first season of the series of content. The user interface includes an image 1044 representing the season to be purchased, a selectable option 1046*a* to confirm the purchase, a selectable option 1046*b* to cancel the process of purchasing the season, a selectable option 1046*c* to view other available versions of the series of content, and an indication 1048 of the language and subtitles of the content and the user account with which the series of content will be purchased. As shown in FIG. 10K, the user selects (e.g., with contact 1003) the option 1046*a* to confirm the purchase. In response to the user's selection, the electronic device 500 presents the first episode of the season the electronic device 500 has purchased, as shown in FIG. 10L.

In FIG. 10M, the electronic device 500 presents the user interface including information about the series of episodic content. The current focus is on option 1032*d* and the user scrolls down (e.g., with contact 1003). In response to the user's scrolling, the electronic device 500 moves the current focus and scrolls the user interface down, as shown in FIG. 10N.

As shown in FIG. 10N, the electronic device 500 scrolls the user interface down to reveal a row 1038*d* of selectable representations of compilations of episodes from the series of episodic content. Each compilation includes a plurality of episodes of the content with a unifying theme other than season. As shown in FIG. 10N, the user scrolls (e.g., with contact 1003) down. In response to the user's scrolling, the electronic device 500 moves the current focus down and scrolls the user interface down, as shown in FIG. 10O.

As shown in FIG. 10O, the electronic device 500 presents information 1040*d* about the series of episodic content. The user scrolls (e.g., with contact 1003) up. In response to the user's input, the electronic device scrolls the user interface up and moves the current focus up, as shown in FIG. 10P.

As shown in 10P, the electronic device 500 presents the row 1014*d* of seasons, the row 1016*d* of episodes, the row 1018*d* of information about the episodes, and the row of bonus content 1020*d*. Although not shown in the figures, when the current focus is on an item in the row 1020*d* of bonus content and the electronic device 500 receives an input to move the current focus up, the electronic device 500 moves the current focus to an item in the row 1016*d* of episodes, skipping the row 1018*d* of information about the episodes, reducing the number of inputs needed to select a representation of an episode in row 1016*d* to play the episode.

While the current focus is on a representation 1016 of an episode, the electronic device 500 detects a horizontally scrolling input (e.g., movement of contact 1003). In response to the user input, the electronic device 500 moves the current focus in accordance with movement of contact 1003, as shown in FIG. 10Q. After moving the current focus, the electronic device 500 detects another horizontal scrolling input, as shown in FIG. 10Q. In response to the user input illustrated in FIG. 10Q, the electronic device 500 scrolls the row 1016*d* of episodes and the row 1018*d* of information in accordance with the input, as shown in FIG. 10R.

Figure 10R:
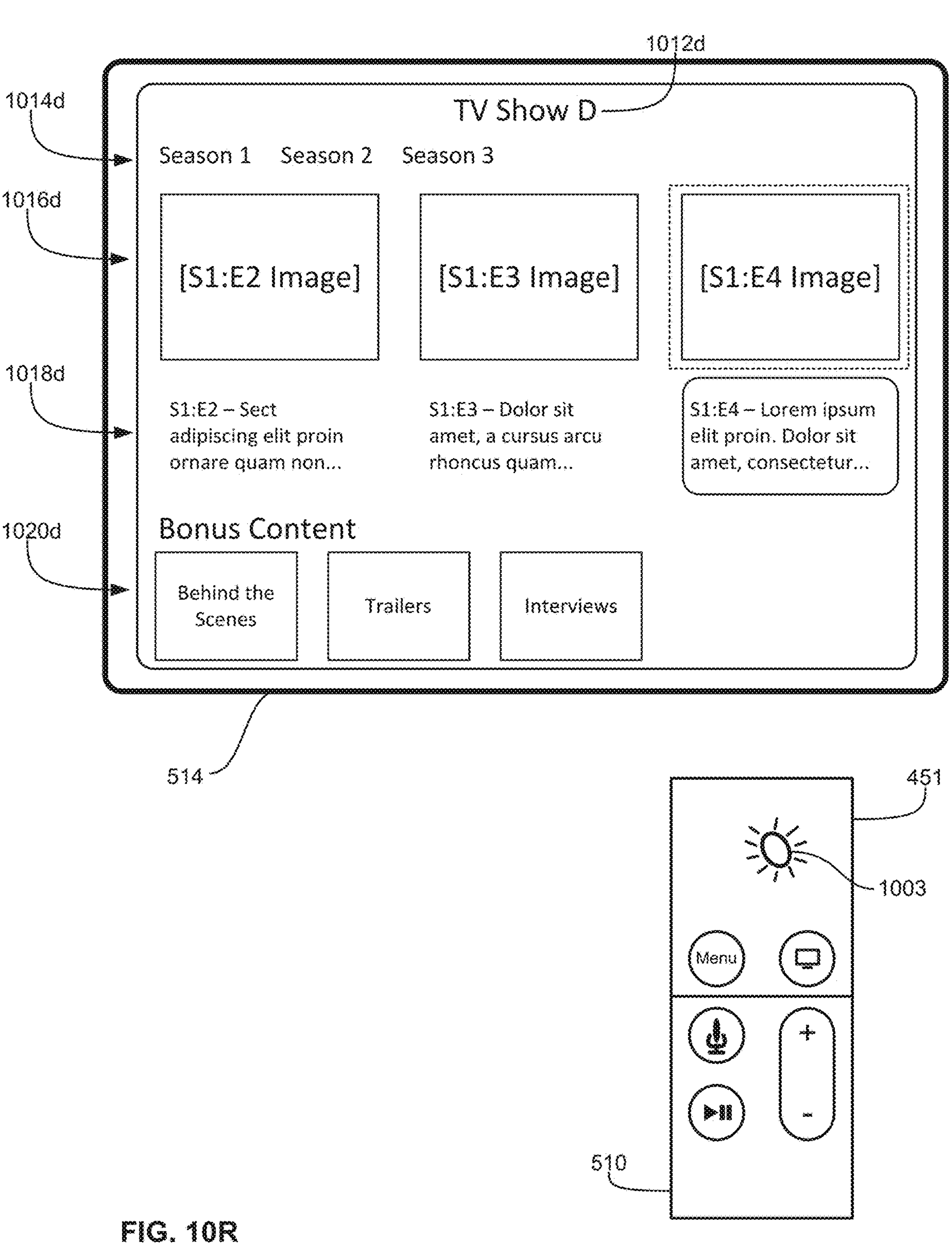
Figure 10S:
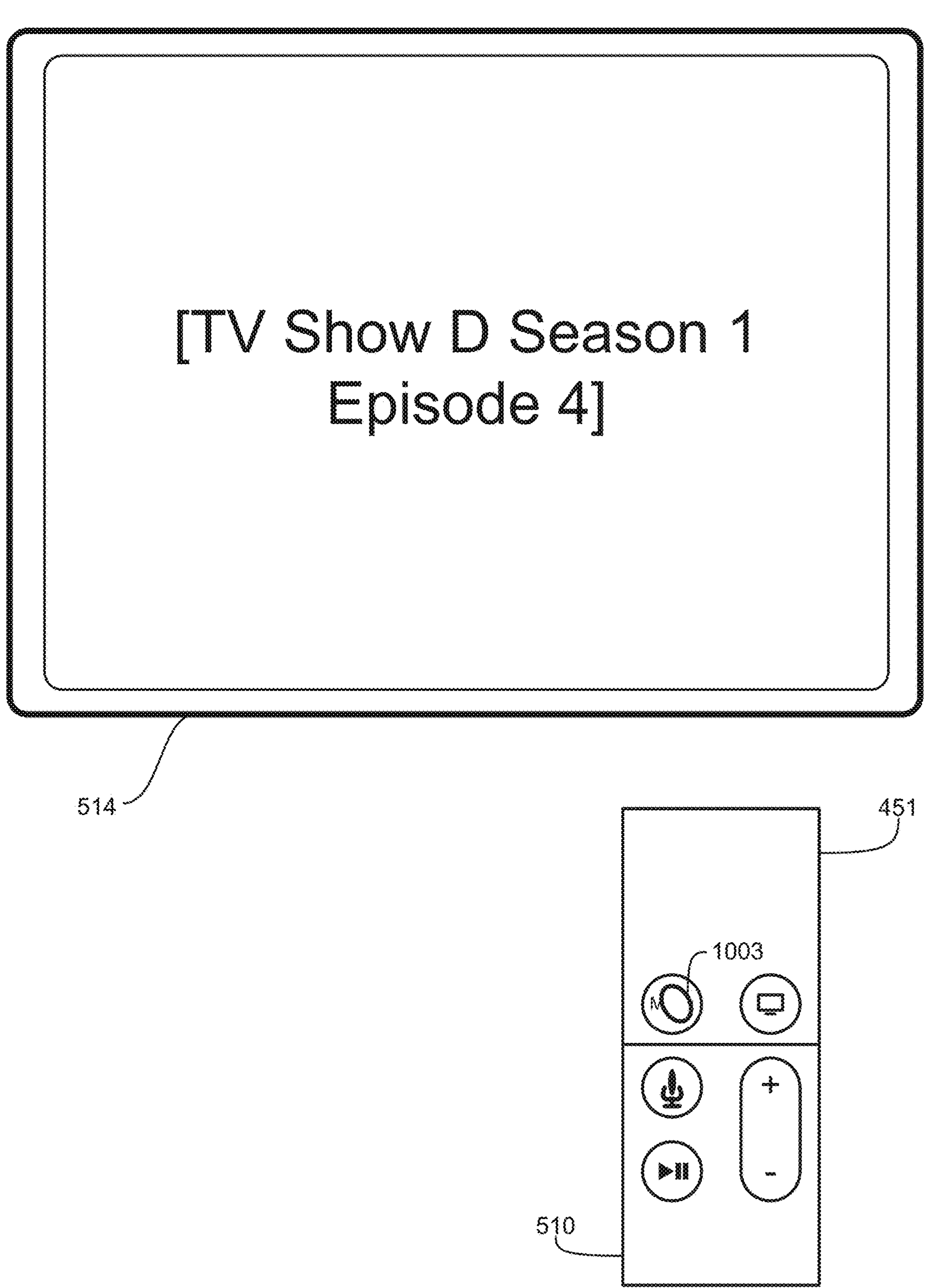
Figure 10T:
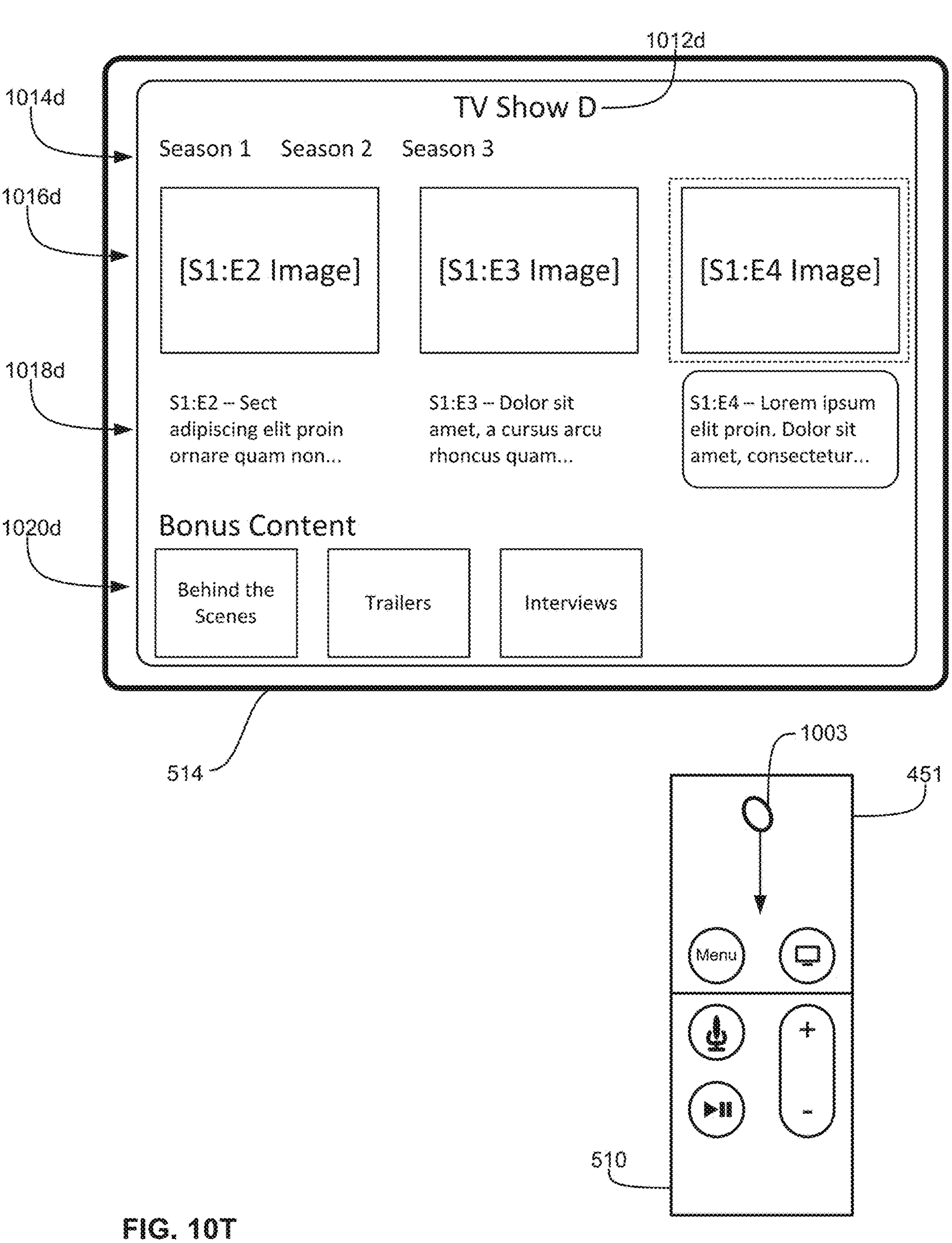

In FIG. 10R, the user selects (e.g., with contact 1003) a representation of an episode of the item of content. In response to the user's selection, the electronic device 500 presents the episode, as shown in FIG. 10S. While presenting the episode, the user selects (e.g., with contact 1003) a "Menu" button of the input device 510. In response to the input, the electronic device 500 presents the user interface with information about the series of content, as shown in FIG. 10T. In FIG. 10T, the user swipes (e.g., with contact 1003) down. In response to the input, the electronic device 500 moves the current focus from an item in the row 1016*d* of episodes to an item 1018*d* in the row of information, as shown in FIG. 10U.

Figure 10U:
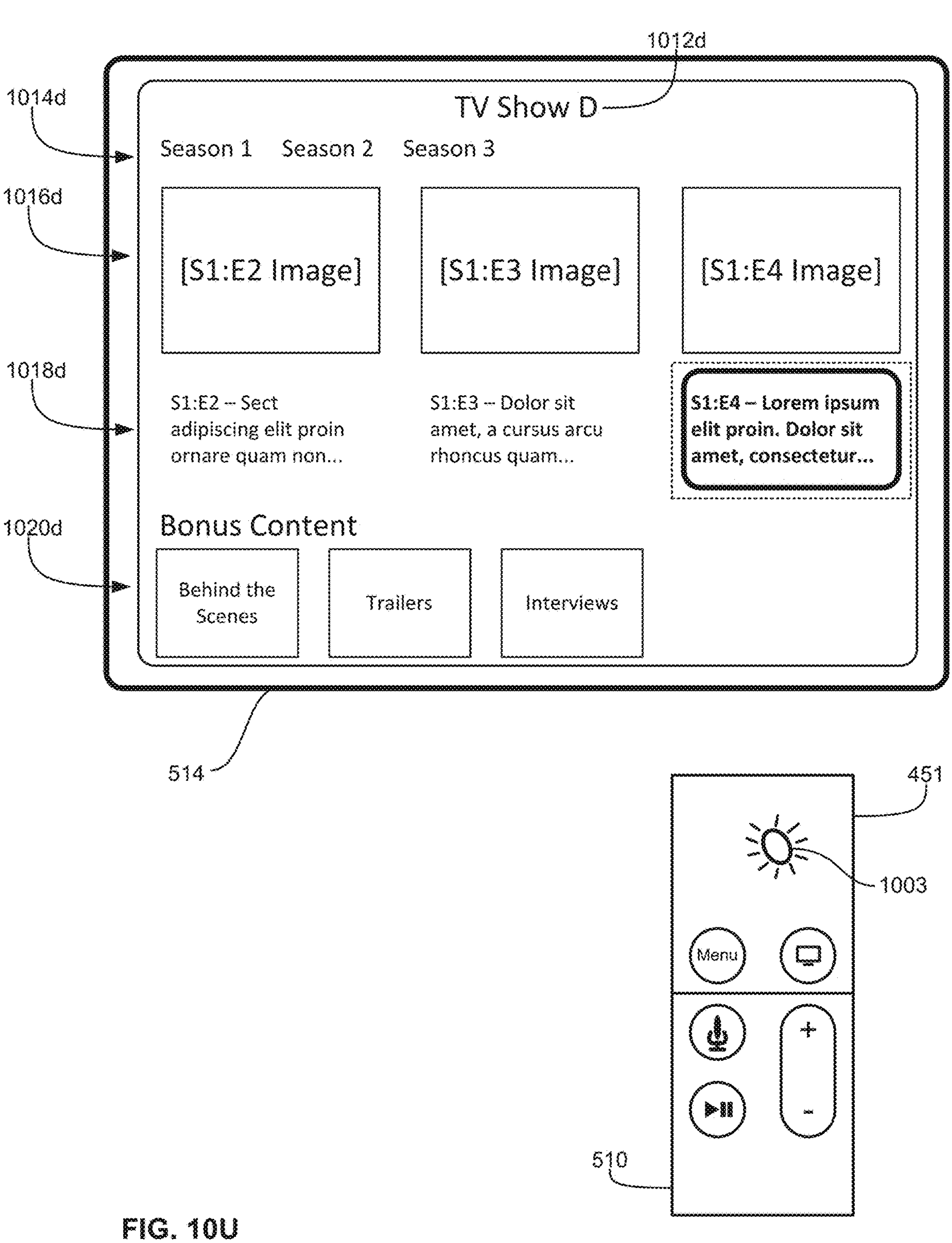
Figure 10V:
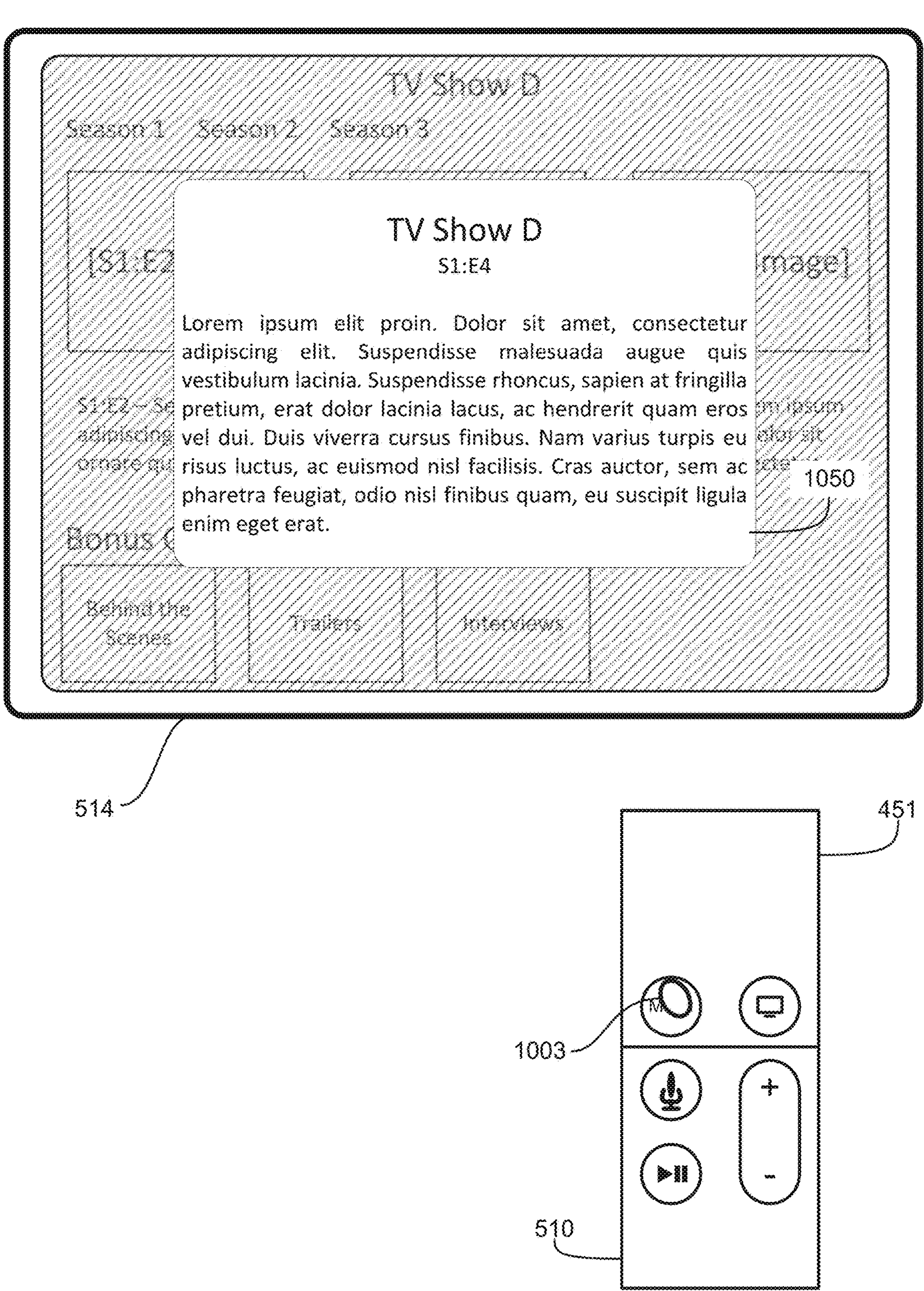

As shown in FIG. 10U, while the current focus is on an item in the row of information 1018*d*, the electronic device 500 detects a user input for selecting (e.g., with contact 1003) the item with the current focus. In response to the input, the electronic device 500 presents additional information 1050 about the respective episode, as shown in FIG. 10V. While presenting the additional information 1050, the electronic device 500 detects selection of the "Menu" button on the input device 510. In response to the user's selection, the electronic device 500 ceases displaying the information 510, as shown in FIG. 10W.

Figure 10W:
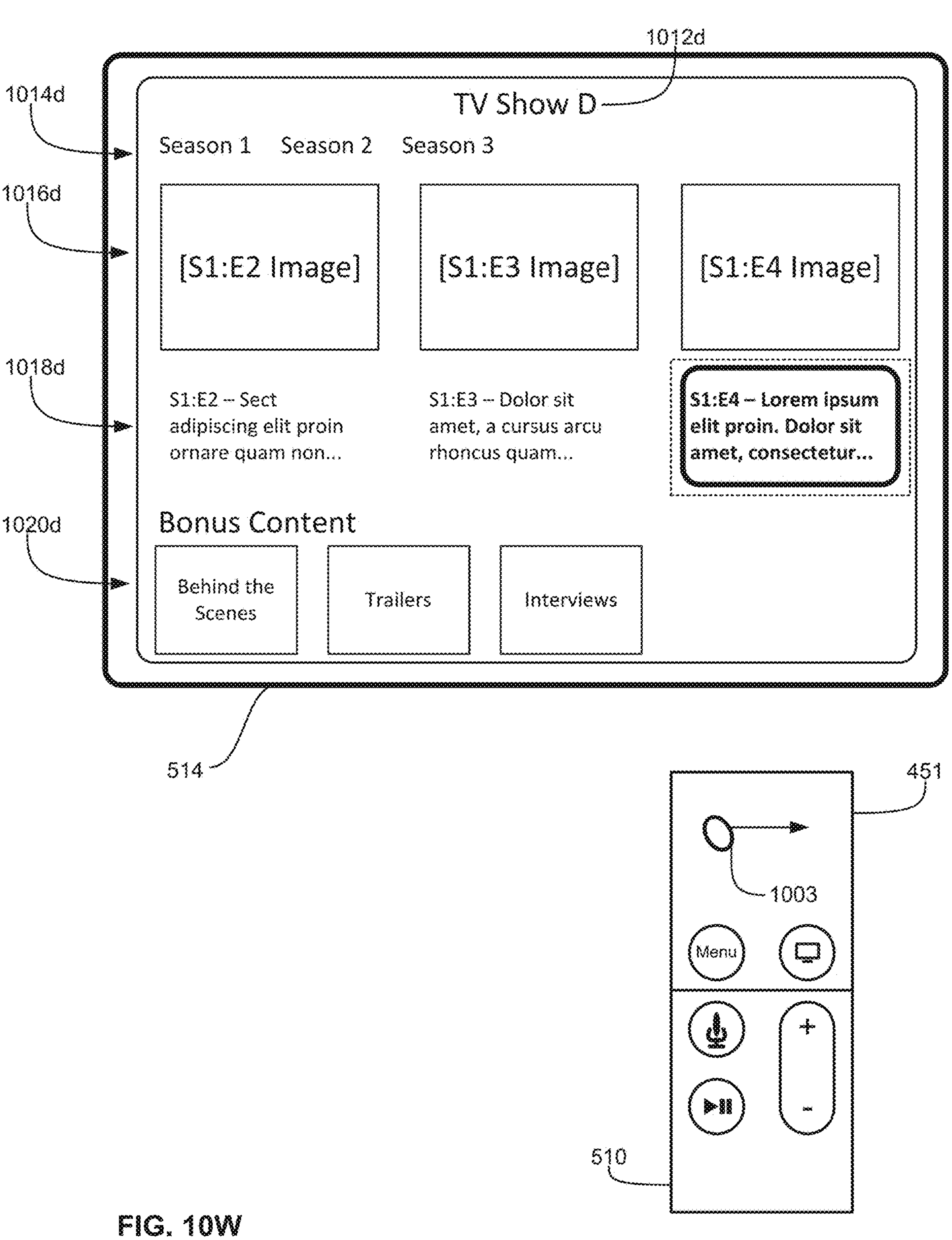

In FIG. 10W, the current focus is on an item in the row 1016*d* of information about the episodes. The user swipes (e.g., with contact 1003) horizontally. In response to the user's input, the electronic device 500 scrolls the items in rows 1016*d* and 1018*d* and moves the current focus from an item in the row 1018*d* of information to an item in the row

Figure 10X:
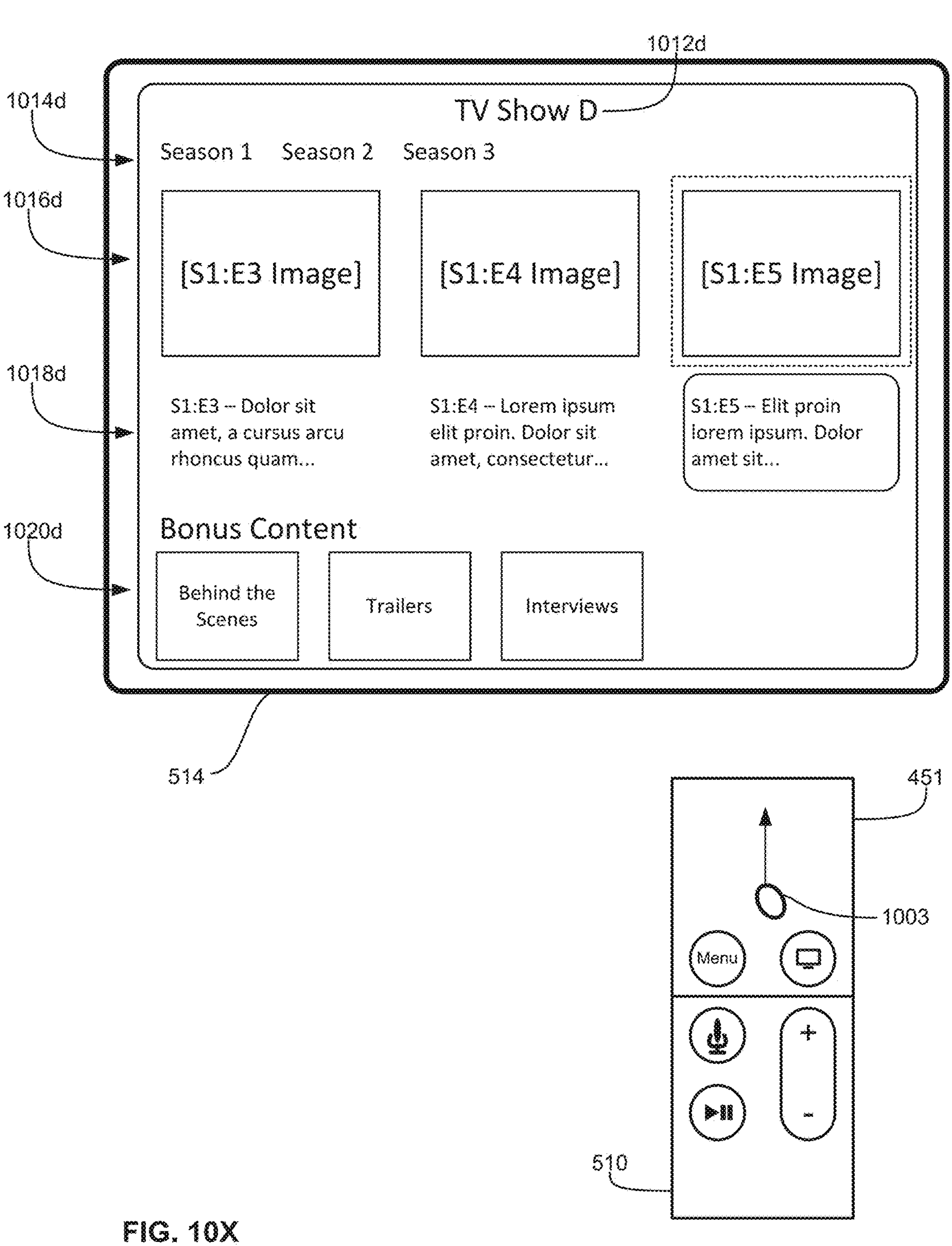

1016*d* of episodes, as shown in FIG. 10X. In FIG. 10X, the electronic device 500 detects a swipe (e.g., movement of contact 1003) up. In response to the input, the electronic device 500 moves the current focus to the row 1014*d* of representations of the seasons of content, as shown in FIG. 10Y.

Figure 10Y:
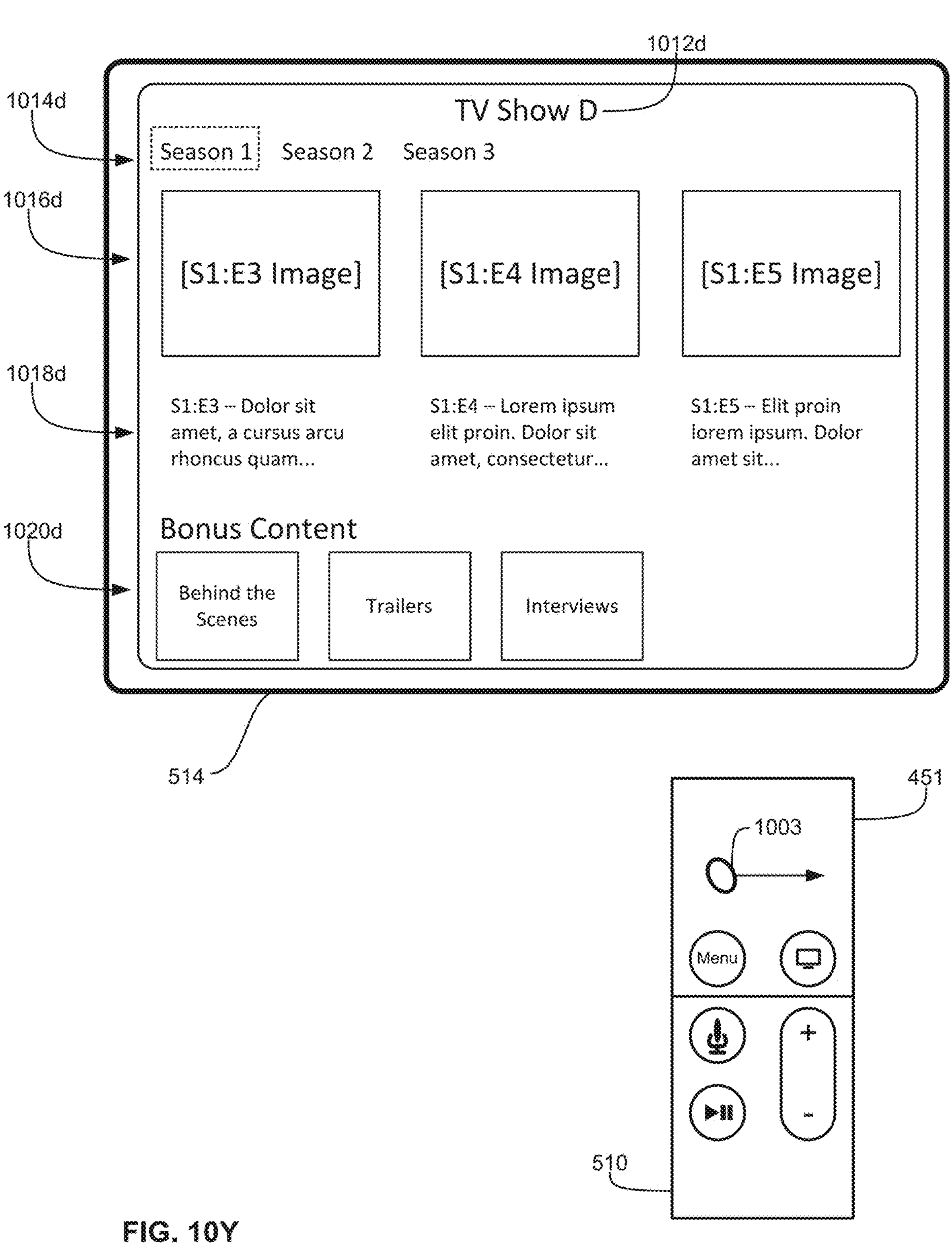

As shown in FIG. 10Y, when the user swipes up from the row 1016*d* of episodes, the electronic device 500 moves the current focus to the representation of the season to which the displayed representations 1016 of episodes belong (e.g., rather than moving the current focus to the representation of the season that is closest, horizontally, to the representation of the episode from which the current focus is coming-namely, season 3). The user swipes horizontally, as shown in FIG. 10Y.

Figure 10Z:
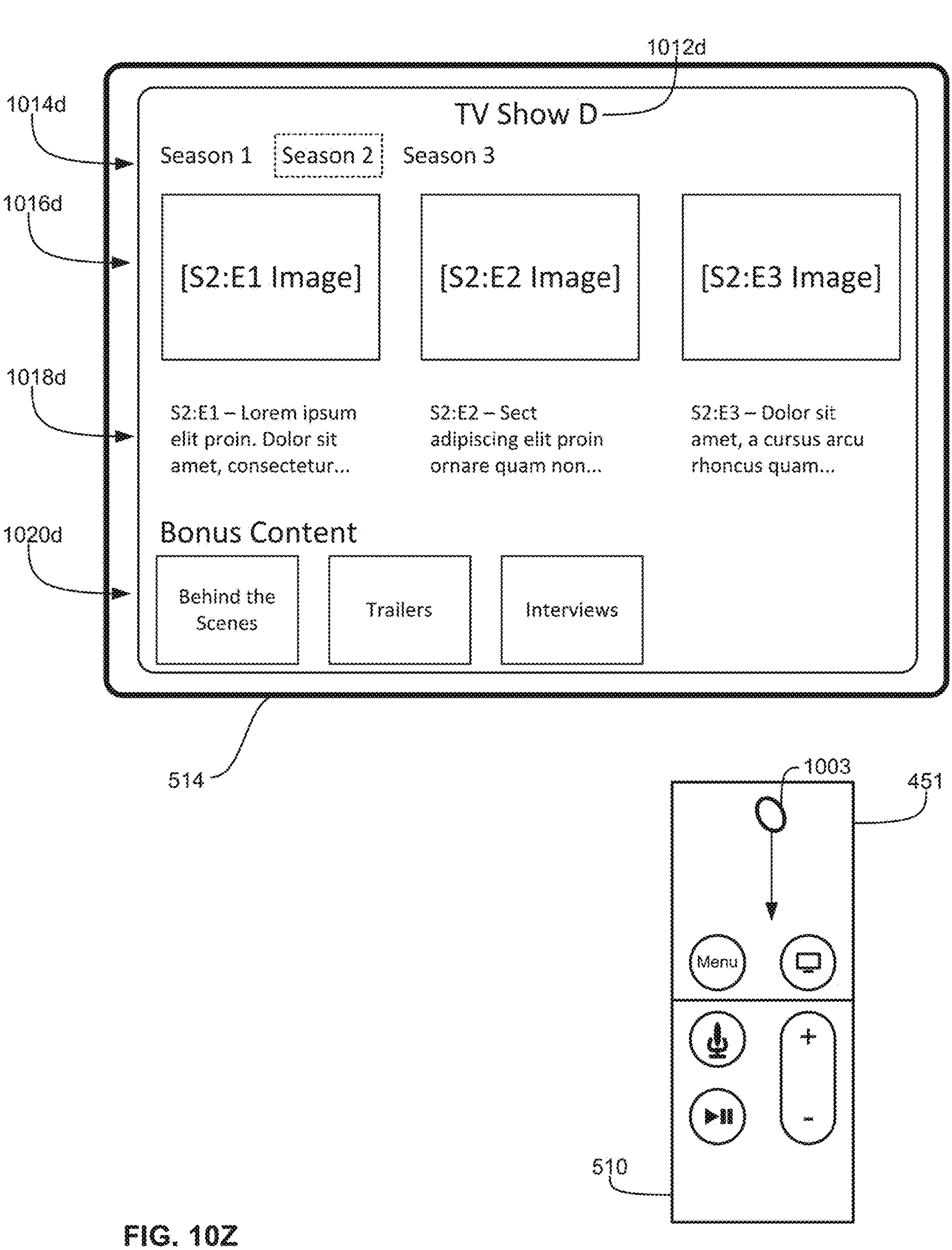
Figure 10A:
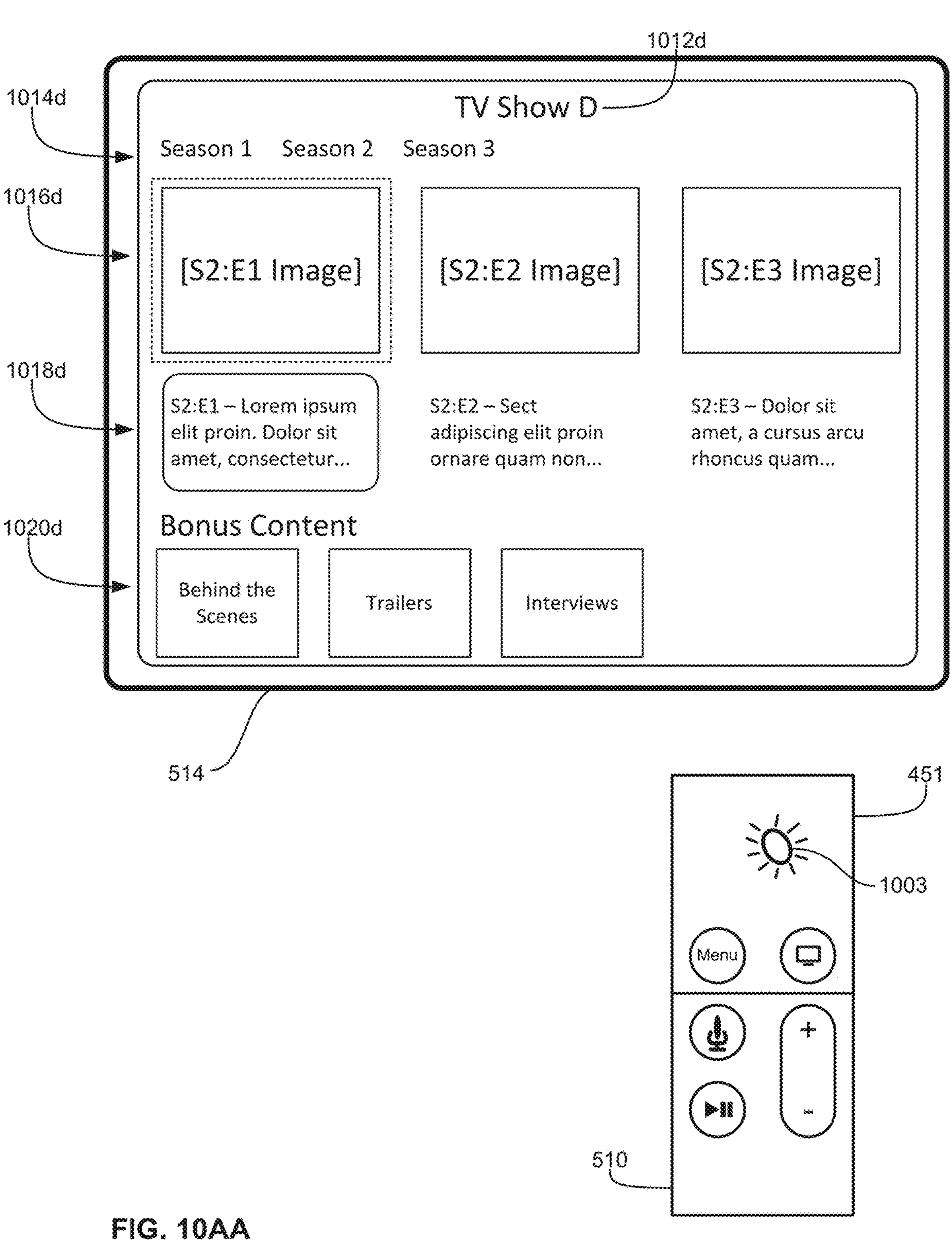
Figure 10B:
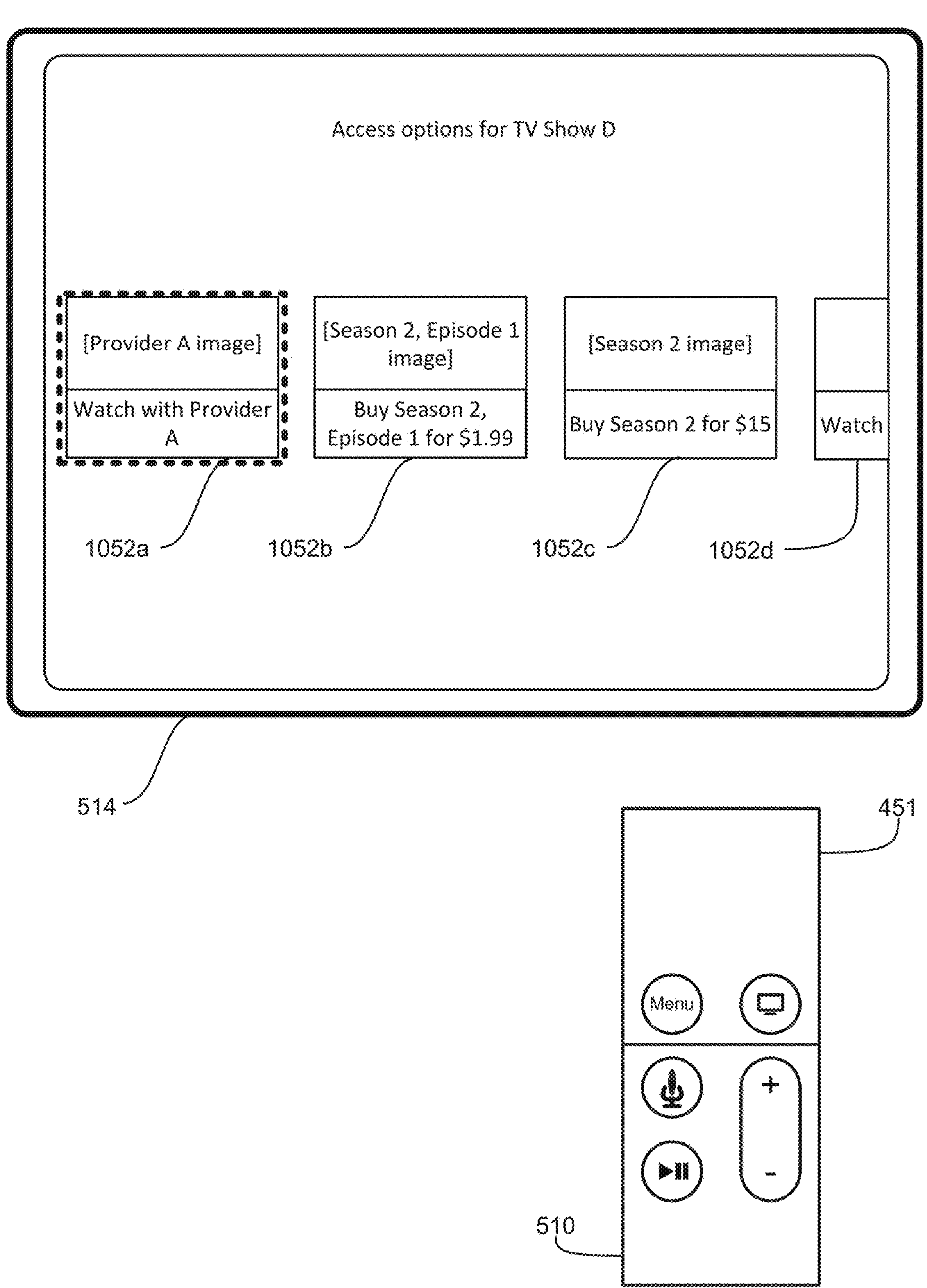
Figure 10C:
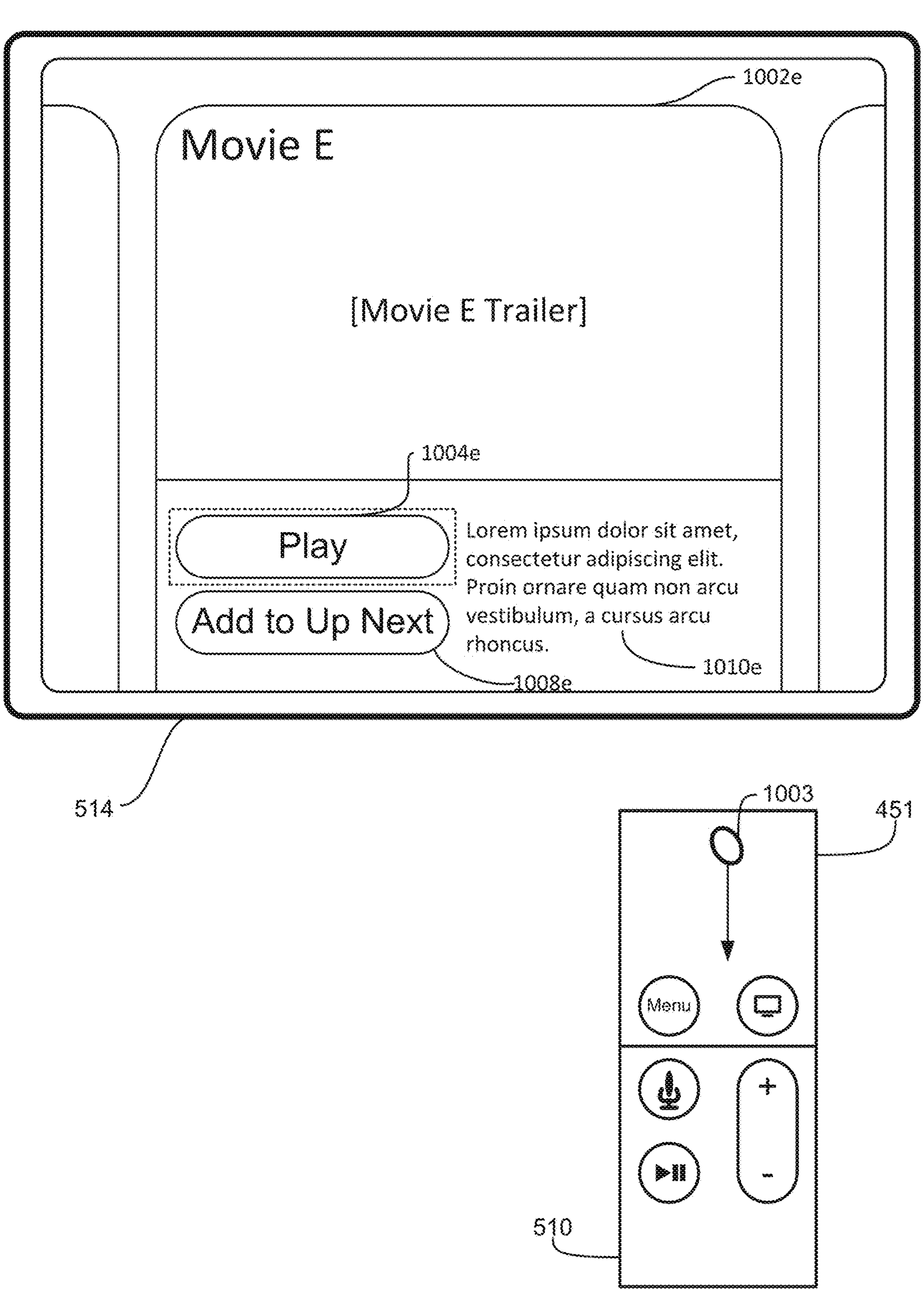
Figure 10D:
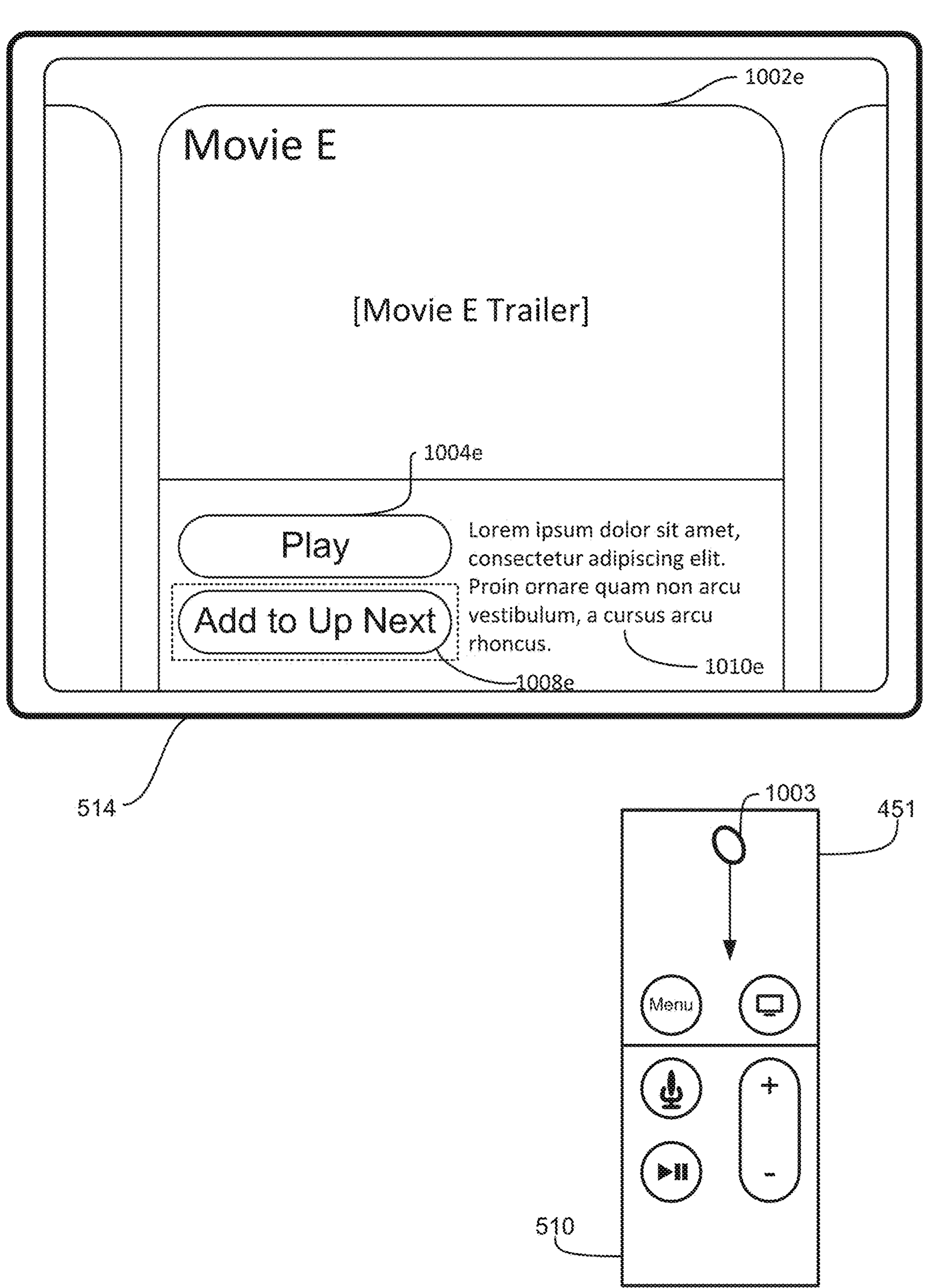
Figure 10E:
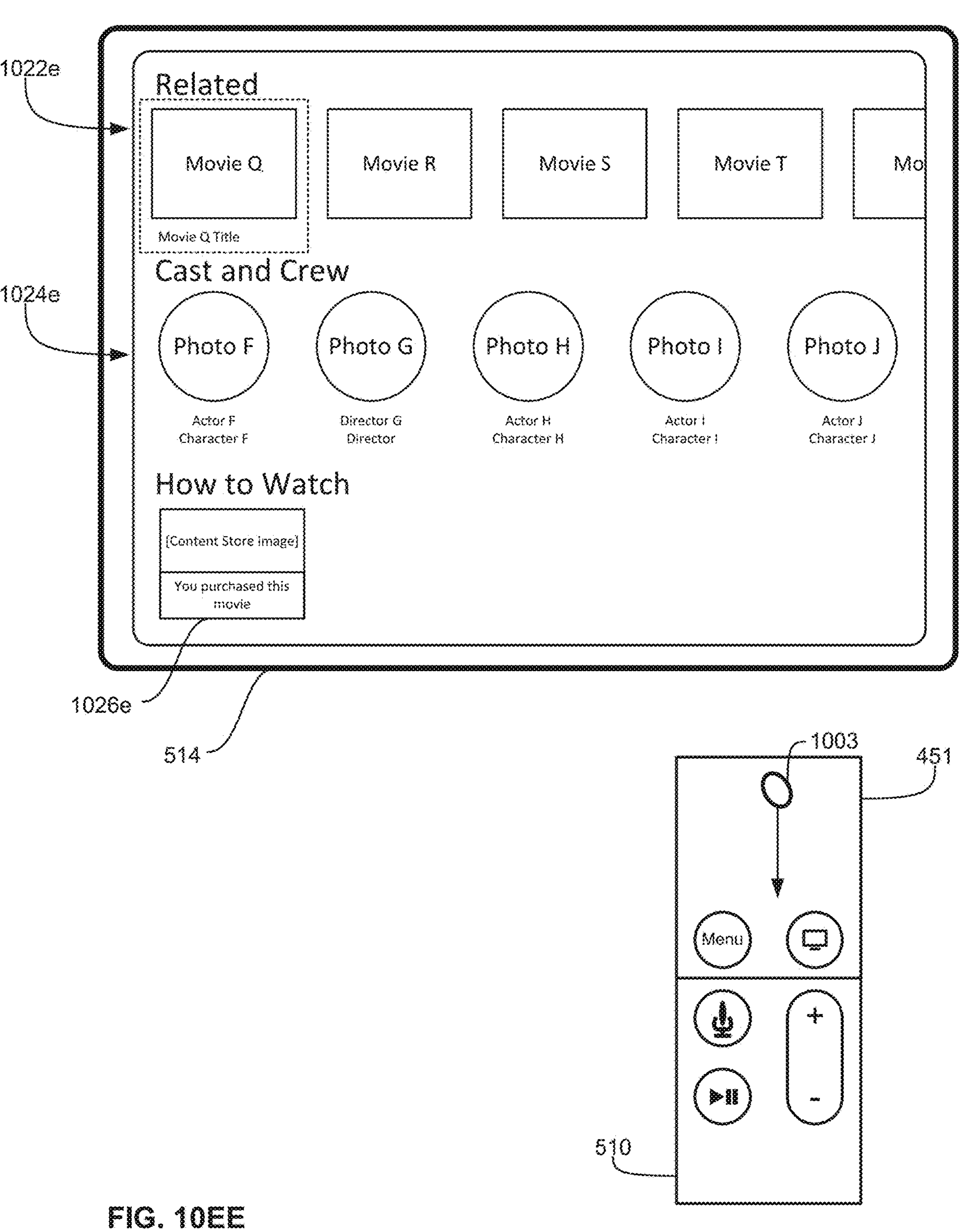
Figure 10F:
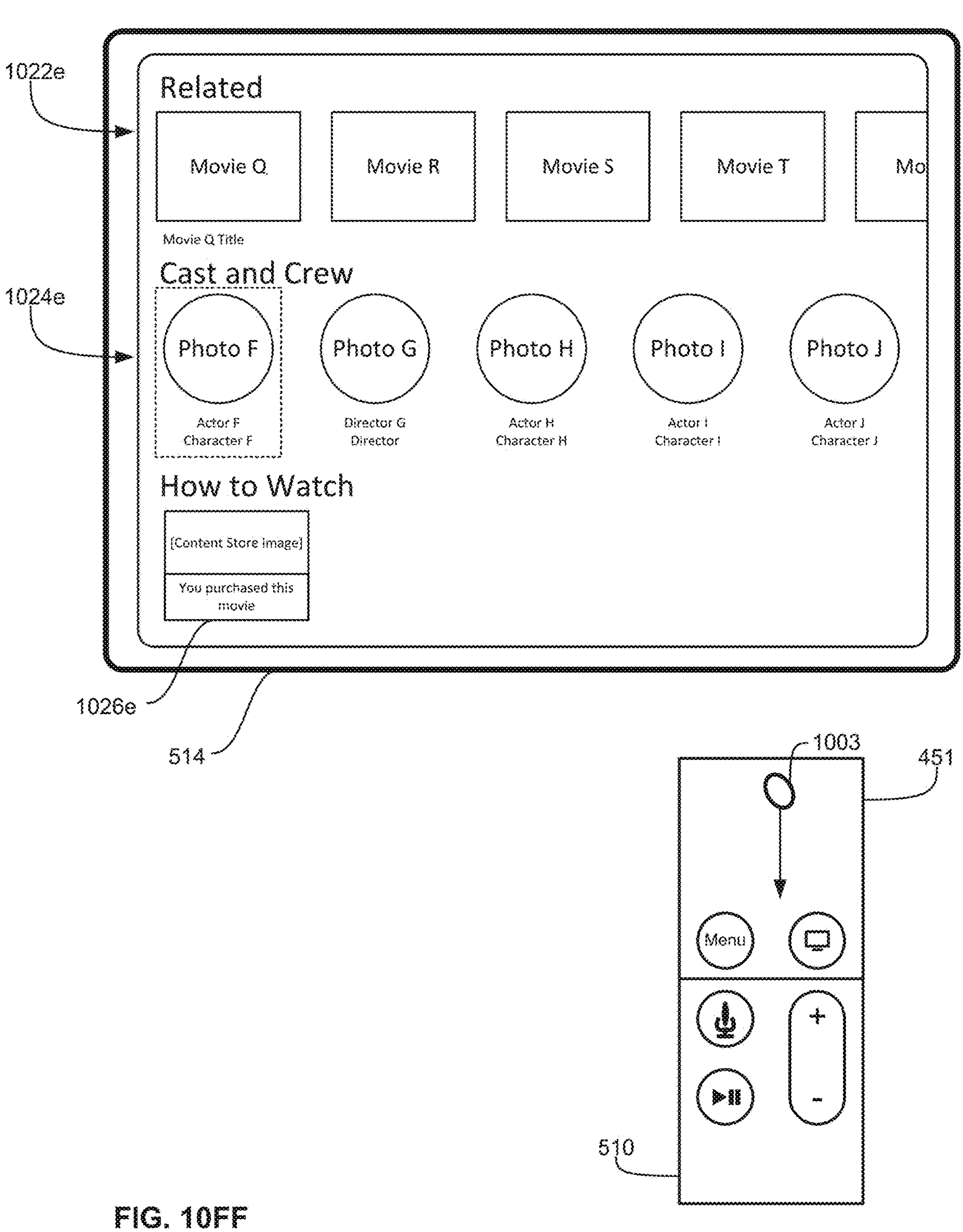
Figure 10G:
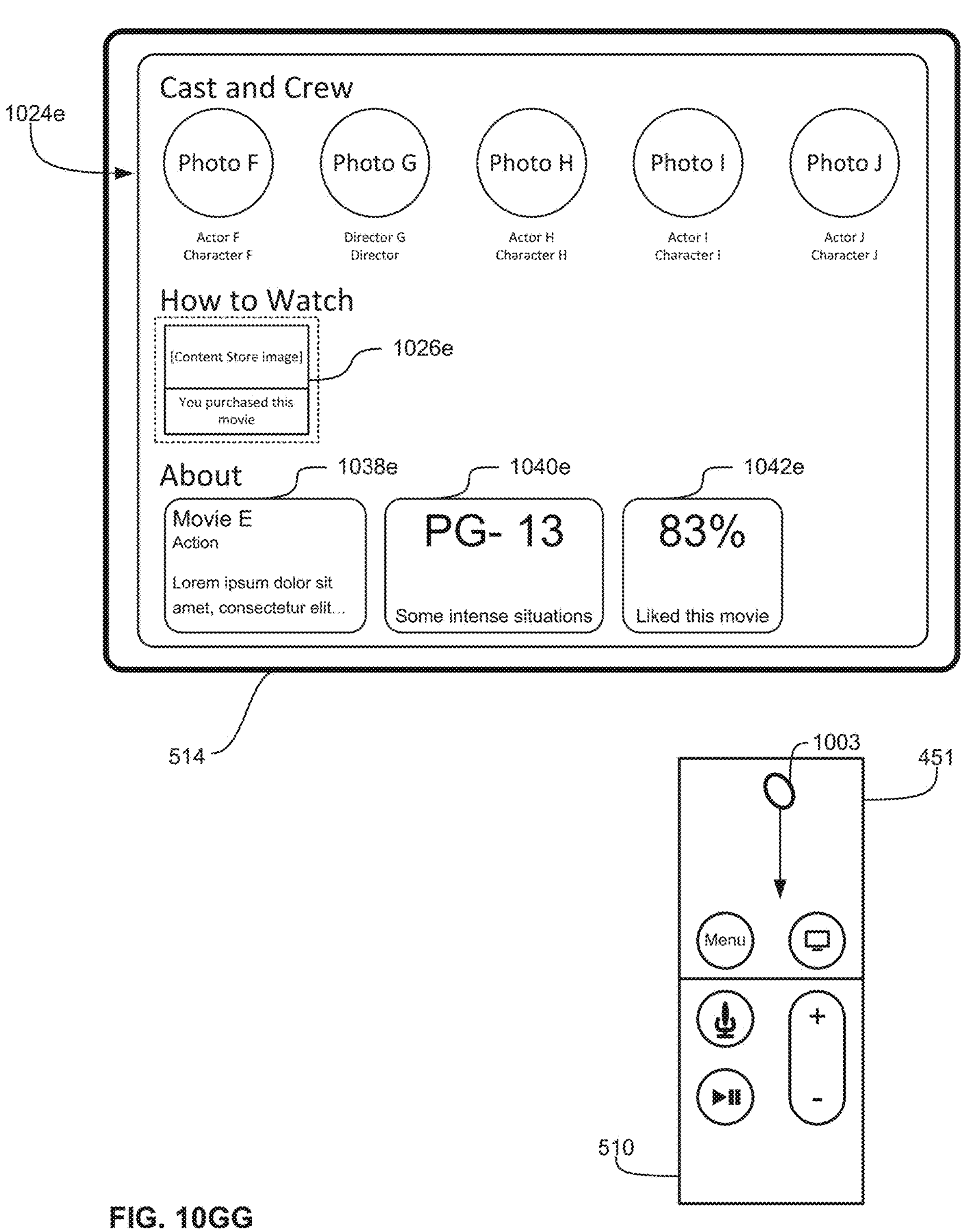
Figure 10H:
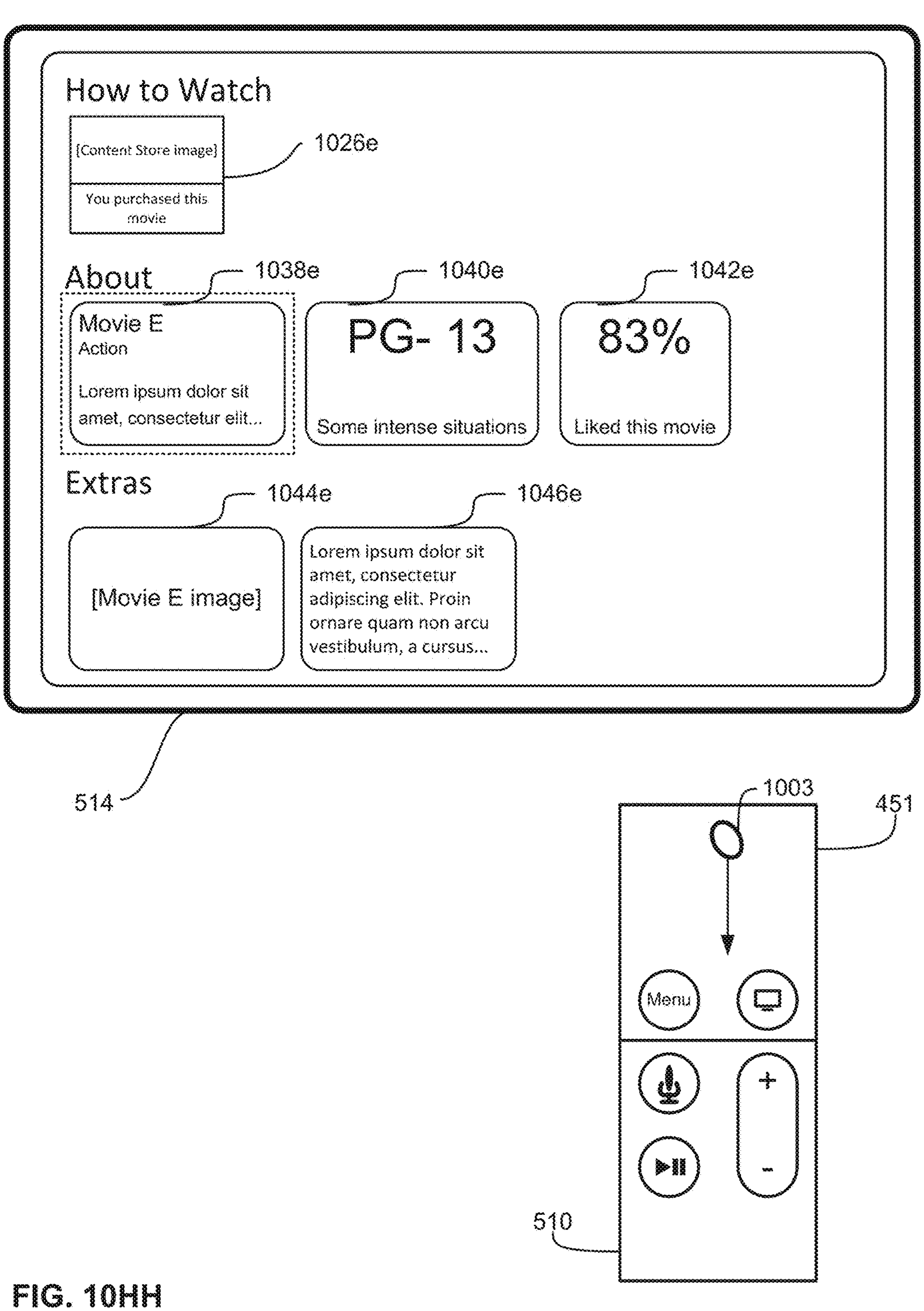
Figure 10I:
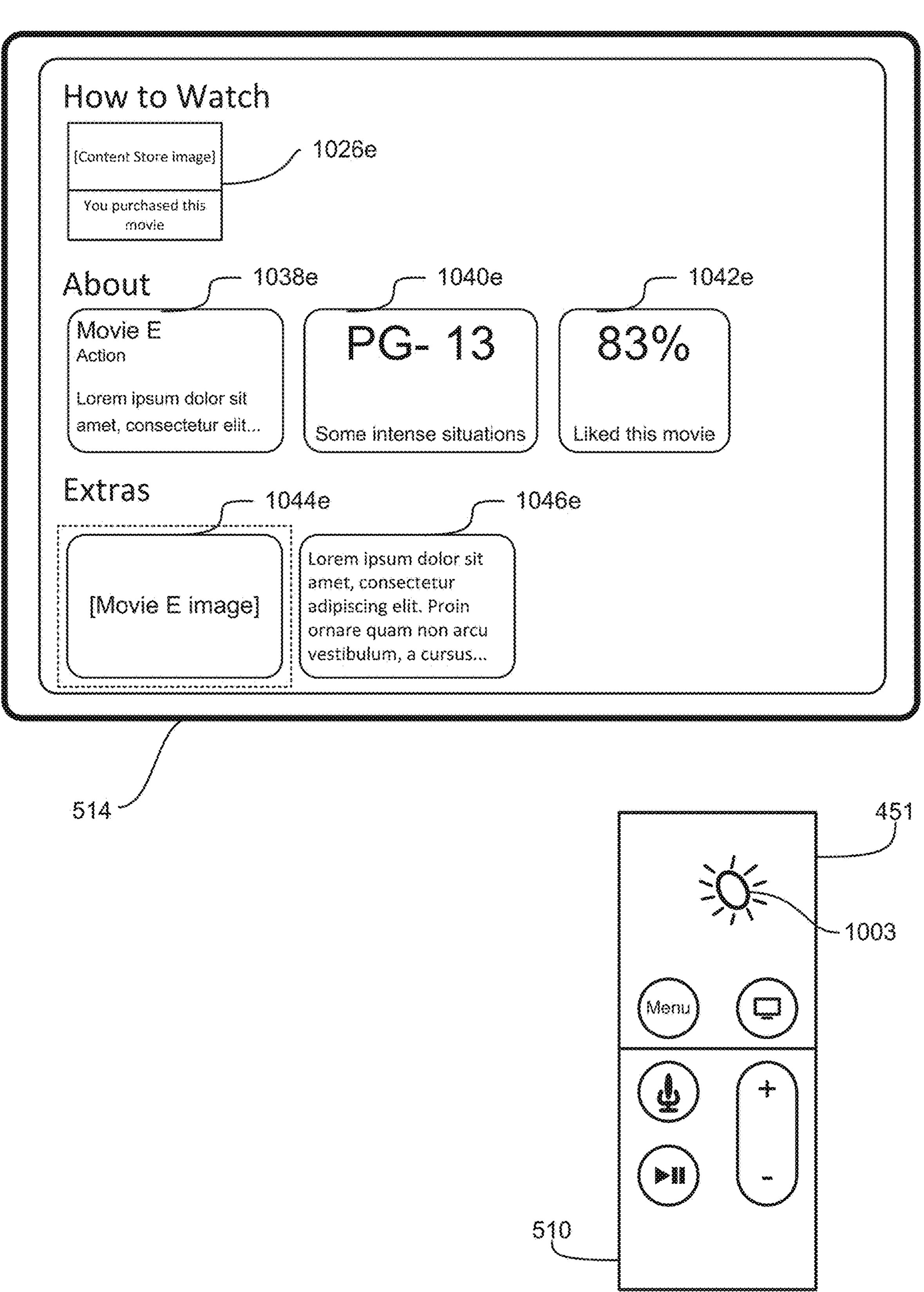
Figure 10J:
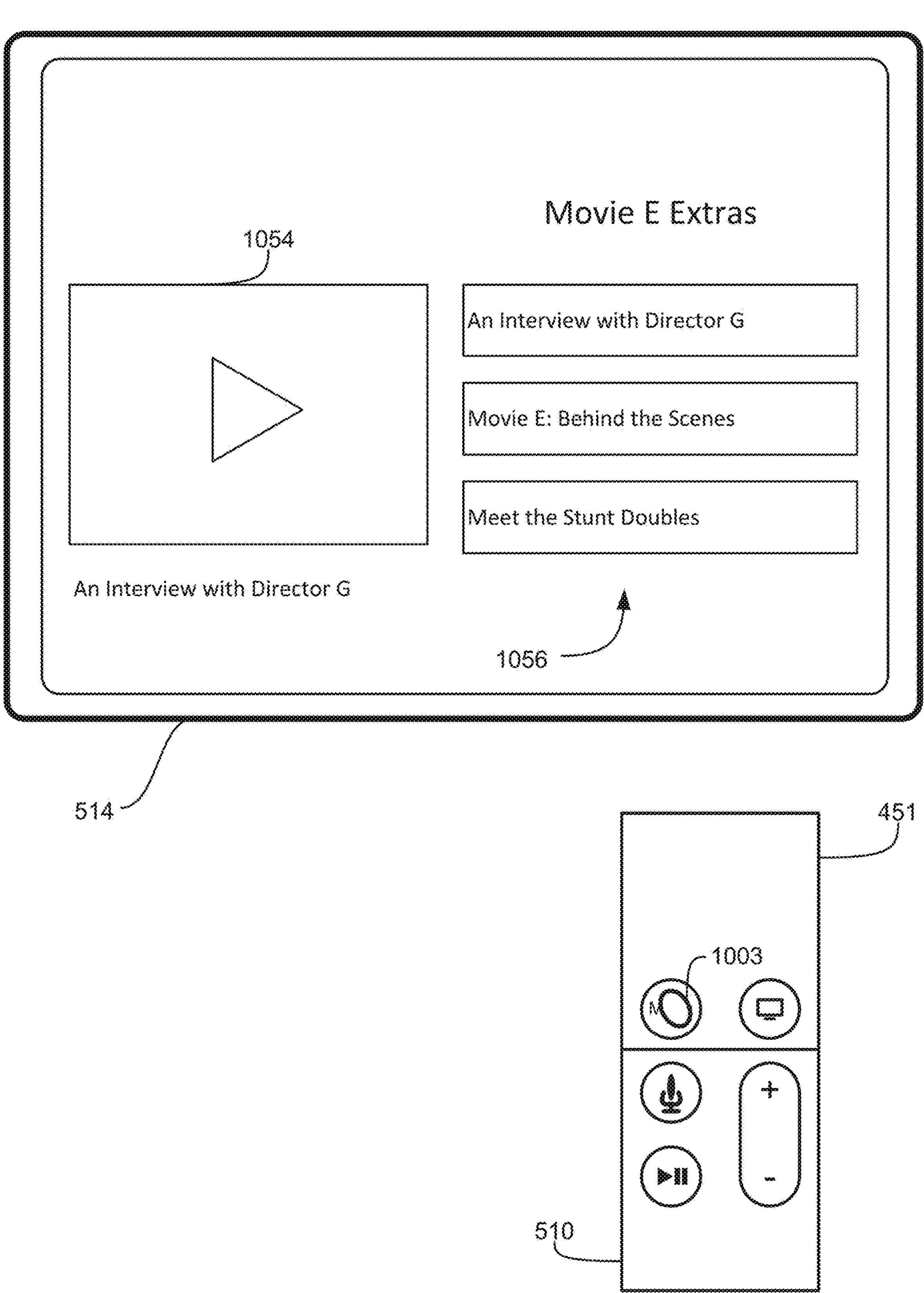
Figure 10K:
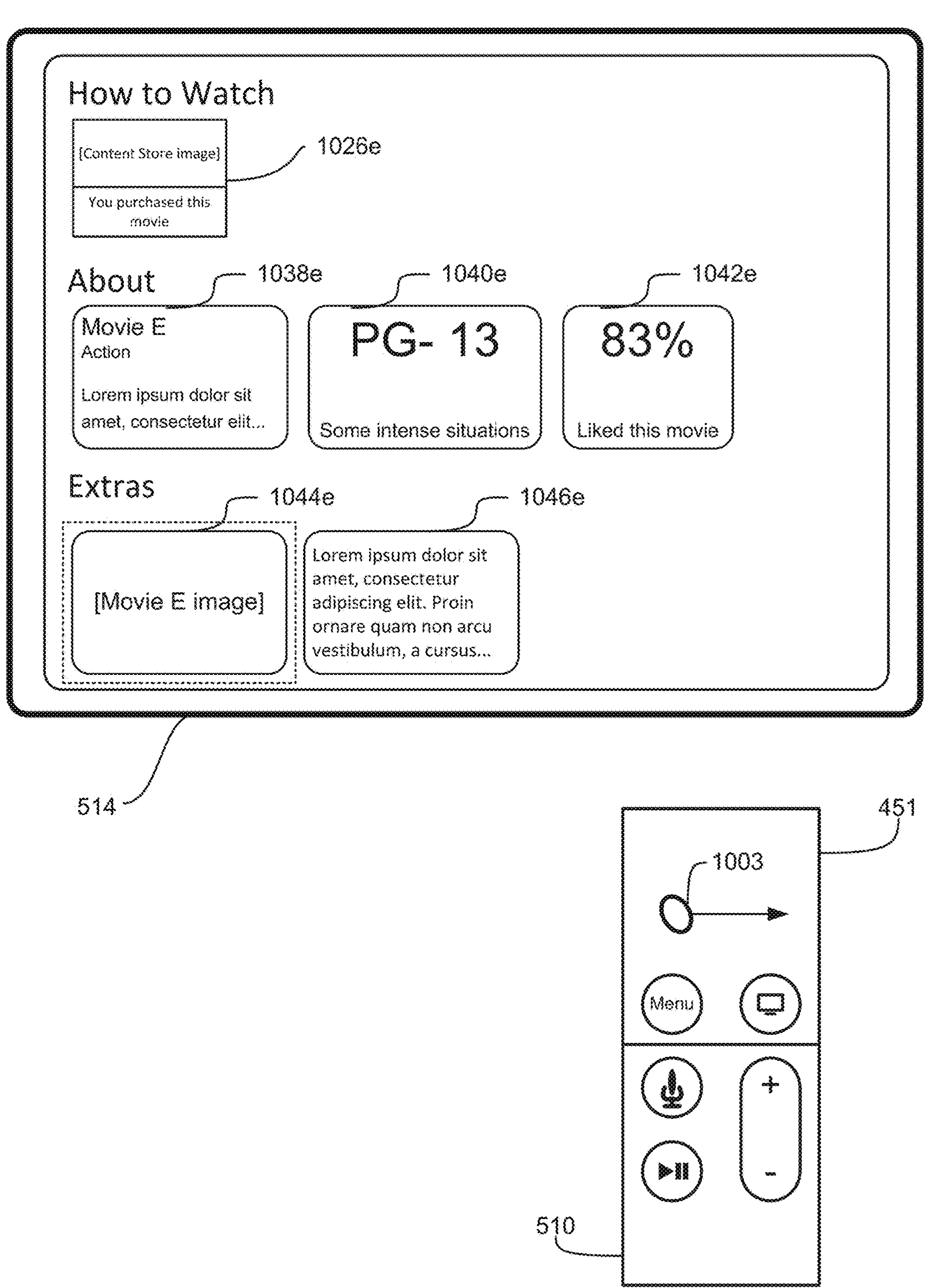
Figure 10L:
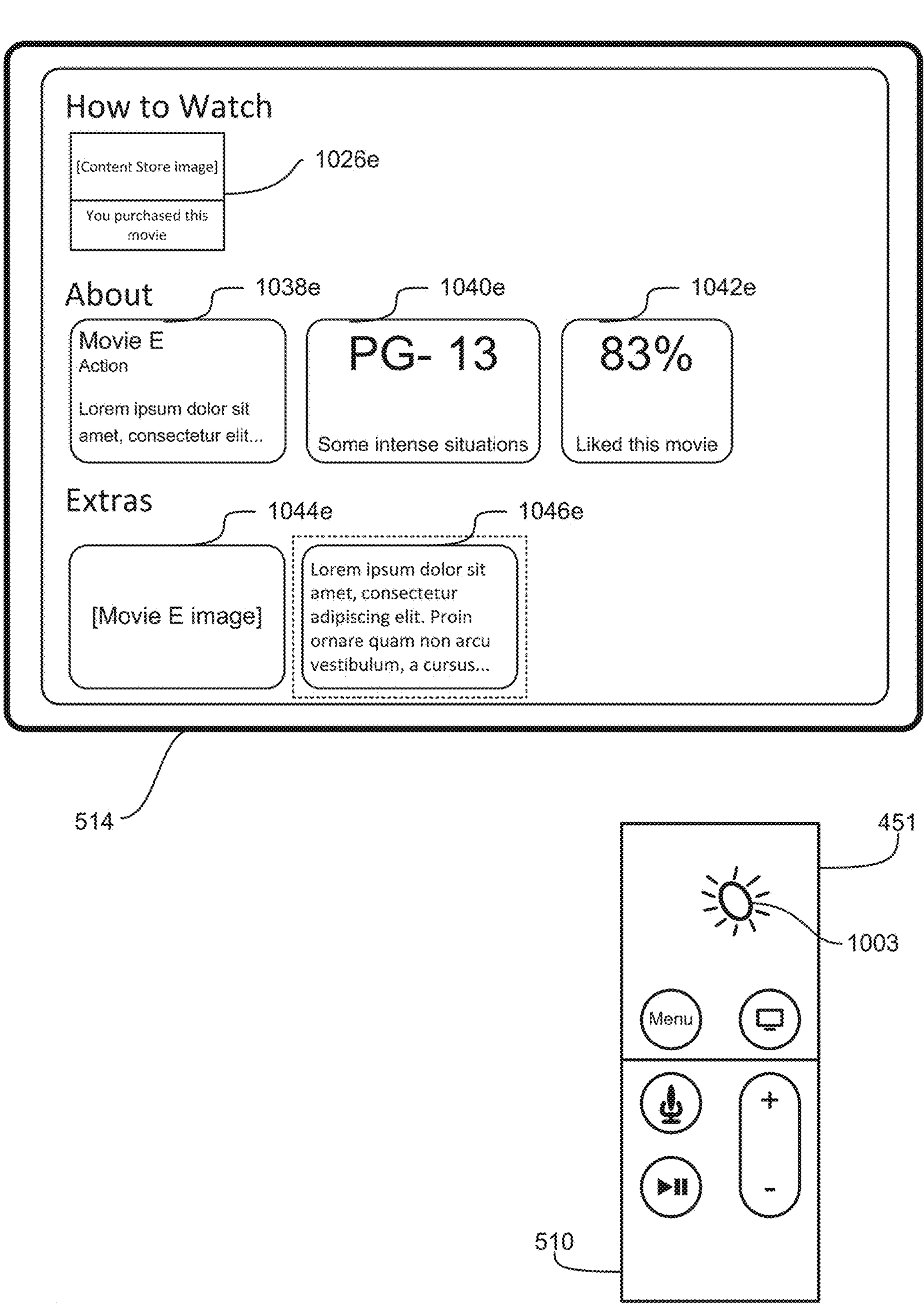
Figure 10M:
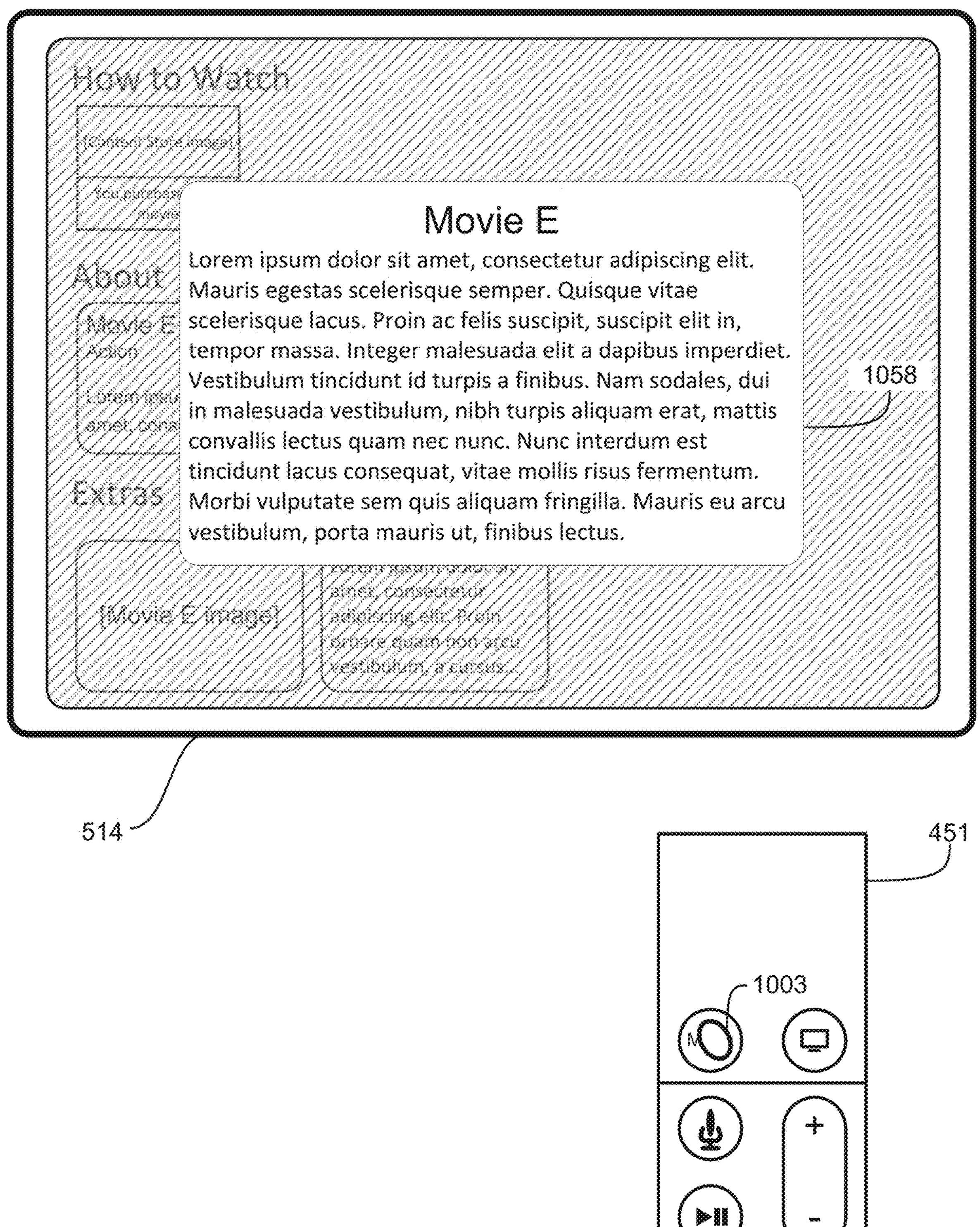
Figure 10N:
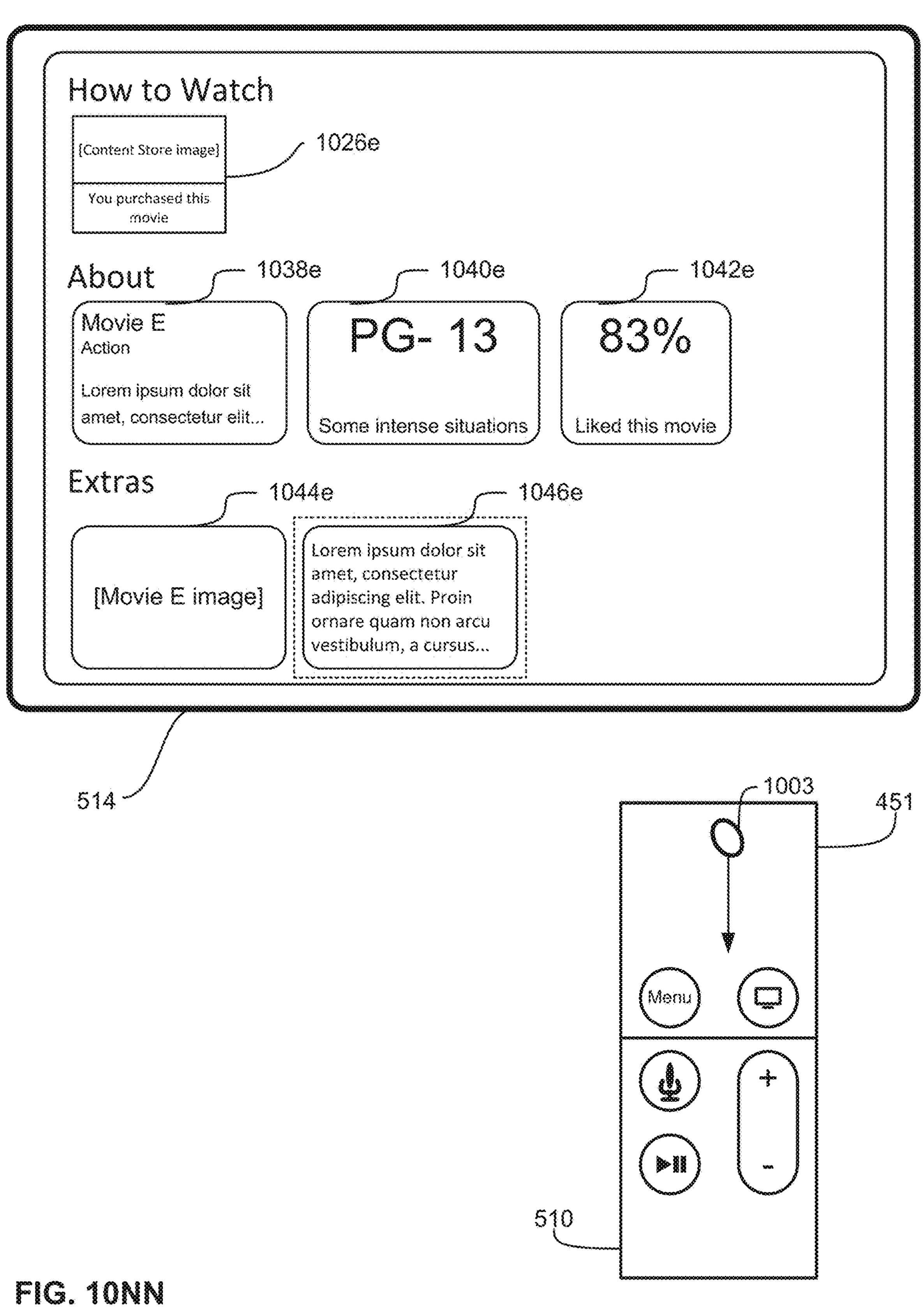
Figure 10O:
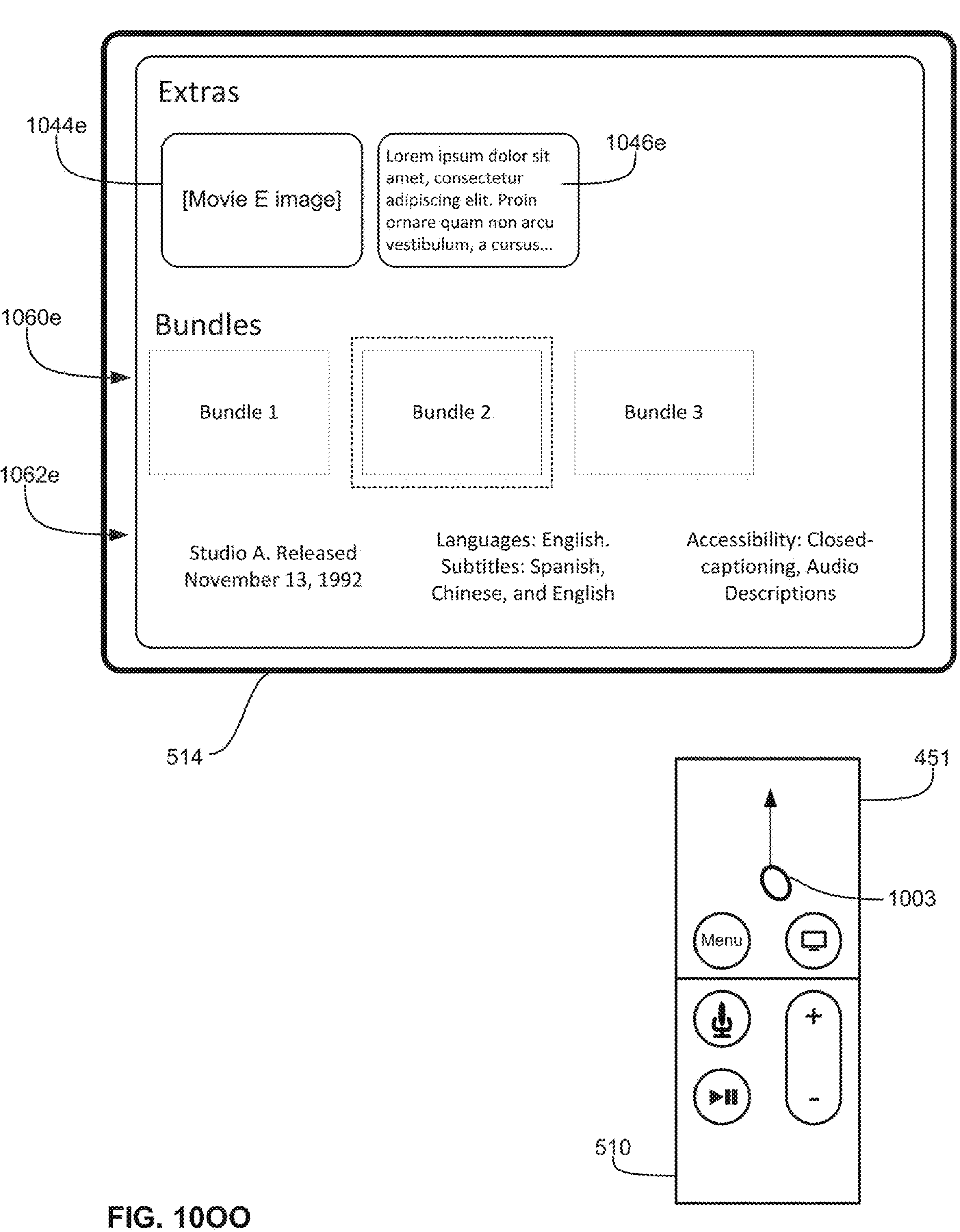
Figure 10P:
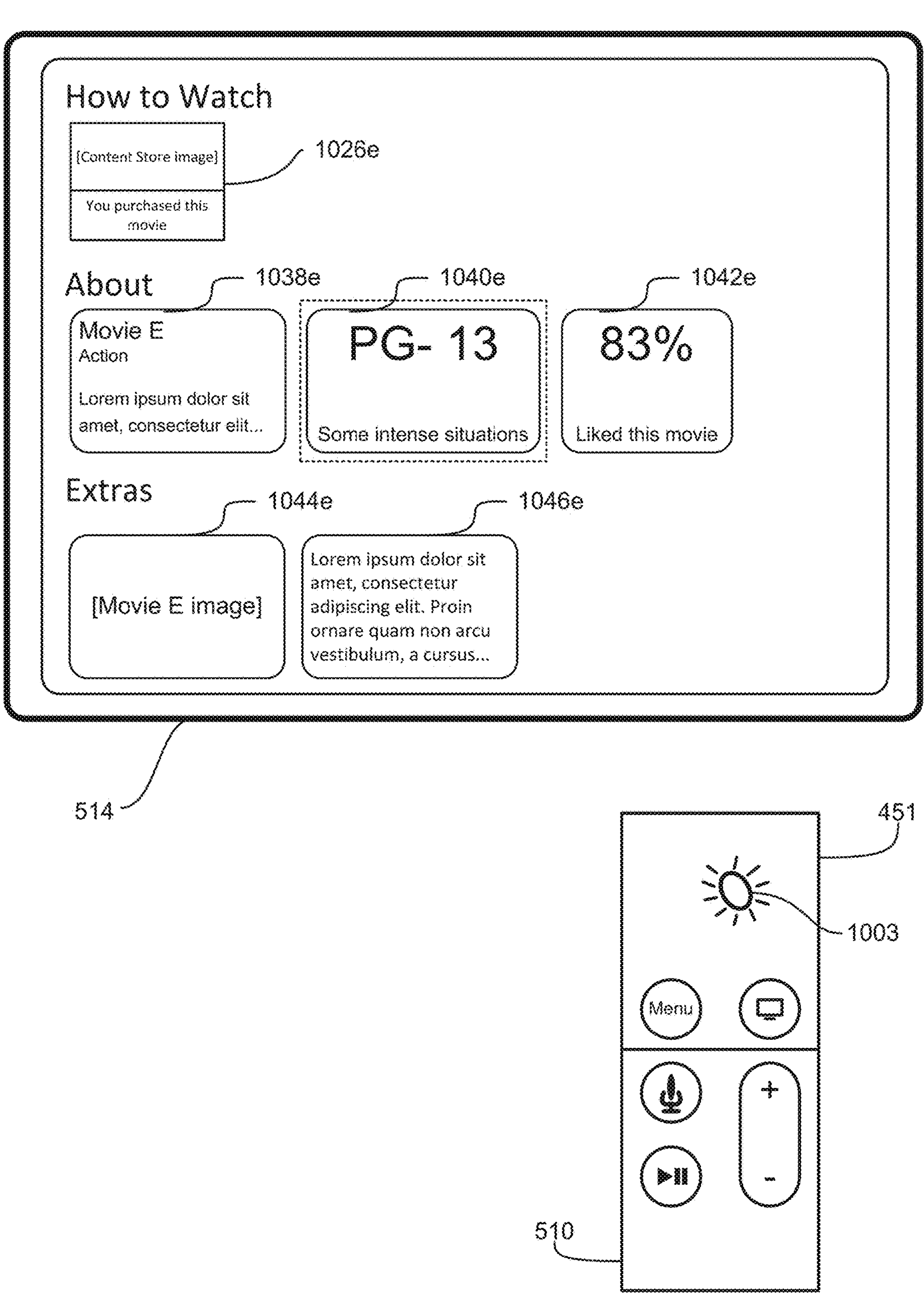
Figure 10Q:
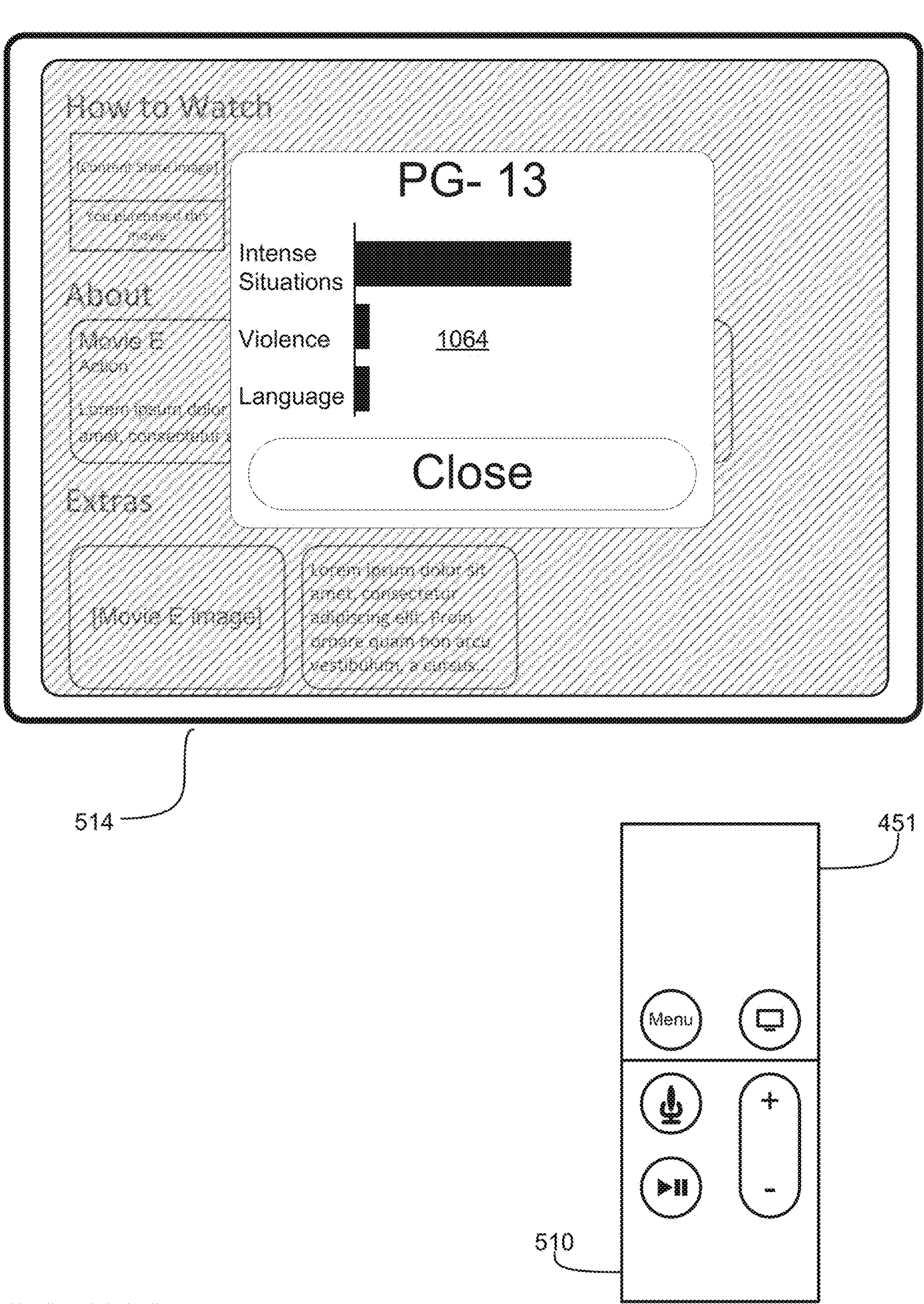
Figure 11B:
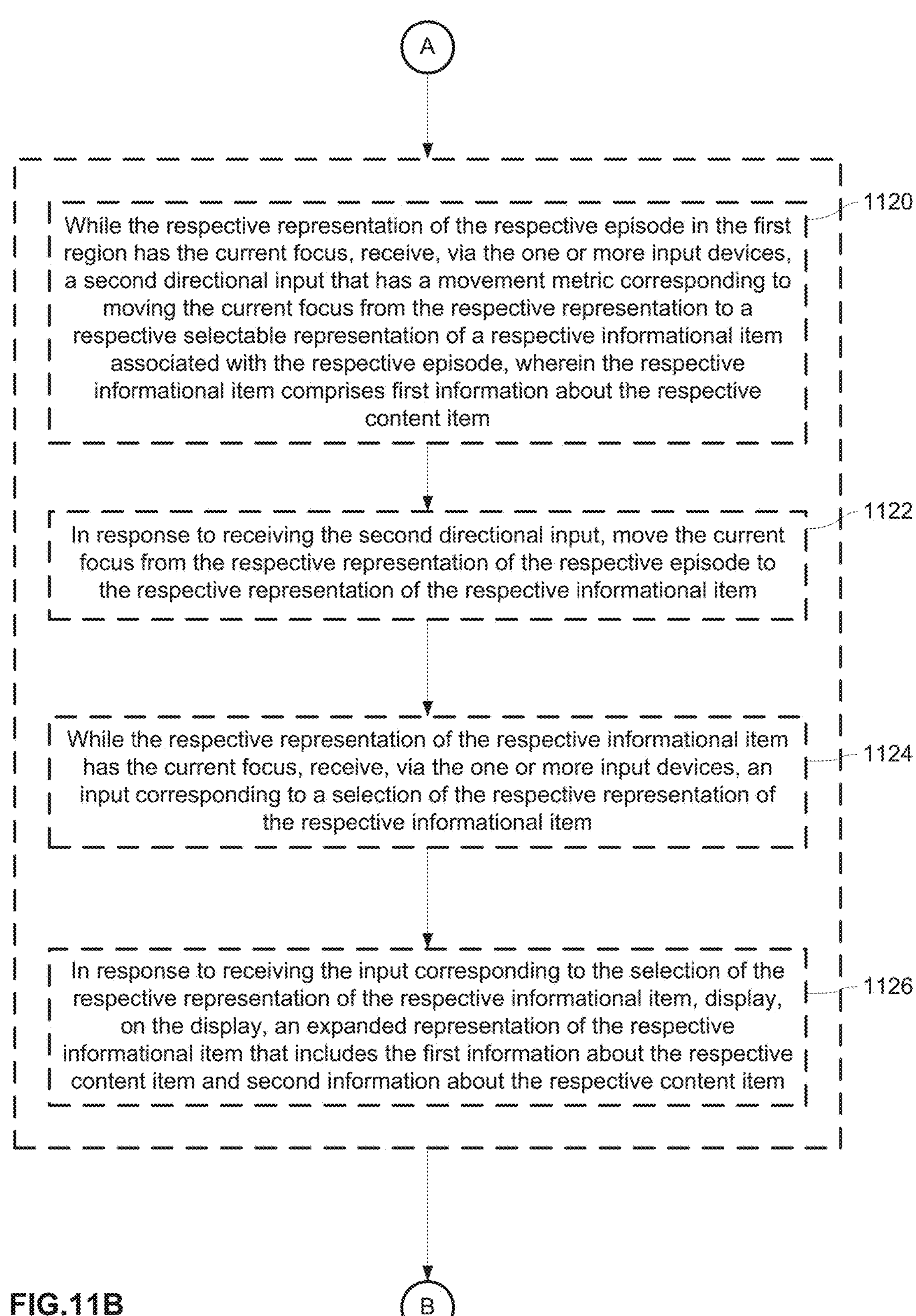
Figure 11C:
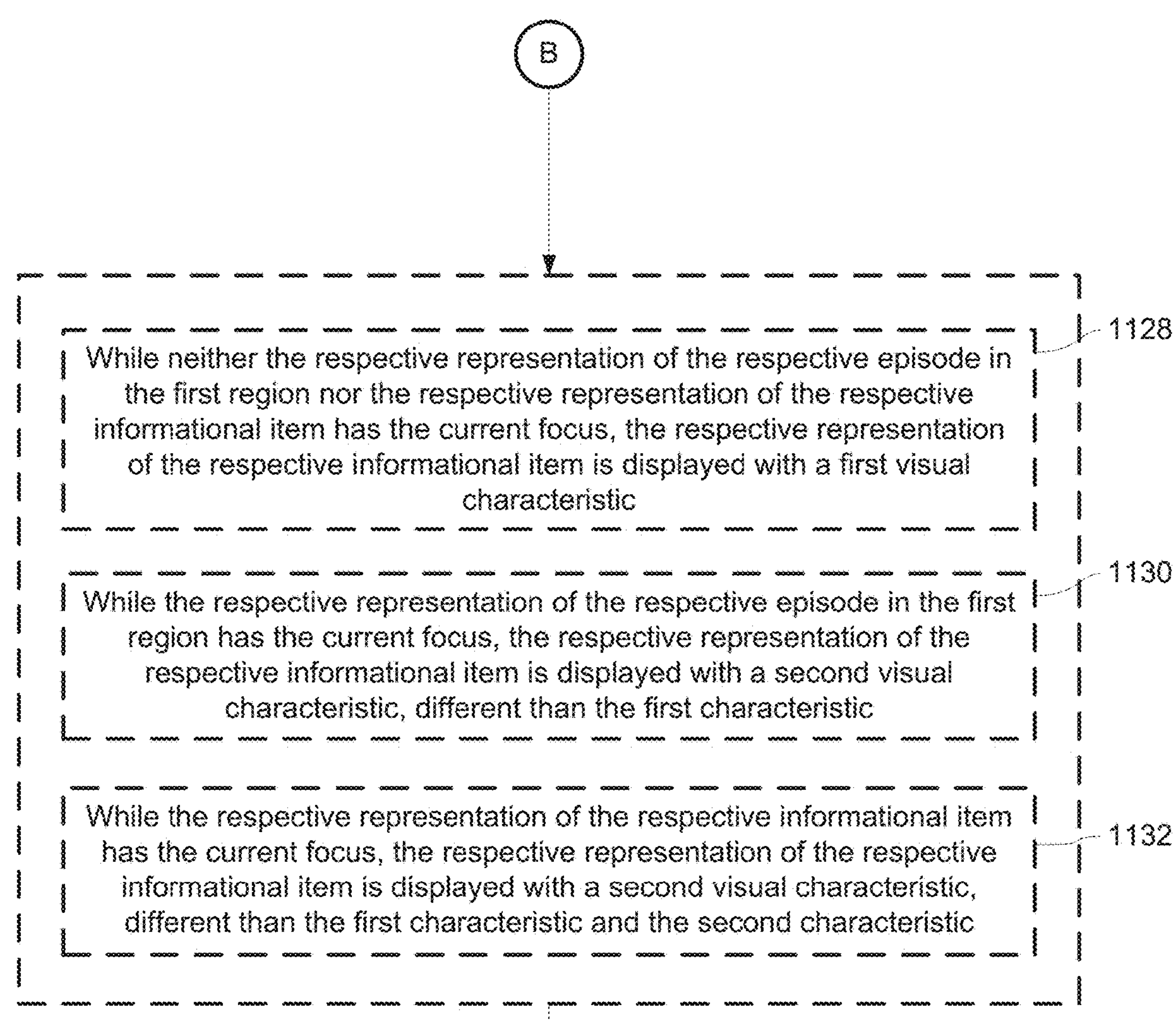
Figure 11D:
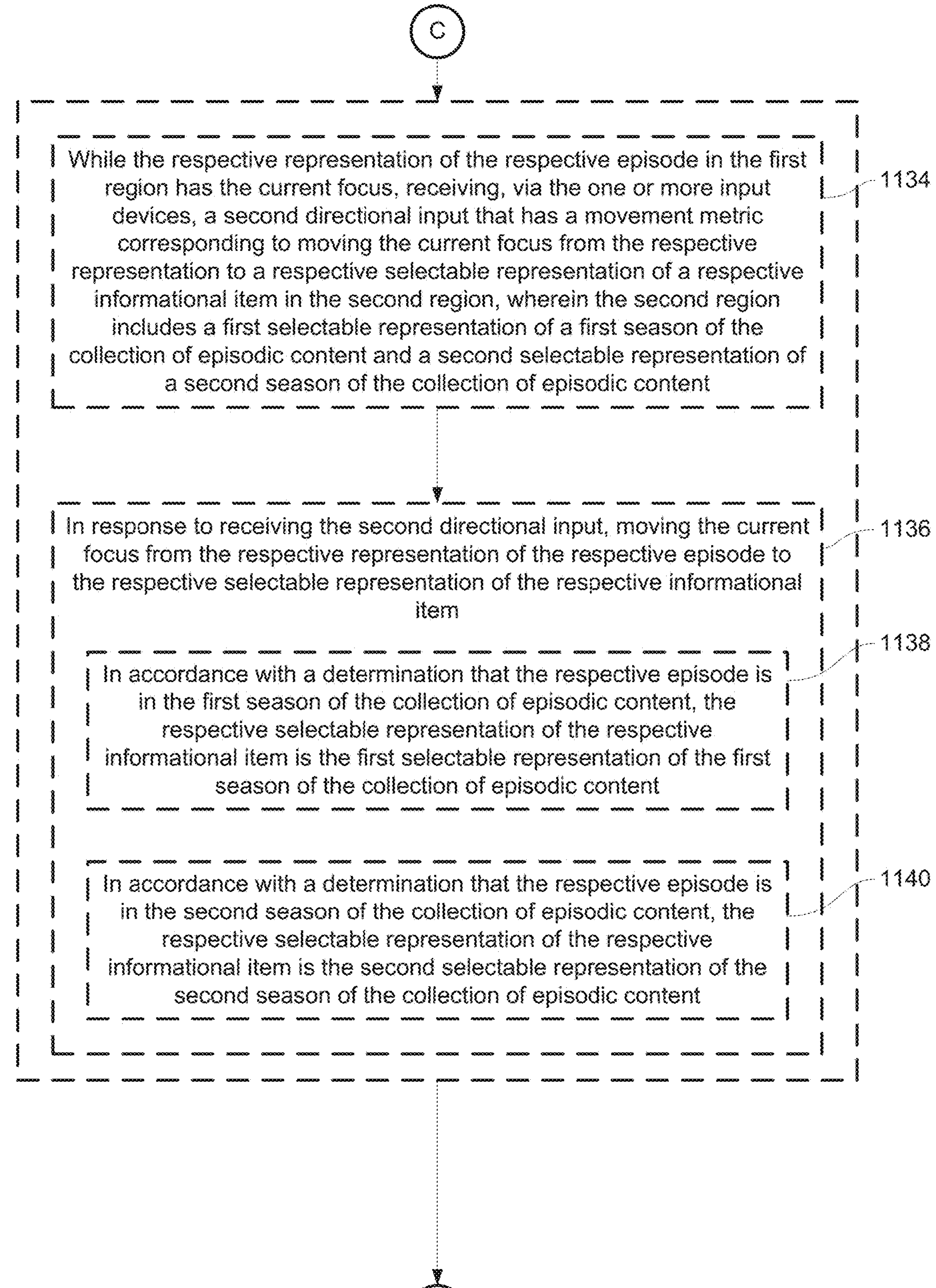
Figure 11E:
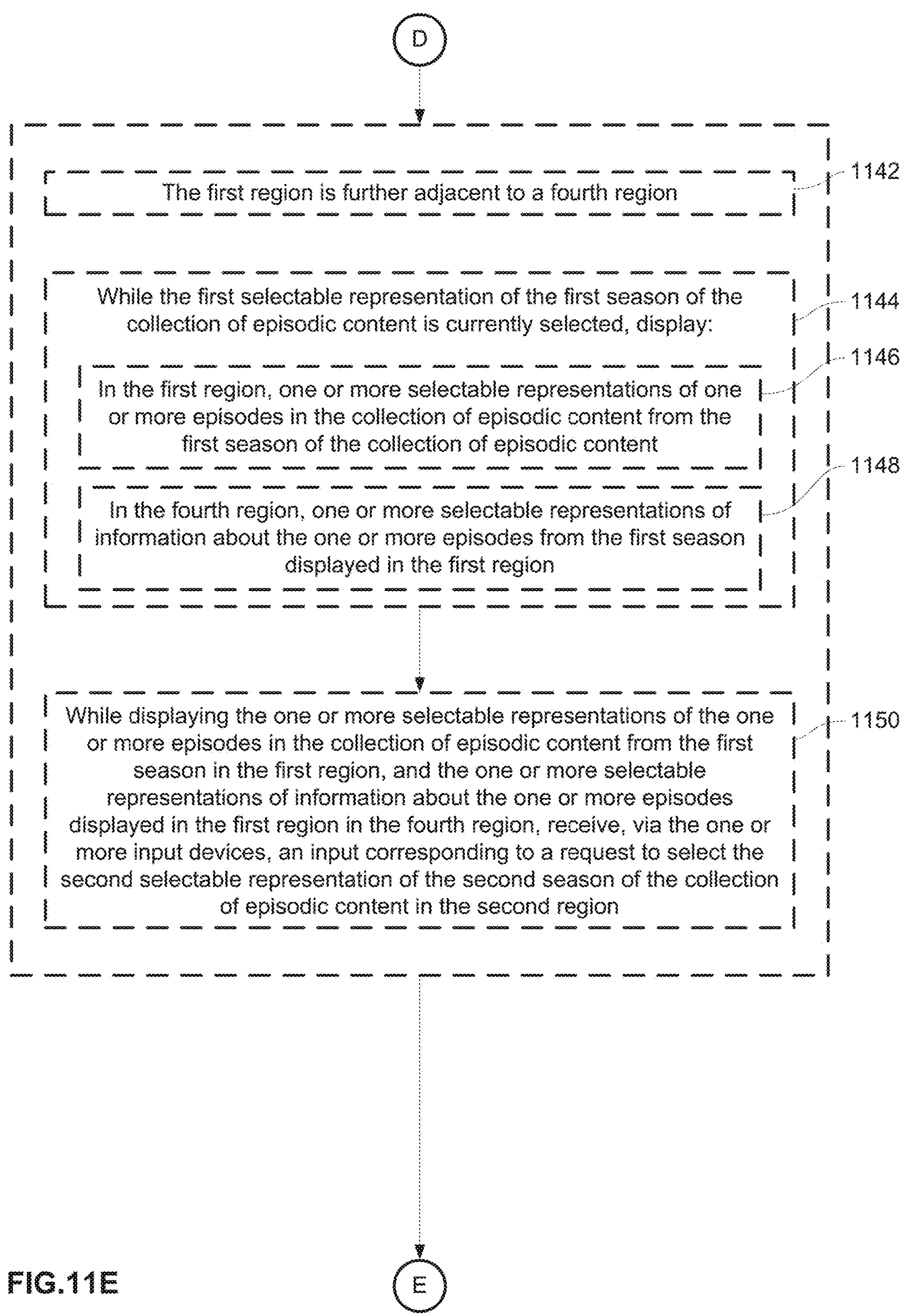
Figure 11F:
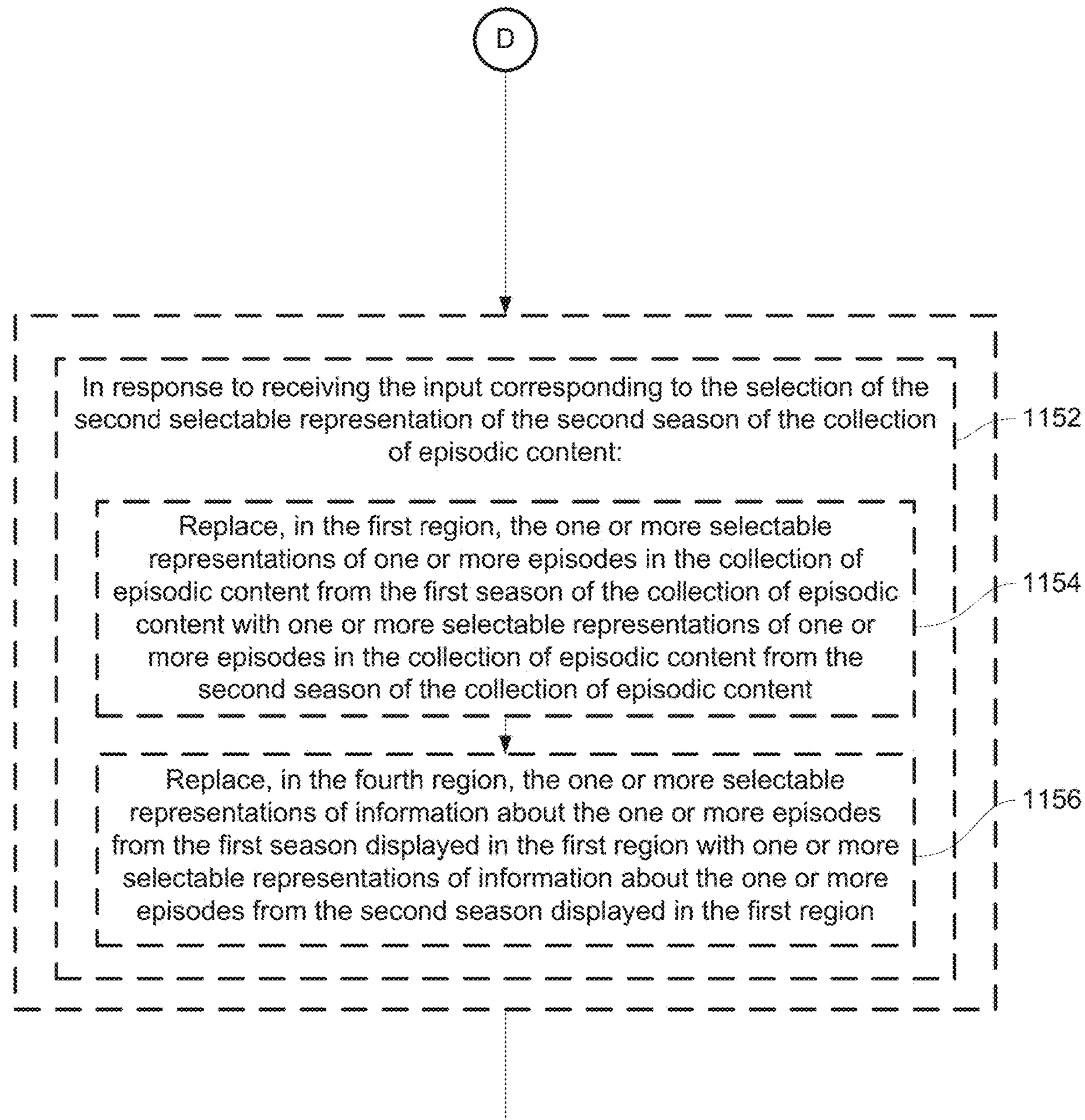
Figure 11G:
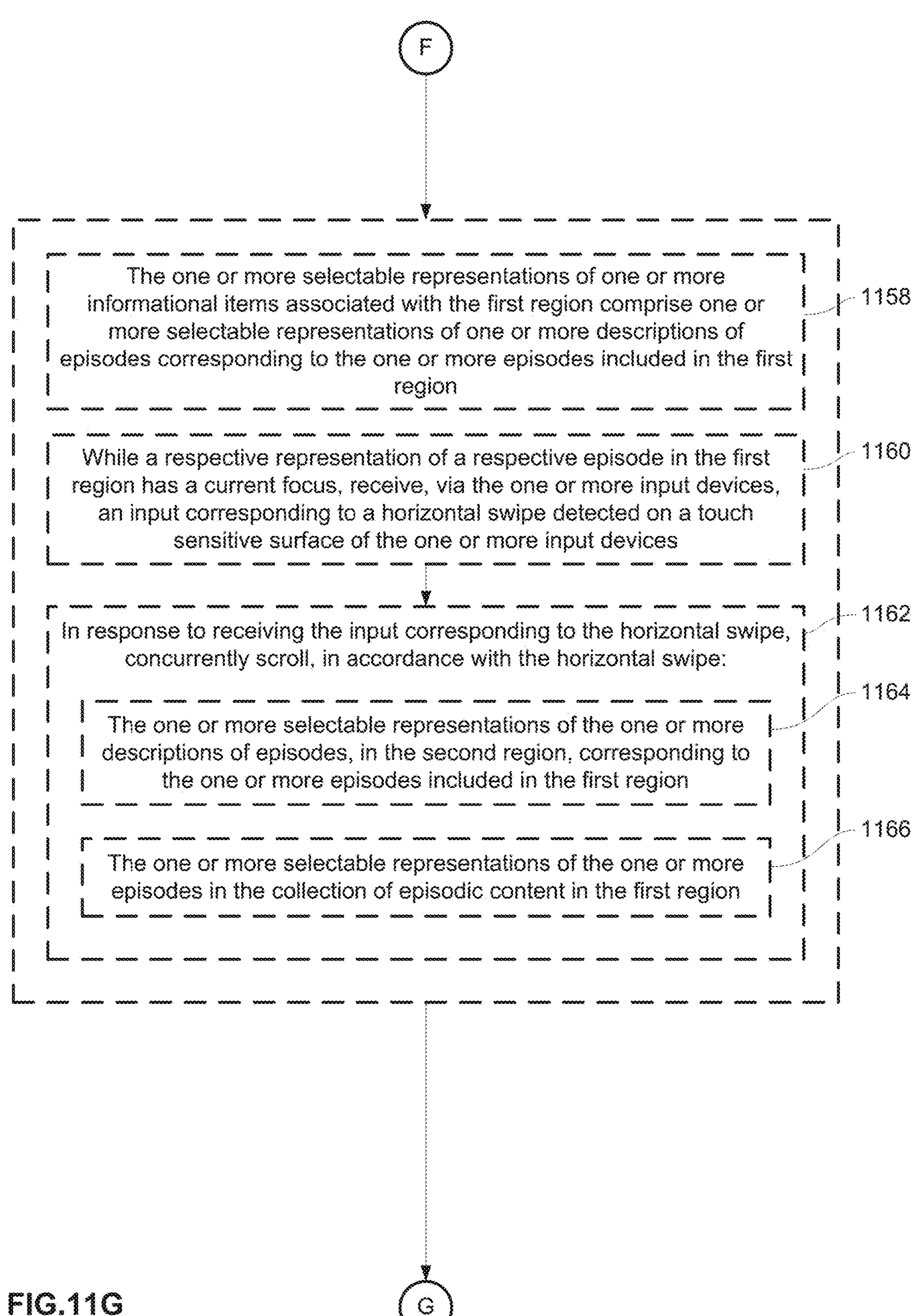
Figure 11I:
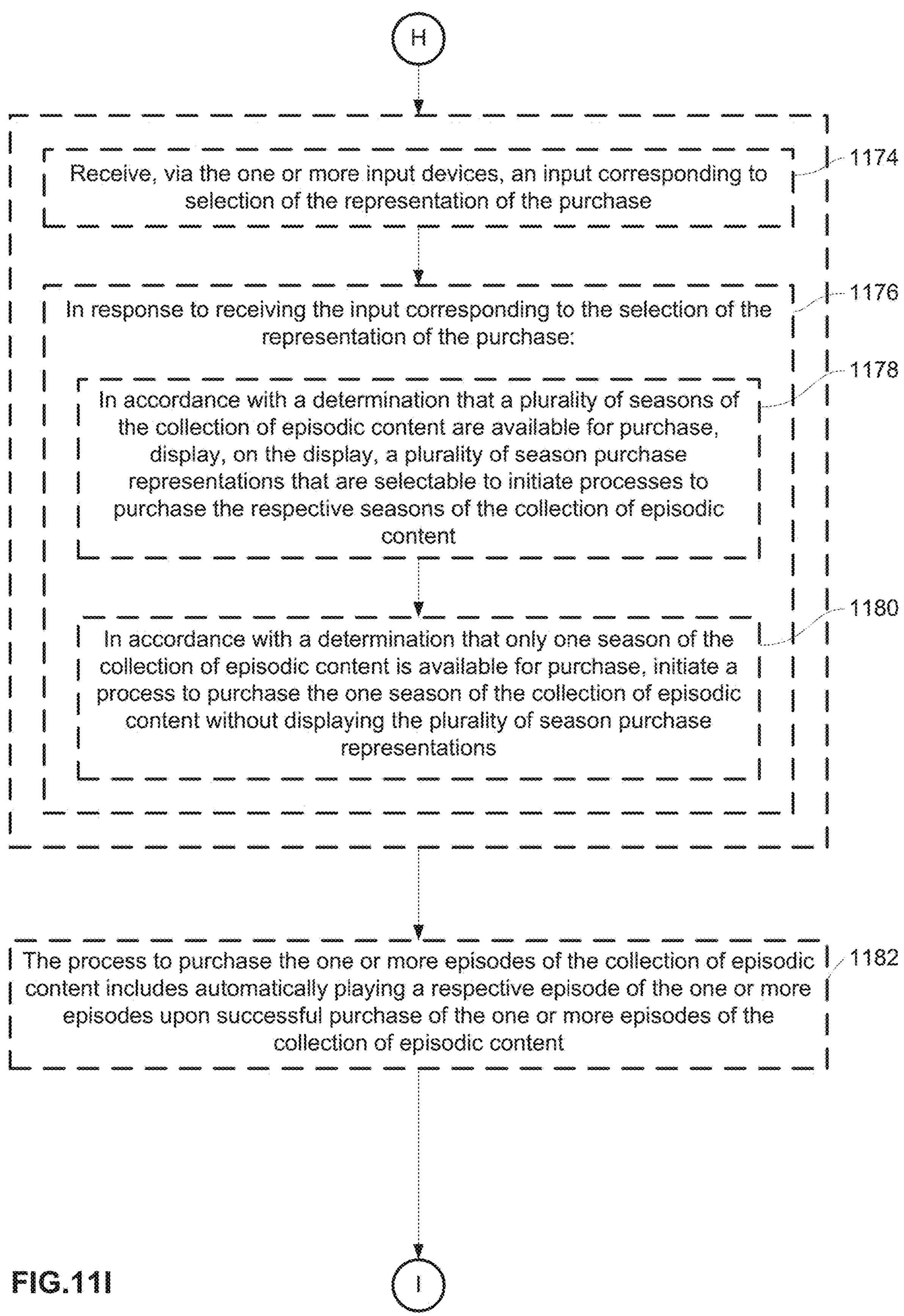
Figure 11J:
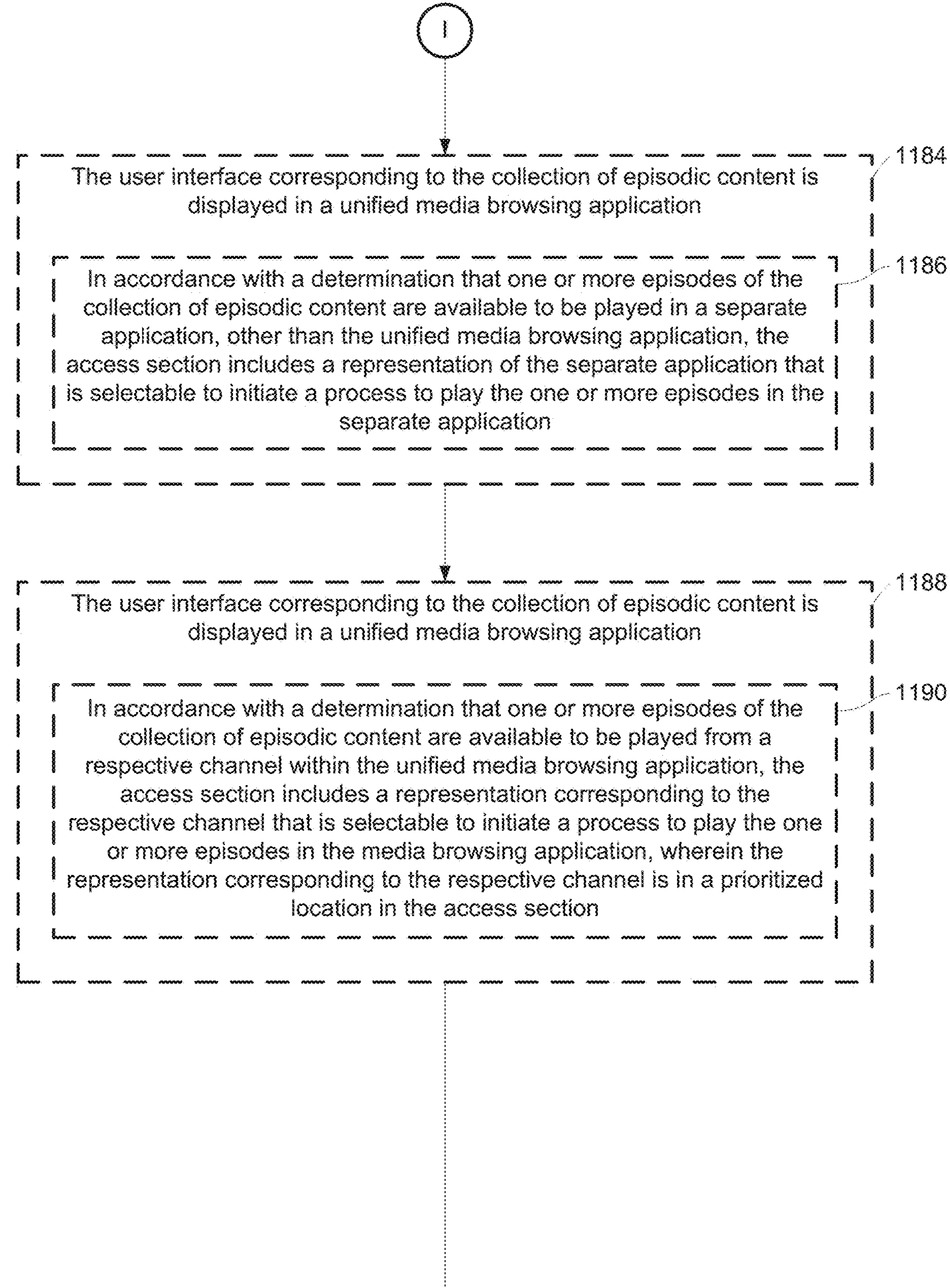
Figure 11K:
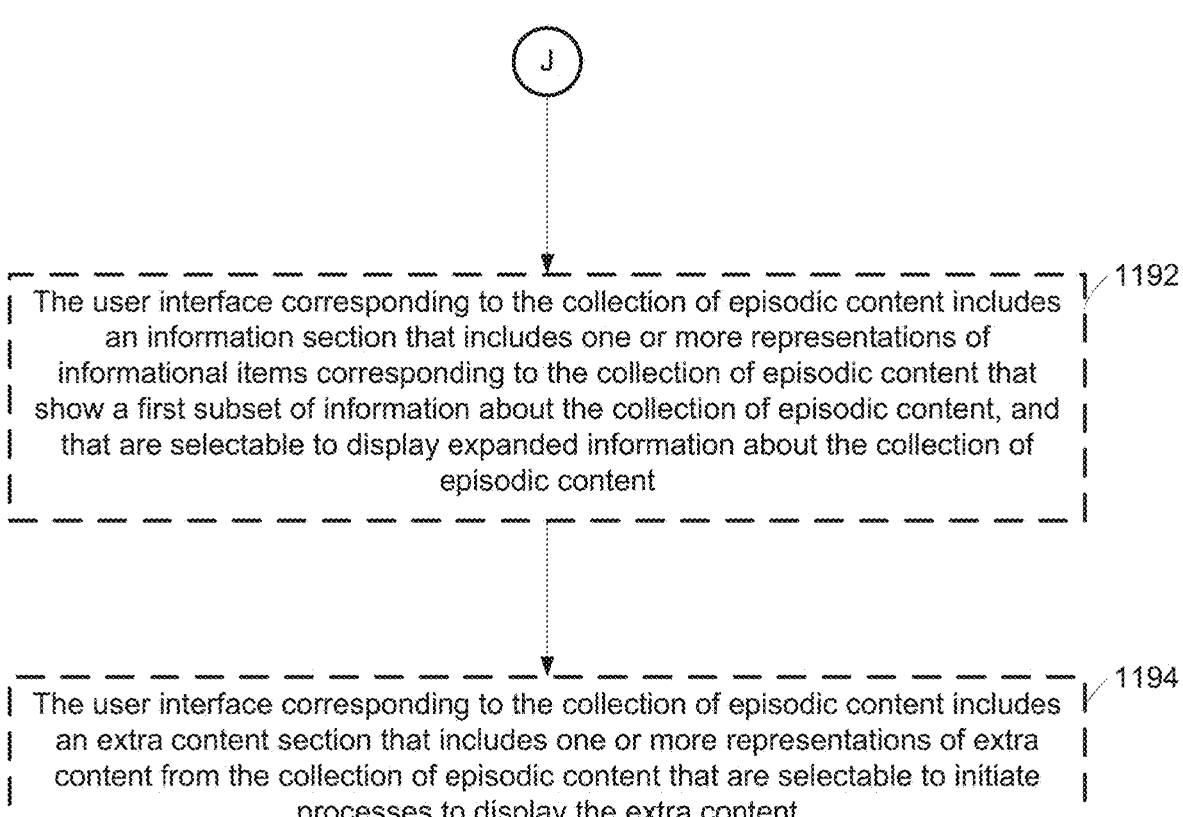

As shown in FIG. 10Z, in response to the input illustrated in FIG. 10Y, the electronic device 500 moves the current focus to a different season and updates the row 1016*d* of episodes and the row 1018*d* of information to include episodes in the selected season and information about those episodes. As shown in FIG. 10Z, the user swipes down (e.g., with contact 1003). In response to the user's input, the electronic device 500 moves the current focus to an item in the row 1016*d* of episodes, as shown in FIG. 10AA.

In FIG. 10AA, the user selects (e.g., with contact 1003) and holds (e.g., for longer than a time threshold, such as 1 second, 3 seconds, 5 seconds) the selection of a representation 1016 of an episode in the series. As shown in FIG. 10BB, in response to the input, the electronic device presents a plurality of options 1052*a-d* for accessing the selected episode, including an option 1052*a* to watch the episode with a channel to which the electronic device 500 is subscribed, an option 1052*b* to purchase the season that includes the episode, the option 1052*c* to purchase the episode, and part of another option 1052*d* (e.g., access with a different channel, access with a different application, etc.).

FIGS. 10CC-10QQ illustrate a user interface including information about an item of content that is not a series of episodic content. FIGS. 10CC-DD illustrate a representation 1002*e* of an item of content that includes a selectable option 1004*e* to initiate a process to play the content, a selectable option 1008*e* to add the item of content to a playback queue, and information 1010*e* about the item of content. As shown in FIGS. 10CC-10DD, while presenting the representation 1002*e* of the item of content, the electronic device 500 receives a series of inputs scrolling down (e.g., with contact 1003). In response to the series of inputs, the electronic device 500 moves the current focus down and scrolls the user interface, as shown in FIG. 10EE.

As shown in FIGS. 10EE-10FF, the electronic device 500 presents a row 1022*e* of related content, a row 1024*e* of representations of the cast and crew of the content, and a selectable option 1026*e* for accessing the content. As shown in FIGS. 10EE-10FF, the user scrolls (e.g., with contact 1003) down. In response to the user's scrolling, the electronic device 500 moves the current focus down and scrolls the user interface down, as shown in FIG. 10GG.

In FIG. 10GG, the electronic device 500 presents a representation 1038*e* of information about the content, a representation 1040*e* of information about parental guidance of the content, and a representation 1042*e* of reviews of the content. As shown in FIG. 10GG, the user scrolls (e.g., with contact 1003) down. In response to the user's scrolling, the electronic device 500 moves the current focus down and scrolls the user interface down, as shown in FIG. 10HH.

As shown in FIG. 10HH, the electronic device 500 presents a representation 1044*e* of extra content related to the content and a representation 1046*e* of a synopsis of the content. The user scrolls (e.g., with contact 1003) down. In response to the input, the electronic device 500 moves the current focus from representation 1038*e* to representation 1044*e*, as shown in FIG. 10II.

In FIG. 10II, the user selects (e.g., with contact 1003) the representation 1044*c*. In response to the user's selection, the electronic device 500 presents a user interface including extra content related to the content, as shown in FIG. 10JJ. In FIG. 10JJ, the electronic device 500 presents a plurality of selectable representations 1056 of extra content related to the content and a mini-player 1054 that is selectable to play one of the items of extra content. As shown in FIG. 10JJ, the user selects (e.g., with contact 1003) an option to navigate backward in the user interface (e.g., the "Menu" button on input device 510). In response to the user input, the electronic device 500 presents the user interface illustrated in FIG. 10KK.

As shown in FIG. 10KK, the electronic device 500 presents the user interface including information about the item of content with the current focus on the representation 1044*e* of extra content. The user enters a swipe input (e.g., with contact 1003). In response to the user's input, the electronic device 500 moves the current focus from representation 1044*e* to representation 1046*e*, as shown in FIG. 6LL. As shown in FIG. 10LL, the user selects (e.g., with contact 1003) the representation 1046*e* of the synopsis of the content.

As shown in FIG. 10MM, in response to the user's selection in FIG. 10LL, the electronic device 500 presents the full text 1058 of the synopsis on the display 514. While displaying the text 1058, the electronic device 500 detects selection (e.g., with contact 1003) of the "Menu" button on the input device 510. In response to the input, the electronic device 500 ceases displaying the text 1058 and returns to displaying the user interface including the information about the item of content, as shown in FIG. 10NN.

As shown in FIG. 10NN, the user scrolls (e.g., with movement of contact 1003) down. In response to the user input, the electronic device 500 scrolls the user interface as shown in FIG. 10OO. In FIG. 10OO, the electronic device 500 presents a row 1060*e* of representations of bundles that include the item of content along with other related items of content and a row 1062*e* of information about the content. The user scrolls (e.g., with contact 1003) up. In response to the input, the electronic device 500 scrolls the user interface up and moves the current focus to the option 1040*e*, as shown in FIG. 10PP.

In FIG. 10PP, the user selects the option 1040*e* to present information about parental guidance for the item of content. In response to the user's selection, the electronic device 500 presents further information 1064 about the parental guidance for the item of content, as shown in FIG. 10QQ.

FIGS. 11A-11K are flow diagrams illustrating a method 1100 of presenting representations of episodes in a series of episodic content in accordance with some embodiments of the disclosure. The method 1100 is optionally performed at an electronic device such as device 100, device 300, device 500, device 501, device 510, and device 511 as described above with reference to FIGS. 1A-1B, 2-3, 4A-4B and 5A-5C. Some operations in method 1100 are, optionally combined and/or order of some operations is, optionally, changed.

As described below, the method 1100 provides ways to present representations of episodes in a series of episodic content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 10D, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510 displays (1102), on the display 514, a user interface corresponding to a collection of episodic content (e.g., a TV show that includes a plurality of episodes presented and/or released in chronological order).

In some embodiments, such as in FIG. 10D, the user interface includes (1104) a first region 1016*d* that includes one or more selectable representations of one or more episodes in the collection of episodic content, wherein the selectable representations of the one or more episodes are selectable to access the one or more episodes on the electronic device (1106) (e.g., one or more images of episodes that, when selected, cause the electronic device to initiate a process to play the selected episode).

In some embodiments, such as in FIG. 10D, the user interface includes a second region 1018*d* that is adjacent to the first region 1016*d*, and that includes one or more selectable representations of one or more informational items associated with the first region (1108) (e.g., season elements, descriptions of episodes, etc.). For example, the user interface includes a row of selectable options to view episodes from one of a plurality of seasons of the episodic content, a row of the selectable representations of one or more episodes, and a row of text descriptions of each episode.

In some embodiments, such as in FIG. 10D, the user interface includes a third region 1020*d* outside of the first region and the second region (1110) (e.g., a row above or below the second region that includes other information or selectable option(s) related to the collection of episodic content). For example, the third region includes a selectable option to add the collection of episodic content to a playback queue. As another example, the third region includes a row of content related to the collection of episodic content (e.g., bonus content such as behind the scenes footage, deleted scenes, interviews with cast and crew, etc.).

In some embodiments, such as in FIG. 10D, while displaying the user interface, the electronic device 500 receives (1112), via the one or more input devices 510, a directional input corresponding to a request to move a current focus in the user interface (e.g., a swipe or a tap received on a touch-sensitive device that corresponds to a request to move the current focus from one row to another row in the user interface), wherein the directional input has a movement metric corresponding to moving the current focus from a current location in the user interface to a final location in the user interface. In some embodiments, the movement metric comprises a direction, duration, length, speed, or other attribute of the directional input.

In some embodiments, such as in FIG. 10E, in response to receiving the directional input (1114), in accordance with a determination that the movement metric corresponds to moving the current focus from the current location to the third region 1022*d*, the electronic device moves (1116) the current focus from the current location to the third region 1022*d* in accordance with the movement metric, as shown in FIG. 10F. For example, while the current focus is on an element in a first row in the user interface, the electronic device detects an input corresponding to a request to move the current focus up one row to the third region of the user interface. In response to the input, the electronic device optionally moves the current focus to an element in the third region of the user interface.

In some embodiments, such as in FIG. 10C, in accordance with a determination that the movement metric corresponds to moving the current focus from the current location to the second region 1014*d*, the electronic device moves (1118) the current focus from the current location to a respective representation of a respective episode in the first region 1016*d* in accordance with a second movement metric, different than the movement metric. For example, while the current focus is on an element in a row adjacent to the second region of the user interface, the electronic device detects a directional input towards the second region of the user interface. In some embodiments, in response to the input, the electronic device moves the current focus to the respective representation of the respective episode. In some embodiments, moving the current focus to the respective representation of the respective episode includes skipping over another row in the second region (e.g., the row of seasons or the row of text descriptions of each episode).

The above-described manner of updating the current focus to the respective representation of the respective episode in response to an input to move the current focus to the second region allows the electronic device to directly move the current focus to the representation of the respective episode, which simplifies the interaction between the user and the electronic device and enhances the operability of the electronic device and makes the user-device interface more efficient (e.g., by reducing the number of directional inputs required to move the current focus to the representation of the respective episode), which additionally reduces power usage and improves battery life of the electronic device by enabling the user to use the electronic device more quickly and efficiency, such as by reducing the number of inputs required to initiate playback of an episode by selecting a representation of a respective episode.

In some embodiments, such as in FIG. 10D, while the respective representation of the respective episode in the first region 1016*d* has the current focus, the electronic device 500 receives (1120), via the one or more input devices 510, a second directional input that has a movement metric corresponding to moving the current focus from the respective representation to a respective selectable representation of a respective informational item (e.g., in row 1018*d*) associated with the respective episode, wherein the respective informational item comprises first information about the respective content item (e.g., a text description of the respective episode including the episode number, the episode title, the episode runtime, and/or a summary or description of the episode). In some embodiments, such as in FIG. 10E, in response to receiving the second directional input, the electronic device 500 moves (1122) the current focus from the respective representation of the respective episode (e.g., in row 1016*d*) to the respective representation of the respective informational item (e.g., in row 1018*d*). For example, the first region includes a plurality of images that each represent respective episodes of the episodic content that are selectable to play the respective episode and a plurality of blocks of text including information about each respective episode. In some embodiments, in response to an input to scroll from another region to the first region, the current focus moves to one of the images that represents a respective episode of the episodic content. In response to a further input to move the current focus in the direction of the blocks of text including information about each respective episode, the electronic device optionally moves the current focus to one of the blocks of text that represents a respective episode. In some embodiments, such as in FIG. 10U, while the respective representation of the respective informational item (e.g., in row 1018*d*) has the current focus, the electronic device 500 receives (1124), via the one or more input devices 510, an input corresponding to a selection of the respective representation of the respective informational item. In some embodiments, such as in FIG. 10V, in response to receiving the input corresponding to the selection of the respective representation (e.g., in row 1018*d*) of the respective informational item, the electronic device 500 displays (1126), on the display 514, an expanded representation 1050 of the respective informational item that includes the first information about the respective content item and second information about the respective content item. In some embodiments, the first information includes a portion of the second information. In some embodiments, the second information includes a summary of the respective content item. For example, the first information includes a title of the episode, the runtime of the episode, an indication of the number of the episode, and/or a portion of the summary of the respective content item (e.g., the first several words or the first sentence or two of the summary or as much text as will fit within the respective representation of the respective informational item) and the second information includes all of the first information and the complete summary of the respective content item.

The above-described manner of moving the current focus from the respective representation of the respective episode to the respective selectable representation of a respective informational item associated with the respective episode and presenting the expanded representation of the respective informational item in response to selection of the respective representation of the respective informational item allows the electronic device to present a subset of the second information before the respective representation of the respective informational item is selected, which simplifies the interaction between the user and the electronic device and enhances the operability of the electronic device and makes the user-device interface more efficient (e.g., by conserving display area for content other than the second information until the user requests to view the second information), which additionally reduces power usage and improves battery life of the electronic device by enabling the user to use the electronic device more quickly and efficiency.

In some embodiments, such as in FIG. 10Y while neither the respective representation of the respective episode in the first region 1016*d* nor the respective representation of the respective informational item (e.g., in row 1018*d*) has the current focus, the respective representation of the respective informational item (e.g., in row 1018*d*) is displayed with a first visual characteristic (1128) (e.g., a first color, size, transparency, highlighting, shape etc.). For example, when the respective representation of the respective informational item is displayed with the first visual characteristic, the text is optionally presented at a first size without a background container. In some embodiments, such as in FIG. 10X, while the respective representation of the respective episode in the first region 1016*d* has the current focus, the respective representation of the respective informational item (e.g., in row 1018*d*) is displayed with a second visual characteristic, different than the first characteristic (1130) (e.g., a second color, size, transparency, highlighting, shape etc.). For example, when the respective representation of the respective informational item is displayed with the second visual characteristic, the text is optionally presented at a second size that is larger than the first size with a background container, such as a rectangle or rounded rectangle behind the text. In some embodiments, such as in FIG. 10W, while the respective representation of the respective informational item (e.g., in row 1018*d*) has the current focus, the respective representation of the respective informational item is displayed with a second visual characteristic, different than the first characteristic and the second characteristic (1132) (e.g., a third color, size, transparency, highlighting, shape etc.). For example, when the respective representation of the respective informational item is displayed with the third visual characteristic, the text is optionally presented at the second size with the background container in a different color than the color the respective representation was presented in when the respective representation was presented with the second visual characteristic.

The above-described manner of presenting the respective representation of the respective informational item with a first visual characteristic when the current focus is not on the respective representation of the respective episode or the respective representation, with a second visual characteristic when the current focus is on the respective representation of the respective episode, and with a third visual characteristic when the current focus is on the respective representation of the respective informational item allows the electronic device to indicate to the user that the respective informational item is associated with the respective episode when the current focus is on the respective representation of the respective episode, which simplifies the interaction between the user and the electronic device and enhances the operability of the electronic device and makes the user-device interface more efficient (e.g., by reducing the amount of time it takes the user to identify which informational item is associated with the respective episode), which additionally reduces power usage and improves battery life of the electronic device by enabling the user to use the electronic device more quickly and efficiency.

In some embodiments, such as in FIG. 10X, while the respective representation of the respective episode in the first region 1016*d* has the current focus, receiving, via the one or more input devices 510, a second directional input that has a movement metric corresponding to moving the current focus from the respective representation to a respective selectable representation of a respective informational item in the second region 1014*d*, wherein the second region 1014*d* includes a first selectable representation of a first season of the collection of episodic content and a second selectable representation of a second season of the collection of episodic content (1134). In some embodiments, while the current focus is on a respective representation of a respective episode, the electronic device detects an input to move the current focus to a representation of a season of the episodic content. For example, the second region includes a plurality of representations of seasons of the episodic content that are selectable to present, in the first region, representations of episodes in the selected season and representations of information items about episodes in the selected season. In some embodiments, such as in FIG. 10Y, in response to receiving the second directional input, the electronic device 500 moves (1136) the current focus from the respective representation of the respective episode (e.g., in row 1016*d*) to the respective selectable representation of the respective informational item (e.g., in row 1014*d*). In some embodiments, regardless of the position of the current focus within the row of representations of episodes, in response to a directional input to move the current focus to the row of the representations of seasons, the current focus is moved to the representation of the season that matches the season of the episodes that are displayed in the first region when the directional input is received. In some embodiments, such as in FIG. 10Y, in accordance with a determination that the respective episode is in the first season of the collection of episodic content, the respective selectable representation of the respective informational item is the first selectable representation of the first season of the collection of episodic content (1138). For example, the electronic device presents representations of episodes in the first season of the collection of episodic content and the input focus is on a representation of a respective episode in the first season. In response to an input to move the current focus to a representation of a season, the electronic device optionally moves the current focus to the representation of the first season. In some embodiments, such as in FIG. 10Z, in accordance with a determination that the respective episode is in the second season of the collection of episodic content, the respective selectable representation of the respective informational item is the second selectable representation of the second season of the collection of episodic content (1140). For example, the electronic device presents representations of episodes in the second season of the collection of episodic content and the input focus is on a representation of a respective episode in the second season. In response to an input to move the current focus to a representation of a season, the electronic device optionally moves the current focus to the representation of the second season.

The above-described manner of moving the current focus to the respective season to which the respective episode belongs in response to an input to move the current focus from the representation of the respective episode to a representation of a season allows the electronic device to reduce the chances of the user selecting a different season in error, such as while scrolling past the representations of the seasons to a different part of the user interface, which simplifies the interaction between the user and the electronic device and enhances the operability of the electronic device and makes the user-device interface more efficient (e.g., by reducing the number of inputs needed to continue viewing the season to which the respective episode belongs), which additionally reduces power usage and improves battery life of the electronic device by enabling the user to use the electronic device more quickly and efficiency and reducing user errors.

In some embodiments, such as in FIG. 10Y, the first region 1016*d* is further adjacent to a fourth region 1018*d* (1142). While the first selectable representation (e.g., in row 1014*d*) of the first season of the collection of episodic content is currently selected, the electronic device 500 displays (1144), in the first region 1016*d*, one or more selectable representations of one or more episodes in the collection of episodic content from the first season of the collection of episodic content (1146), such as in FIG. 10Y (e.g., one or more images representing the one or more episodes in the first season of the collection of episodic content). In response to detecting selection of one of the representations of episodes, the electronic device optionally initiates a process to play the selected episode. In some embodiments, such as in FIG. 10Y, the electronic device 500 displays, in the fourth region 1018*d*, one or more selectable representations of information about the one or more episodes from the first season displayed in the first region (1148) (e.g., text including information about each episode in the first season). In some embodiments, each respective selectable representation of information about a respective episode is visually associated with the selectable representation of the respective episode. For example, if the representations of episodes are displayed in a row and the respective representations of informational items about the episodes are displayed in a different row, the respective representation of the respective episode is displayed directly above or directly below the respective representation of the informational item related to the respective episode. In some embodiments, such as in FIG. 10Y, while displaying the one or more selectable representations of the one or more episodes in the collection of episodic content from the first season in the first region 1016*d*, and the one or more selectable representations of information about the one or more episodes displayed in the first region in the fourth region 1018*d*, receiving, via the one or more input devices, an input (e.g., movement of contact 1003) corresponding to a request to select the second selectable representation of the second season of the collection of episodic content in the second region 1014*d* (1150). In some embodiments, the input includes a directional input in the direction from the first selectable representation of the first season to the second selectable representation of the second season and, optionally, selection of the second selectable representation of the second season). In some embodiments, such as in FIG. 10Z, in response to receiving the input corresponding to the selection of the second selectable representation of the second season of the collection of episodic content (1152), the electronic device 500 replaces (1154), in the first region 1016*d*, the one or more selectable representations of one or more episodes in the collection of episodic content from the first season of the collection of episodic content with one or more selectable representations of one or more episodes in the collection of episodic content from the second season of the collection of episodic content and replaces (1156), in the fourth region 1018*d*, the one or more selectable representations of information about the one or more episodes from the first season displayed in the first region with one or more selectable representations of information about the one or more episodes from the second season displayed in the first region 1016*d*. In some embodiments, each respective selectable representation of information about a respective episode is visually associated with the selectable representation of the respective episode. For example, if the representations of episodes are displayed in a row and the respective representations of informational items about the episodes are displayed in a different row, the respective representation of the respective episode is displayed directly above or directly below the respective representation of the informational item related to the respective episode.

The above-described manner of replacing the representations of episodes and information about episodes in the first season with representations of episodes and information about episodes in the second season in response to moving the current focus from the first selectable representation of the first season to the second selectable representation of the second season allows the electronic device to reduce the number of inputs needed to view episodes in the second season compared to requiring the user to scroll through a plurality of representations of episodes in the first or other seasons, which simplifies the interaction between the user and the electronic device and enhances the operability of the electronic device and makes the user-device interface more efficient (e.g., by reducing the number of inputs needed to view episodes from the second season) which additionally reduces power usage and improves battery life of the electronic device by enabling the user to use the electronic device more quickly and efficiency.

In some embodiments, such as in FIG. 10Q, the one or more selectable representations of one or more informational items associated with the first region 1016*d* comprise one or more selectable representations of one or more descriptions of episodes (e.g., in row 1018*d*) corresponding to the one or more episodes included in the first region 1016*d* (1158) (e.g., text including information about each episode in the first season). In some embodiments, each respective selectable representation of information about a respective episode is visually associated with the selectable representation of the respective episode. For example, if the representations of episodes are displayed in a row and the respective representations of informational items about the episodes are displayed in a different row, the respective representation of the respective episode is displayed directly above or directly below the respective representation of the informational item related to the respective episode. In some embodiments, such as in FIG. 10Q, while a respective representation of a respective episode in the first region 1016*d* has a current focus, the electronic device receives (1160), via the one or more input devices 510, an input corresponding to a horizontal swipe detected on a touch sensitive surface of the one or more input devices 510 (e.g., or some other directional input, such as a tap in one of a plurality of horizontal regions of the touch sensitive surface). In some embodiments, such as in FIG. 10R, in response to receiving the input corresponding to the horizontal swipe, the electronic device 500 concurrently scrolls (1162), in accordance with the horizontal swipe, the one or more selectable representations of the one or more descriptions of episodes, in the second region 1018*d*, corresponding to the one or more episodes included in the first region 1016*d* (1164) and the one or more selectable representations of the one or more episodes in the collection of episodic content in the first region 1016*d* (1166). In some embodiments, the row of representations of episodes and the row of representations of descriptions of episodes scroll together so that the representation of each respective episode remains visually associated with the description of each respective episode. In some embodiments, other rows of selectable options presented in the user interface scroll separately from the representations of episodes and the representations of descriptions of episodes. For example, the user interface further includes information about the cast and crew of the collection of episodic content and information about content that is related to the collection of episodic content.

The above-described manner of scrolling the representations of the episodes and the representations of the descriptions of episodes together allows the electronic device to maintain the association of respective representations of respective episodes with the respective representations of descriptions of respective episodes while also allowing the representations of episodes and the representations of descriptions of episodes to be independently selectable to perform different actions, which simplifies the interaction between the user and the electronic device and enhances the operability of the electronic device and makes the user-device interface more efficient (e.g., by maintaining the visual association of the representation of and representation of information about each respective episode while also presenting a selectable option to initiate a process to view the episode and a selectable option to view more information about the episode proximate to one another), which additionally reduces power usage and improves battery life of the electronic device by enabling the user to use the electronic device more quickly and efficiency, such as by reducing the number of inputs needed to view the association of a representation of an episode to a description of the episode, to initiate a process to view an episode, and to view additional information about the episode.

In some embodiments, such as in FIG. 10M, the user interface corresponding to the collection of episodic content includes an access section that includes one or more representations 1026*d*-1032*d* of manners (e.g., a content store, a channel the provides content that plays in the application of the user interface, or applications other than the application of the user interface that provide the content) of accessing one or more episodes of the collection of episodic content that are selectable to initiate processes to access the one or more episodes of the collection of episodic content (1168). In some embodiments, in response to selecting a respective representation of a manner of accessing the content, the content is played via the respective manner. For example, the content is accessible by purchasing the content with the content store or by watching the content via a channel of the application of the user interface. In some embodiments, in response to detecting selection of the representation of the channel, the electronic device initiates a process to play the content with the channel.

The above-described manner of presenting representations of the one or more manners of accessing the content allows the electronic device to reduce the number of inputs needed to view the different manners of accessing the content and selecting one of the manners to play the content, which simplifies the interaction between the user and the electronic device and enhances the operability of the electronic device and makes the user-device interface more efficient (e.g., by reducing the number of inputs needed to view whether an item of content is available through each of a plurality of manners of accessing content and to play the content via one of the manners), which additionally reduces power usage and improves battery life of the electronic device by enabling the user to use the electronic device more quickly and efficiency.

In some embodiments, such as in FIG. 10GG, in accordance with a determination that a user of the electronic device 500 has purchased one or more episodes of the collection of episodic content (e.g., via a content store), the access section includes a first representation 1026*e* that corresponds to the purchased one or more episodes of the collection of episodic content, and is selectable to play the one or more episodes of the collection of episodic content (1170). Even if the content is available via one or more other manners (e.g., channels, applications, etc.), the electronic device optionally only presents the selectable option that causes the electronic device to play the content via the user's previous purchase of the content.

The above-described manner of presenting the representation that corresponds to the purchased content allows the electronic device to reduce the chances of a user error of selecting a different manner of viewing the content, which simplifies the interaction between the user and the electronic device and enhances the operability of the electronic device and makes the user-device interface more efficient (e.g., by reducing the number of inputs needed to correct an error by avoiding the error), which additionally reduces power usage and improves battery life of the electronic device by enabling the user to use the electronic device more quickly and efficiency.

In some embodiments, such as in FIG. 10M, in accordance with a determination that one or more episodes of the collection of episodic content are available for purchase (e.g., via a content store), the access section includes a representation 1032*d* of the purchase that is selectable to initiate a process to purchase the one or more episodes of the collection of episodic content (1172). In some embodiments, the representation includes an indication of purchasing one or more episodes of the collection of episodic content. In some embodiments, the user is able to purchase the content episode-by-episode or season-by-season. For example, in response to detecting selection of the representation of the purchase, the electronic device presents a user interface including selectable options to purchase each of a plurality of seasons of the episodic content.

The above-described manner of presenting a selectable option to purchase one or more episodes of the collection of episodic content allows the electronic device to provide to the user a way of purchasing the content in a user interface that includes further information about the content, which simplifies the interaction between the user and the electronic device and enhances the operability of the electronic device and makes the user-device interface more efficient (e.g., by reducing the number of inputs needed to navigate between a user interface that includes information about the content and a user interface that includes the selectable option to purchase the content), which additionally reduces power usage and improves battery life of the electronic device by enabling the user to use the electronic device more quickly and efficiency.

In some embodiments, such as in FIG. 10I, the electronic device 500 receives (1174), via the one or more input devices 510, an input corresponding to selection of the representation 1032*d* of the purchase. In some embodiments, such as in FIG. 10J, in response to receiving the input corresponding to the selection of the representation 1032*d* of the purchase (1176), in accordance with a determination that a plurality of seasons of the collection of episodic content are available for purchase, the electronic device 500 displays (1178), on the display 514, a plurality of season purchase representations 1042*a-d* that are selectable to initiate processes to purchase the respective seasons of the collection of episodic content. For example, if there are three seasons of the episodic content available for purchase, the electronic device presents a season purchase representation for each seasons that is available for purchase. In some embodiments, each season purchase representation includes an indication of the price of the season. Once the user has purchased as season of the episodic content, the electronic device is optionally able to play episodes from the purchased season. In some embodiments, in accordance with a determination that only one season of the collection of episodic content is available for purchase, the electronic device initiates (1180) a process to purchase the one season of the collection of episodic content without displaying the plurality of season purchase representations, such as presenting the user interface illustrated in FIG. 10K in response to the selection in FIG. 10I without presenting the user interface of FIG. 10J. The representation of the purchase includes an indication of which season is available for purchase and the purchase price of the seasons.

The above-described manner of presenting the season purchase representations in response to selection of the representation of the purchase allows the electronic device to conserve display area before selection of the representation of the purchase by presenting the single representation of the purchase rather than presenting each of the season purchase representations, which simplifies the interaction between the user and the electronic device and enhances the operability of the electronic device and makes the user-device interface more efficient (e.g., by enabling the user to view more information about the collection of episodic content prior to selecting the representation of the purchase), which additionally reduces power usage and improves battery life of the electronic device by enabling the user to use the electronic device more quickly and efficiency.

In some embodiments, such as in FIG. 10L, the process to purchase the one or more episodes of the collection of episodic content includes automatically playing a respective episode of the one or more episodes upon successful purchase of the one or more episodes of the collection of episodic content (1182). In some embodiments, in response to successful purchase of one or more episodes of the collection of episodic content, the electronic device automatically presents the first episode of the one or more episodes that were purchased. For example, if the user purchases a season of the episodic content, the first episode of the season will be presented in response to the successful purchasing of the season.

The above-described manner of playing a respective episode of the one or more episodes upon successful purchase of the one or more episodes allows the electronic device to reduce the number of inputs needed to play the content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, such as in FIG. 10I, the user interface corresponding to the collection of episodic content is displayed in a unified media browsing application (1184). In some embodiments, such as in FIG. 10I, in accordance with a determination that one or more episodes of the collection of episodic content are available to be played in a separate application, other than the unified media browsing application, the access section includes a representation 1030*d* of the separate application that is selectable to initiate a process to play the one or more episodes in the separate application (1186). In some embodiments, in response to selection of the representation of the separate application, the electronic device opens the separate application to play the content. In some embodiments, the access section also includes a representation of a channel that provides content that plays in the unified media browsing application. The representation of the channel and the representation of the separate application are optionally presented with different visual characteristics. For example, the representation of the separate application includes an icon that indicates that selecting the representation of the separate application will cause the electronic device to open an application that is different from the unified media browsing application, an image that represents the separate application (e.g., an image of an icon that represents the separate application in a home screen of the electronic device), and text that indicates that selection of the representation will open the separate application. As another example, the representation of the channel includes an image that represents the channel that is not an icon that represents an application, does not include an indication of opening a different application, and includes text that does not indicate that a different application will be opened to view the content. In response to detecting selection of the representation of the channel, the electronic device presents the content in the unified media browsing application.

The above-described manner of presenting a selectable option within the unified media browsing application that is selectable to view the content in the separate application allows the electronic device to present information about accessing the content through applications that are not the unified media browsing application, which simplifies the interaction between the user and the electronic device and enhances the operability of the electronic device and makes the user-device interface more efficient (e.g., by reducing the number of inputs needed to open the different application to see if the content is available via the different application), which additionally reduces power usage and improves battery life of the electronic device by enabling the user to use the electronic device more quickly and efficiency.

In some embodiments, such as in FIG. 10I, the user interface corresponding to the collection of episodic content is displayed in a unified media browsing application (1188). In some embodiments, such as in FIG. 10I, in accordance with a determination that one or more episodes of the collection of episodic content are available to be played from a respective channel within the unified media browsing application (e.g., other than having been purchased, but rather as a result of the user's subscription with a channel whose content is available to be viewed within the unified media browsing application), the access section includes a representation 1026*d* corresponding to the respective channel that is selectable to initiate a process to play the one or more episodes in the media browsing application, wherein the representation 1026*d* corresponding to the respective channel is in a prioritized location in the access section (1190). In some embodiments, the representation corresponding to the respective channel is presented first in a row of representations of manners of accessing the content (e.g., to the left). As another example, the representation of the channel includes an image that represents the channel that is not an icon that represents an application, does not include an indication of opening a different application, and includes text that does not indicate that a different application will be opened to view the content. In response to detecting selection of the representation of the channel, the electronic device presents the content in the unified media browsing application.

The above-described manner of presenting the representation of the respective channel in the prioritized position allows the electronic device to reduce the number of inputs needed to navigate to the representation of the respective channel, which simplifies the interaction between the user and the electronic device and enhances the operability of the electronic device and makes the user-device interface more efficient (e.g., by reducing the number of inputs needed to watch the content within the unified browsing application), which additionally reduces power usage and improves battery life of the electronic device by enabling the user to use the electronic device more quickly and efficiency.

In some embodiments, such as in FIG. 10PP, the user interface corresponding to the collection of episodic content includes an information section that includes one or more representations 1040*e* of informational items corresponding to the collection of episodic content that show a first subset of information about the collection of episodic content, and that are selectable to display expanded information 1064 about the collection of episodic content (1192), such as in FIG. 10QQ. In some embodiments, the one or more representations include a representation of a summary of the collection of the episodic content and a representation of parental guidance information about the collection of the episodic content. In some embodiments, the informational section further includes a reviews section that includes information about the popularity of the movie. For example, in response to detecting selection of the representation of the summary of the collection of the episodic content, the electronic device presents a full summary of the episodic content. As another example, in response to detecting selection of the parental guidance representation, the electronic device presents detailed information about the parental guidance, such as one or more factors in why the content has the a particular recommended viewer age. As another example, selection of the representation of the reviews causes the electronic device to present a user interface for browsing reviews of the content.

The above-described manner of presenting representations of information that are selectable to present additional information allows the electronic device to reduce the amount of screen area used for information before one of the representations is selected, which simplifies the interaction between the user and the electronic device and enhances the operability of the electronic device and makes the user-device interface more efficient (e.g., by reducing the number of inputs needed to view information other than the expanded information before one of the representations is selected), which additionally reduces power usage and improves battery life of the electronic device by enabling the user to use the electronic device more quickly and efficiency.

In some embodiments, such as in FIG. 10II, the user interface corresponding to the collection of episodic content includes an extra content section that includes one or more representations 1044*e* of extra content from the collection of episodic content that are selectable to initiate processes to display the extra content (1194). In some embodiments, extra content includes items of content related to the collection of episodic content that are not episodes of the episodic content. For example, extra content includes interviews with cast and crew, behind the scenes footage, deleted scenes, and the like. The electronic device optionally presents the representations of extra content for collections of episodic content that are available to be viewed on the application that includes the user interface via a channel and does not include the representations of extra content for collections of episodic content that are provided by other sources (e.g., other applications). In some embodiments, user interfaces corresponding to collections of episodic content do not include representations of extra content. Rather, in some embodiments, user interfaces corresponding to movies include representations of extra content. The above-described manner of presenting the extra content section allows the electronic device to reduce the number of inputs needed to navigate between the user interface corresponding to the collection of episodic content and the extra content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

It should be understood that the particular order in which the operations in FIGS. 11A-11K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., 700, 900, 1300, 1500, 1700, and 1900) are also applicable in an analogous manner to method

1100 described above with respect to FIGS. 11A-11K. For example, the operation of the electronic device to present representations of episodes in a collection of episodic content described above with reference to method 1100 optionally has one or more of the characteristics of the presentation of presenting representations of content items, presenting options for accessing the content based on available means for accessing items of content, presenting an enhanced preview of an items of content, presenting a control panel, switching the active user of the device, and entering into a picture-in-picture mode, etc., described herein with reference to other methods described herein (e.g., methods 700, 900, 1300, 1500, 1700, and 1900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIGS. 11A-11K are, optionally, implemented by components depicted in FIGS. 1A-1B. For example, displaying operations 1102, 1112, 1126, 1128, 1130, 1132, 1144, 1148, 1150, 1156, 1178, 1180, 1184, 1188, and 1192 receiving operations 1112, 1114, 1120, 1122, 1124, 1128, 1134, 1136, 1150, 1152,1160, 1162, 1174, and 1176 and initiating operations 1168, 1172, 1178, 1180, 1186, 1190, and 1194 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Previews of Items of Content

Users interact with electronic devices in many different manners, including using an electronic device to browse for items of content available for playback on the electronic device. In some embodiments, an electronic device is able to present a preview of items of content available via respective applications on the electronic device. The embodiments described below provide ways in which an electronic device presents enhanced previews of items of content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12A:
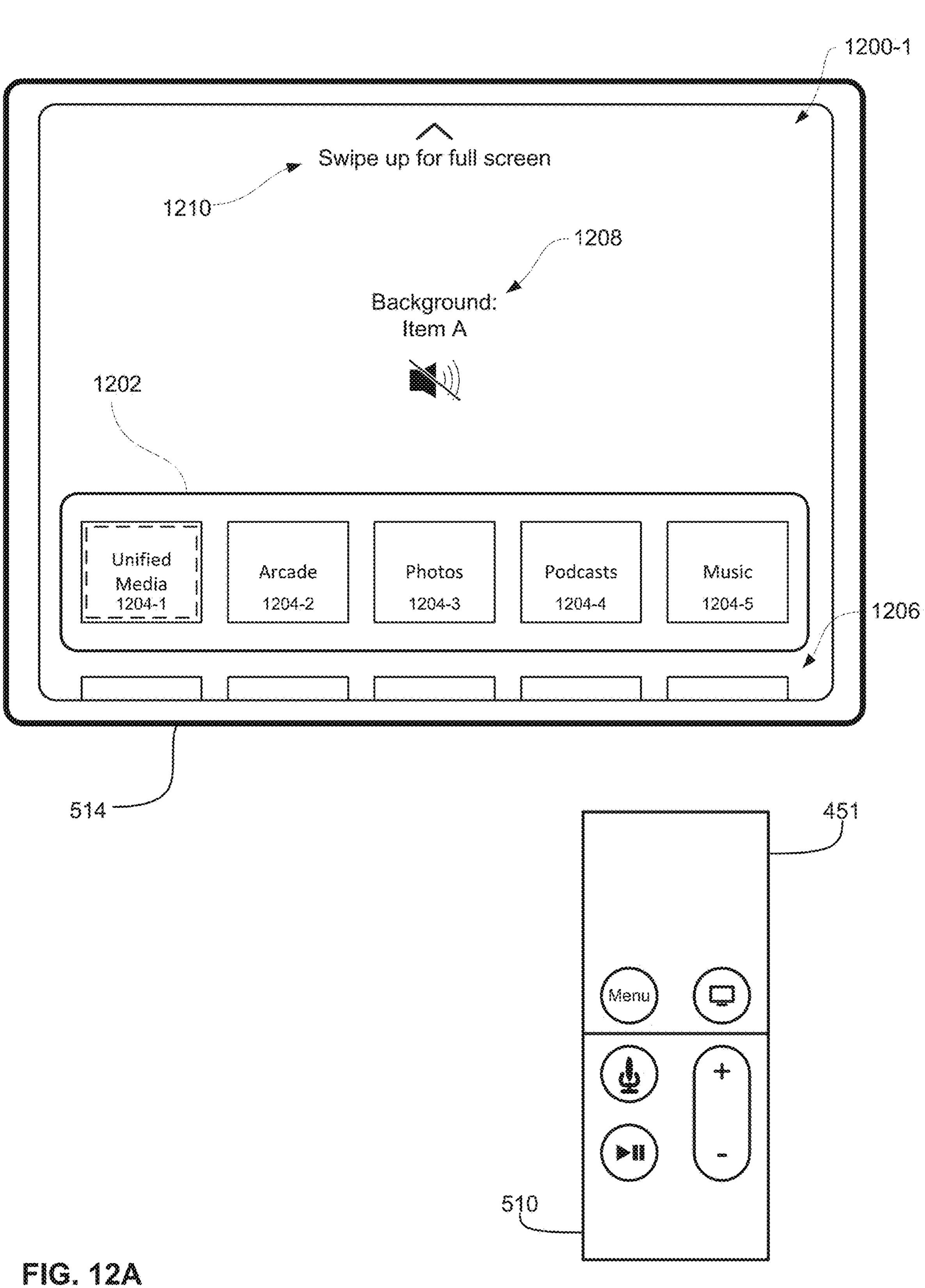
FIGS. 12A-12AAA illustrate exemplary ways in which an electronic device presents enhanced previews of items of content available via respective applications on the electronic device in accordance with some embodiments of the disclosure.

FIGS. 12A-12AAA illustrate exemplary ways in which an electronic device 500 presents enhanced previews of items of content available via respective applications on the electronic device 500 in accordance with some embodiments of the disclosure. The embodiments in these figures are used to illustrate the processes described below, including the processes described with reference to FIGS. 13A-13L.

FIG. 12A illustrate an electronic device 500 displaying user interface 1200-1 on display 514. In some embodiments, user interface 1200-1 is a home screen user interface. In some embodiments, user interface 1200-1 includes one or more representations of applications (e.g., representations 1204-1 to 1204-5). In some embodiments, the representations of applications correspond to applications that are installed on the electronic device. In some embodiments, the representations of applications 1204-1 to 1204-5 are selectable to cause display of the corresponding application. In some embodiments, user interface 1200-1 is scrollable to reveal further rows of representations of applications corresponding to applications that are installed on the electronic device (e.g., as shown by row 1206). Thus, in some embodiments, the electronic device includes a unified media browsing application (e.g., corresponding to representation 1204-1), an arcade application (e.g., corresponding to representation 1204-2), a photos application (e.g., corresponding to representation 1204-3), a podcast application (e.g., corresponding to representation 1204-4), a music application (e.g., corresponding to representation 1204-5), among others. In some embodiments, user interface 1200-1 is a user interface in which a user is able to browse the applications that are installed on the device and cause display of a respective application.

In some embodiments, user interface 1200-1 includes a content preview region 1208. In some embodiments, content preview region 1208 displays a preview of content available on the electronic device via the applications installed on the device. In some embodiments, the content displayed in content preview region 1208 displays content available from the application that currently has focus. In some embodiments, the content displayed in the content preview region 1208 are still images, a slideshow of still images or videos, and/or a video. In some embodiments, when content is previewed in content preview region 1208, the device does not play the accompanying or corresponding audio of the content being previewed (e.g., if the preview is a video, then the accompanying audio is muted). In some embodiments, the content preview region 1208 encompasses the entire display and is displayed as a background beneath the other user interface elements on user interface 1200-1 (e.g., the rows of content are overlaid over the content preview region 1208). In some embodiments, user interface 1200-1 includes a prioritized row of applications (e.g., row 1202) at or near the bottom of user interface (although it is understood that row 1202 can be displayed anywhere on the user interface). In some embodiments, the prioritized row of applications 1202 is visually indicated and/or separated from other rows of applications. For example, as shown in FIG. 12A, the prioritized row of applications 1202 is shown as having a boundary or box around the row of application icons. In some embodiments, the boundary or box has a different color than other rows of application icons (e.g., row 1206, etc.).

In FIG. 12A, representation 1204-1 corresponding to the unified media browsing application has a current focus (e.g., as shown by the dotted box). In some embodiments, when a representation in the prioritized row 1202 has a current focus, then content preview region 1208 displays content associated with the application whose representation has a current focus. Thus, in FIG. 12A, because representation 1204-1 has a current focus, then content display region 1208 displays a preview of Item A. In some embodiments, Item A is a content item that is accessible from the unified media browsing application (e.g., content that is browsable and selectable in the unified media browsing application for display within the unified media browsing application or another application that is launched in response to the user's selection of the content). In some embodiments, content preview region 1208 displays a slideshow of multiple content items that are available from the unified media browsing application. In some embodiments, a finite number of content items are previewed in the content preview region 1208 (e.g., the top 4 featured items, the top 5 featured items, etc.). In some embodiments, the content that is previewed in the content preview region 1208 are those that are recommended to the user by the unified media browsing application or are those that are in the user's playback queue (e.g., an "Up Next" queue). Thus, in some embodiments, the content preview region 1208 displays a set of content items (e.g., one at a time, in a slideshow) that is determined by the unified media browsing application.

In some embodiments, the unified media browsing application is an application that provides a centralized location for browsing, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc. (e.g., such as provider 1, provider 2, provider 3 discussed above with reference to FIG. 6A)). In some embodiments, the unified media browsing application aggregates all the shared information to provide a better and more cohesive interface and dataset for the user. In some embodiments, the unified media browsing application allows the user to browse the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device). In some embodiments, the unified media browsing application provides an interface for the user to select content items that the user desires to view. Upon selection of the content item, the electronic device optionally determines the respective application from where the content item is available, launches the respective application, and causes playback of the selected content item. In some embodiments, the unified media browsing application can perform playback within the unified media browsing application itself (e.g., by receiving data directly from the provider's server, by receiving data through the provider's application (e.g., the provider's application requests and receives the data and forwards or otherwise transmits it to the unified media browsing application), or any other suitable method). In some embodiments, content that can be played from a respective provider's application can also be played from within the unified media browsing application.

In some embodiments, when a content item is previewed in the content preview region 1208, then the user is able to perform a gesture to request display of an enhanced preview of the content item currently being displayed in the content preview region 1208. In some embodiments, an upward gesture (e.g., an upward navigational gesture performed on a touch-sensitive surface of a remote control device) corresponds to a request to display an enhanced preview of the content item. In some embodiments, user interface 1200-1 displays a hint 1210 at or near the top of the user interface (e.g., overlaid over content preview region 1208) that indicates to the user that performing an upward swipe gesture causes display of an enhanced preview of the content item.

Figure 12B:
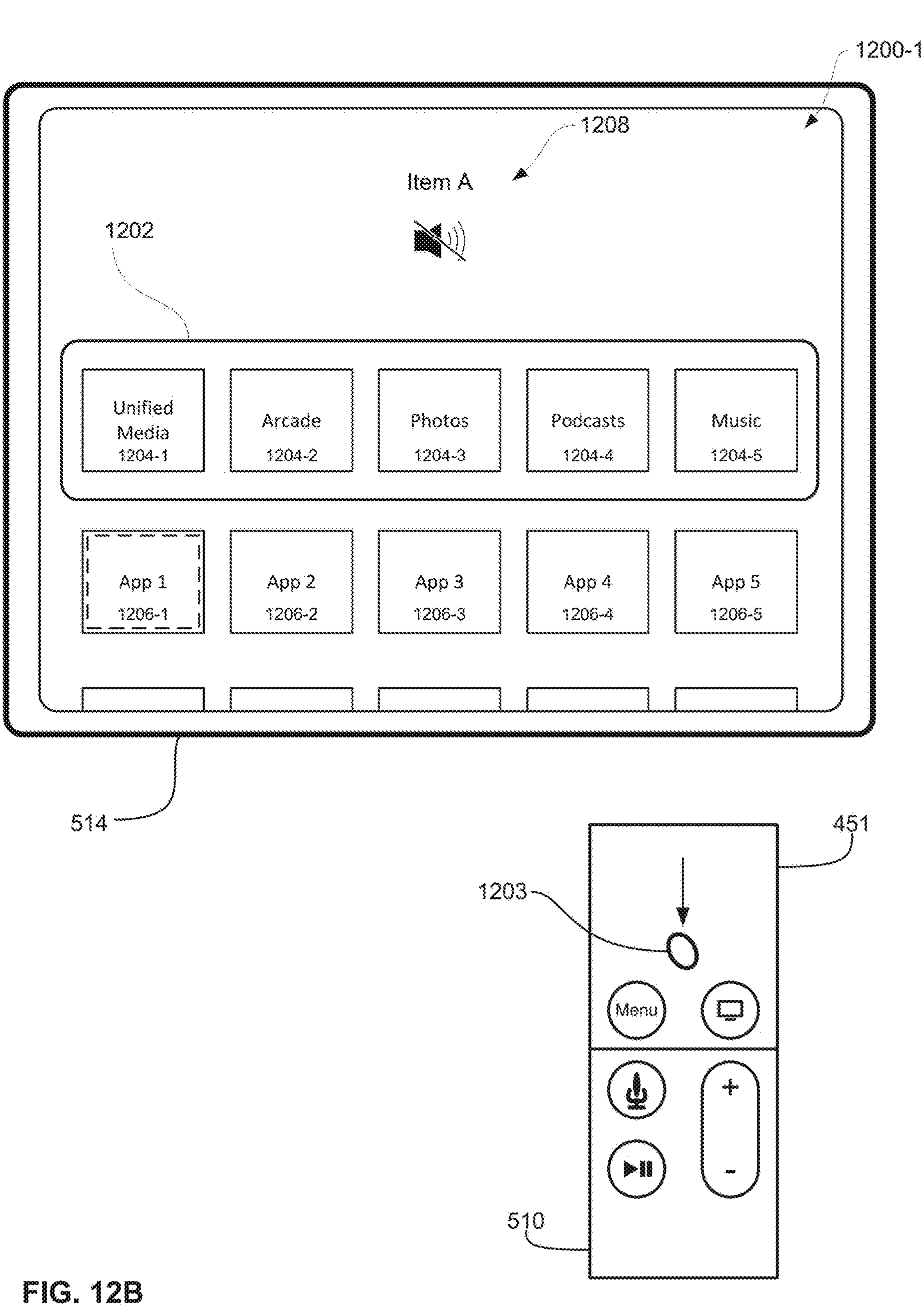

In FIG. 12B, a user input 1203 corresponding to a downward swipe (e.g., a request to navigate downwards) is received on the touch-sensitive surface 451 of remote control 510. In some embodiments, in response to the downward swipe input, user interface 1200-1 updates to reveal further rows of applications (e.g., the rows below the prioritized row 1202) that are installed on the electronic device. Thus, in some embodiments, in response to the downward swipe input, user interface 1200-1 displays representations of applications 1206-1 through 1206-5 corresponding to App 1 through App 5, respectively. In some embodiments, the focus is moved from representation 1204-1 to representation 1206-1 (e.g., the representation below the representation that previously had focus). In some embodiments, the content preview region 1208 is moved upwards (e.g., scrolled upwards). In some embodiments, the content preview region 1208 no longer encompasses the entire user interface 1200-1. In some embodiments, the lower boundary of the content preview region 1208 is the same as where it was before (e.g., at the bottom of prioritized row 1202). Thus, in some embodiments, the content preview region 1208 is also scrolled upwards in the same manner that prioritized row 1202 is also scrolled upwards (e.g., a portion of the top of content preview region 1208 is no longer displayed as it is beyond the top of user interface 1200-1). In some embodiments, the content preview region 1208 does not change the content that is being displayed to reflect the content available from application 1 (e.g., the application that currently has focus). Thus, in some embodiments, the content preview region 1208 only displays content of applications in focus if the application is in the prioritized row 1202. In some embodiments, content preview region 1208 maintains the preview that was displayed in the content preview region 1208 before the user input moving the focus downwards. In some embodiments, if the content preview region 1208 was displaying a video preview, then the video preview is paused (e.g., and if the content preview region 1208 was displaying a slideshow, the slideshow is frozen at a respective photo that was shown at the time the downward input was received).

Figure 12C:
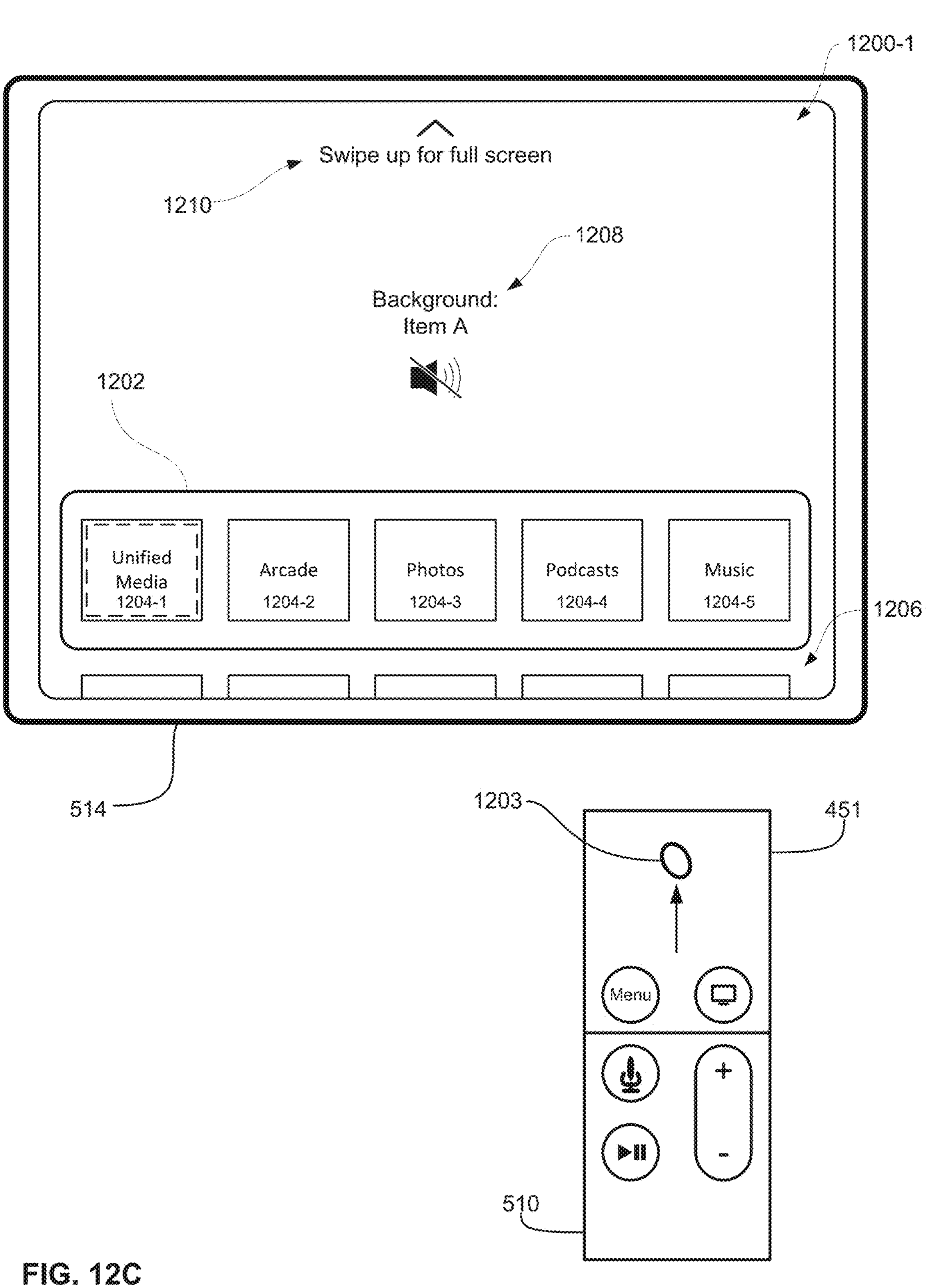

In FIG. 12C, the device receives an upward navigation to move the focus back to representation 1204-1 corresponding to the unified media browsing application. In some embodiments, row 1206 is moved back downwards such that it is no longer displayed or only a portion of the row is displayed. In some embodiments, the content preview region 1208 is scrolled to encompass the entire user interface (e.g., but still displayed behind the other user interface elements). In some embodiments, content preview region 1208 resumes displaying previews of content items available from the unified media browsing application (e.g., resumes the video or resumes the slideshow).

Figure 12D:
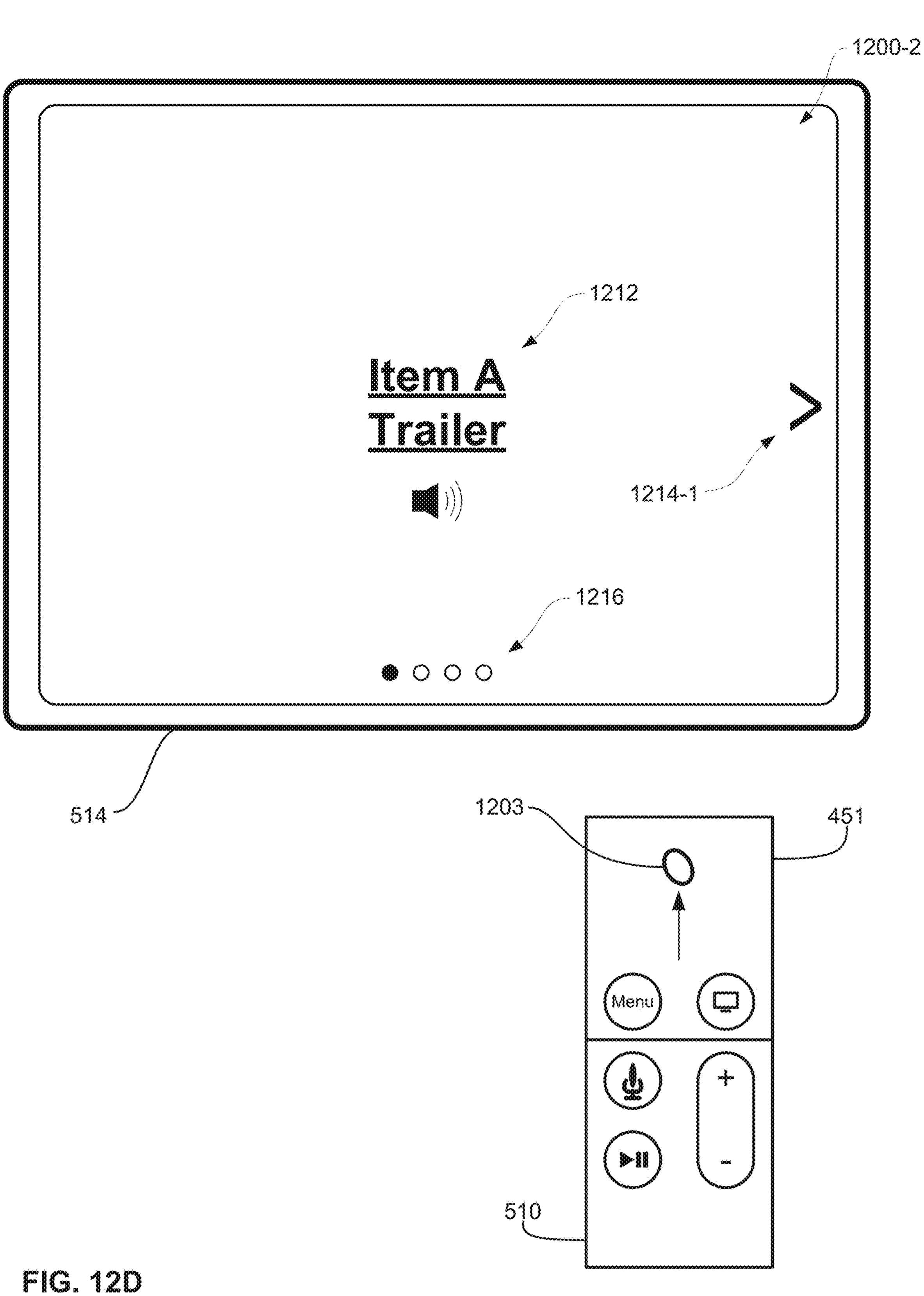

In FIG. 12D, the device receives user input 1203 corresponding to an upward swipe gesture which corresponds to a request to display the enhanced preview of the content item currently being previewed in content preview region 1208. In some embodiments, in response to the user input, device 500 replaces display of user interface 1200-1 with display of user interface 1200-2 (e.g., also referred to as a content display user interface or enhanced preview user interface). In some embodiments, user interface 1200-1 is a full-screen preview of the content items that were being previewed in content preview region 1208. For example, as shown in FIG. 12D, user interface 1200-2 is displaying the trailer of Item A (e.g., the item that was being previewed in content preview region 1208 when the user input was received) in full-screen mode. In some embodiments, the audio component of the preview is now being played (e.g., no longer muted). In some embodiments, pagination marker 1216 and navigation marker 1214-1 are displayed to indicate to the user that item A is one of several content items that are preview-able in user interface 1200-2. In some embodiments, if only one item is preview-able, then pagination marker 1216 and navigation marker 1214-1 are not shown. In some embodiments, navigation marker 1214-1 is a greater than sign at the right side of the screen indicating that a rightward navigation will cause the display of a preview of the next content item. In some embodiments, a leftward navigation marker is also displayed. In some embodiments, only the navigation marker that corresponds to the direction that can be navigated in is displayed (e.g., if the user can only browse to the right, only display the rightward navigation marker). In some embodiments, pagination marker 1216 displays the total number of items that can be previewed (e.g., 4 in the case of FIG. 12D) and which item is currently being previewed (e.g., the left-most item, in the case of FIG. 12D). In some embodiments, the amount of items that are preview-able are the same amount of items that were preview-able in the content preview region 1208. Thus, in some embodiments, the set of items that are preview-able in user interface 1200-2 are a set of items that are determined by the unified media browsing application. In some embodiments, the set of items that are preview-able are associated only with the application that had a focus when the user entered enhanced preview mode (e.g., the user cannot navigate to display preview of items from other applications without returning to the home user interface and entering into enhanced preview mode for the other applications). Thus, in some embodiments, the enhanced preview mode is specific to the application that had a focus when the user entered into enhanced preview mode.

Figure 12E:
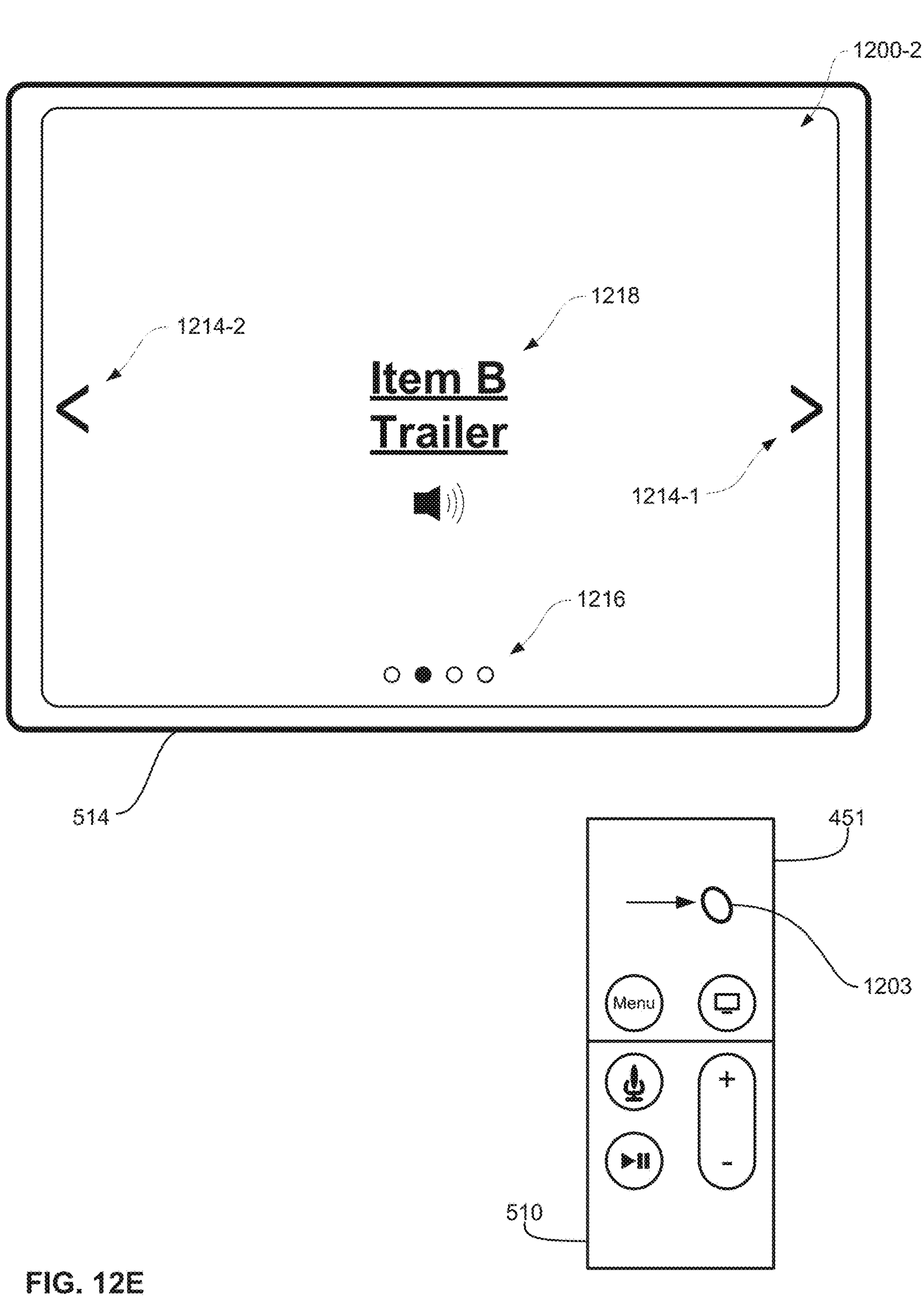

In FIG. 12E, device 500 receives a user input 1203 corresponding to a rightward swipe on a touch-sensitive surface 451 of remote control device 510 (e.g., a rightward navigation request). In some embodiments, in response to the user input, as shown in FIG. 12E, user interface 1200-2 replaces the preview of item B with a preview of Item B (e.g., the next content item in the set of content items for preview). In some embodiments, the items being previewed in user interface 1200-2 do not automatically move to the next content item and only move to the next content item in response to the user input (e.g., as opposed to content preview region 1208 which optionally automatically cycles through every item in the set of items that are preview-able). In some embodiments, the pagination marker 1216 and navigation marker 1214-1 and 1214-1 are updated to reflect the navigation to the second item in the set of items (e.g., navigation marker 1214-2 is now displayed and pagination marker 1216 indicates the user is now currently viewing the second item out of a total of four items in the set).

Figure 12F:
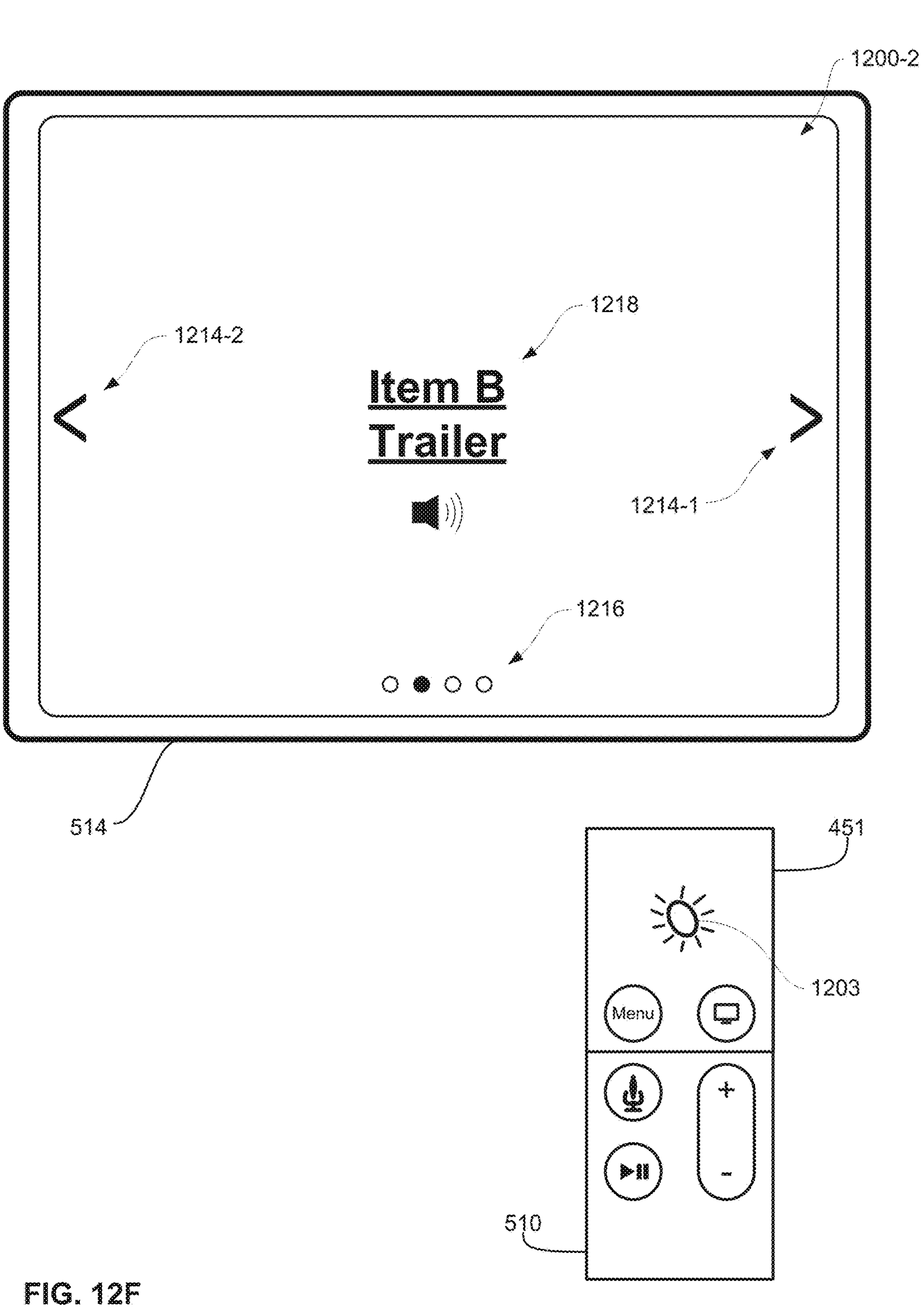

In FIG. 12F, a user input 1203 is received corresponding to a click input on the touch-sensitive surface 451 of remote control device 510 (e.g., ordinarily a selection input). In some embodiments, in response to the user input, the device displays additional information and one or more selectable options associated with the currently previewed content item, as shown in FIG. 12G.

Figure 12G:
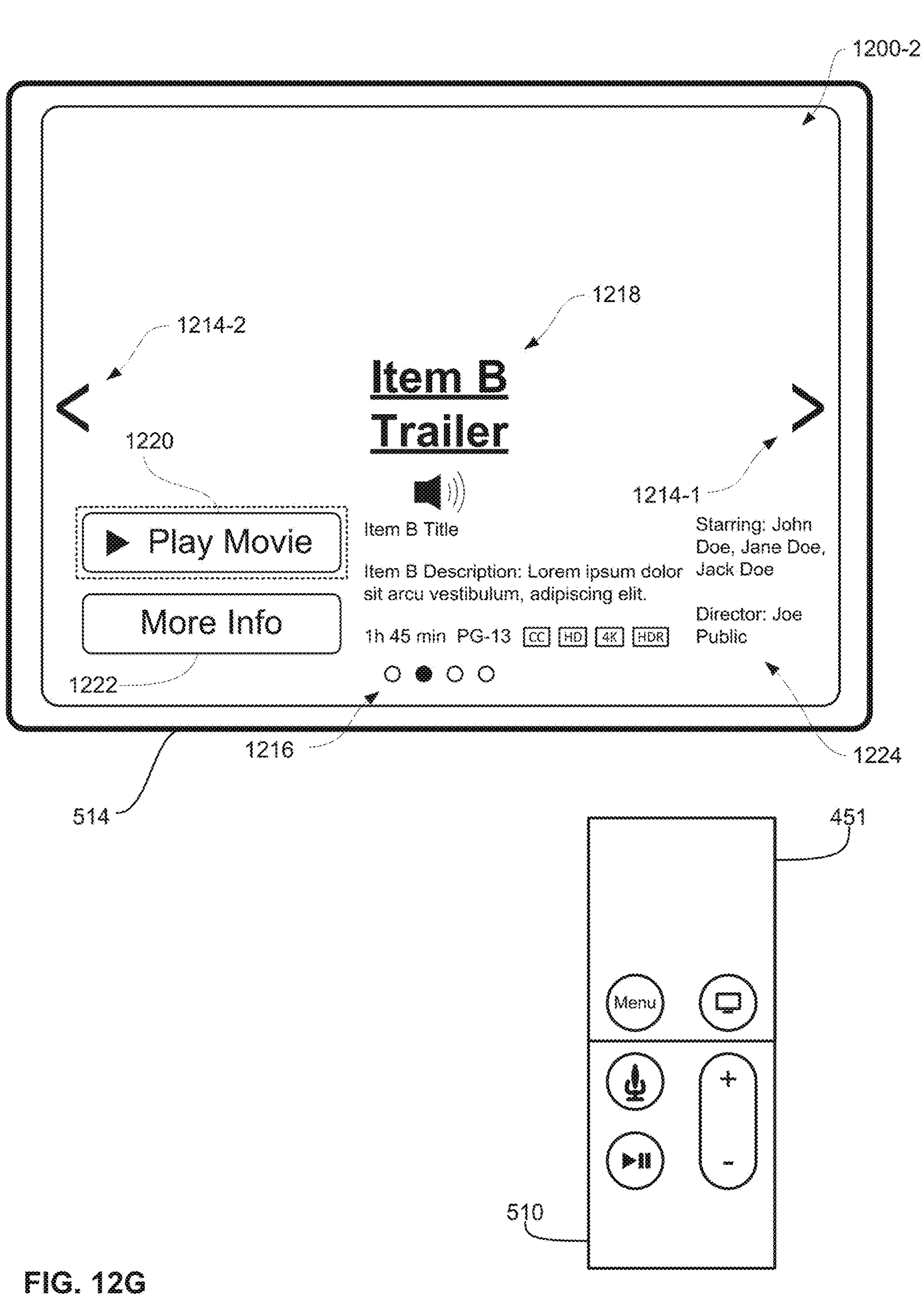

As shown in FIG. 12G, user interface 1200-2 is now displaying selectable option 1220, selectable option 1220 and information 1224. In some embodiments, selectable option 1220 and information 1224 are overlaid over the content preview. In some embodiments, information 1224 displays information about the content item such as the title, a synopsis or short description, the duration, certain content format options (e.g., closed captioning features, audio or video quality, etc.), viewer or critics ratings, maturity ratings, information about the directors and/or actors in the content item, or a subset or any combination of the foregoing. In some embodiments, selectable option 1220 is selectable to cause playback of the content item that is currently being previewed (e.g., Item B, which as shown in FIG. 12G, is a movie). In some embodiments, causing playback of the content item includes launching or otherwise displaying an application for displaying the content item (e.g., the unified media browsing application or another application). In some embodiments, selectable option 1222 is selectable to cause the display of a product page specific to Item B, similar to the product pages described above with respect to FIGS. 6, 8, and 10 (and accompanying flow charts for method 700, 900, and 1100).

Figure 12H:
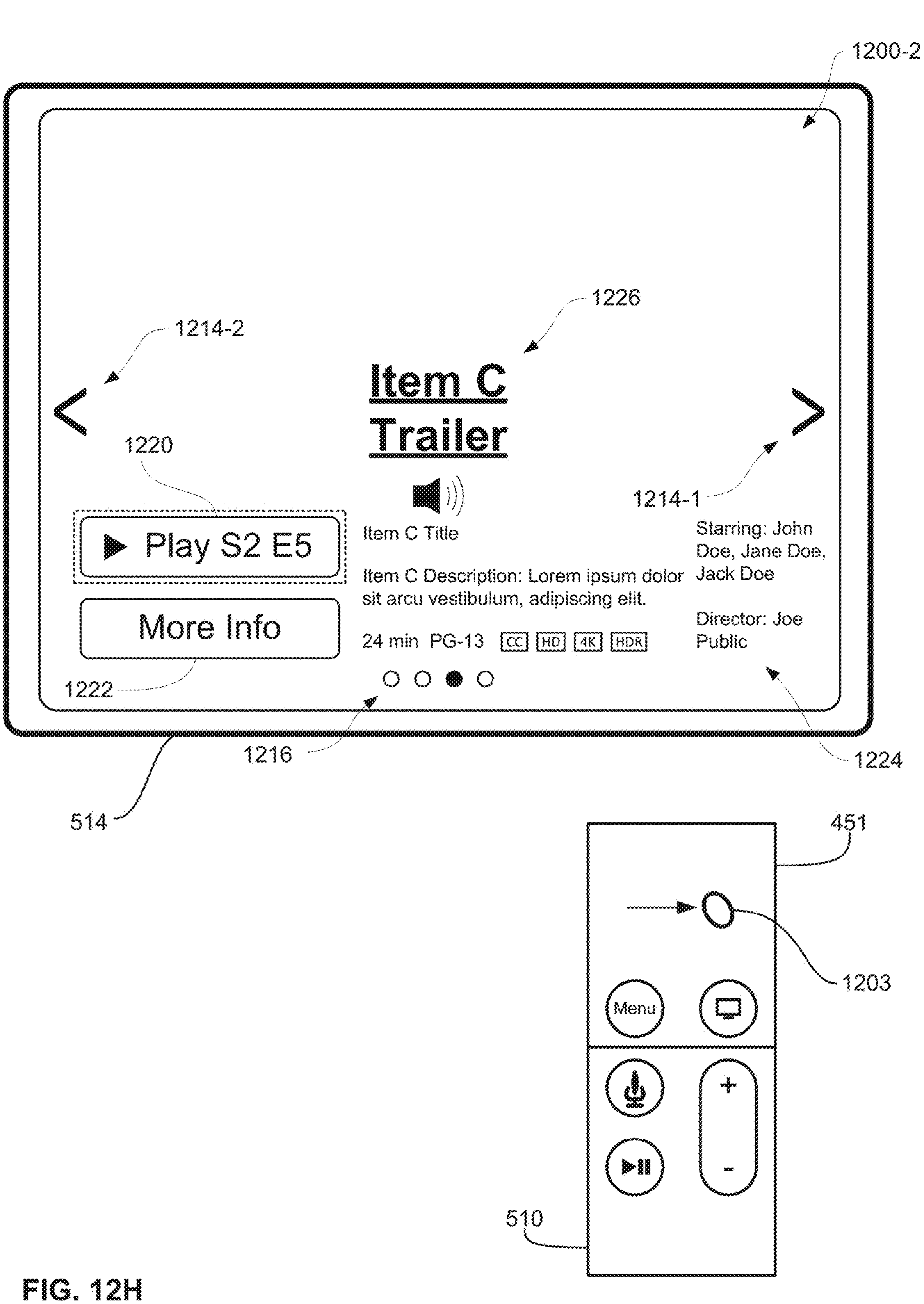

In FIG. 12H, device 500 receives a user input 1203 corresponding to a rightward navigation while selectable options 1220 and 1222 and information 1224 are displayed on user interface 1200-2. In some embodiments, in response to receiving the user input, the device navigates rightwards to the next item in the set of items that are preview-able (and is associated with the unified media browsing application), as shown in FIG. 12H. In some embodiments, because selectable options 1220 and 1222 and information 1224 were displayed when the navigation input was received, display of the selectable options 1220 and 1222 and information 1224 is maintained when the user interface navigates to the next content item. In some embodiments, the selectable options and information are updated to reflect the new item that the options and information are now referring to. For example, as shown in FIG. 12H, selectable option 1220 now reads "Play S2 E5" and is selectable to cause playback of season 2, episode 5 of item C. In FIG. 12H, information 1224 now displays information about Item C. In some embodiments, item C is a television series. In some embodiments, pagination marker 1216 is updated to reflect that the third item in the set of preview-able items is now being displayed. As shown in FIG. 12H, even though item C is a television series and the user interface is providing a preview of the television series, the system is able to determine the most appropriate episode to play based on the user's viewing history and the selectable option dynamically updates to reflect this. For example, in the embodiment shown in FIG. 12H, the user has already watched item C up to season 2 episode 4. Thus, the system provides the user with a quick way of accessing the next episode and selectable option 1220 is selectable to play the next episode.

Figure 12I:
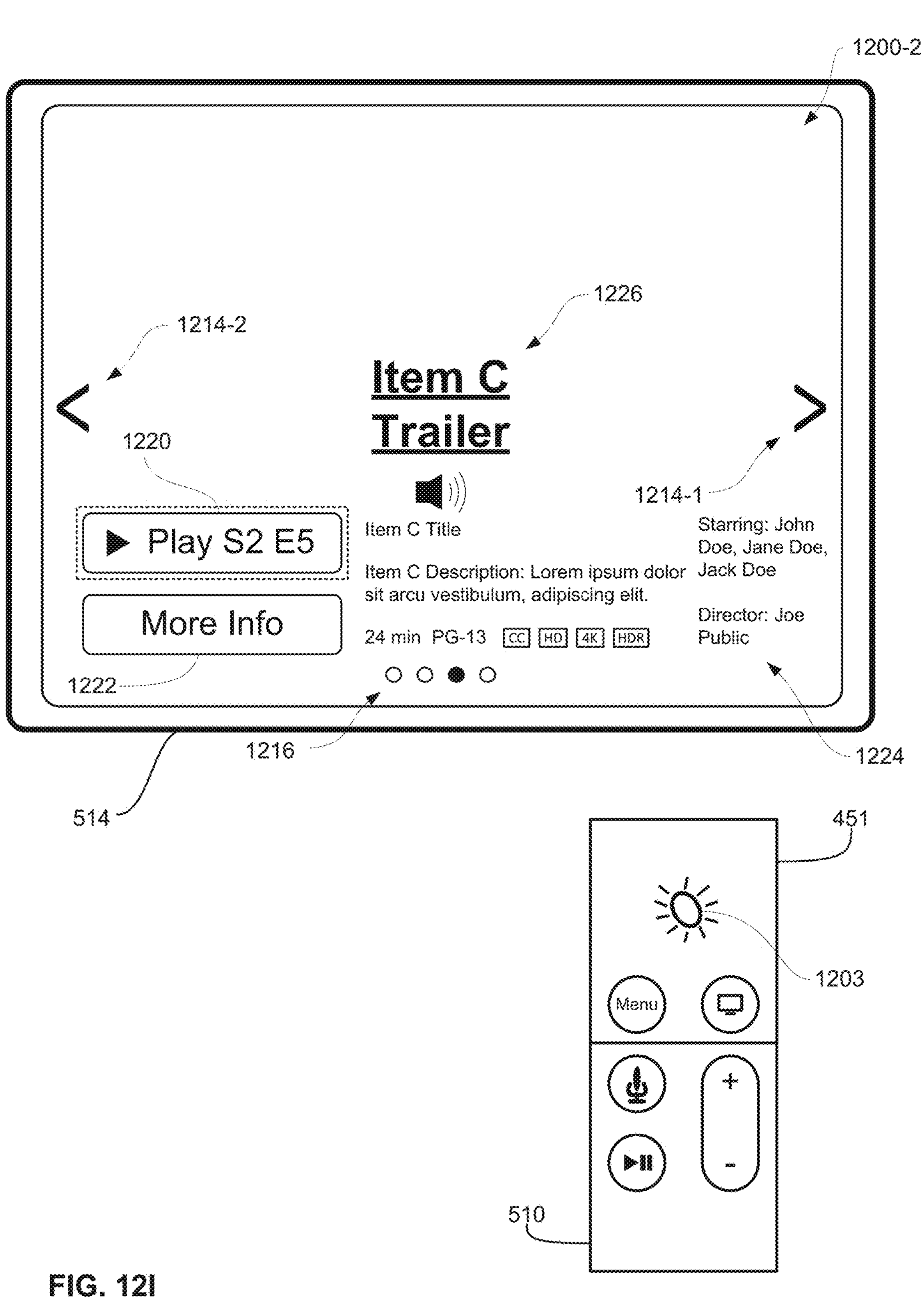

In FIG. 12I, a user input 1203 is received corresponding to a selection input (e.g., a click on touch-sensitive surface 451 of remote control device 510) while selectable option 1220 has a focus. In some embodiments, in response to the user input, device 500 replaces display of user interface 1200-2 with display of user interface 1200-3 corresponding to a media playback user interface and causes playback of item C in the media playback user interface. In some embodiments, the playback of item C occurs in a user interface of the unified media browsing application (e.g., the device launches or otherwise displays the unified media browsing application and causes playback of the item from within the unified media browsing application). In some embodiments, the playback of item C occurs in another application, different from the unified media browsing application (e.g., such as an application for a content provider).

Figure 12J:
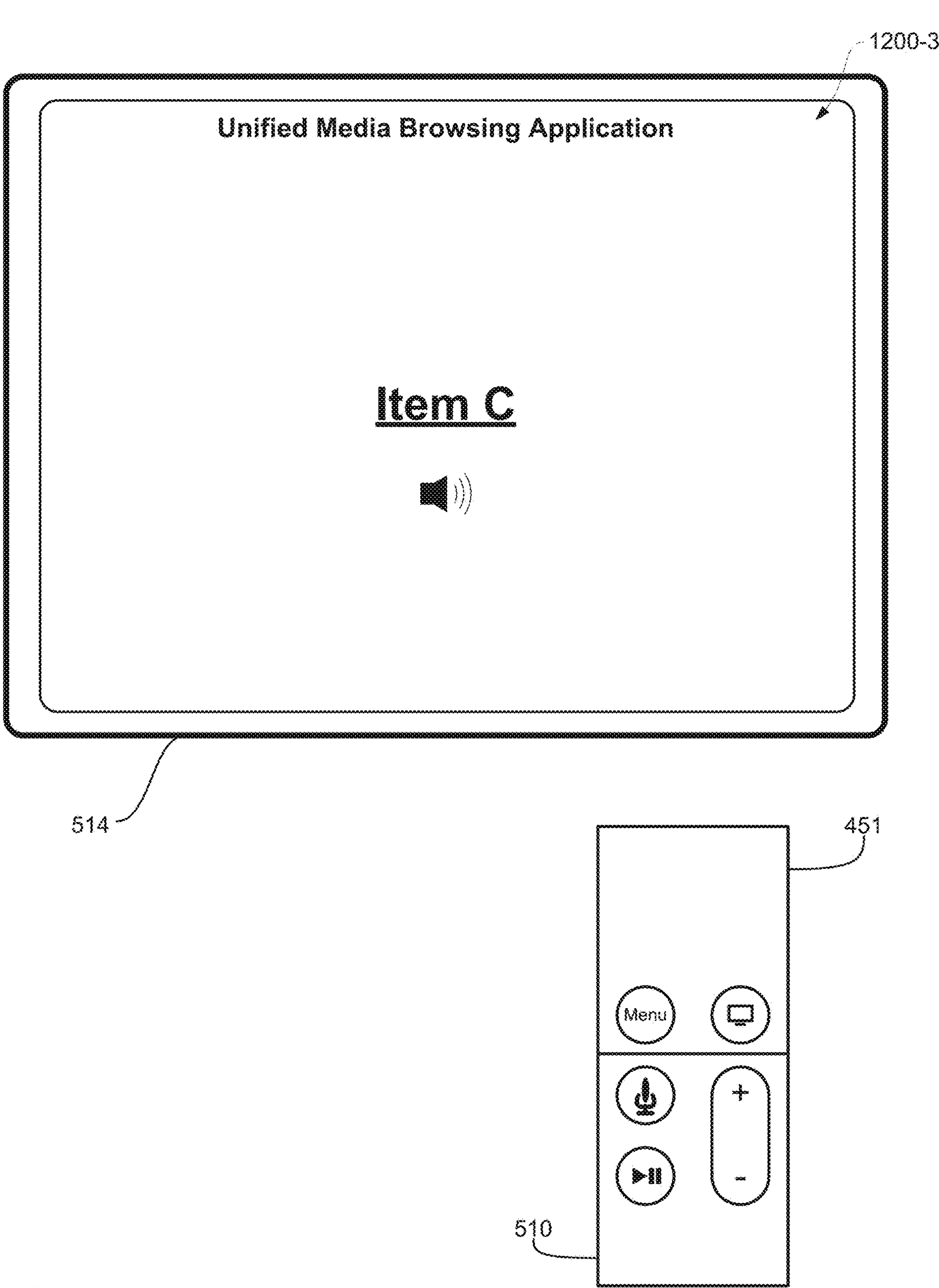
Figure 12K:
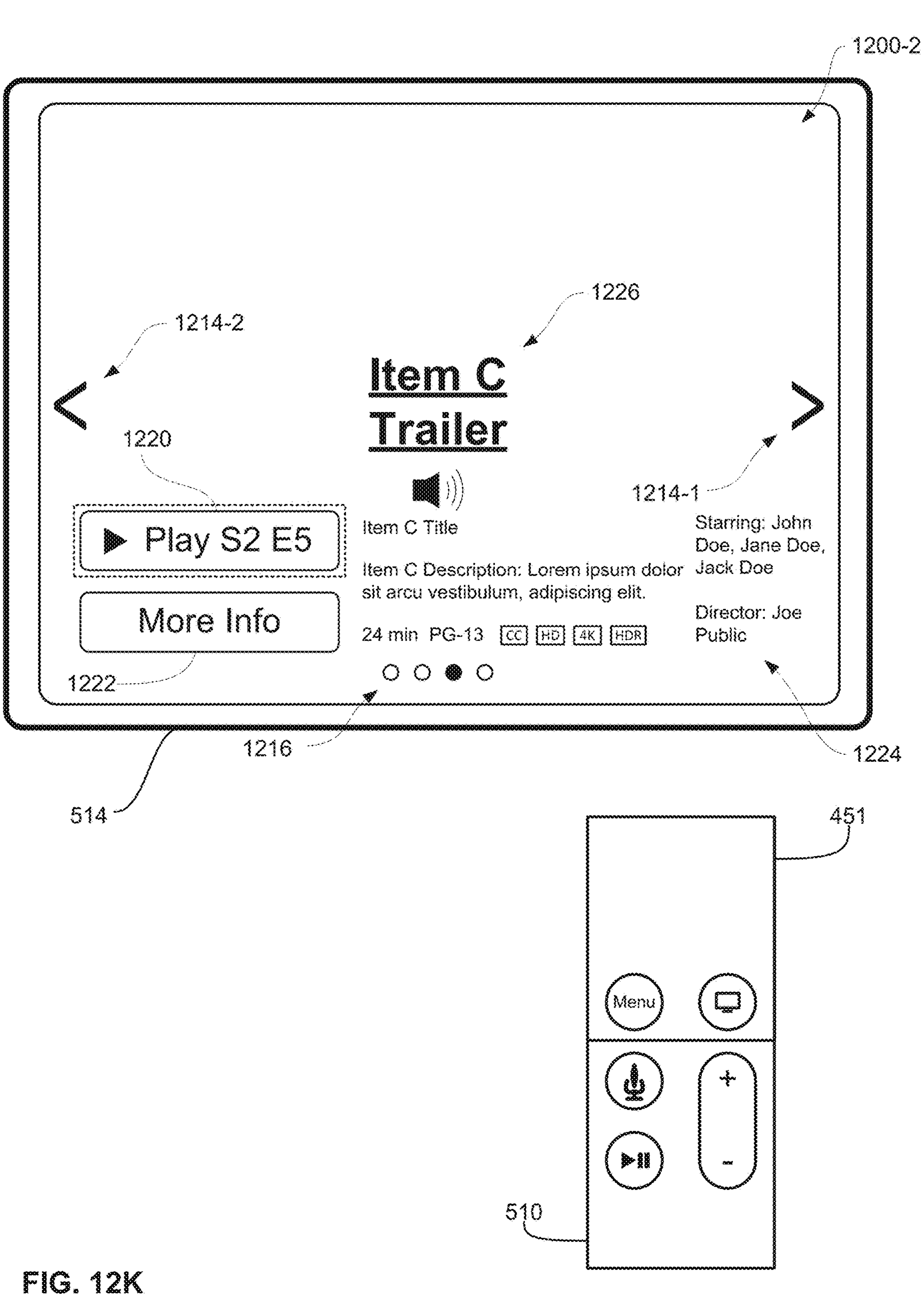
Figure 12L:
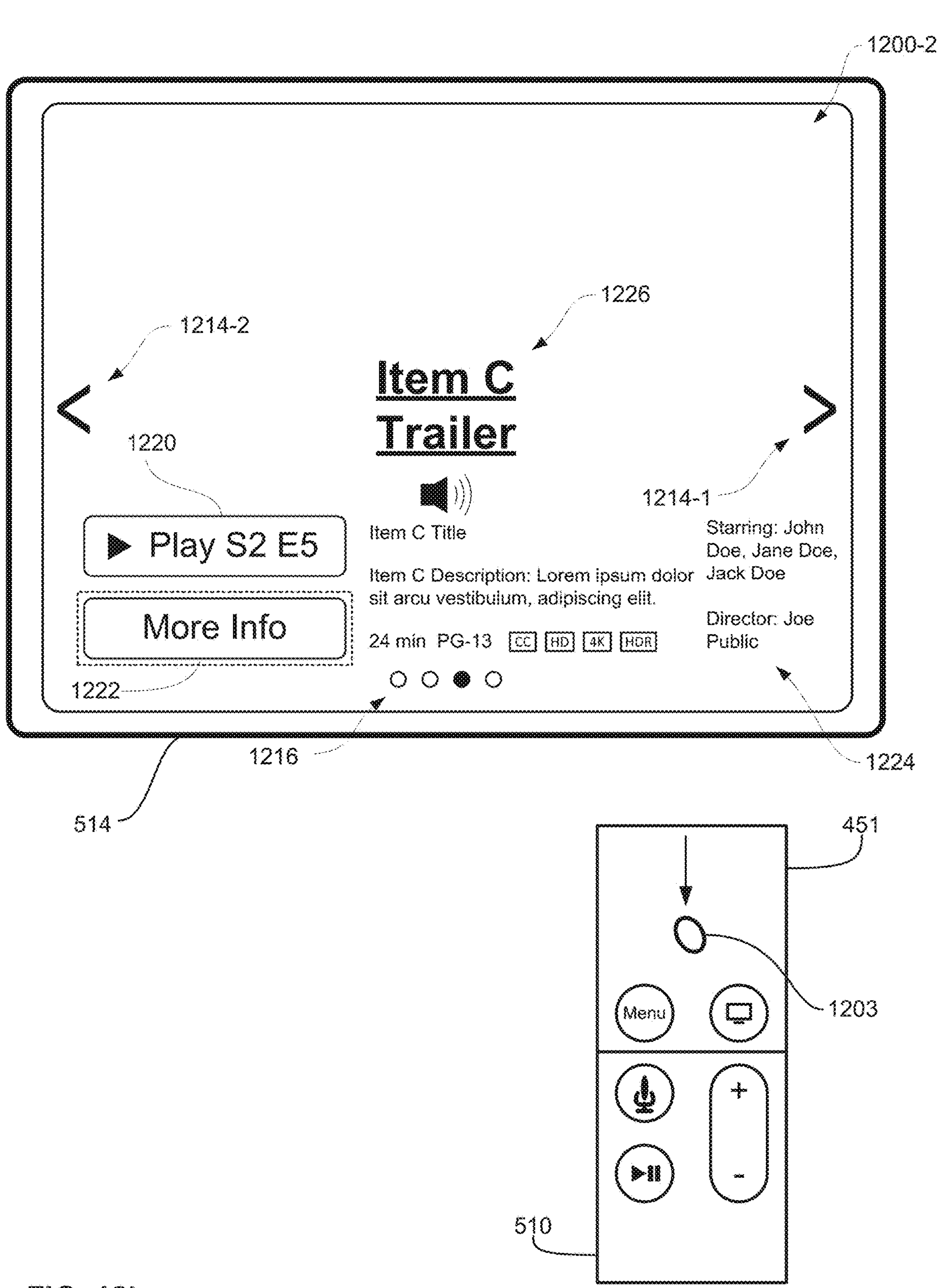

FIG. 12K returns to user interface 1200-2 displaying the enhanced preview of item C with selectable option 1220 having the focus, similar to in FIG. 12H-12I. In FIG. 12L, a user input 1203 is received corresponding to a downward navigation. In some embodiments, in response to the user input, the focus is moved downwards from selectable option

Figure 12M:
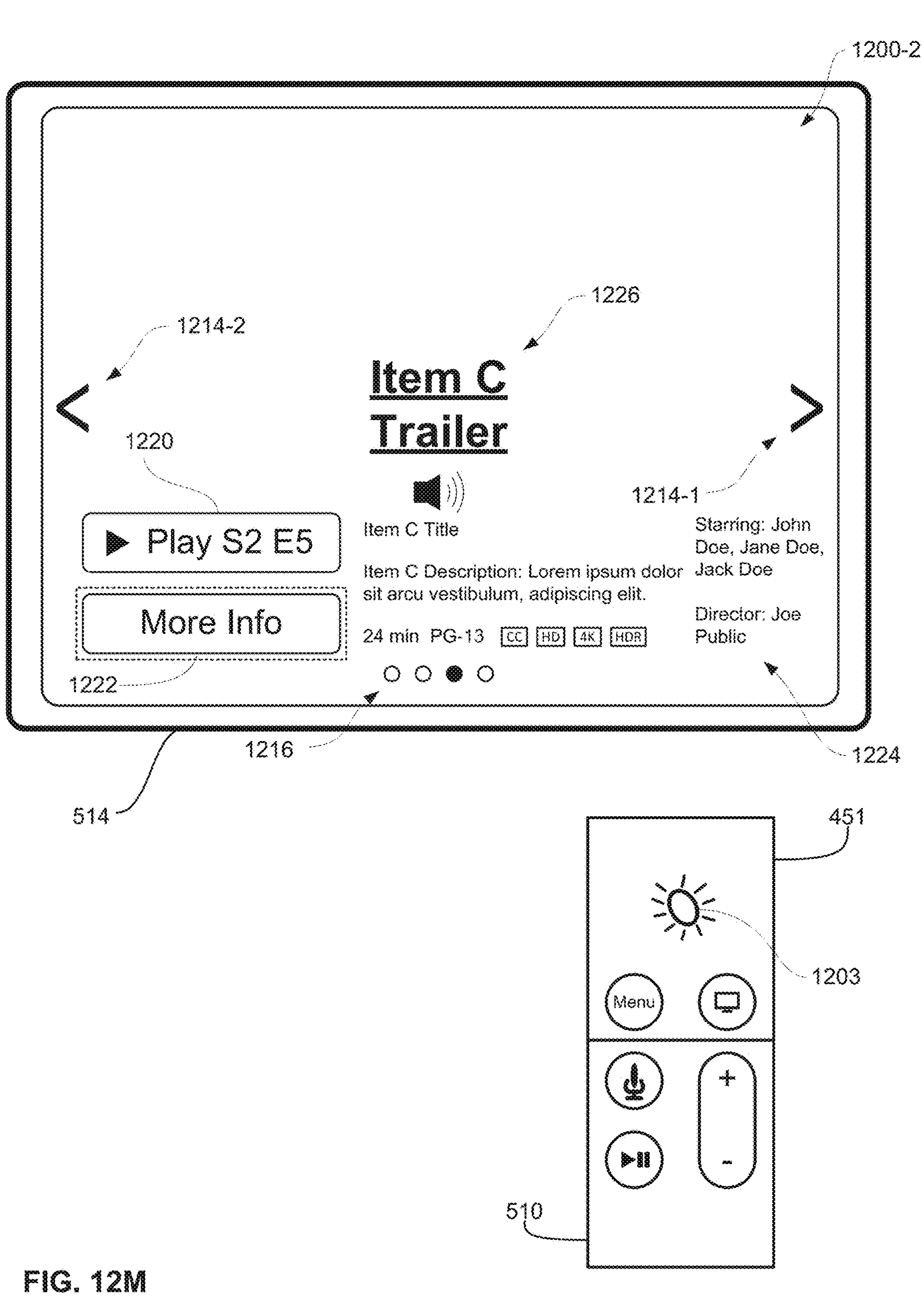

1220 to selectable option 1220, as shown in FIG. 12L. In FIG. 12M, a user input 1203 is received corresponding to a selection input while selectable option 1222 has a focus. In some embodiments, in response to the user input, device 500 replaces display of user interface 1200-2 with user interface 1200-4. In some embodiments, user interface 1200-4 is a user interface of the unified media browsing application specific to the content item (e.g., a product page for item C), similar to the product page described above with respect to method 700 (e.g., FIG. 6Z).

Figure 12N:
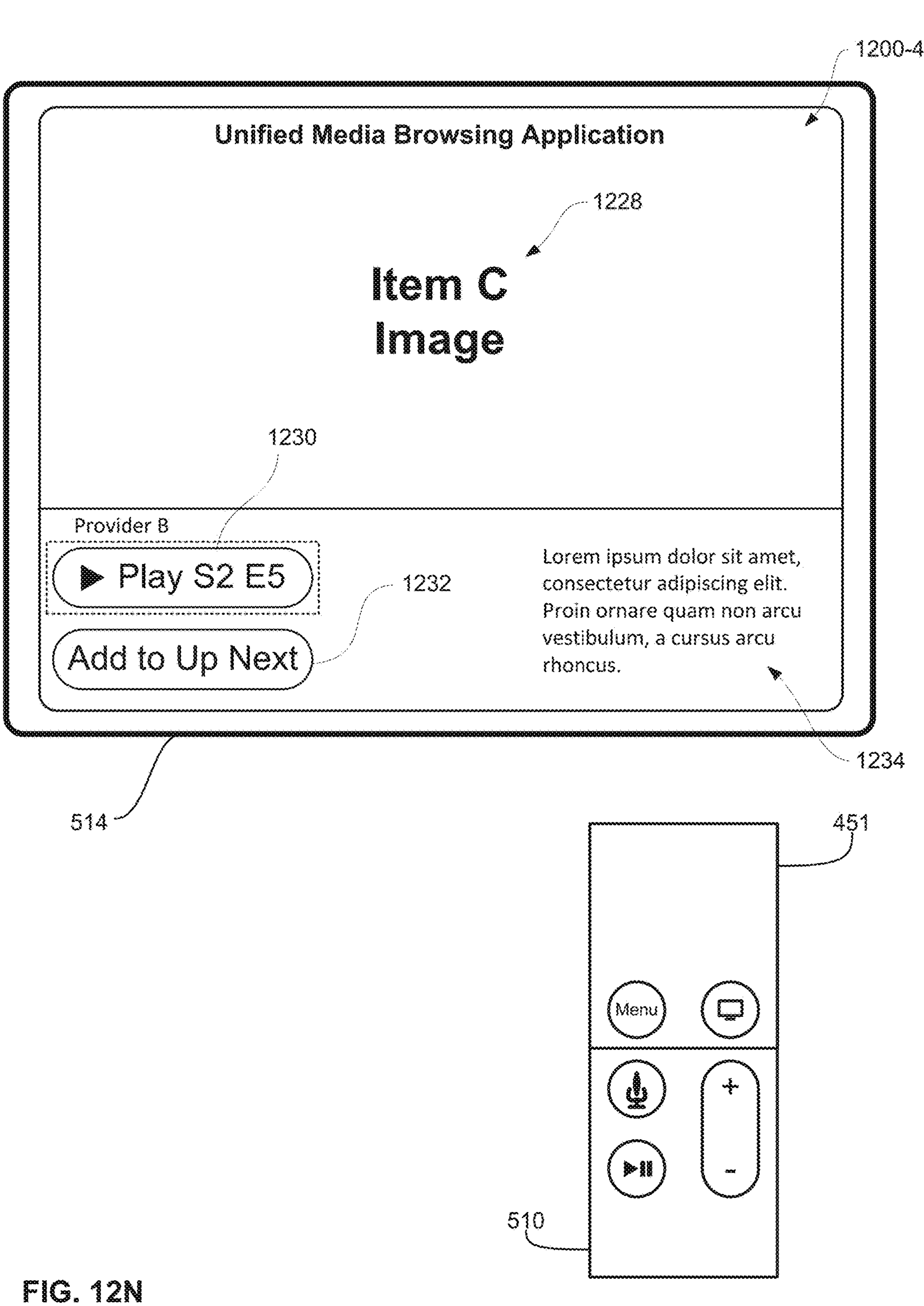
Figure 12O:
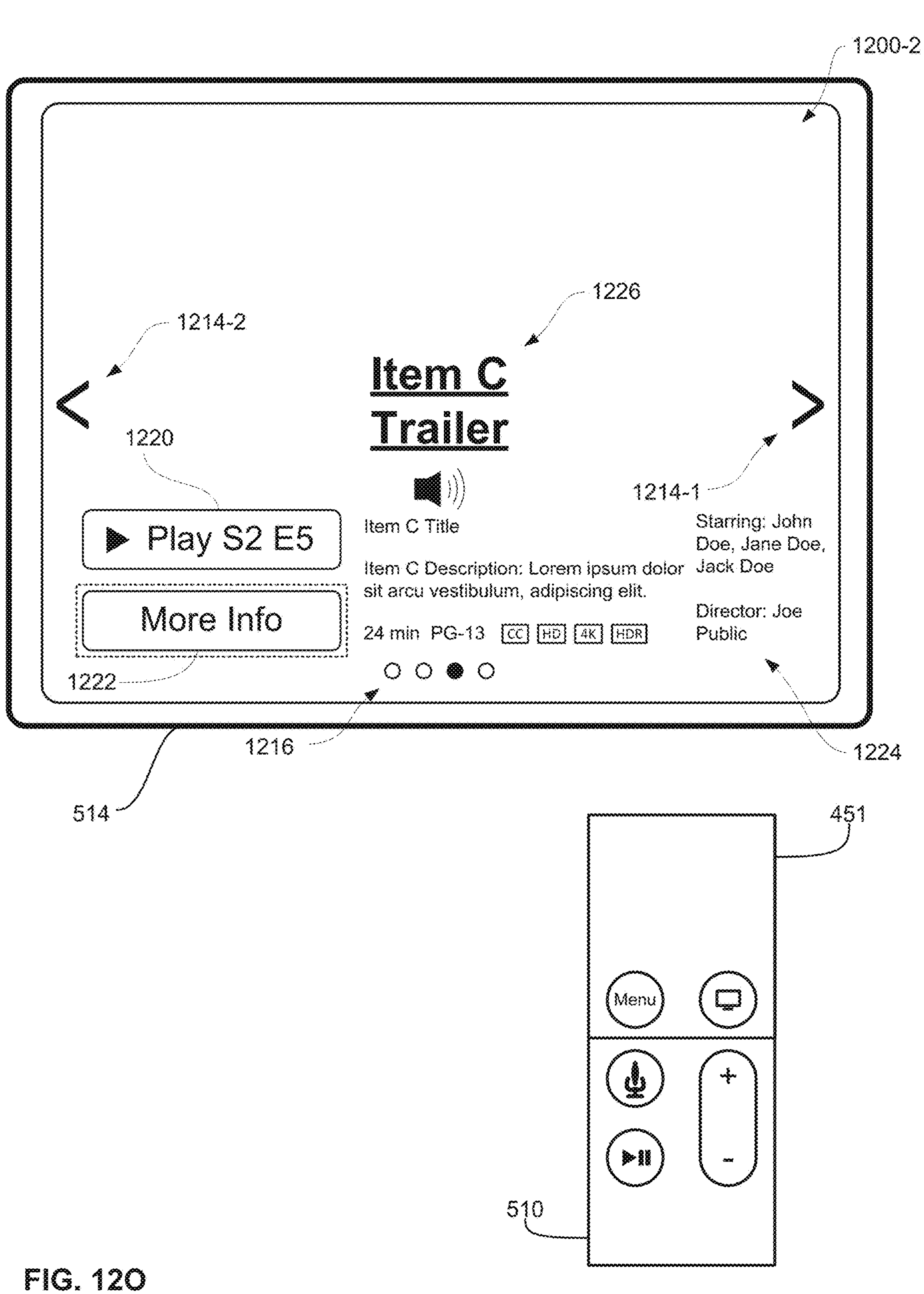
Figure 12P:
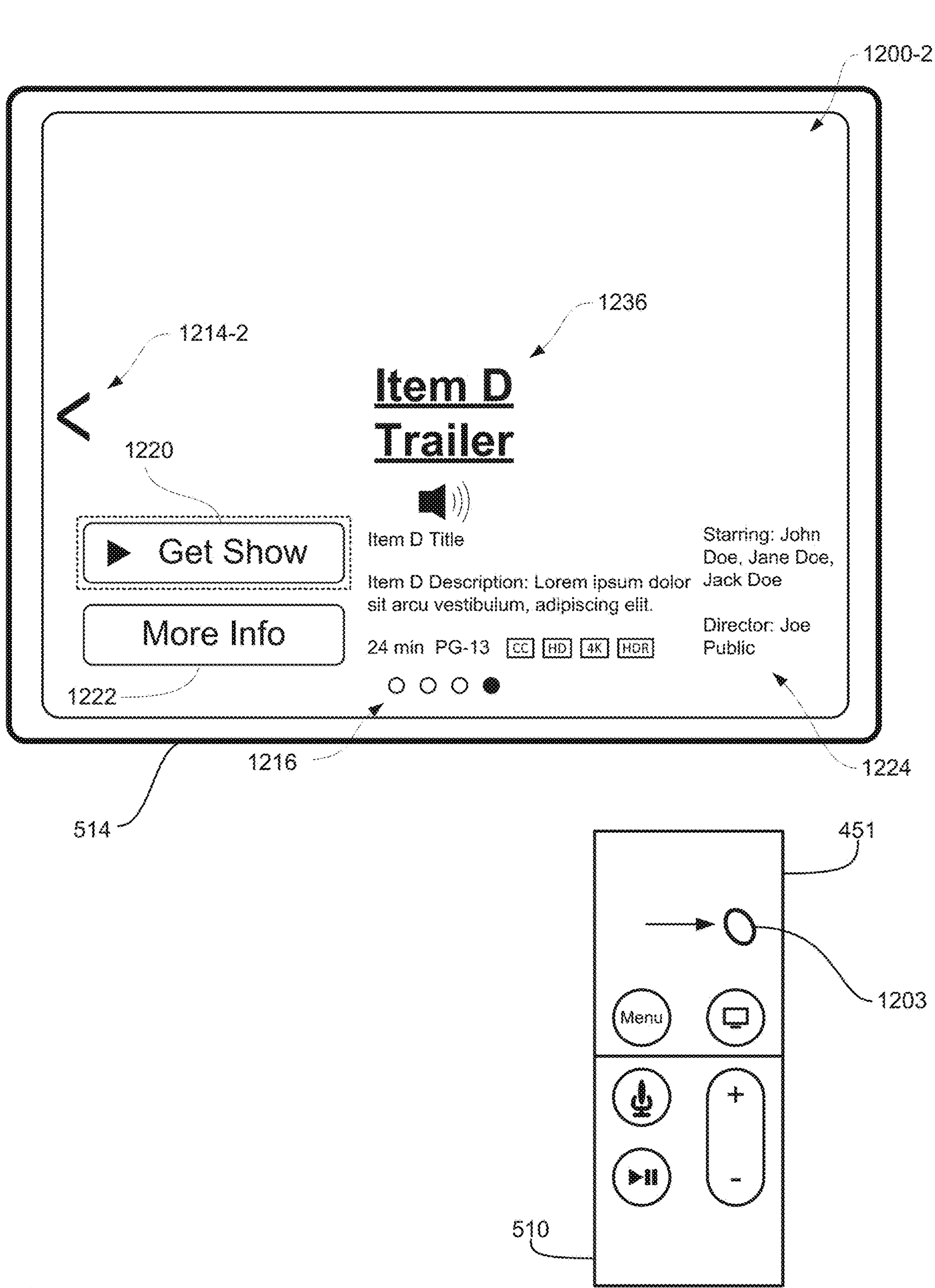

FIG. 12O returns to user interface 1200-2 displaying the enhanced preview of item C while selectable option 1222 has a focus. In FIG. 12P, a user input 1203 corresponding to a rightward navigation is received. In some embodiments, as shown in FIG. 12P, user interface 1200-2 is updated to display the enhanced preview of the next content item. Thus, in some embodiments, a rightward navigation while the selectable options and information are displayed does not cause focus to move from the selectable options to information 1224. In some embodiments, information 1224 are not selectable. In some embodiments, information 1224 is selectable to cause display of further information and a rightward navigation does cause focus to move to information 1224 (e.g., and a further rightward navigation while information 1224 has a focus causes navigation to the next content item).

As shown in FIG. 12P, user interface 1220-2 is displaying an enhanced preview of item D and selectable options 1220 and 1222 and information 1224 are updated to reflect item D. In some embodiments, if the user does not have an entitlement to item D (e.g., does not have a subscription to the provider that provides item D or has not otherwise purchased access to item D), then the device is able to determine that the user does not have entitlement and must first acquire entitlement to access item D. Thus, in some embodiments, selectable option 1220 reads "Get Show" and is selectable to initiate a process for acquiring entitlement to item D. For example, in FIG. 12Q, a user input 1203 is received corresponding to a selection request while selectable option 1220 has a focus. In some embodiments, in response to the user input, the device replaces display of user interface 1200-2 with display of user interface 1200-4 corresponding to the product page for item D. In some embodiments, because the user selected the selectable option for acquiring entitlement to item D, user interface 1200-4 is scrolled downwards (e.g., as opposed to displaying the top of the product page as shown in FIG. 12N) to reveal the section of the product page that displays one or more ways of acquiring entitlement to item D. As shown in FIG. 12R, the section of the product page that displays one or more ways of acquiring entitlement to item D (e.g., "How to Watch" section) includes selectable options 1238-1 to 1238-4 that are selectable to initiate a process of acquiring entitlement through the respective method, similarly to the process described above with respect to method 1100 (e.g., and shown in FIGS. 10H-10K).

Figure 12Q:
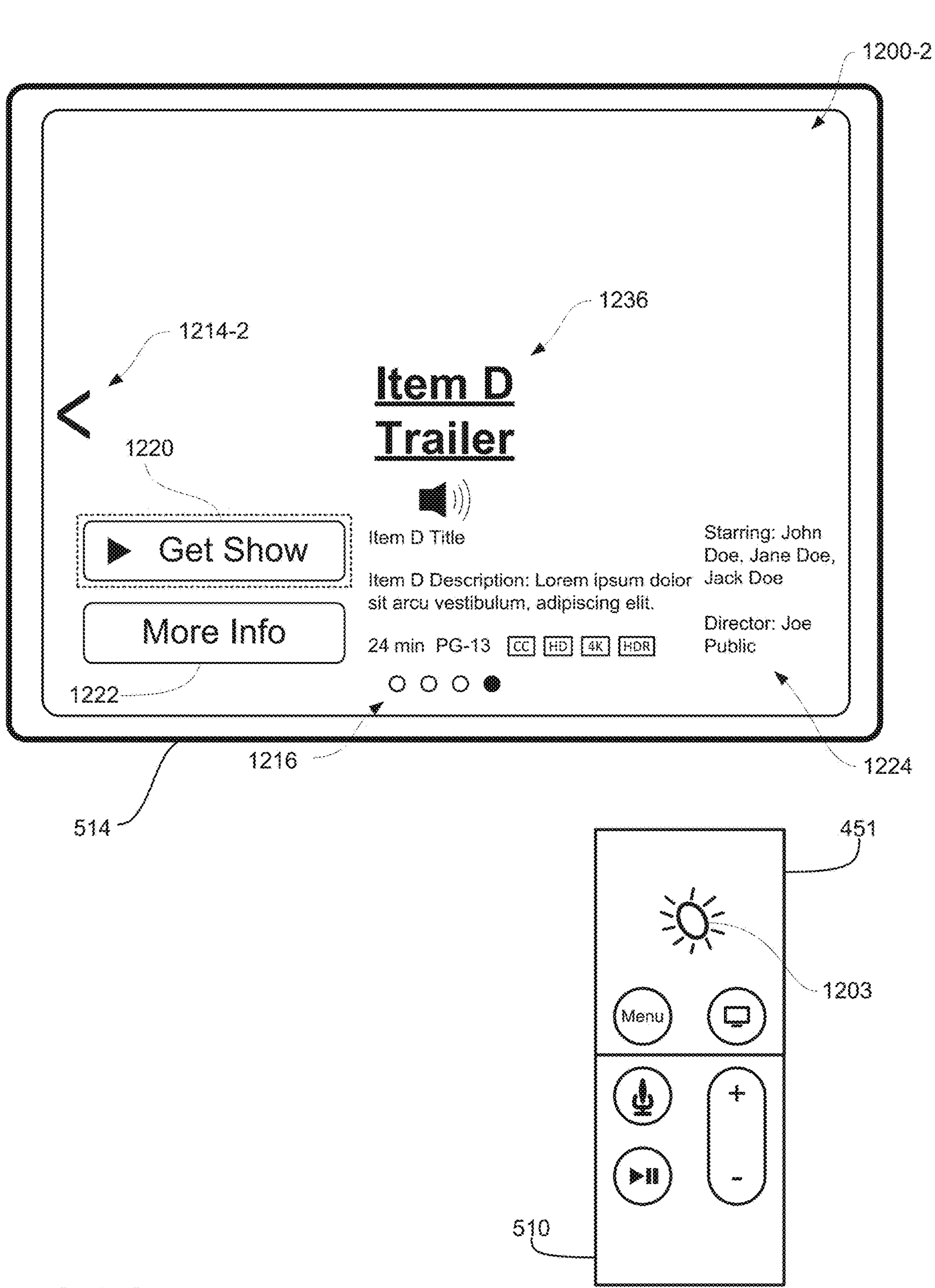
Figure 12R:
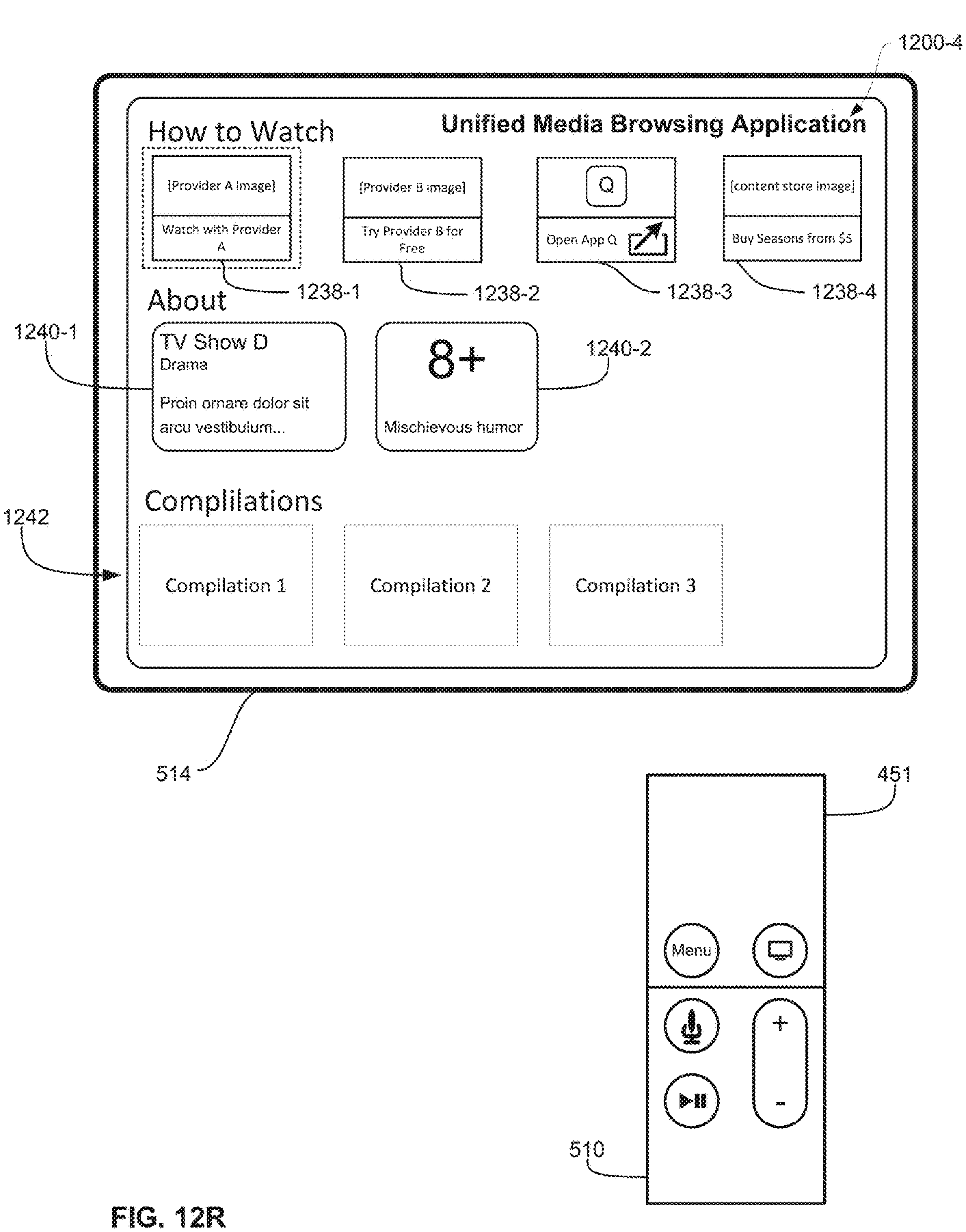
Figure 12S:
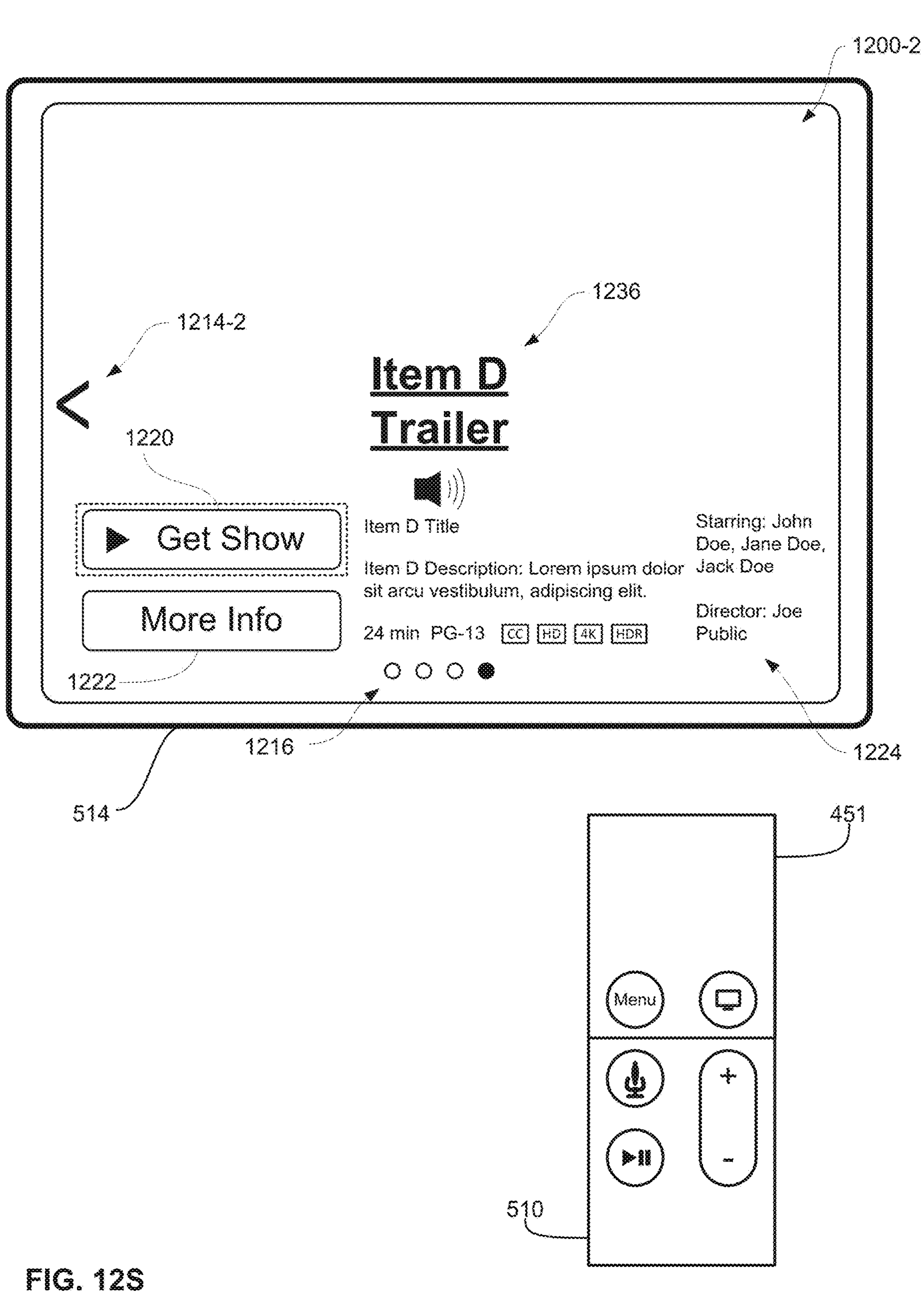
Figure 12T:
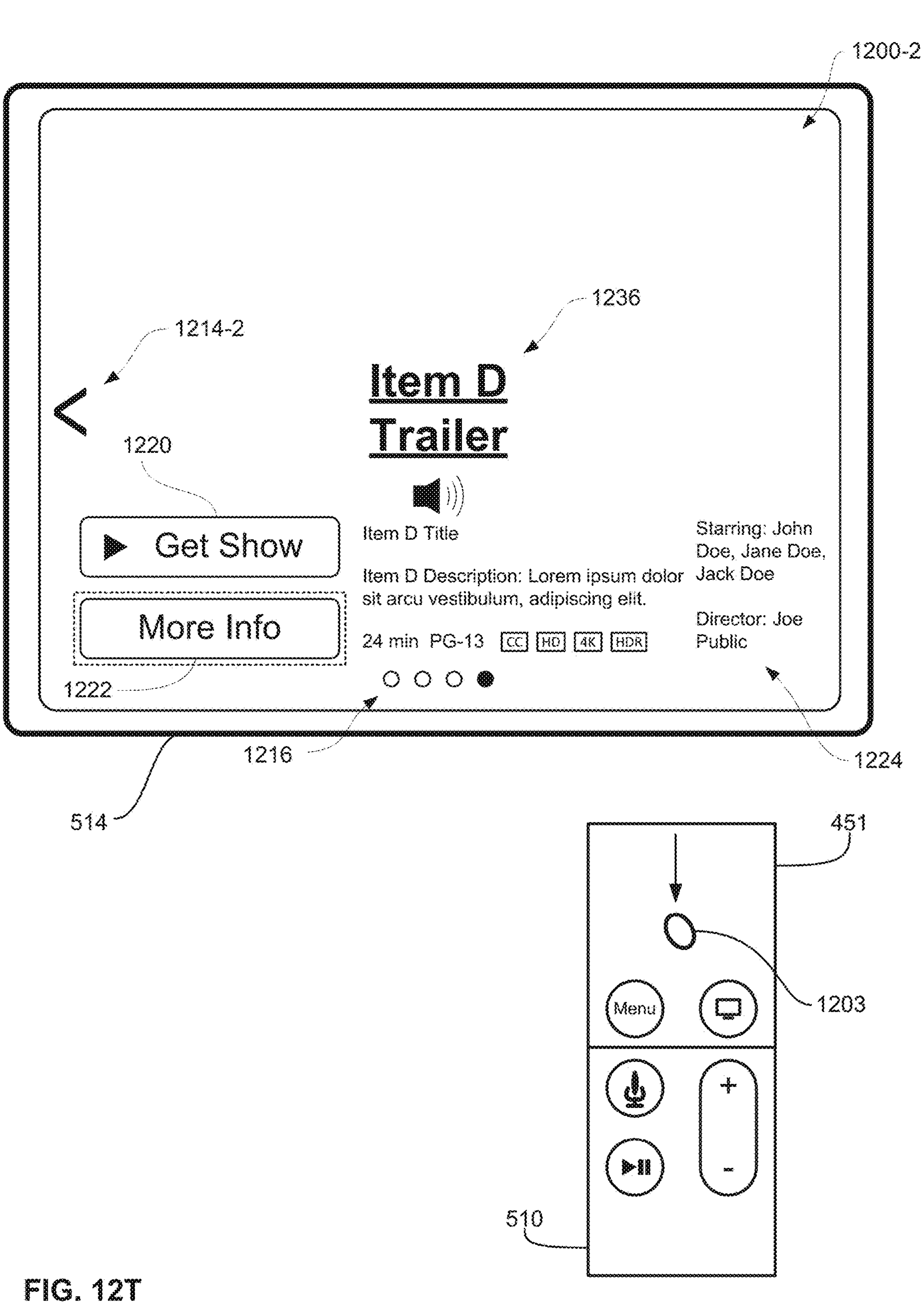
Figure 12U:
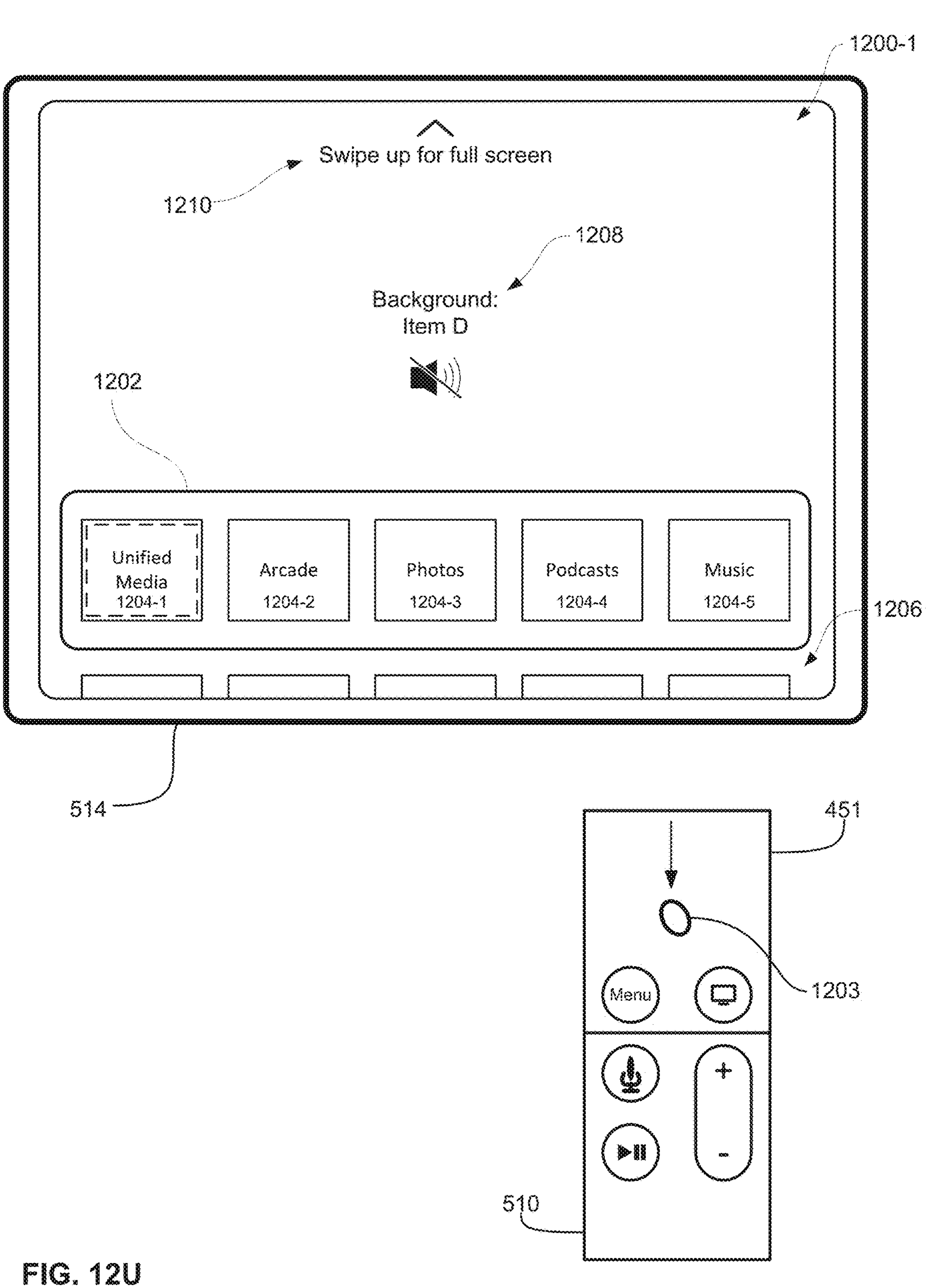

FIG. 12S returns to user interface 1200-2 displaying the enhanced preview of item D with selectable option 1220 having a focus. In FIG. 12T, a user input 1203 is received corresponding to a downward navigation. In some embodiments, in response to the user input, the focus is moved downwards to selectable option 1222, as shown in FIG. 12T. In FIG. 12U, a further user input 1203 is received corresponding to a downward navigation while selectable option 1222 has a focus. In some embodiments, in response to the downward input, device 500 exits out of enhanced preview mode and replaces display of user interface 1220-2 with display of user interface 1200-1 corresponding to the home screen user interface with representation 1204-1 having the focus (e.g., returning to the user interface that was displayed before the user entered into enhanced preview mode), but with item D being previewed in content preview region 1208 (e.g., because item D was the item that was being displayed in enhanced preview mode when the user exited enhanced preview mode). In some embodiments, performing a further downward swipe then the user is at the lowest selectable option does not cause the device to exit enhanced preview mode (e.g., in response to the input, the focus remains on selectable option 1222). In such embodiments, the user exits enhanced preview mode by selecting the "back" button on the remote control device (e.g., the "menu" button).

Figure 12V:
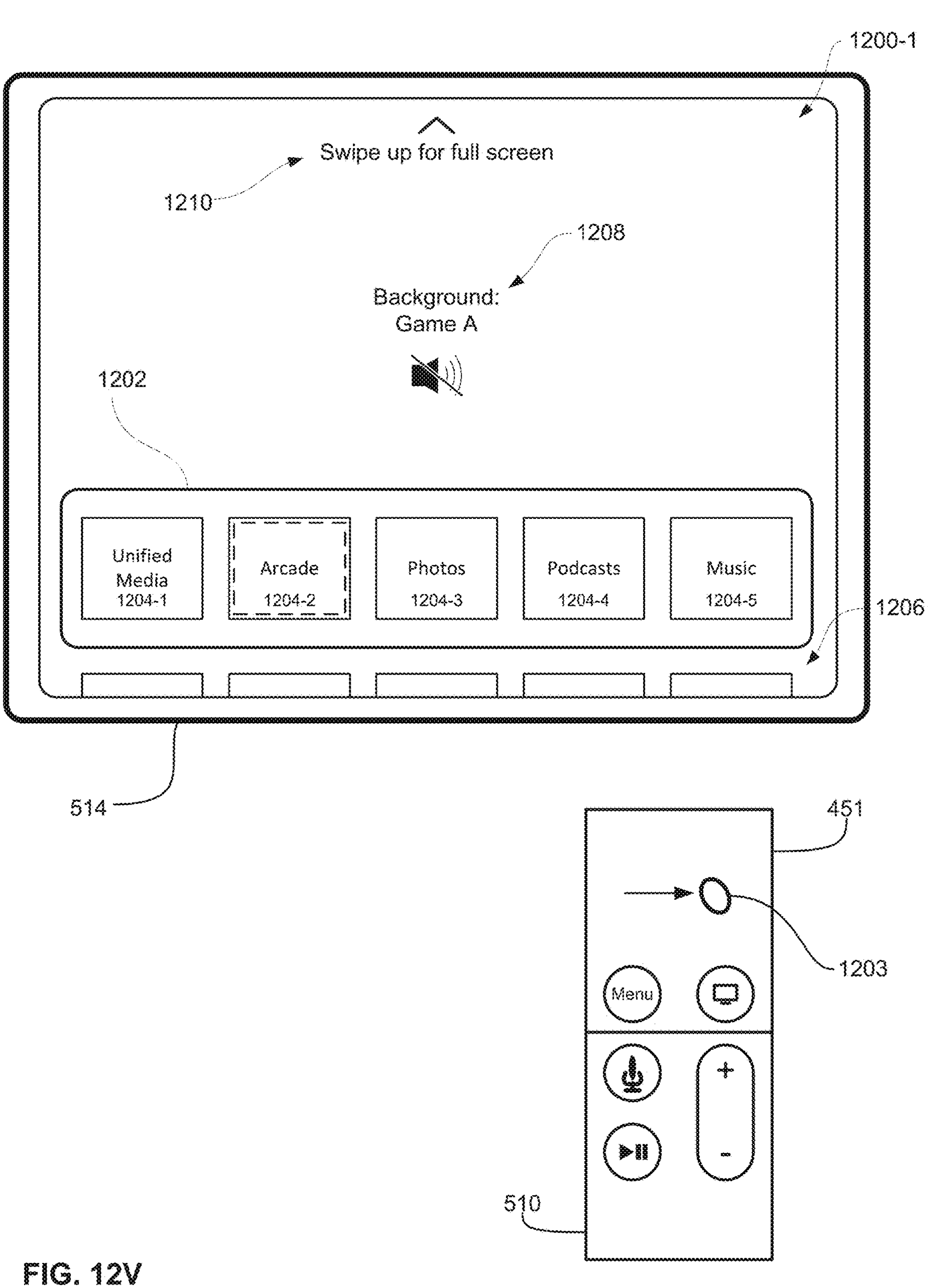

In FIG. 12V, a user input 1203 is received corresponding to a rightward navigation. In some embodiments, in response to the user input, focus is moved from representation 1204-1 to representation 1204-2 corresponding to the arcade application, as shown in FIG. 12V. In some embodiments, the arcade application is an application for the arcade subscription service from which the user can browse for, download, and launch arcade games that are associated with the arcade subscription service. In some embodiments, the arcade subscription service is a service in which a single subscription (e.g., optionally for which there are periodic payments) to the arcade subscriptions service grants the user with entitlements to every game in the arcade subscription service. In FIG. 12V, because representation 1204-2 has a focus, content preview region 1208 is displaying a featured game (e.g., game A) that is accessible in the arcade application. In some embodiments, hint 1210 indicates that the user is able to enter into enhanced preview mode for the arcade application.

Figure 12W:
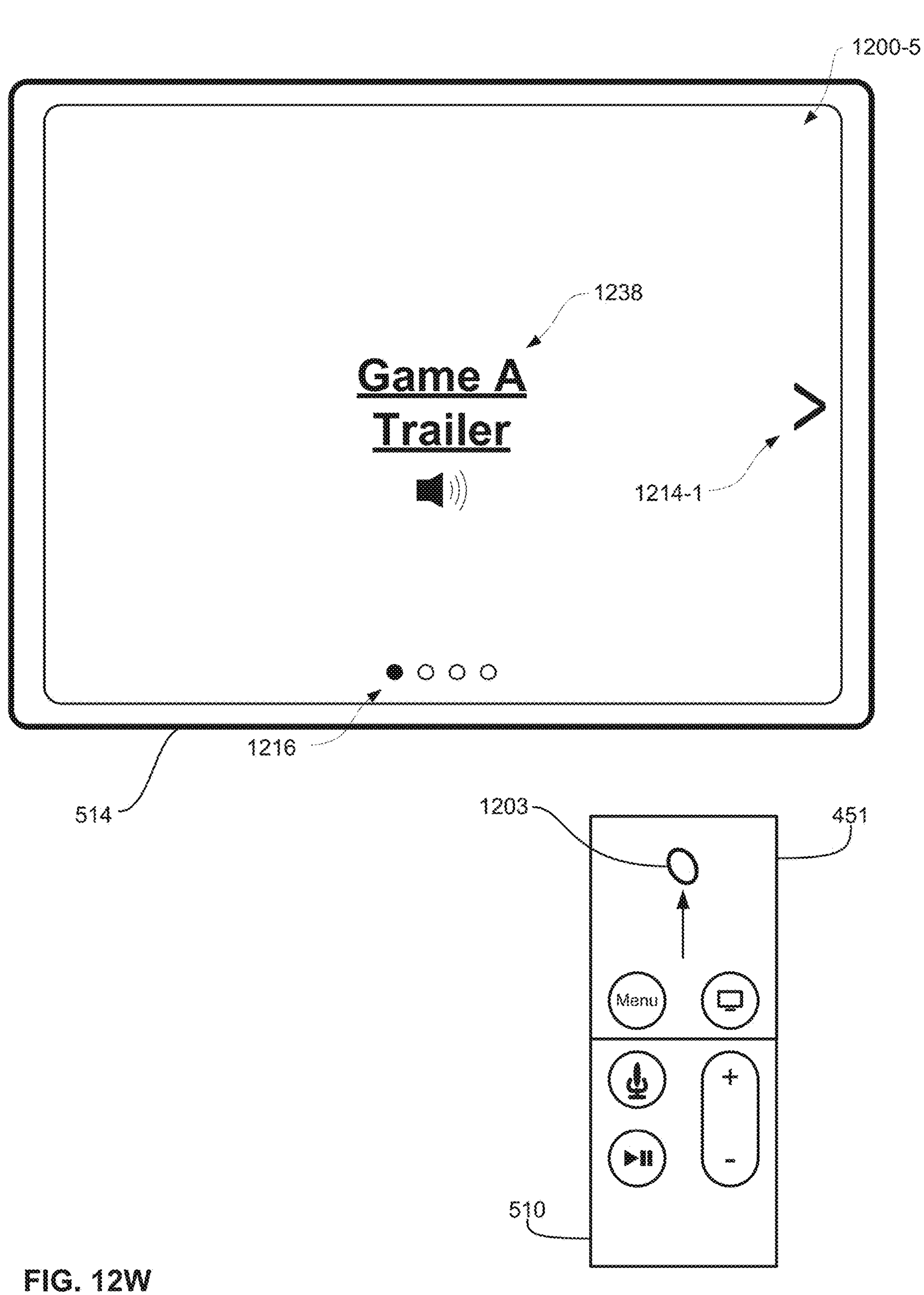

In FIG. 12W, a user input 1203 is received corresponding to an upward swipe (e.g., corresponding to a request to enter into enhanced preview mode). In some embodiments, in response to the user input, device 500 replaces display of user interface 1200-1 with user interface 1200-5 corresponding to the full-screen preview user interface. In some embodiments, user interface 1200-5 displays a full screen preview of game A and includes pagination markers 1216 and navigation indicator 1214-1.

Figure 12X:
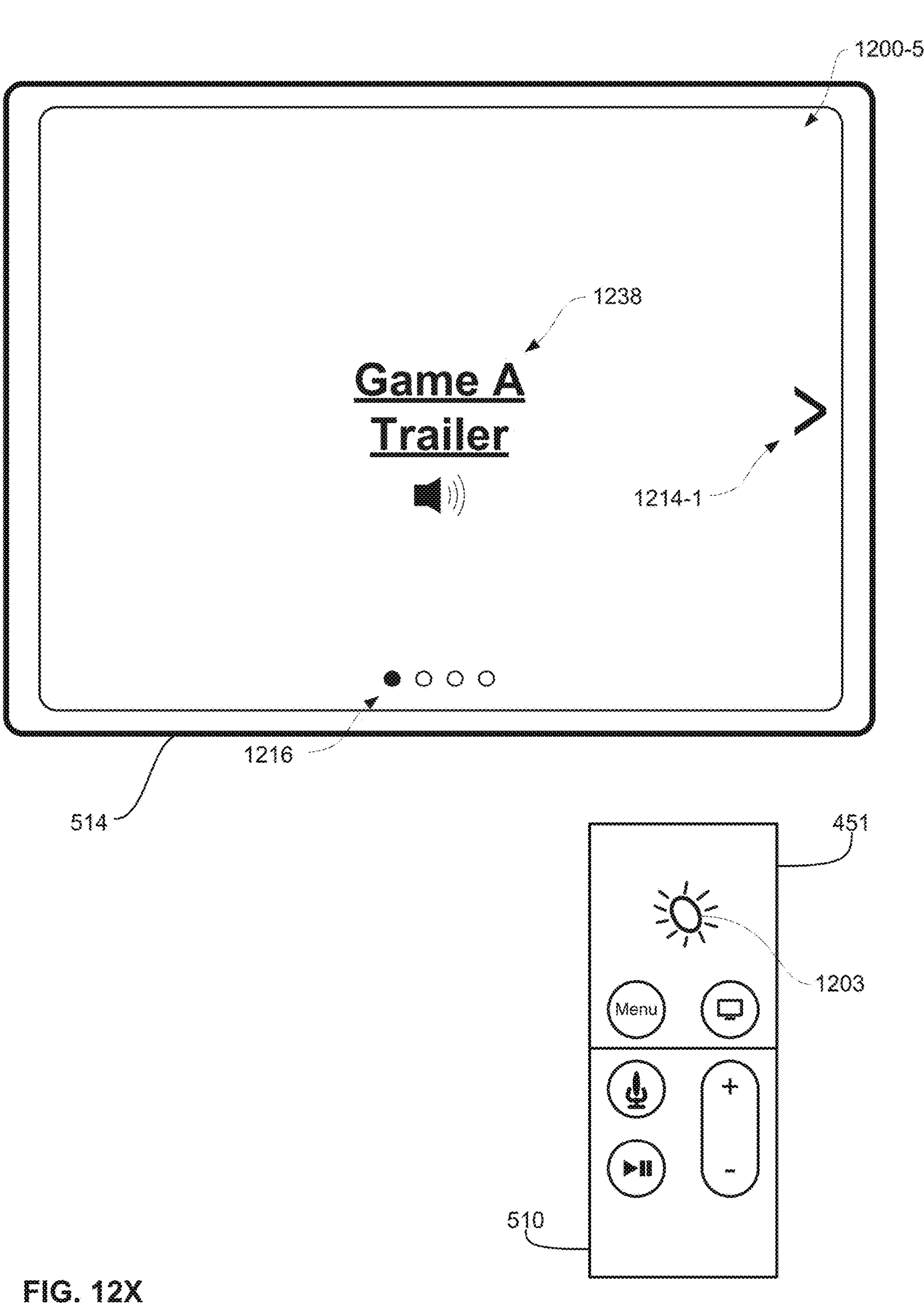
Figure 12Y:
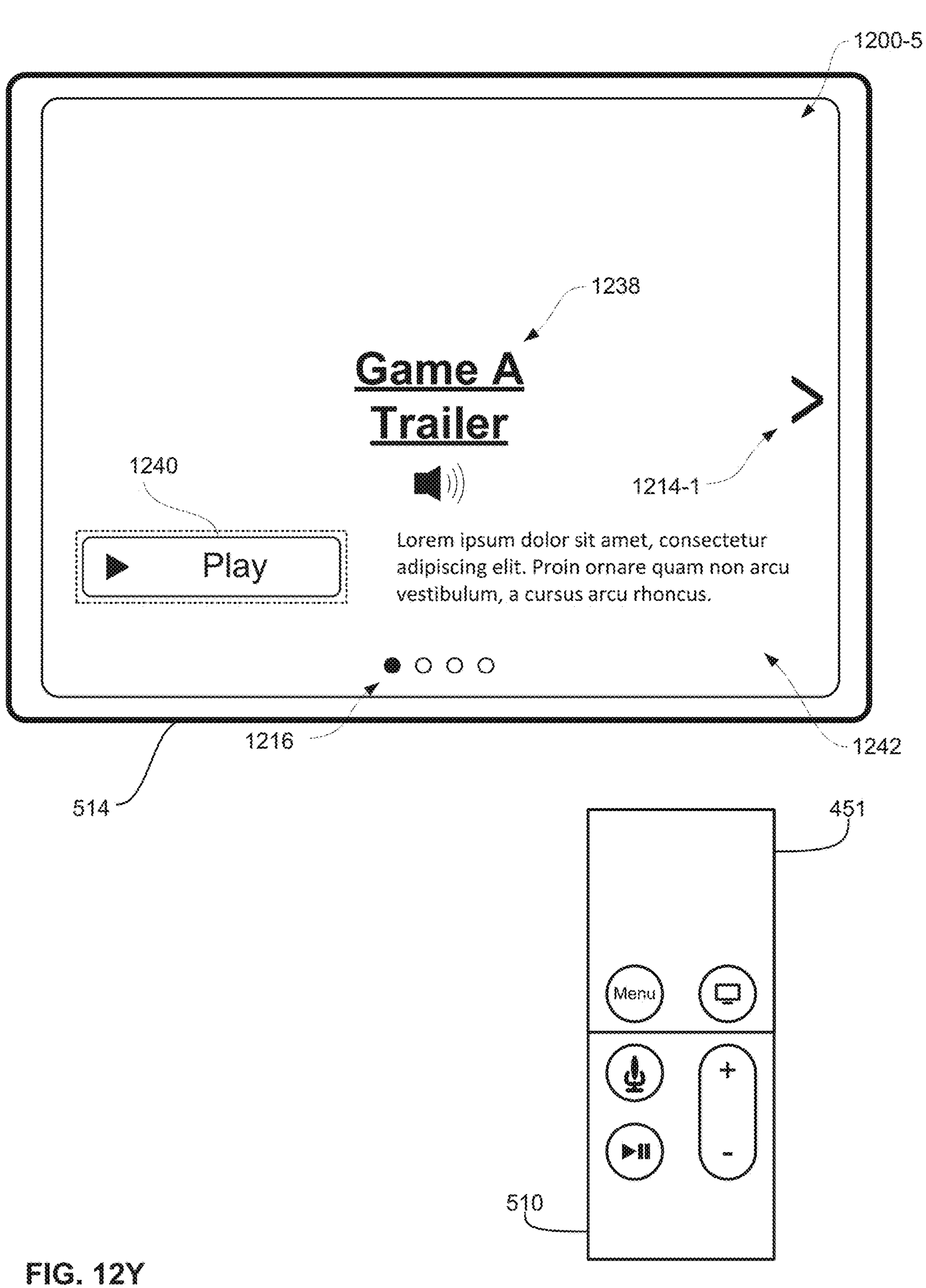
Figure 12Z:
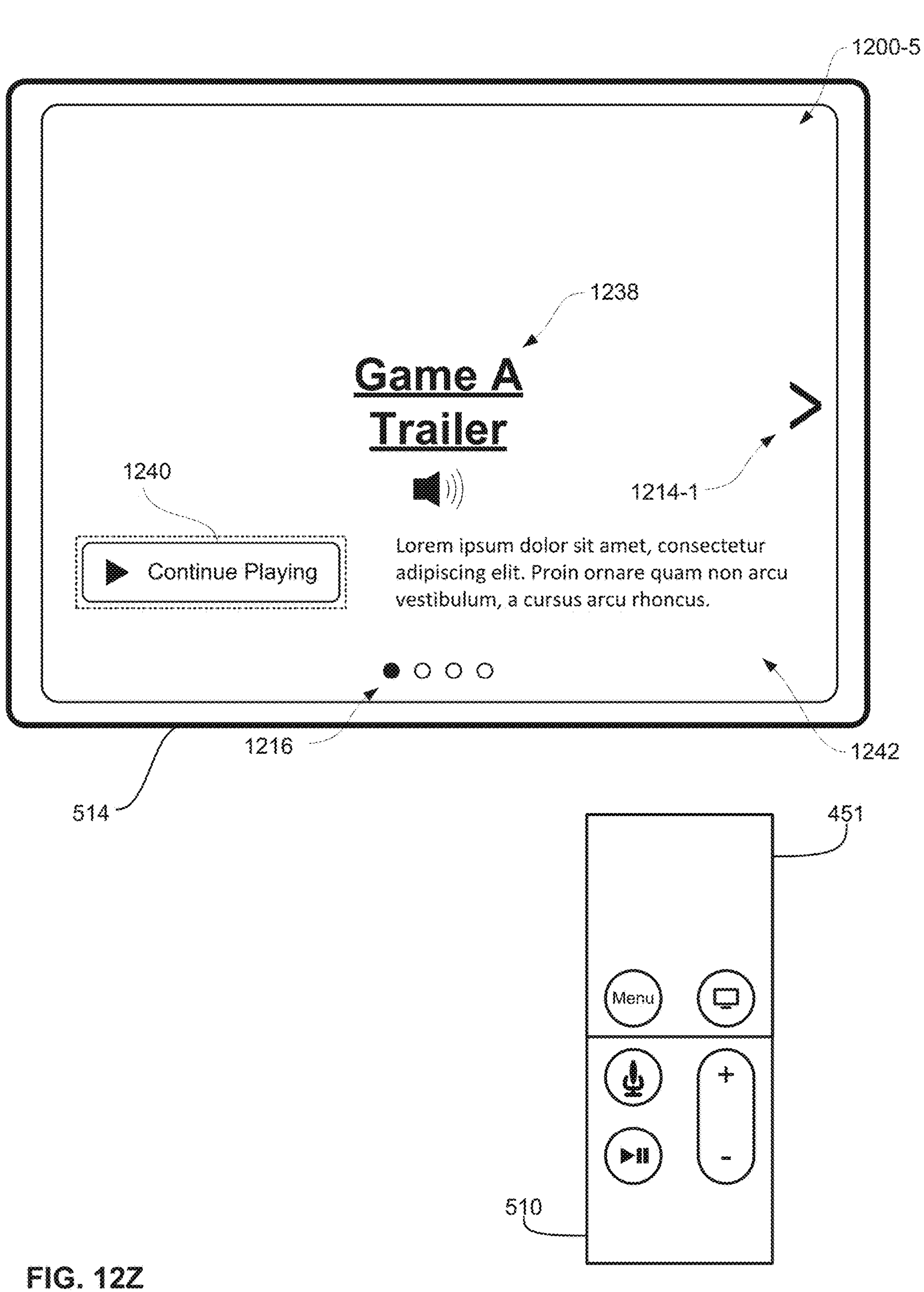
Figure 12A:
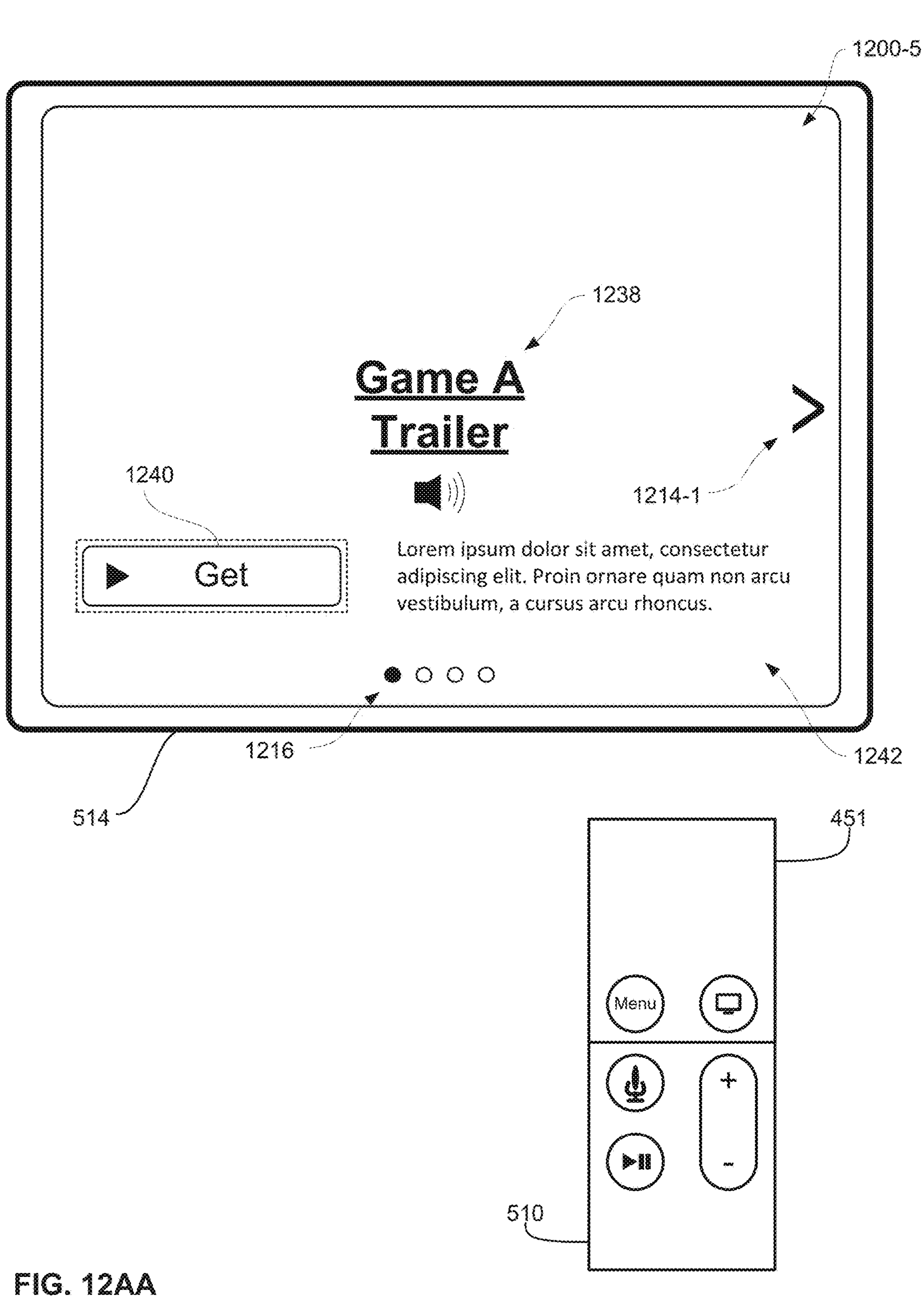
Figure 12B:
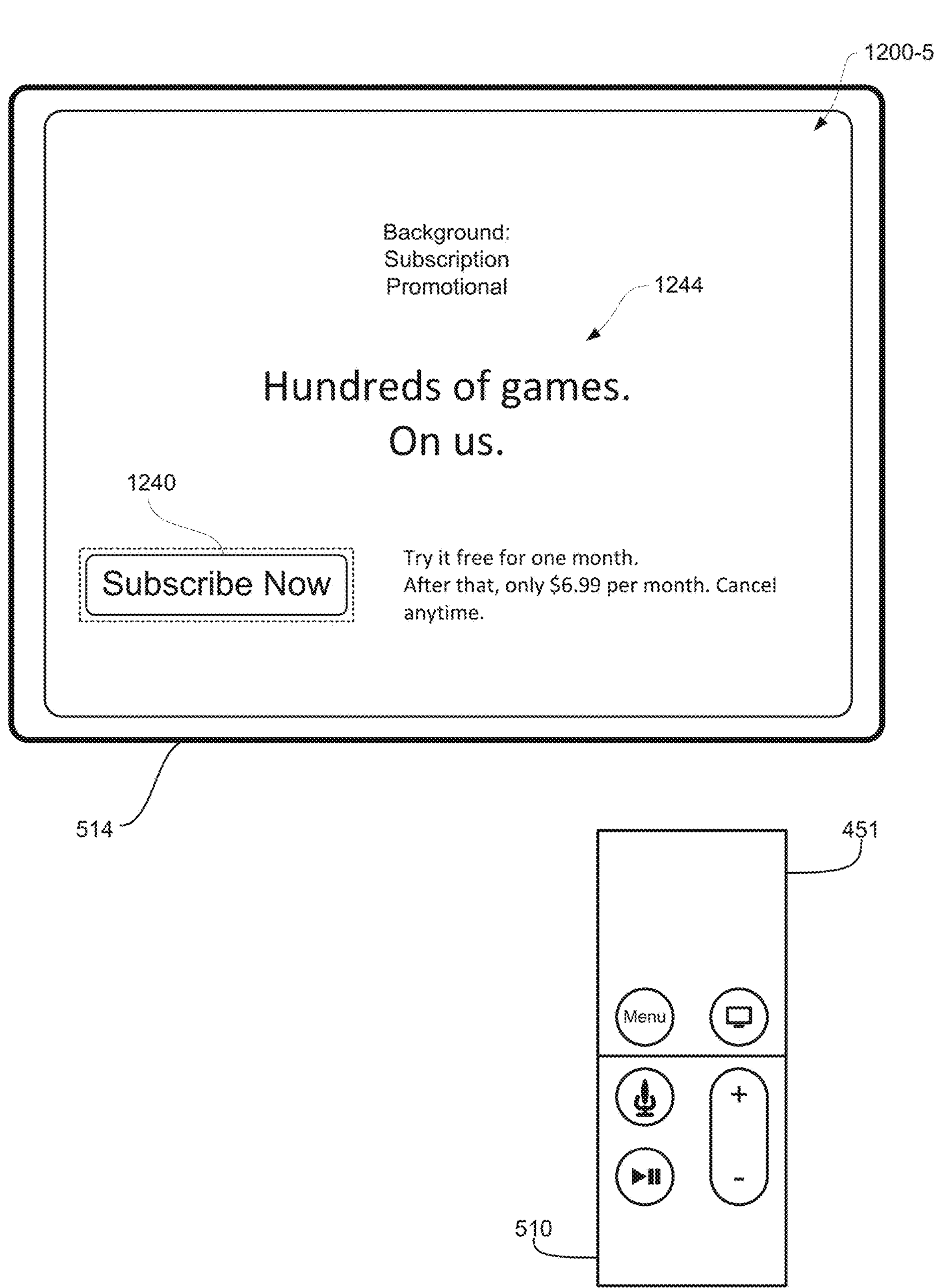
Figure 12C:
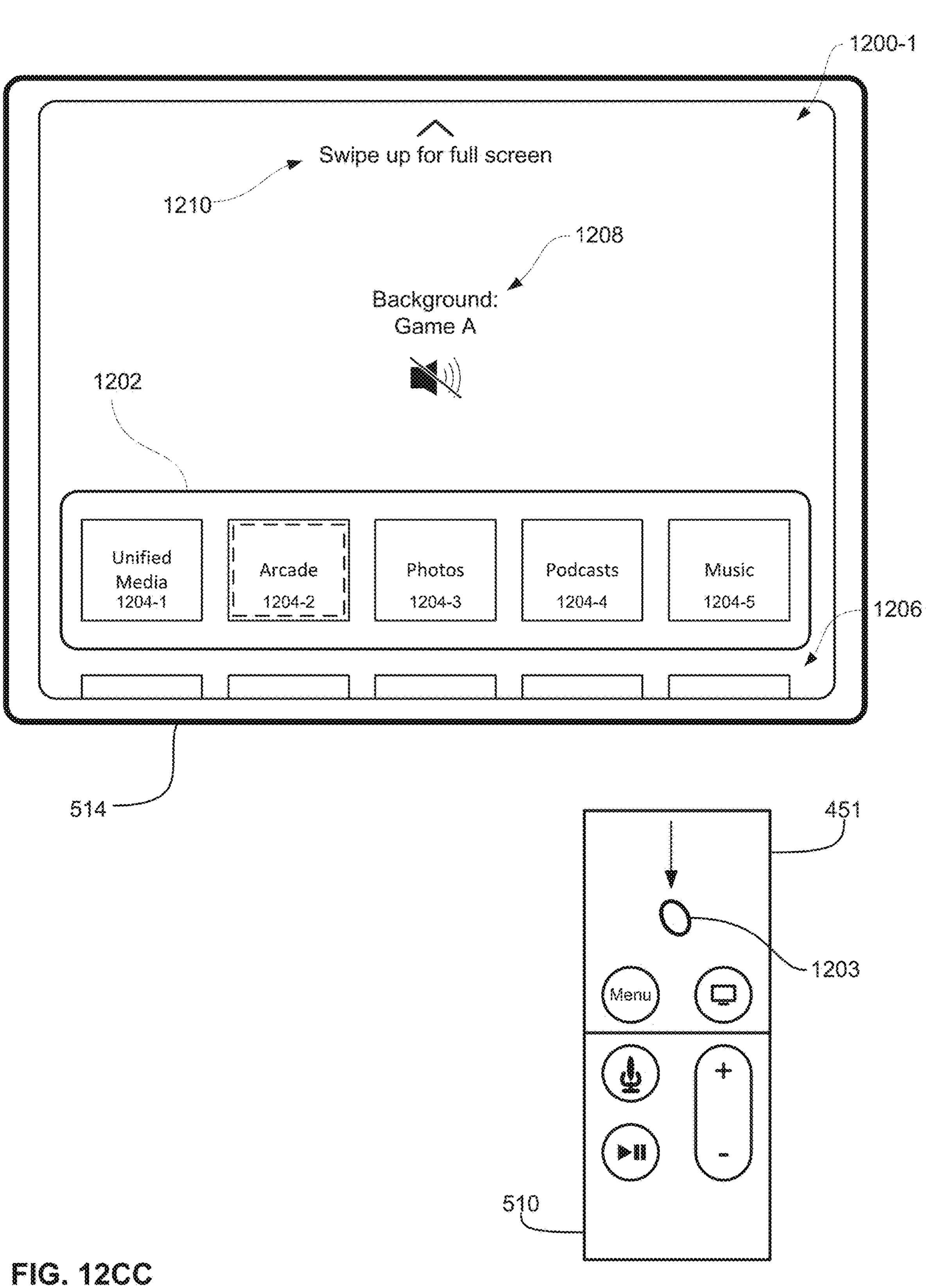
Figure 12D:
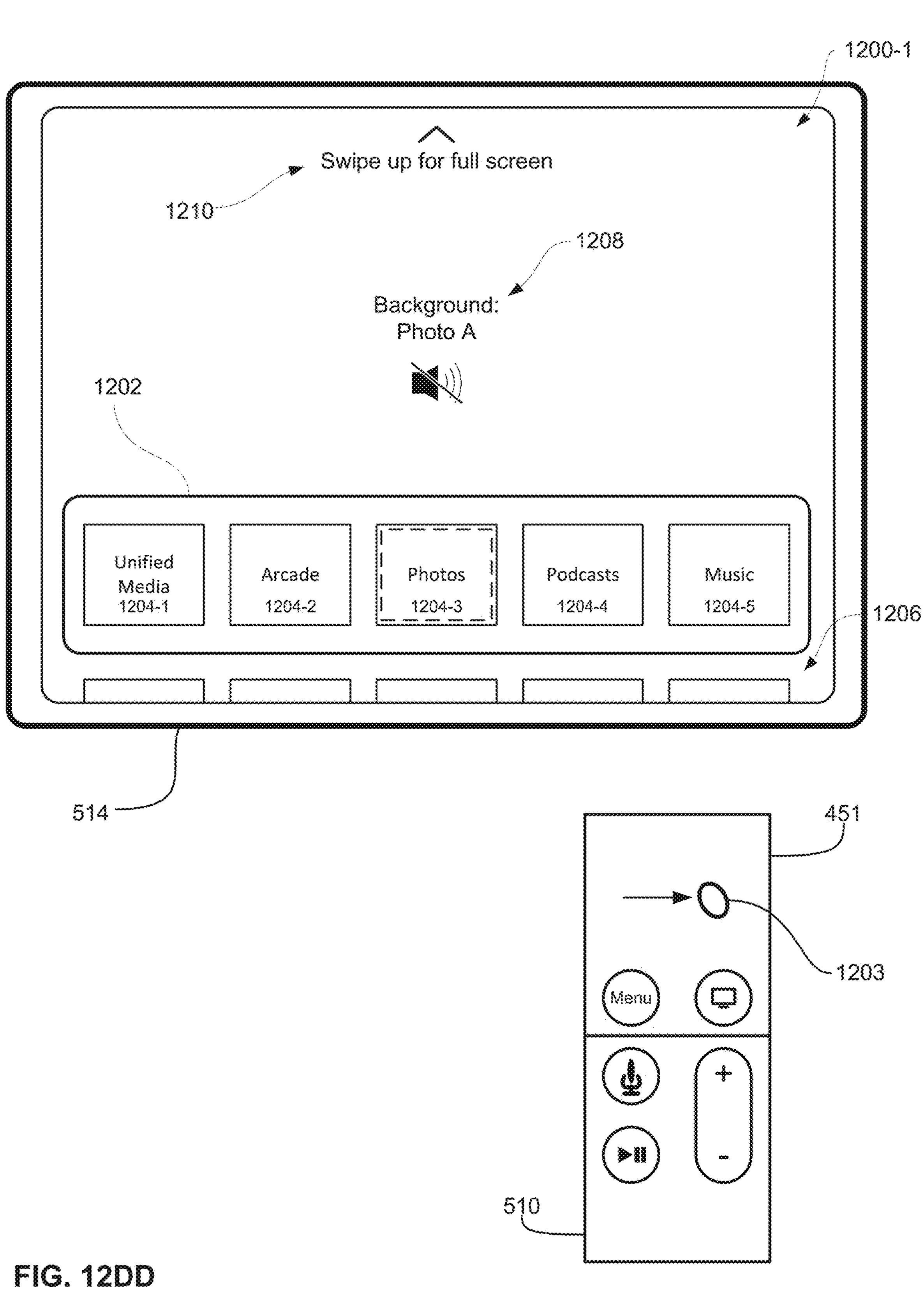
Figure 12E:
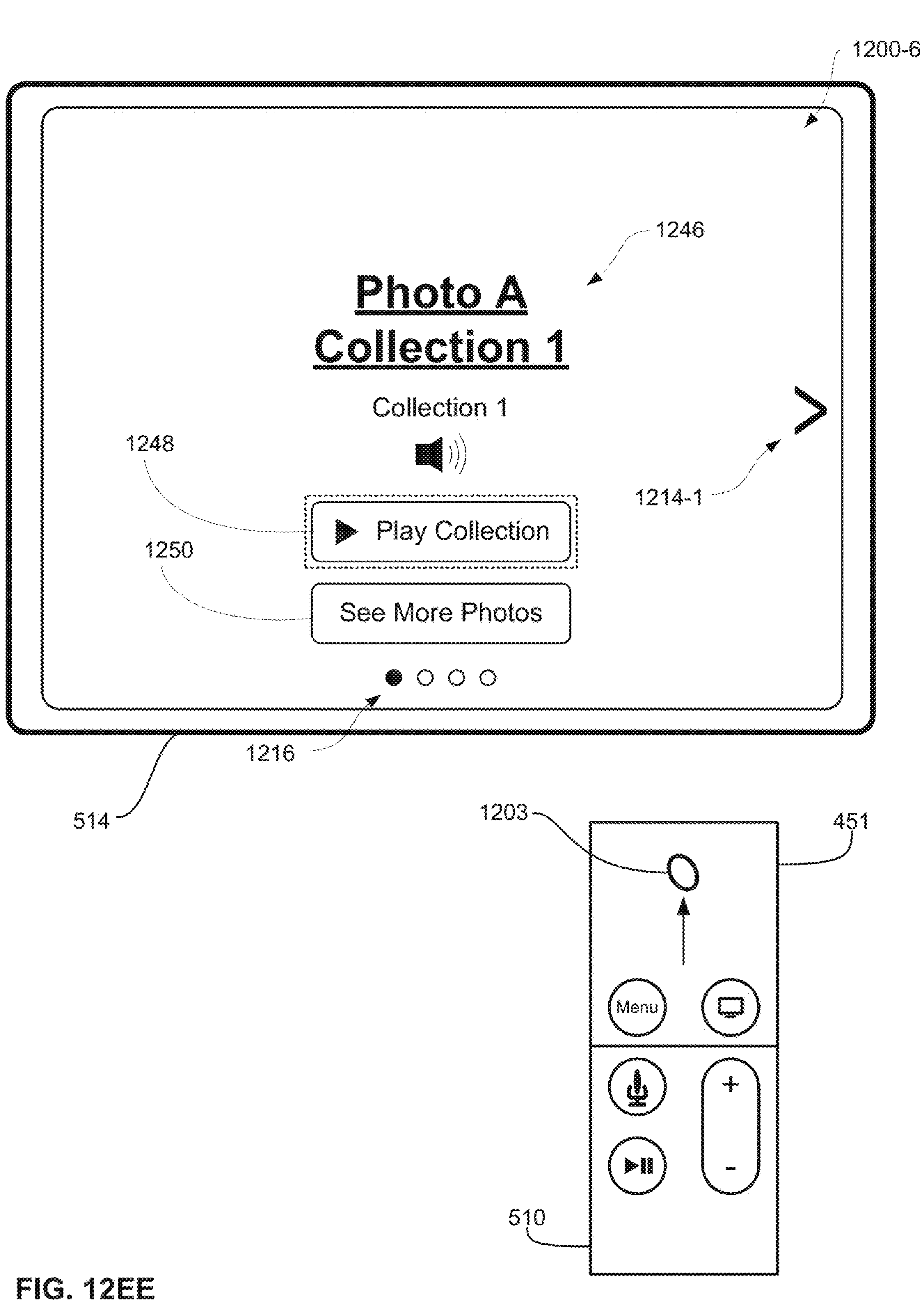
Figure 12F:
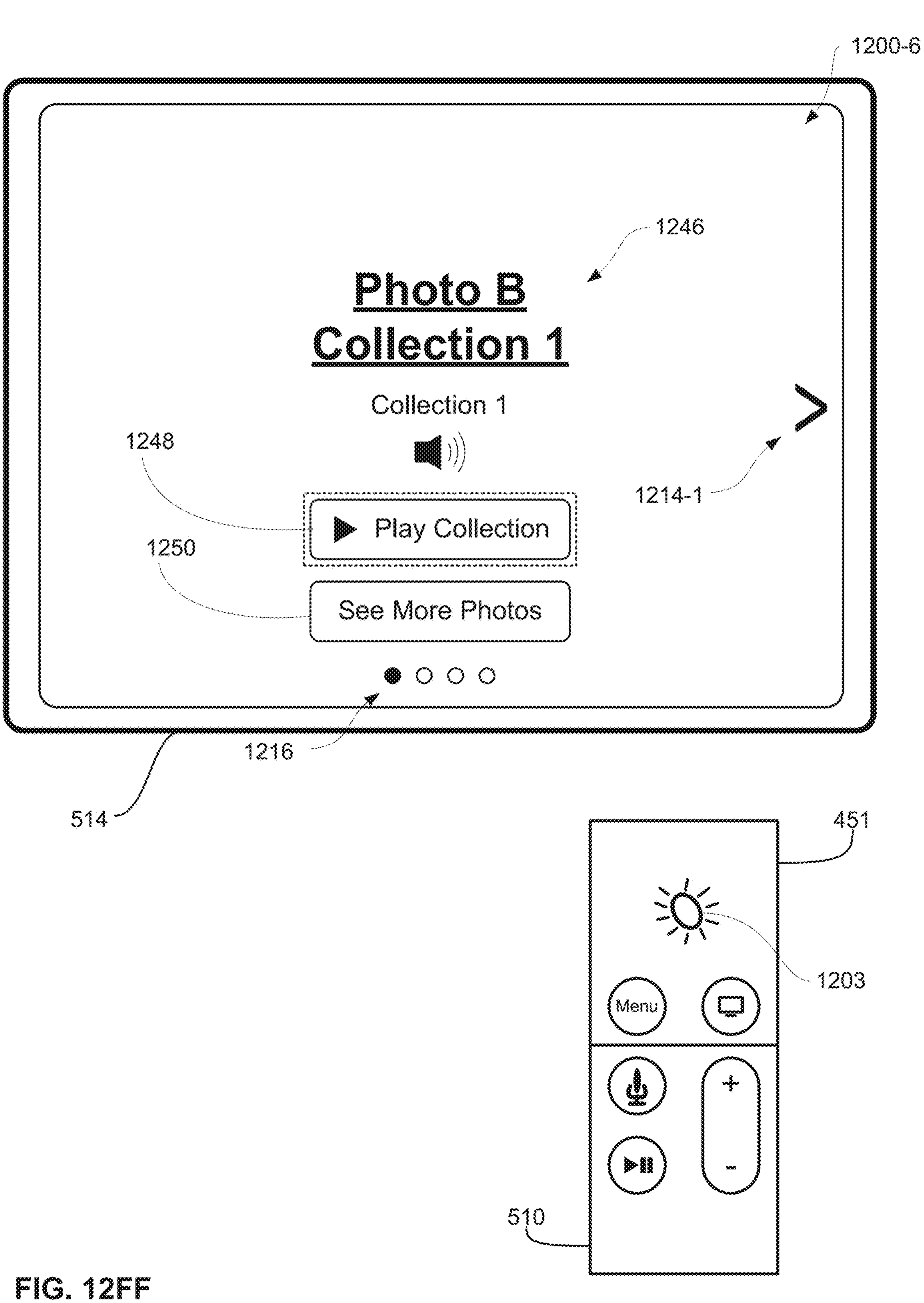
Figure 12G:
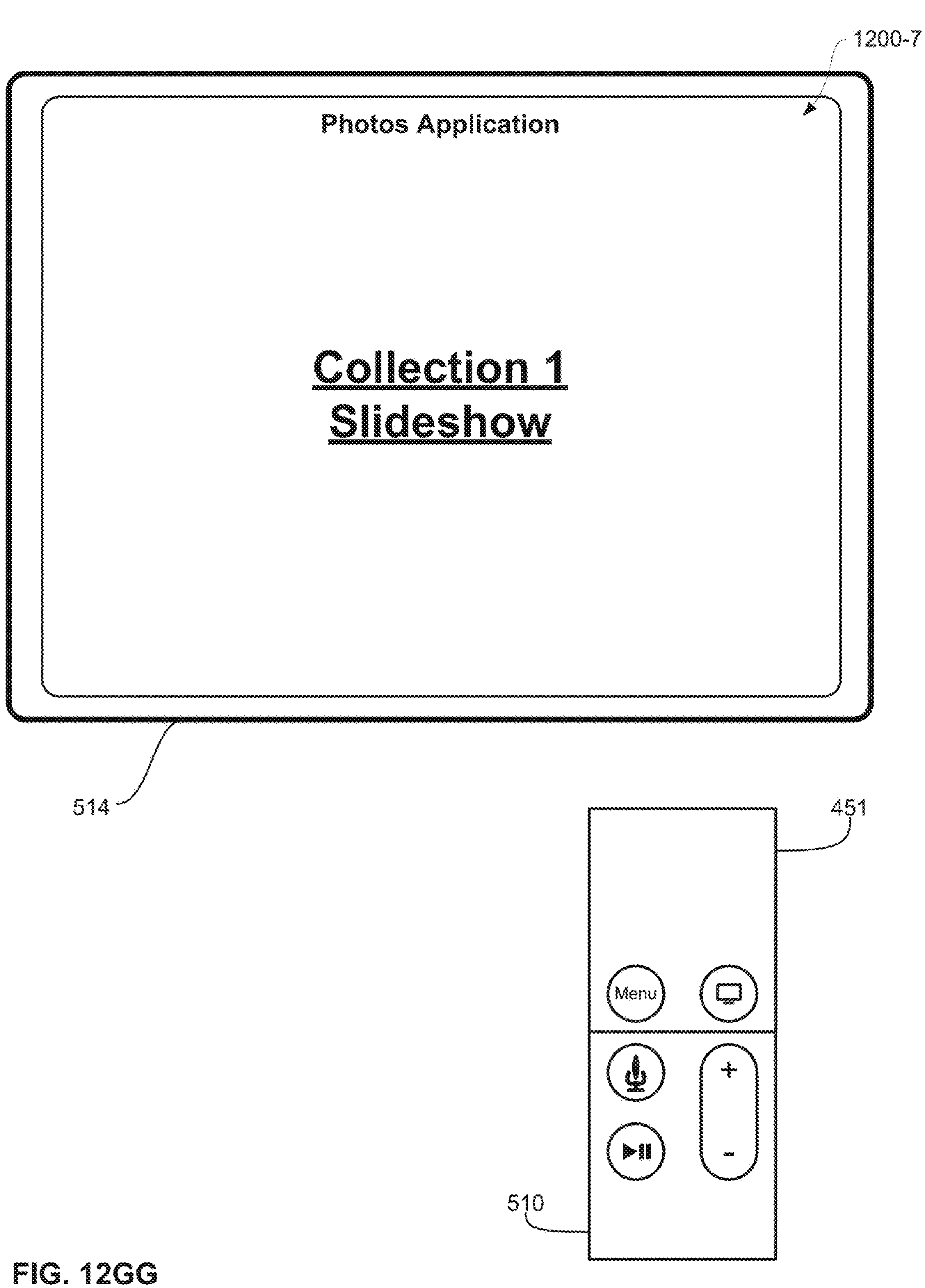
Figure 12H:
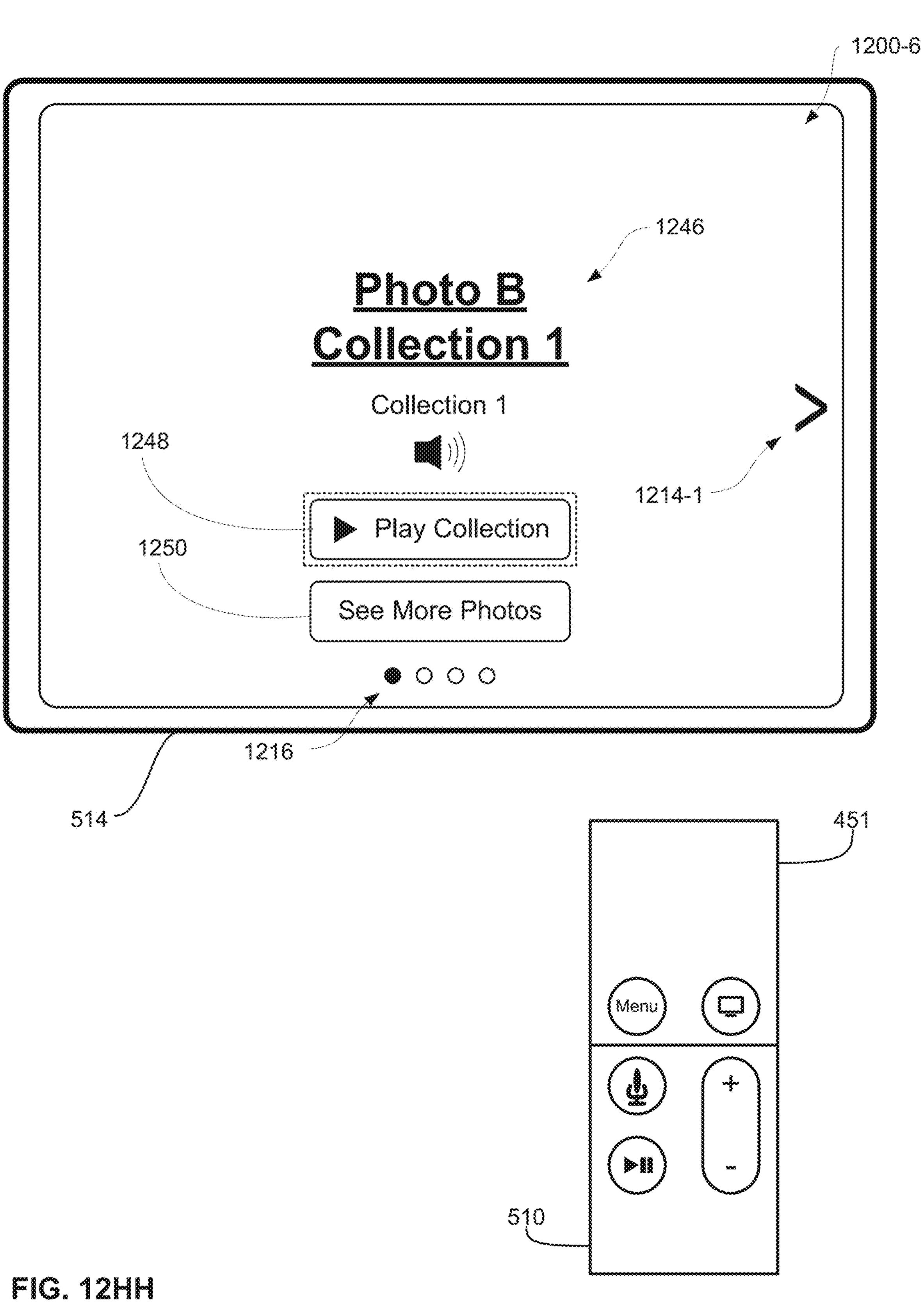
Figure 12I:
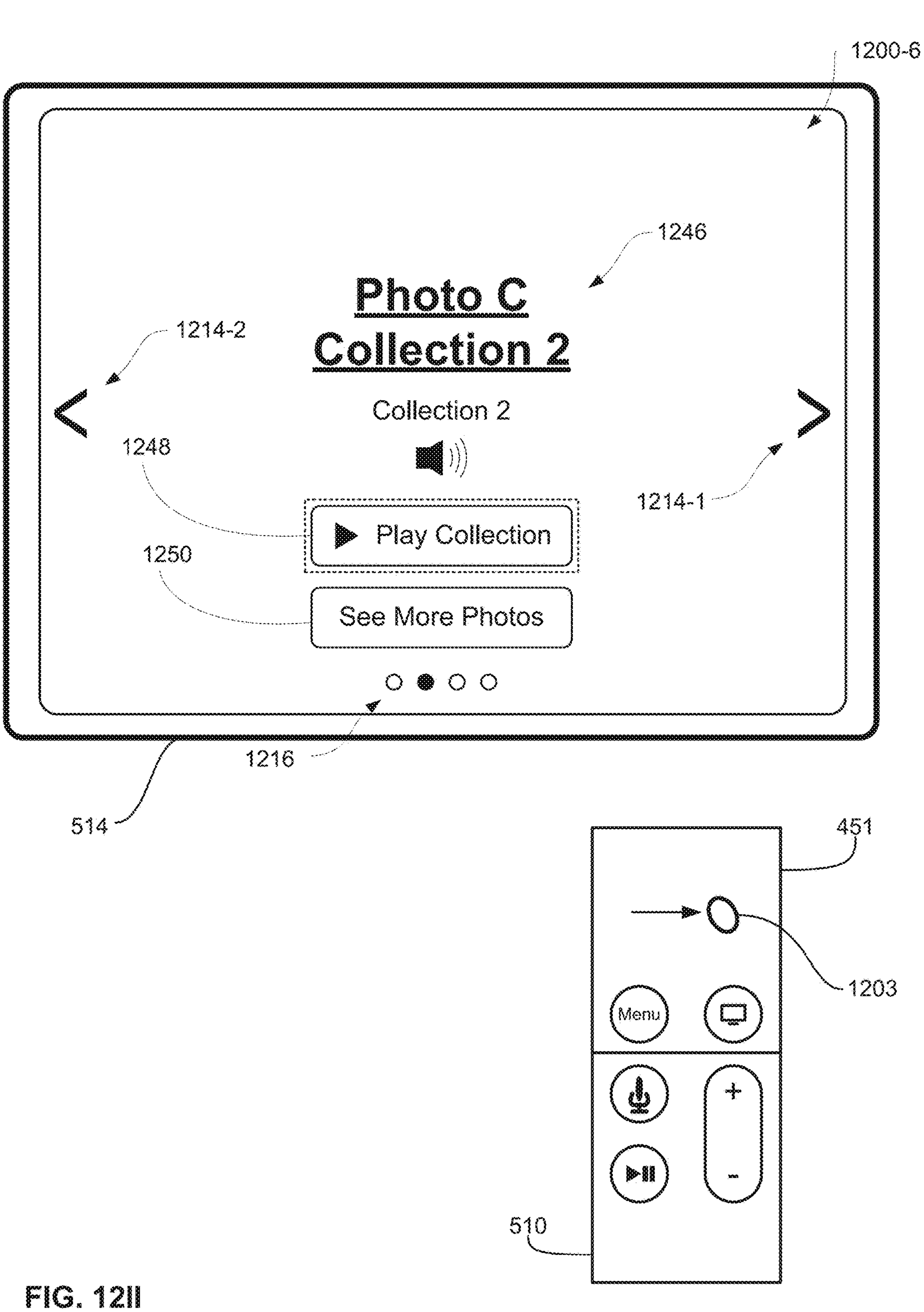
Figure 12J:
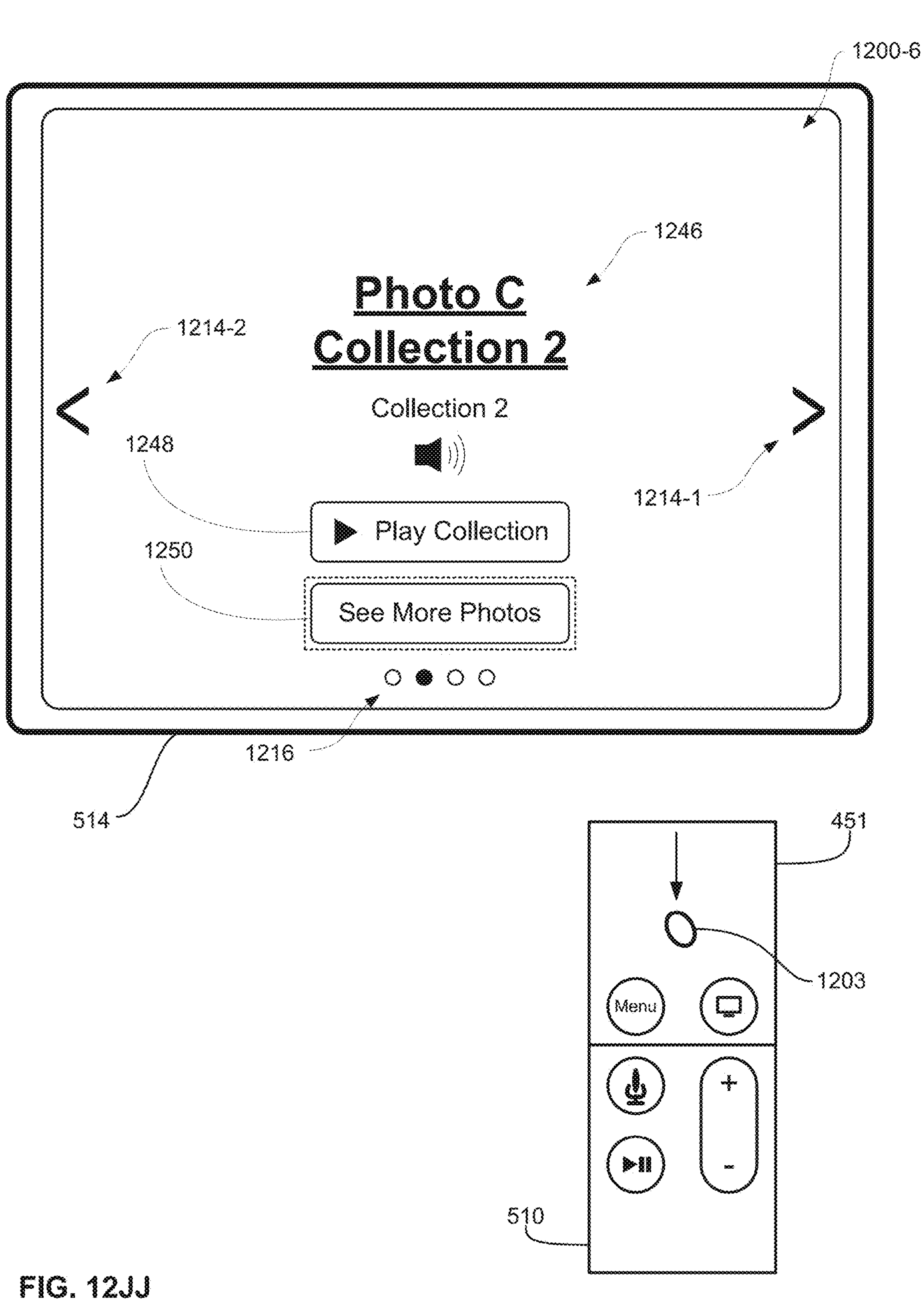
Figure 12K:
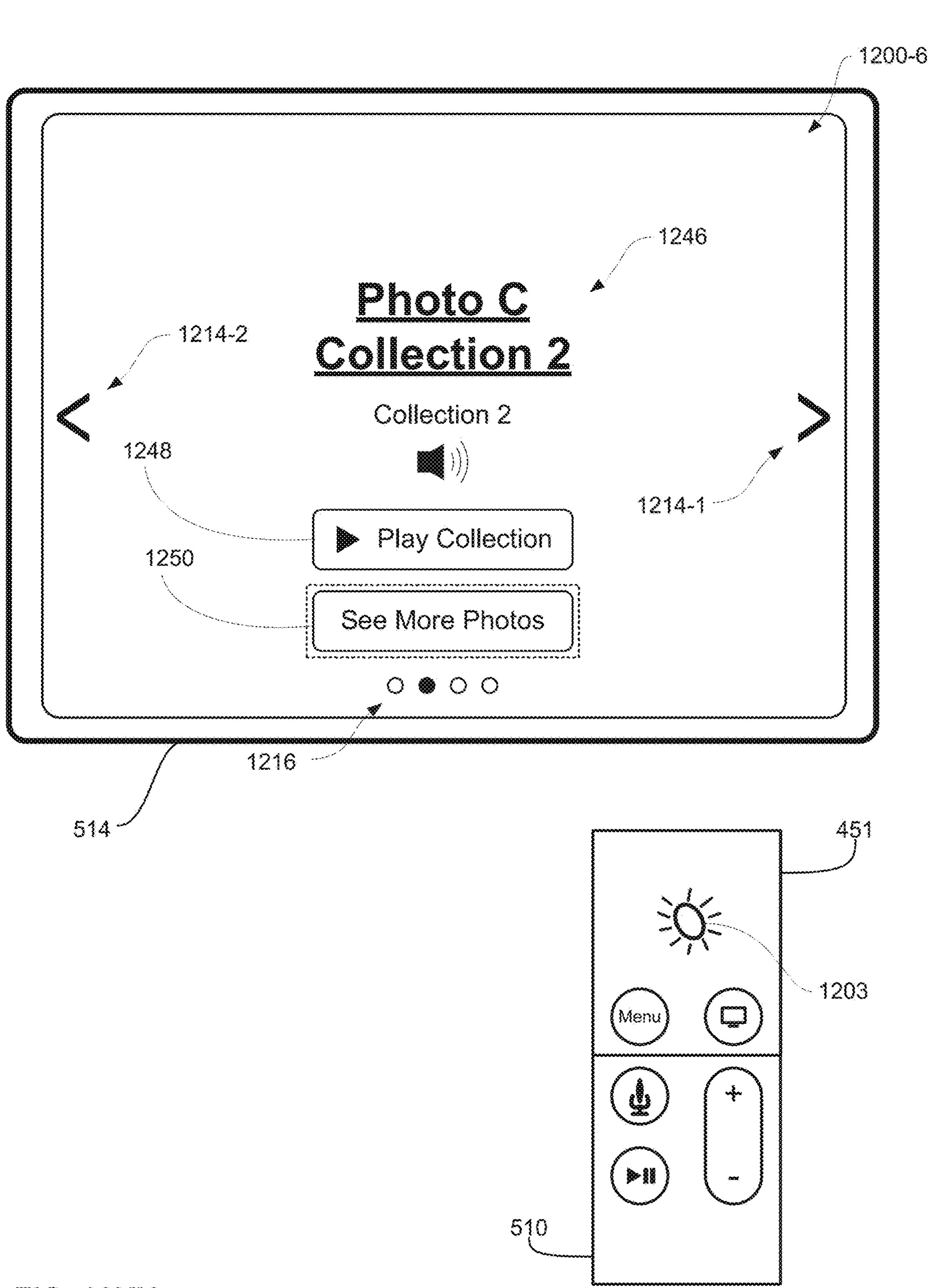
Figure 12L:
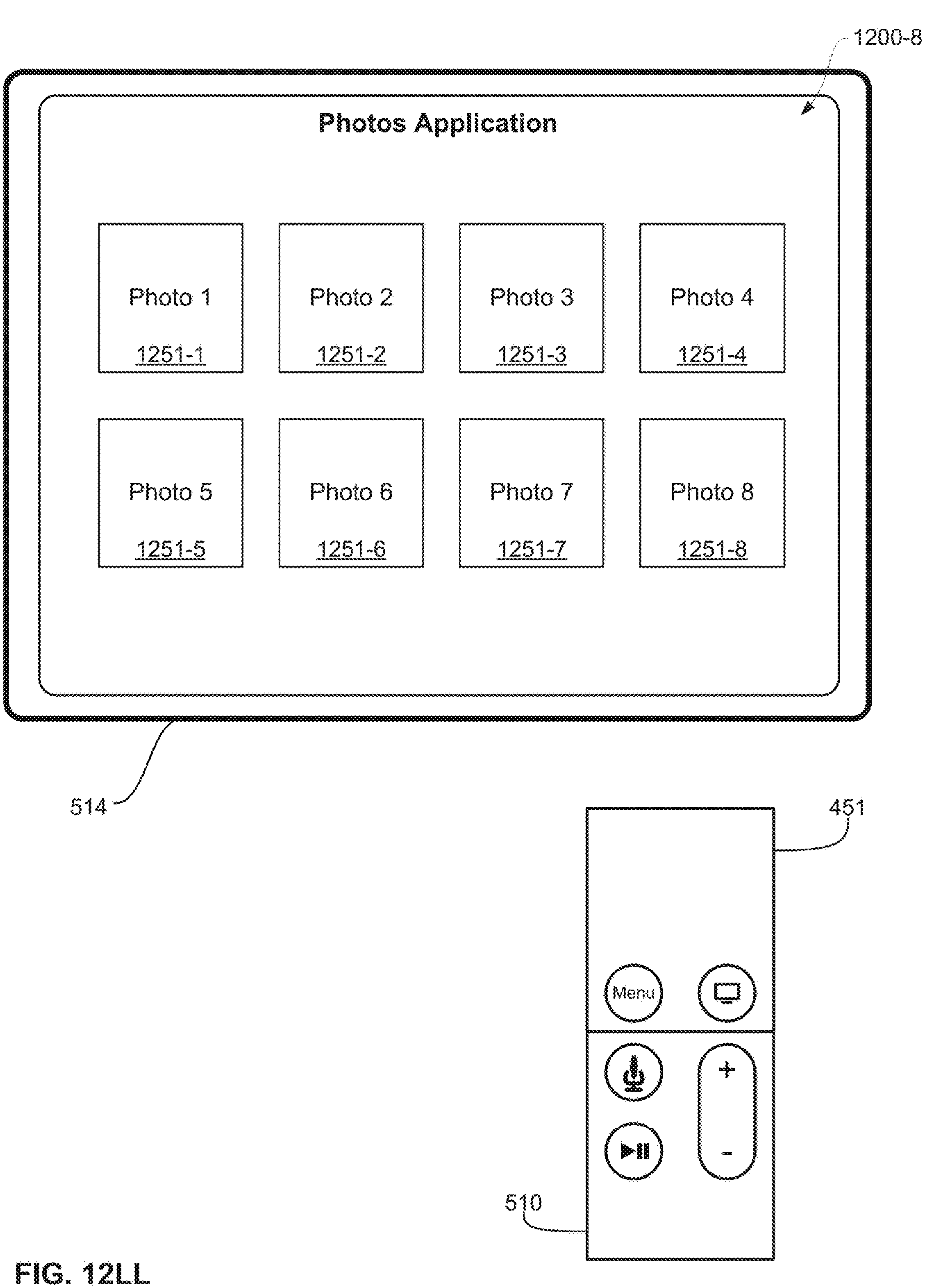
Figure 12M:
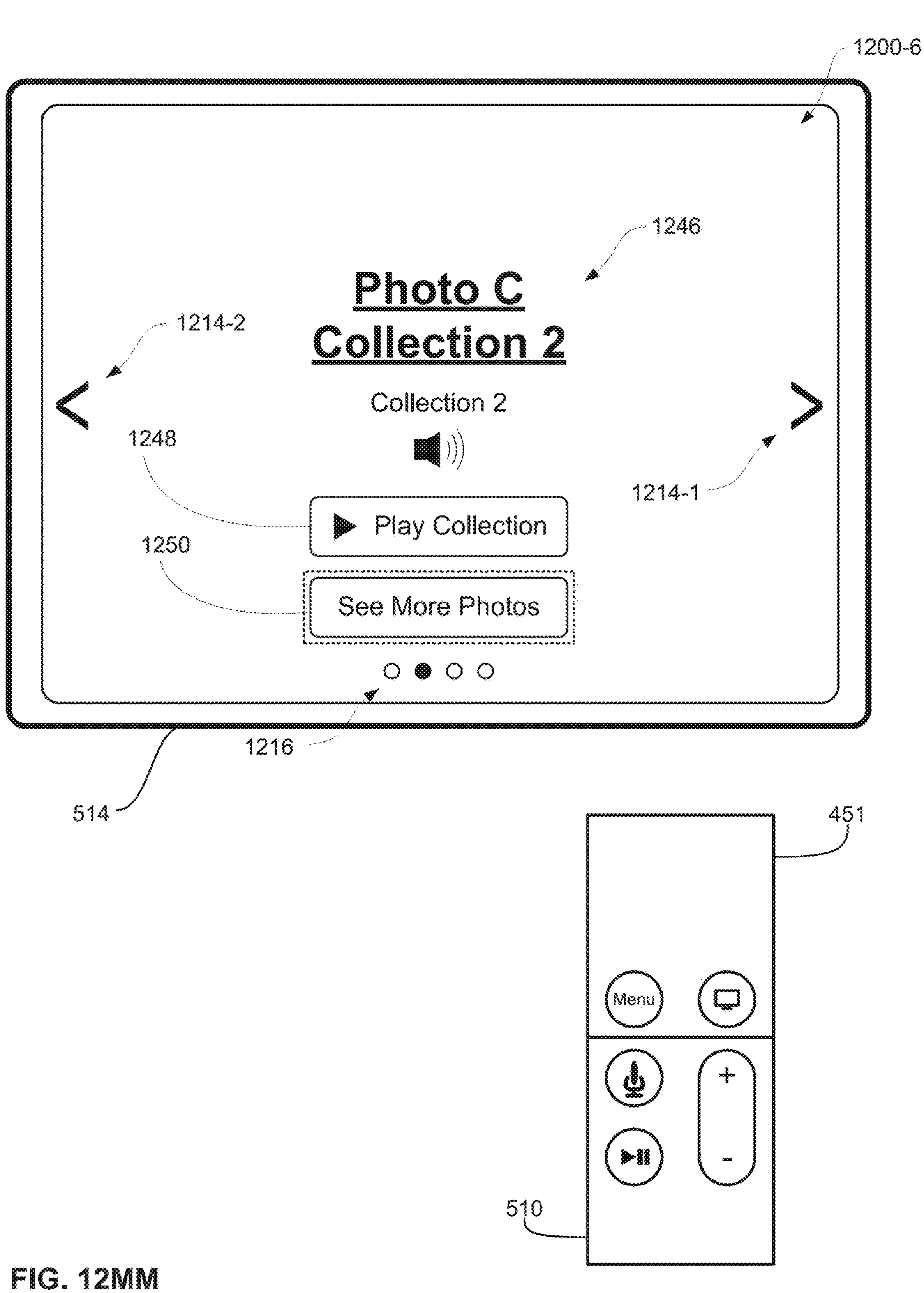
Figure 12N:
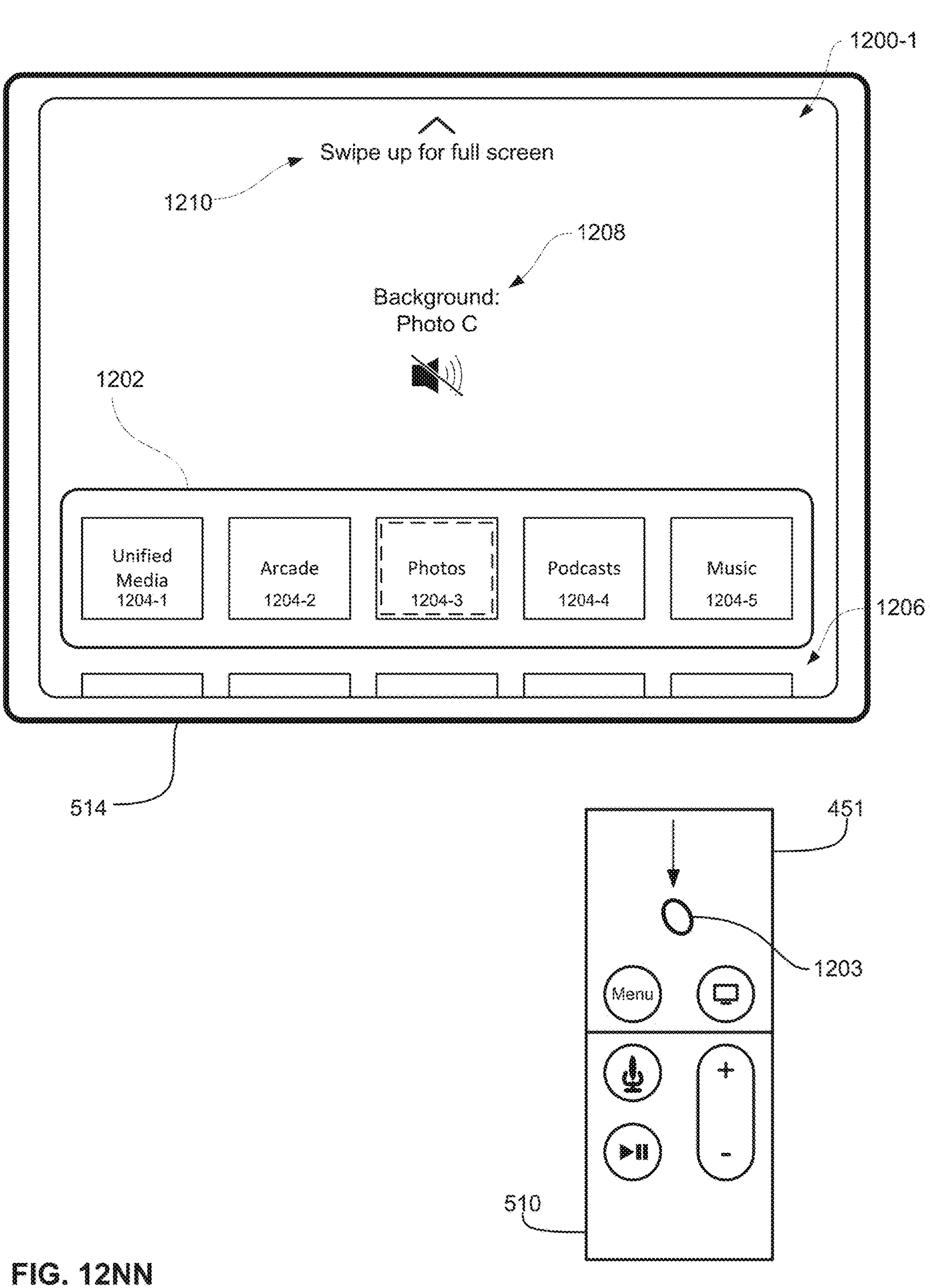
Figure 12O:
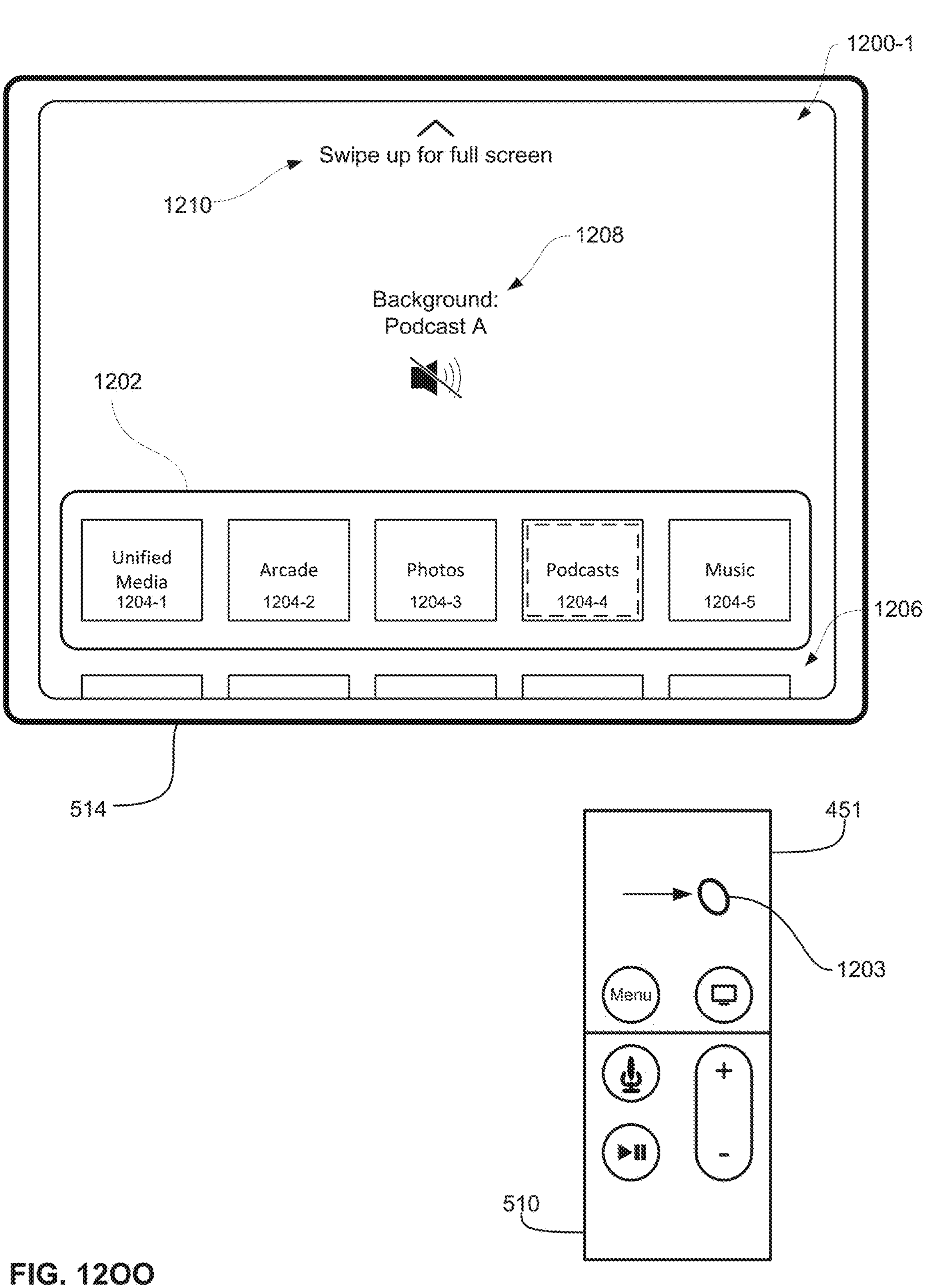
Figure 12P:
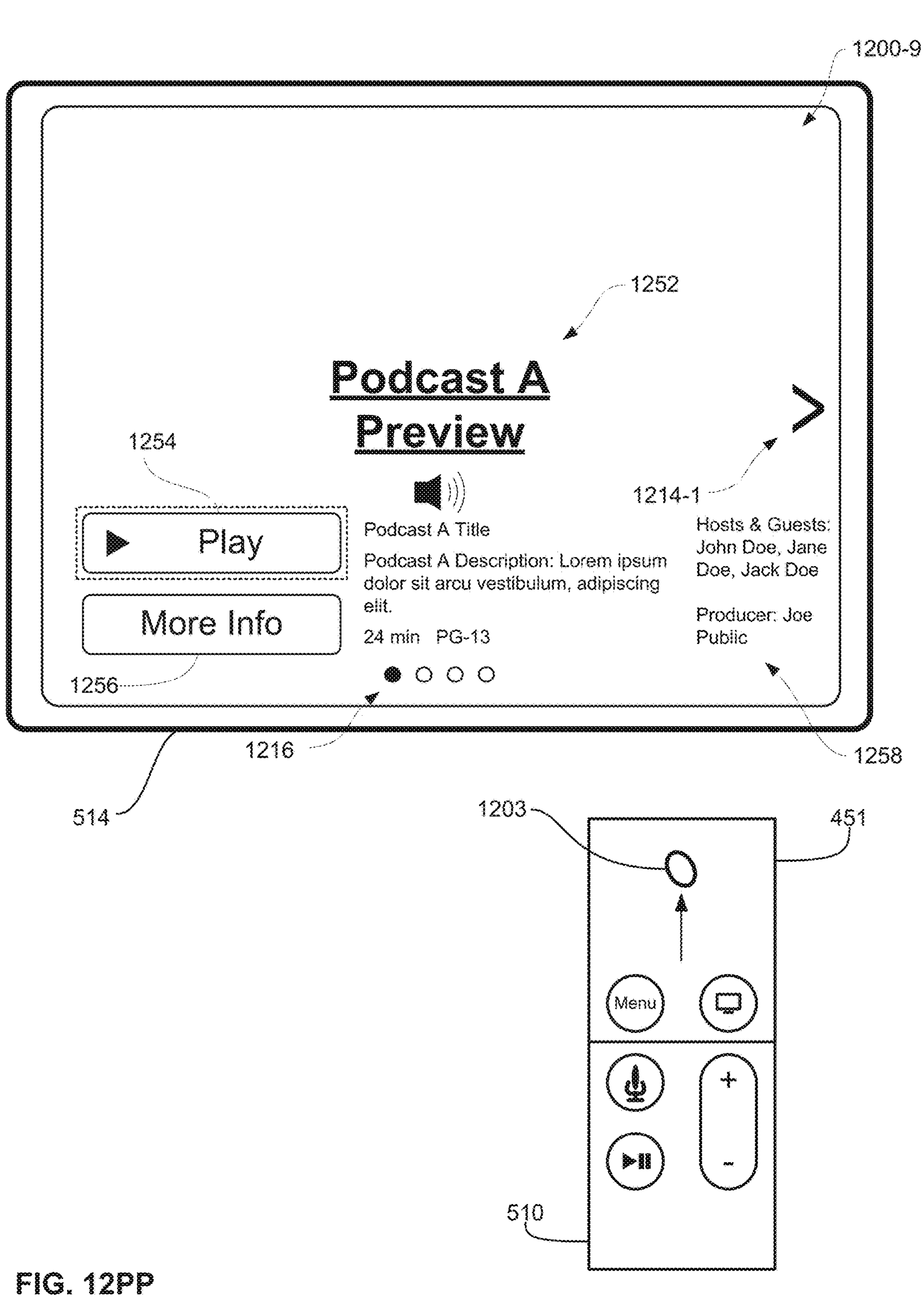
Figure 12Q:
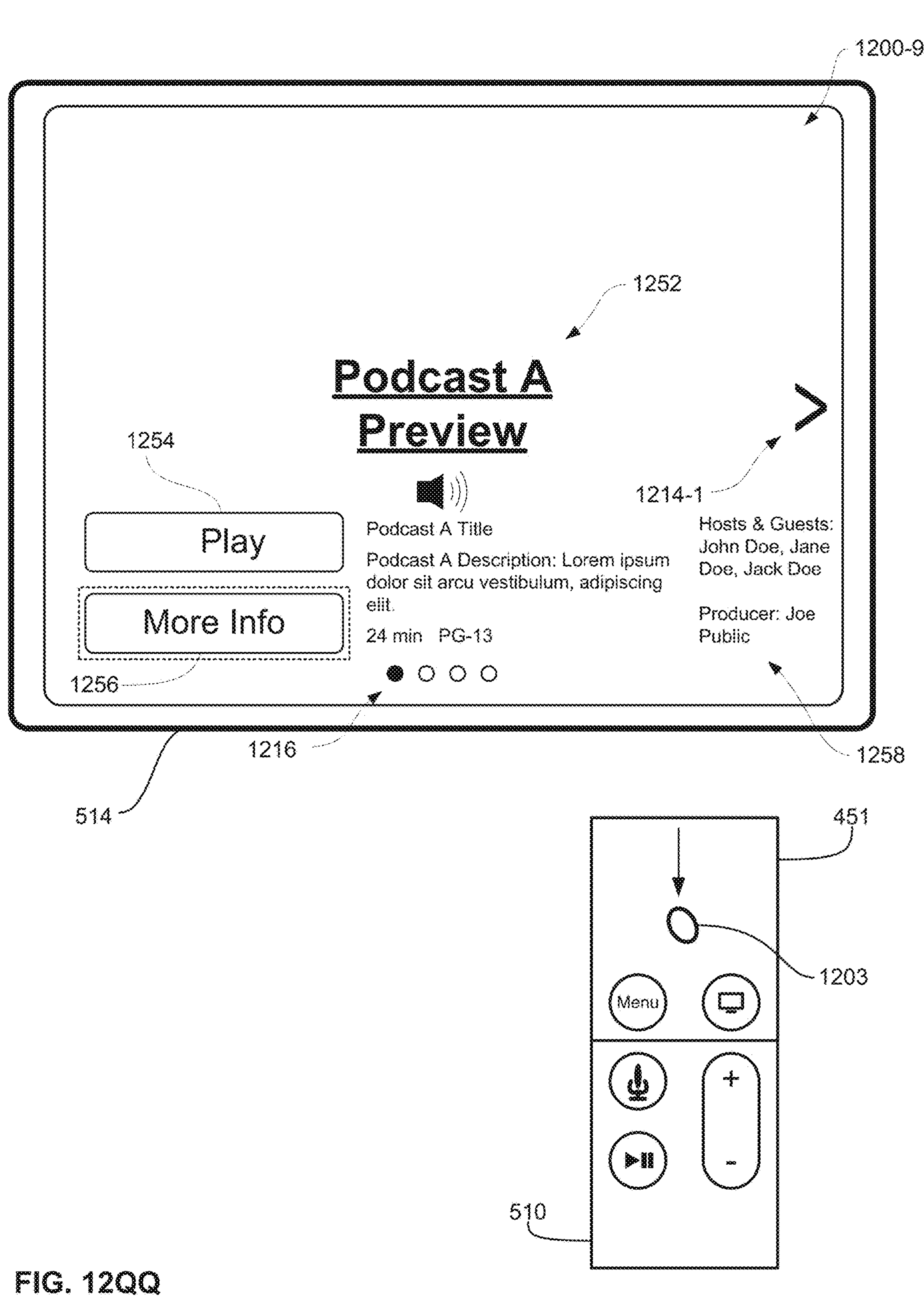
Figure 12R:
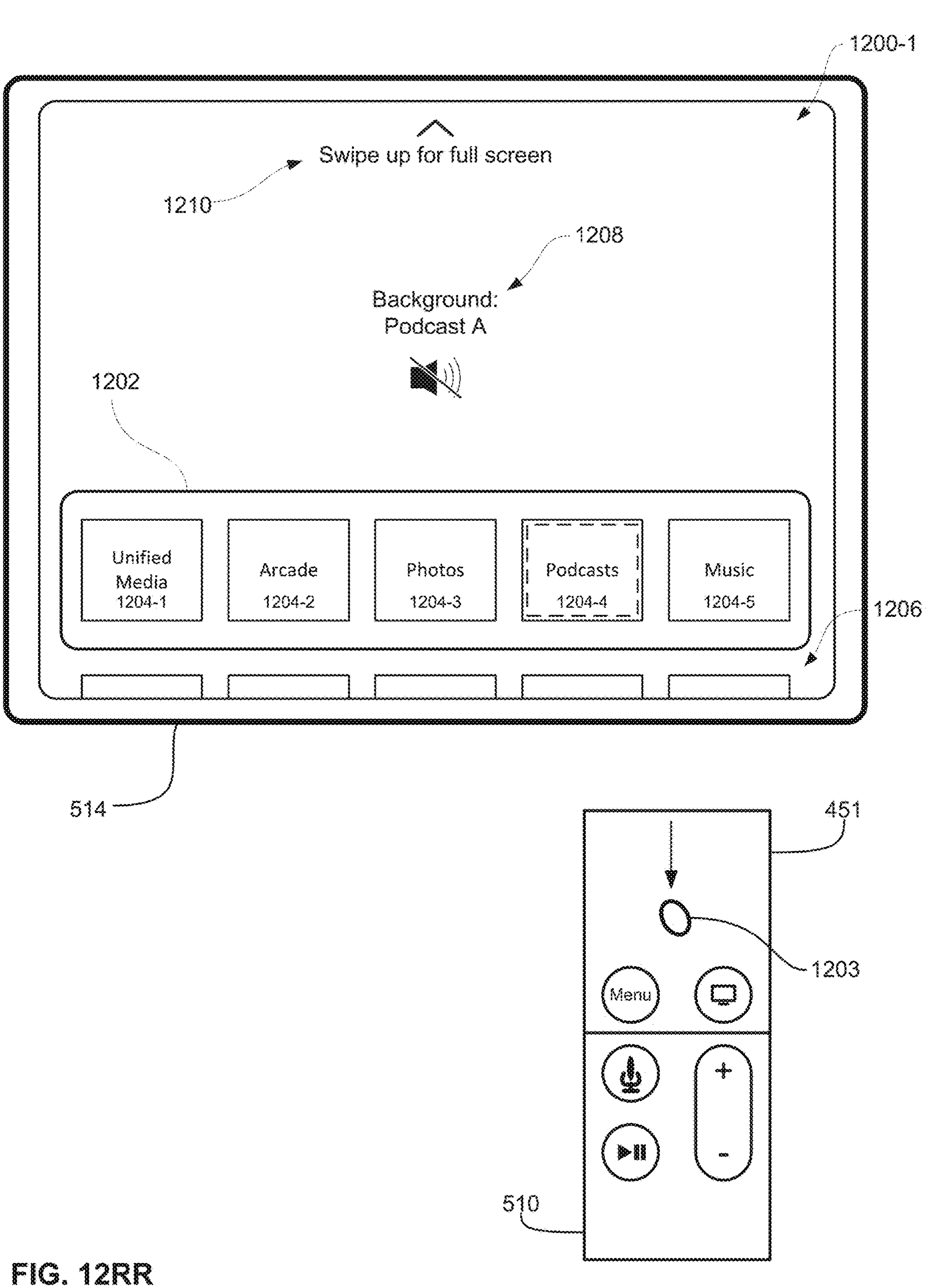
Figure 12S:
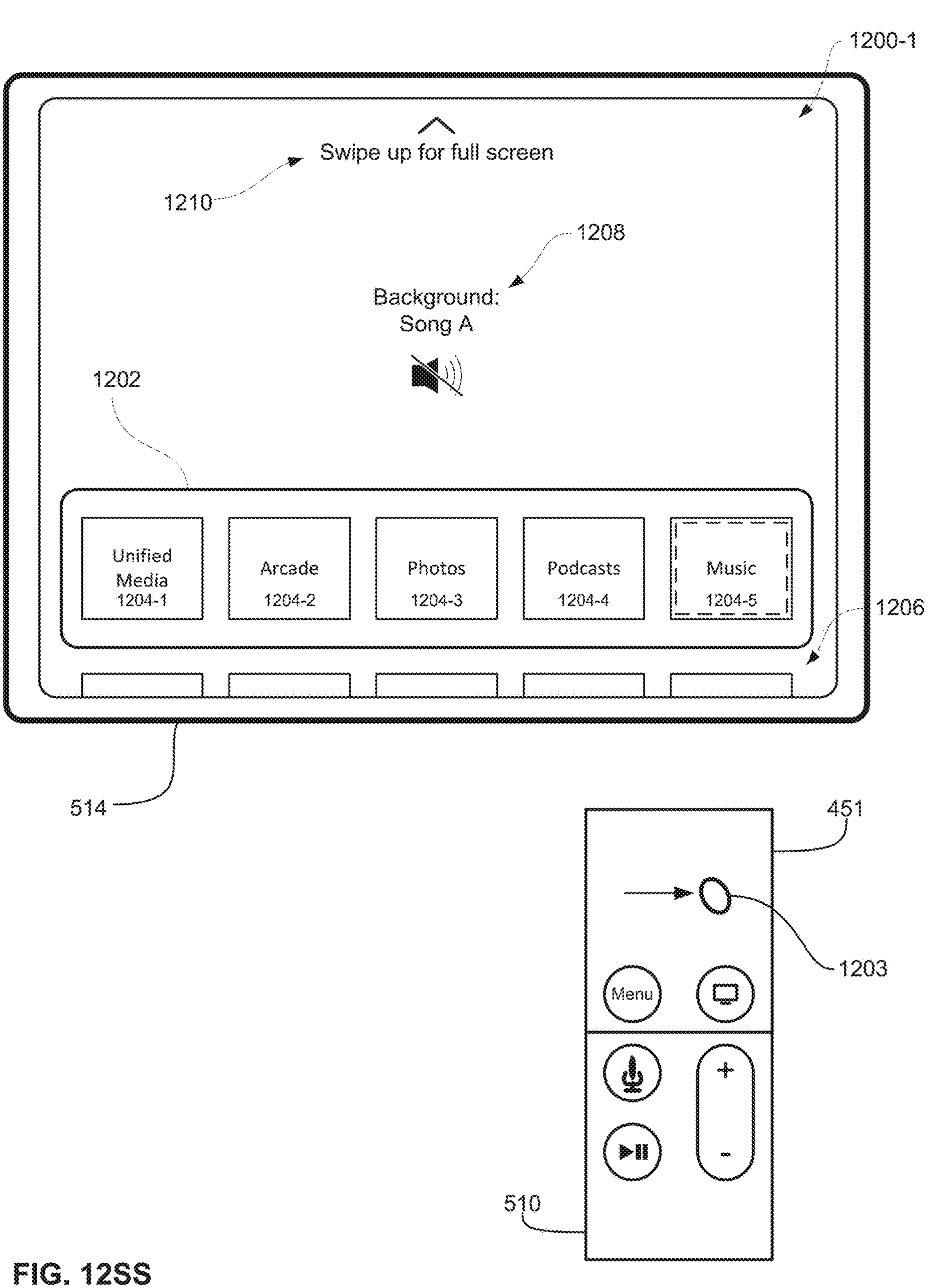
Figure 12T:
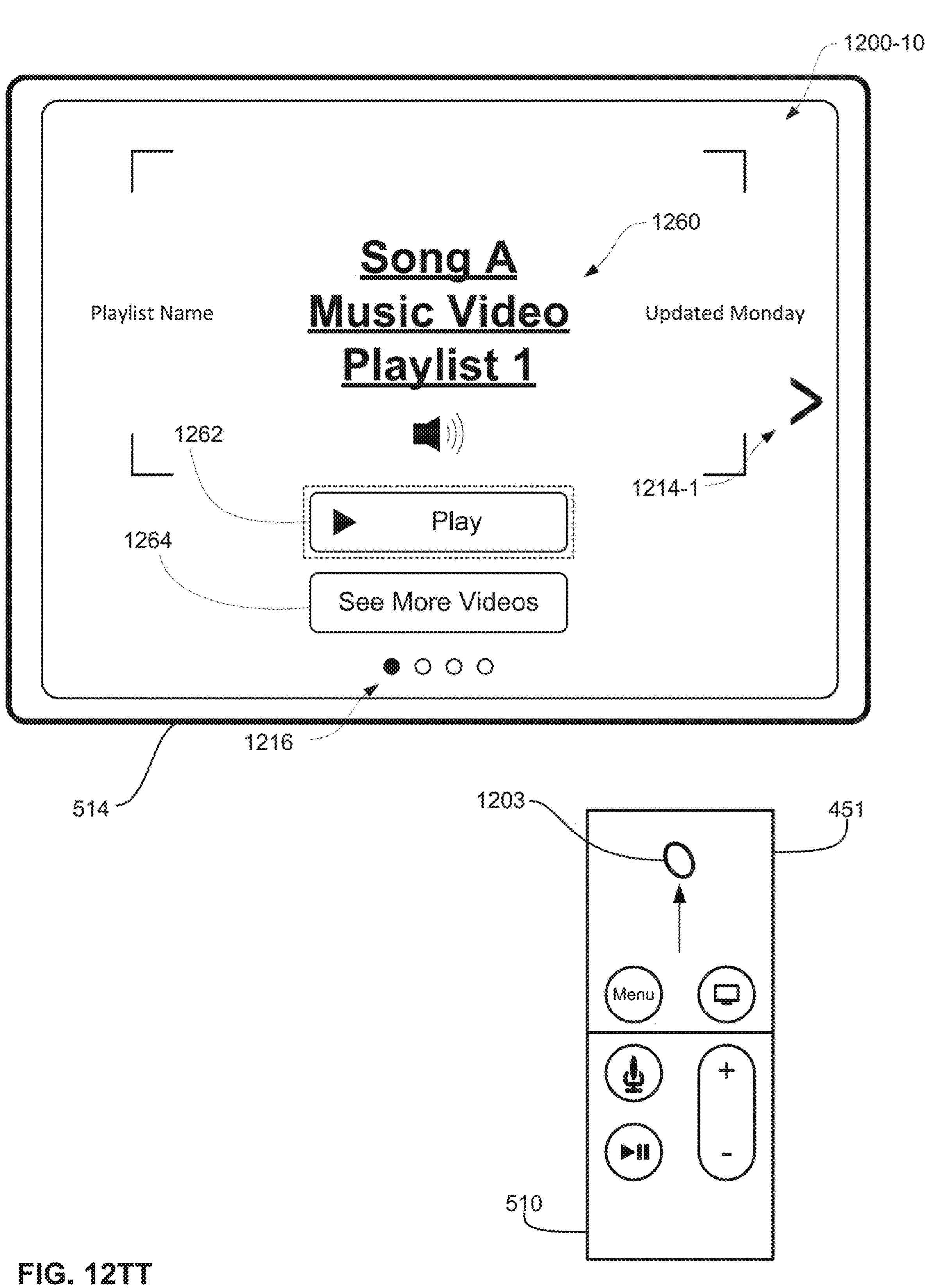
Figure 12U:
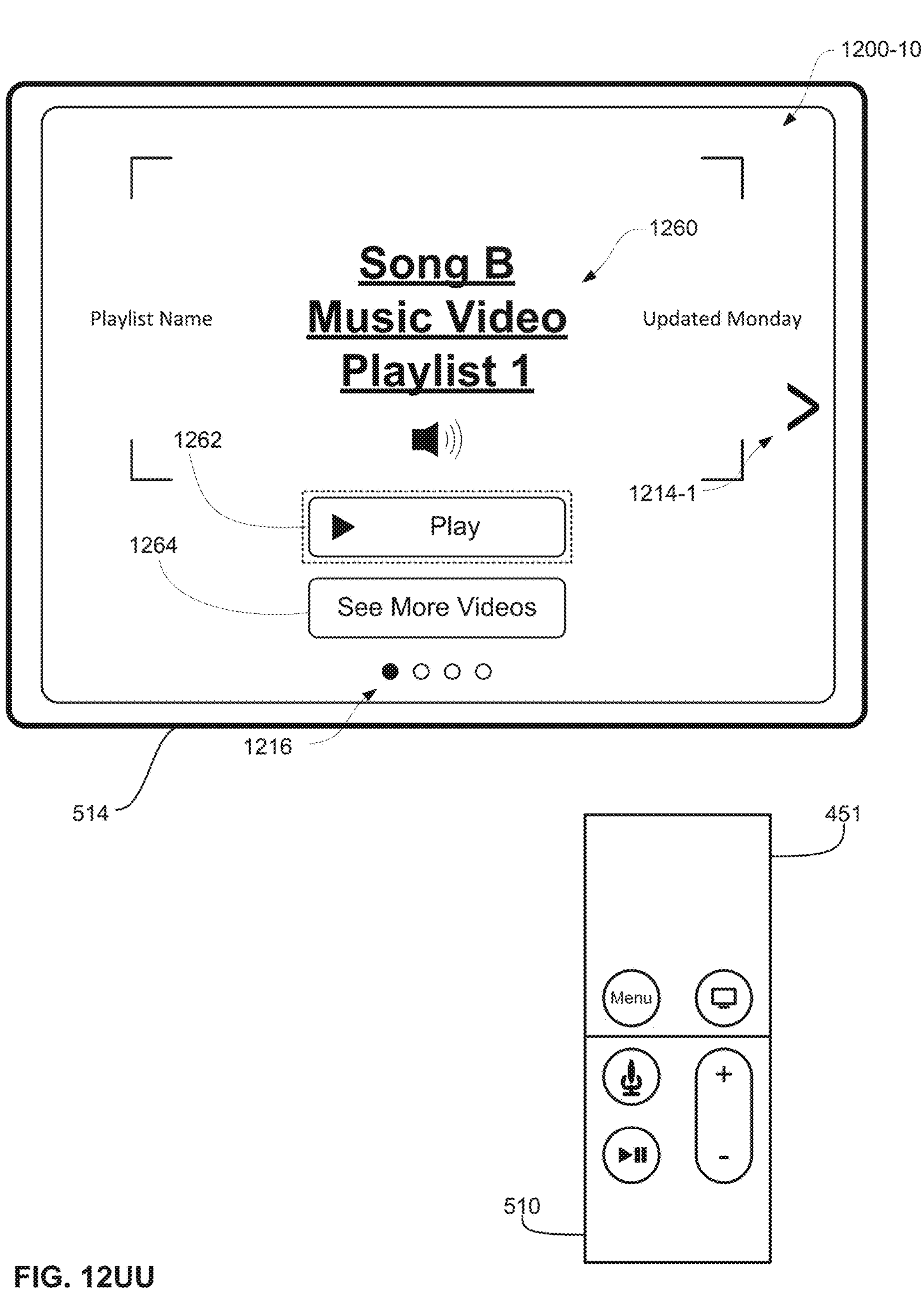
Figure 12V:
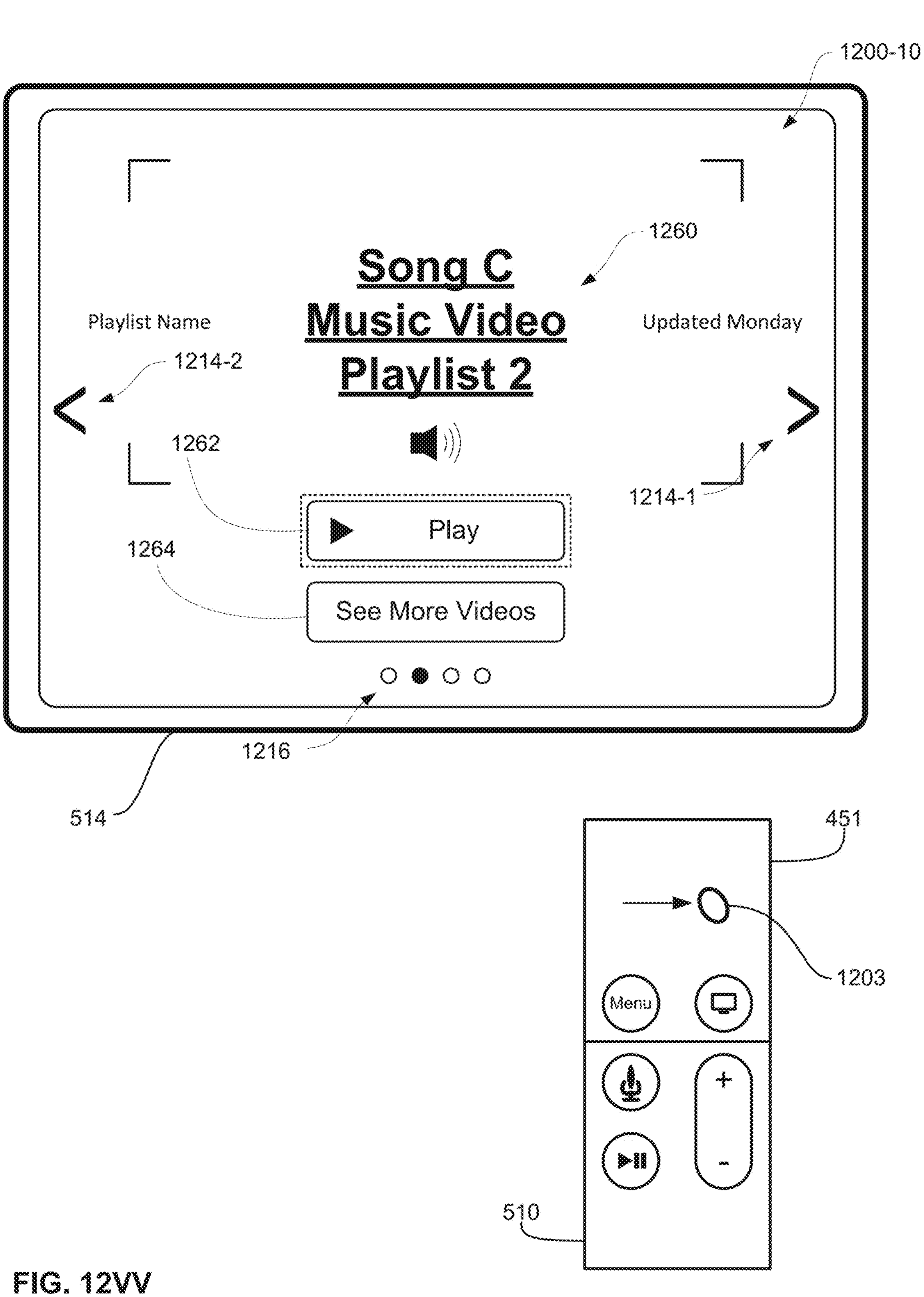
Figure 12W:
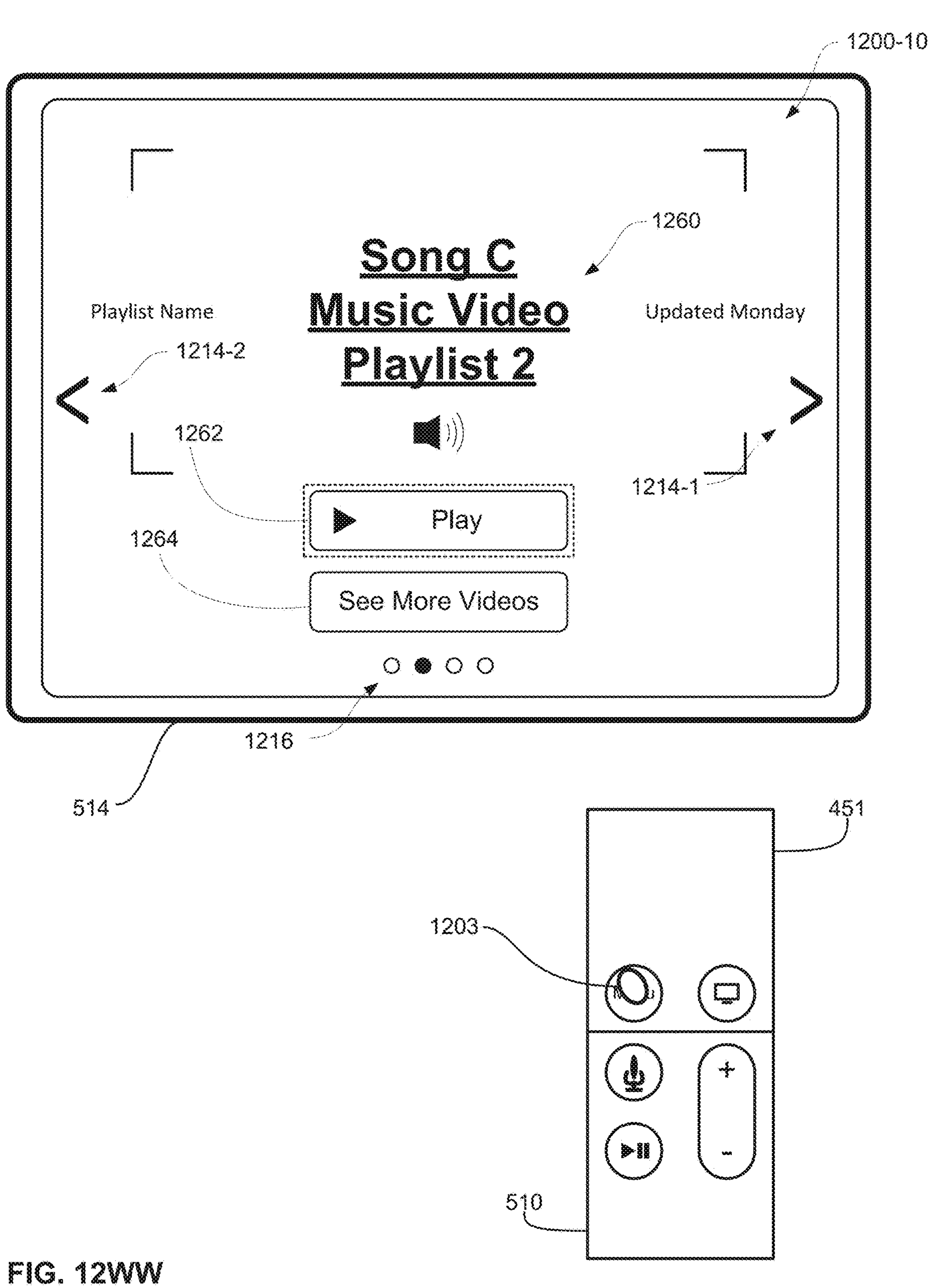
Figure 12X:
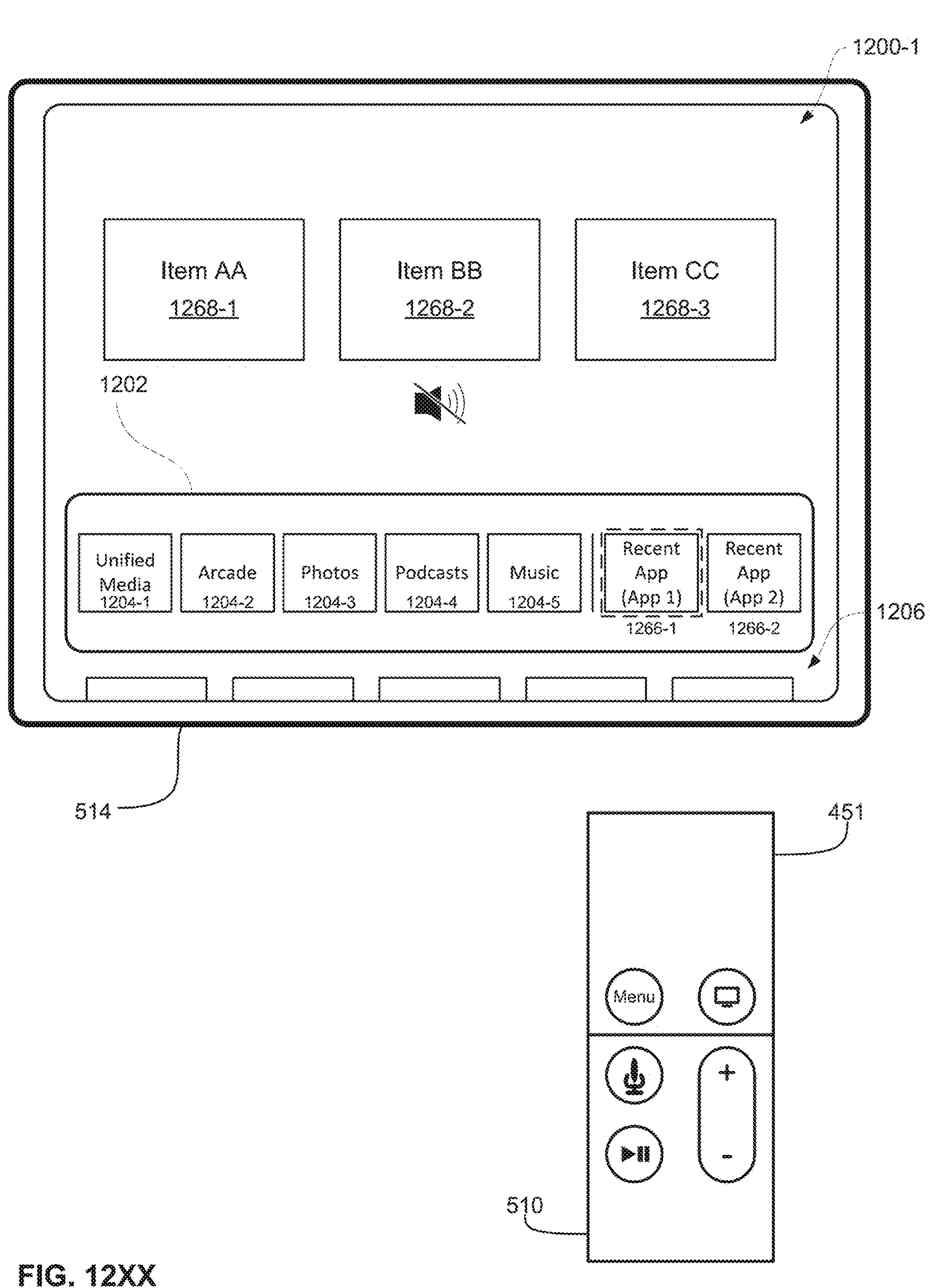
Figure 12Y:
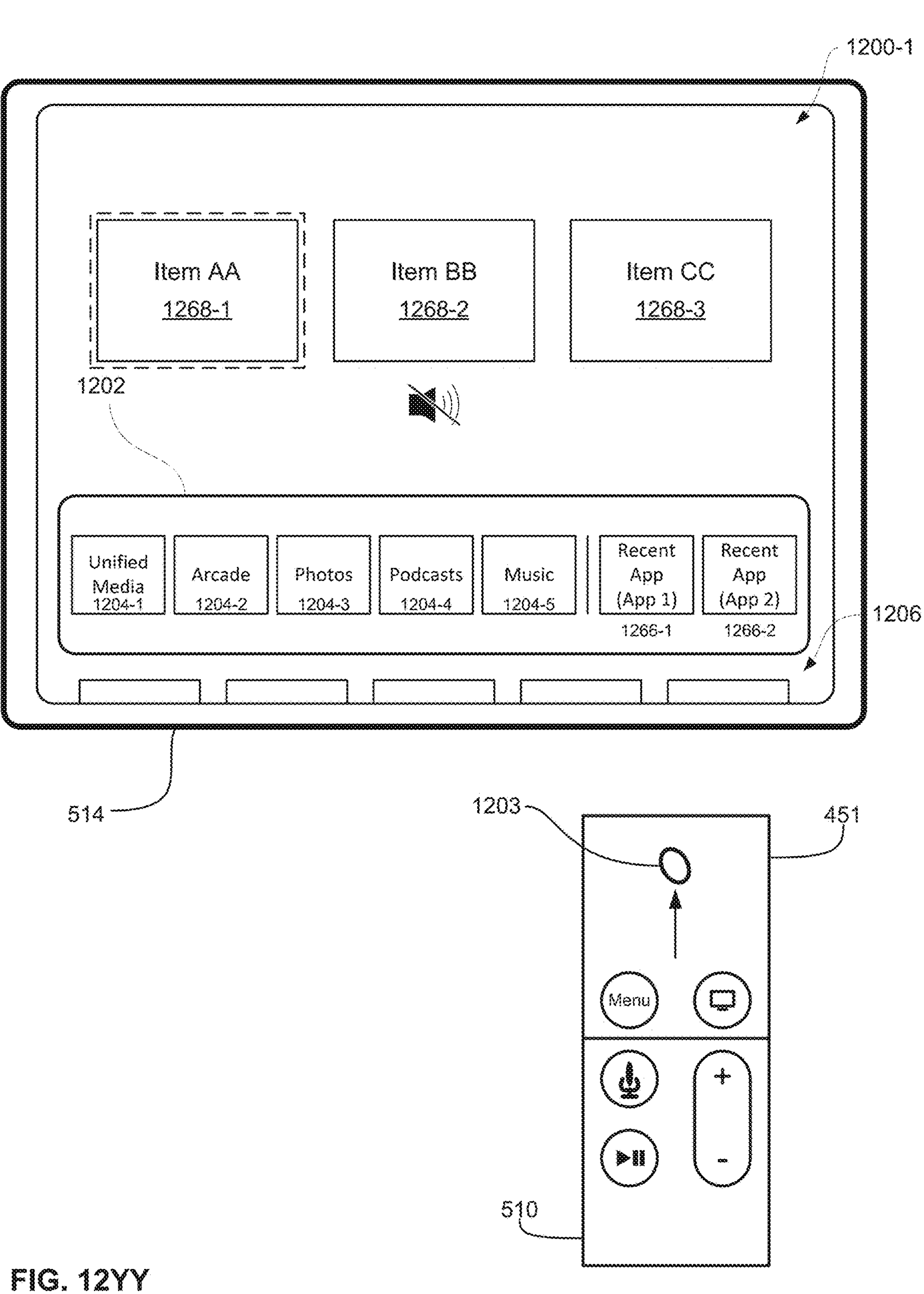
Figure 12Z:
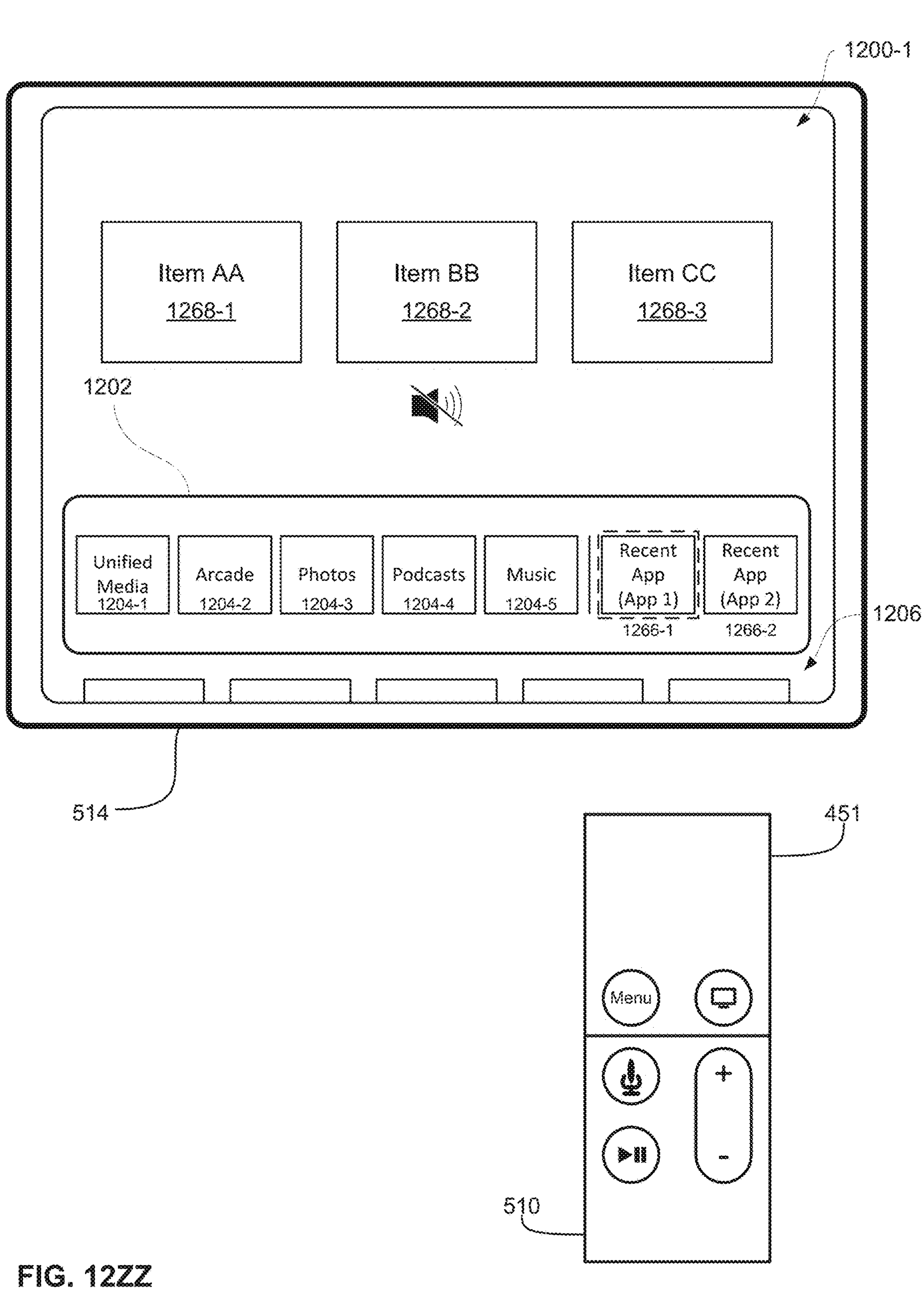
Figure 13A:
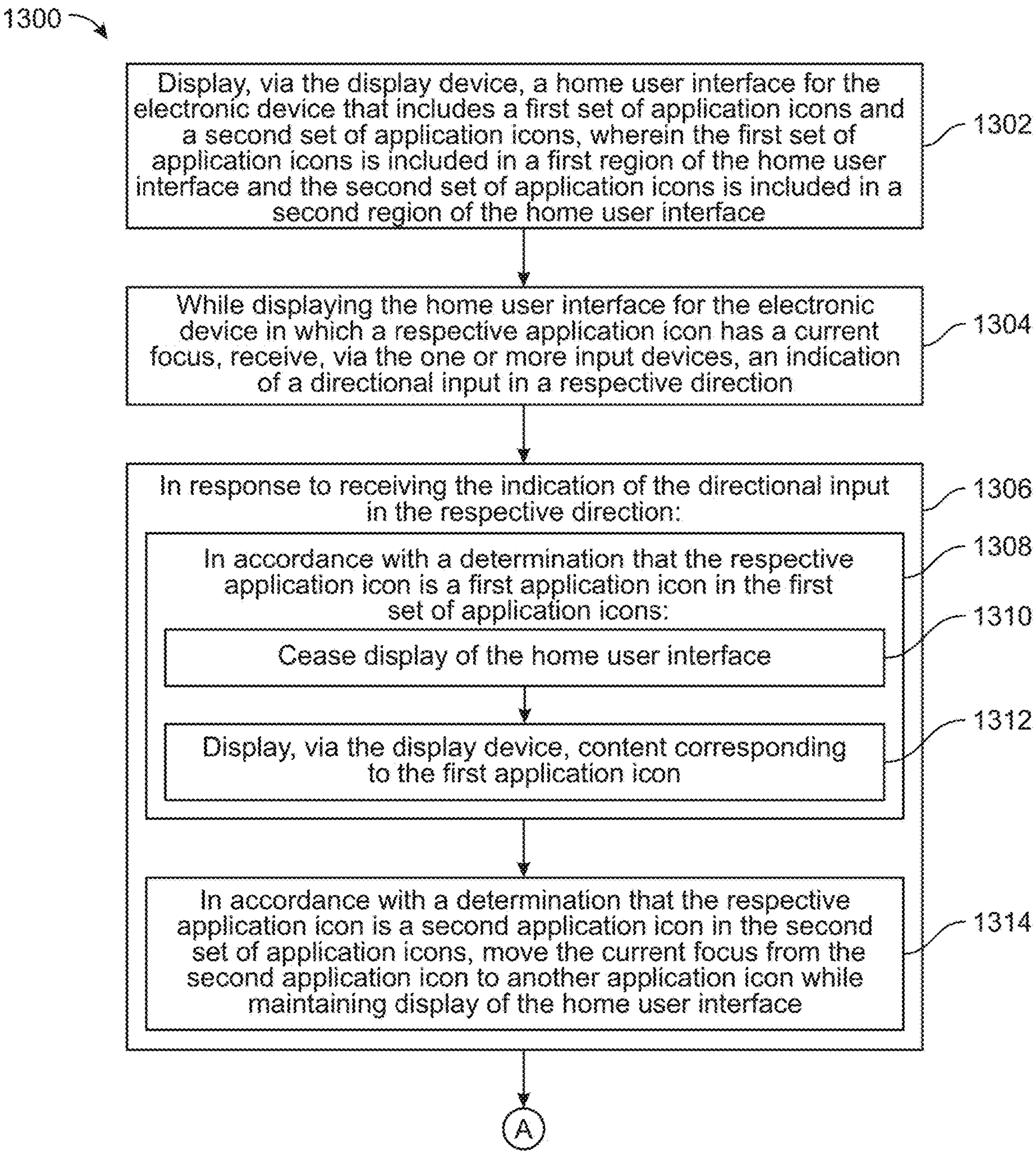
FIGS. 13A-13L are flow diagrams illustrating a method of presenting enhanced previews of items of content available via respective applications on the electronic device in accordance with some embodiments of the disclosure.
Figure 13B:
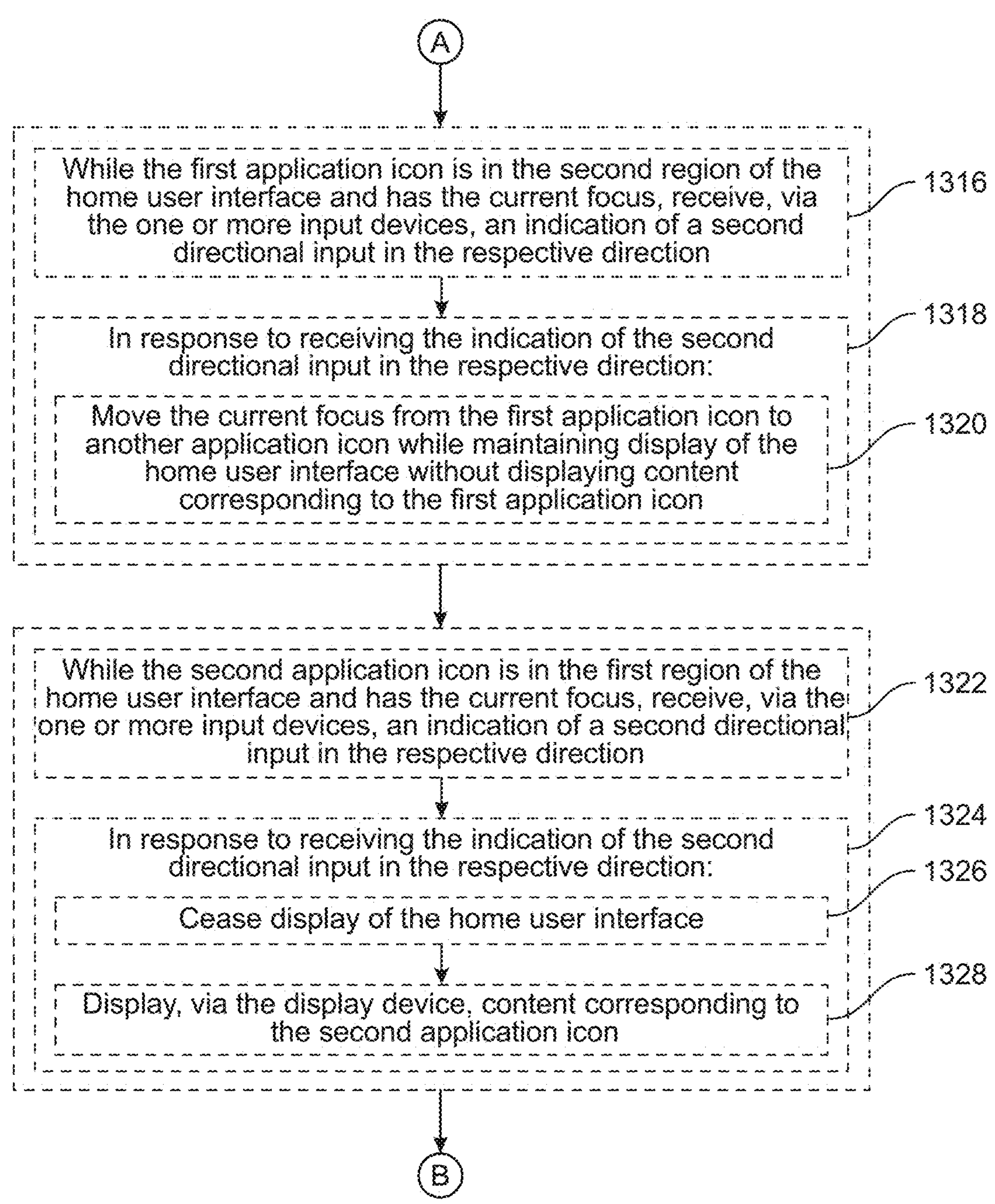
Figure 13C:
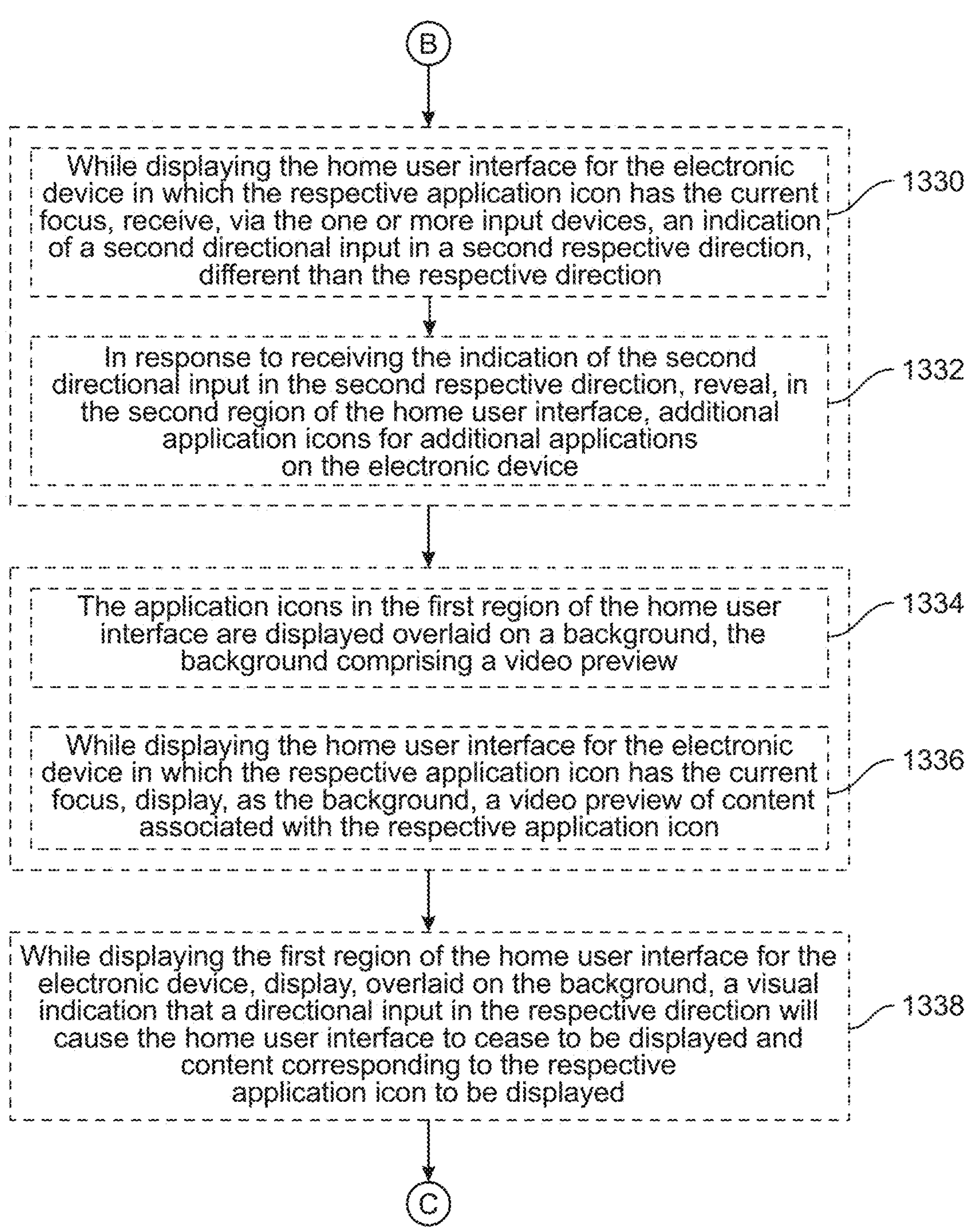
Figure 13D:
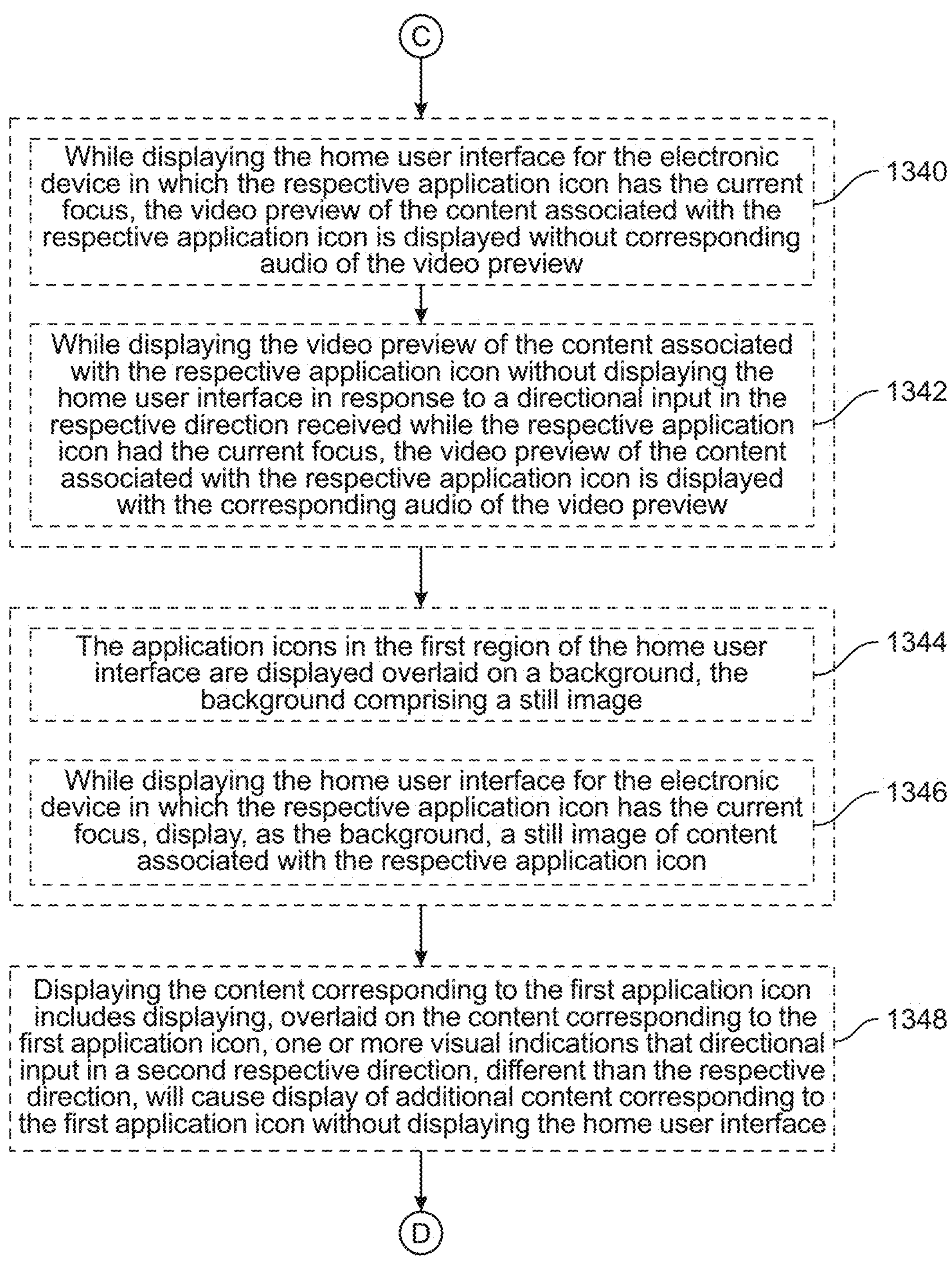
Figure 13E:
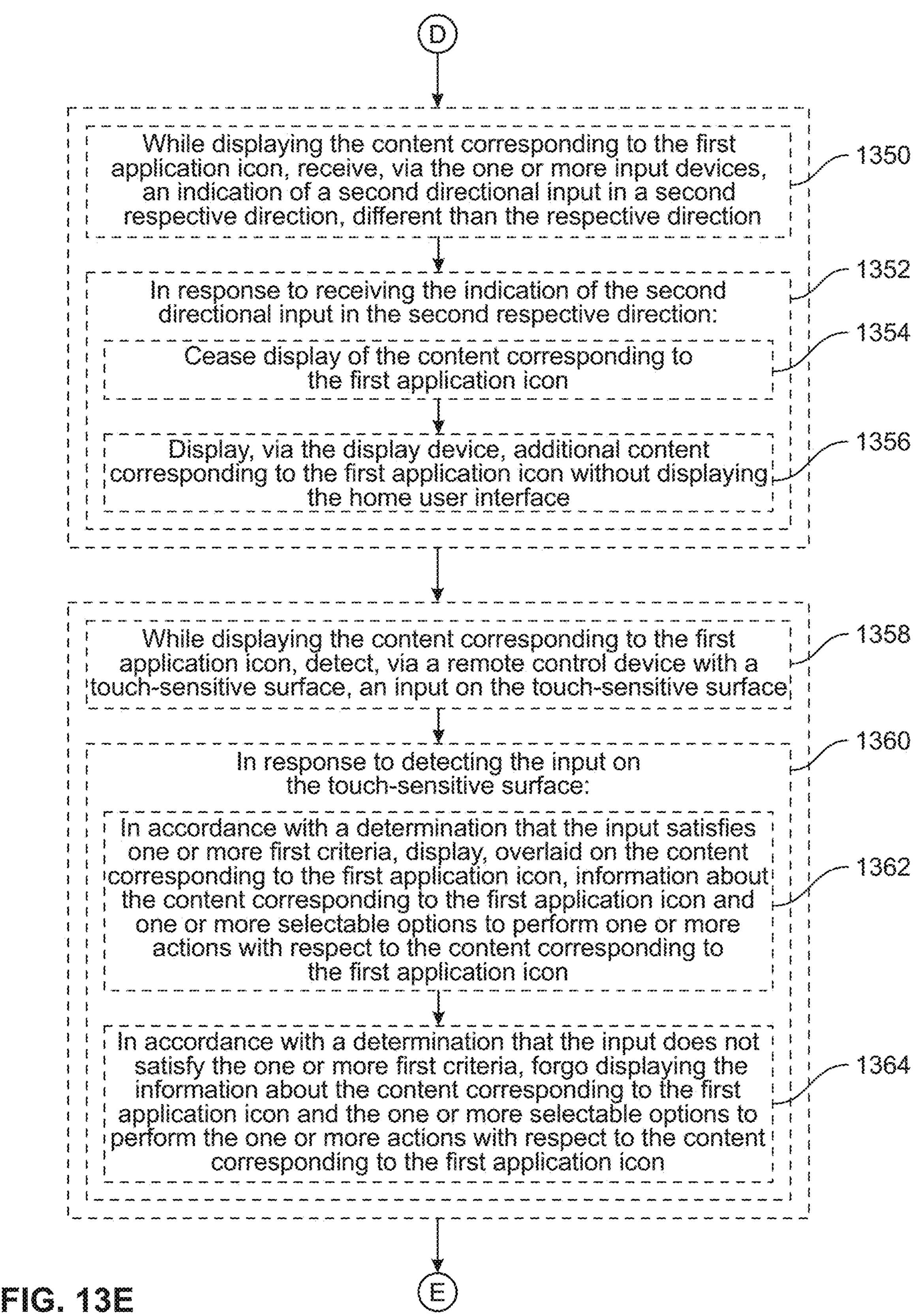
Figure 13F:
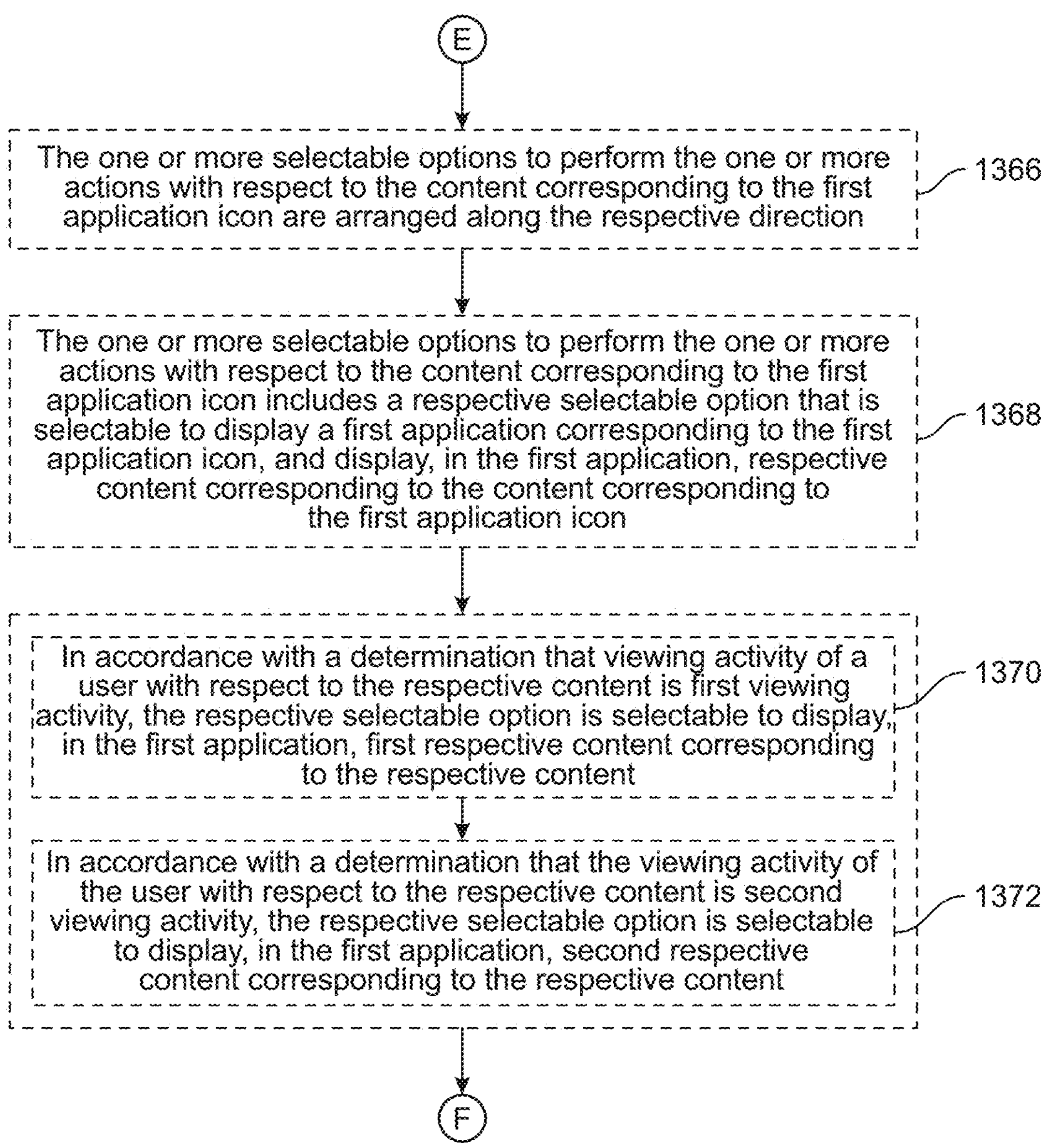
Figure 13G:
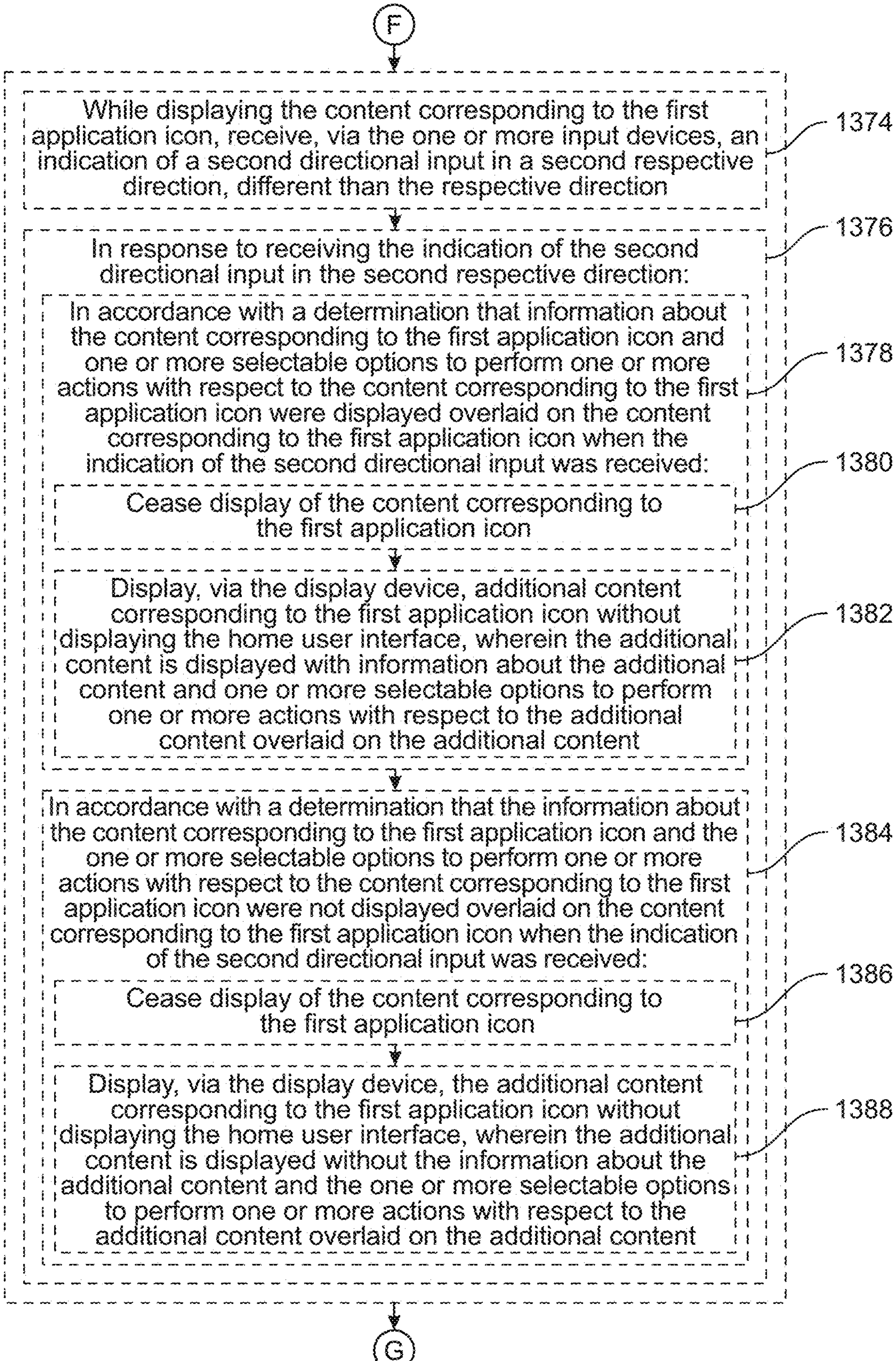
Figure 13H:
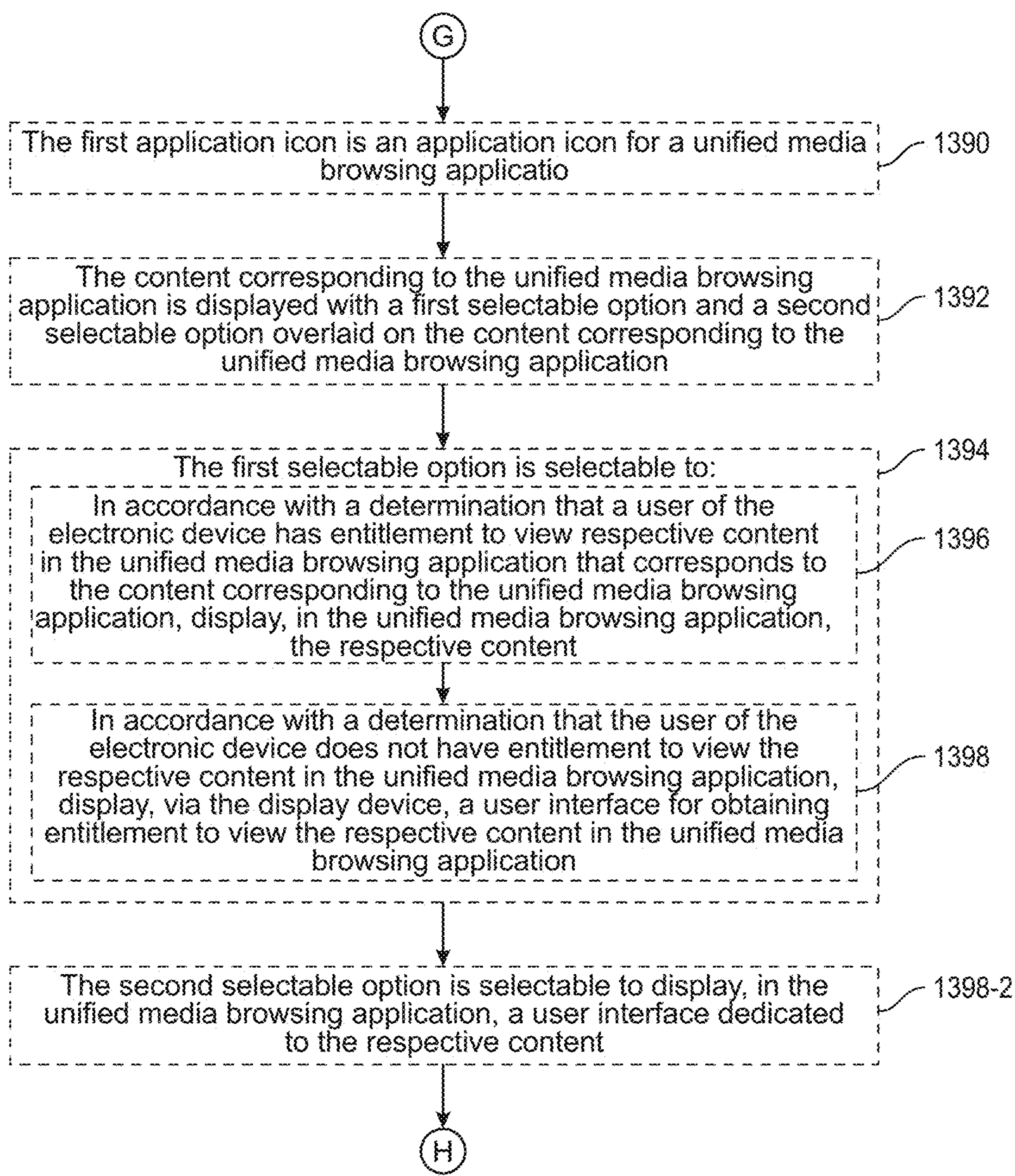
Figure 13I:
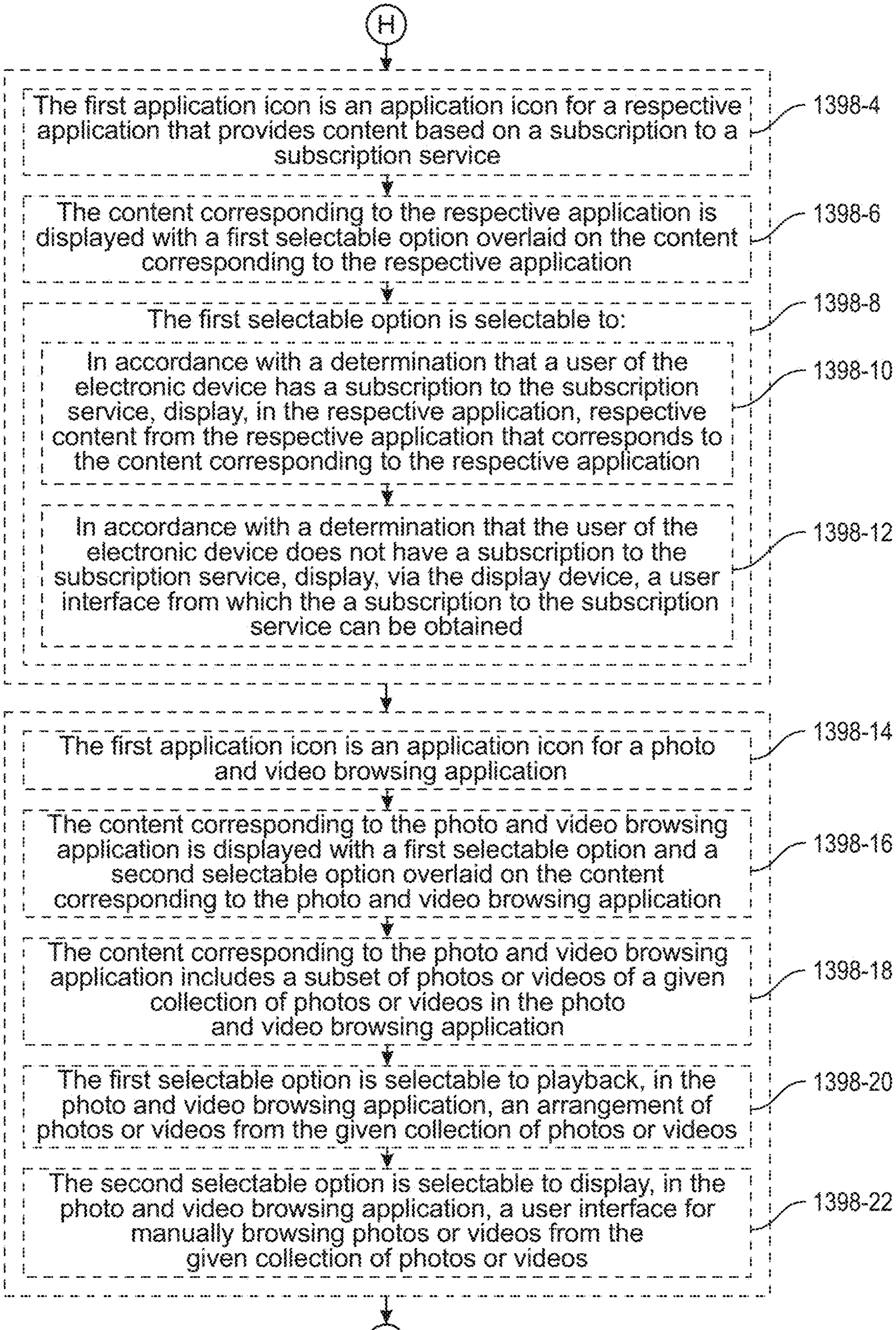
Figure 13J:
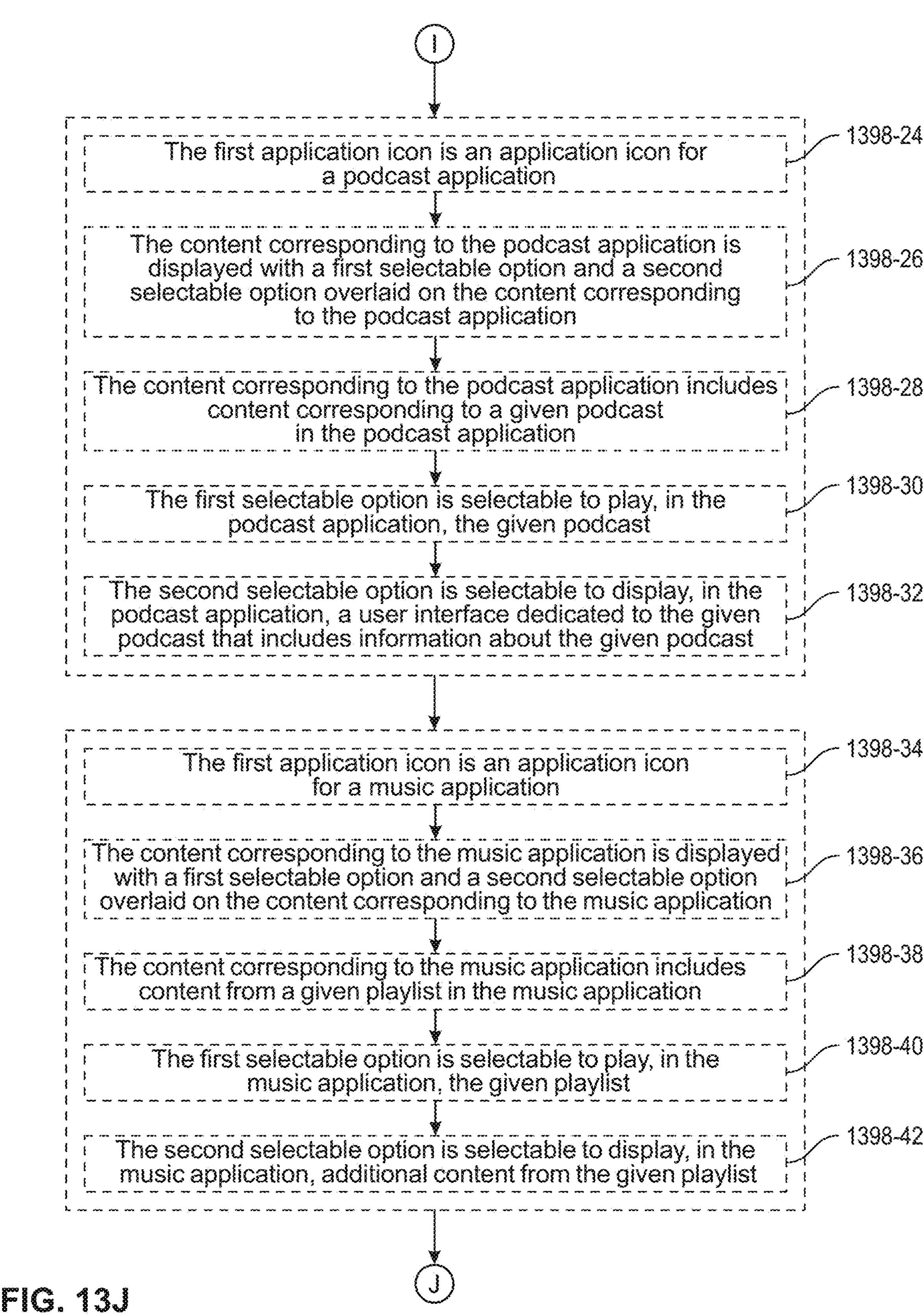
Figure 13K:
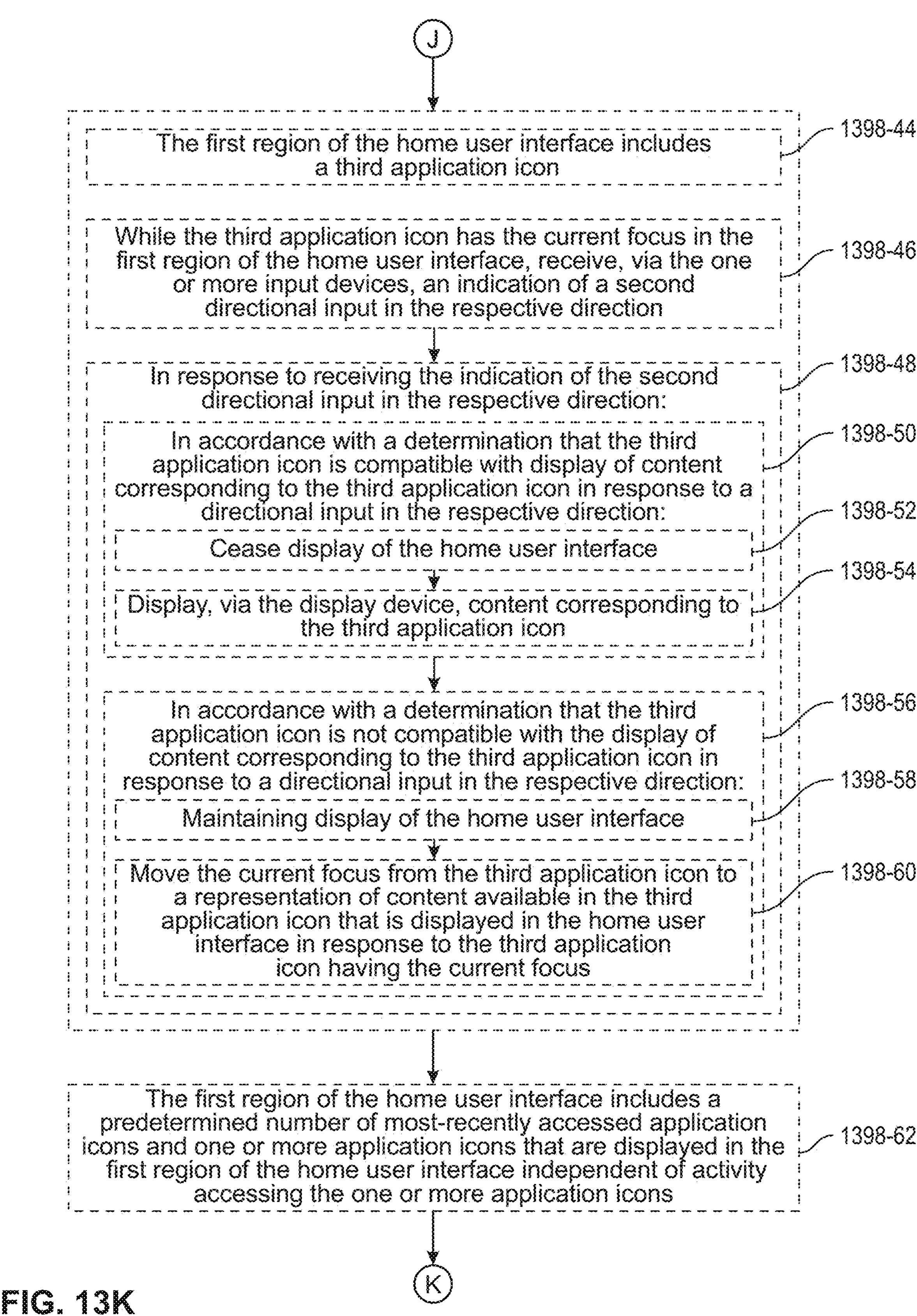
Figure 13L:
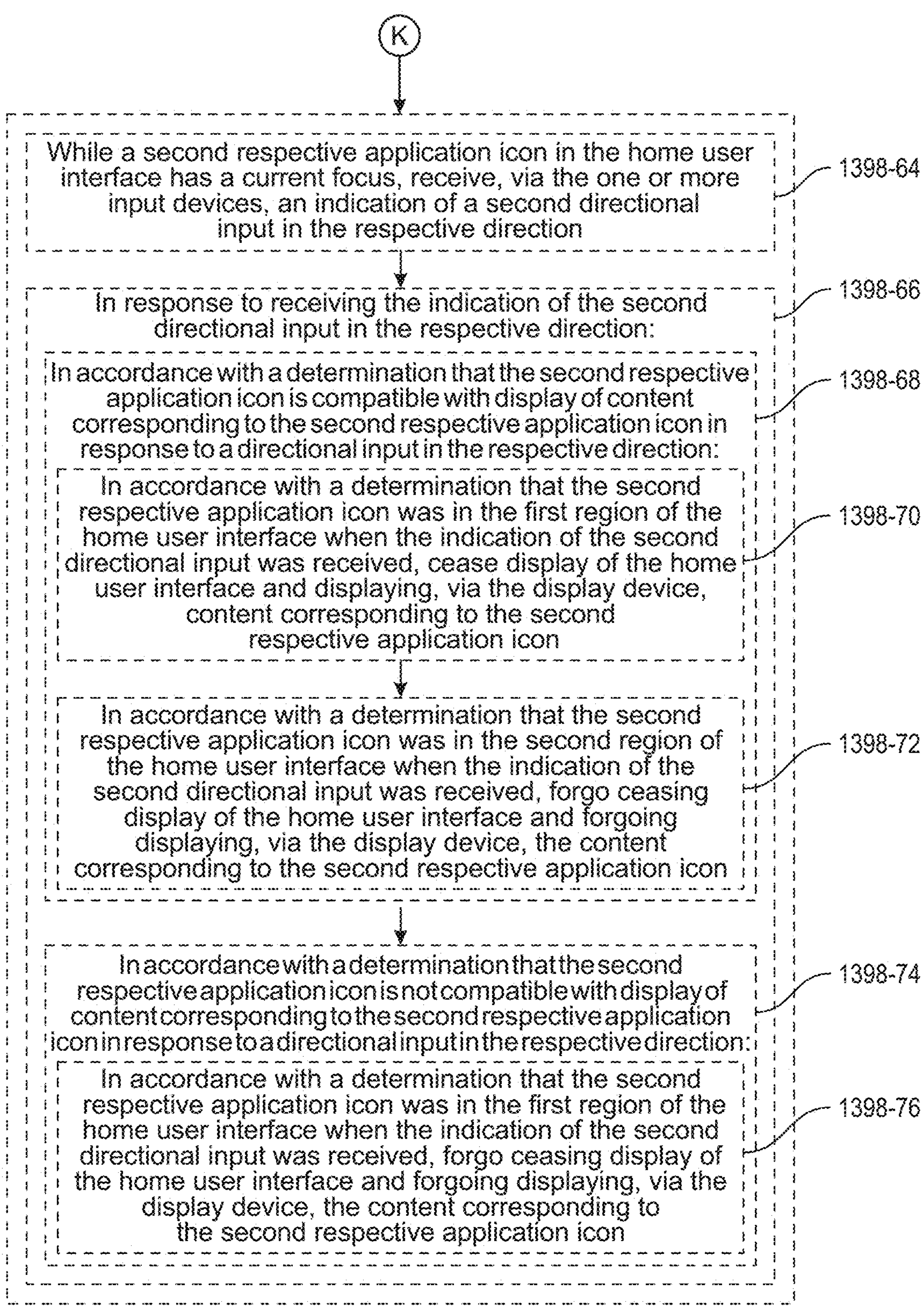

In FIG. 12X, a user input 1203 corresponding to a selection input (e.g., a click) is received. In some embodiments, in response to the user input, user interface 1200-5 displays selectable option 1240 overlaid over the content preview. In some embodiments, for certain applications, such as the arcade application, a "More Info" selectable option is not provided. As shown in FIG. 12Y, if the user has a subscription to the subscription service and has not previously played game A, then selectable option 1240 reads "Play" and is selectable to cause display of Game A. FIG. 12Z illustrates an embodiment in which the user has a subscription to the subscription service and has partially played through game A. In such embodiments, selectable option 1240 reads "Continue Playing" and is selectable to cause display of game A and a resumption at the user's latest progression position in game A. FIG. 12AA illustrates an embodiment in which the user has a subscription to the subscription service but has not yet downloaded game A onto device 500. In such embodiments, selectable option 1240 reads "Get" and is selectable to initiate a process for downloading game A. In some embodiments, after the download completes, game A is automatically displayed.

FIG. 12BB illustrates an embodiment in which the user does not have a subscription to the subscription service. Thus, instead of displaying an enhanced preview of game A in response to the upward swipe navigation input in FIG. 12W, the device displays a subscription service promotional including promotional text and promotional media 1244 (e.g., images or videos) and information about the subscription service. In some embodiments, selectable option 1240 is selectable to initiate a process for subscribing to the subscription service.

It is understood that a rightward and leftward navigational inputs are performable to cause navigation to other items associated with the arcade application, similarly to the processes described in FIGS. 12E-12T for the unified media browsing application, the details of which are not repeated here for brevity.

In FIG. 12CC, a user input 1203 corresponding to a downward swipe gesture is received, thus returning the device back to user interface 1200-1. In FIG. 12DD, user input 1203 corresponding to a rightward navigation gesture is received, thus moving the focus to representation 1204-3 corresponding to the photos application. In some embodiments, the photos application is an application from which the user can browse for and cause display of photos that are associated with the user's account. In some embodiments, the photos are stored on the device or on a server. In some embodiments, the photos application includes one or more photos, photo albums, collections, automatically created albums, etc. In some embodiments, while representation 1204-3 has a focus, content preview region 1208 displays a photo available in the photo application. In some embodiments, hint 1210 is shown indicating that the user can enter into enhanced preview mode to preview items associated with the photos application.

In FIG. 12EE, a user input 1203 corresponding to an upward swipe gesture is received. In some embodiments, in response to the user input, device 500 replaces display of user interface 1200-1 with user interface 1200-6. In some embodiments, user interface 1200-6 displays a preview 1246 of a featured collection from the photos application (e.g., collection 1). In some embodiments, the preview is a slideshow of a subset of photos (or optionally all of the photos) in the featured collection. In some embodiments, the slideshow includes an audio track that is associated with the particular collection being previewed or that is played during slideshows. In some embodiments, preview 1246 is a slideshow such that, without user input, preview 1246 changes from displaying Photo A from collection 1 to displaying Photo B from collection 1 after a predetermined period of time (e.g., 5 seconds, 10 seconds, 30 seconds), as shown in FIG. 12FF. In some embodiments, user interface 1200-6 displays the name of the collection that is currently being previewed.

As shown in FIG. 12EE, selectable options 1248 and 1250 are shown without needing to receive a user input to cause display of the selectable options. In some embodiments, selectable options 1248 and 1250 are not initially shown and are only displayed in response to selection user input. In some embodiments, selectable option 1248 is selectable to launch or otherwise display the photos application and cause playback of the slideshow of Collection 1, as shown in FIGS. 12FF-12GG. In some embodiments, selectable option 1250 is selectable to launch or otherwise display the photos application and display a photos browsing user interface to browse through the photos in collection 1 (or optionally to browse through all of the photos available in the photo application).

FIG. 12HH returns to user interface 1200-6 with Photo B of collection 1 being displayed by preview 1246. In FIG. 12II, a user input 1203 corresponding to a rightward swipe is received. In some embodiments, in response to the user input, user interface 1200-6 displays a preview of another collection of photos (e.g., collection 2). Thus, a navigational user input causes the enhanced preview to display slideshows of different collections (e.g., rather than different photos in the same collection).

In FIG. 12JJ-12KK, the user navigates the focus to selectable option 1250 and performs a selection user input while selectable option 1250 has a focus. In such embodiments, in response to the user input, device 500 replaces display of user interface 1200-6 with user interface 1200-8 corresponding to a browsing user interface of the photos application. In some embodiments, user interface 1200-8 includes one or more representations of photos associated with the user's account (e.g., representations 1251-1 to 1251-8 corresponding to photo 1 to photo 8). It is understood that user interface 1200-8 is illustrative of an embodiment of a photo browsing user interface and other user interfaces for browsing through photos in a user's account are possible.

FIG. 12MM-12NN illustrates the process for returning back to user interface 1200-1 similarly to processes described above. In FIG. 12OO, a user input 1203 corresponding to a rightward swipe is received. In some embodiments, in response to the user input, the focus is moved from representation 1204-3 to representation 1204-4 corresponding to a podcast application, as shown in FIG. 12OO. In some embodiments, the podcast application is an application from which the user can browse for, subscribe to, and cause playback of podcasts. In some embodiments, when representation 1204-4 has a focus, content preview region 1208 displays a preview of a featured podcast that is available from the podcast application (e.g., podcast A). In some embodiments, hint 1210 is displayed indicating that enhanced preview is available for the podcast application.

In FIG. 12PP, a user input 1203 corresponding to an upward swipe gesture is received corresponding to a request to enter enhanced preview mode. In some embodiments, device 500 replaces display of user interface 1200-1 with user interface 1200-9. In some embodiments, user interface 1200-9 displays a full screen preview 1252 of podcast A. In some embodiments, the preview is an image, a video, a slideshow, or the like. In some embodiments, without user input, selectable options 1254 and 1256 and information 1258 are displayed. In some embodiments, selectable options 1254 and 1256 and information 1258 are only displayed after receiving the user input. It is understood that whether the selectable options and information are automatically displayed or displayed after user input are not restricted to the applications illustrated with the respective embodiment and any applications can have one or the other (e.g., optionally the developer of the respective application can select which behavior to have). In some embodiments, selectable option 1254 is selectable to launch or otherwise display the podcast application and cause playback of the previewed podcast (e.g., podcast A). In some embodiments, selectable option 156 is selectable to launch or otherwise display the podcast application and cause display of a user interface specific to the podcast (e.g., the podcast's product page).

FIG. 12QQ-12RR illustrates the process of returning to user interface 1200-1 similar to processes described above.

In FIG. 12SS, a user input 1203 corresponding to a rightward navigation is received. In some embodiments, in response to the user input, focus is moved from representation 1204-4 to representation 1204-5 corresponding to the music application. In some embodiments, the music application an application from which the user can browse for and cause playback of music content (e.g., songs, playlists, music videos, etc.). In some embodiments, when representation 1204-5 has a focus, content preview region 1208 displays a preview of a featured songs, playlists, and/or music videos that is available from the music application (e.g., song A). In some embodiments, hint 1210 is displayed indicating that enhanced preview is available for the music application.

In FIG. 12TT, a user input 1203 corresponding to an upward swipe gesture is received corresponding to a request to enter enhanced preview mode. In some embodiments, device 500 replaces display of user interface 1200-1 with user interface 1200-10. In some embodiments, user interface 1200-9 displays a full screen preview 1252 of podcast A. In some embodiments, the preview is music video of song A. In some embodiments, preview 1252 is displaying a music video playlist and will automatically (e.g., without user input) cycle through some or all of the music videos in the playlist, as shown in FIG. 12TT.

In some embodiments, user interface 1200-10 includes the name of the playlist as well as the date when the playlist was most recently updated (e.g., "Monday"). In some embodiments, without user input, selectable options 1262 and 1264 are displayed. In some embodiments, selectable option 1262 is selectable to launch or display of the music application and cause playback of the previewed playlist (e.g., playlist 1). In some embodiments, selectable option 1264 is selectable to launch or display the music application and display a browsing user interface to browse through the music videos in the respective playlist or browse through all available music videos.

In FIG. 12VV, a user input 1203 corresponding to a rightward swipe is received. In some embodiments, in response to the user input, user interface 1200-10 displays a preview of another playlist of music videos (e.g., playlist 2). Thus, a navigational user input causes the enhanced preview to display music videos of different playlists (e.g., rather than a different music video from the same playlist).

In FIG. 12WW, a user input 1203 is received selecting the "menu" button (e.g., optionally the "back" button) corresponding to a request to navigate backwards. In some embodiments, in response to the user input, device 500 replaces display of user interface 1200-10 with display of user interface 1200-1 corresponding to the home screen user interface.

FIGS. 12XX-12AAA illustrate an embodiment in which recently accessed applications are displayed in a region of the prioritized row 1202. In FIG. 12XX, prioritized row 1202 includes representations 1204-1 through 1204-5, similar to representations 1204-1 through 1204-5 described above. In some embodiments, prioritized row 1202 also includes representations 1266-1 and 1266-2 corresponding to two of the most recently accessed applications (e.g., App 1 and App 2). In some embodiments, the recently accessed applications are the two more recently accessed applications that are not already represented by the other representations in the prioritized row (e.g., App 1 and App 2 are not any of the unified media browsing application, arcade application, photos application, podcasts application, or music application). In some embodiments, the region of the prioritized row 202 for the recently accessed applications are visually distinguished from the region that does not dynamically change based on the user's recent access history (e.g., by a line or any other visual demarcation).

In some embodiments, because representation 1266-1 and representation 1266-2 are now in prioritized row 1202, the representations have access to the content preview functions of the prioritized row. However, in some embodiments, not all applications are compatible with the full features of the prioritized row. Thus, for example, as shown in FIG. 12XX, App 1 (corresponding to representation 1266-1) does not support enhanced preview feature and instead of displaying one content item in content preview region 1208 (e.g., and from which an upward swipe gesture enters into enhanced preview mode), content preview region 1208 displays a plurality of representations of content that is available from app 1 (e.g., icons of content) above the prioritized row (e.g., does not extend into the prioritized row such that the prioritized row is overlaid over any portion of the preview).

In FIG. 12YY, a user input 1203 corresponding to an upward swipe navigation is received. In some embodiments, because app 1 does not support the enhanced preview features, instead of entering into the enhanced preview mode, the focus is moved upwards from representation 1266-1 to representation 1268-1 corresponding to Item AA, which is available from App 1. In some embodiments, representations 1268-1 to 1268-3 are selectable to cause display of the respective item in App 1 (e.g., launching or otherwise displaying app 1).

In FIG. 12AAA, a user input 1203 corresponding to a rightward navigation is received. In some embodiments, in response to the user input, the focus is moved to representation 1266-2 corresponding to App 2. In some embodiments, even though App 2 is not originally in the prioritized row 1202 (e.g., when it is not a recently opened app), App 2 does support the features and functionalities of enhanced preview mode. In some embodiments, because App 2 supports the features and functionalities of enhanced preview mode, content preview region 1208 displays a preview (e.g., optionally the preview extends over the entire length and width of the user interface such that the user interface elements are overlaid over the preview) of an item associated with App 2 (e.g., Item B). In some embodiments, hint 1210 is displayed to indicate that enhanced preview mode is available and that an upward swipe gesture will cause the device to enter into an enhanced preview mode for App 2.

Thus, in some embodiments, one or more applications installed on device 500 support enhanced preview mode. In some embodiments, a user is able to move applications to different rows, including into and out of the prioritized row 1202. In some embodiments, if an application supports enhanced preview mode, then when the application is in the prioritized row and has a focus, content is displayed in content preview region 1208 as discussed above and the user is able to enter into enhanced preview mode. In some embodiments, if the application supports enhanced preview mode and is not in the prioritized row 1202, then when the application has a focus, content is not displayed in content preview region 1208 and the user is not able to enter into enhanced preview mode. In some embodiments, if an application does not support enhanced preview mode and is not in the prioritized row 1202, then when the application has a focus, content is not displayed in content preview region 1208 and the user is not able to enter into enhanced preview mode. In some embodiments, if an application does not support enhanced preview mode and is in the prioritized row 1202, then when the application has a focus, selectable representations of content are displayed in the content preview region (e.g., as individual icons rather than a preview), and the user is not able to enter into enhanced preview mode.

FIGS. 13A-13L are flow diagrams illustrating a method of presenting enhanced previews of items of content available via respective applications on the electronic device 500 in accordance with some embodiments of the disclosure. The method 1300 is optionally performed at an electronic device such as device 100, device 300, device 500, device 501, device 510, and device 511 as described above with reference to FIGS. 1A-1B, 2-3, 4A-4B and 5A-5C. Some operations in method 1300 are, optionally combined and/or order of some operations is, optionally, changed.

As described below, the method 1300 provides ways to present enhanced previews of items of content available via respective applications on the electronic device 500. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 12A, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510 displays (1302), on the display, via the display device, a home user interface for the electronic device that includes a first set of application icons and a second set of application icons, wherein the first set of application icons is included in a first region of the home user interface and the second set of application icons is included in a second region of the home user interface, such as in FIG. 12A (e.g., a home screen or application launching user interface that includes one or more icons of applications that are selectable to launch the respective application).

In some embodiments, the icons of applications represent applications that are downloaded and/or installed on the electronic device. In some embodiments, the applications include a unified media browsing application, one or more content provider applications, a settings application, a music application, a podcast application, a photo gallery application, an application store application, etc. In some embodiments, the unified media browsing application provides a centralized location for browsing, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate HBO application, etc.) and aggregates the shared information into a catalog of available content. In some embodiments, the content provider applications have access to content from a specific provider, such as a primary or secondary content provider. In some embodiments, a primary content provider is a content provider (e.g., Comcast, Time Warner, etc.) that provides the user access to a plurality of secondary content providers (e.g., CBS, Fox, HBO, etc.). In some embodiments, the music application provides access to a plurality of music that the user is entitled to access. In some embodiments, the podcast application provides access to a plurality of podcasts that are available on the electronic device. In some embodiments, the photo gallery application provides access to a plurality of photographs, memories, collections, and/or albums that are associated with the user of the electronic device's account. In some embodiments, the home user interface includes a content preview region and an application icon region. In some embodiments, the content preview region displays content associated with the application that has a focus. In some embodiments, the first region of the home user interface is a prioritized row of icons. In some embodiments, when an icon in the prioritized row of icons receives a focus, the content preview region displays a preview of content associated with the application whose icon has focus. In some embodiments, not all applications have all the content preview features that are available. Thus, in some embodiments, some applications in the prioritized row of icons have limited content preview functionalities and other applications in the prioritized row of icons have full content preview functionalities. In some embodiments, the second region of the home user interface is a row of icons other than the prioritized row of icons. In some embodiments, the rows of icons other than the prioritized row of icons are displayed beneath the prioritized row of icons and is accessible by navigating the home user interface downwards. In some embodiments, when icons in rows other than the prioritized row of icons have a focus, the content preview region does not display content associated with the application that has focus. Thus, in some embodiments, only the applications in the prioritized row of icons cause content to be displayed in the content preview region when the respective application has a focus.

In some embodiments, while displaying the home user interface for the electronic device in which a respective application icon has a current focus, the electronic device receives (1304), via the one or more input devices, an indication of a directional input in a respective direction, such as in FIG. 12D (e.g., receiving a user input corresponding to a navigational request). It is understood that the user input can be received from a dedicated remote control device, a universal remote control device, or a remote control application on a mobile electronic device such as a smart phone. In some embodiments, the user input is an upward swipe on a touch-sensitive surface of an input device corresponding to an upward navigation.

In some embodiments, in response to receiving the indication of the directional input in the respective direction (1306), such as in FIG. 12D: in accordance with a determination that the respective application icon is a first application icon in the first set of application icons (1308), such as in FIG. 12D (e.g., receiving an upward swipe input when an icon in the prioritized row of icons has a focus): the electronic device ceases display (1310) of the home user interface, such as in FIG. 12D; and displays (1312), via the display device, content corresponding to the first application icon, such as in FIG. 12D (e.g., replacing the display of the home user interface with content corresponding to the first application icon).

In some embodiments, the content corresponding to the first application icon is the content that was displayed in the content preview region before receiving the upward swipe input. In some embodiments, the content is displayed in a full-screen mode (e.g., without displaying any other user interface elements and/or other content). In some embodiments, displaying the content includes playing audio associated with the content, where the audio was not played before entering full-screen mode. In some embodiments, the content is a still photograph, a slide show, a short clip, a trailer, or any other suitable promotional content. In some embodiments, the content is content that is available from the first application. Thus, in some embodiments, the upward swipe input causes an upward navigation beyond the top-most row of icons, thereby exiting the home user interface and entering into a content display user interface (e.g., a substantially full-screen content display user interface).

In some embodiments, in accordance with a determination that the respective application icon is a second application icon in the second set of application icons, the electronic devices moves (1314) the current focus from the second application icon to another application icon while maintaining display of the home user interface, such as in FIG. 12C (e.g., if the upward swipe input is received when an icon that is not in the prioritized row of icons has a focus). In some embodiments, the second set of application icons are in a row below the prioritized row of icons or below another row of icons. In some embodiments, in response to receiving an upward swipe input, focus is moved upwards to an icon in the above row corresponding to another application. Thus, in some embodiments, the upward swipe input causes an upward navigation to another row of applications.

The above-described manner of displaying content associated with an application when the application is in a prioritized region of the user allows the electronic device to provide the user with access to promotional content associated with the application, which simplifies the interaction between the user and the electronic device and enhances the operability of the electronic device and makes the user-device interface more efficient (e.g., by providing a mechanism for the user to preview content available from the application without requiring the user to launch the application or perform additional user inputs to preview the content), which additionally reduces power usage and improves battery life of the electronic device by enabling the user to use the electronic device more quickly and efficiency, such as by streamlining the process of accessing content.

In some embodiments, while the first application icon is in the second region of the home user interface and has the current focus, the electronic device receives (1316), via the one or more input devices, an indication of a second directional input in the respective direction, such as in FIG. 12C (e.g., when an application in the non-prioritized row of icons (e.g., below the prioritized row of icons) has the current focus, receiving an input corresponding to an upward navigation (e.g., a request to move the focus upwards to the item above the first application)).

In some embodiments, in response to receiving the indication of the second directional input in the respective direction (1318), such as in FIG. 12C: the electronic device moves (1320) the current focus from the first application icon to another application icon while maintaining display of the home user interface without displaying content corresponding to the first application icon, such as in FIG. 12C (e.g., moving the focus to the item above the first application, even if the first application is compatible with displaying content in the content display region and/or compatible with the features of the prioritized row of applications).

In some embodiments, the second region is a second row of icons that is beneath the first row of icons (e.g., beneath the first region of the home user interface, beneath the prioritized row), and an upward navigation causes the focus to move from the first application in the second row to another application that is in the first row. In some embodiments, if the first application is in the second region (e.g., not in the prioritized row), then when focus is on the first application, the content preview region does not display content corresponding to the first application and optionally displays content corresponding to another application. In some embodiments, the upward swipe does not cause the content the device to enter into a content display user interface.

The above-described manner of displaying content associated with an application in a prioritized region (e.g., by providing content preview features to items in the prioritized region, but not providing content preview regions that are not in the prioritized region) allows the electronic device to emphasize applications that are displayed in the prioritized region (e.g., by displaying content in the content preview region and providing the user with the ability to view the displayed content in a more immersive user interface for applications that are in the prioritized region, but not similarly displaying content for applications that are not in the prioritized region), which simplifies the interaction between the user and the electronic device and enhances the operability of the electronic device and makes the user-device interface more efficient (e.g., by providing the user with a mechanism to quickly view content available from applications from which the user is more likely to want to view content and not providing the user with the same mechanism for applications from which the user is less likely to want to view content), which additionally reduces power usage and improves battery life of the electronic device by enabling the user to use the electronic device more quickly and efficiency, such as by streamlining the process of accessing content for a subset of applications on the electronic device.

In some embodiments, while the second application icon is in the first region of the home user interface and has the current focus, the electronic device receives (1322), via the one or more input devices, an indication of a second directional input in the respective direction, such as in FIG. 12V (e.g., the application is in the prioritized row of applications and has a current focus). In some embodiments, when the application in the prioritized row of application has a current focus, then the content preview region displays a preview of content corresponding to the application (e.g., available via the application, available in the application, information of which is viewable in the application, access and/or playback of which is able to be achieved from the application, etc.).

In some embodiments, in response to receiving the indication of the second directional input in the respective direction (1324), such as in FIG. 12W: the electronic device ceases display (1326) of the home user interface, such as in FIG. 12W and displays (1328), via the display device, content corresponding to the second application icon, such as in FIG. 12W (e.g., in response to receiving the upward swipe from the prioritized row of applications, replacing display of the home user interface (e.g., the content browsing user interface) with display of a user interface corresponding to the application that had focus).

In some embodiments, the user interface corresponding to the application is a full screen or substantially full screen display of the content that was displayed in the content preview region before receiving the upward swipe input. In some embodiments, if the first application is not compatible with the functionalities of the prioritized row of applications, then performing an upward swipe does not cause display of the content corresponding to the second application. In such embodiments, the content preview region displays one or more representations of content (e.g., icons of content rather than a preview image or preview video of the content), and an upward swipe causes the focus to move from the second application to the representations of content that is in the content preview region (e.g., the content preview region is displayed above the prioritized row of applications).

The above-described manner of displaying content associated with an application in a prioritized region (e.g., by providing content preview features to items in the prioritized region, but not providing content preview features to those same items when they are not in the prioritized region) allows the electronic device to emphasize the applications that are displayed in the prioritized region (e.g., by displaying content in the content preview region and providing the user with the ability to view the displayed content in a more immersive user interface for applications that are in the prioritized region, which the user has indicated that he or she is more likely to access due to their inclusion in the prioritized region), which simplifies the interaction between the user and the electronic device and enhances the operability of the electronic device and makes the user-device interface more efficient (e.g., by providing the user with a mechanism to quickly view content available from applications from which the user is more likely to access, without requiring the user to navigate into the respective application to browse for and view the same content), which additionally reduces power usage and improves battery life of the electronic device by enabling the user to use the electronic device more quickly and efficiency, such as by streamlining the process of accessing content for a subset of applications on the electronic device.

In some embodiments, while displaying the home user interface for the electronic device in which the respective application icon has the current focus, the electronic device receives (1330), via the one or more input devices, an indication of a second directional input in a second respective direction, different than the respective direction, such as in FIG. 12B (e.g., receiving a downward swipe input or otherwise an input corresponding to a request to navigate downwards).

In some embodiments, in response to receiving the indication of the second directional input in the second respective direction, the electronic device reveals (1332), in the second region of the home user interface, additional application icons for additional applications on the electronic device, such as in FIG. 12B (e.g., scrolling the user interface downwards).

In some embodiments, scrolling the user interface downwards comprises moving the prioritized row of applications upwards and displaying another row of applications below the prioritized row of applications. In some embodiments, when any application from the prioritized row of applications has a focus, then the prioritized row of applications is displayed at or near the bottom of the display and is the only row that is displayed on the display (e.g., optionally the row below the prioritized row of applications is partially displayed beneath the prioritized row of applications as if "peeking" from the bottom of the display). Thus, in some embodiments, a downward navigation causes the row below the prioritized row of applications to be revealed and focus to be moved to that row).

The above-described manner of displaying other applications installed on the electronic device (e.g., by displaying other rows of content in response to a downward navigation) allows the electronic device to display only the applications that the user is more likely to access unless otherwise requested (e.g., by displaying only the prioritized row of icons until the user performs a input corresponding to a request to view other rows of applications), which simplifies the interaction between the user and the electronic device and enhances the operability of the electronic device and makes the user-device interface more efficient (e.g., by displaying only those applications in the prioritized row of applications to minimize the items displayed on the user interface, unless or until the user requests display of over rows of applications by performing a downward navigation input), which additionally reduces power usage and improves battery life of the electronic device by enabling the user to use the electronic device more quickly and efficiency, such as by streamlining the process of accessing content for a subset of applications on the electronic device.

In some embodiments, the application icons in the first region of the home user interface are displayed overlaid on a background, the background comprising a video preview (1334), such as in FIG. 12A (e.g., the content preview region is displayed in the background of the display such that the icons of applications in the prioritized row of applications are displayed overlaid over the content preview region). In some embodiments, the prioritized row of applications are displayed within a boundary and the boundary is displayed overlaid over the content preview region. In some embodiments, the content preview region encompasses the entire user interface and is displayed behind some or all of the user interface elements on the user interface (e.g., the prioritized row of applications, the navigation menu, etc.). In some embodiments, the content preview region encompasses a subset of the user interface such some or none of the content preview region is obscured by other user interface elements.

In some embodiments, while displaying the home user interface for the electronic device in which the respective application icon has the current focus, the electronic device displays (1336), as the background, a video preview of content associated with the respective application icon, such as in FIG. 12A (e.g., the content preview region displays content associated with the application icon that currently has focus).

In some embodiments, if the user moves focus from one application icon in the prioritized row of content to another application icon in the prioritized row of content (e.g., due to a leftward or rightward navigation request), then the content preview region updates to display content from the newly-focused application. In some embodiments, the content preview region only displays content from the prioritized row of content. In some embodiments, if the content preview region is still displayed when an icon from a row of content beneath the prioritized row of content has a focus, then the content preview region does not display any content or displays content corresponding to the application from the prioritized row of content that previously had focus (e.g., if the user scrolled down from the prioritized row to a non-prioritized row, then the content preview region continues to display content from the prioritized row of content). In some embodiments, the content displayed in the content preview region is a video preview of the content associated with the respective application icon, such as a trailer or teaser video. In some embodiments, the content displayed in the content preview region is a still image or a slideshow. In some embodiments, the content associated with the respective application icon comprises content that is accessible via the respective application).

The above-described manner of displaying content associated with an application in a prioritized region (e.g., by displaying a video in the content preview region corresponding to the application that currently has focus) allows the electronic device to provide a more substantial preview of the content associated with the application that has focus, which simplifies the interaction between the user and the electronic device and enhances the operability of the electronic device and makes the user-device interface more efficient (e.g., by providing the user with a mechanism to meaningfully preview the content that is available from the application without requiring the user to view only still images or navigate to the respective application to view information about the content), which additionally reduces power usage and improves battery life of the electronic device by enabling the user to use the electronic device more quickly and efficiency, such as by streamlining the process of previewing content.

In some embodiments, while displaying the first region of the home user interface for the electronic device, the electronic device displays (1338), overlaid on the background, a visual indication that a directional input in the respective direction will cause the home user interface to cease to be displayed and content corresponding to the respective application icon to be displayed, such as in FIG. 12B (e.g., while the prioritized row of applications is displayed and optionally has a focus such that the content preview region is displaying content associated with the respective application, then display an indicator or hint on the user interface to indicate to the user that an upward swipe will cause the device to enter into a content display user interface (e.g., a substantially full-screen content display user interface that is displaying the content that was displayed in the content preview region before receiving the upward swipe input)). In some embodiments, the visual indication comprises a caret character and/or a textual description (e.g., "Swipe up for full screen"). In some embodiments, the visual indication is displayed at or near the top of the display. In some embodiments, the visual indication is displayed overlaid over the content display region.

The above-described manner of displaying a hint of how to access the content display user interface (e.g., by displaying a visual indication that directional input will cause the device to enter into the content display user interface) allows the electronic device to ensure that the user knows how to access the more immersive user interface for previewing content associated with the application, which simplifies the interaction between the user and the electronic device and enhances the operability of the electronic device and makes the user-device interface more efficient (e.g., by displaying a visual indication that if the user performs a particular gesture while the respective application has a focus, then the user will be presented with a more immersive user experience to view the content that is currently being displayed in the content preview region, which additionally reduces power usage and improves battery life of the electronic device by enabling the user to use the electronic device more quickly and efficiency, such as by streamlining the process of previewing content available from an application.

In some embodiments, while displaying the home user interface for the electronic device in which the respective application icon has the current focus, the video preview of the content associated with the respective application icon is displayed without corresponding audio of the video preview (1340), such as in FIG. 12A (e.g., while displaying the home user interface and content in the content preview region, but not displaying the content preview user interface (e.g., the full screen or substantially full screen display of content in response to an upward swipe navigation), the display of content in the content preview region does not cause playback of any accompanying audio content (e.g., the audio track corresponding to the content being displayed in the content preview region).

In some embodiments, while displaying the video preview of the content associated with the respective application icon without displaying the home user interface in response to a directional input in the respective direction received while the respective application icon had the current focus (e.g., the content display user interface (e.g., the full screen or substantially full screen display of content associated with the respective application)), the video preview of the content associated with the respective application icon is displayed with the corresponding audio of the video preview (1342), such as in FIG. 12D (e.g., playback of the content that is displayed on the content display user interface (e.g., optionally the same content that was displayed in the content preview region before receiving the upward swipe navigational input), includes corresponding audio (e.g., the audio track of the video preview, etc.)). In some embodiments, if the content displayed in the content display user interface is a still image or slideshow, then audio corresponding to the still image or slideshow is also able to be played.

The above-described manner of displaying content associated with an application in a prioritized region (e.g., by playing audio when the user enters into the full-screen content display user interface, but not playing audio when the user is on the home screen user interface) allows the electronic device to provide the user with a more immersive experience when the user requests the more immersive experience, but otherwise not playing audio when the user is potentially browsing for media, when audio is potentially disruptive and distracting, which simplifies the interaction between the user and the electronic device and enhances the operability of the electronic device and makes the user-device interface more efficient (e.g., by providing the user with a mechanism to preview the content with audio only when the user performs a user input requesting a more immersive experience), which additionally reduces power usage and improves battery life of the electronic device by enabling the user to use the electronic device more quickly and efficiency.

In some embodiments, the application icons in the first region of the home user interface are displayed overlaid on a background, the background comprising a still image (1344), such as in FIG. 12A (e.g., the content displayed in the content preview region is a still image or a slideshow of still images). In some embodiments, while displaying the home user interface for the electronic device in which the respective application icon has the current focus, the electronic device displays, as the background, a still image of content associated with the respective application icon (1346), such as in FIG. 12A (e.g., the still image or slideshow of still images that is displayed in the content preview region is associated with the application in the prioritized row of icons that currently has focus). In some embodiments, if the focus moves from the respective application icon to another application icon in the prioritized row of icons, then the still image in the content preview region is updated to display content associated with the newly focused application.

The above-described manner of displaying content associated with an application in a prioritized region (e.g., by displaying a still image of content in the content preview region) allows the electronic device to provide the user with a preview of content without overly distracting the user (e.g., by displaying still images in the content preview region when the user has not yet performed an input indicating a request to view the displayed content), which simplifies the interaction between the user and the electronic device and enhances the operability of the electronic device and makes the user-device interface more efficient (e.g., by providing the user with a mechanism to preview the content without overly crowding the user interface), which additionally reduces power usage and improves battery life of the electronic device by enabling the user to use the electronic device more quickly and efficiency, such as by streamlining the process of previewing content available from applications on the electronic device.

In some embodiments, the displaying the content corresponding to the first application icon includes displaying, overlaid on the content corresponding to the first application icon, one or more visual indications that directional input in a second respective direction, different than the respective direction, will cause display of additional content corresponding to the first application icon without displaying the home user interface (1348), such as in FIG. 12D (e.g., while displaying content in the content display user interface (e.g., the full screen or substantially full screen content display user interface), display visual indicators on the left and right of the display to indicate that a leftward or rightward navigation will cause display of other content in the content display user interface (e.g., cause navigation to the next or previous item)).

In some embodiments, the next or previous item are associated with the respective application that had focus when the device entered into the content display user interface (e.g., optionally corresponding to other items that are accessible from the respective application that had focus). In some embodiments, the visual indicators are a left-face and right-facing caret or chevron (e.g., less-than or greater-than symbols). In some embodiments, the visual indicators are only displayed for a threshold amount of time (e.g., for 1 second, 2 seconds, 3 seconds after the initial display of the content display user interface or after content in the content display user interface is changed to another content). In some embodiments, the visual indicators are only displayed when a user input is detected (e.g., a touch-down on a touch-sensitive surface or a navigational input). In some embodiments, only one of the visual indicators are shown if navigation can only proceed in one direction (e.g., only the rightward indicator is shown if the user can only navigate in the rightward direction, and similarly for the leftward navigational direction). In some embodiments, the visual indicators include pagination markers at or near the bottom of the display. In some embodiments, the pagination markers include dots that correspond to the number of available "pages" corresponding to different content that can be navigated to. In some embodiments, the pagination markers include dashes that correspond to the number of available pages. In some embodiments, if there is only one content for display in the content display user interface, then the visual indicators are not shown.

The above-described manner of displaying hints for displaying additional content (e.g., by displaying visual indications that swiping to the left or right will cause display of additional content associated with the first application in the content display user interface) allows the electronic device to ensure that the user knows that additional content is available to be previewed by the user, which simplifies the interaction between the user and the electronic device and enhances the operability of the electronic device and makes the user-device interface more efficient (e.g., by indicating to the user that the user can preview other content items associated with the first application that the user may be interested in), which additionally reduces power usage and improves battery life of the electronic device by enabling the user to use the electronic device more quickly and efficiency, such as by streamlining the process of browsing for content from a particular application on the electronic device.

In some embodiments, while displaying the content corresponding to the first application icon, the electronic device receives (1350), via the one or more input devices, an indication of a second directional input in a second respective direction, different than the respective direction, such as in FIG. 12E (e.g., while in the content display user interface, receiving a leftward or rightward navigational input (e.g., a left-swipe or right-swipe on a touch sensitive surface of an input device)).

In some embodiments, in response to receiving the indication of the second directional input in the second respective direction (1352), such as in FIG. 12E: the electronic device ceases display (1354) of the content corresponding to the first application icon, such as in FIG. 12E, and displays (1356), via the display device, additional content corresponding to the first application icon without displaying the home user interface, such as in FIG. 12E (e.g. replacing the display of the current content in the content display user interface with the next content that corresponds to the application that had focus before entering into the content display user interface). In some embodiments, there is only one content item to display in the content display user interface. In such embodiments, then a rightward or leftward navigation input does not cause the display to switch to the next content item.

The above-described manner of displaying additional content associated with an application in a prioritized region (e.g., by displaying additional content in response to a leftward or rightward navigation) allows the electronic device to provide the user with previews of other content that are also associated with the application, which simplifies the interaction between the user and the electronic device and enhances the operability of the electronic device and makes the user-device interface more efficient (e.g., by providing the user with a mechanism to quickly preview a plurality of content available from the first application without requiring the user to navigate to the first application to browse for content), which additionally reduces power usage and improves battery life of the electronic device by enabling the user to use the electronic device more quickly and efficiency.

In some embodiments, while displaying the content corresponding to the first application icon, the electronic device detects (1358), via a remote control device with a touch-sensitive surface, an input on the touch-sensitive surface, such as in FIG. 12F (e.g., a button press input on the touch-sensitive surface or a touch-down on the touch-sensitive surface).

In some embodiments, in response to detecting the input on the touch-sensitive surface (1360), such as in FIG. 12G: in accordance with a determination that the input satisfies one or more first criteria (e.g., a button press input (e.g., actuation of a mechanical button or satisfying the criteria corresponding to a button selection gesture) or a touch-down on the touch-sensitive surface without a button press actuation), the electronic device displays (1362), overlaid on the content corresponding to the first application icon, information about the content corresponding to the first application icon and one or more selectable options to perform one or more actions with respect to the content corresponding to the first application icon, such as in FIG. 12G (e.g., in response to the user input, displaying information about the content that is currently being displayed and one or more selectable options).

In some embodiments, the information includes a short synopsis or description of the content item, the title of the content item, the year of publication of the content item, the rating of the content item (reviews, maturity ratings, etc.), the duration of the content item, the cast and crew associated with the content item (e.g., actors, directors, producers, etc.), audio/visual characteristics of the content item (e.g., icons indicating whether the item is playable in HD quality, 4K quality, HDR quality, etc.), or any combination of the forgoing. In some embodiments, the one or more selectable options includes a selectable option that is selectable to cause playback of the content item (e.g., cause the display of the content item in an application for displaying the content item). In some embodiments, the one or more selectable options includes a selectable option to acquire access to the content item. In some embodiments, the one or more selectable option includes a selectable option to display a user interface corresponding to the content item (e.g., display the content item's product page). In some embodiments, the one or more selectable options includes a selectable option to add the content item to a playback queue (e.g., an "Up Next" queue). In some embodiments, other selectable options for performing other actions are possible. In some embodiments, the information and/or the one or more selectable options are always displayed on the content display user interface, without requiring that the user perform a user input that satisfies the first criteria.

In some embodiments, in accordance with a determination that the input does not satisfy the one or more first criteria, the electronic device forgoes (1364) displaying the information about the content corresponding to the first application icon and the one or more selectable options to perform the one or more actions with respect to the content corresponding to the first application icon, such 12E (e.g., if the user input does not correspond to a click input or a touch-down input, then do not display the information and/or the selectable options). For example, if the user input corresponds to a navigational swipe input, then optionally perform a navigation action rather than display the information and/or selectable options.

The above-described manner of receiving more information and performing actions with respect to the content displayed in the content display user interface (e.g., by displaying information and selectable options in response to a user input that satisfies the first criteria) allows the electronic device to display a clean user interface until the user requests for display of other elements on the display (e.g., other information and/or selectable options for performing actions associated with the content), which simplifies the interaction between the user and the electronic device and enhances the operability of the electronic device and makes the user-device interface more efficient (e.g., by providing the user with a simple preview user interface, but also providing the user with a mechanism to view more information and/or perform actions associated with the content), which additionally reduces power usage and improves battery life of the electronic device by enabling the user to use the electronic device more quickly and efficiency, such as by streamlining the process of previewing and accessing content on the electronic device.

In some embodiments, the one or more selectable options to perform the one or more actions with respect to the content corresponding to the first application icon are arranged along the respective direction (1366), such as in FIG. 12G (e.g., the selectable options are arranged vertically or horizontally, or otherwise along a straight line in a respective direction). In some embodiments, when the selectable options are displayed, the first selectable option (e.g., top-most selectable option or left-most selectable option) has the current focus. In some embodiments, when the selectable options are displayed, then a navigational input in the respective direction of the selectable icons (e.g., a downward swipe if the selectable options are arranged vertically), will cause the focus to move from one selectable option to the next selectable option in the direction of the navigational input. In some embodiments, a navigational input in a different direction from the respective direction (e.g., a leftward or rightward swipe when the selectable options are arranged vertically), will not cause the focus to move away from the selectable option that currently has focus. In some embodiments, the focus cannot be moved from the selectable option to the displayed information (e.g., the information is not selectable). In some embodiments, the focus is able to be moved from the selectable option to the displayed information (e.g., the information is selectable to cause display of a user interface with more information or an expansion of the currently displayed information).

The above-described manner of displaying selectable options for performing actions associated with the displayed content (e.g., by displaying the selectable options arranged along a respective direction) allows the electronic device to provide the user with an easily navigable user interface (e.g., by displaying all selectable options along only one direction such that navigation in one direction will allow the user to access all of the selectable options), which simplifies the interaction between the user and the electronic device and enhances the operability of the electronic device and makes the user-device interface more efficient (e.g., by providing the user with a mechanism to quickly navigate through the selectable options without requiring the user to perform different gestures to access all of the available selectable options), which additionally reduces power usage and improves battery life of the electronic device by enabling the user to use the electronic device more quickly and efficiency.

In some embodiments, the one or more selectable options to perform the one or more actions with respect to the content corresponding to the first application icon includes a respective selectable option that is selectable to display a first application corresponding to the first application icon, and display, in the first application, respective content corresponding to the content corresponding to the first application icon (1368), such as in FIG. 12G (e.g., one of the selectable options is a selectable option that is selectable to cause playback of the content item that is displayed in the content display user interface). In some embodiments, causing playback includes displaying a content playback user interface of a respective application for displaying the content item. For example, selection of the respective selectable option causes playback of the content item in a media playback interface of a unified media browsing application (e.g., optionally launching the unified media browsing application or otherwise displaying the unified media browsing application).

The above-described manner of displaying the previewed content (e.g., by causing display of the content in response to a selection of a selectable option) allows the electronic device to provide the user with a method to cause playback of the content after previewing the content, which simplifies the interaction between the user and the electronic device and enhances the operability of the electronic device and makes the user-device interface more efficient (e.g., by providing the user with a mechanism to quickly cause full playback of the previewed content item without requiring the user to navigate away from the content display user interface, launch the respective application, and then browse to the previewed content item to cause full playback of the previewed content item), which additionally reduces power usage and improves battery life of the electronic device by enabling the user to use the electronic device more quickly and efficiency, such as by streamlining the process of accessing content on the electronic device.

In some embodiments, in accordance with a determination that viewing activity of a user with respect to the respective content is first viewing activity, the respective selectable option is selectable to display, in the first application, first respective content corresponding to the respective content (1370), such as in FIG. 12J (e.g., the content item displayed in the content display user interface is selected for inclusion in the set of content items that are available to be viewed in the content display user interface due to the user's viewing activity). For example, if the user has watched up to season 2, episode 5 of a respective television series, then one of the content items displayed in the content display user interface is season 2, episode 6 of the respective television series.

In some embodiments, in accordance with a determination that the viewing activity of the user with respect to the respective content is second viewing activity, the respective selectable option is selectable to display, in the first application, second respective content corresponding to the respective content (1372), such as in FIG. 12J (e.g., if the user has a different viewing activity, such as having watched up to season 3, episode 2 of the respective television series, then one of the content items displayed in the content display user interface is season 3, episode 3 of the respective television series).

In some embodiments, only one episode of the respective television series is displayed to the user. For example, the content displayed in the content user interface corresponds to a television series (e.g., rather than a respective episode of the television series), and selection of the selectable option causes display of a respective episode of the television series based on the user's viewing history. In some embodiments, the selectable option indicates which episode of the television series will be displayed in response to the user's selection (e.g., "Play S3 E3"). In some embodiments, the set of content items that are available to be viewed in the content display user interface comprise a movie, television series, miniseries, etc. In some embodiments, any or all of these content items are included in the set of content items based on the user's viewing history or based on the user adding these content items into a queue (e.g., "Up Next" queue).

The above-described manner of presenting content based on the user's viewing history (e.g., by causing playback of a particular content item that is based on the user's viewing history) allows the electronic device to customize the content that is displayed in response to the user's selection (e.g., by displaying different episodes of an episodic series based on whether the user has already watched certain episodes of the episodic series), which simplifies the interaction between the user and the electronic device and enhances the operability of the electronic device and makes the user-device interface more efficient (e.g., by providing the user with an easy way to cause playback of the next episode of an episodic series that the user has not yet watched), which additionally reduces power usage and improves battery life of the electronic device by enabling the user to use the electronic device more quickly and efficiency, such as by streamlining the process of accessing episodes of an episodic series on the electronic device.

In some embodiments, while displaying the content corresponding to the first application icon, the electronic device receives (1374), via the one or more input devices, an indication of a second directional input in a second respective direction, different than the respective direction, such as in FIG. 12H (e.g., a leftward or rightward navigation corresponding to a request to replace display of the current content item with the previous or next content item in the set of content items available to be viewed in the content display user interface).

In some embodiments, in response to receiving the indication of the second directional input in the second respective direction (1376), such as in FIG. 12H: in accordance with a determination that information about the content corresponding to the first application icon and one or more selectable options to perform one or more actions with respect to the content corresponding to the first application icon were displayed overlaid on the content corresponding to the first application icon when the indication of the second directional input was received (1378), such as in FIG. 12G (e.g., the information about the respective content item and the one or more selectable items are currently being displayed (e.g., in response to the user input or otherwise)): the electronic device ceases (1380) display of the content corresponding to the first application icon, such as in FIG. 12H, and displays (1382), via the display device, additional content corresponding to the first application icon without displaying the home user interface, wherein the additional content is displayed with information about the additional content and one or more selectable options to perform one or more actions with respect to the additional content overlaid on the additional content, such as in FIG. 12H (e.g., replacing display of the current content item with display of the previous or next content item in accordance with the direction of the user's navigational input).

In some embodiments, if the information about the respective content item and the one or more selectable items are currently being displayed, then preserve the display of the information and the selectable items but update the information and the selectable icons to correspond to the content that is now being displayed. For example, the information now describes the new content item and the one or more selectable options now correspond to performing actions with respect to the new content item. In some embodiments, more or fewer selectable options are displayed based on the actions that are available with the new content item.

In some embodiments, in accordance with a determination that the information about the content corresponding to the first application icon and the one or more selectable options to perform one or more actions with respect to the content corresponding to the first application icon were not displayed overlaid on the content corresponding to the first application icon when the indication of the second directional input was received (1384), such as in FIG. 12D (e.g., the information about the respective content item and the one or more selectable items are not currently being displayed): the electronic device ceases (1386) display of the content corresponding to the first application icon, such as in FIG. 12E, and displays, via the display device, the additional content corresponding to the first application icon without displaying the home user interface, wherein the additional content is displayed without the information about the additional content and the one or more selectable options to perform one or more actions with respect to the additional content overlaid on the additional content (1388), such as in FIG. 12E (e.g., replacing display of the current content item with display of the previous or next content item in accordance with the direction of the user's navigational input but do not cause the display of information or one or more selectable options). Thus, in some embodiments, if the information and selectable options are displayed when the user performs the navigational input, continue displaying information and selectable options (updated for the new content item being displayed), but if the information and selectable options are not displayed, then do not display information and selectable options for the new content item).

The above-described manner of browsing through previews of different content items (e.g., by navigating to a different content item in response to a user request to navigate to a different content item and preserving the display of information and selectable options if information and selectable options were displayed for the previous content item when the request to navigate to a different content item was received, but by continuing to not display information or selectable options if information and selectable options were not displayed for the previous content item when the request to navigate to a different content item was received) allows the electronic device to provide a consistent user interface for the user based on the user's previous requests (e.g., if the user has previously requested display of information and selectable options, then preserve the display of the information and selectable options, but if the user has not yet requested display of information and selectable options, or has dismissed display of information and selectable options, then do not display information or selectable options until the user performs an explicit request for them), which simplifies the interaction between the user and the electronic device and enhances the operability of the electronic device and makes the user-device interface more efficient (e.g., without requiring the user to perform additional inputs to display information and selectable options or to dismiss information or selectable options when the user has already shown a preference for whether to display information and selectable options), which additionally reduces power usage and improves battery life of the electronic device by enabling the user to use the electronic device more quickly and efficiency.

In some embodiments, the first application icon is an application icon for a unified media browsing application (1390), such as in FIG. 12A (e.g., the icon on the home user interface that had a focus corresponds to a unified media browsing application). In some embodiments, when the icon corresponding to the unified media browsing application has a focus, the content preview region is displaying content from the user's "Up Next" queue or featured content that is available via the unified media browsing application.

In some embodiments, the content corresponding to the unified media browsing application is displayed with a first selectable option and a second selectable option overlaid on the content corresponding to the unified media browsing application (1392), such as in FIG. 12G (e.g., while in the content display user interface displayed in response to an upward swipe input when the unified media browsing application had a focus, then the one or more selectable options (that are displayed in response to a user input that satisfies certain criteria described above) include two selectable options).

In some embodiments, the first selectable option is selectable to (1394): in accordance with a determination that a user of the electronic device has entitlement to view respective content in the unified media browsing application that corresponds to the content corresponding to the unified media browsing application, display, in the unified media browsing application, the respective content (1396), such as in FIG. 12J (e.g., if the user is entitled to view the content item being displayed in the content display user interface, the first selectable option is selectable to cause playback of the content item in a playback user interface of the unified media browsing application (e.g., optionally launch or otherwise display the unified media browsing application)).

In some embodiments, in accordance with a determination that the user of the electronic device does not have entitlement to view the respective content in the unified media browsing application, display, via the display device, a user interface for obtaining entitlement to view the respective content in the unified media browsing application (1398), such as in FIG. 12R (e.g., if the user is not entitled to view the content item being displayed in the content display user interface, the first selectable option is selectable to initiate a process for obtaining entitlement). For example, the device displays a user interface for subscribing to a respective subscription service, subscribing to a respective content provider, purchasing or renting the content item from a respective content provider, or otherwise acquiring access to the content item. In some embodiments, the device displays a product page for the content in the unified media browsing application and navigates to a section of the product page that displays information of one or more methods of acquiring access (e.g., obtaining entitlement) to the content item (e.g., display the product page scrolled to the "How to Watch" section of the product page).

In some embodiments, the second selectable option is selectable to display, in the unified media browsing application, a user interface dedicated to the respective content (1398-2), such as in FIG. 12N (e.g., the second selectable option is selectable to cause the display of a product page for the content item (e.g., optionally navigated to the top of the product page, as opposed to the "How to Watch" section) in the unified media browsing application (e.g., optionally launch or otherwise display the unified media browsing application)).

The above-described manner of dynamically presenting selectable options based on the user's entitlements (e.g., causing playback of the previewed content item if the user is entitled to view the content and by displaying a user interface for obtaining entitlement if the user is not yet entitled to view the content) allows the electronic device to perform the best course of action for accessing the previewed content item in response to the user expressing a desire to access the previewed content item, which simplifies the interaction between the user and the electronic device and enhances the operability of the electronic device and makes the user-device interface more efficient (e.g., without requiring the user to separately determine whether the user is entitled to view the content item and navigate to a separate user interface to acquire entitlement to the content item before accessing the content item), which additionally reduces power usage and improves battery life of the electronic device by enabling the user to use the electronic device more quickly and efficiency, such as by streamlining the process of accessing content on the electronic device.

In some embodiments, the first application icon is an application icon for a respective application that provides content based on a subscription to a subscription service (1398-4), such as in FIG. 12V (e.g., the icon on the home user interface that had a focus corresponds to an application browsing application for a game subscription service). In some embodiments, the application browsing application for the game subscription service is an application in which the user is able to browse for and download applications (e.g., games) included in the game subscriptions service. In some embodiments, the game subscription service is a service in which a subscription to the game subscription service provides the user with access to a plurality of games included in the game subscription service (e.g., some or all of the games included in the game subscription service).

In some embodiments, the content corresponding to the respective application is displayed with a first selectable option overlaid on the content corresponding to the respective application (1398-6), such as in FIG. 12Y (e.g., while in the content display user interface displayed in response to an upward swipe input when the application browsing application for the game subscription service had a focus, then the one or more selectable options (that are displayed in response to a user input that satisfies certain criteria described above) include one selectable option).

In some embodiments, the first selectable option is selectable to (1398-8): in accordance with a determination that a user of the electronic device has a subscription to the subscription service, display, in the respective application, respective content from the respective application that corresponds to the content corresponding to the respective application (1398-10), such as in FIG. 12Y (e.g., if the user has a subscription to the subscription service, then selection of the first selectable option causes the device to launch (or display of) the application that is being displayed in the content display user interface).

In some embodiments, if the user has a subscription to the subscription service, but the respective application is not yet downloaded and/or installed on the electronic device, then selection of the first selectable option initiates a process for downloading and/or installing (or otherwise acquiring) the respective application. In some embodiments, if the user has not previously progressed in the respective application (e.g., has not played the game), then the first selectable option is selectable to begin the application from the beginning (e.g., start at the beginning of the game). In some embodiments, if the user has partially progressed in the respective application (e.g., has partially played through the game), then the first selectable option is selectable to continue at the current progress position of the respective application (e.g., continue playing the game at the previous playthrough position). In some embodiments, the selectable option indicates the action that is performed when the selectable option is selected (e.g., “Get”, “Play”, “Continue Play”, etc.).

In some embodiments, in accordance with a determination that the user of the electronic device does not have a subscription to the subscription service, display, via the display device, a user interface from which the subscription to the subscription service can be obtained (1398-12), such as in FIG. 12BB (e.g., if the user does not have a subscription to the subscription service, then initiate a process for acquiring a subscription to the subscription service. In some embodiments, the process includes display of a user interface providing more information about the subscription service and providing an option for subscribing to the subscription service).

The above-described manner of accessing subscription content (e.g., by causing display of the subscription application if the user has a subscription to the subscription service and by displaying a user interface for subscribing to the subscription service if the user does not have a subscription to the subscription service) allows the electronic device to perform the best course of action for accessing the previewed content item in response to the user expressing a desire to access the previewed content item, which simplifies the interaction between the user and the electronic device and enhances the operability of the electronic device and makes the user-device interface more efficient (e.g., without requiring the user to separately determine whether the user has a subscription to the subscription service and navigate to a separate user interface to acquire a subscription to the subscription service to the content item before accessing the content item), which additionally reduces power usage and improves battery life of the electronic device by enabling the user to use the electronic device more quickly and efficiency, such as by streamlining the process of accessing subscription content on the electronic device.

In some embodiments, the first application icon is an application icon for a photo and video browsing application (1398-14), such as in FIG. 12DD (e.g., the icon on the home user interface that had a focus corresponds to a photo and video browsing application). In some embodiments, the photo and video browsing application allows the user to browse for and view photos and videos that are saved on the electronic device or on a server. In some embodiments, when the icon corresponding to the photo and video browsing application has a focus, the content preview region is displaying a featured collection of photos and/or videos.

In some embodiments, the content corresponding to the photo and video browsing application is displayed with a first selectable option and a second selectable option overlaid on the content corresponding to the photo and video browsing application (1398-16), such as in FIG. 12EE (e.g., while in the content display user interface displayed in response to an upward swipe input when the application browsing application for the photos and video browsing application had a focus, then the one or more selectable options (that are displayed in response to a user input that satisfies certain criteria described above) include two selectable options). In some embodiments, the two selectable options are always displayed on the content display user interface (e.g., overlaid over the content) without requiring that the user perform a user input that satisfies a respective criteria.

In some embodiments, the content corresponding to the photo and video browsing application includes a subset of photos or videos of a given collection of photos or videos in the photo and video browsing application (1398-18), such as in FIG. 12EE (e.g., the content that is displayed in the content display user interface associated with the photo and video browsing application comprises a subset of a given collection). In some embodiments, the content display user interface is displaying still photos, a slide show of still photos, a video, a slideshow of videos, or any combination of the above. In some embodiments, each content item (e.g., “page”) displayed in the content display user interface corresponds to a given collection of photos and/or videos (e.g., an album, an automatically generated album, an album shared to the user by another user, or any other type of collection). In some embodiments, when the content display region is displaying a particular collection, only a subset of the items in the particular collection are shown (e.g., as a slideshow). In some embodiments, when the content display region is displaying a particular collect, all of the items in the particular collection are shown (e.g., as a slideshow).

In some embodiments, the first selectable option is selectable to playback, in the photo and video browsing application, an arrangement of photos or videos from the given collection of photos or videos (1398-20), such as in FIG. 12GG (e.g., the first selectable option is selectable to cause display of the currently displayed collection (e.g., a slideshow of all of the items in the collection) in the photos and video browsing application (e.g., launching or otherwise displaying the photos and video browsing application)).

In some embodiments, the second selectable option is selectable to display, in the photo and video browsing application, a user interface for manually browsing photos or videos from the given collection of photos or videos (1398-22), such as in FIG. 12LL (e.g., the second selectable option is selectable to cause display of a browsing user interface for manually (e.g., with user input) browsing through the displayed collection in the photos and video browsing application (e.g., launching or otherwise displaying the photos and video browsing application)).

The above-described manner of accessing photo and video content (e.g., by displaying a preview of a collection of photos and/or videos and causing display of the respective collection in the photo and video browsing application in response to a request to view the collection of photos and/or videos or causing display of user interface for browsing photos and/or videos in response to a request to browse for photos and/or videos) allows the electronic device to provide the user with options for how to viewing the previewed content, which simplifies the interaction between the user and the electronic device and enhances the operability of the electronic device and makes the user-device interface more efficient (e.g., by providing multiple viewing options for the respective collection to the user without requiring the user to navigate to the photo and video application to access the same options), which additionally reduces power usage and improves battery life of the electronic device by enabling the user to use the electronic device more quickly and efficiency, such as by streamlining the process of viewing a collection of photos and/or videos on the electronic device.

In some embodiments, the first application icon is an application icon for a podcast application (1398-24), such as in FIG. 12OO (e.g., the icon on the home user interface that had a focus corresponds to a podcast application.) In some embodiments, the podcast application allows the user to browse for, subscribe, and cause playback of podcasts. In some embodiments, when the icon corresponding to the podcast application has a focus, the content preview region is displaying a featured podcast.

In some embodiments, the content corresponding to the podcast application is displayed with a first selectable option and a second selectable option overlaid on the content corresponding to the podcast application (1398-26), such as in FIG. 12PP (e.g., while in the content display user interface displayed in response to an upward swipe input when the application browsing application for the podcast application had a focus, then the one or more selectable options (that are displayed in response to a user input that satisfies certain criteria described above) include two selectable options). In some embodiments, the information and/or the two selectable options are always displayed on the content display user interface (e.g., overlaid over the content) without requiring that the user perform a user input that satisfies a respective criteria.

In some embodiments, the content corresponding to the podcast application includes content corresponding to a given podcast in the podcast application (1398-28), such as in FIG. 12PP (e.g., the content that is displayed in the content display user interface is associated with a particular podcast that is accessible from the podcast application). In some embodiments, the content is an image or graphic representing the podcast. In some embodiments, the content is a promotional video, trailer, or teaser for the podcast.

In some embodiments, the first selectable option is selectable to play, in the podcast application, the given podcast (1398-30), such as in FIG. 12PP (e.g., the first selectable option is selectable to cause playback of the displayed podcast in the podcast application (e.g., launching or otherwise displaying the podcast application). In some embodiments, the second selectable option is selectable to display, in the podcast application, a user interface dedicated to the given podcast that includes information about the given podcast (1398-32), such as in FIG. 12PP (e.g., the second selectable option is selectable to display a product page corresponding to the displayed podcast (e.g., a user interface with information about the podcast that optionally displays the available episodes of the podcast) and from which the user is able to cause playback of one or more episodes of the podcast).

The above-described manner of accessing podcasts (e.g., by displaying a preview of featured podcasts and causing playback of the previewed podcast in response to a user request to play back the previewed podcast or causing display of a user interface for viewing more information about the previewed podcast in response to a user request to view information about the previewed podcast) allows the electronic device to provide the user with multiple options for interacting with the previewed podcast (e.g., to cause playback if the user is interested in the podcast, or to display more information if the user wants to view more information before deciding whether to play the podcast), which simplifies the interaction between the user and the electronic device and enhances the operability of the electronic device and makes the user-device interface more efficient (e.g., without requiring the user to separately navigate to the podcast application and then browse for the previewed podcast to determine whether the user is interested in the podcast and to initiate playback of the podcast), which additionally reduces power usage and improves battery life of the electronic device by enabling the user to use the electronic device more quickly and efficiency, such as by streamlining the process of accessing podcasts on the electronic device.

In some embodiments, the first application icon is an application icon for a music application (1398-34), such as in FIG. 12SS (e.g., the icon on the home user interface that had a focus corresponds to a music application). In some embodiments, the music application allows the user to browse for, subscribe, and cause playback of music. In some embodiments, when the icon corresponding to the music application has a focus, the content preview region is displaying a featured music video and/or a music video from a featured playlist.

In some embodiments, the content corresponding to the music application is displayed with a first selectable option and a second selectable option overlaid on the content corresponding to the music application (1398-36), such as in FIG. 12TT (e.g., while in the content display user interface displayed in response to an upward swipe input when the application browsing application for the music application had a focus, then the one or more selectable options (that are displayed in response to a user input that satisfies certain criteria described above) include two selectable options). In some embodiments, the two selectable options are always displayed on the content display user interface (e.g., overlaid over the content) without requiring that the user perform a user input that satisfies a respective criteria.

In some embodiments, the content corresponding to the music application includes content from a given playlist in the music application (1398-38), such as in FIG. 12TT (e.g., the content displayed in the content display user interface corresponds to a given playlist (e.g., a given song in a given playlist)). In some embodiments, the content displayed is a music video corresponding to a song on the given playlist. In some embodiments, the content display region automatically plays a music video corresponding to the next song in the given playlist after the completion of playback of the music video of the previous song in the given playlist. In some embodiments, the music videos that are displayed in the content display user interface are a subset of the songs in the given playlist (if music videos exist for the respective songs). In some embodiments, the music videos that are displayed in the content display user interface are all of the songs in the given playlist (if music videos exist for the respective songs).

In some embodiments, the first selectable option is selectable to play, in the music application, the given playlist (1398-40), such as in FIG. 12TT (e.g., the first selectable option is selectable to cause playback of the playlist in the music application (e.g., launching the music application or otherwise display the music application)). In some embodiments, playback of the playlist in the music application begins at the beginning of the playlist. In some embodiments, playback of the playlist in the music application begins at the current position in the playlist (e.g., that has been reached by the content display user interface.

In some embodiments, the second selectable option is selectable to display, in the music application, additional content from the given playlist (1398-42), such as in FIG. 12TT (e.g., the second selectable option is selectable to cause display of a browsing user interface of the music application for browsing for content in the given playlist). In some embodiments, the second selectable option is selectable to cause display of a browsing user interface of the music application for browsing for all content available via the music application (e.g., not limited to the given playlist).

The above-described manner of displaying music content (e.g., by causing playback of music videos from a featured playlist and causing playback of the playlist in response to the user request to view the playlist or by displaying a user interface for browsing through the featured playlist in response to the user request to view the items in the playlist) allows the electronic device to provide the user with multiple options for interacting with the previewed playlist, which simplifies the interaction between the user and the electronic device and enhances the operability of the electronic device and makes the user-device interface more efficient (e.g., without requiring the user to separately navigate to the music application and then browse for the previewed playlist to determine whether the user is interested in the music videos in the playlist and then to initiate playback of the music videos in the playlist), which additionally reduces power usage and improves battery life of the electronic device by enabling the user to use the electronic device more quickly and efficiency, such as by streamlining the process of accessing music content on the electronic device.

In some embodiments, the first region of the home user interface includes a third application icon (1398-44), such as in FIG. 12XX. In some embodiments, while the third application icon has the current focus in the first region of the home user interface (e.g., when a third application in the prioritized row of application has a focus), the electronic device receives (1398-46), via the one or more input devices, an indication of a second directional input in the respective direction, such as in FIG. 12YY (e.g., an upward swipe or upward navigational input).

In some embodiments, in response to receiving the indication of the second directional input in the respective direction (1398-48), such as in FIG. 12YY: in accordance with a determination that the third application icon is compatible with display of content corresponding to the third application icon in response to a directional input in the respective direction (1398-50), such as in FIG. 12AAA (e.g., the third application icon supports the functionalities of the prioritized row of icons or otherwise supports displaying content in the content preview region): the electronic device ceases display (1398-52) of the home user interface, such as in FIG. 12D, and displays, via the display device, content corresponding to the third application icon (1398-54), such as in FIG. 12D (e.g., entering into the content display user interface to display (in full screen or substantially full screen) content associated with the third application).

In some embodiments, in accordance with a determination that the third application icon is not compatible with the display of content corresponding to the third application icon in response to a directional input in the respective direction, such as in FIG. 12XX (e.g., the third application does not support the functionalities of the prioritized row of icon or otherwise does not support displaying content in the content preview region): the electronic device maintains display (1398-58) of the home user interface, such as in FIG. 12YY, and moves the current focus from the third application icon to a representation of content available in the third application icon that is displayed in the home user interface in response to the third application icon having the current focus (1398-60), such as in FIG. 12YY (e.g., do not enter into the content display user interface and moving the focus from the third application icon to one or more representations of content (e.g., icons) that are displayed in the content preview region).

In some embodiments, if a respective application does not support the functionalities of the prioritized row of icons, then instead of displaying content in the content preview region (and from which an upward swipe navigation causes display of a content display user interface), then the content preview region displays one or more icons of content that is available from the respective application that are selectable to cause playback of the respective content.

The above-described manner of previewing content available in an application that does not support the prioritized region functionalities (e.g., by displaying, in the content preview region, representations of content available from the respective application, which are selectable to cause display of the respective content in the respective application) allows the electronic device to provide the user with the ability to move a preferred application to the prioritized region and still be able to quickly access content from the preferred application, even if the application does not support the full functionalities of the prioritized region, which simplifies the interaction between the user and the electronic device and enhances the operability of the electronic device and makes the user-device interface more efficient (e.g., by providing the user a mechanism to move a preferred application to the prioritized region while still providing some ability to quickly access certain content from the preferred application, without requiring the user to always navigate around the home user interface to find the preferred application and navigate into the preferred application to quickly find available content), which additionally reduces power usage and improves battery life of the electronic device by enabling the user to use the electronic device more quickly and efficiency, such as by streamlining the process of content from a particular user-preferred application on the electronic device.

In some embodiments, the first region of the home user interface includes a predetermined number (e.g., one, two, three) of most-recently accessed application icons and one or more application icons that are displayed in the first region of the home user interface independent of activity accessing the one or more application icons (1398-62), such as in FIG. 12XX (e.g., the prioritized row of icons includes a section for one or more applications that correspond to the most recently displayed applications alongside a section for one or more applications that are in the prioritized row of icons without regard to its usage activity (e.g., the icons were placed in the prioritized row by default, the user has placed the icons in the prioritized row, etc.)).

In some embodiments, if a recently accessed application already has a corresponding icon in the prioritized row of icons, then do not include a second icon of the application in the section for recently displayed applications. In some embodiments, the section for one or more applications is visually separated from the section for other icons (e.g., by a line or other visual divider or boundary). In some embodiments, if the icons of the recently displayed applications in the prioritized row of icons are compatible with the functionalities of the prioritized row of icons, then focus on the respective icon will cause display of content in the content preview region (e.g., and optionally the display of the content display user interface in response to an upward swipe input). In some embodiments, if the icons of the recently displayed applications in the prioritized row of icons are not compatible with the functionalities of the prioritized row of icons, then focus on the respective icon will not cause display of content in the content preview region and optionally causes display of one or more icons of content available from the respective application.

The above-described manner of displaying recently accessed applications (e.g., by displaying a number of recently accessed applications I the prioritized region which are selectable to cause display of the respective application) allows the electronic device to provide the user with a shortcut to access applications that the user has shown an interest in accessing (e.g., by recently accessing the respective applications), which simplifies the interaction between the user and the electronic device and enhances the operability of the electronic device and makes the user-device interface more efficient (e.g., by providing a shortcut to recently accessed applications without requiring the user to separately navigate the home user interface to find and launch the recently accessed applications), which additionally reduces power usage and improves battery life of the electronic device by enabling the user to use the electronic device more quickly and efficiency, such as by streamlining the process of accessing recently accessed applications on the electronic device.

In some embodiments, while a second respective application icon in the home user interface has a current focus, the electronic device receives (1398-64), via the one or more input devices, an indication of a second directional input in the respective direction, such as in FIG. 12D (e.g., receiving an upward swipe input when the second respective application's icon has a focus).

In some embodiments, in response to receiving the indication of the second directional input in the respective direction (1398-66), such as in FIG. 12D: in accordance with a determination that the second respective application icon is compatible with display of content corresponding to the second respective application icon in response to a directional input in the respective direction (1398-68), such as in FIG. 12A (e.g., the second application is compatible with the functionalities of the prioritized row of icons): in accordance with a determination that the second respective application icon was in the first region of the home user interface when the indication of the second directional input was received, the electronic device ceases display of the home user interface and displays, via the display device, content corresponding to the second respective application icon (1398-70), such as in FIG. 12D (e.g., if the second application's icon is in the prioritized row of icons when it has a focus, then display content in the content display region such that an upward swipe navigation will cause display of the content display user interface).

In some embodiments, in response to receiving the indication of the second directional input in the respective direction (1398-66): in accordance with a determination that the second respective application icon is compatible with display of content corresponding to the second respective application icon in response to a directional input in the respective direction (1398-68) (e.g., the second application is compatible with the functionalities of the prioritized row of icons): in accordance with a determination that the second respective application icon was in the second region of the home user interface when the indication of the second directional input was received, the electronic device forgoes ceasing display of the home user interface and forgoes displaying, via the display device, the content corresponding to the second respective application icon (1398-72), such as in FIG. 12C (e.g., if the second application's icon is not in the prioritized row of icons when it has a focus, then an upward swipe navigation does not cause the device to display the content display user interface (e.g., optionally the focus is moved from the second application's icon to another application's icon).

In some embodiments, in accordance with a determination that the second respective application icon is not compatible with display of content corresponding to the second respective application icon in response to a directional input in the respective direction (1398-74), such as in FIG. 12XX (e.g., the second application is not compatible with the functionalities of the prioritized row of icons): in accordance with a determination that the second respective application icon was in the first region of the home user interface when the indication of the second directional input was received, forgoing ceasing display of the home user interface and forgoing displaying, via the display device, the content corresponding to the second respective application icon (1398-76), such as in FIG. 12YY (e.g., if the second application was in the prioritized row of icons, then an upward swipe navigation does not cause the device to display the content display user interface (e.g., optionally the focus is moved from the second application's icon to icons corresponding to content associated with the second application)). In some embodiments, if the second application was not in the prioritized row of icons when it has a focus, then an upward swipe navigation does not cause the device to display the content display user interface (e.g., optionally the focus is moved from the second application's icon to another application's icon).

The above-described manner of interacting with applications on the electronic device (e.g., by displaying content in the content preview region if the respective application with focus is in the prioritized region and supports the functionalities of the prioritized region or by not displaying content in the content preview region if the respective application is not in the prioritized region (e.g., moving a focus) or if the respective application does not support the functionalities of the prioritized region (e.g., display icons of content items in the content preview region), allows the electronic device to provide the user with the ability to move applications to different locations in the home user interface and adjust the functionality of the applications and the device based on the location and the functionalities supported by the applications, which simplifies the interaction between the user and the electronic device and enhances the operability of the electronic device and makes the user-device interface more efficient (e.g., without fixing the position of the respective application in their respective regions, which potentially requires the user to perform excessive user inputs to navigate to an application that the user is potentially more interested in (e.g., applications not in the prioritized region) or to be presented with applications that the user is potentially not interested in (e.g., applications in the prioritized region)), which additionally reduces power usage and improves battery life of the electronic device by enabling the user to use the electronic device more quickly and efficiency, such as by streamlining the process of accessing applications on the electronic device.

It should be understood that the particular order in which the operations in FIGS. 13A-13L have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, 1700, and 1900) are also applicable in an analogous manner to method 1300 described above with respect to FIGS. 13A-13L. For example, the operation of the electronic device to present enhanced previews of items of content with reference to method 1300 optionally has one or more of the characteristics of the presentation of presenting representations of content items, presenting options for accessing the content based on available means for accessing items of content, presenting representations of episodes of collections of episodic content, presenting a control panel, switching the active user of the device, and entering into a picture-in-picture mode, etc., described herein with reference to other methods described herein (e.g., methods 700, 900, 1100, 1500, 1700, and 1900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIGS. 13A-13L are, optionally, implemented by components depicted in FIGS. 1A-1B. For example, displaying operations 1302, 1310, 1312, 1326, 1328, 1336, 1338, 1346, 1348, 1354, 1356, 1362, 1364, 1380, 1382, 1386, 1388, 1396, 1398, 1398-10, 1398-12, 1398-52, 1398-54, 1398-58, 1398-70, 1398-72, and 1398-76, receiving operations 1304, 1316, 1322, 1330, 1350, 1374, 1398-46, 1398-64, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting a Control Center User Interface

Users interact with electronic devices in many different manners, including using an electronic device to browse for and view items of content on the electronic device. In some embodiments, an electronic device is able to present a control center user interface including a plurality of options for controlling the operation of the electronic device. The embodiments described below provide ways in which an electronic device presents these options for controlling the operation of the electronic device in a control center user interface. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 14A:
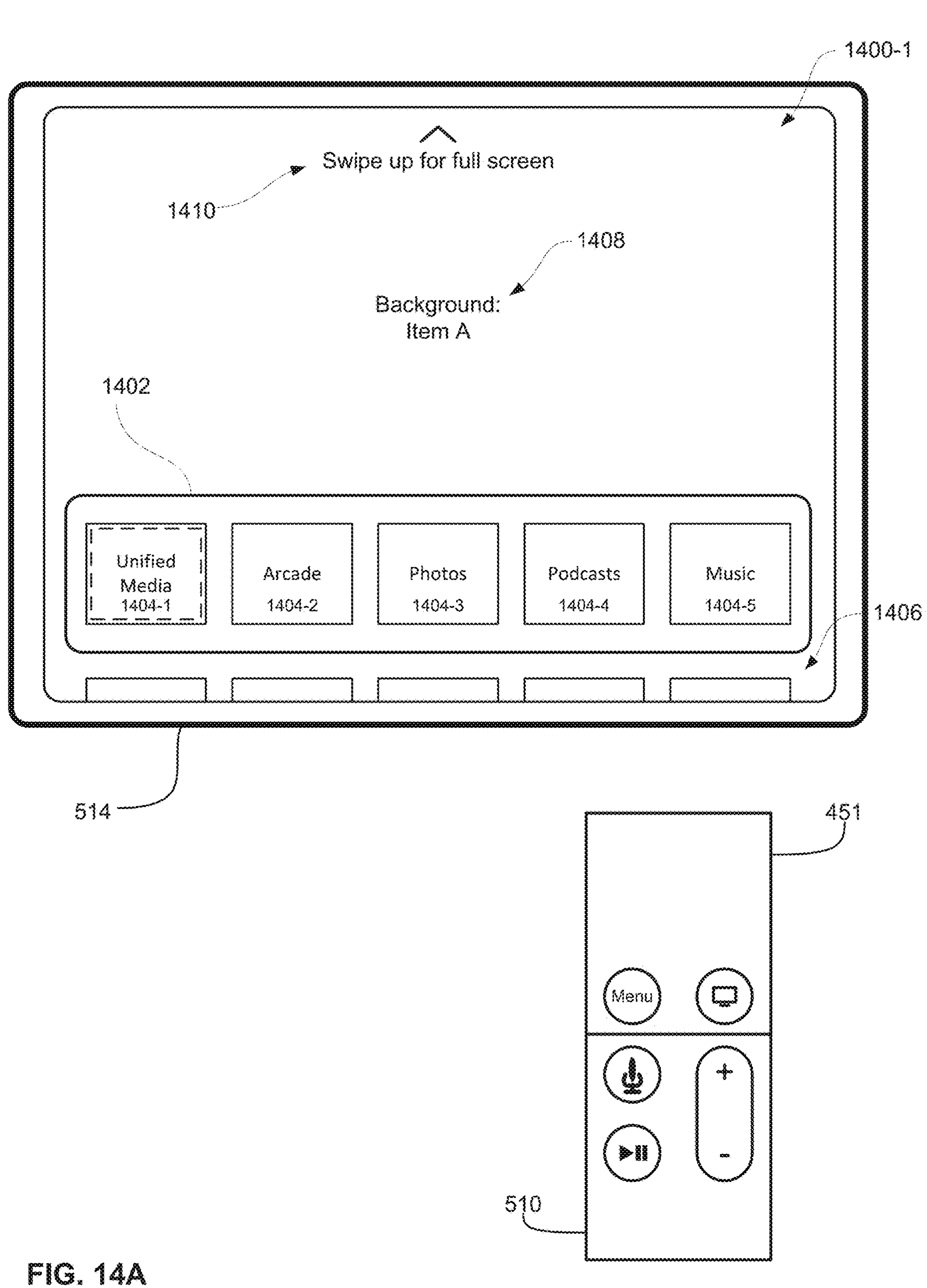
FIGS. 14A-14T illustrate exemplary ways in which an electronic device presents a control center user interface in accordance with some embodiments of the disclosure.
Figure 14B:
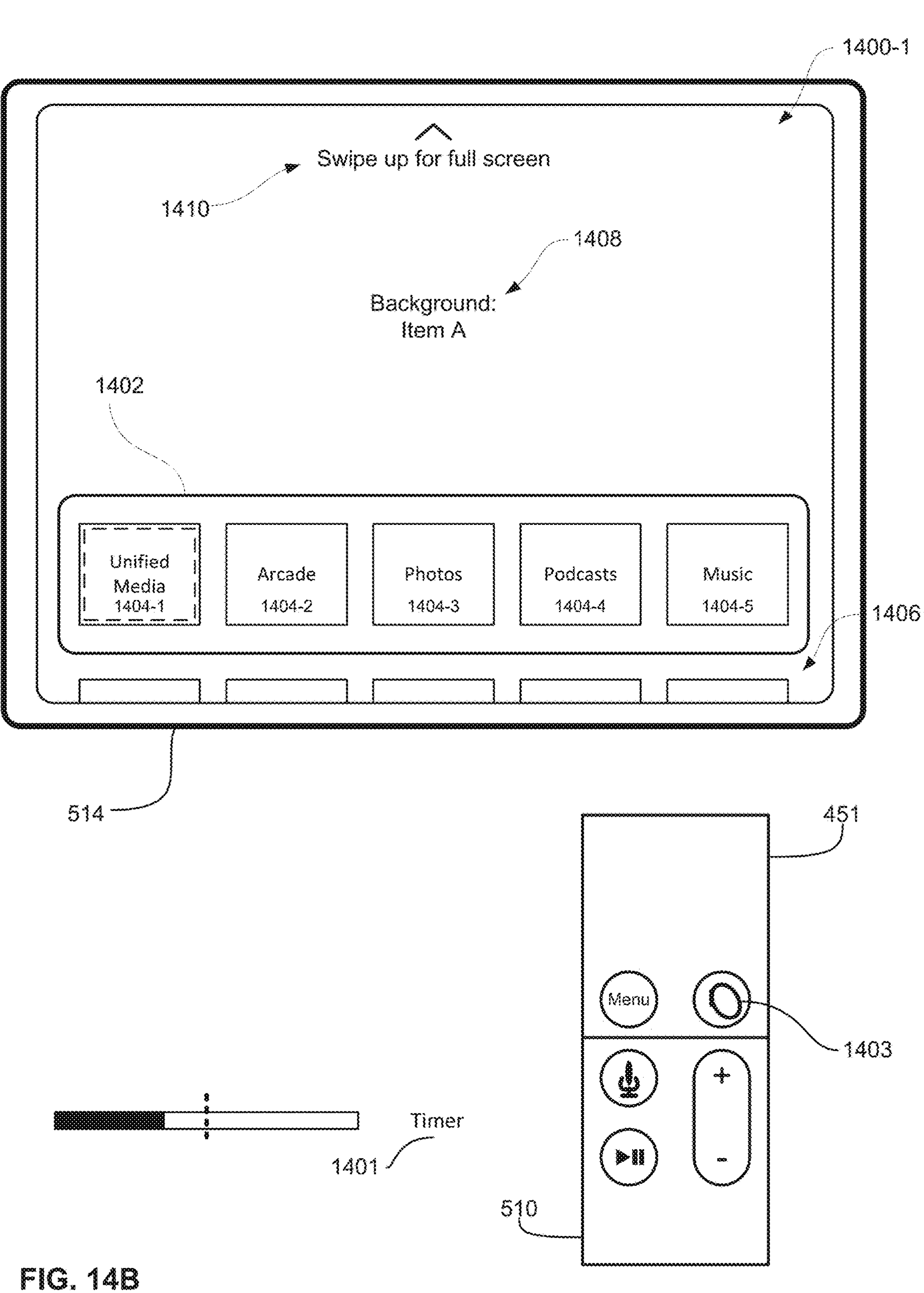
Figure 14C:
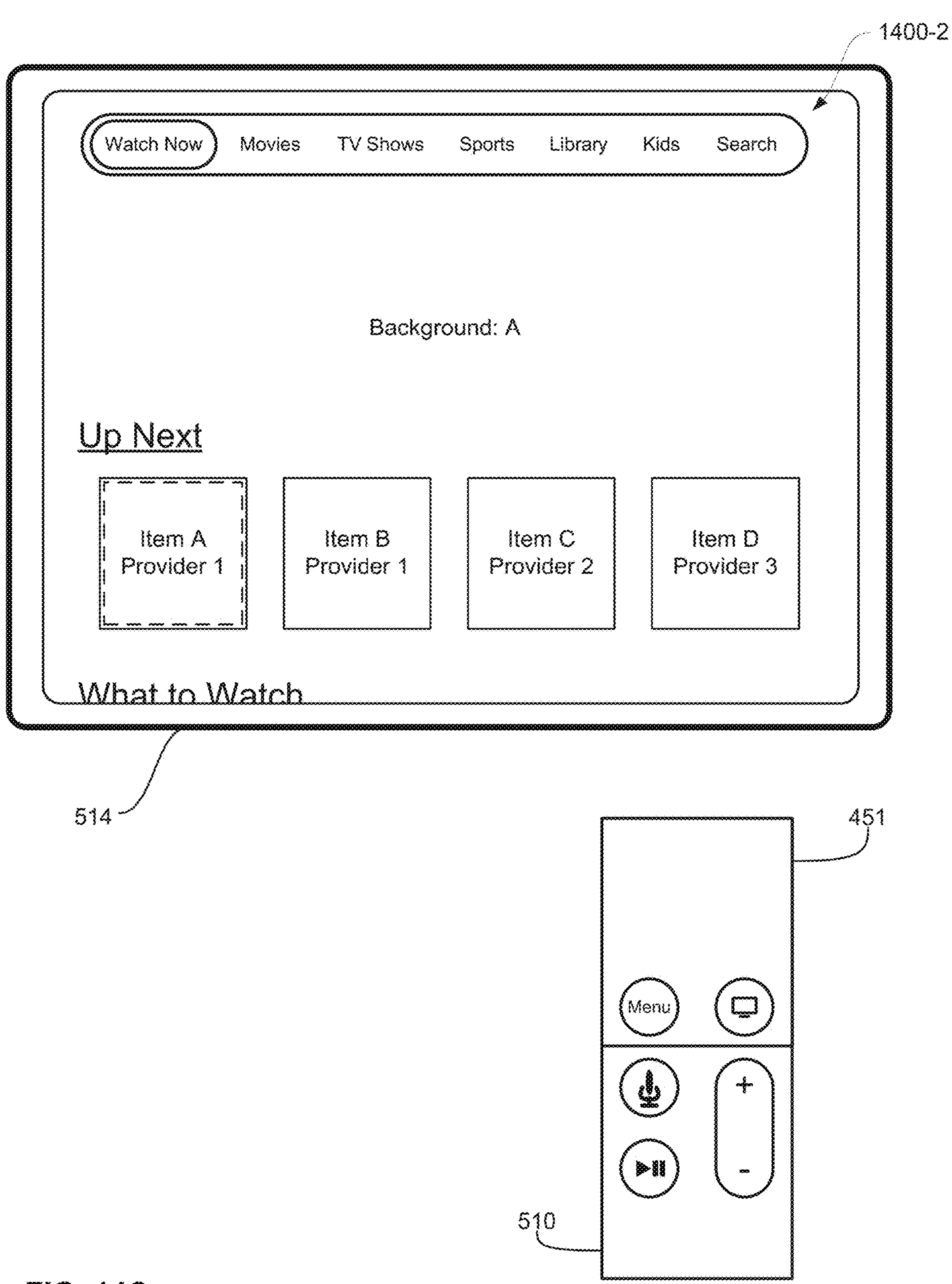
Figure 14D:
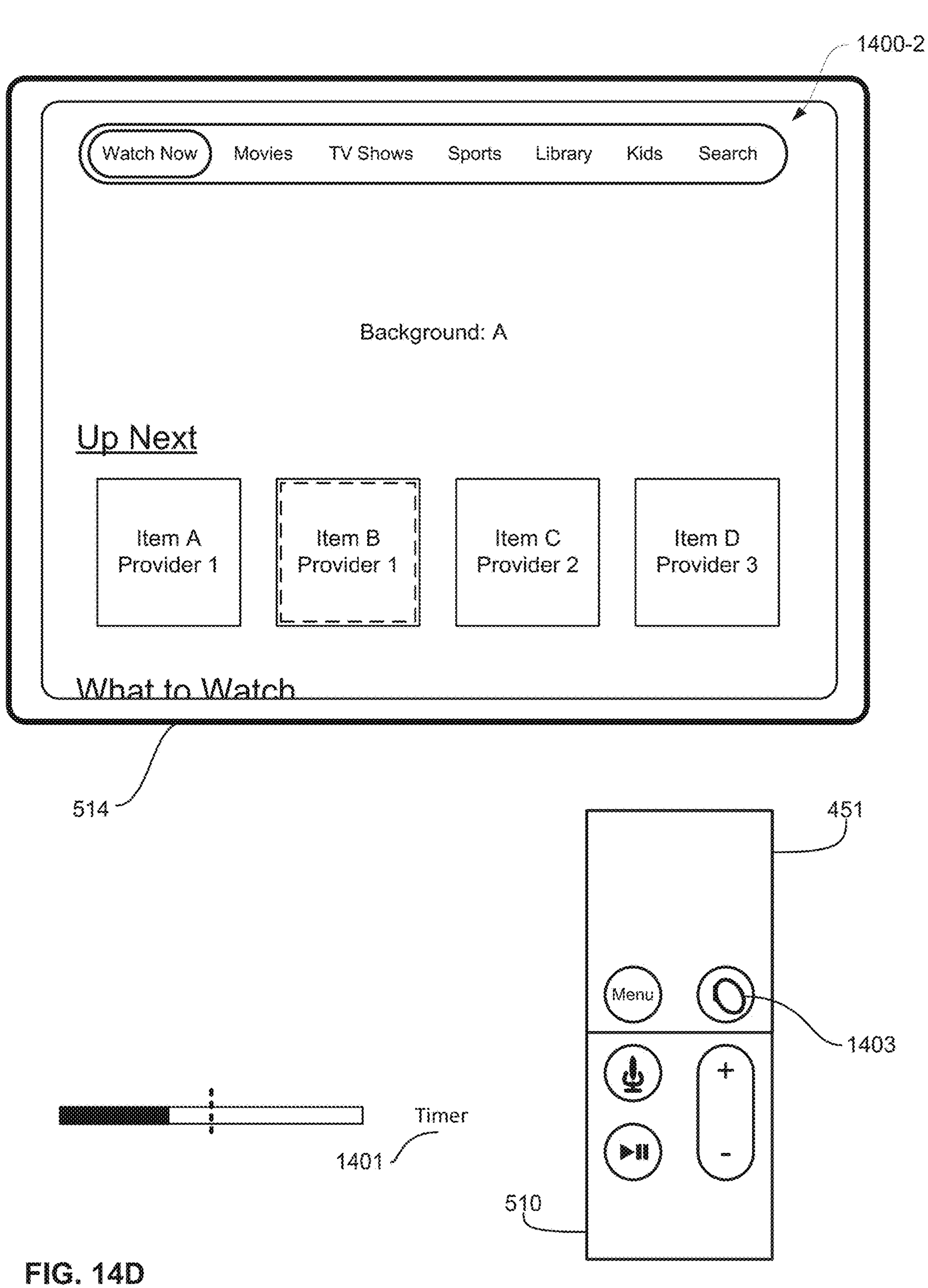
Figure 14E:
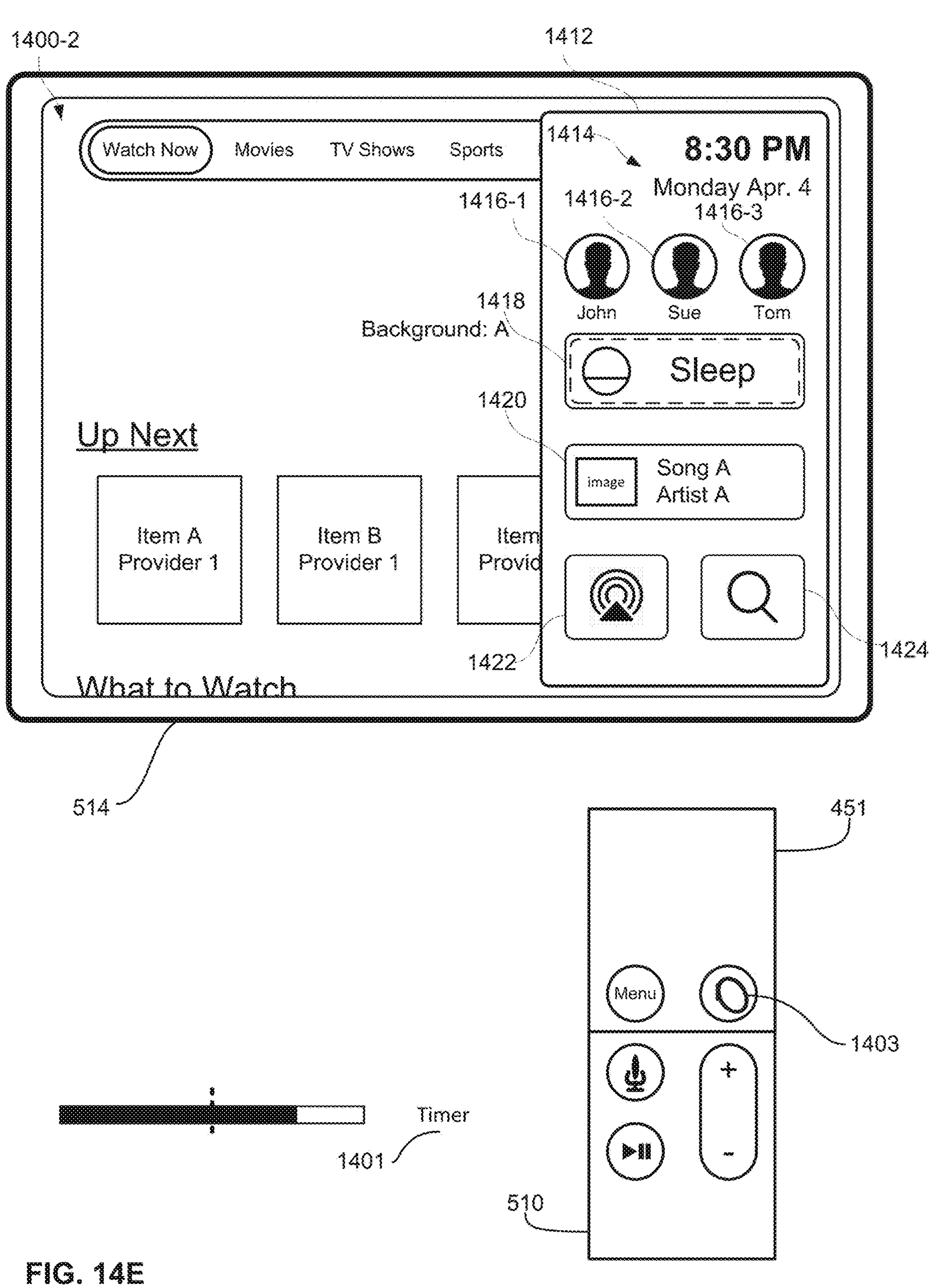
Figure 14F:
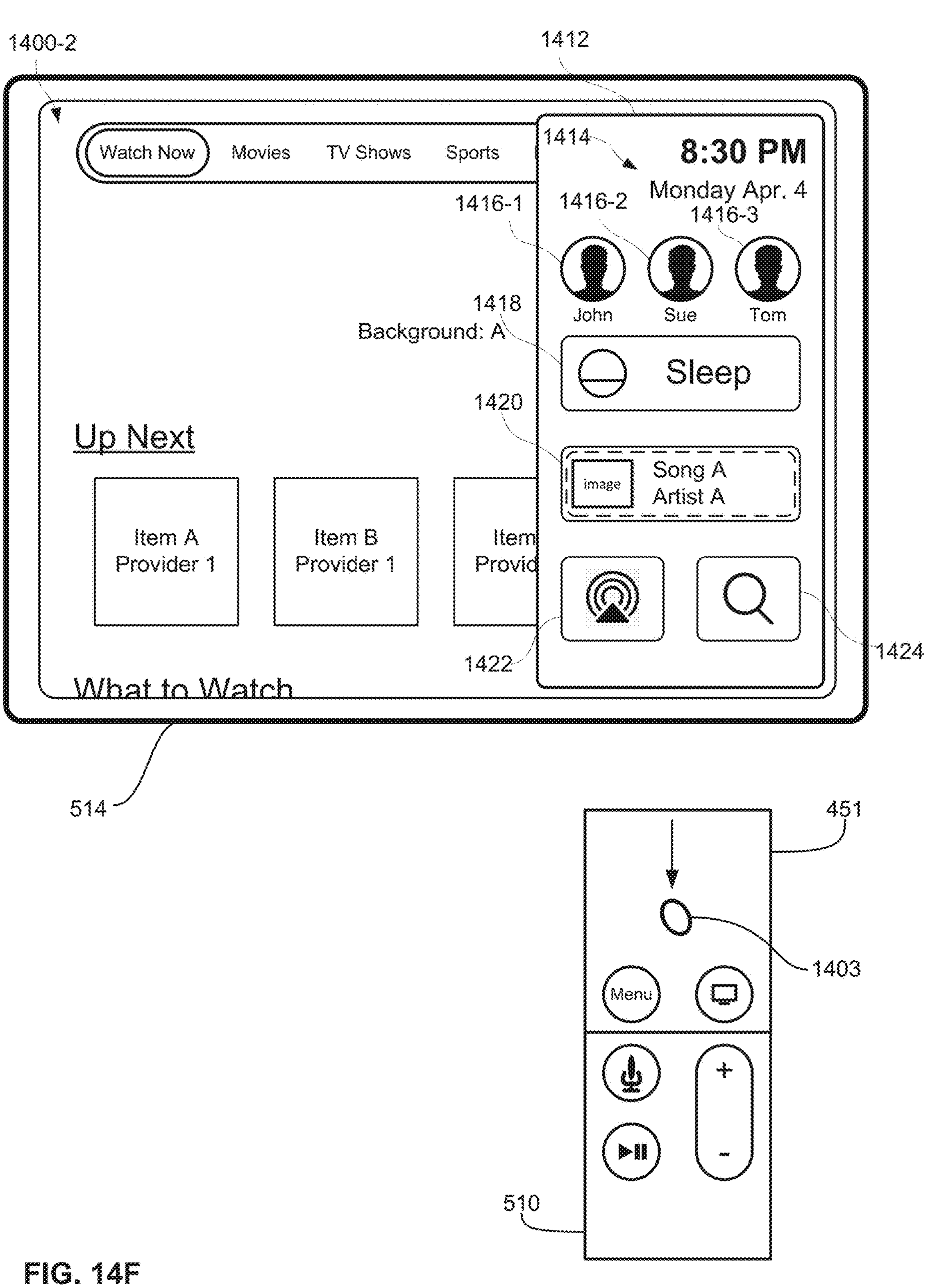
Figure 14G:
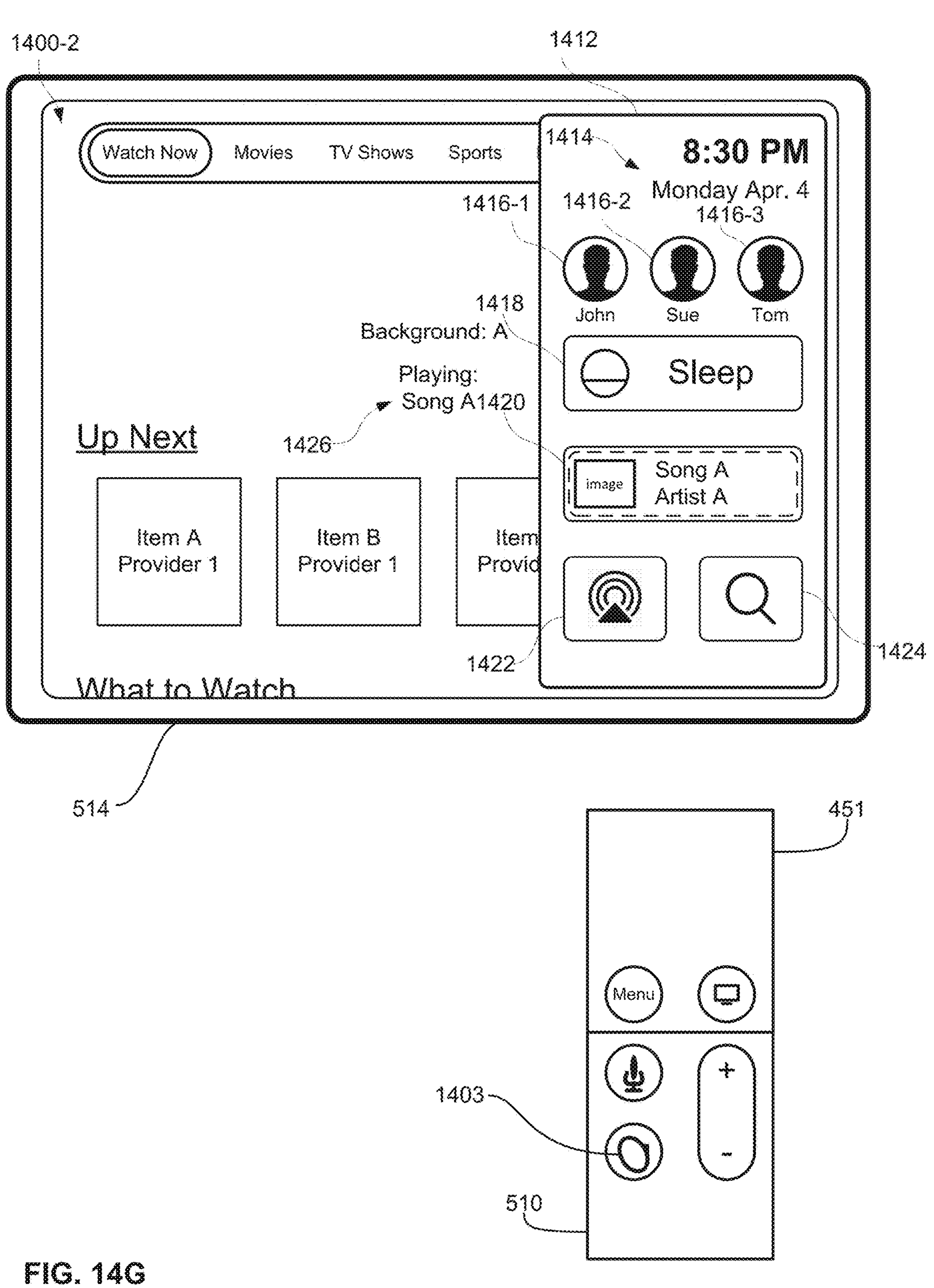
Figure 14H:
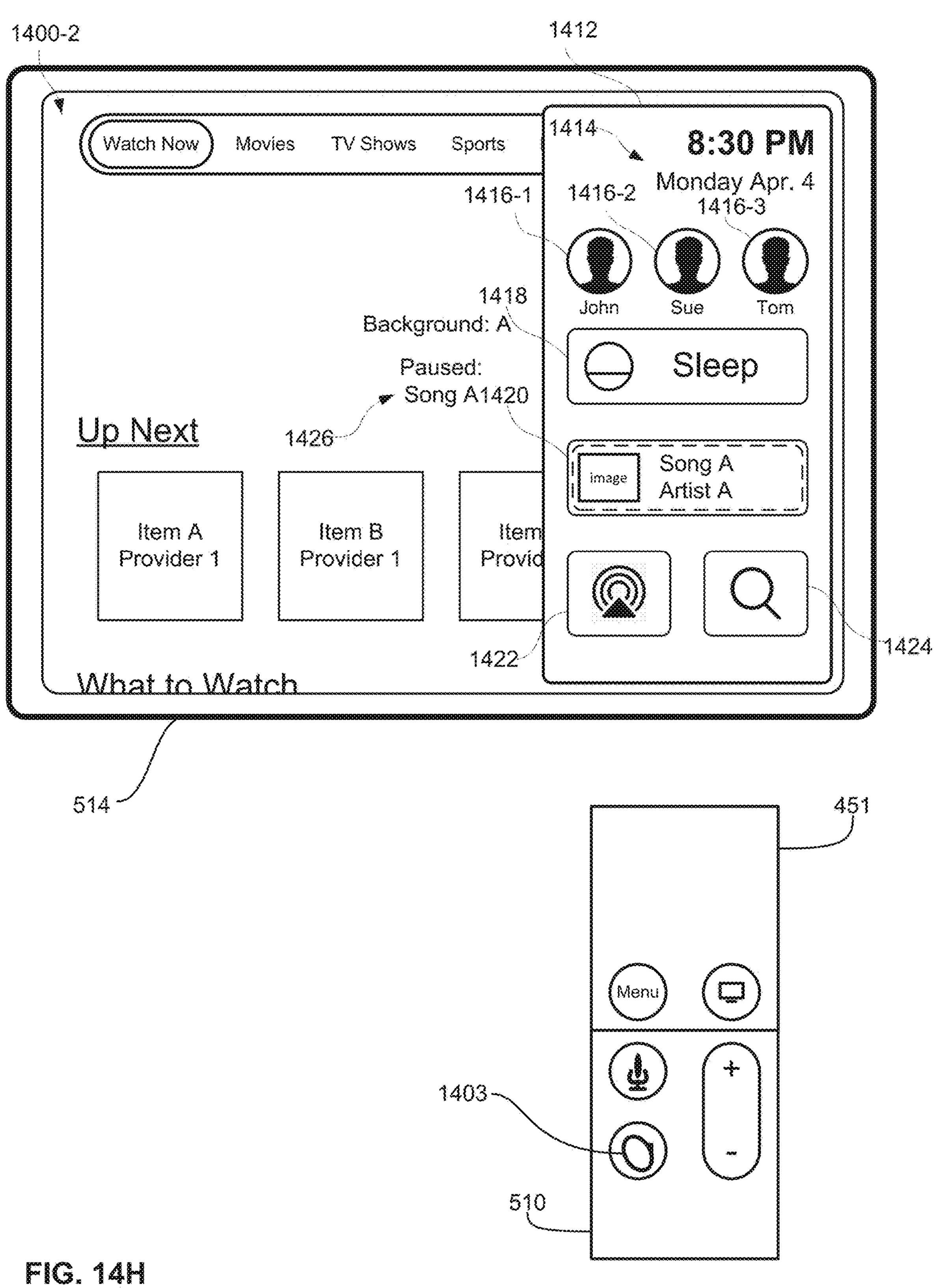
Figure 14I:
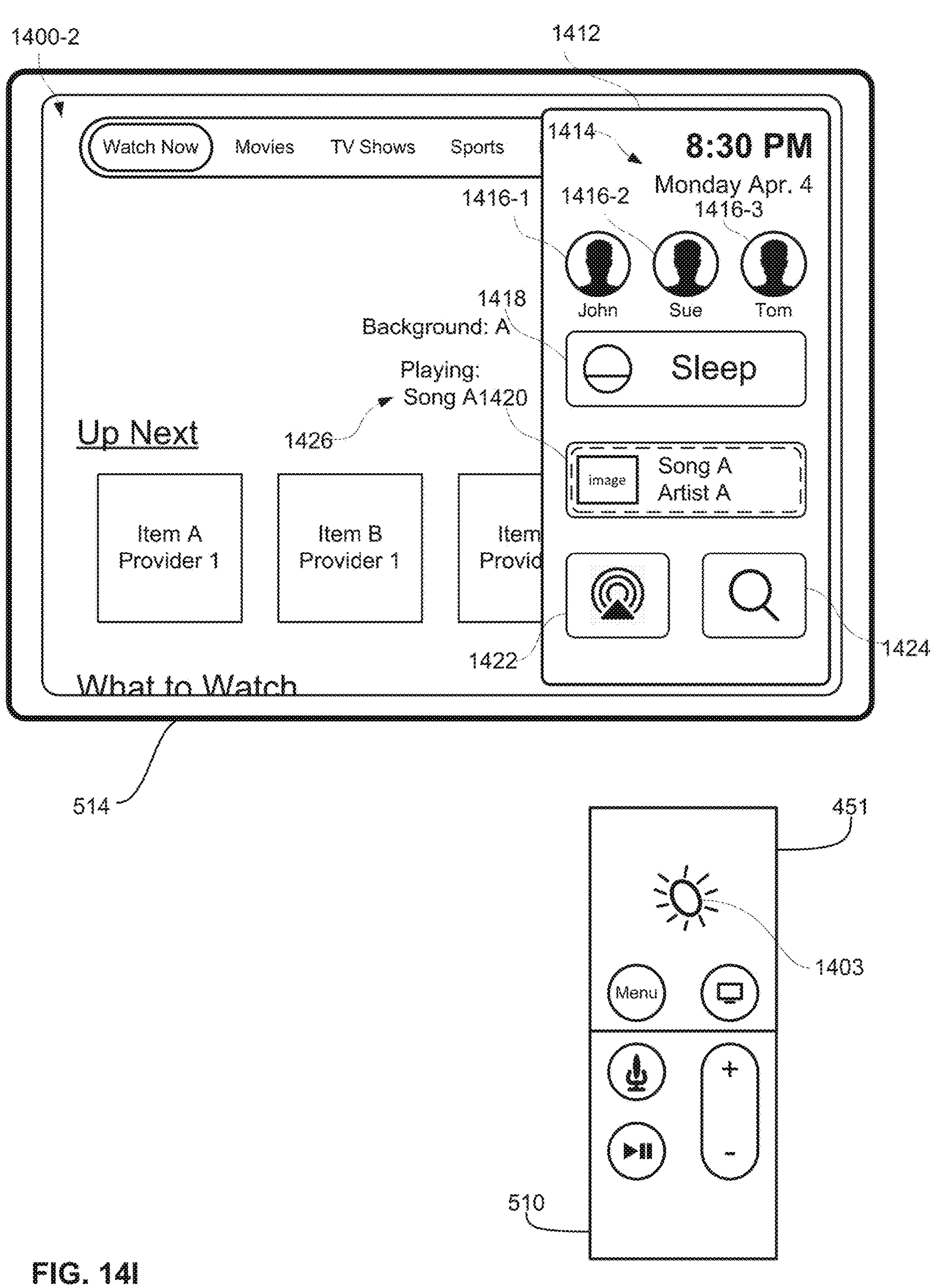
Figure 14J:
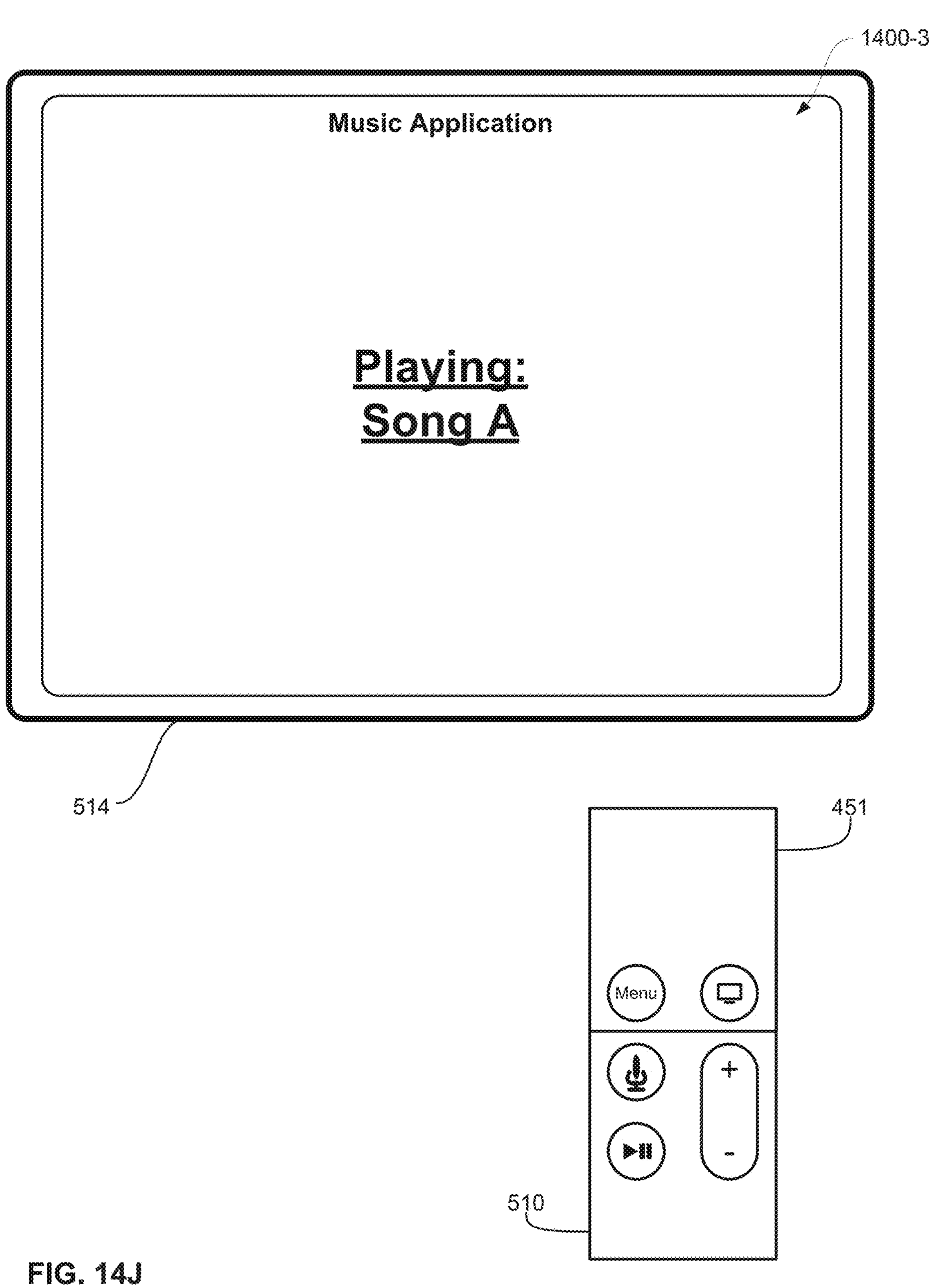
Figure 14K:
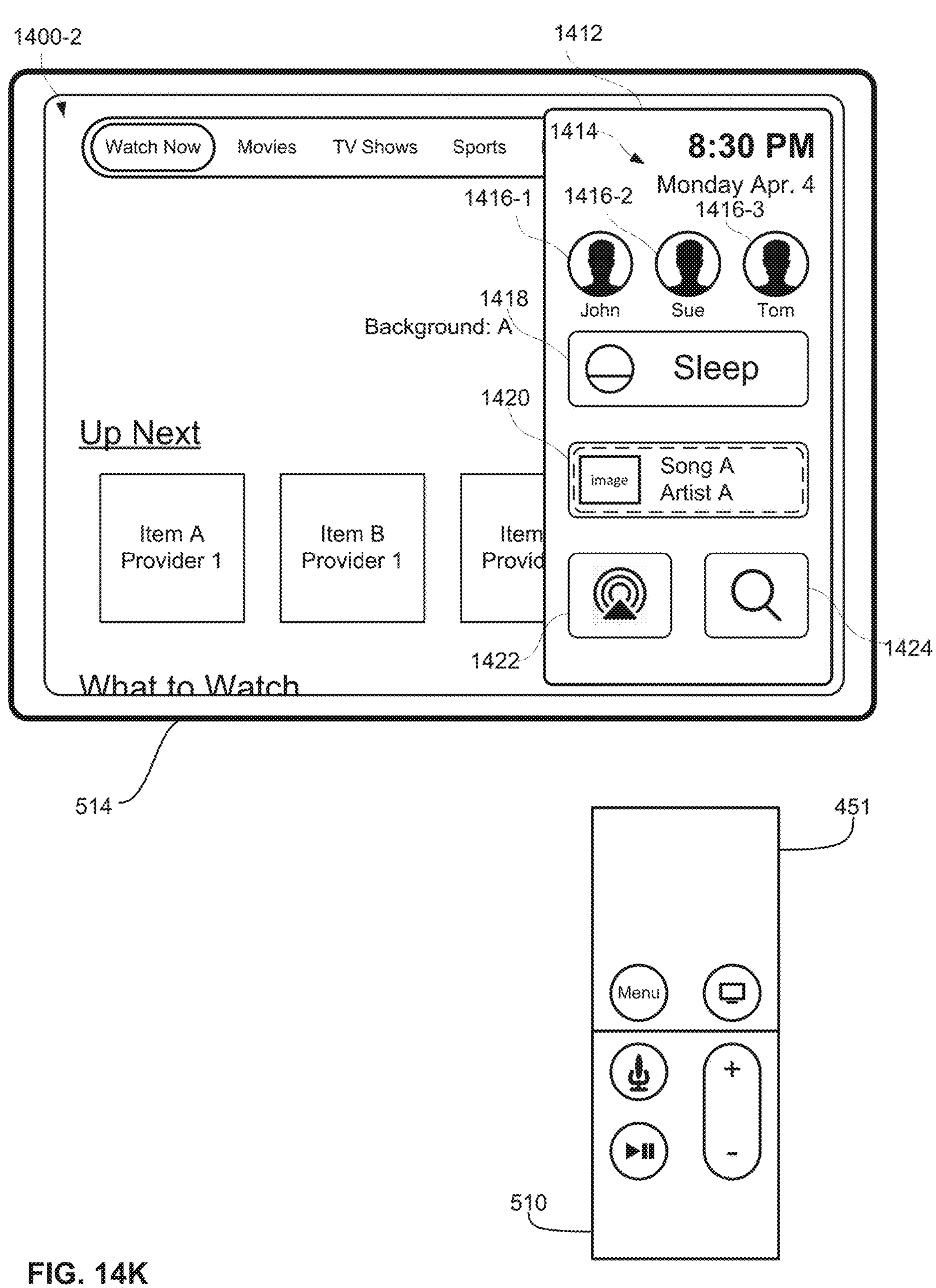
Figure 14L:
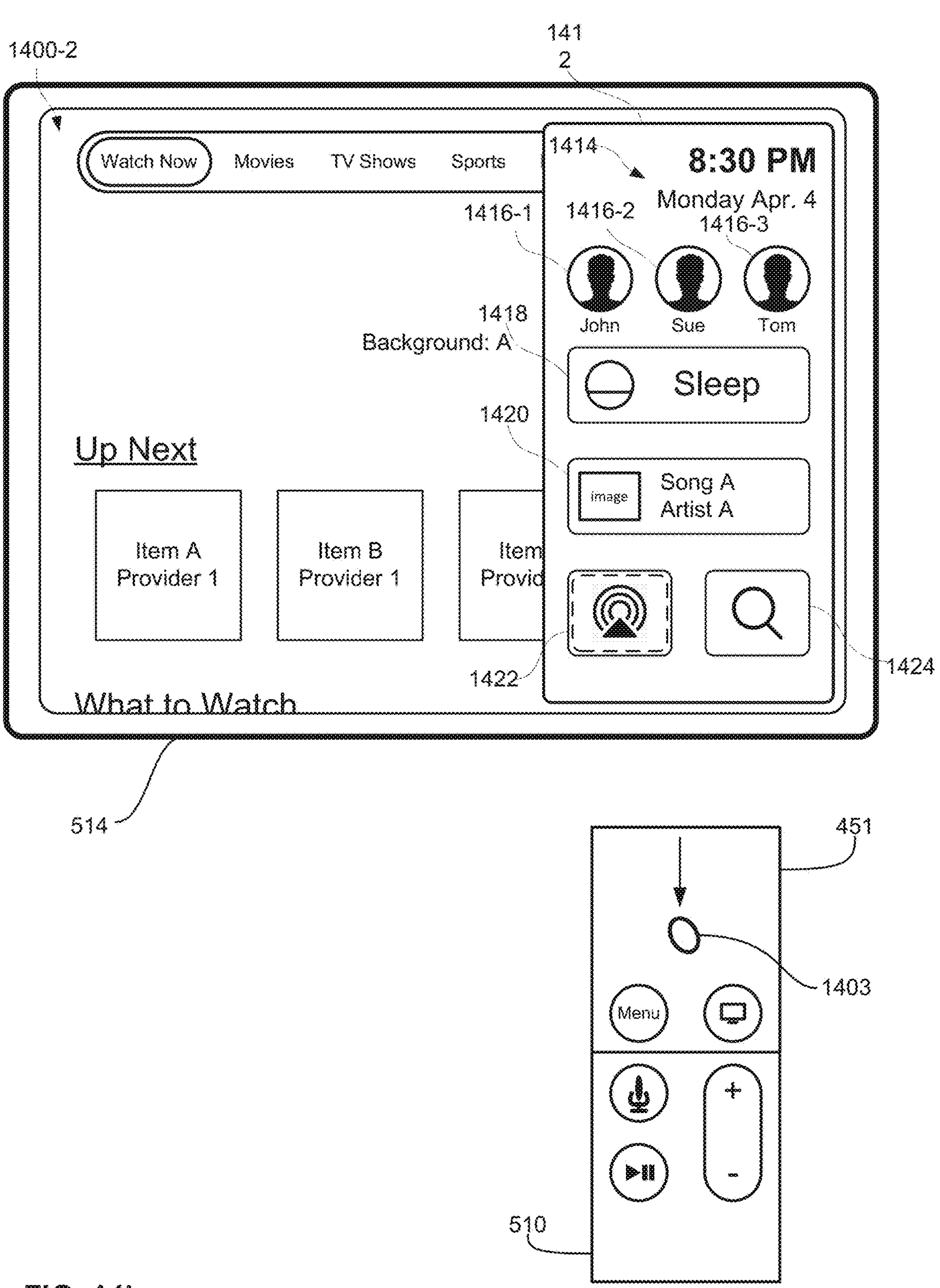
Figure 14M:
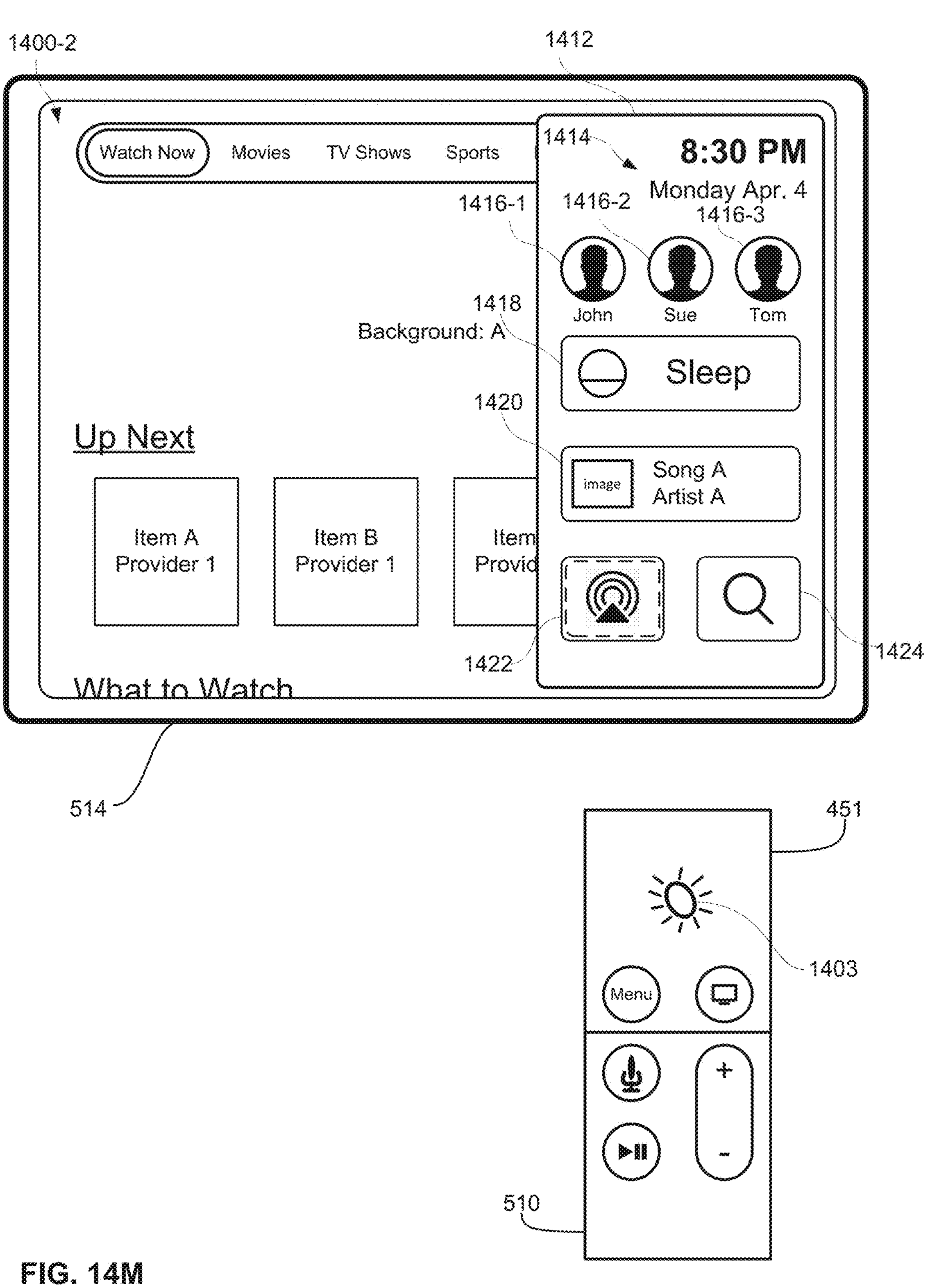
Figure 14N:
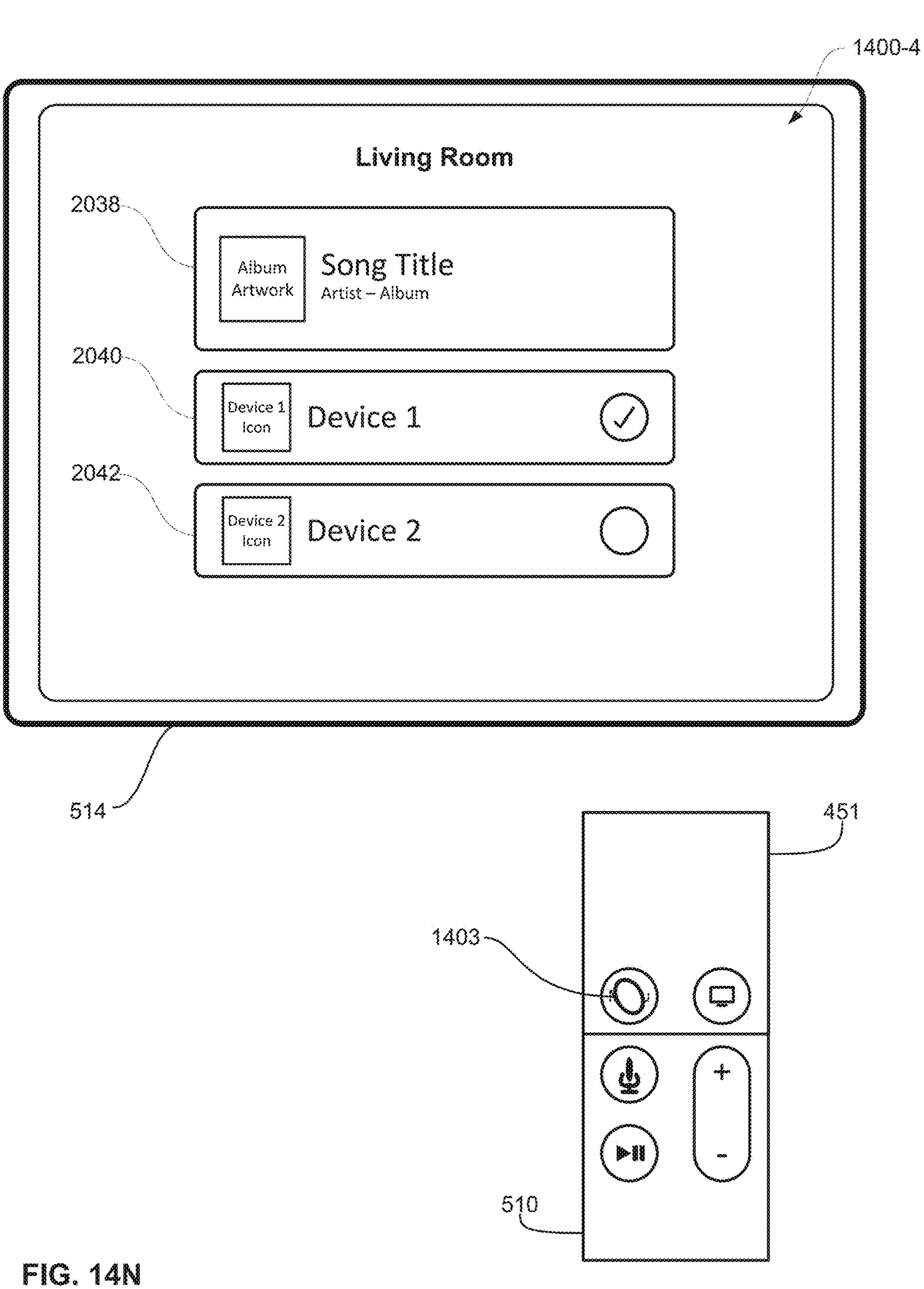
Figure 14O:
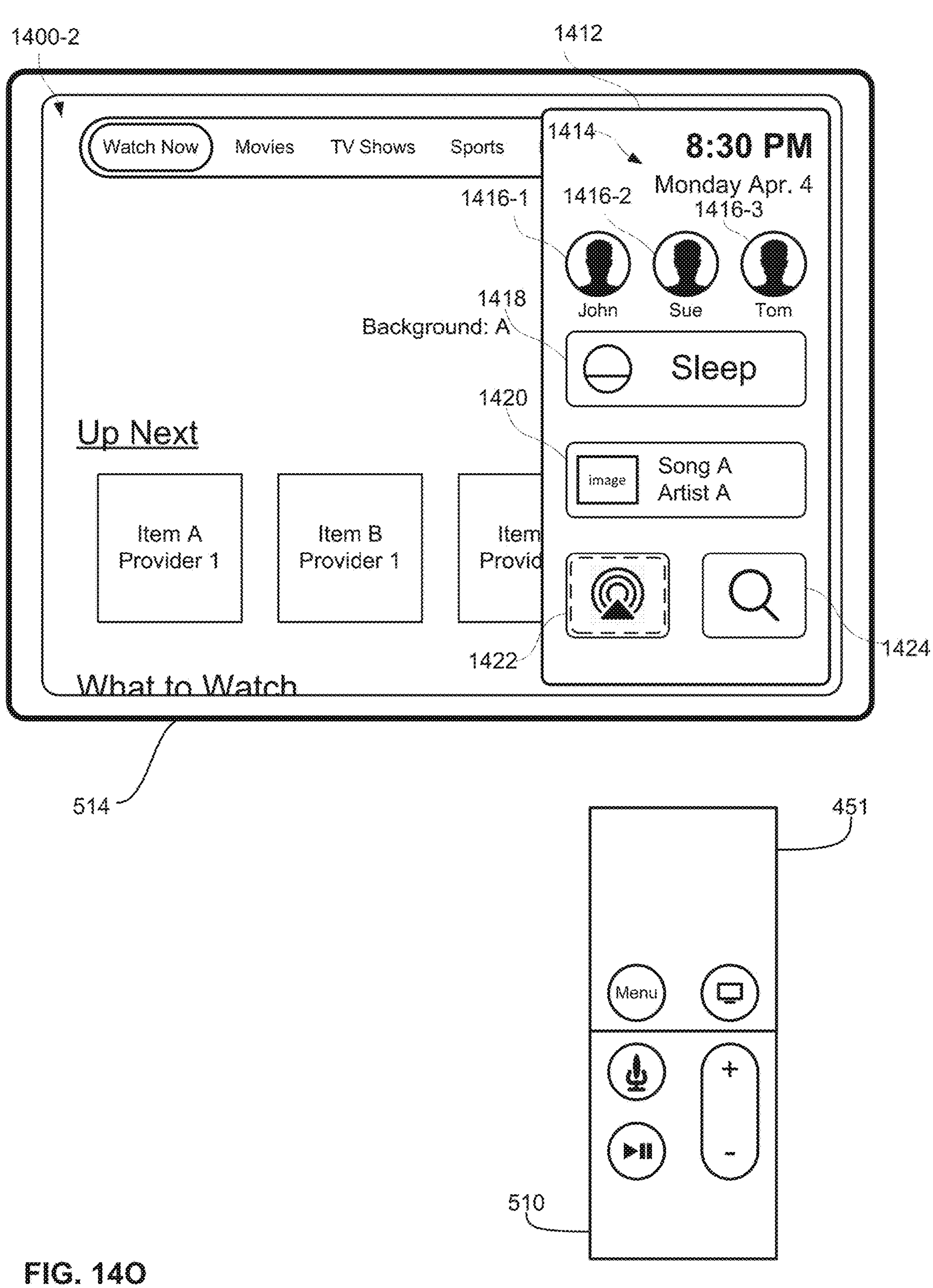
Figure 14P:
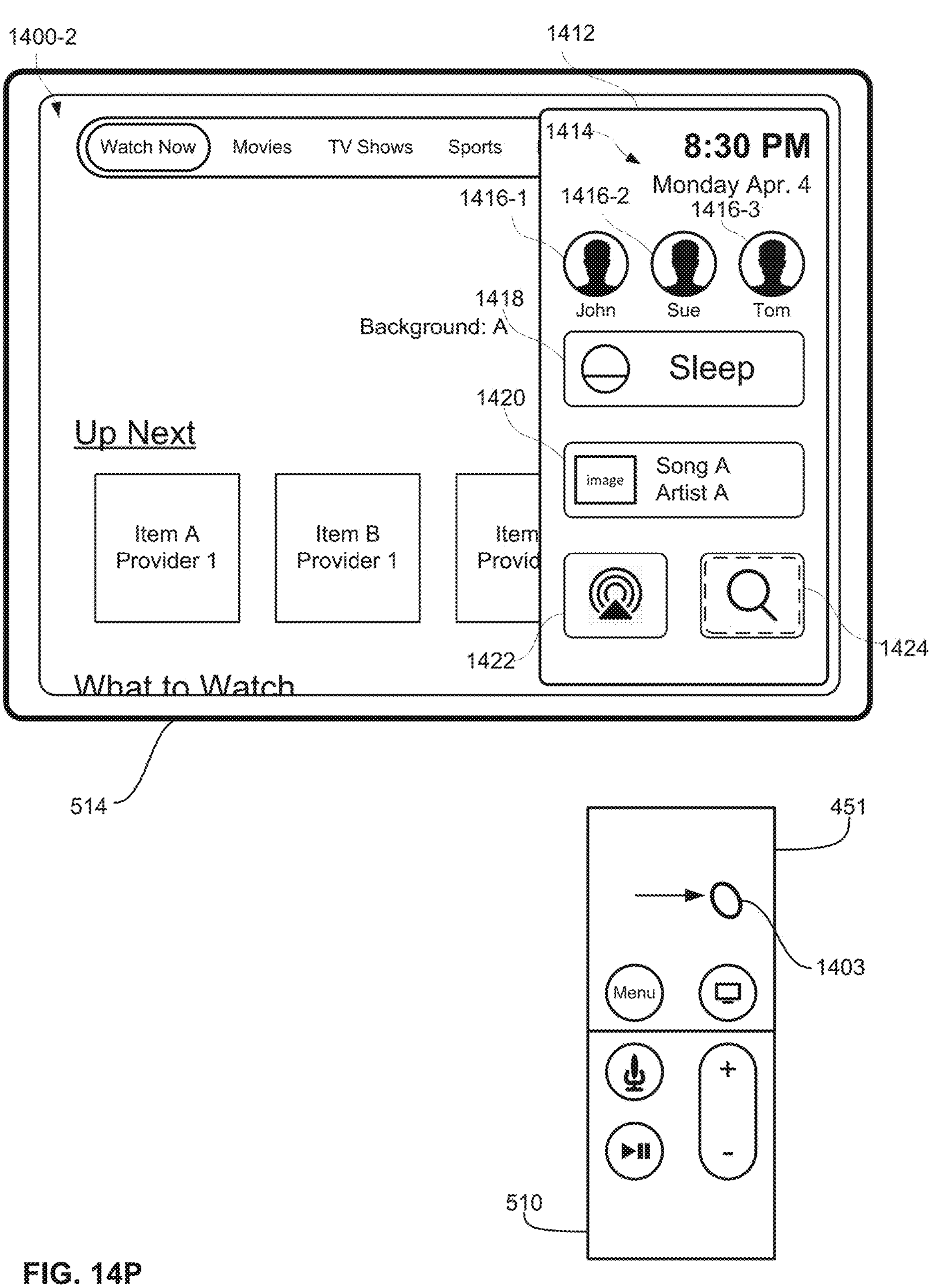
Figure 14Q:
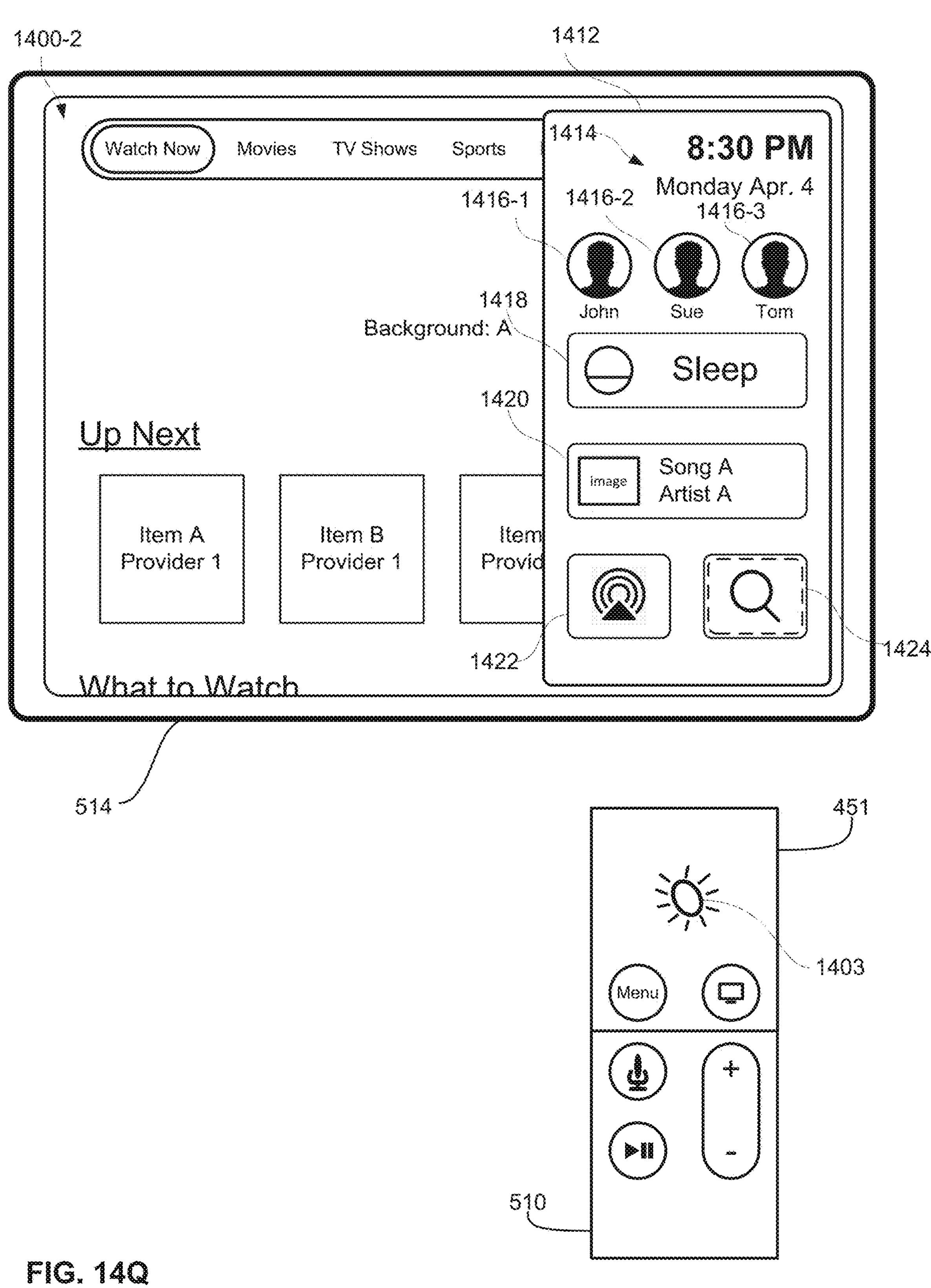
Figure 14R:
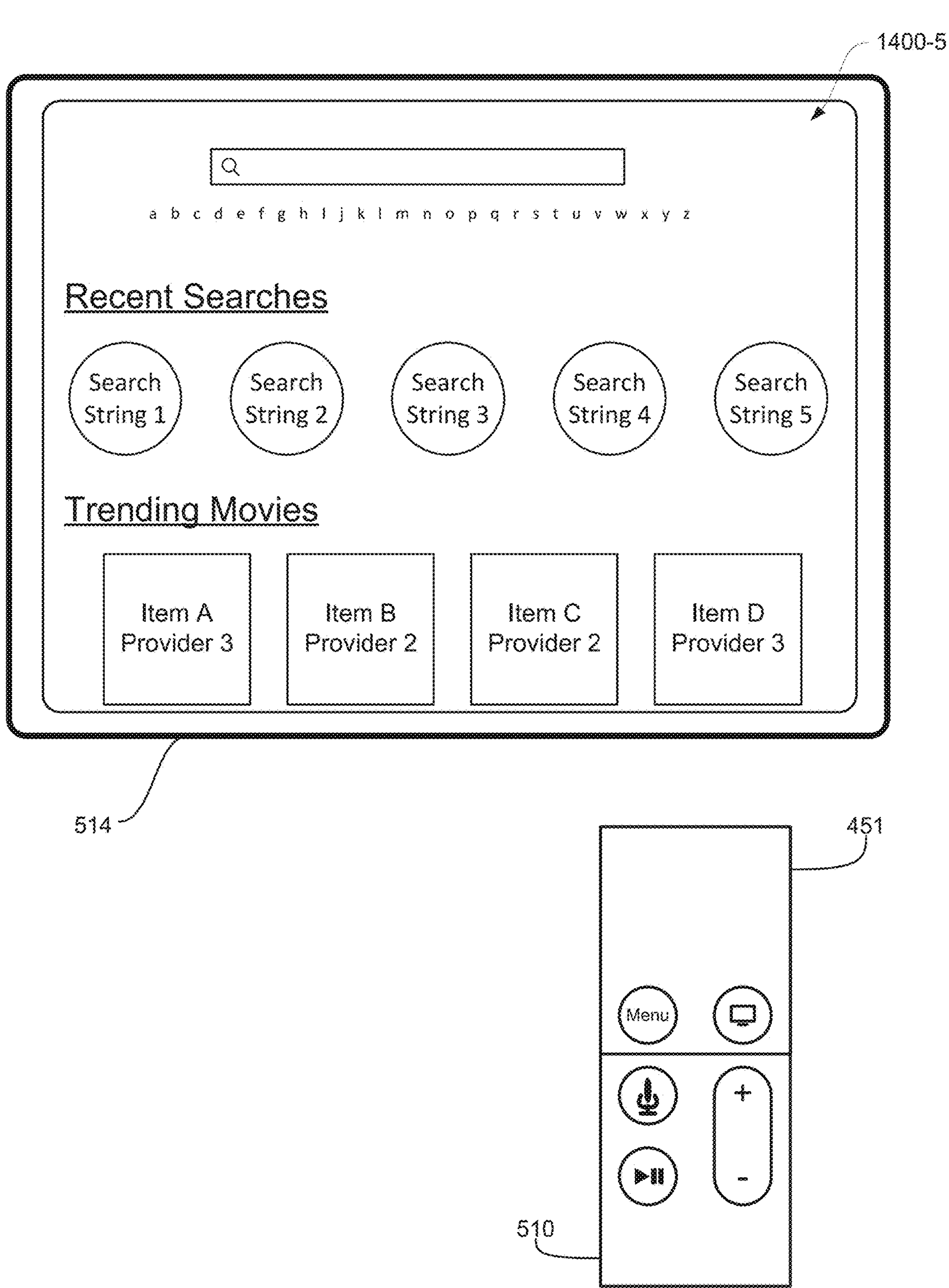
Figure 14S:
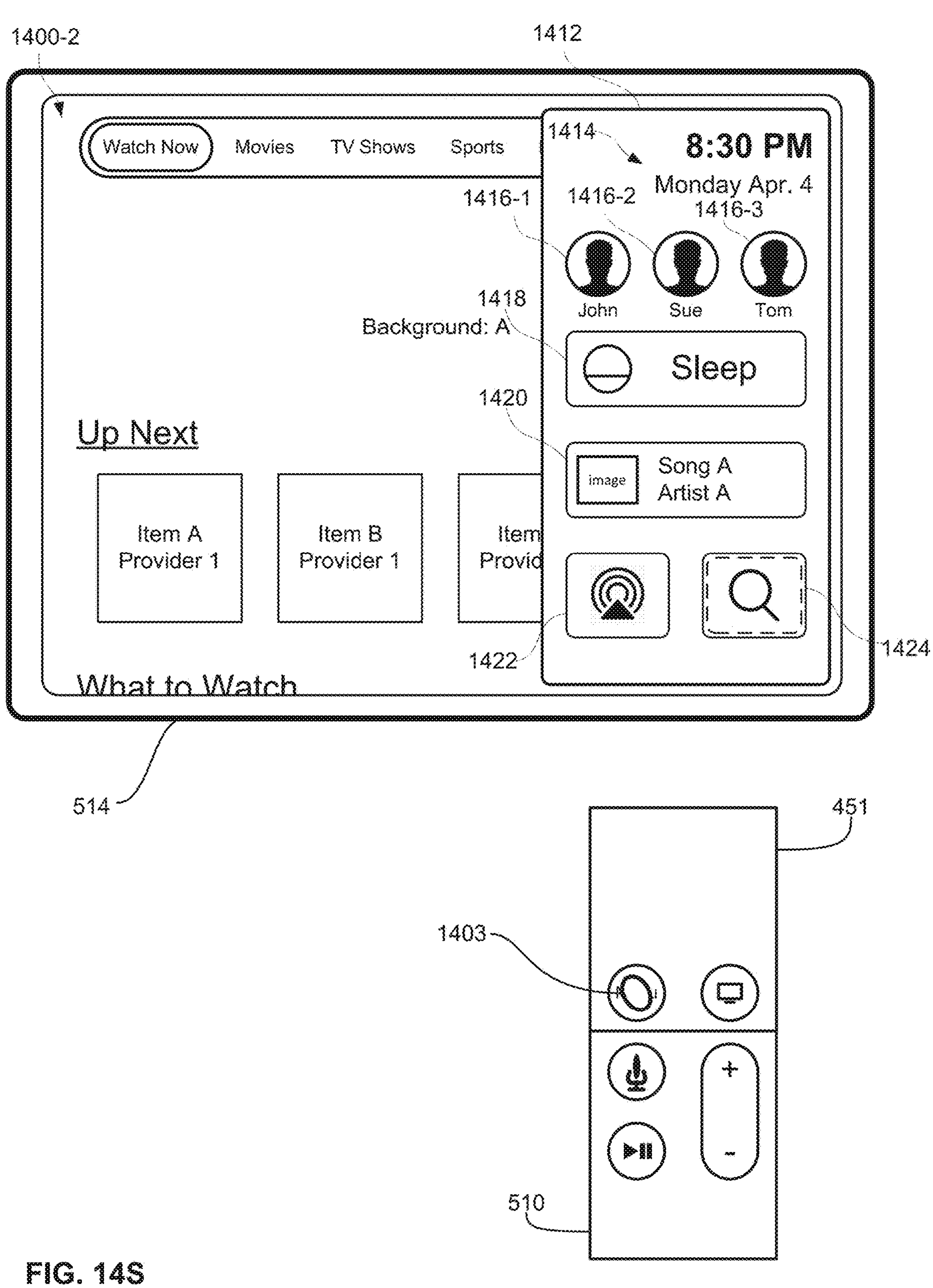
Figure 14T:
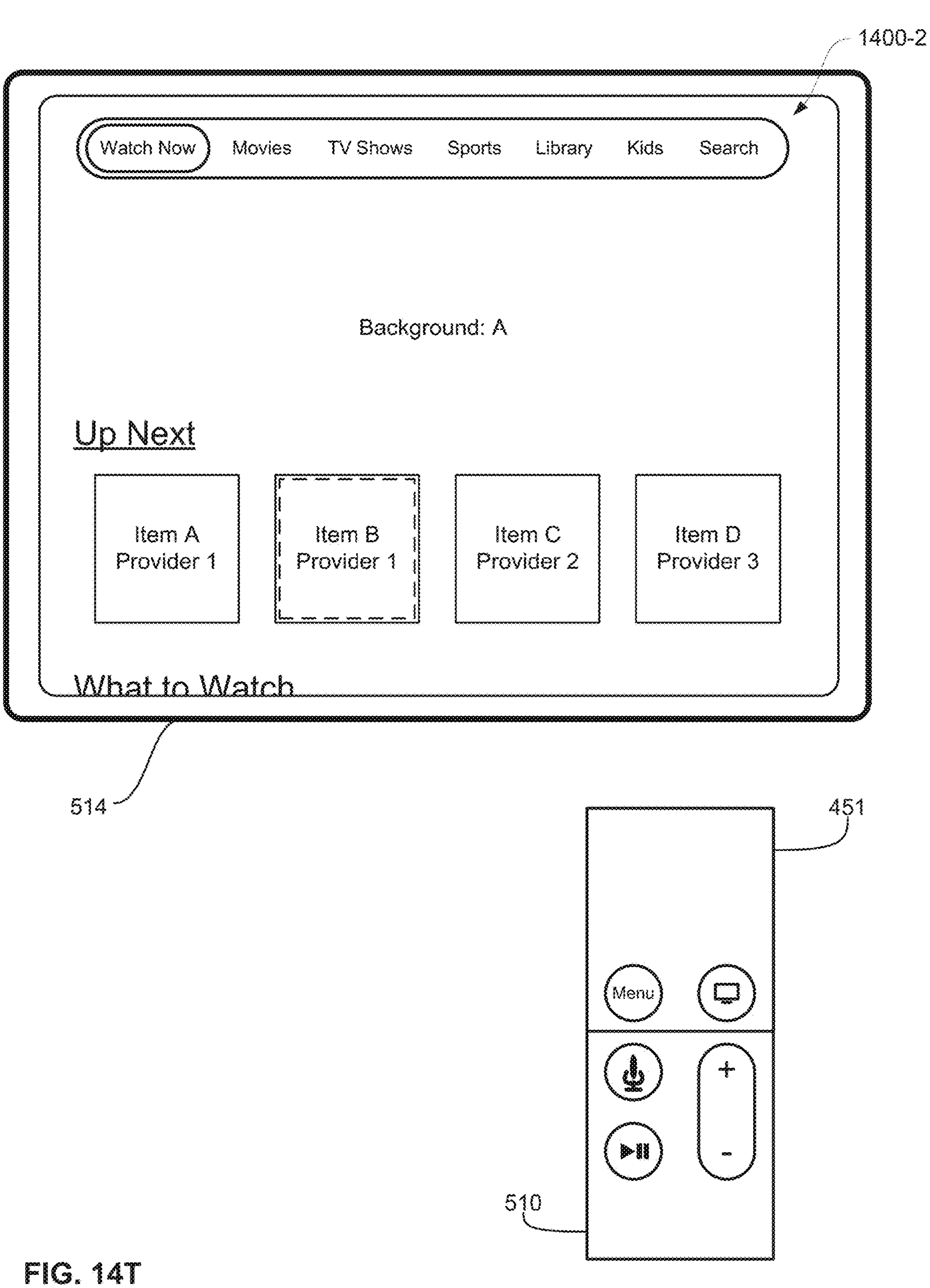

FIGS. 14A-14T illustrate exemplary ways in which an electronic device 500 presents a control center user interface in accordance with some embodiments of the disclosure. The embodiments in these figures are used to illustrate the processes described below, including the processes described with reference to FIGS. 15A-15C.

FIG. 14A illustrates an electronic device 500 displaying user interface 1400-1 on display 514. In some embodiments, user interface 1400-1 is a home screen user interface. In some embodiments, user interface 1400-1 is similar to user interface 1200-1, the details of which will not be repeated here for brevity.

In FIG. 14A-14B, representation 1404-1 corresponding to the unified media browsing application has a current focus (e.g., as shown by the dotted box). In FIG. 14B, a contact 1403 corresponding to an actuation of the home button (e.g., such as button 518 described above with respect to FIG. 5B) is received while representation 1404-1 has a focus. In some embodiments, the selection of the home button corresponds to a request to display the home screen user interface. In some embodiments, the selection of the home button corresponds to a request to display the unified media browsing application. In some embodiments, the home button is customizable to either display the home screen user interface or display the unified media browsing application (e.g., the user is able to select which function to perform in a settings user interface). In some embodiments, as shown in FIG. 14B, contact 1403 on the home button is for less than a predetermined time threshold (e.g., 0.2 seconds, 0.4 seconds, 0.6 seconds). In some embodiments, if contact 1403 lifts off before reaching the predetermined time threshold, then device 500 determines that the user input is a click rather than a press-and-hold input. Thus, in response to the user input, device 500 displays (e.g., launches or otherwise displays) the unified media browsing application, as shown in FIG. 14C.

In FIG. 14D, a contact 1403 corresponding to an actuation of the home button is received. In some embodiments, as shown in FIG. 14E, contact 1403 on the home button is held for more than the predetermined time threshold. In some embodiments, the device considers contact 1403 to be a press-and-hold input. In some embodiments, in response to the user input, control panel 1412 (e.g., a control center user interface) is displayed. In some embodiments, control panel 1412 is displayed on the right side of the user interface overlaid over the user interface that was displayed when the user input was received (e.g., user interface 1400-2). In some embodiments, control panel 1412 can be displayed on any side of the user interface.

In some embodiments, control panel 1412 includes an indication 1414 of the current date and time (e.g., Monday April 4 at 8:30 PM). In some embodiments, control panel 1412 includes one or more selectable option for controlling the operation of device 500. For example, as shown in FIG. 14E, control panel 1412 includes one or more user profile options 1416-1 to 1416-3 that are selectable to switch the active user profile of the device to the selected user profile (as will be described in further detail below with respect to FIGS. 16A-16ZZ). In some embodiments, control panel 1412 includes selectable option 1418 that is selectable to initiate a process for putting device 500 in a standby state (e.g., sleep state or any other low power state, such as an off state). In some embodiments, control panel 1412 includes selectable option 1420 (e.g., a representation of the currently playing item) that indicates the current item that is being played or displayed by device 500 (e.g., music or video). In some embodiments, if device 500 is not currently playing or displaying a content item, selectable option 1420 is not included on control panel 1412. In some embodiments, selectable option 1420 displays an icon (e.g., log or other representation) of the item currently playing or displayed and a description of the currently playing or displayed item (e.g., name, album, title, etc.). In some embodiments, selectable option 1420 includes a indicator or text description of the playback status of the currently playing or displayed item (e.g., whether the item is paused or playing). In some embodiments, control panel 1412 includes selectable option 1422 that is selectable to modify the audio destination settings of the device. In some embodiments, control panel 1412 includes selectable option 1424 that is selectable to display a search user interface for searching for content available on the device. As shown in FIG. 14E, in some embodiments, selectable option 1418 has a focus when control panel 1412 is initially displayed (e.g., focus is moved away from the items on user interface 1400-2).

In FIG. 14F, user input 1403 corresponding to a downward swipe gesture is received. In some embodiments, in response to the user input, focus is moved downwards from selectable option 1418 to selectable option 1420. In some embodiments, while selectable option 1420 (e.g., a representation of the currently playing item) has a focus, one or more playback control functions are available. For example, in FIG. 14G, while device 500 is currently playing song A (e.g., as indicated by 1426), user input 1403 is received selecting a play/pause button on remote control device 510 while selectable option 1420 has a focus. In some embodiments, in response to the user input, device 500 pauses playback of song A, as shown in FIG. 14H. In some embodiments, in response to a further user input 1403 selecting the play/pause button (as shown in FIG. 14H), device 500 resumes playback of song A, as shown in FIG. 14I. In some embodiments, selectable option 1420 updates the indicator or text description of the playback status of the currently playing or displayed item to reflect changes in the playback status (e.g., whether the item is currently playing or paused) in response to the user's input selecting the play/pause button. As shown in FIGS. 14G-14I, user interface 1400-2 is not displaying a music application or displaying a playback user interface for song A, yet the user is able to control the playback of the song using control panel 1412 and without navigating to the music application.

In FIG. 14I, while device 500 is playing song A, user input 1403 is received selecting selectable option 1420. In some embodiments, in response to the user input, device 500 replaces display of user interface 1400-2 and control panel 1412 with user interface 1400-3 corresponding to the music application (e.g., the application that is playing the currently playing song). In some embodiments, control panel 1412 is still displayed when user interface 1400-3 is displayed (e.g., which the user is able to dismiss via a selection of the menu or back button).

It is understood that although the figures and description above describe the control of playback of a song, the above-described features apply similarly to the playback of video or multimedia content items being played by any application.

In FIG. 14K-14L, user input 1403 corresponding to a downward navigation is received while selectable option 1420 has a focus. In some embodiments, in response to the user input, the focus is moved from selectable option 1420 to selectable option 1422. In FIG. 14M, a user input 1403 corresponding to a selection input is received while selectable option 1422 has a focus. In some embodiments, in response to the user input, device 500 replaces display of user interface 1400-2 and user interface 1412 with user interface 1400-4. In some embodiments, user interface 1400-4 is an audio destination selection user interface from which the user is able to select the destination device to output audio that is being outputted by device 500. For example, user interface 1400-4 includes representation 2038 that displays the current song (e.g., or video) that is being played by device 500 (e.g., including artwork representing the song such as album artwork, the song title, the artist, and the album of the song). In some embodiments, user interface 1400-4 includes selectable option 2040 representing a first output device and selectable option 2042 representing a second output device. In some embodiments, selectable option 2040 and 2042 includes an icon representing the respective output device (e.g., a logo or picture), a textual description of the output device, and an indicator for whether the respective output device is currently selected to output audio. In some embodiments, representations 2040 and 2042 are selectable to cause the output that is being outputted by device 500 to be routed to the respective output device. For example, in some embodiments, representation 2040 corresponds to device 500 itself (e.g., output will be outputted to the audio device connected to device 500 such as a television or speakers). In some embodiments, representation 2040 corresponds to smart speaker. In some embodiments, other devices capable of playing audio can be displayed and selectable on user interface 1400-4, such as a set-top box, a smartphone, a tablet, a smart television, etc.

In FIG. 14N, user input 1403 is received on the "menu" or "back" button corresponding to a request to dismiss user interface 1400-4 and return to the previous user interface. In some embodiments, in response to the user input, device 500 replaces display of user interface 1400-4 with user interface 1400-2 with control panel 1412 displayed (e.g., what was displayed on display 514 before user interface 1400-4 was displayed), as shown in FIG. 14O.

In FIG. 14P, user input 1403 corresponding to a rightward swipe is received. In some embodiments, in response to the user input, focus is moved from selectable option 1422 to selectable option 1424. In FIG. 14Q, user input 1403 corresponding to a selection input is received while selectable option 1424 has a focus. In some embodiments, in response to the user input, device 500 replaces display of user interface 1400-2 and control panel 1412 with user interface 1400-5. In some embodiments, user interface 1400-5 is a search user interface. In some embodiments, user interface 1400-5 allows a user to perform a search for all content that is available or accessible on device 500, including but not limited to, content that is available from applications that are installed on the device, content that is saved on the device, and content for which the user can view information on the device.

In some embodiments, user interface 1400-5 includes a text field in which the user enters text to be searched, a row of recent searches which the user is able to select to perform a search using the respective search string, and one or more rows of content items (e.g., such as a row of trending movies, a row of trending television shows, a row of popular content, etc.) from which the user can select to cause display of the respective content item.

In FIG. 14S, user input 1403 is received on the "menu" or "back" button while control panel 1412 is displayed on display 514. In some embodiments, in response to user input 1403, device 500 dismisses display of control panel 1412, as shown in FIG. 14T. In some embodiments, the focus is moved back to the item that had the focus before control panel 1412 was initially displayed (e.g., the representation of Item B).

Figure 15A:
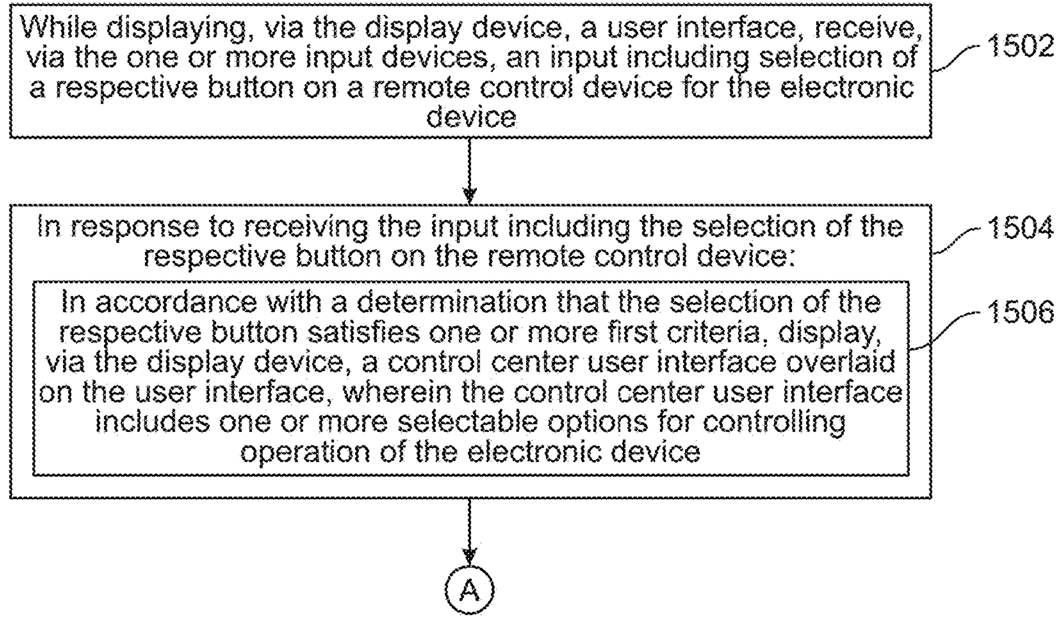
FIGS. 15A-15C are flow diagrams illustrating a method of presenting a control center user interface in accordance with some embodiments of the disclosure.
Figure 15B:
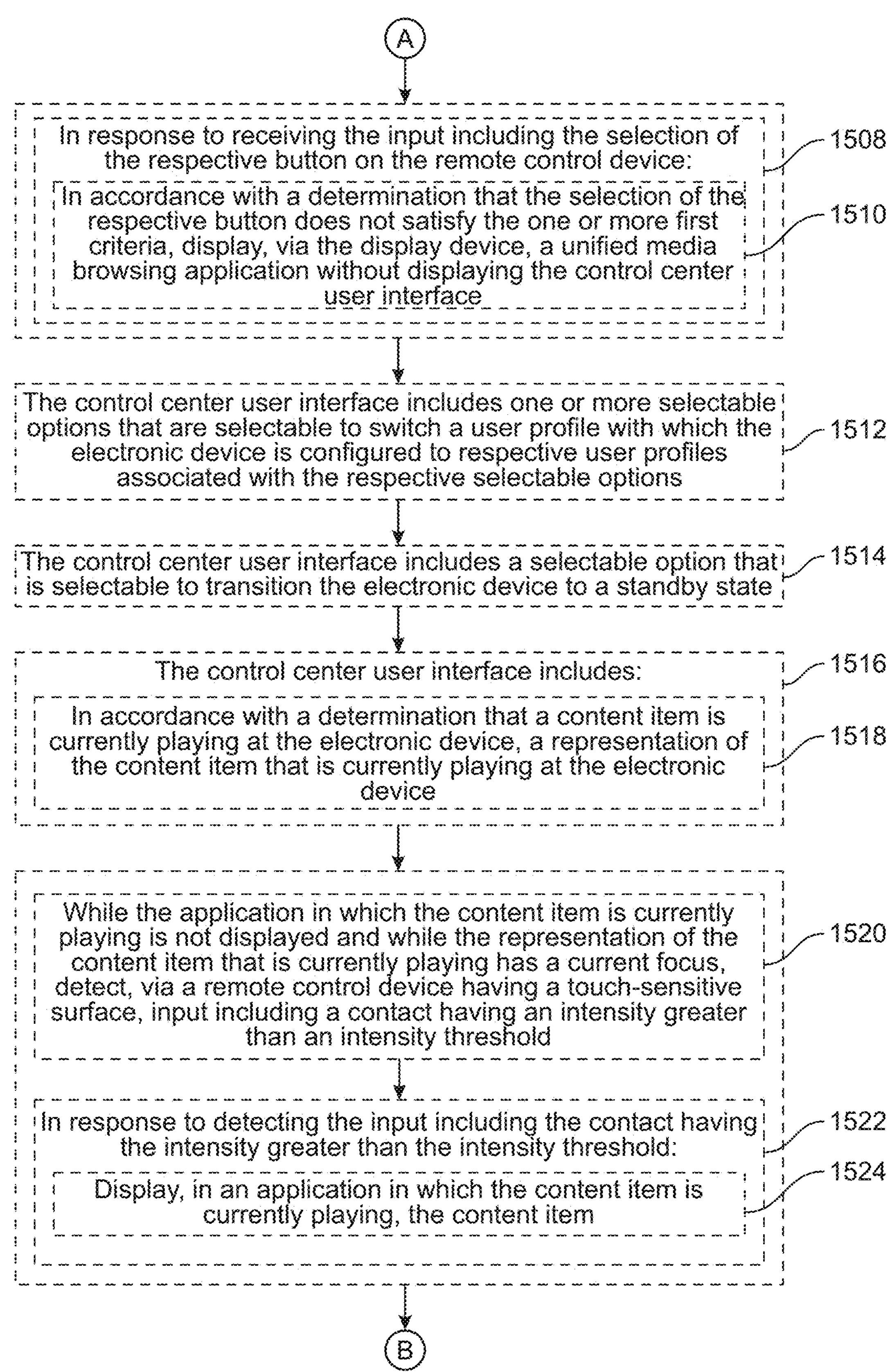
Figure 15C:
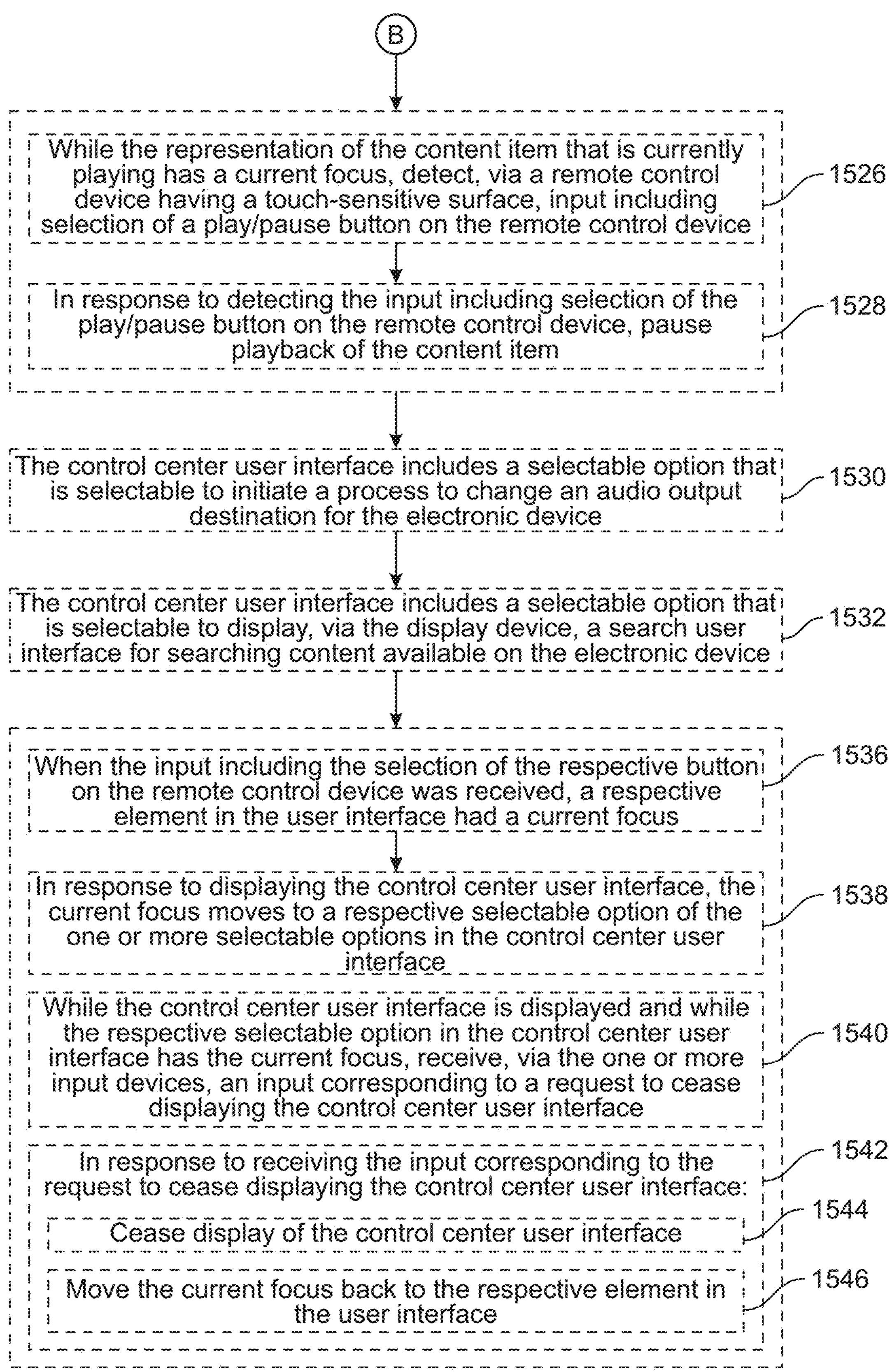

FIGS. 15A-15C are flow diagrams illustrating a method of presenting control center user interface in accordance with some embodiments of the disclosure. The method 1500 is optionally performed at an electronic device such as device 100, device 300, device 500, device 501, device 510, and device 511 as described above with reference to FIGS. 1A-1B, 2-3, 4A-4B and 5A-5C. Some operations in method 1500 are, optionally combined and/or order of some operations is, optionally, changed.

As described below, the method 1500 provides ways to present control center user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 14B, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510, while displaying, via the display device, a user interface, receives (1502), via the one or more input devices, an input including selection of a respective button on a remote control device for the electronic device, such as in FIG. 14B (e.g., receiving a user input corresponding to an actuation of a button on a remote control device). In some embodiments, the user input is an actuation of a button corresponding to a unified media browsing application (e.g., such that actuation of the button causes display of the unified media browsing application). It is understood that the user input can be received from a dedicated remote control device, a universal remote control device, or a remote control application on a mobile electronic device such as a smart phone.

In some embodiments, in response to receiving the input including the selection of the respective button on the remote control device (1504), such as in FIG. 14E: in accordance with a determination that the selection of the respective button satisfies one or more first criteria (e.g., the user input is a depression of the respective button for longer than a time threshold (0.5 seconds, 1 second, 2 seconds), a double click of the respective button, etc. In some embodiments, the respective button is a button on the remote control device for launching a unified media browsing application on the electronic device. In some embodiments, the respective button is a button that initiates a process for causing the electronic device to enter into a low power), the electronic device displays (1506), via the display device, a control center user interface overlaid on the user interface, wherein the control center user interface includes one or more selectable options for controlling operation of the electronic device, such as in FIG. 14E (e.g., displaying a control center or control panel on some or part of the display).

In some embodiments, the control panel is displayed overlaid over the content or user interface that was displayed before the control panel was displayed. In some embodiments, the control panel is displayed along one side of the display (e.g., right side, left side, top side, bottom side, etc.). In some embodiments, the control panel includes a selectable option for causing the electronic device to enter into a low power mode (e.g., sleep), a selectable option for controlling playback of media (e.g., music, videos, etc.) that is currently playing on the electronic device, a selectable option for controlling the audio and/or video output of the electronic device, selectable options to change the primary user profile of the electronic device, and/or a selectable option to display a search user interface on the electronic device. In some embodiments, the control panel displays the current date and time of the electronic device. In some embodiments, if the selection of the respective button does not satisfy the first criteria (e.g., the click or actuation is not longer than the time threshold), then the electronic device launches the unified media browsing application or performs another action corresponding to a short click or tap of the respective button (e.g., as opposed to a long-click or click-and-hold input).

The above-described manner of displaying a control panel for controlling operation of the electronic device allows the electronic device to provide the user with a method to control the operation of the electronic device at any time, which simplifies the interaction between the user and the electronic device and enhances the operability of the electronic device and makes the user-device interface more efficient (e.g., by providing a mechanism for the user to display a control panel and control the operation of the electronic device without requiring the user to navigate to a separate user interface or interrupt the content being displayed by the electronic device to perform the same functions), which additionally reduces power usage and improves battery life of the electronic device by enabling the user to use the electronic device more quickly and efficiency, such as by streamlining the process of controlling the electronic device.

In some embodiments, in response to receiving the input including the selection of the respective button on the remote control device (1508), such as in FIG. 14B: in accordance with a determination that the selection of the respective button does not satisfy the one or more first criteria, the electronic device displays (1510), via the display device, a unified media browsing application without displaying the control center user interface, such as in FIG. 14C (e.g., if the input does not satisfy the first criteria (e.g., is not a depression of the respective button for longer than a time threshold (0.5 seconds, 1 second, 2 seconds), or a double click of the respective button)), then display a unified media browsing application instead of displaying the control center user interface). In some embodiments, the respective button is customizable to perform an action other than display the unified media browsing application, such as display a home user interface. In such embodiments, then if the input does not satisfy the first criteria, then display the home user interface instead of displaying the control enter user interface.

The above-described manner of displaying either a control panel or a unified media browsing application allows the electronic device to provide the user with a method of using a single button on a remote control device to perform multiple functions (e.g., display the control center unified interface or a unified media browsing application) based on the characteristic of the user input on the respective button, which simplifies the interaction between the user and the electronic device and enhances the operability of the electronic device and makes the user-device interface more efficient (e.g., by providing the user with a mechanism to display a control panel or launch the unified media browsing application without requiring the user to navigate through a menu or perform additional inputs to perform the same functions), which additionally reduces power usage and improves battery life of the electronic device by enabling the user to use the electronic device more quickly and efficiency, such as by streamlining the process of interacting with the electronic device.

In some embodiments, the control center user interface includes one or more selectable options that are selectable to switch a user profile with which the electronic device is configured to respective user profiles associated with the respective selectable options (1512), such as in FIG. 14E (e.g., the control center user interface includes one or more selectable options that correspond to one or more user profiles that are available to be switched to). In some embodiments, selection of a respective selectable option that corresponds to a respective user profile causes the electronic device to select the respective user profile as the active user profile of the device (e.g., similar to the process described below with respect to method 1700).

The above-described manner of changing the active user profile of the device (e.g., by selecting a respective user profile on a control center user interface) allows the electronic device to provide the user with a shortcut method of selecting an active profiles without requiring the user to navigate to a system settings user interface, which simplifies the interaction between the user and the electronic device and enhances the operability of the electronic device and makes the user-device interface more efficient (e.g., by displaying a control panel in response to the user input from which the user can change the user profile, without requiring the user to navigate through a settings menu system to change the active profile of the device), which additionally reduces power usage and improves battery life of the electronic device by enabling the user to use the electronic device more quickly and efficiency, such as by streamlining the process of switching user profiles on the electronic device.

In some embodiments, the control center user interface includes a selectable option that is selectable to transition the electronic device to a standby state (1514), such as in FIG. 14E (e.g., the control center user interface includes a selectable option that is selectable to cause the electronic device to enter into a sleep state, a low power state, a powered-off state, or any state other than an active state). In some embodiments, the selectable option for transitioning to the standby state has a focus when the control center user interface is initially displayed (e.g., the selectable option has a focus by default until the user navigates the focus to another selectable option).

The above-described manner of transitioning the electronic device to a standby state (e.g., by providing a selectable option on the control center user interface that is selectable to place the electronic device in a standby state) allows the electronic device to provide the user with a quick shortcut method of placing the electronic device in a low power state, which simplifies the interaction between the user and the electronic device and enhances the operability of the electronic device and makes the user-device interface more efficient (e.g., without requiring the user to navigate through a menu system to find a user interface for controlling the power states of the device and without requiring the remote control device to include a dedicated power button for controlling the power states of the device), which additionally reduces power usage and improves battery life of the electronic device by enabling the user to use the electronic device more quickly and efficiency.

In some embodiments, the control center user interface includes (1516), such as in FIG. 14E: in accordance with a determination that a content item is currently playing at the electronic device, a representation of the content item that is currently playing at the electronic device (1514), such as in FIG. 14E (e.g., the control center user interface includes a selectable option corresponding to a currently playing content item (e.g., music, video, slideshow, etc.)). In some embodiments, the selectable option (e.g., representation of the content item) dynamically displays the content item that is currently playing (e.g., the button has a text label of the currently playing content item). In some embodiments, the selectable option is only displayed if content is currently playing. In some embodiments, the selectable option is always displayed (e.g., but is optionally displayed without a label of what is currently playing or with a label that indicates no content item is currently playing).

The above-described manner of displaying information about content that is currently playing (e.g., by displaying, on the control center user interface, a representation of the content item that is currently playing at the electronic device) allows the electronic device to provide the user with a single interface from which the user can view information about the content item currently being played (e.g., without requiring the user to find the application that is playing the currently playing content and then navigate into the respective application to view information about the currently played content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while the application in which the content item is currently playing is not displayed (e.g., the application that is playing the currently playing content item is not currently displayed on the display (e.g., is running as a background process)) and while the representation of the content item that is currently playing has a current focus, the electronic device detects (1520), via a remote control device having a touch-sensitive surface, input including a contact having an intensity greater than an intensity threshold, such as in FIG. 14I (e.g., detecting a selection input when the representation of the content item that is currently playing has a current focus corresponding to a request to display the content that is currently playing).

In some embodiments, in response to detecting the input including the contact having the intensity greater than the intensity threshold (1522), such as in FIG. 14I (e.g., the input is a click or other selection input): the electronic device displays (1524), in the application in which the content item is currently playing, the content item, such as in FIG. 14J (e.g., displaying the application that is playing the currently playing content item).

For example, if the currently playing content item is a song that is being played by a music application, then display the music application (e.g., optionally the playback user interface of the music application). In some embodiment, if the currently playing content is a video (e.g., tv show, movie, etc.), then display the application that is playing the video (e.g., optionally the playback user interface of the application). In some embodiments, after displaying the application that is playing the currently playing content item, the control center user interface is dismissed (e.g., no longer displayed). In some embodiments, if the application that is playing the currently playing content item is already displayed on the display when the user selects performs the input, then merely dismiss the control panel. For example, if the user is in a music app and causes playback of a respective song, then causes display of the control panel (e.g., without navigating to another application or to another user interface), and selects the representation of the respective song, then causing display of the application that is playing the currently playing content item and dismissal of the control center user interface only causes the dismissal of the control center user interface because the music application is already displayed.

The above-described manner of displaying the application that is currently playing content (e.g., by displaying the application that is currently playing content in response to the user selecting the representation of the currently playing content on the control center user interface) allows the electronic device to provide the user with a quick shortcut method of displaying the application that is currently playing content, without requiring the user to search for and navigate into the application that is currently playing content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while the representation of the content item that is currently playing has a current focus, the electronic device detects (1526), via a remote control device having a touch-sensitive surface, input including selection of a play/pause button on the remote control device, such as in FIG. 14G (e.g., detecting an input selecting a button associated with the play/pause functionality or otherwise detecting an input corresponding to a request to play or pause playback of a content item (e.g., not necessarily a button dedicated to causing play or pause playback)). In some embodiments, the application that is playing the currently playing content item is not currently displayed on the display (e.g., is running as a background process).

In some embodiments, in response to detecting the input including selection of the play/pause button on the remote control device, the electronic device pauses (1528) playback of the content item, such as in FIG. 14H (e.g., cause the content item to play or pause if the content item is currently paused or playing, respectively). Thus, in some embodiments, the user is able to control the playback of the content item without navigating to the application that is playing the currently playing content item. In some embodiments, the representation of the content item will update to show that the playback status of the content item has changed. In some embodiments, if the representation of the content item does not have a focus (e.g., if other selectable options on the control panel user interface have a focus), then the selection of the button associated with the play/pause functionality will not cause the currently playing item to play or pause. In some embodiments, if other selectable options are in focus, then selection of the button associated with the play/pause functionally does cause the currently playing item to play or pause (e.g., and optionally the representation of the content item will update accordingly).

The above-described manner of controlling playback of the currently playing content item (e.g., by playing or pausing the currently playing content item in response to a user input selecting the play/pause button while the representation of the currently playing content item on the control center user interface has a focus) allows the electronic device to provide the user with a quick shortcut method of controlling the playback of the content item without requiring the user to find and navigate into the application that is currently playing the content item to achieve the same playback control functions, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the control center user interface includes a selectable option that is selectable to initiate a process to change an audio output destination for the electronic device (1530), such as in FIG. 14M-14N (e.g., a selectable option that is selectable to cause display of a user interface from which the user is able to select the audio output device). In some embodiments, selecting an audio output device other than the electronic device causes audio that otherwise would be played by the audio device (e.g., or the television connected to the electronic device) to be transmitted to the selected destination device (e.g., via a wireless communication method such as Bluetooth or Wi-Fi).

The above-described manner of changing the audio output destination of the electronic device (e.g., by displaying a selectable option on the control center user interface that is selectable to display a user interface for changing the audio output destination of the electronic device allows the electronic device to provide the user with a quick shortcut method of changing the audio output destination of the electronic device without requiring the user to navigate through a system settings menu system to find a setting for changing the audio output destination or find and navigate into the application that is currently playing content to change the audio output destination, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the control center user interface includes a selectable option that is selectable to display, via the display device, a search user interface for searching content available on the electronic device (1532), such as in FIG. 14Q-14R (e.g., a selectable option that is selectable to initiate a process to search for content available on the electronic device. In some embodiments, the search user interface is able to perform a universal search for content that is available from all applications that are installed on the electronic device (e.g., including non-system applications)).

The above-described manner of displaying a search user interface (e.g., by providing a selectable option on the control center user interface that is selectable to display the search user interface) allows the electronic device to provide the user with a quick shortcut method of displaying the search user interface without requiring the user to navigate to the home user interface and find the icon corresponding to the search feature, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, when the input including the selection of the respective button on the remote control device was received, a respective element in the user interface had a current focus (1536), such as in FIG. 14D (e.g., an item on the user interface had a focus when the user caused the display of the control center user interface). In some embodiments, in response to displaying the control center user interface, the current focus moves to a respective selectable option of the one or more selectable options in the control center user interface (138), such as in FIG. 14E (e.g., upon display of the control center user interface, one of the selectable options of the one of more selectable options on the control center user interface receives a focus). In some embodiments, the selectable option that is selectable to transition the device into a standby state receives the focus when the control center is first displayed. Thus, in some embodiments, the user interface displayed when the control center was displayed no longer has an element with the current focus.

In some embodiments, while the control center user interface is displayed and while the respective selectable option in the control center user interface has the current focus, the electronic device receives, via the one or more input devices, an input corresponding to a request to cease displaying the control center user interface (1540), such as in FIG. 14S (e.g., receiving a user input corresponding to a button press of a "menu" button or a "back" button corresponding to a request to dismiss the control center user interface).

In some embodiments, in response to receiving the input corresponding to the request to cease displaying the control center user interface (1542), such as in FIG. 14T: the electronic device ceases (1544) display of the control center user interface, such as in FIG. 14T, and moves (1546) the current focus back to the respective element in the user interface, such as in FIG. 14T (e.g., upon dismissal of the control center user interface, the focus moves from a selectable option on the control center user interface back to the element on the user interface that had a focus before the control center user interface was displayed).

The above-described manner of changing the item that has a focus (e.g., by moving the focus to a selectable option on the control center user interface when the control center user interface is displayed and moving the focus back to the item that had a focus before the control center user interface was displayed when the control center user interface is dismissed) allows the electronic device to provide the user with a method of displaying the control center user interface, performing the user's intended actions, then dismissing the control center user interface and resume interacting with the user interface with very little interruption without requiring navigate the focus to the appropriate item when the control center user interface was displayed and dismissed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1700, and 1900) are also applicable in an analogous manner to method 1500 described above with respect to FIGS. 15A-15C. For example, the operation of the electronic device to present a control panel with reference to method 1500 optionally has one or more of the characteristics of the presentation of presenting representations of content items, presenting options for accessing the content based on available means for accessing items of content, presenting representations of episodes of collections of episodic content, presenting an enhanced preview of an items of content, switching the active user of the device, and entering into a picture-in-picture mode, etc., described herein with reference to other methods described herein (e.g., methods 700, 900, 1100, 1300, 1700, and 1900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIGS. 15A-15C are, optionally, implemented by components depicted in FIGS. 1A-1B. For example, displaying operations 1506, 1510, 1524, and 1544, receiving operations 1502, and 1540, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Switching User Profiles on an Electronic Device

Users interact with electronic devices in many different manners, including using an electronic device to browse for and view items of content on the electronic device. In some embodiments, the electronic devices maintains one or more of the user's preferences, settings, viewing history, etc., sometimes known as a user profile, to provide the user with a more customized experience. In some embodiments, the electronic devices maintains multiple user profiles for different users to reflect each user's individual preferences, settings, viewing histories, etc. The embodiments described below provide ways in which an electronic device switches the active profile of the device from one user profile to another, thus enhancing users' interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 16A:
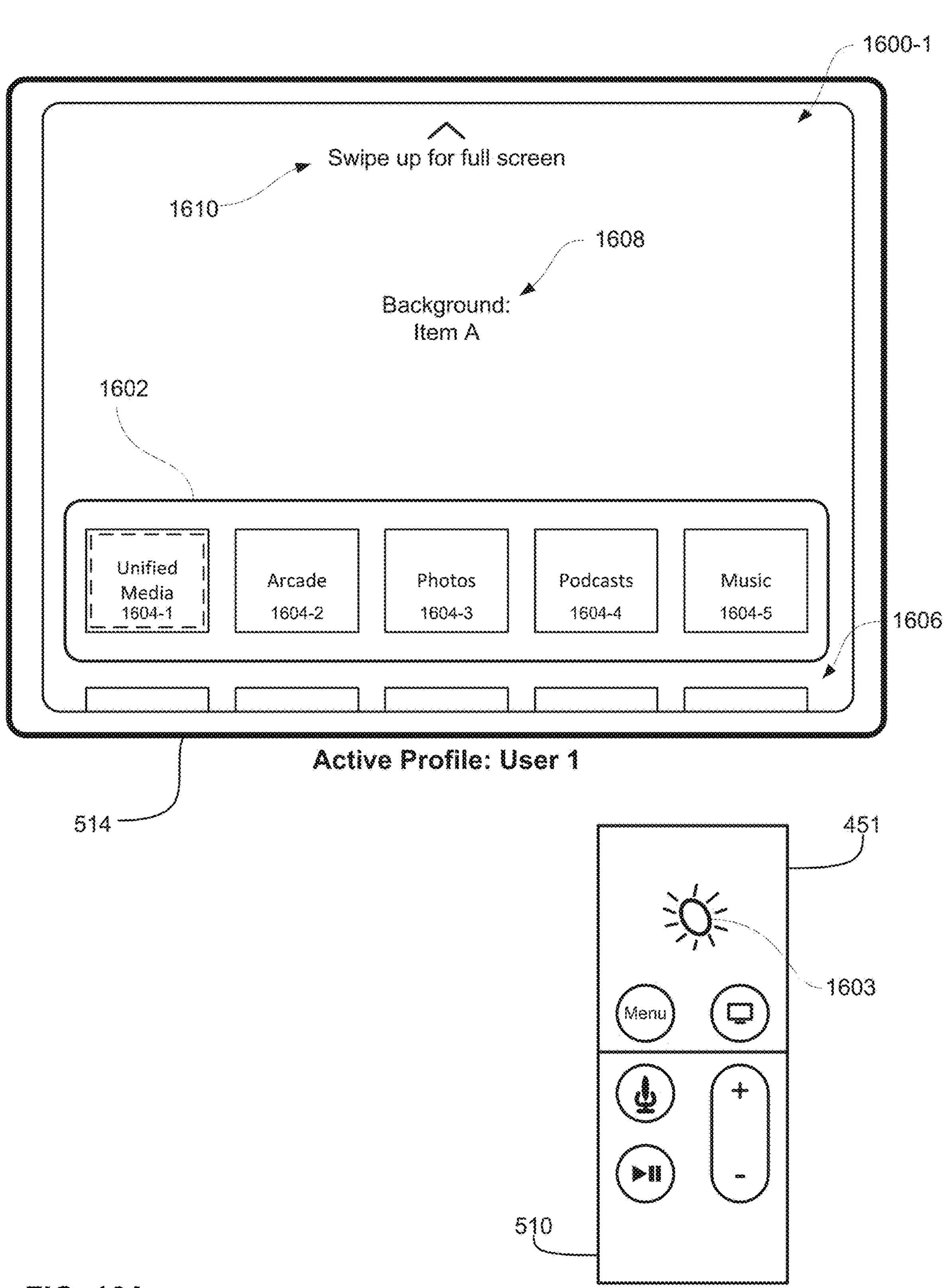
FIGS. 16A-16ZZ illustrate exemplary ways in which an electronic device switches the active user profile of the device in accordance with some embodiments of the disclosure
Figure 16B:
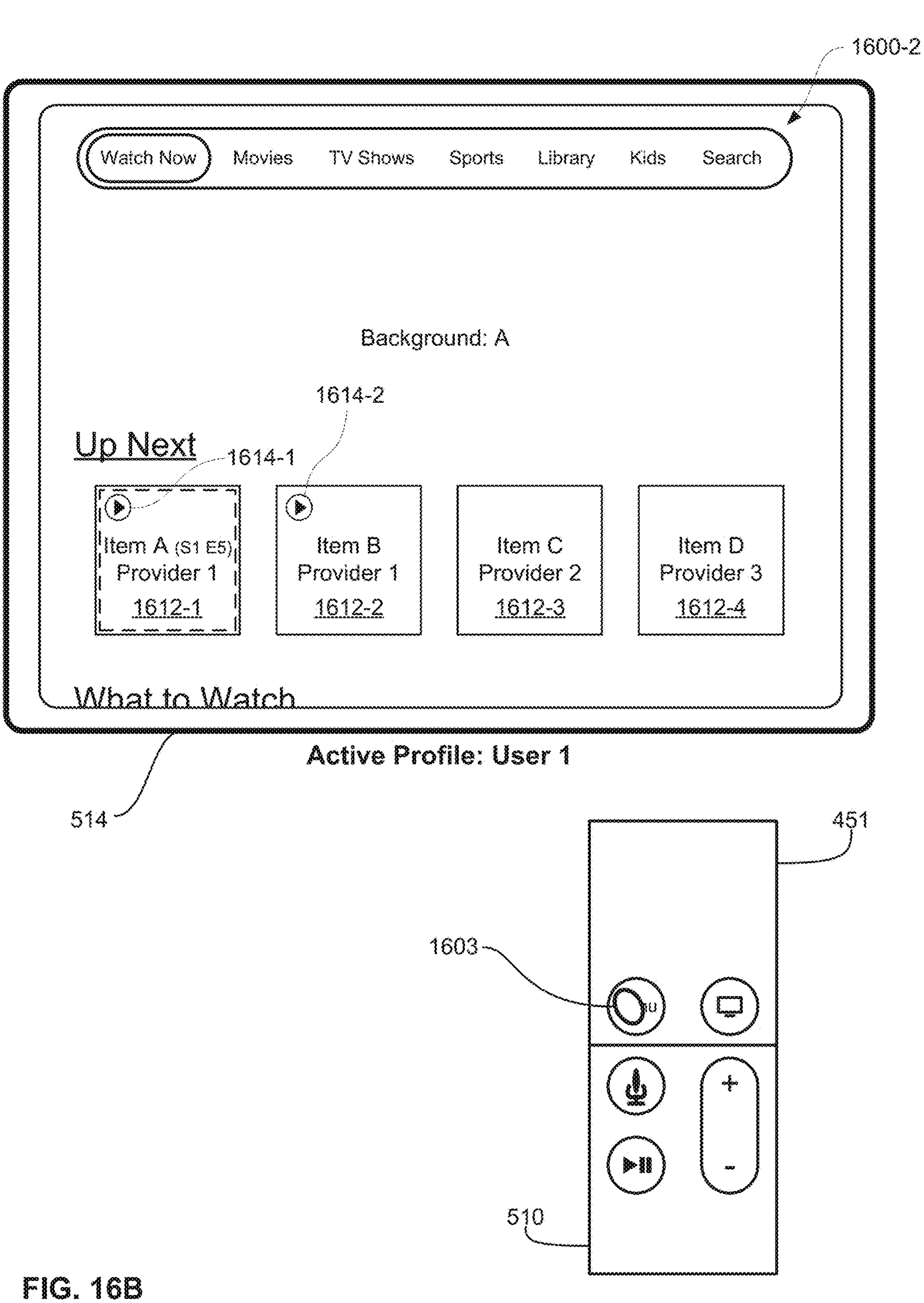
Figure 16C:
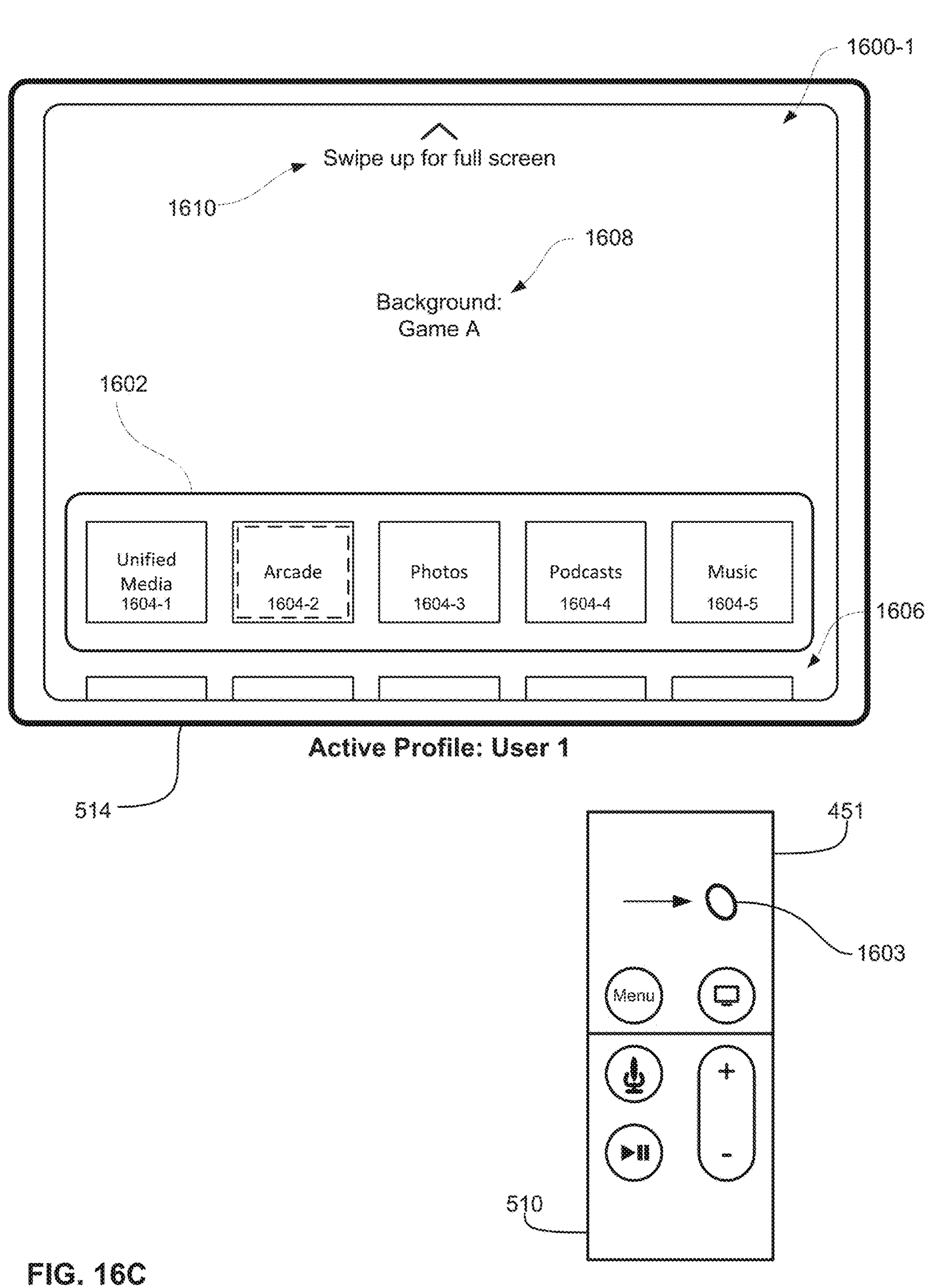
Figure 16D:
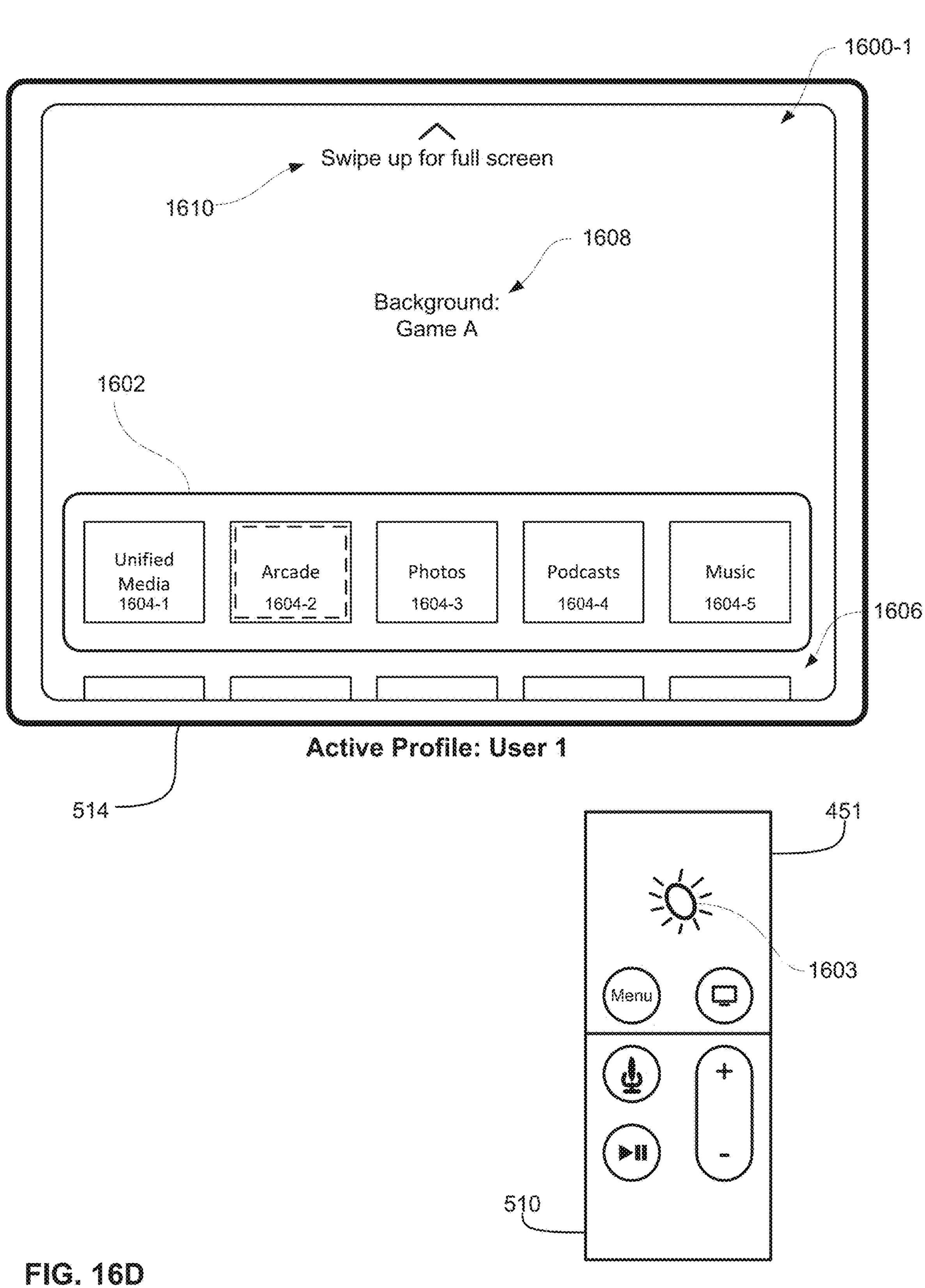
Figure 16E:
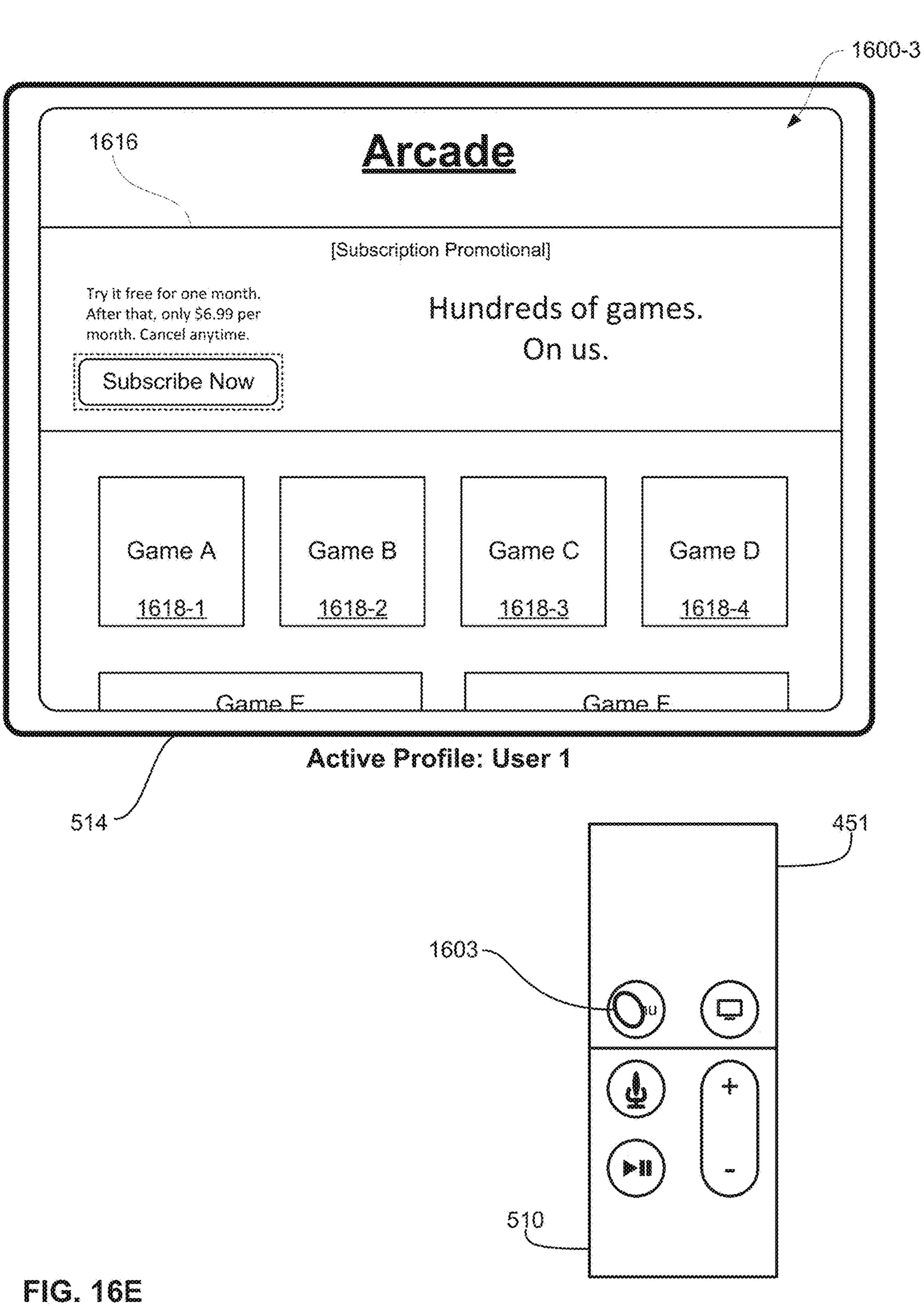
Figure 16F:
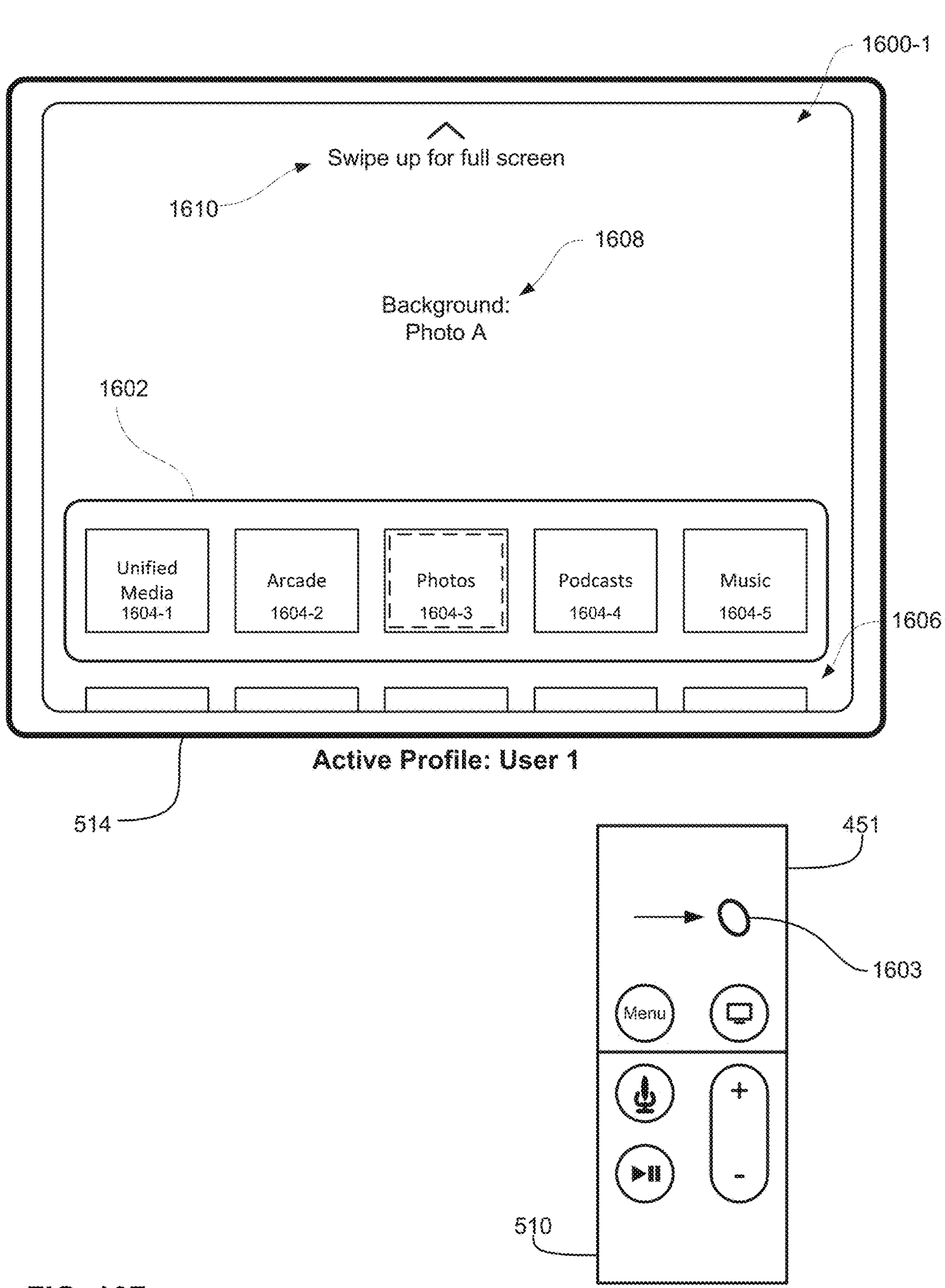
Figure 16G:
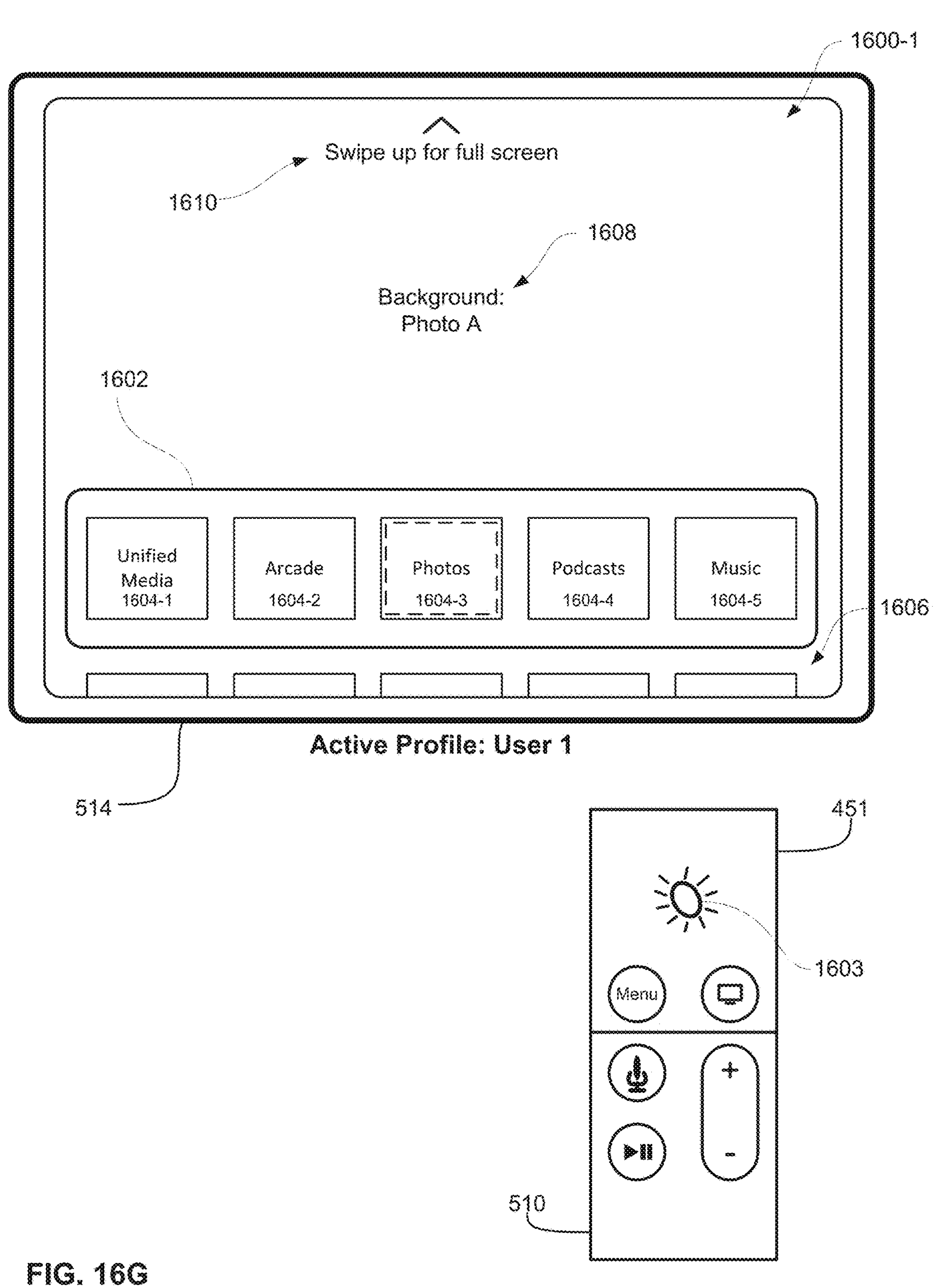
Figure 16H:
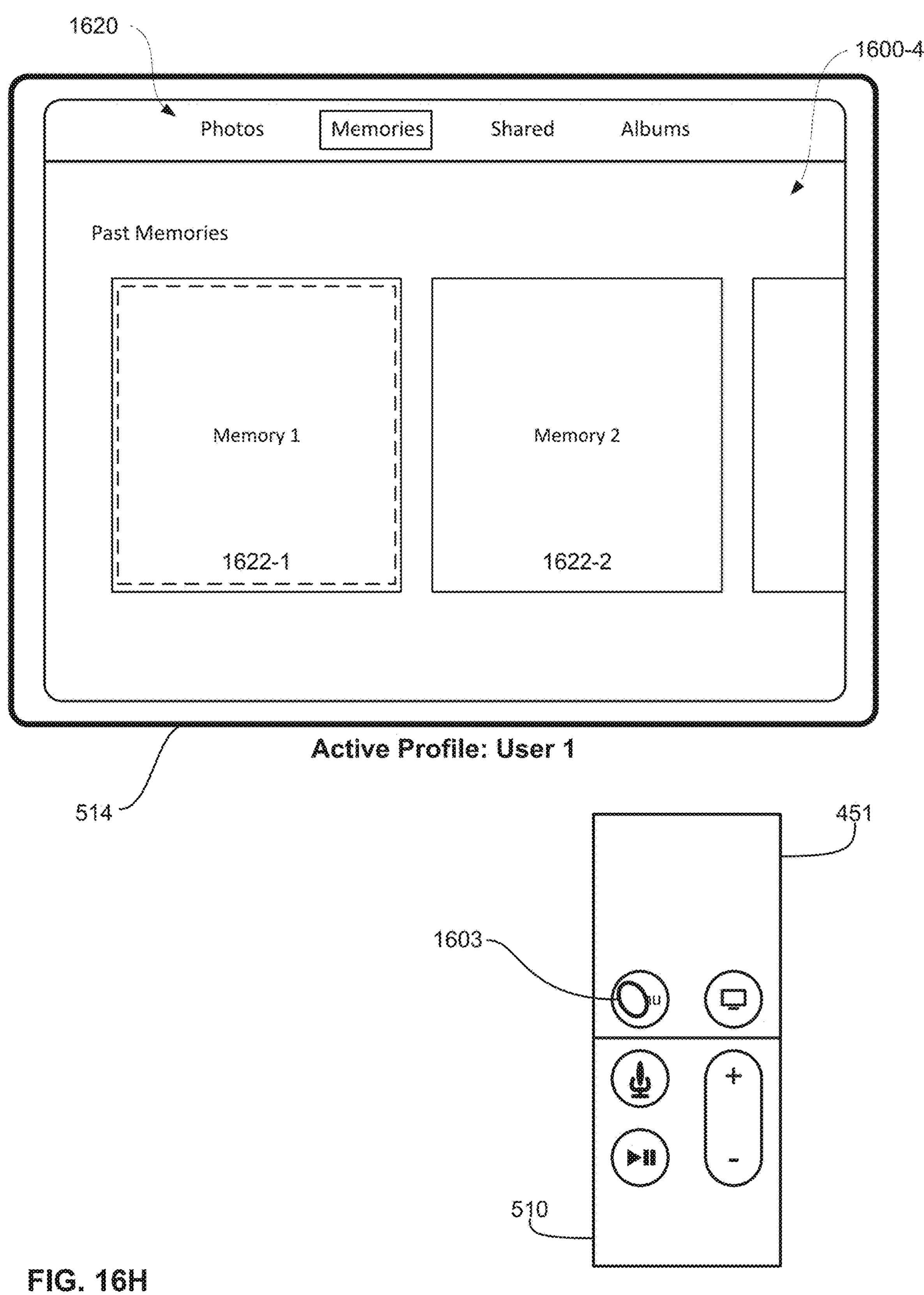
Figure 16I:
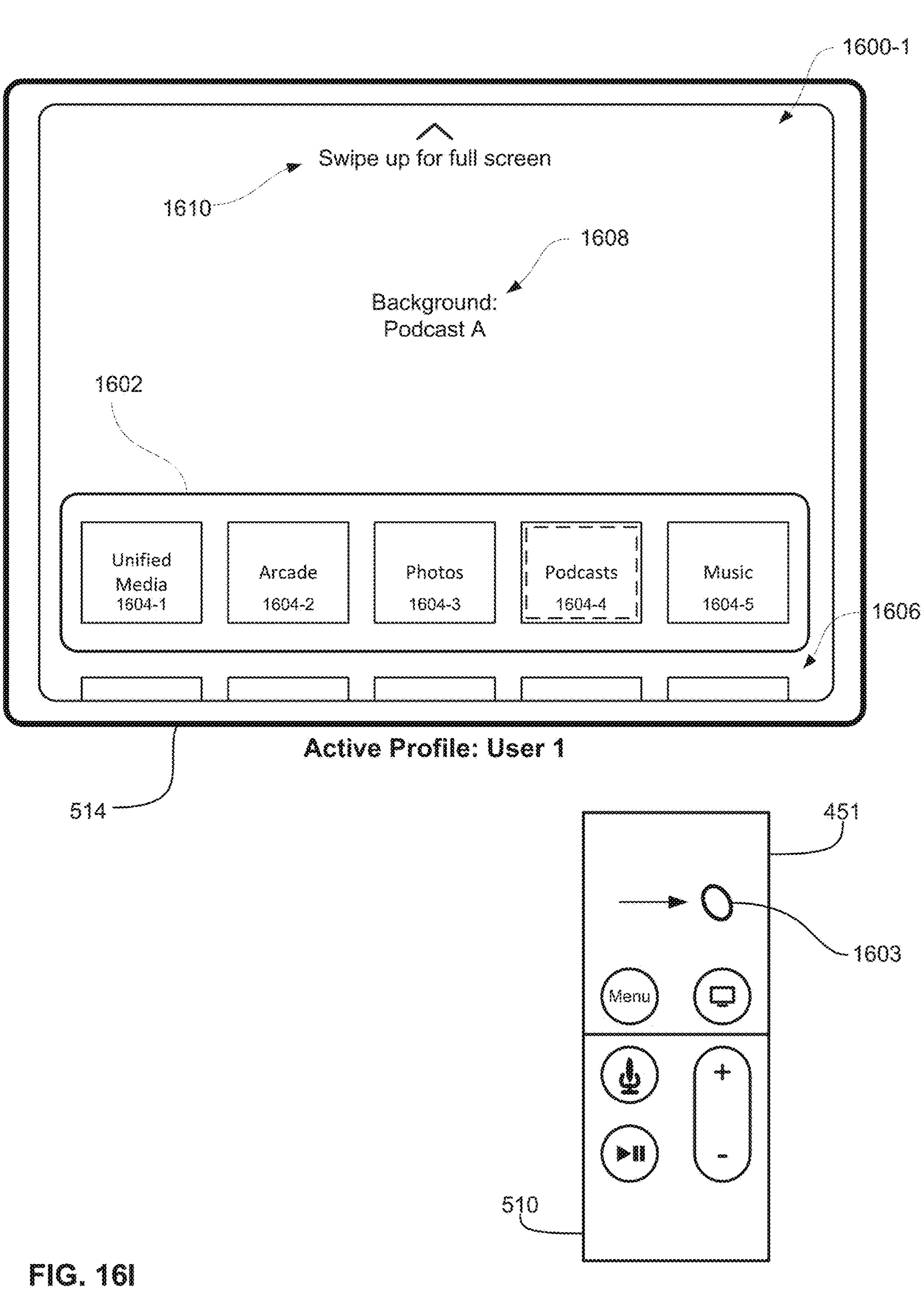
Figure 16J:
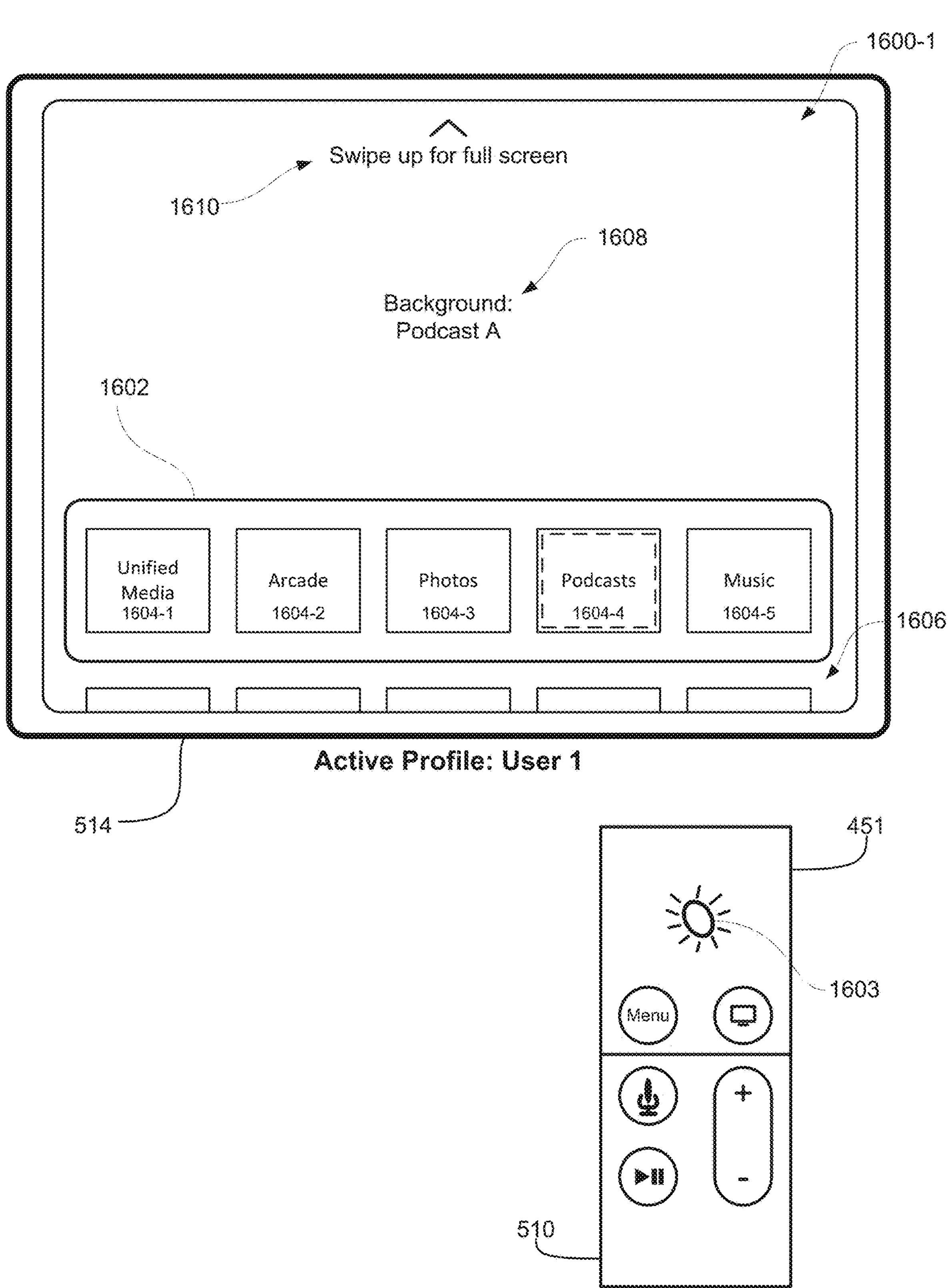
Figure 16K:
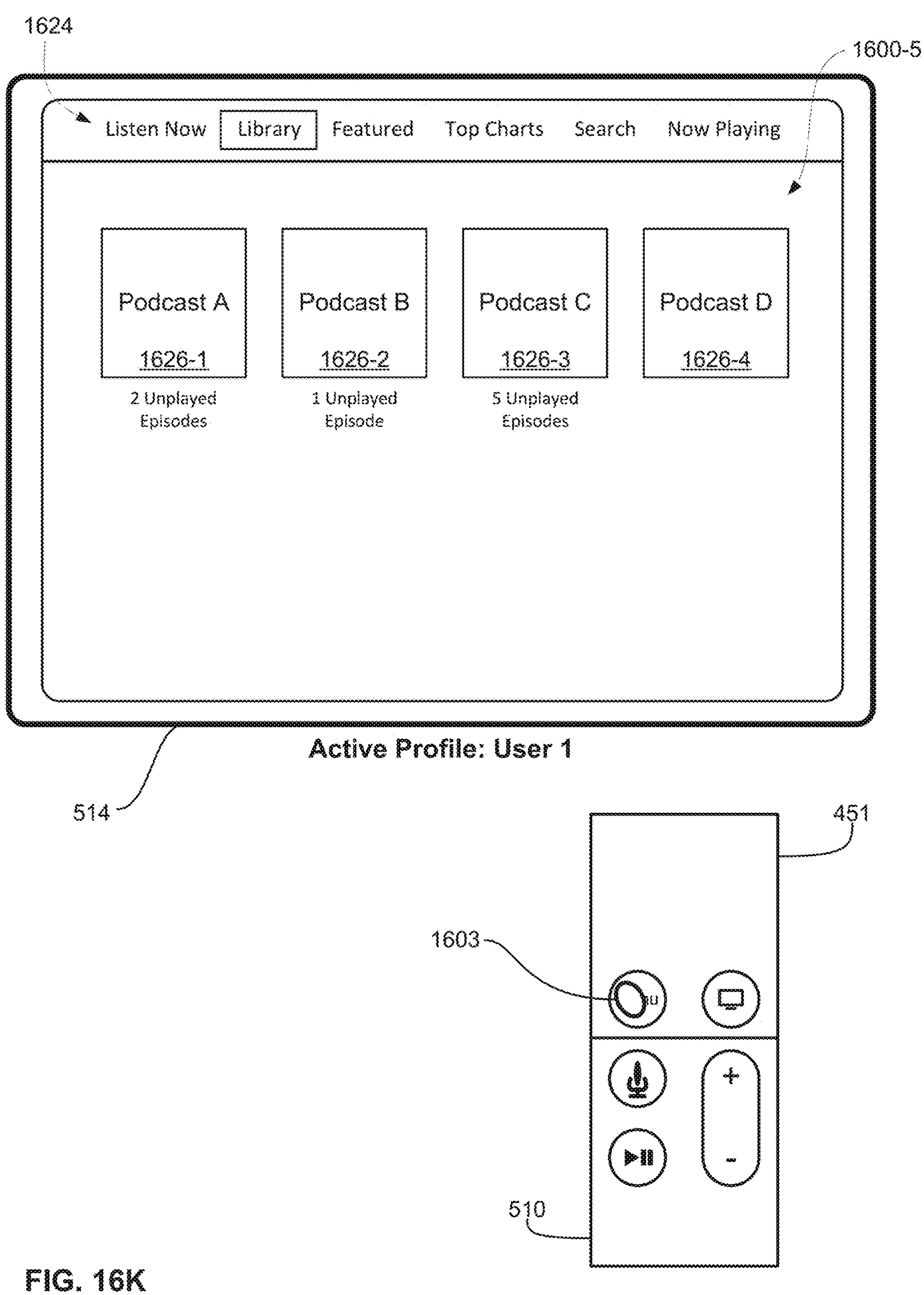
Figure 16L:
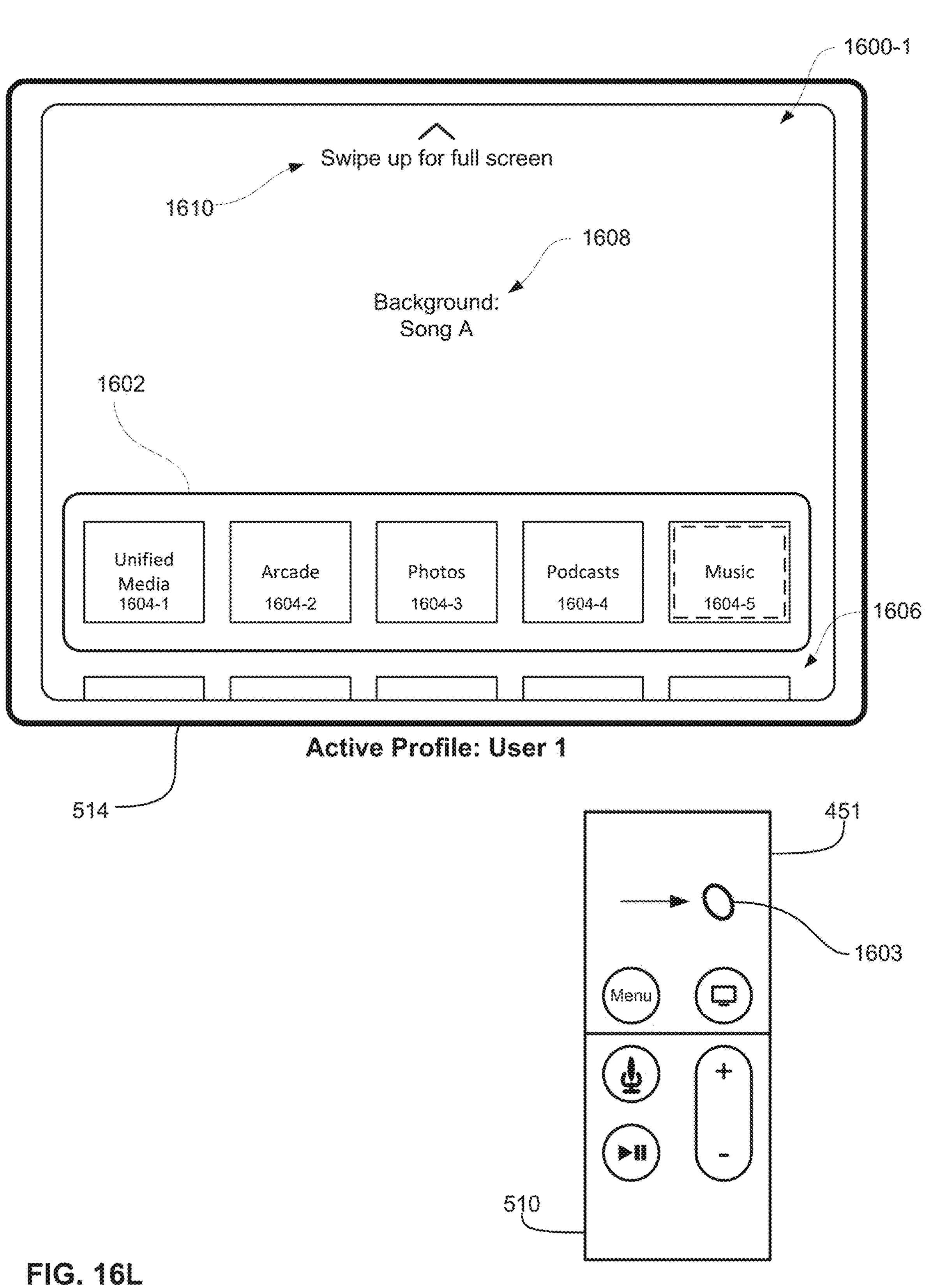
Figure 16M:
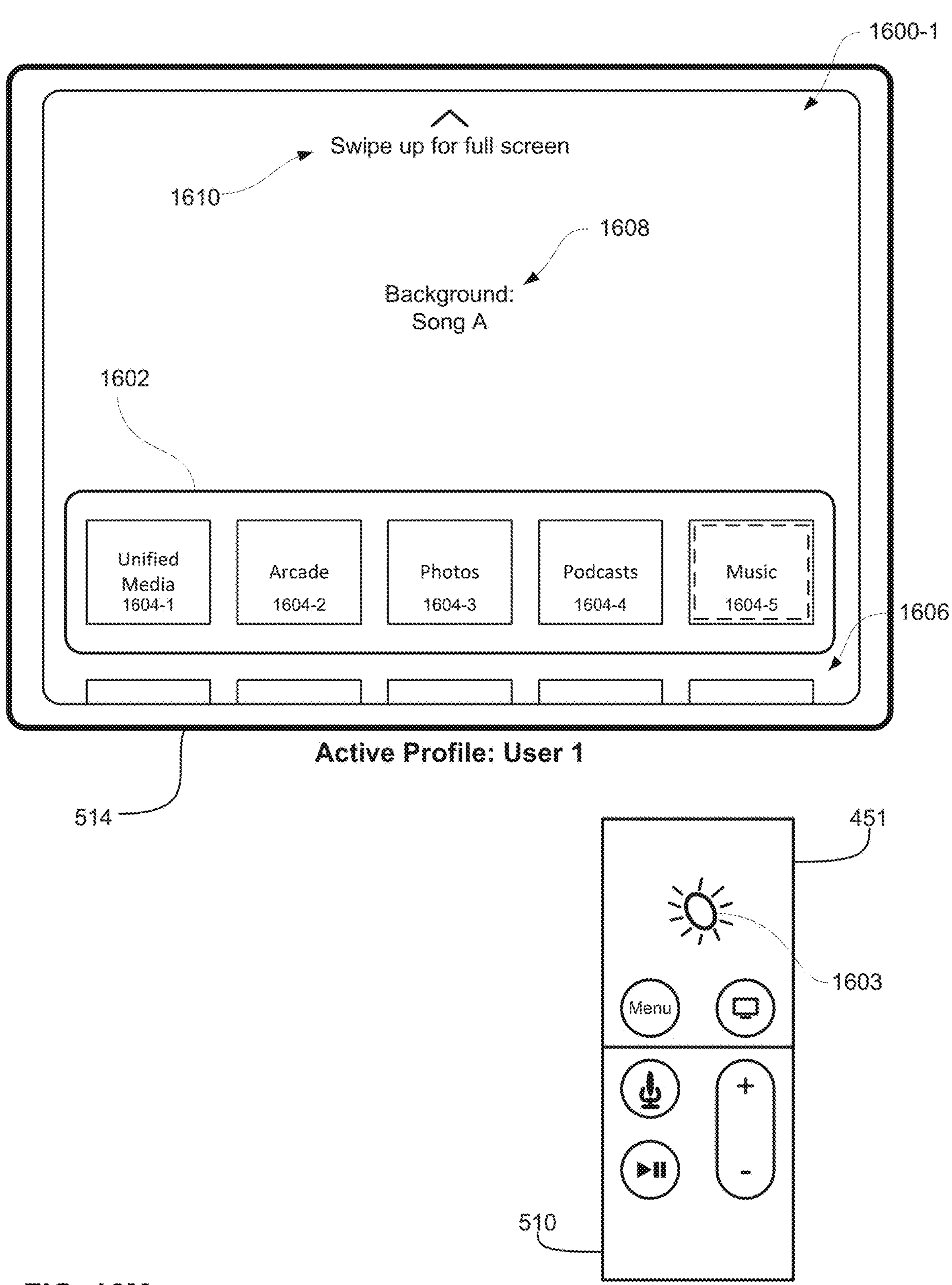
Figure 16N:
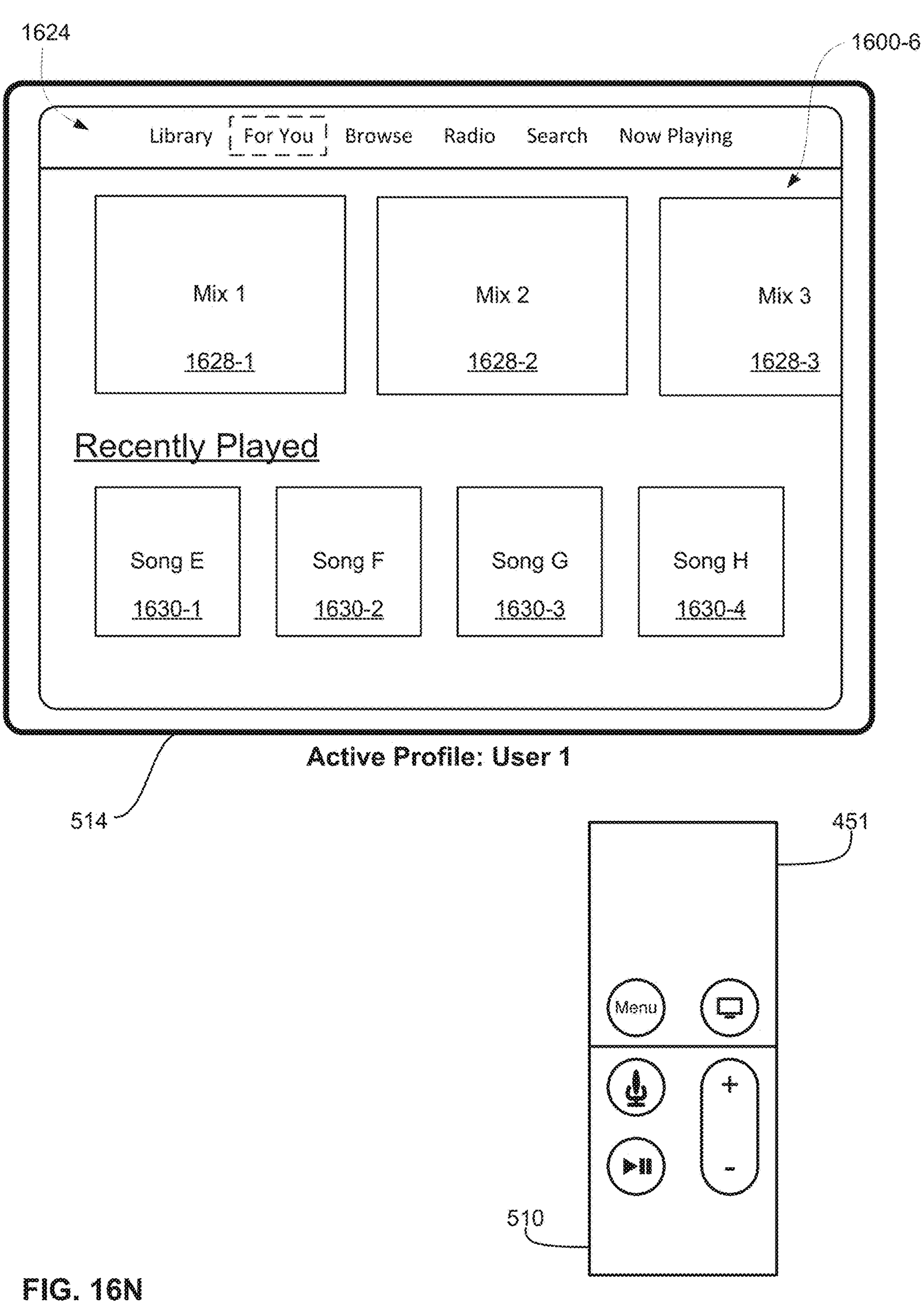
Figure 16O:
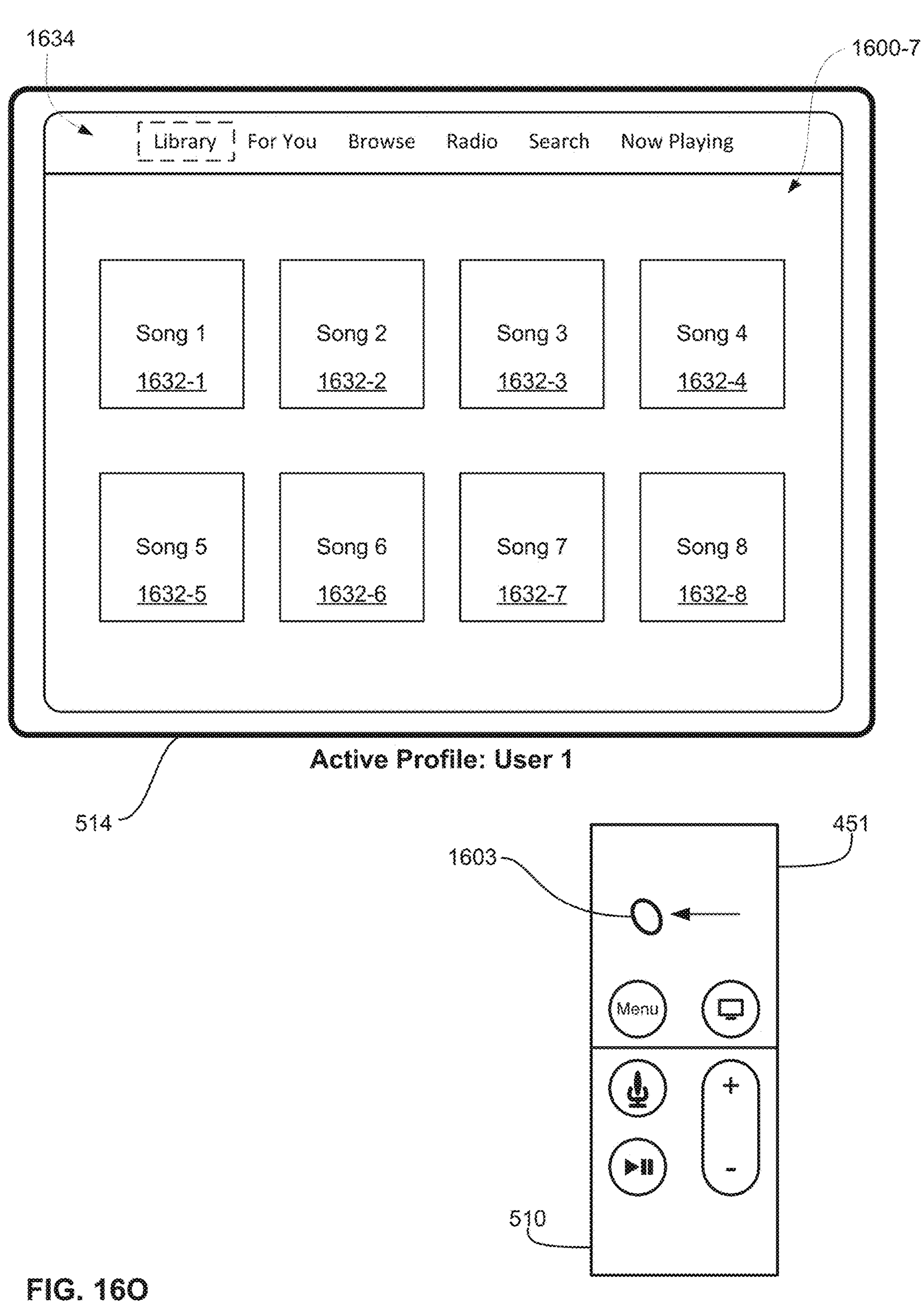
Figure 16P:
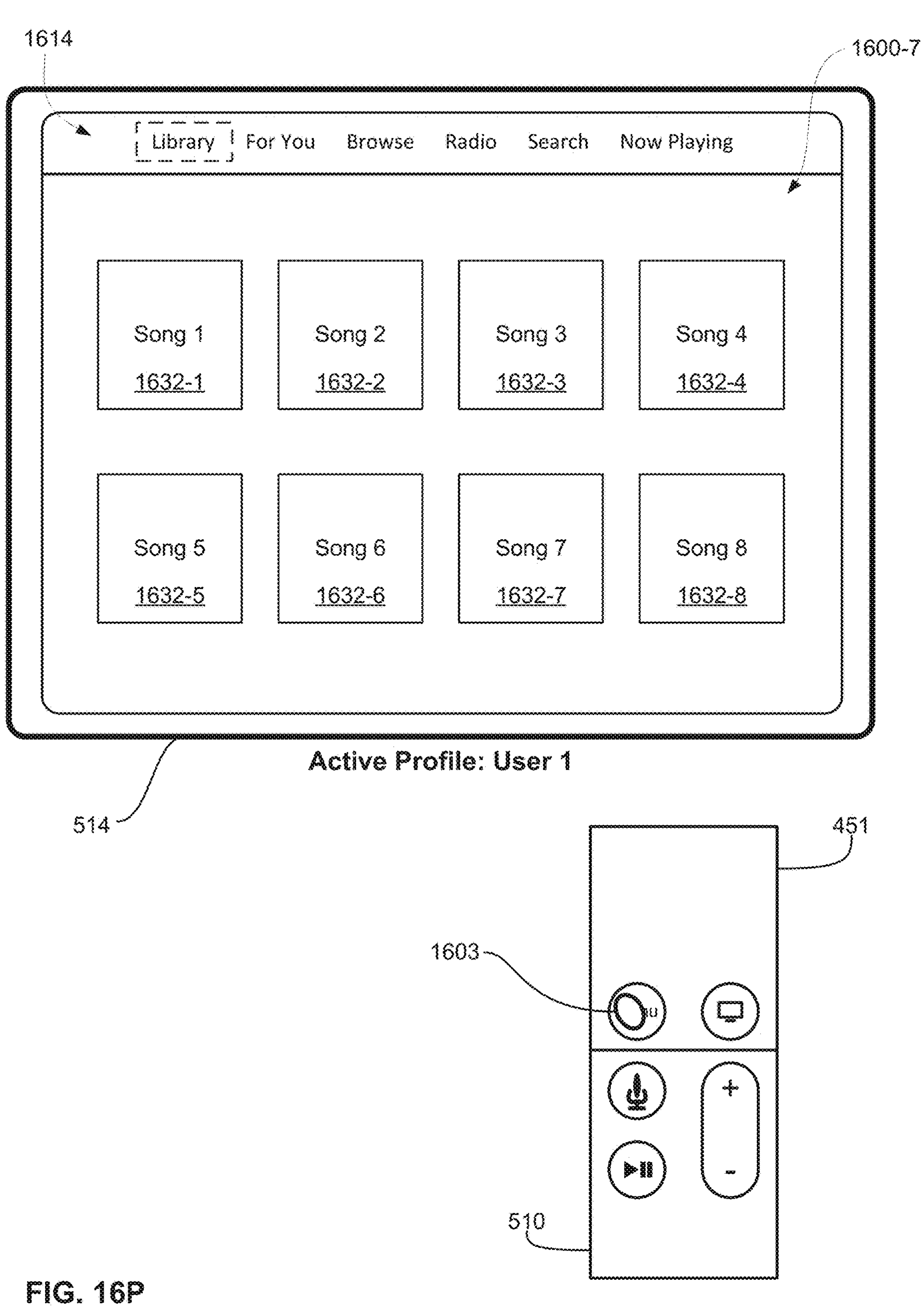
Figure 16Q:
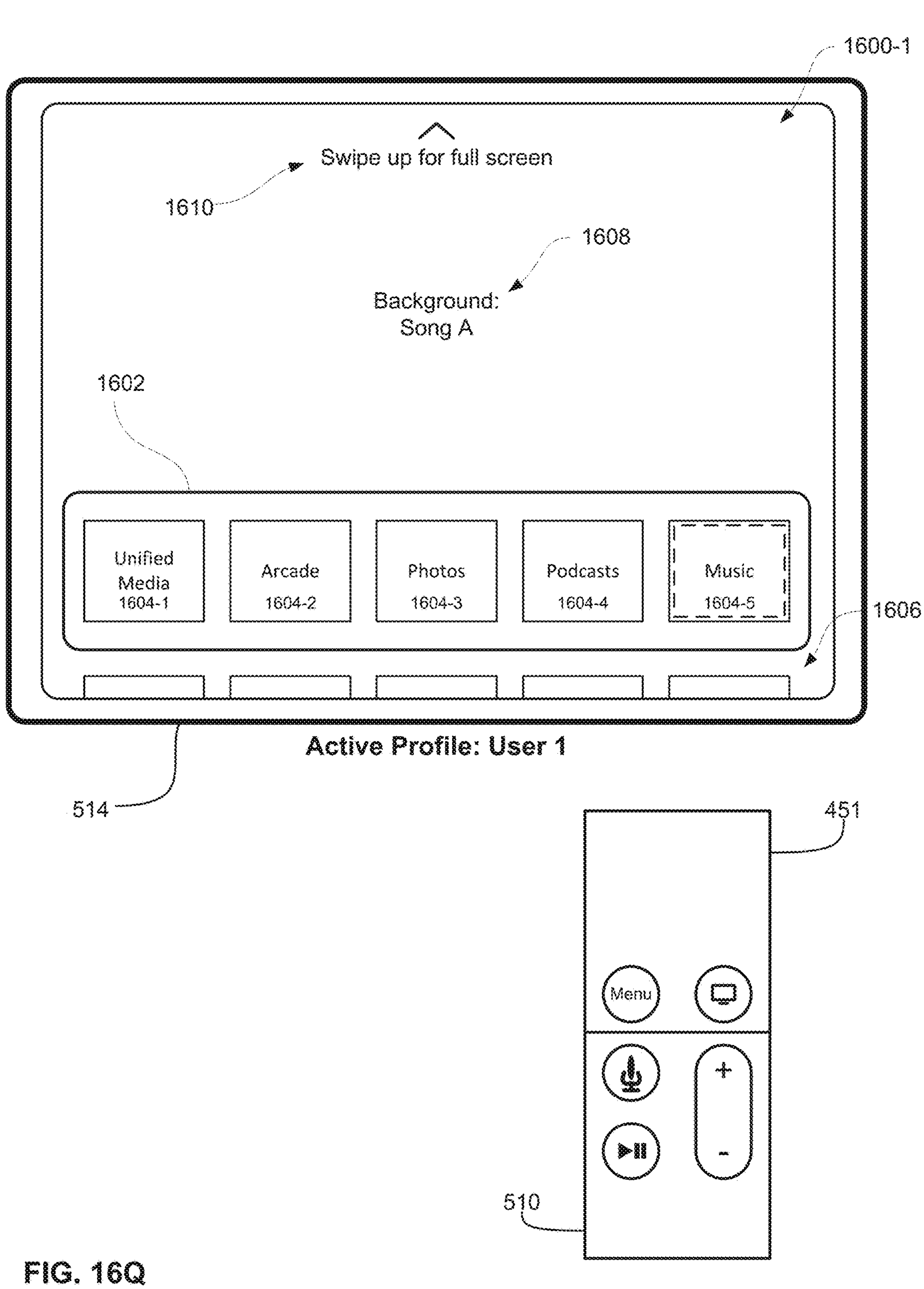
Figure 16R:
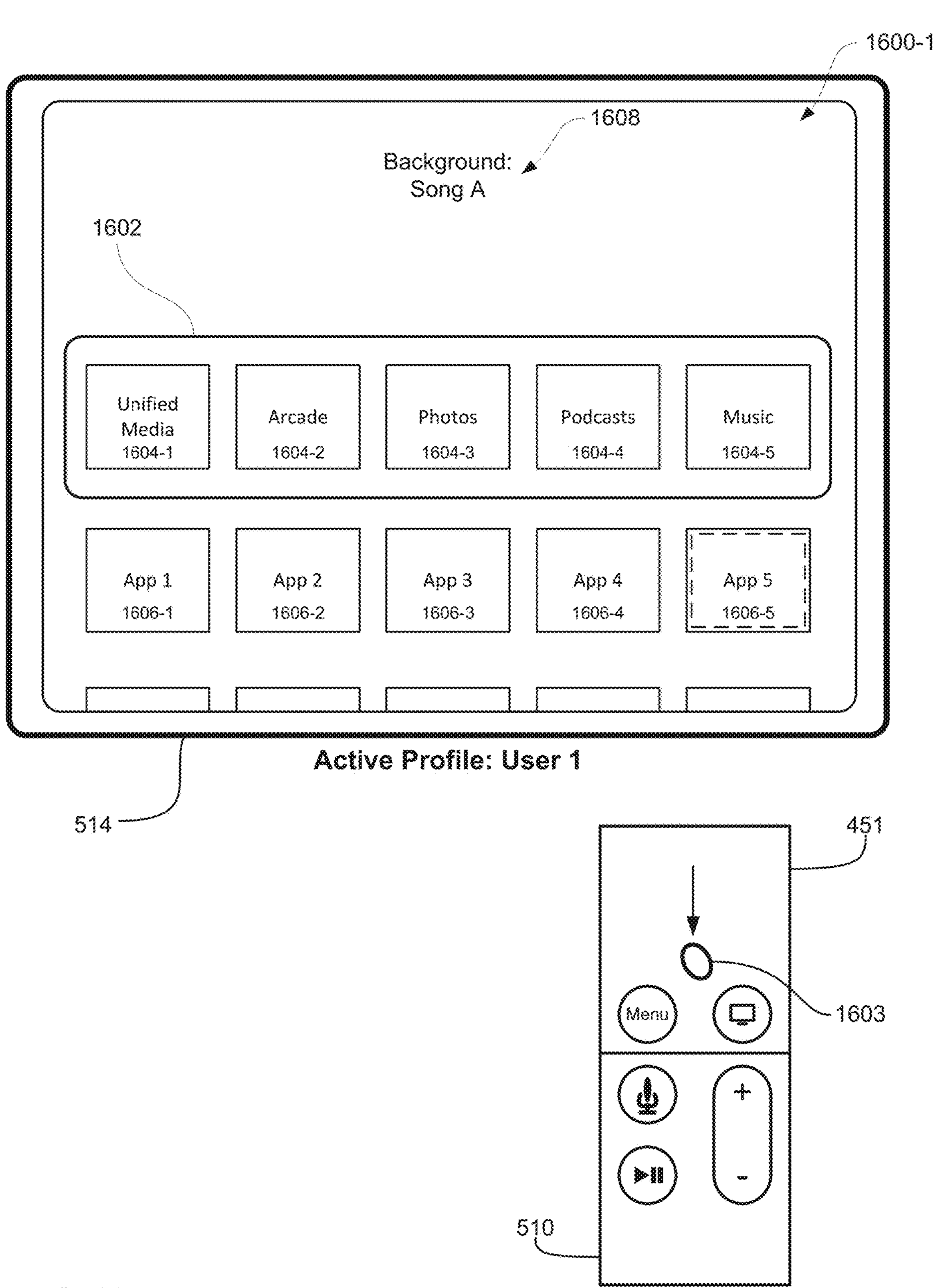
Figure 16S:
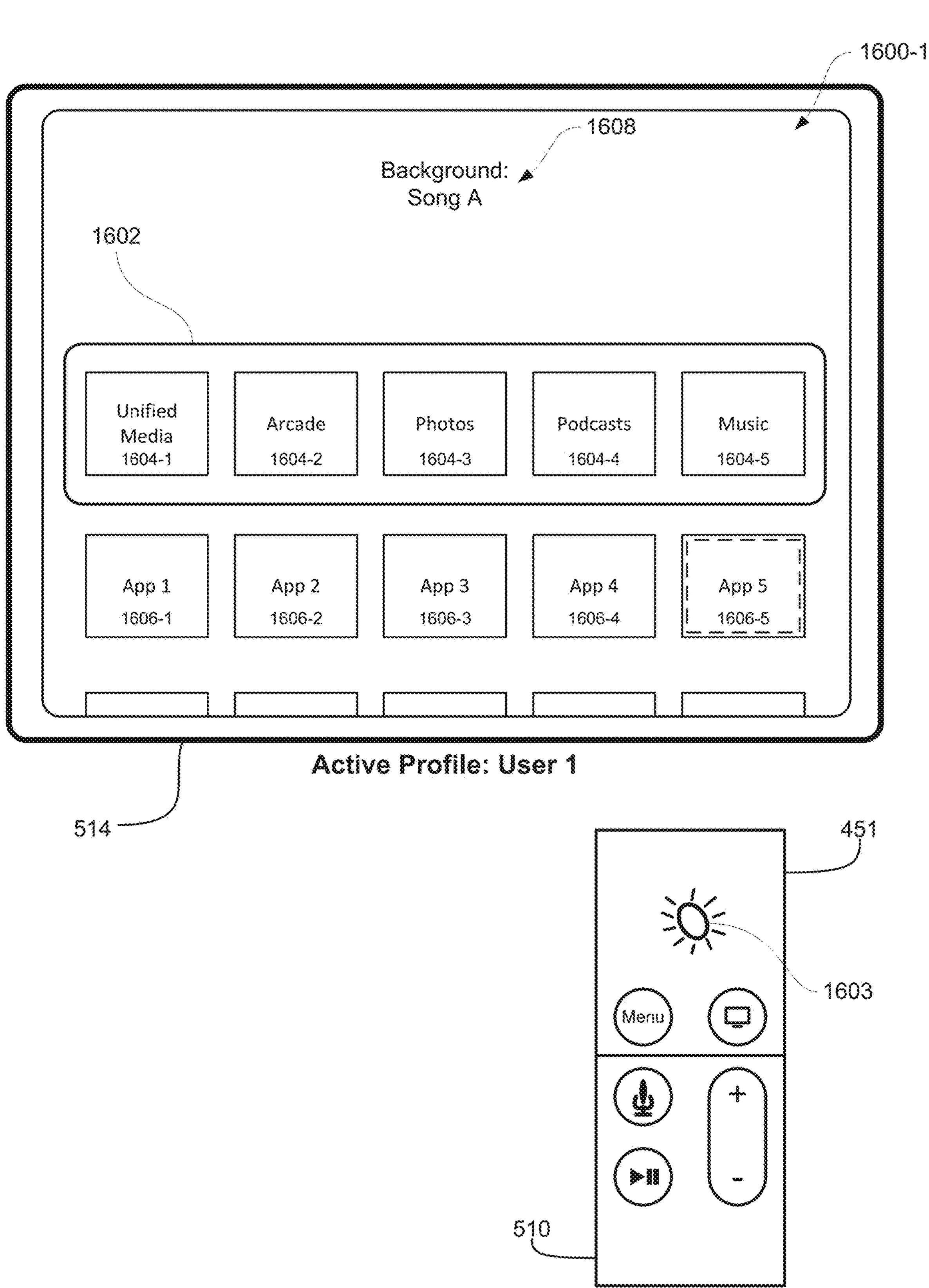
Figure 16T:
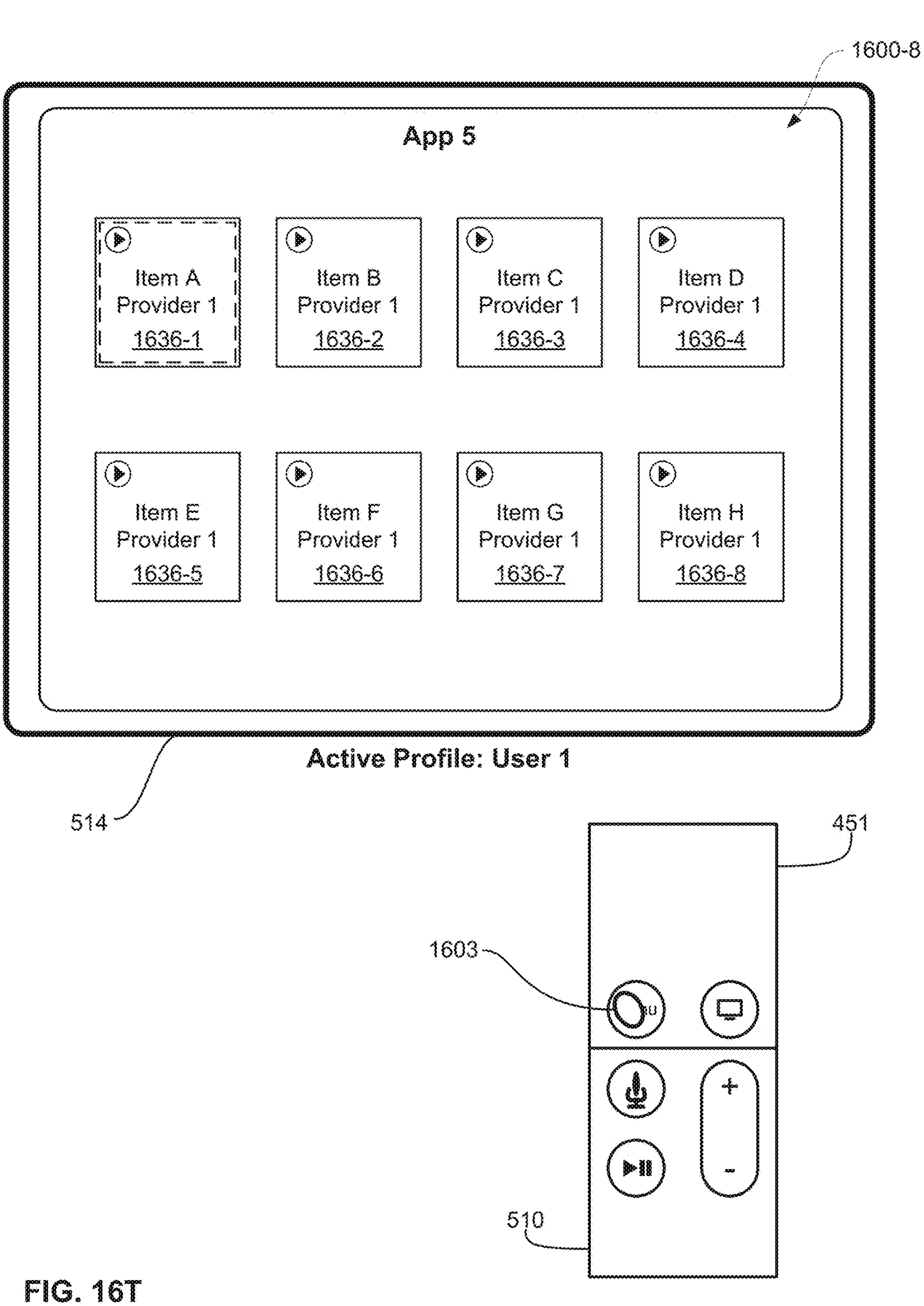
Figure 16U:
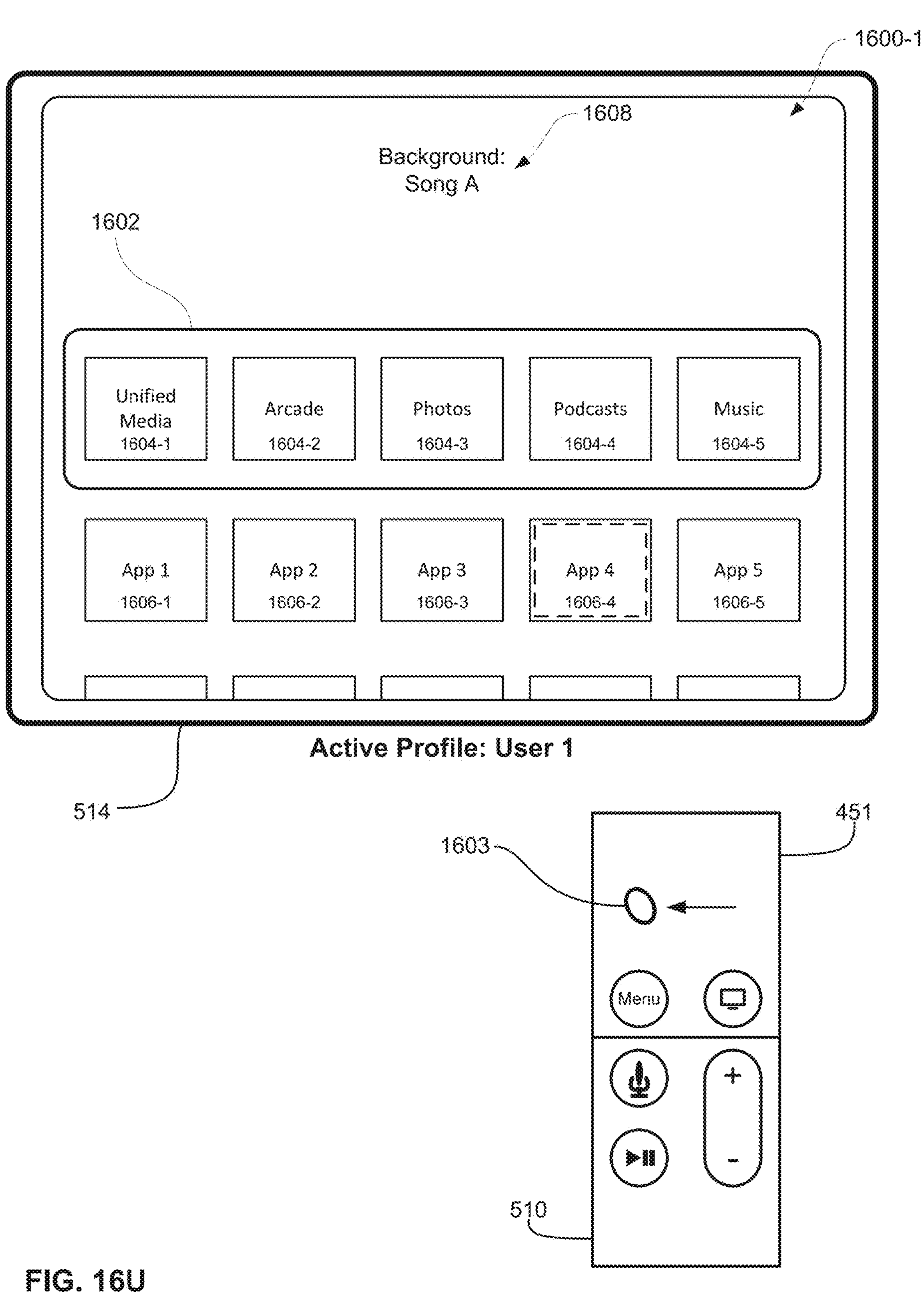
Figure 16V:
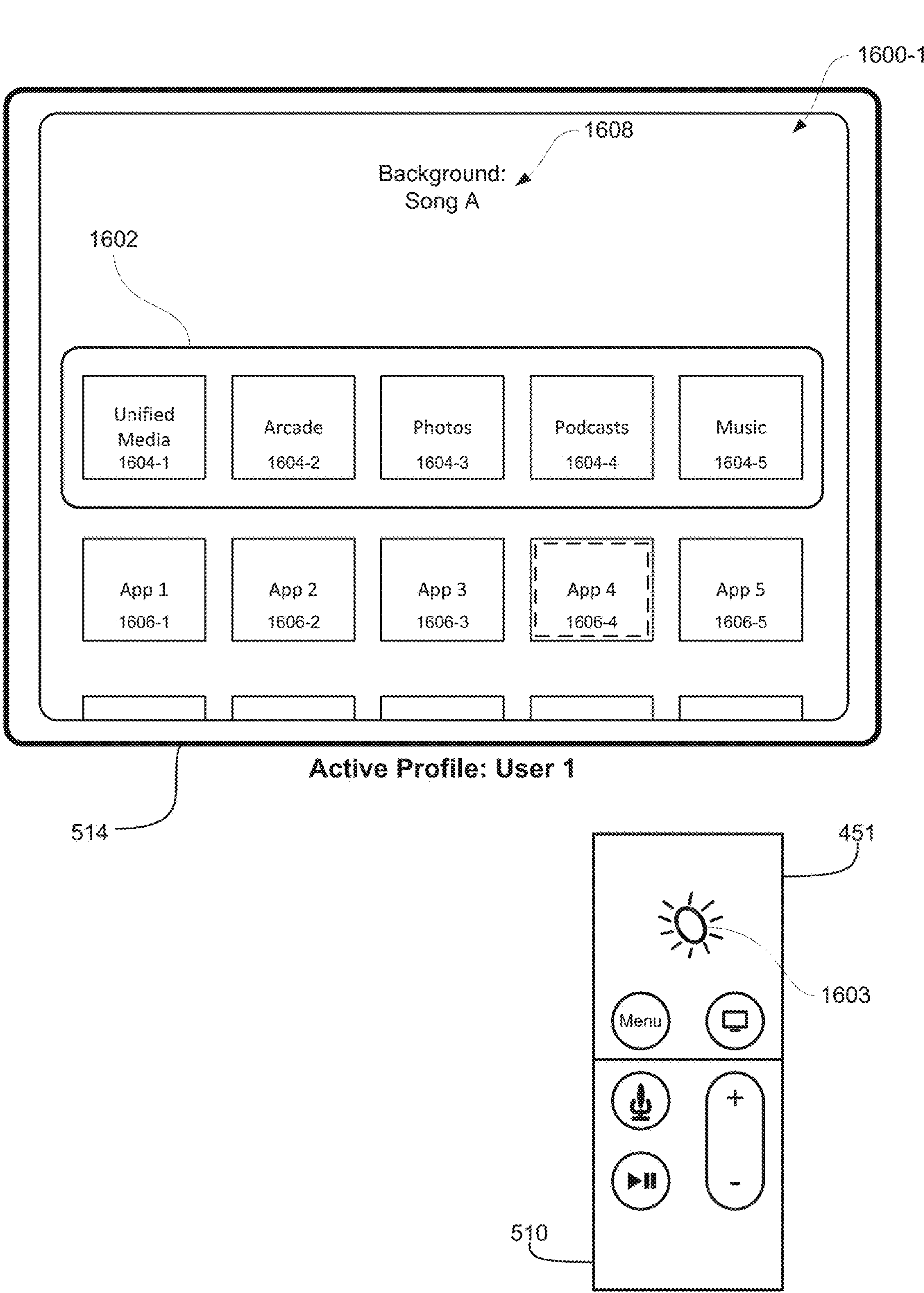
Figure 16W:
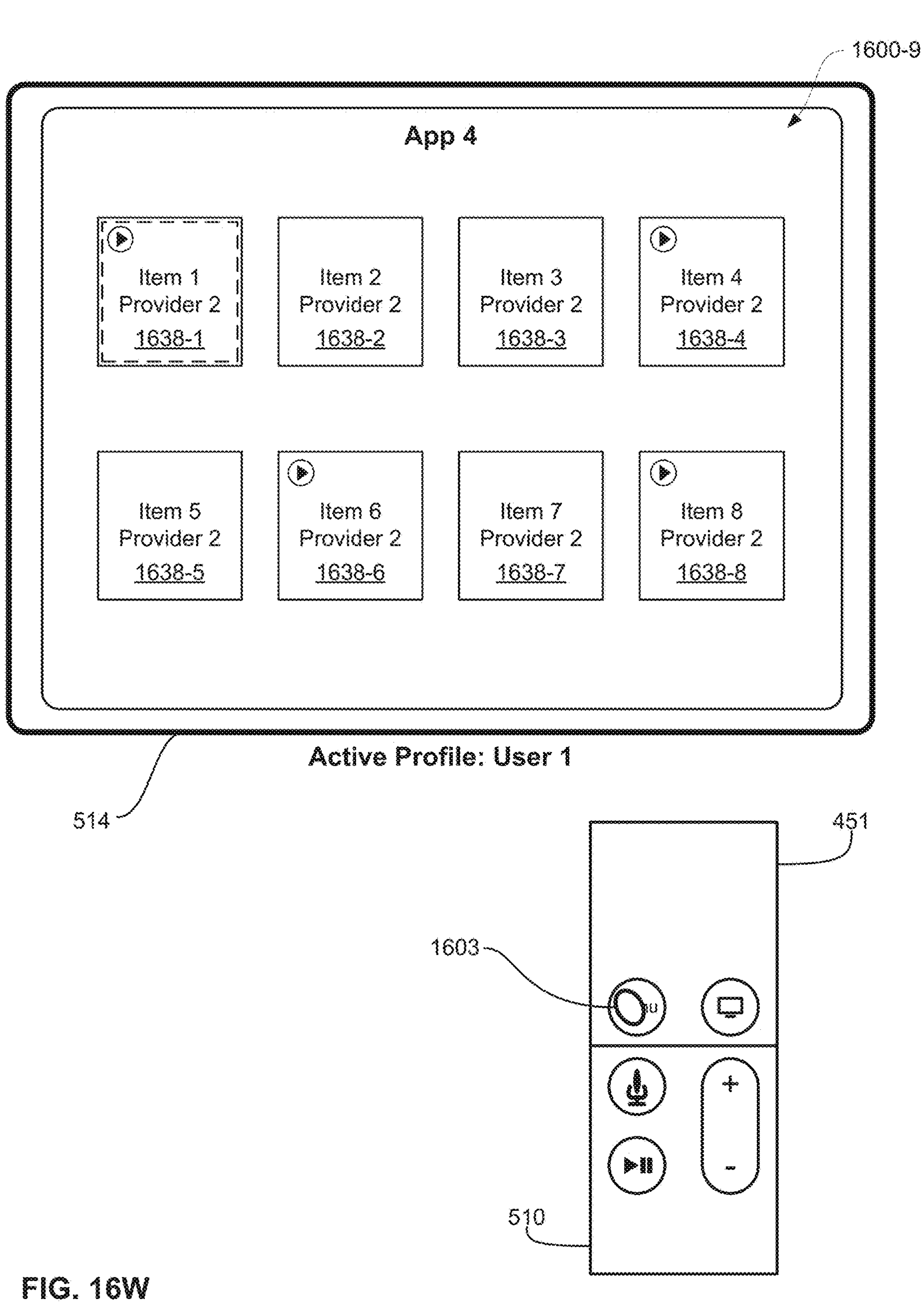
Figure 16X:
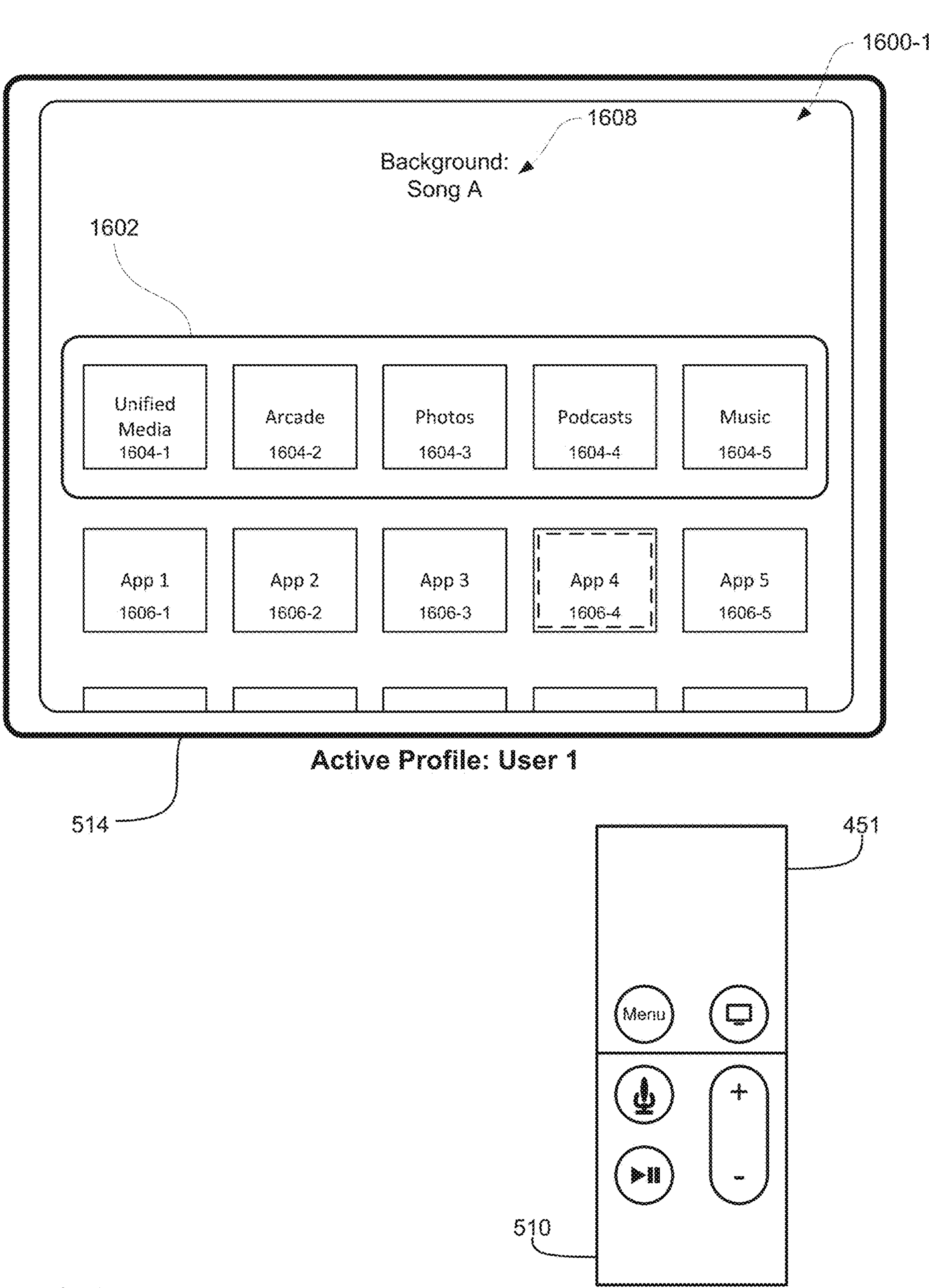
Figure 16Y:
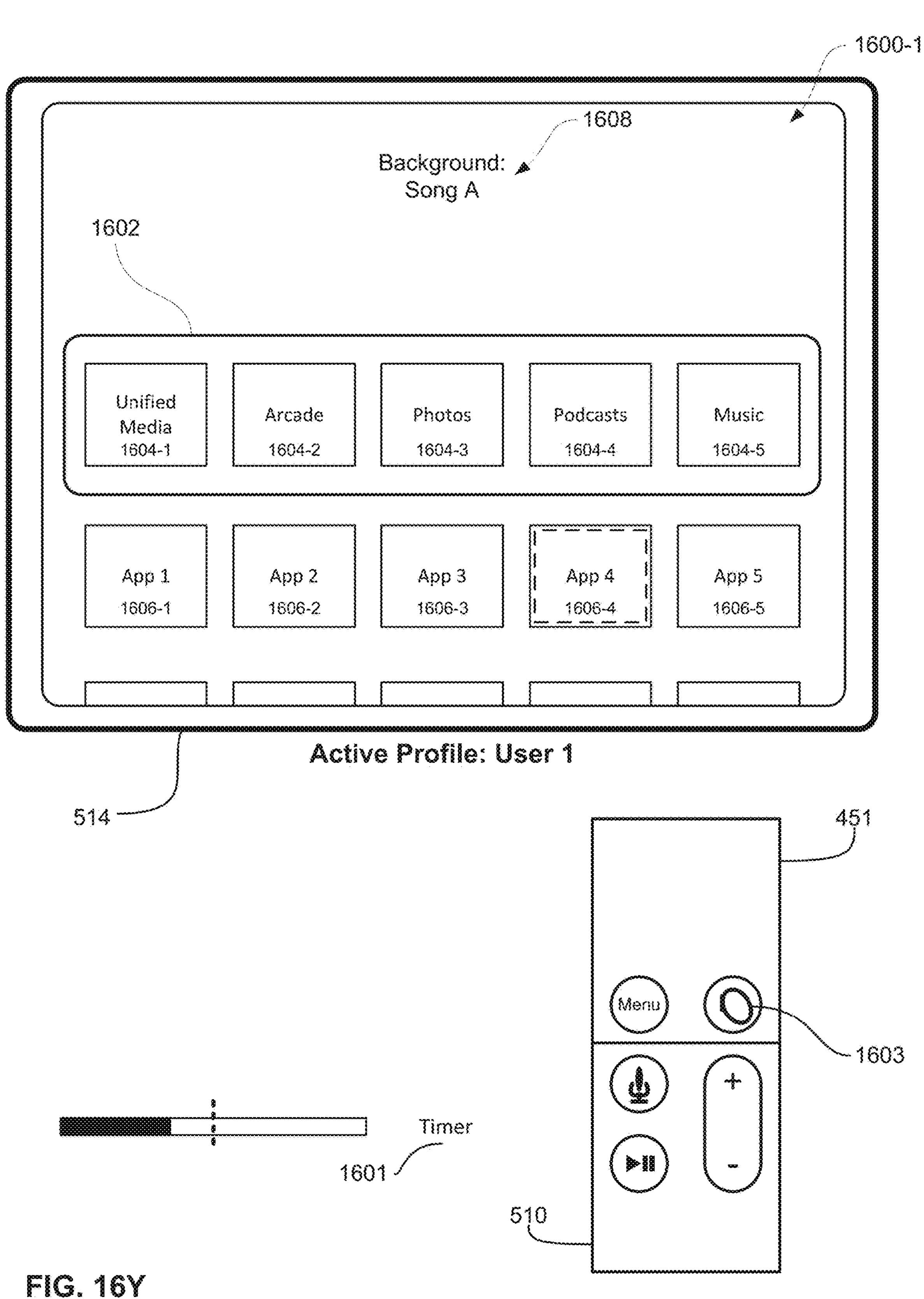
Figure 16Z:
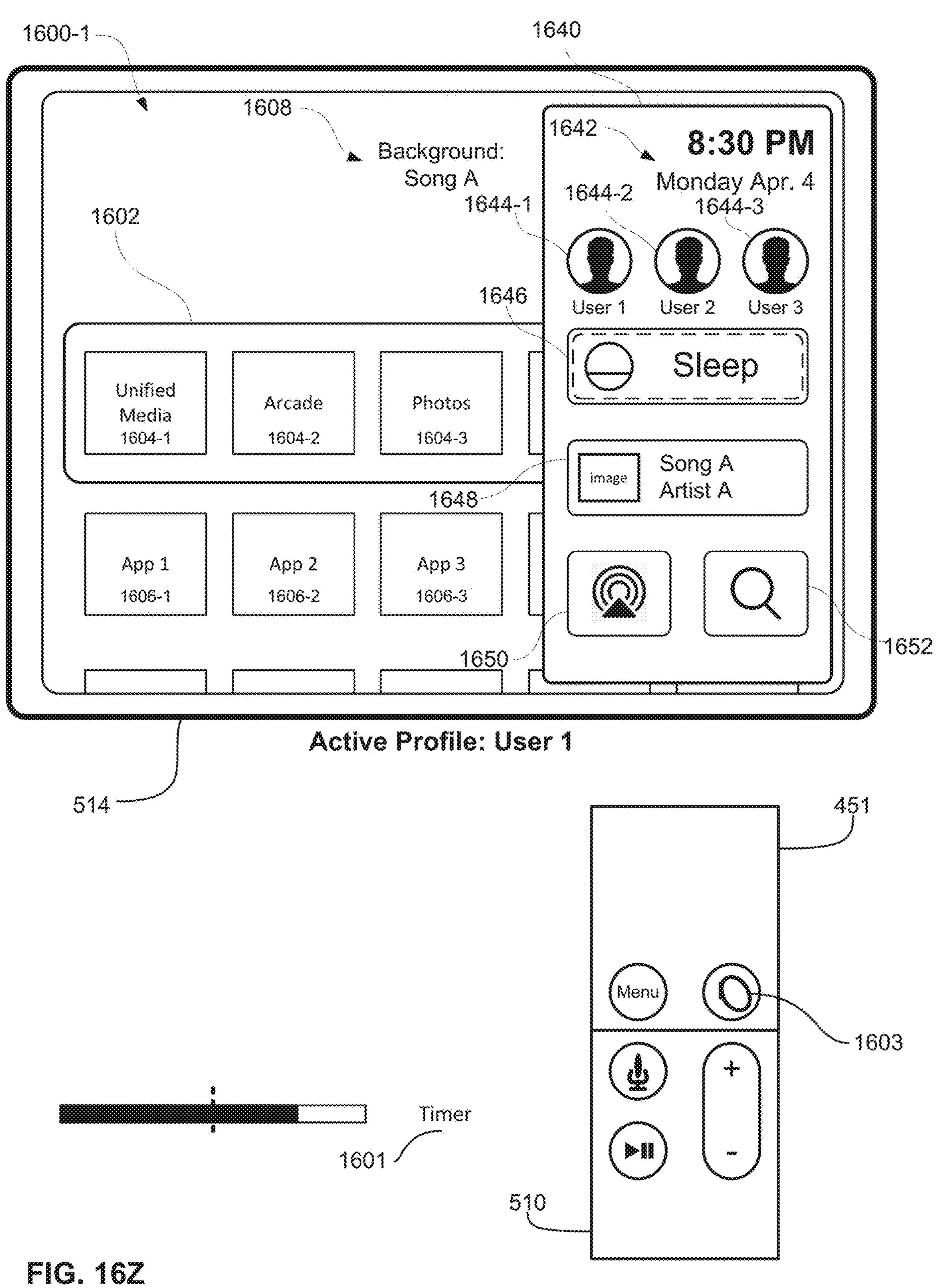
Figure 16A:
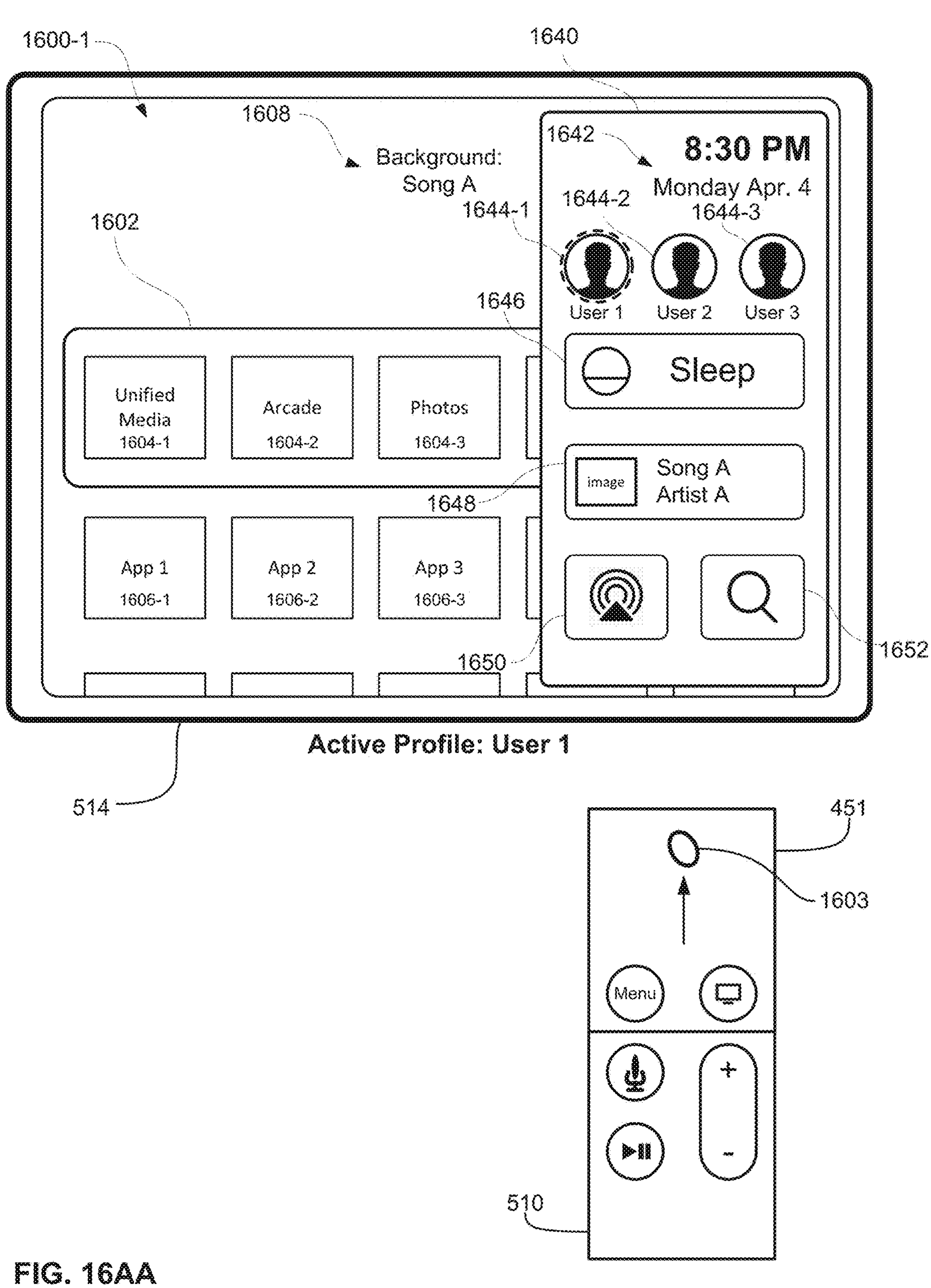
Figure 16B:
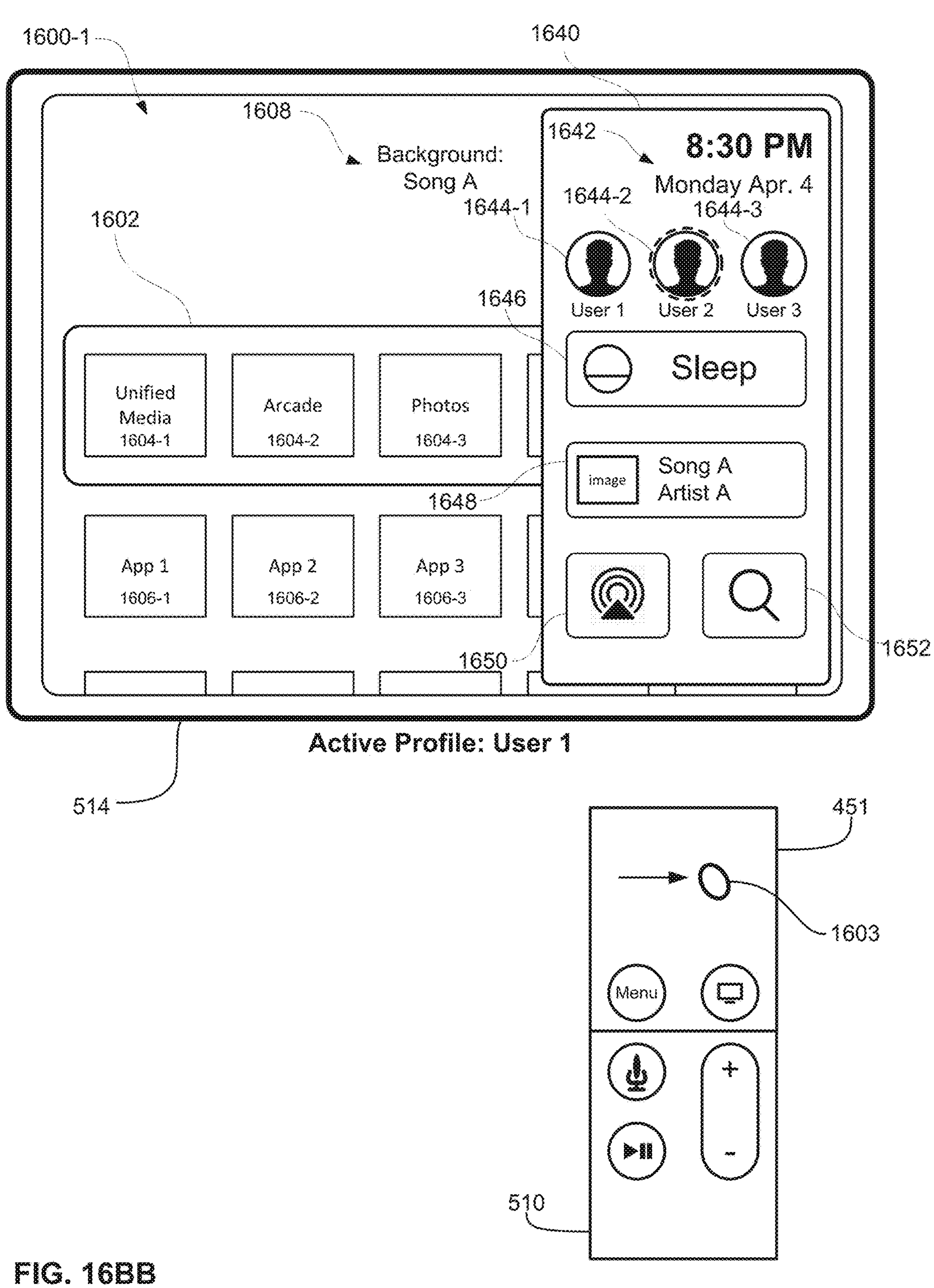
Figure 16C:
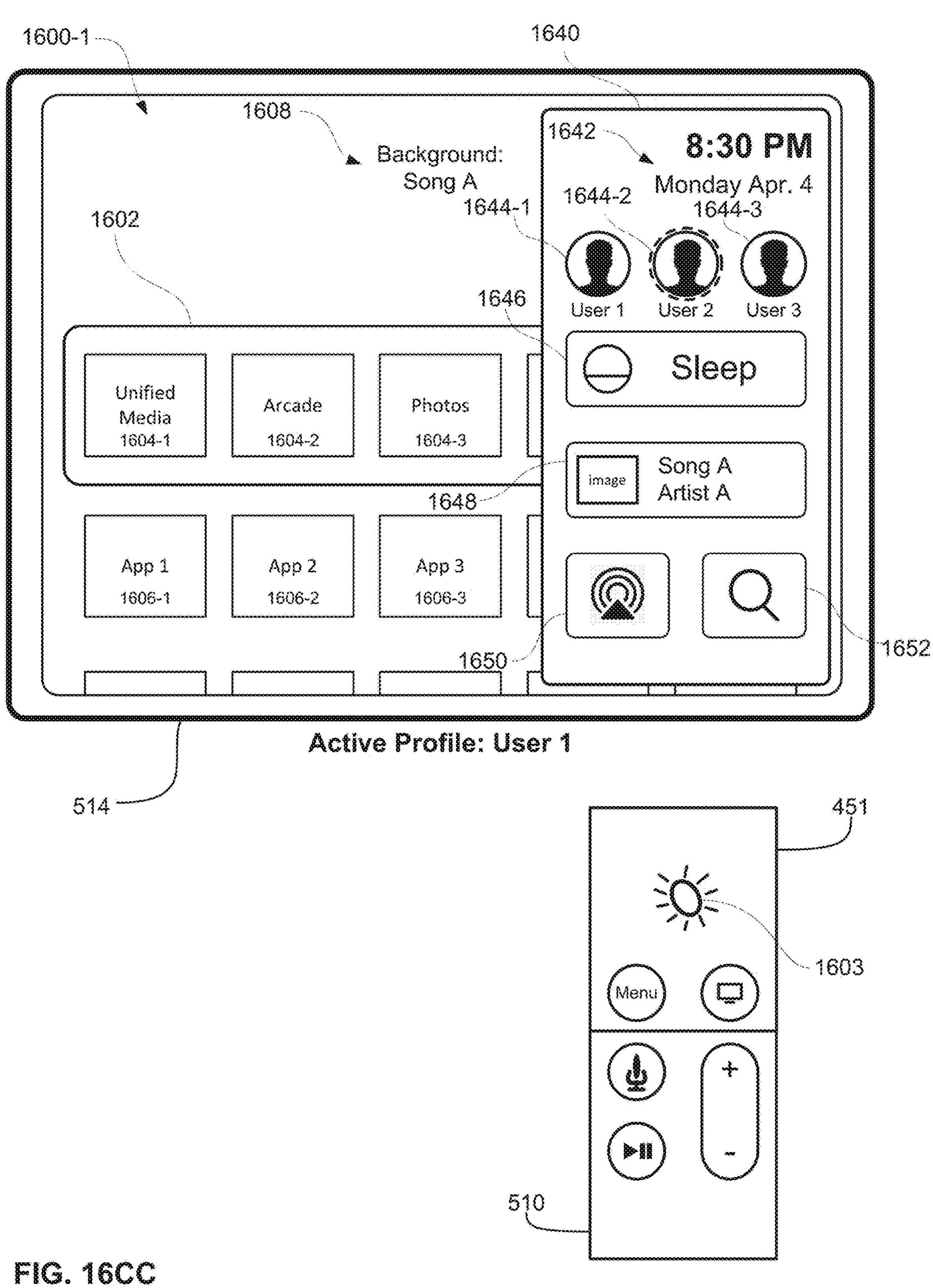
Figure 16D:
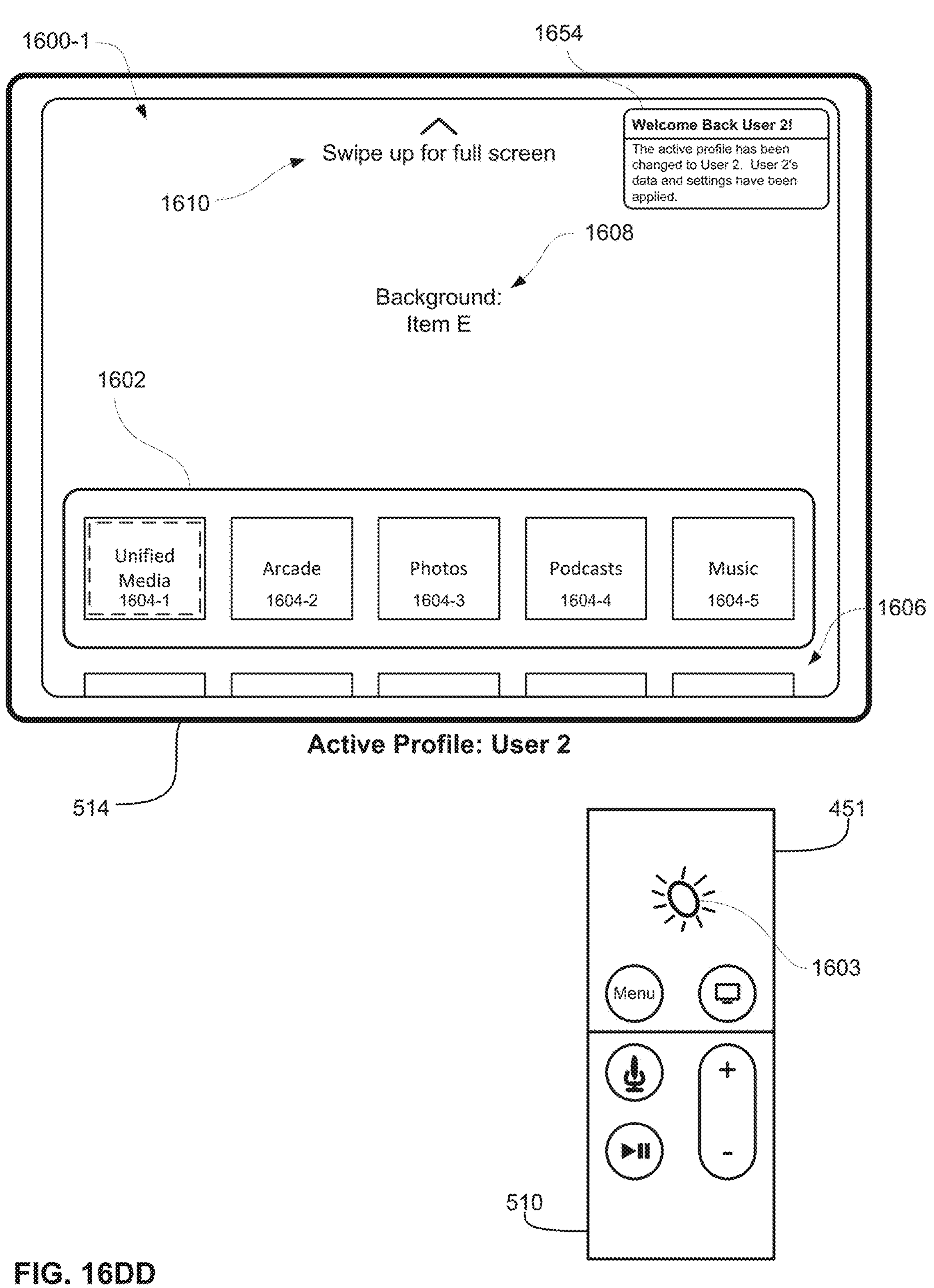
Figure 16E:
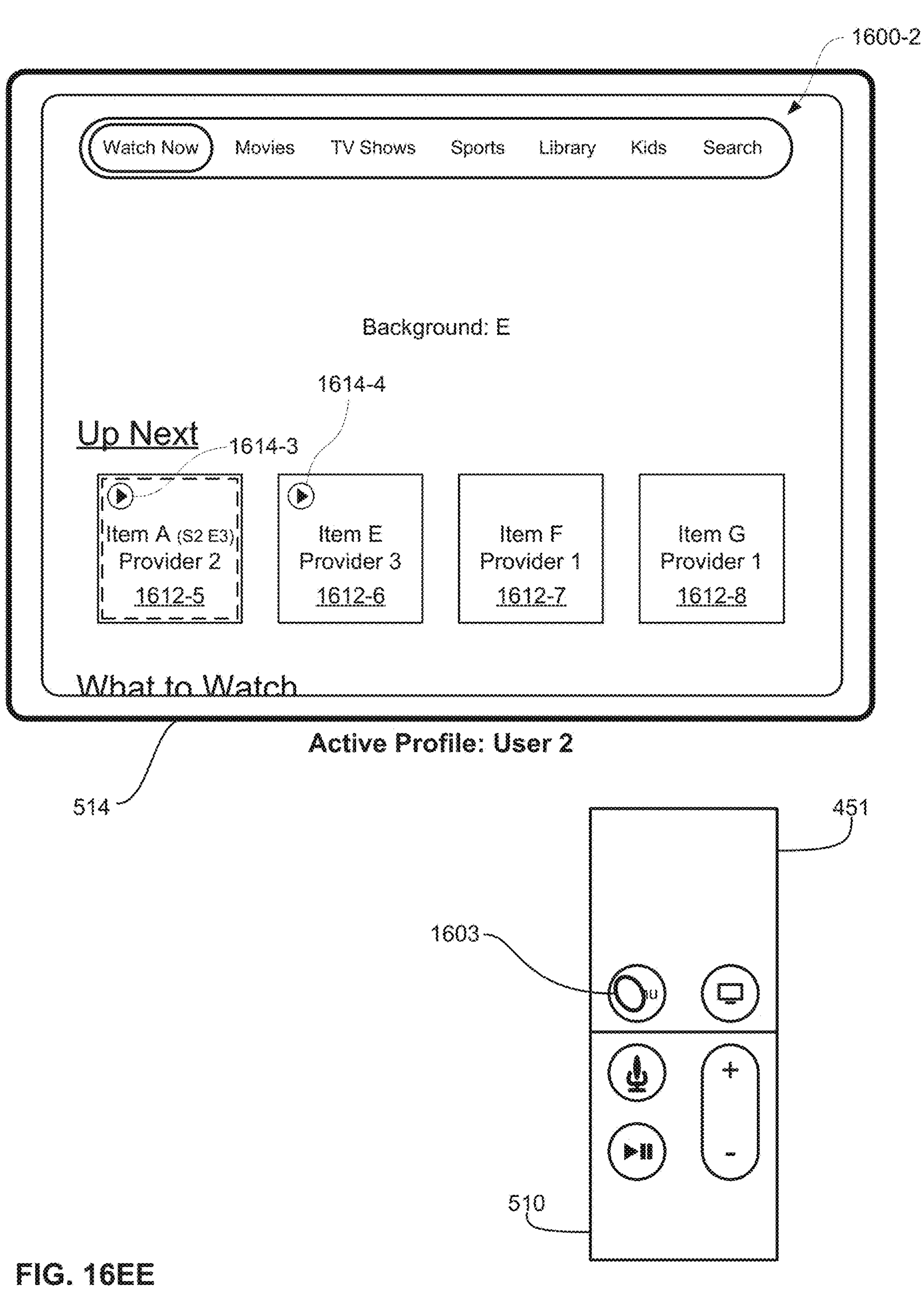
Figure 16F:
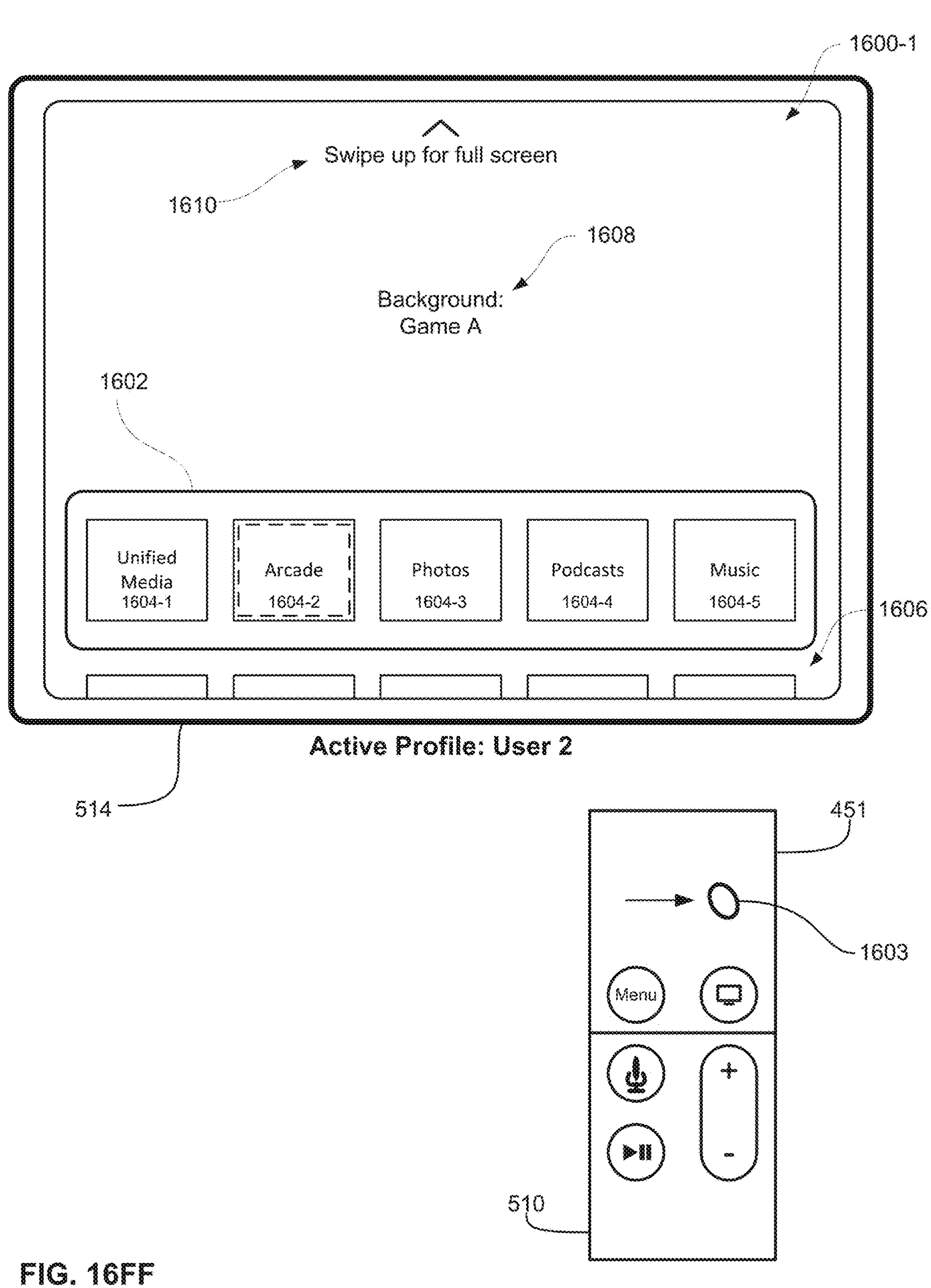
Figure 16G:
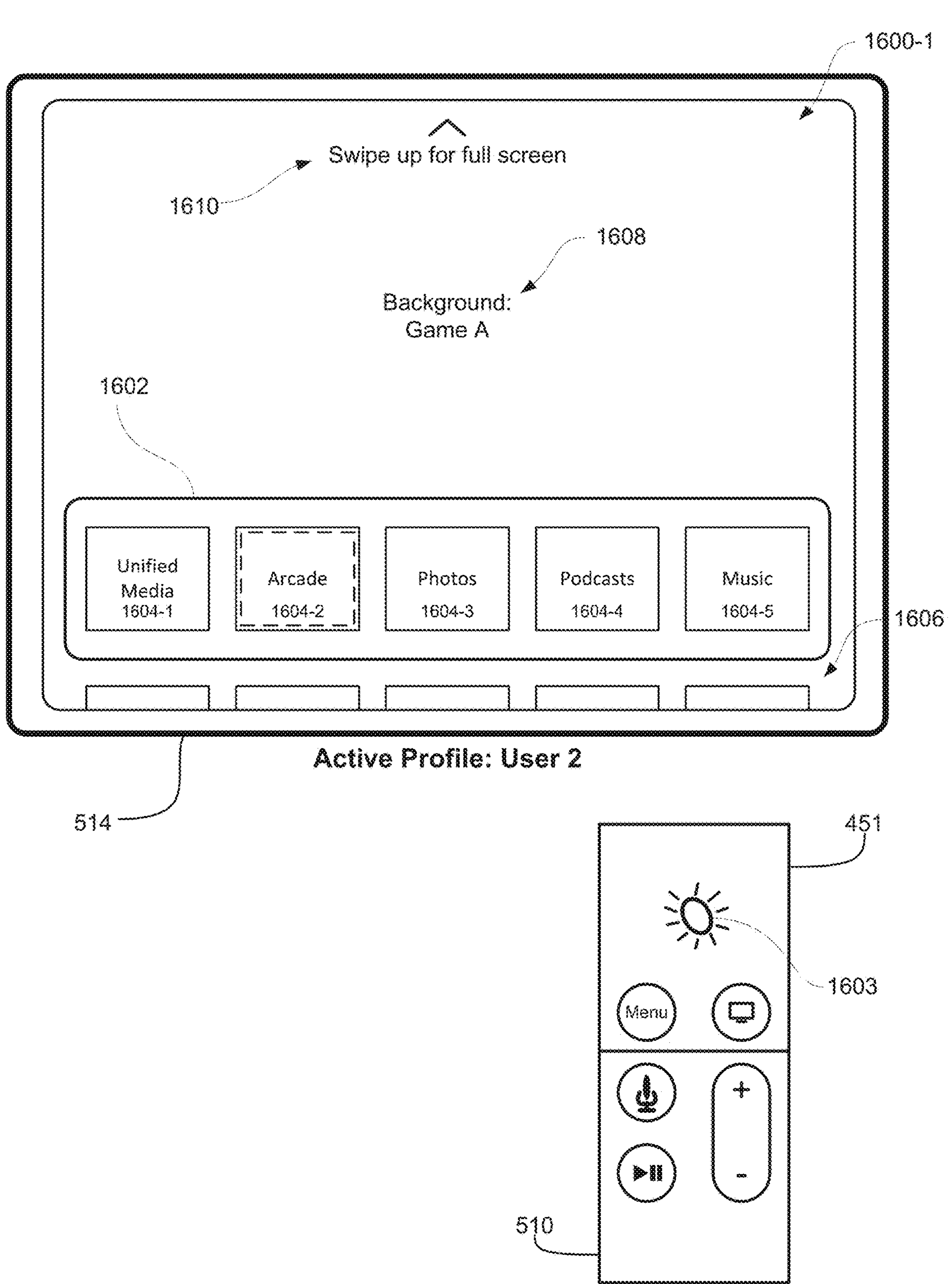
Figure 16H:
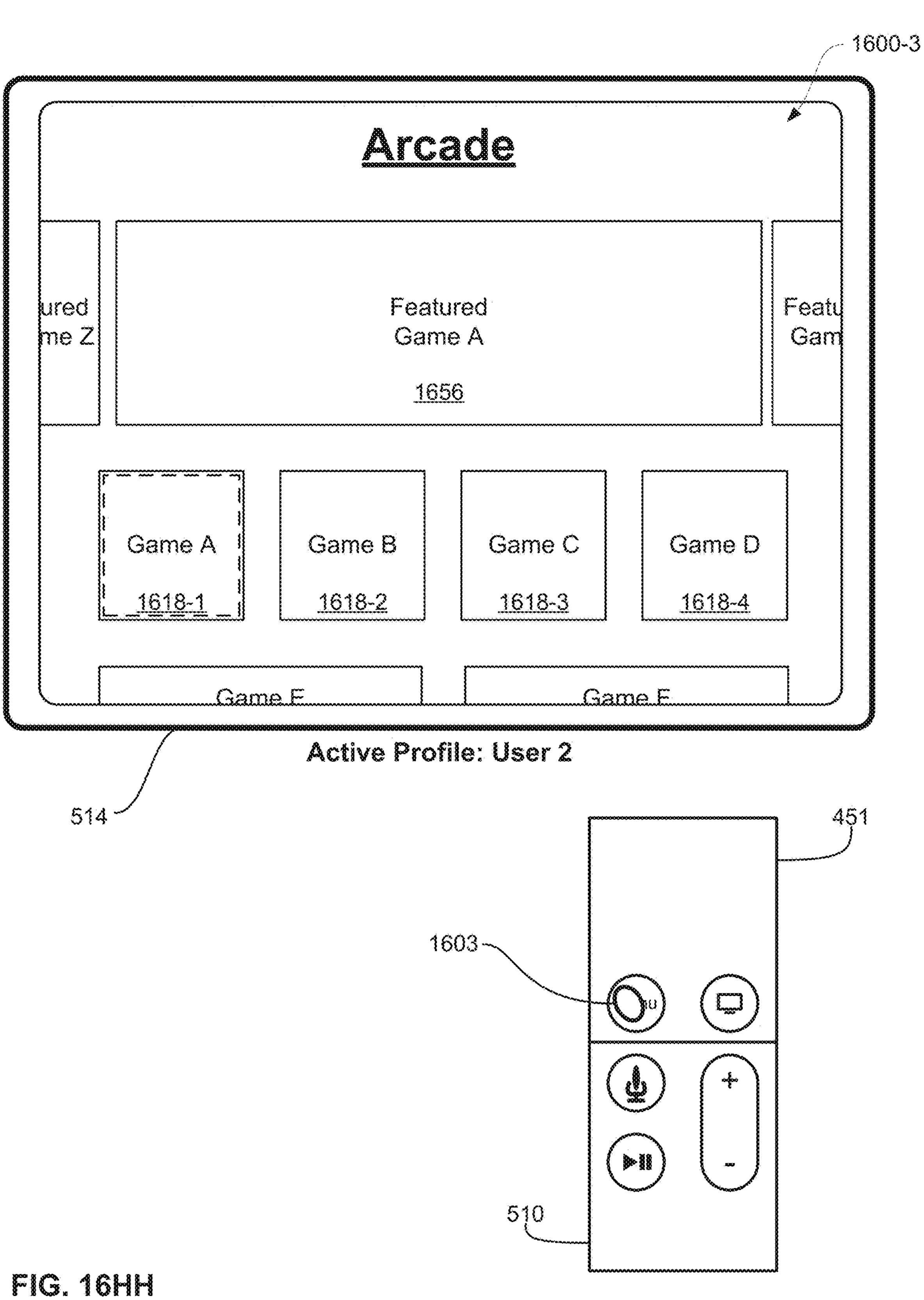
Figure 16I:
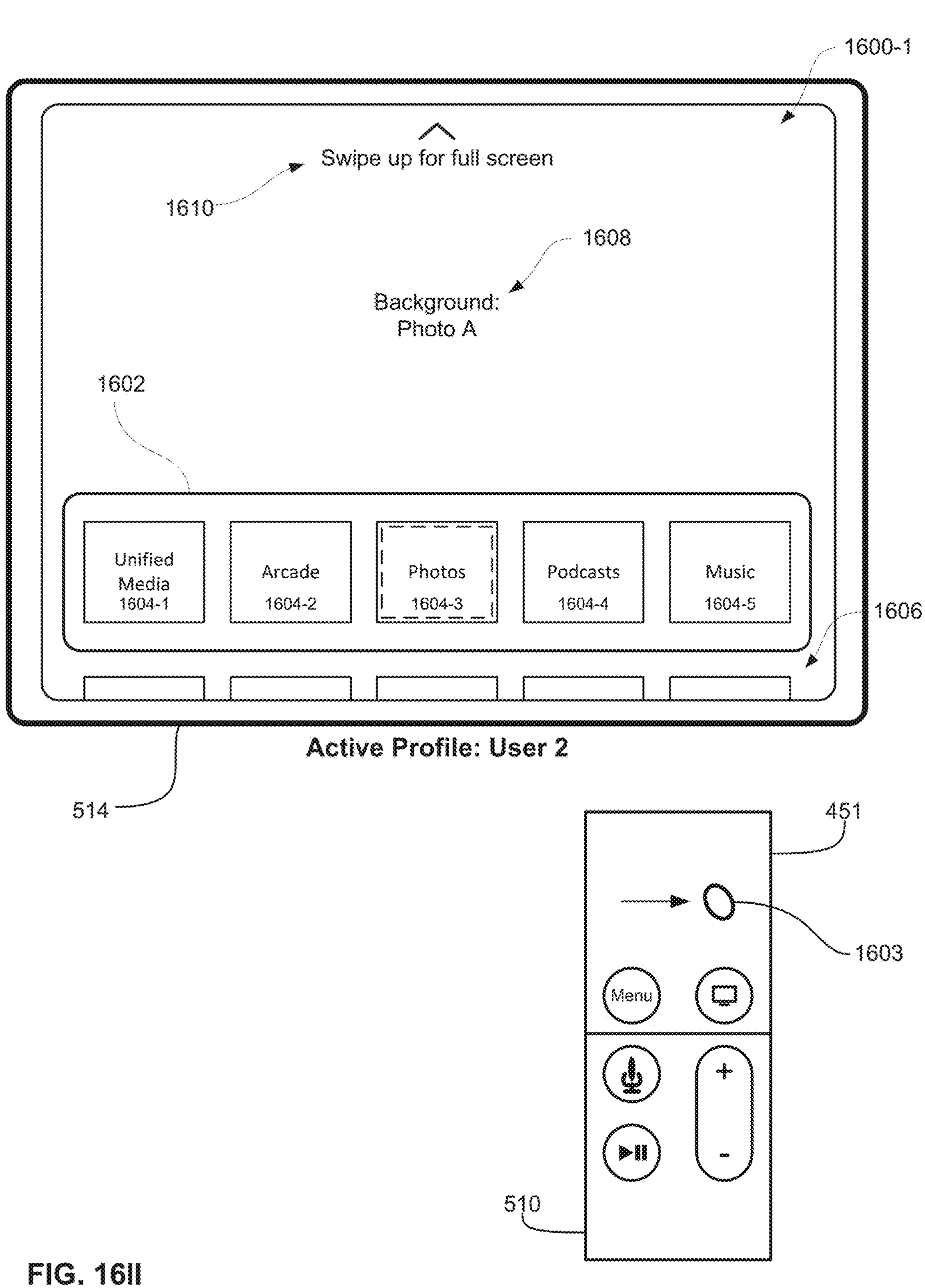
Figure 16J:
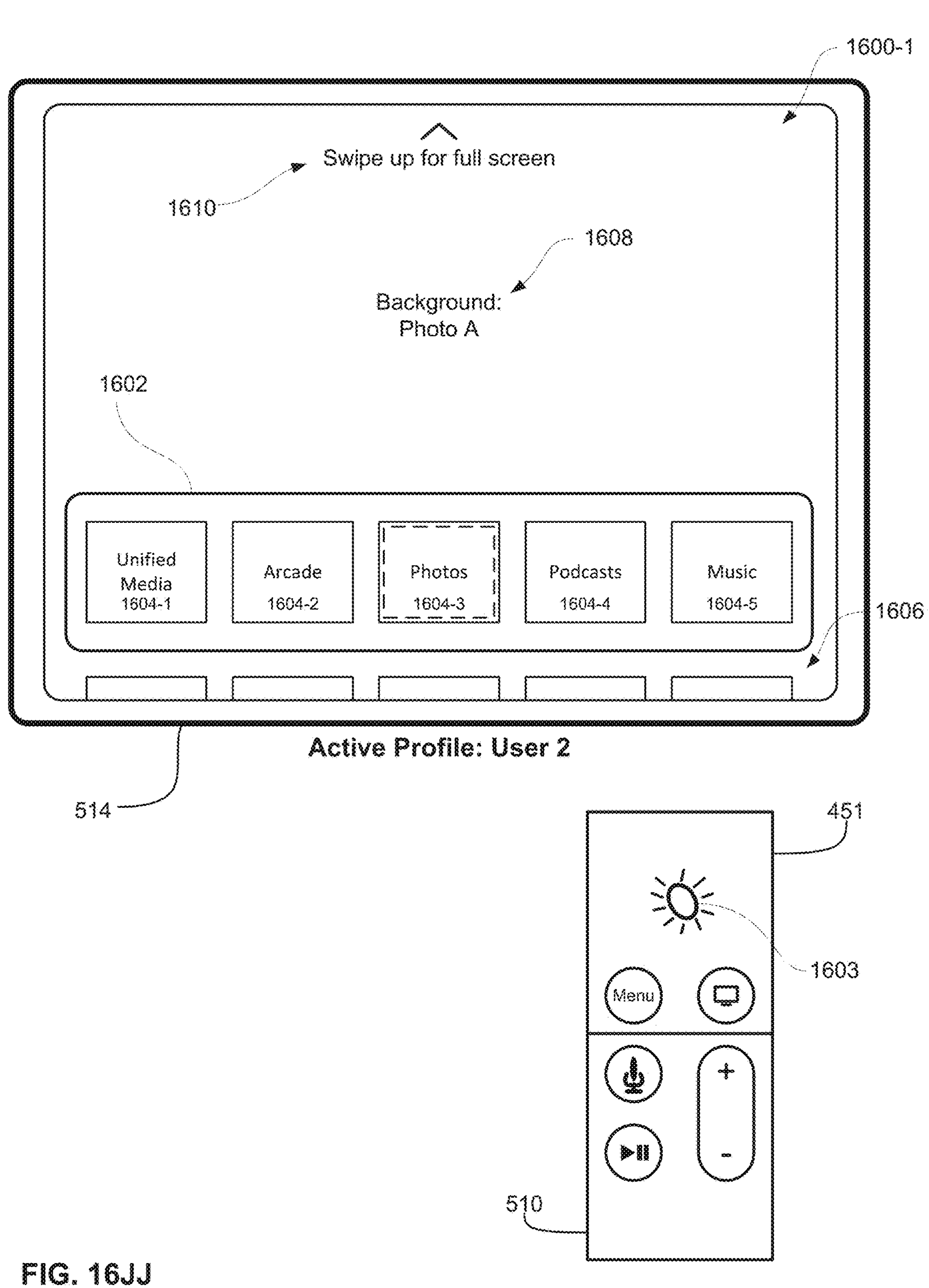
Figure 16K:
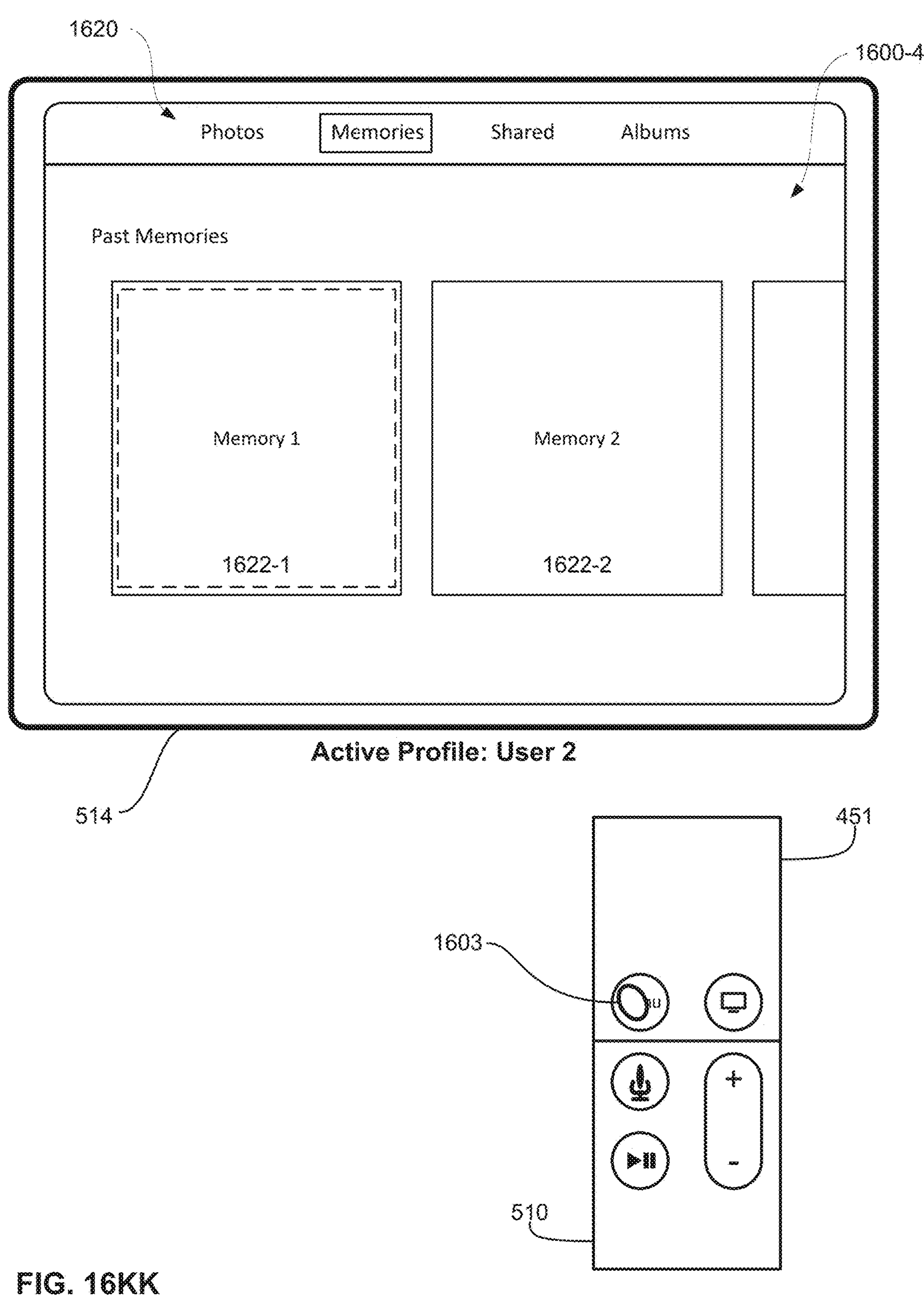
Figure 16L:
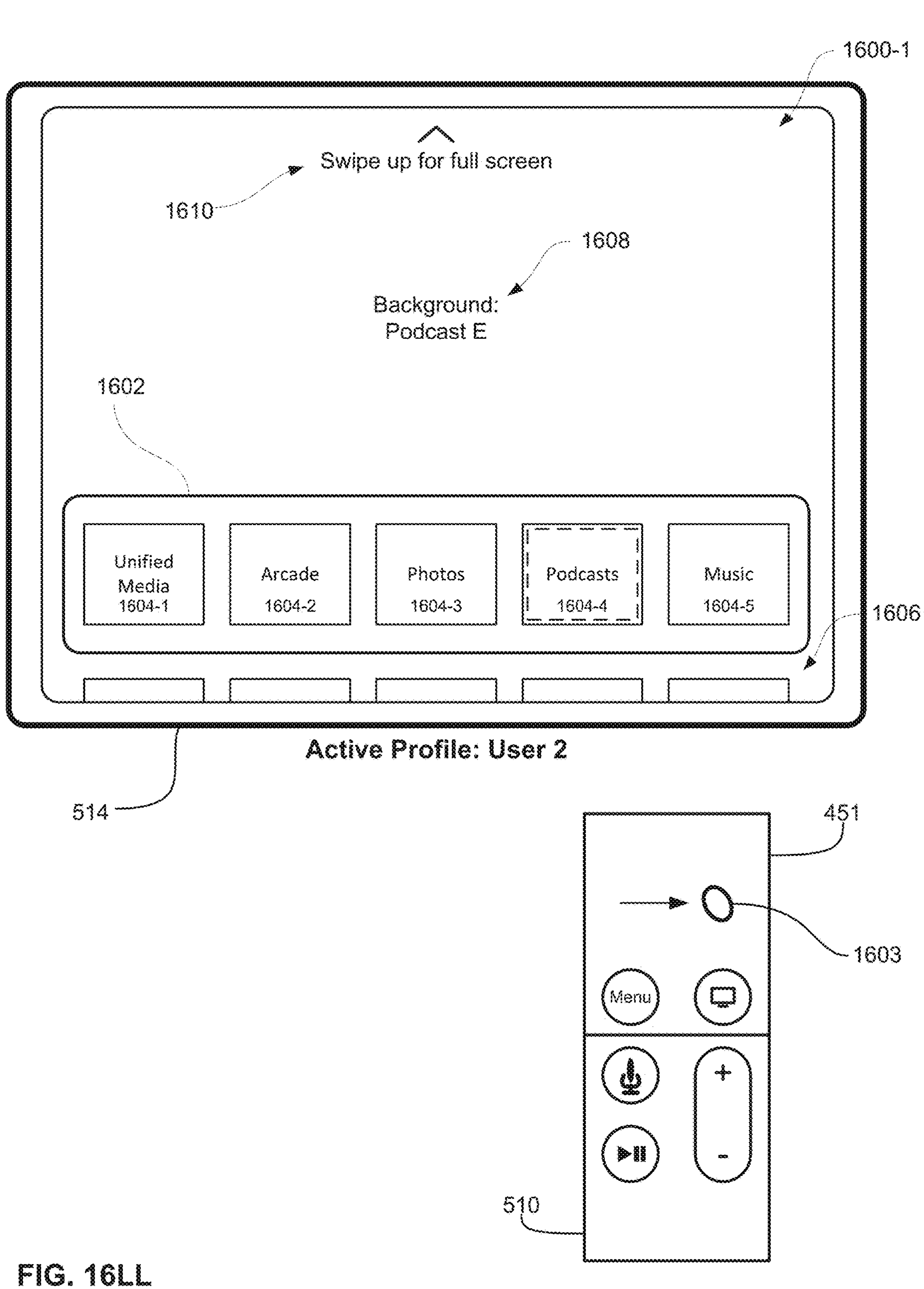
Figure 16M:
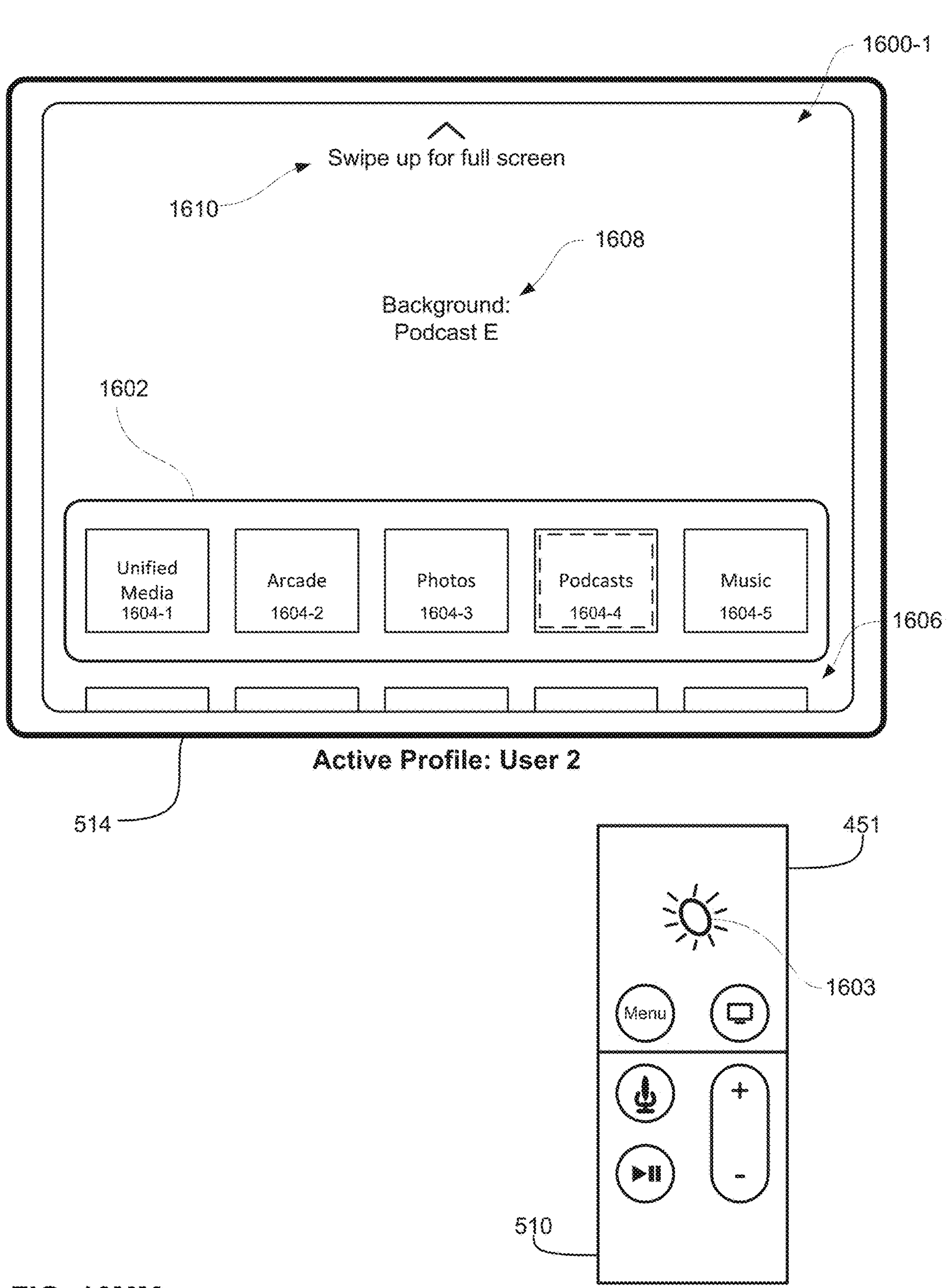
Figure 16N:
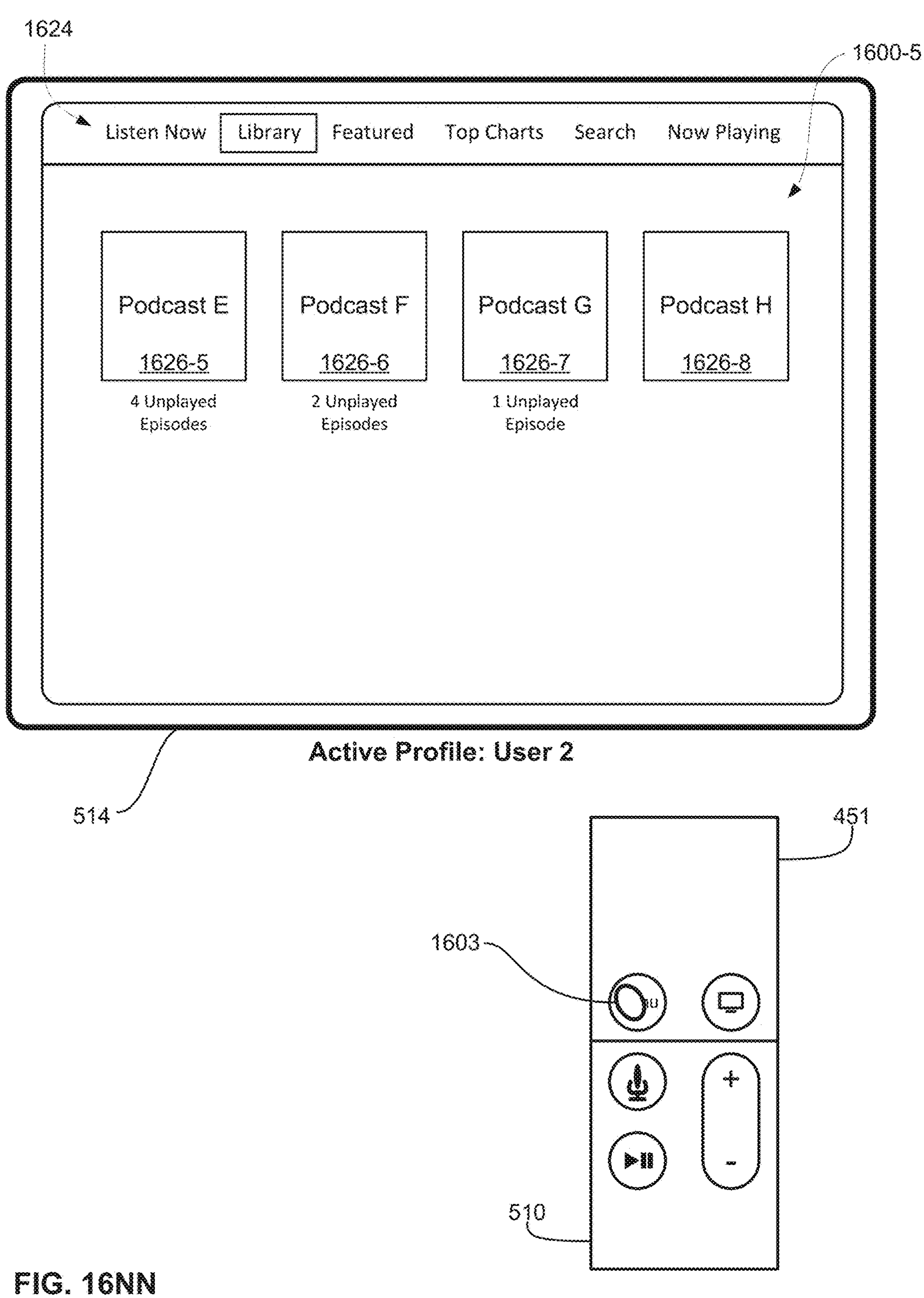
Figure 16O:
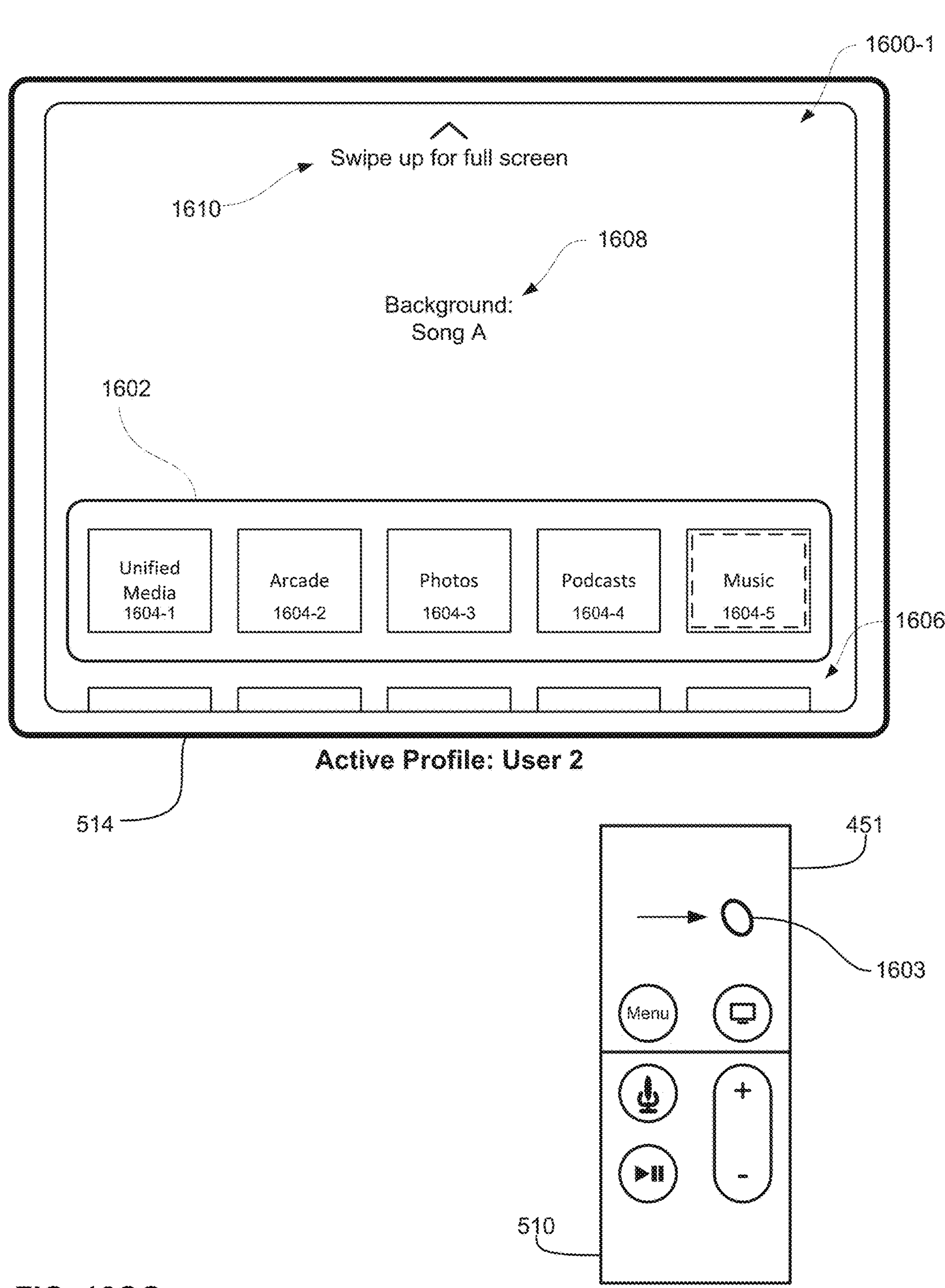
Figure 16P:
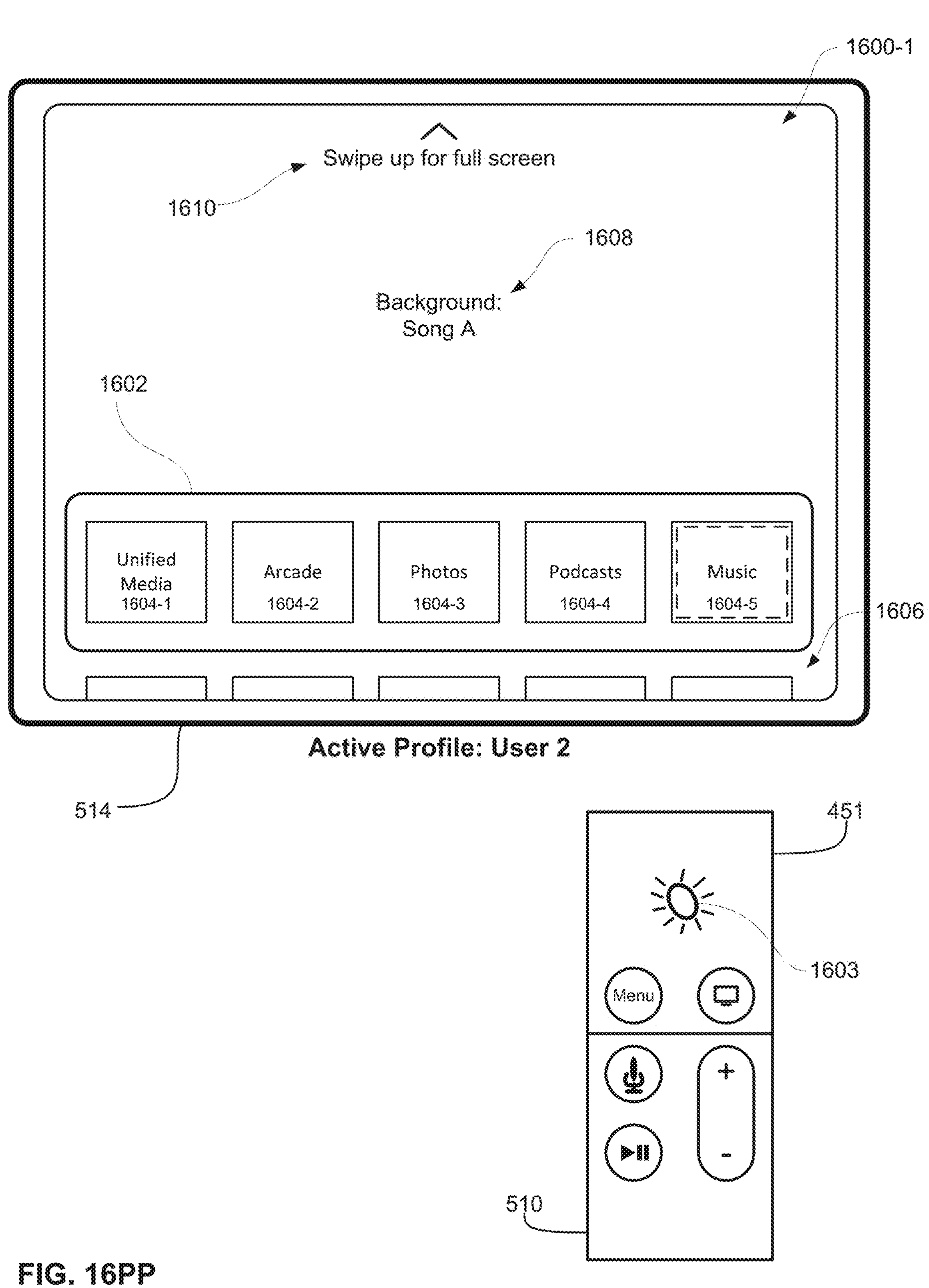
Figure 16Q:
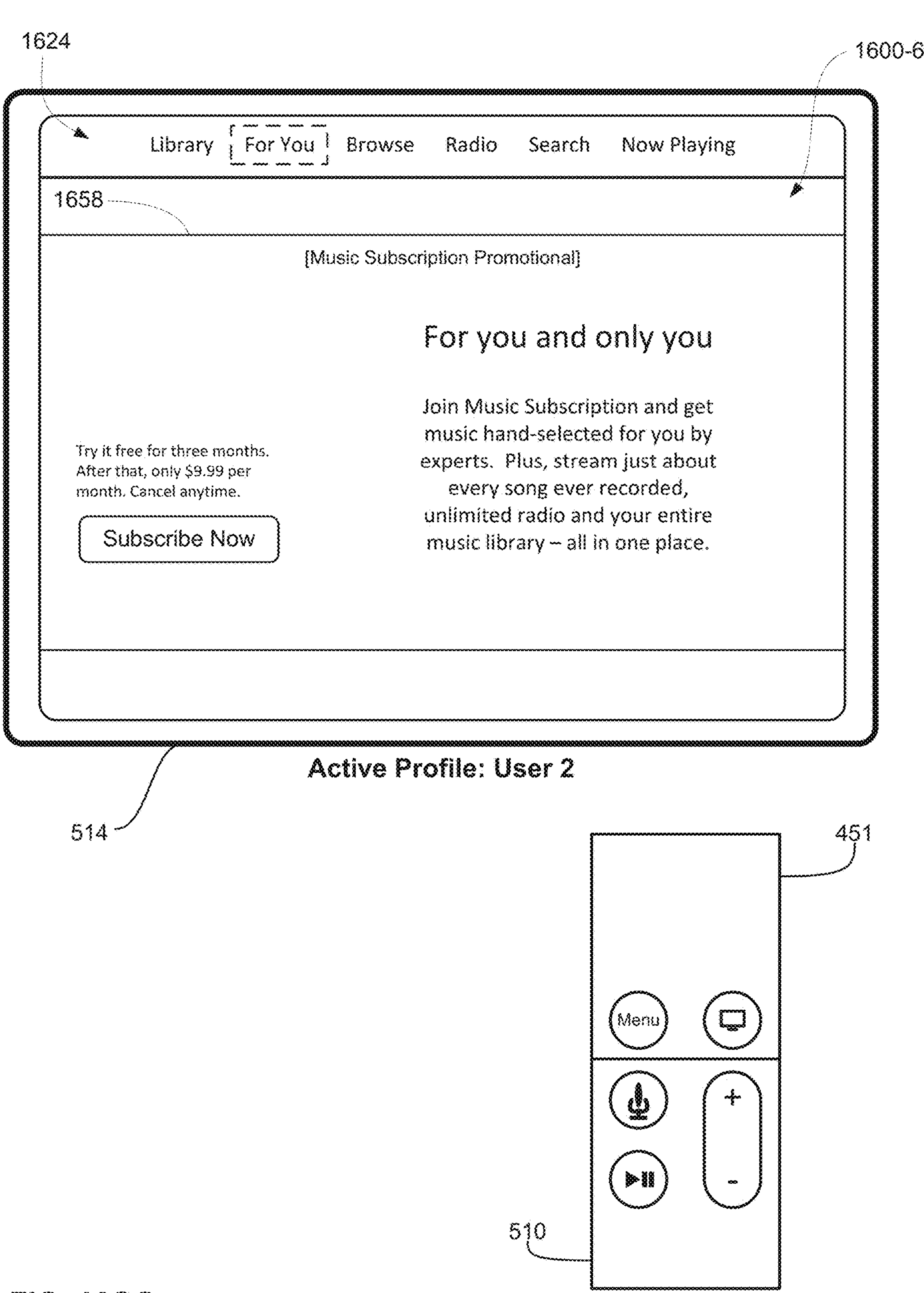
Figure 16R:
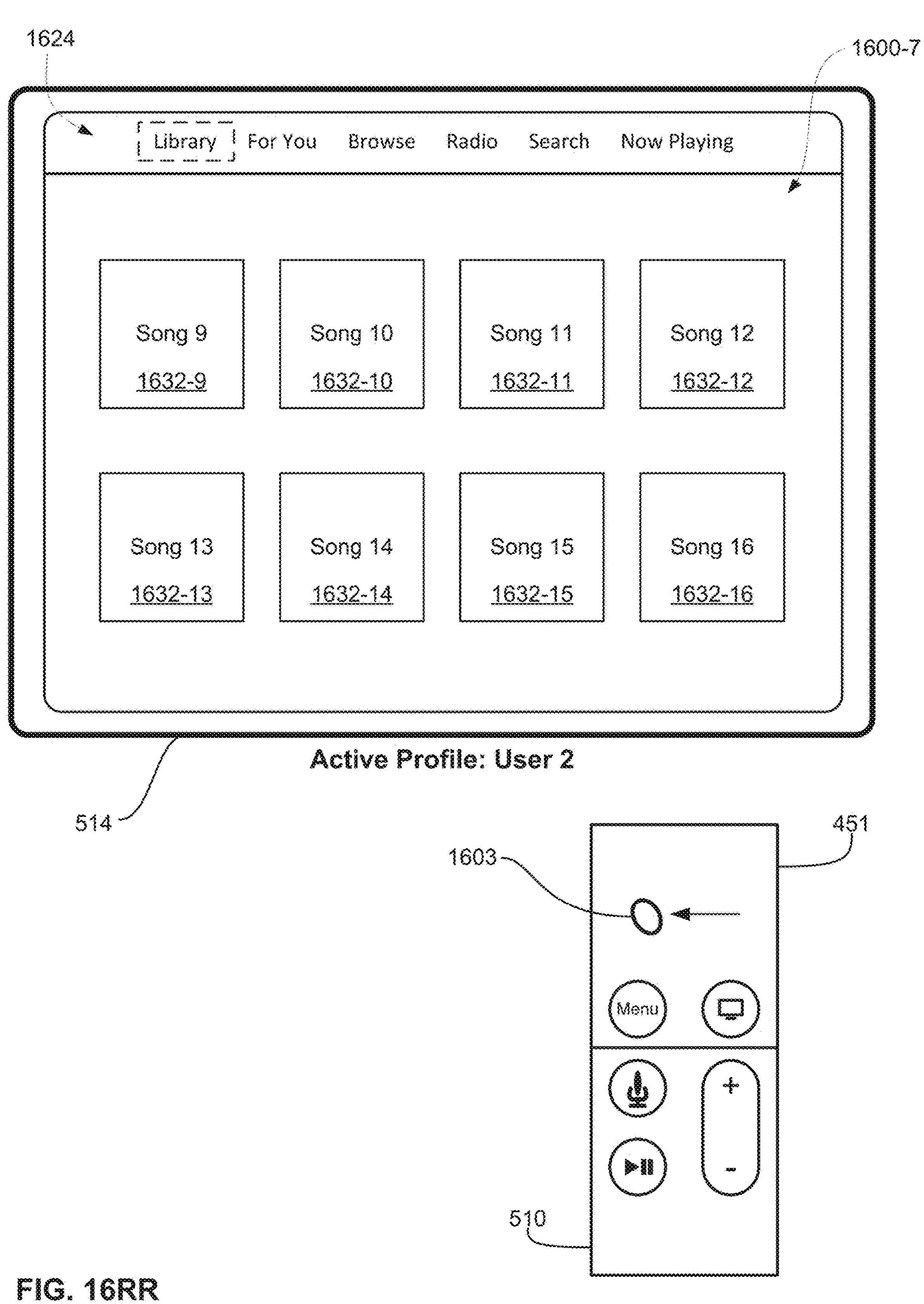
Figure 16S:
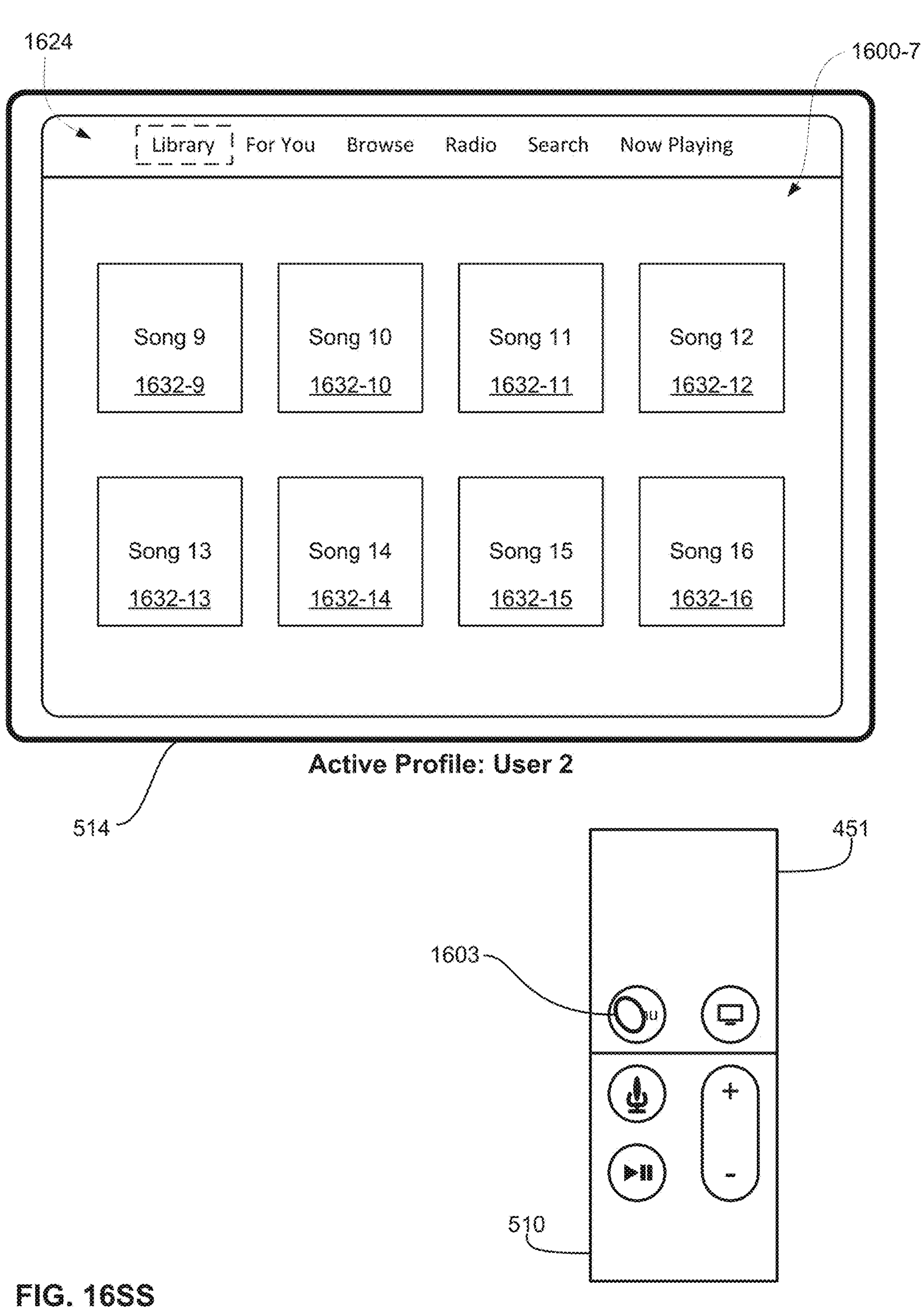
Figure 16T:
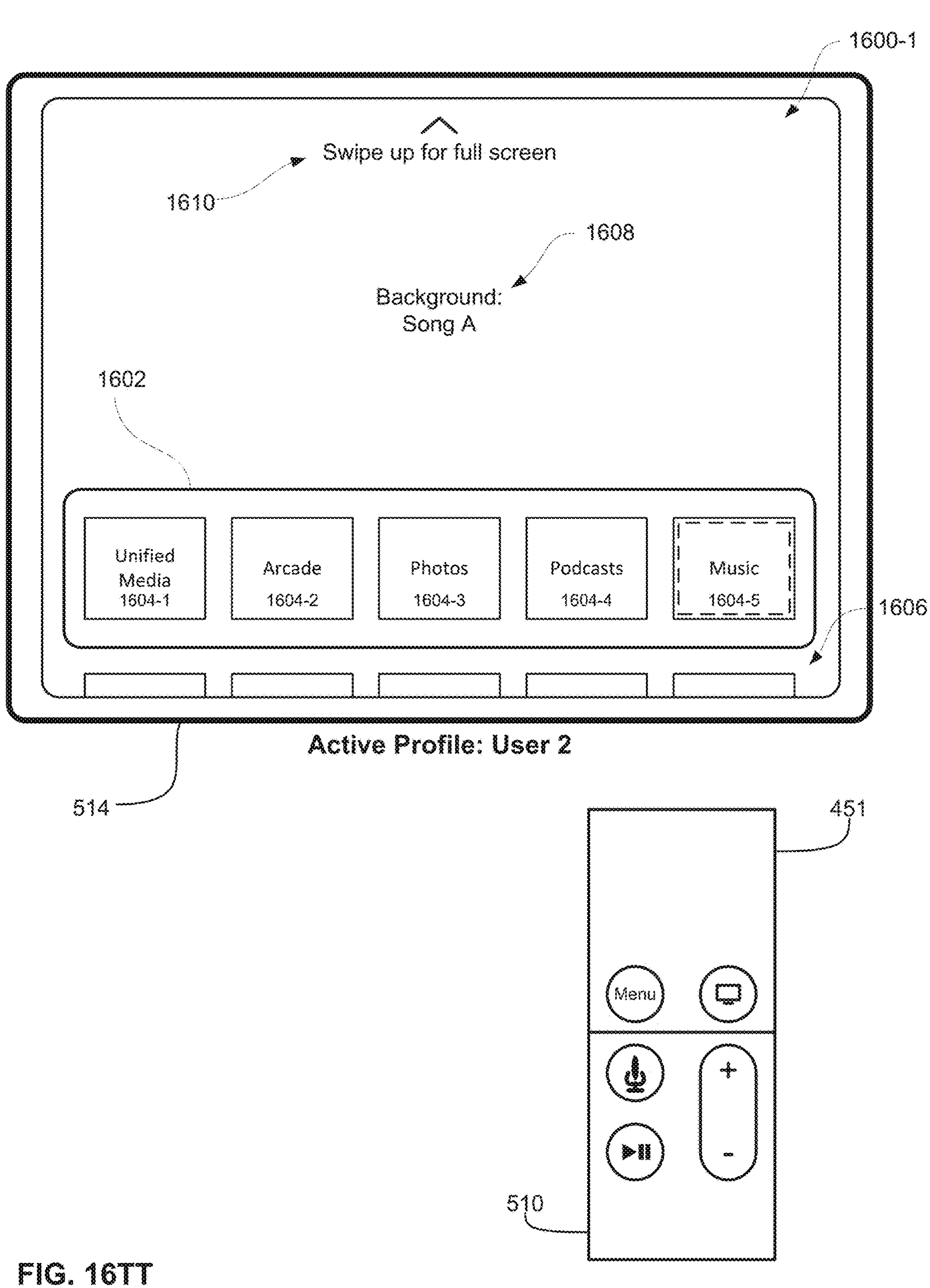
Figure 16U:
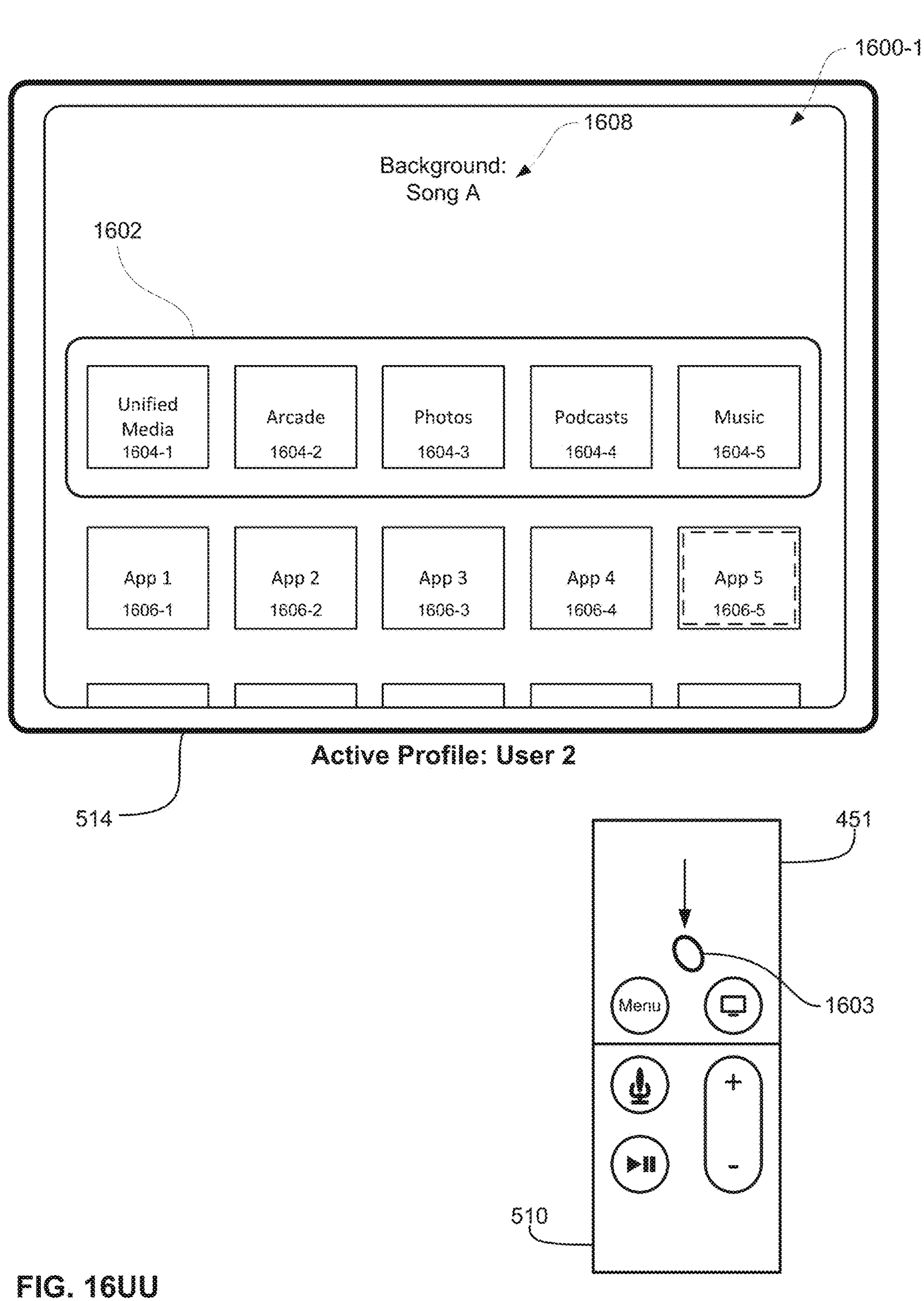
Figure 16V:
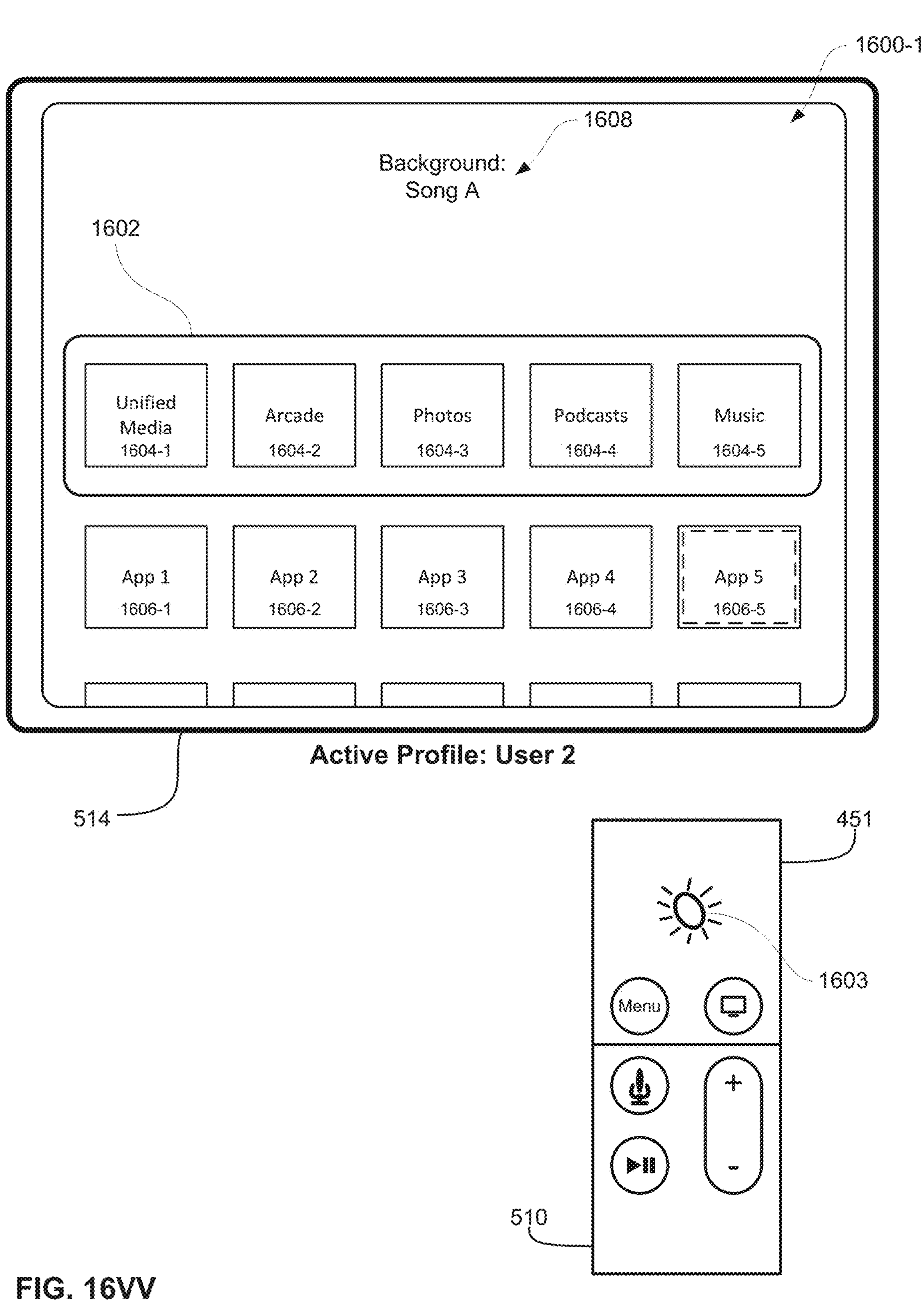
Figure 16W:
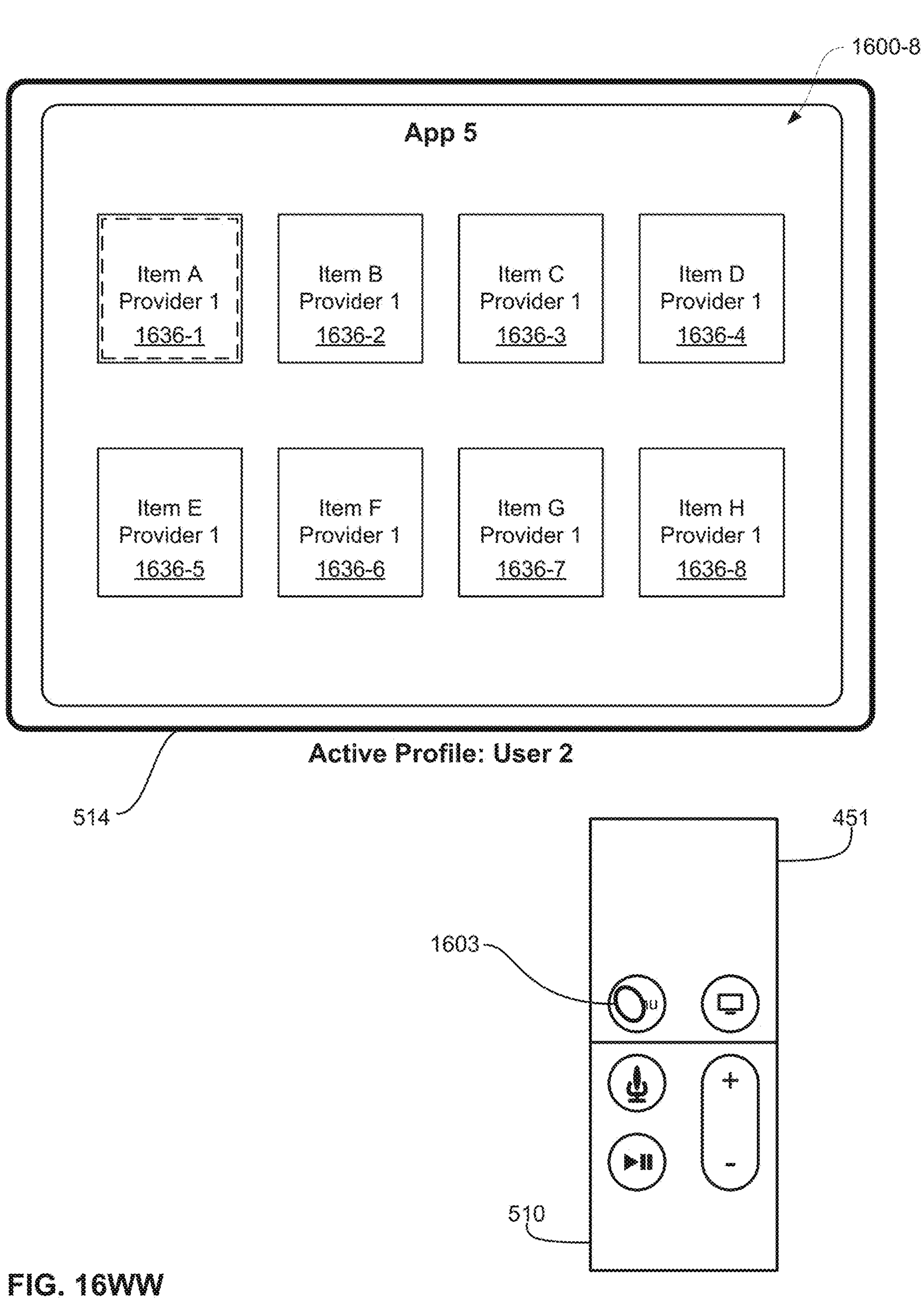
Figure 16X:
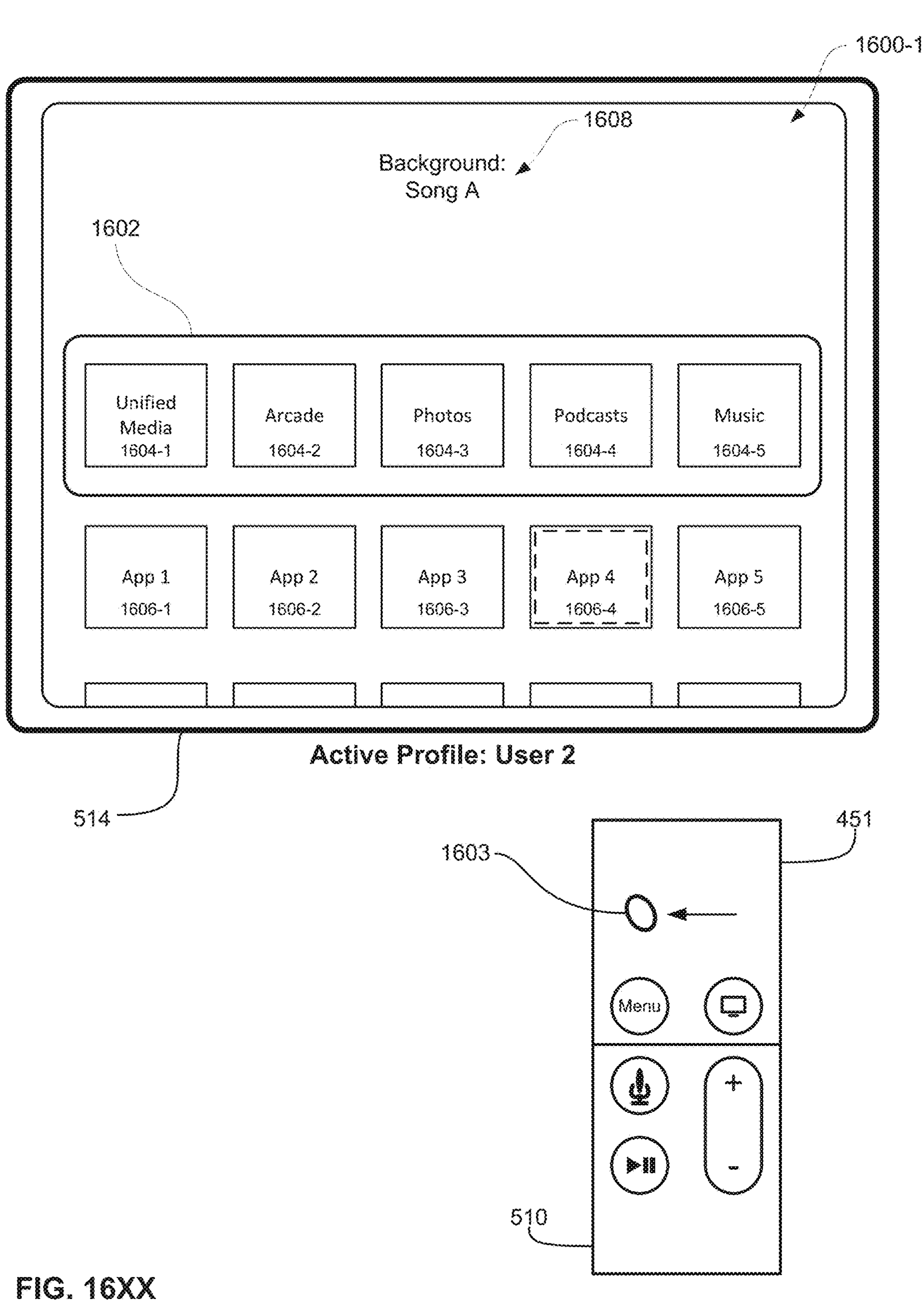
Figure 16Y:
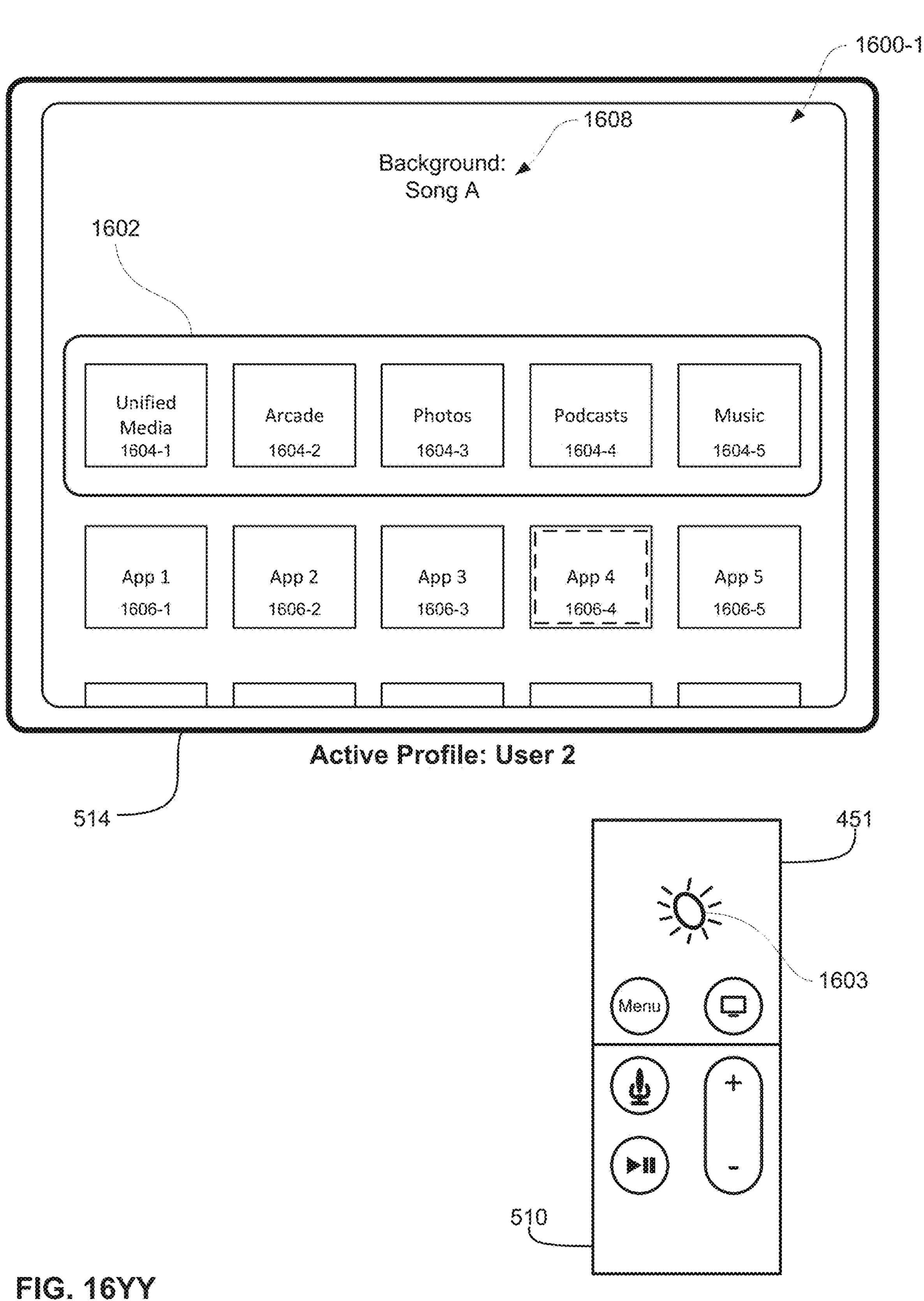
Figure 16Z:
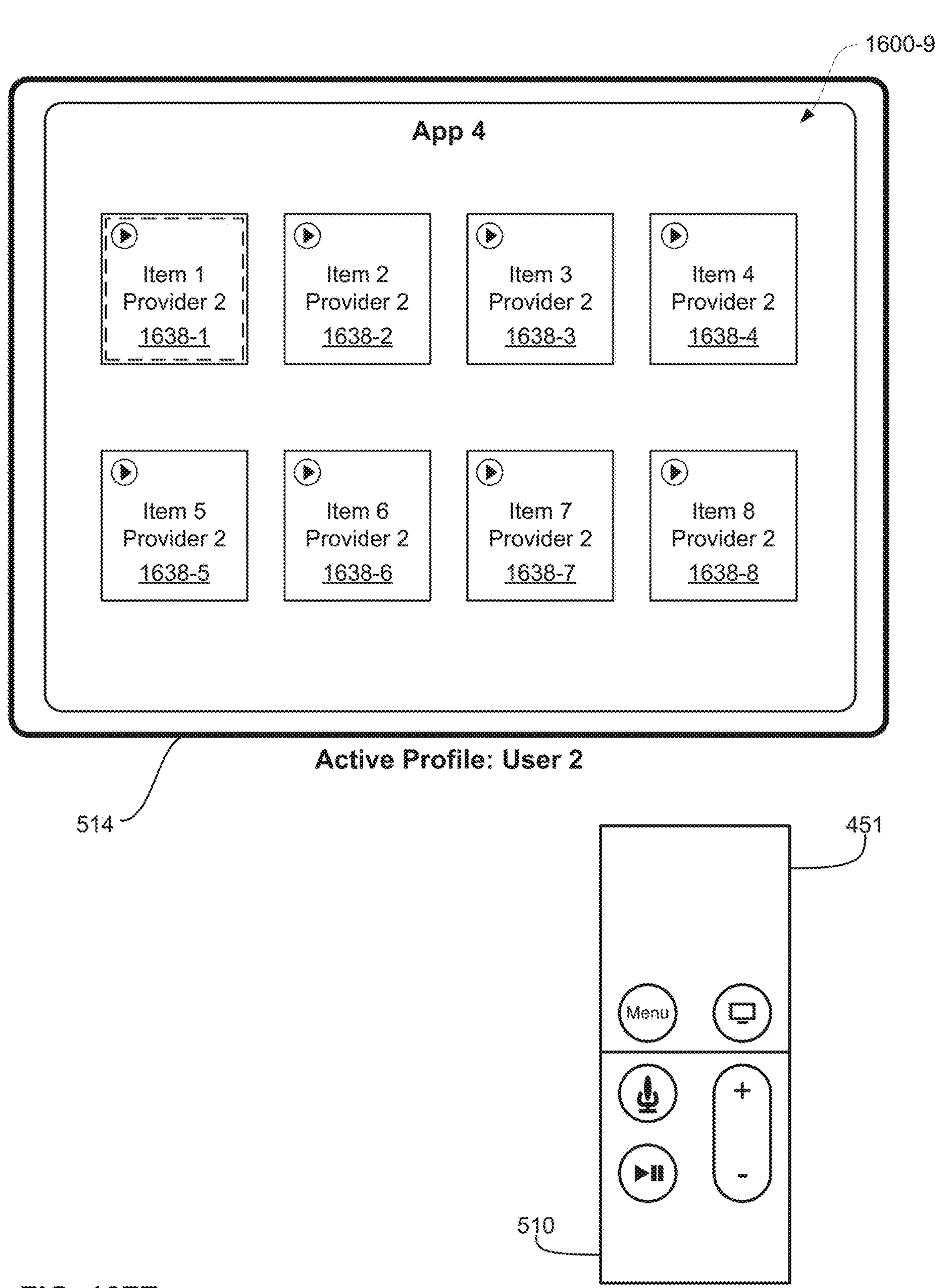
Figure 17B:
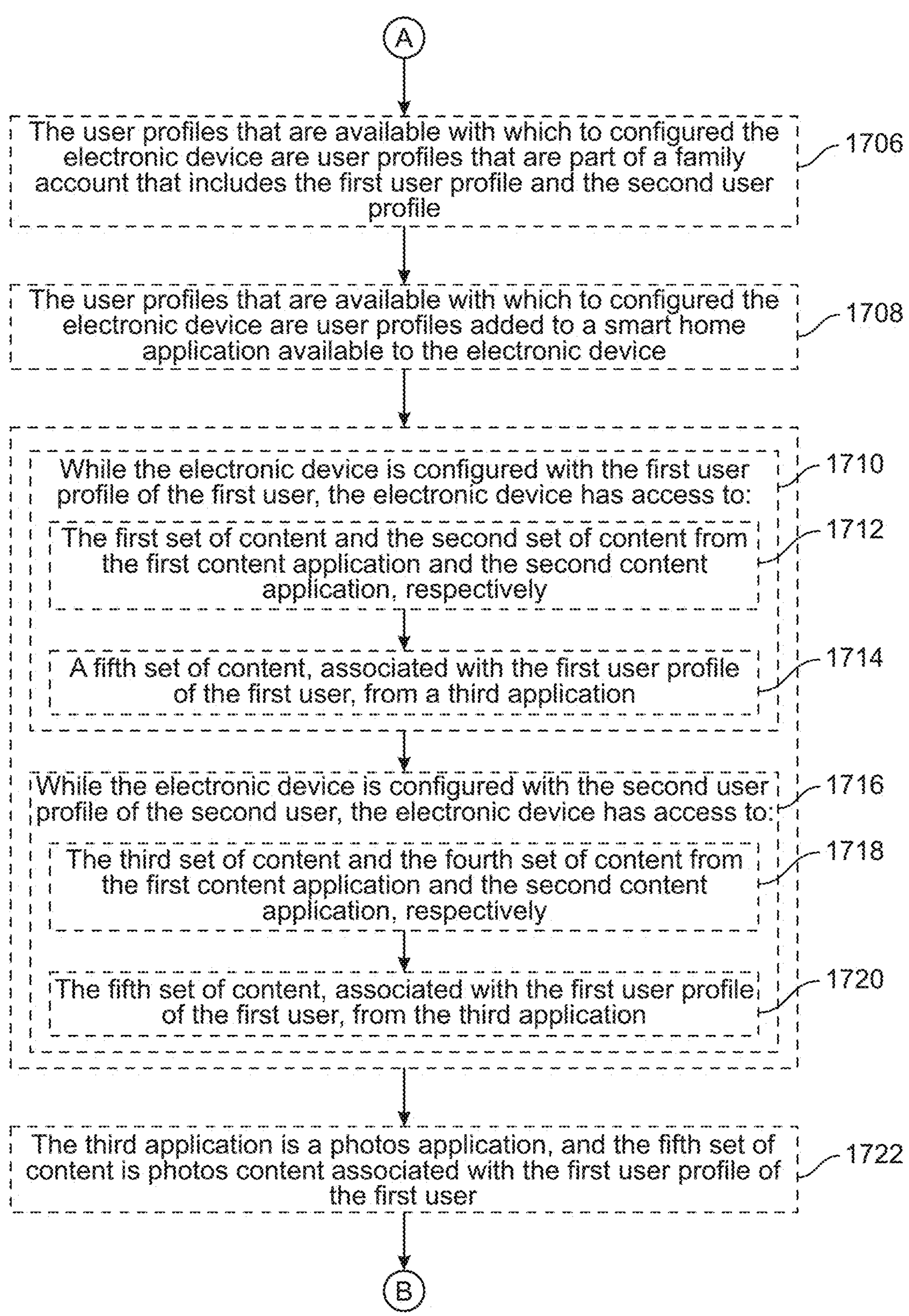
Figure 17C:
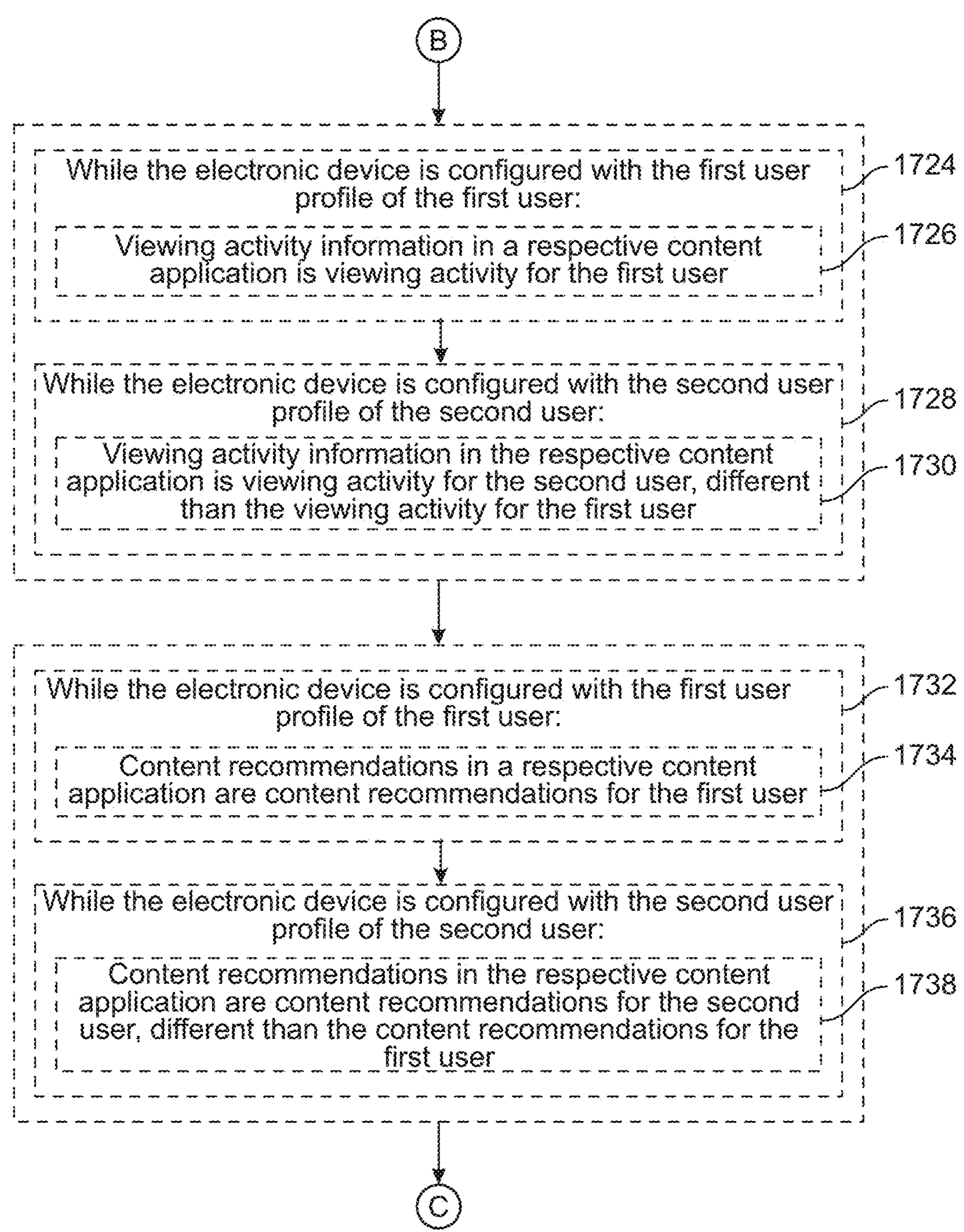
Figure 17D:
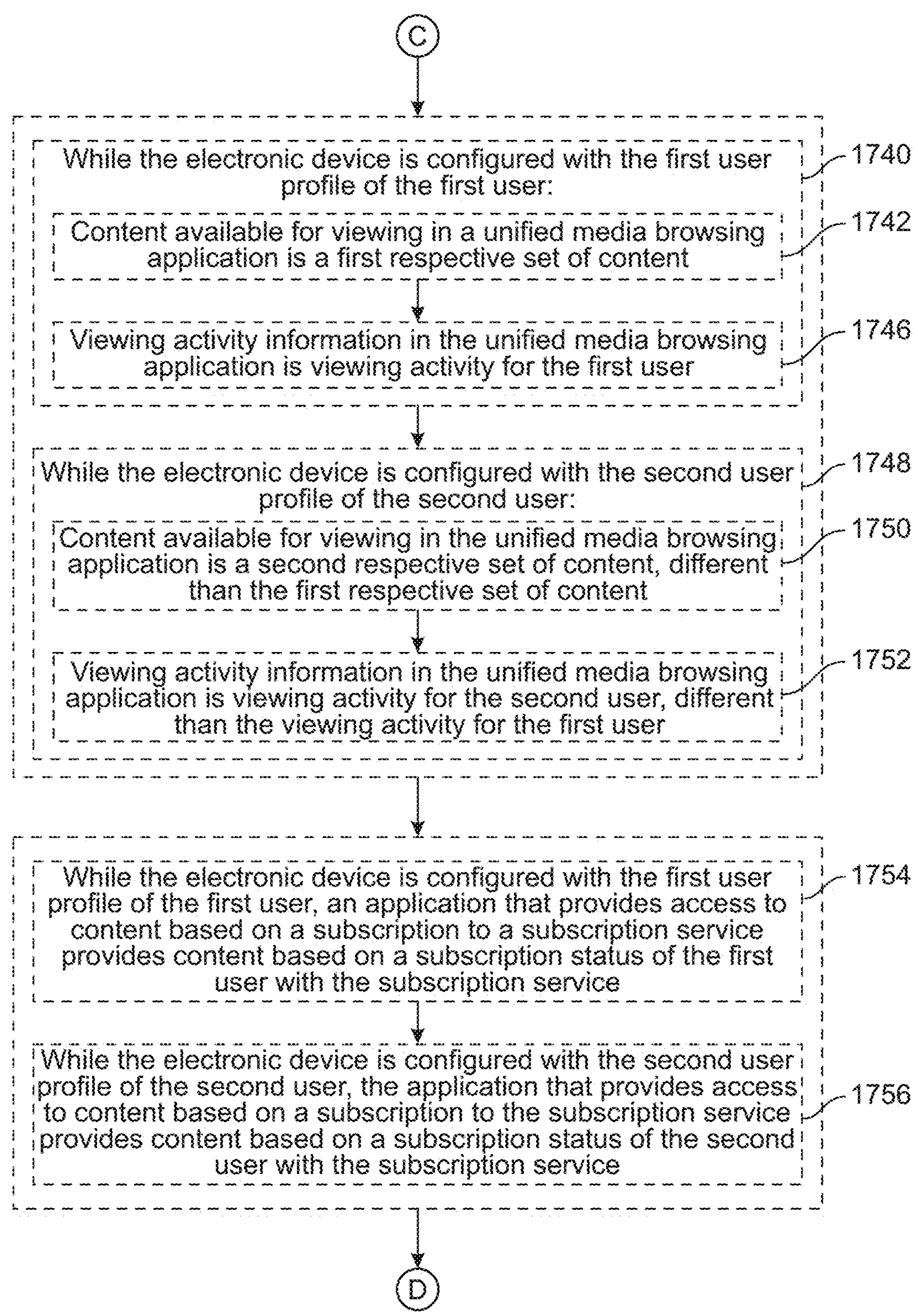
Figure 17E:
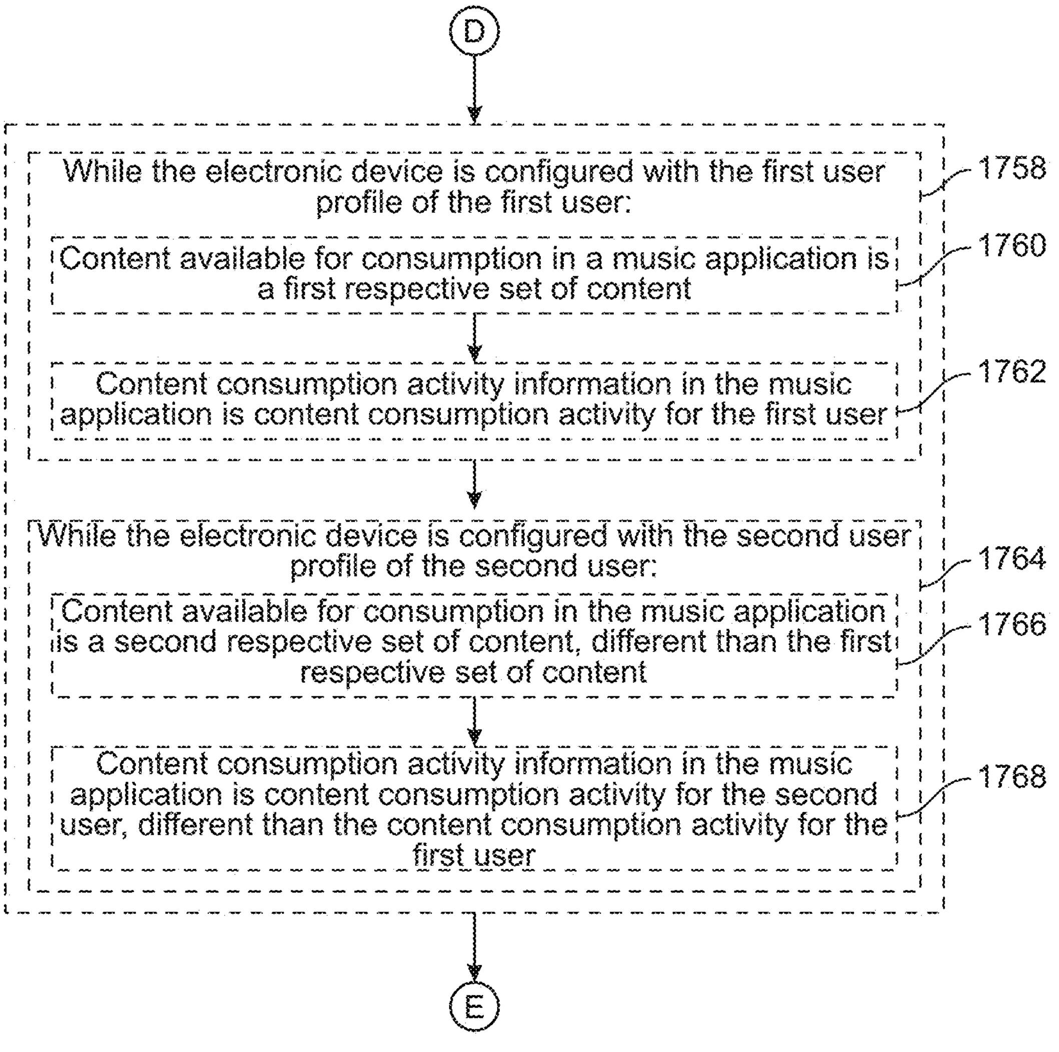
Figure 17F:
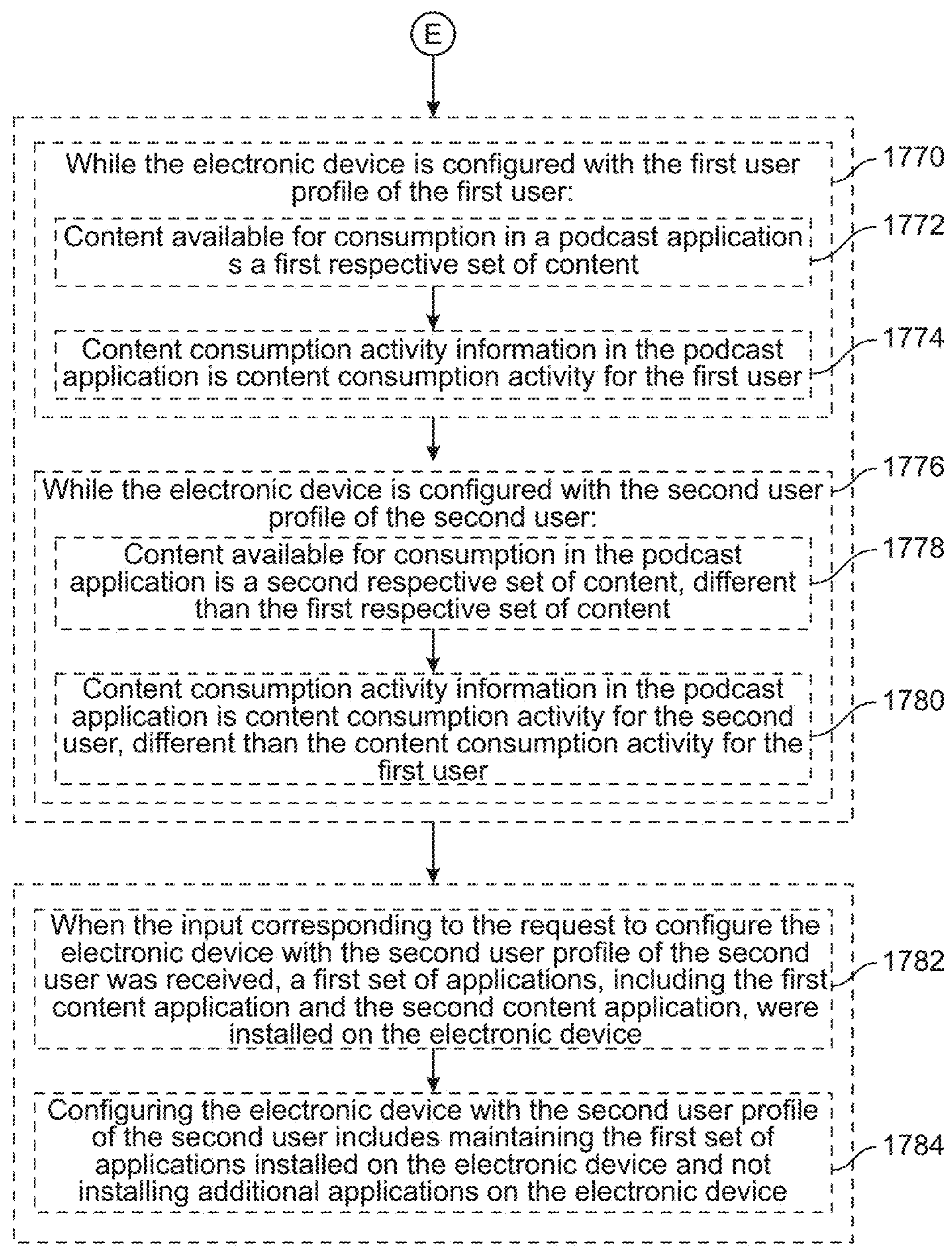

FIGS. 16A-16ZZ illustrate exemplary ways in which an electronic device 500 switches the active user profile of the device in accordance with some embodiments of the disclosure. The embodiments in these figures are used to illustrate the processes described below, including the processes described with reference to FIGS. 17A-17F.

FIG. 16A illustrates an electronic device 500 displaying user interface 1600-1 on display 514. In some embodiments, user interface 1600-1 is a home screen user interface. In some embodiments, user interface 1600-1 is similar to user interface 1200-1, the details of which will not be repeated here for brevity.

In FIG. 16A, the active profile of device 500 is the user profile associated with User 1. Thus, in some embodiments, the settings, preferences, viewing history, etc. of user 1 are active such that one or more of the applications on device 500 reflect that the current user of the device is User 1. In FIG. 16A, representation 1604-1 corresponding to the unified media browsing application has a current focus (e.g., as shown by the dotted box). In FIG. 16A, user input 1603 corresponding to a selection input is received. In some embodiments, in response to the user input, device 500 displays user interface 1600-2 corresponding to the unified media browsing application, as shown in FIG. 16B.

In some embodiments, the unified media browsing applications maintains data regarding the user's entitlement to contact and data regarding the user's viewing preferences. In some embodiments, the unified media browsing application determines content that is available via multiple content providers and determines whether the user has entitlement to the content providers or to any content items directly. Thus, in some embodiments, the unified media browsing application is able to provide the user with multiple ways of viewing respective content items and adjust the recommendations provided to the user based on the user's entitlements. In some embodiments, the unified media browsing application stores the user's viewing history and viewing preferences to allow the unified media browsing application to recommend content items to the user that are most likely to be of interest to the user. For example, the unified media browsing application is able to recommend the next episode of a television show to the user or a movie that is similar to a previously watched movie.

Thus, as shown in FIG. 16B, because the active profile is User 1, user interface 1600-2 corresponding to the unified media browsing application displays representations 1612-1 through 1612-4 that optionally correspond to items that the unified media browsing application recommends to User 1. In some embodiments, representations 1612-1 through 1612-4 correspond to items that User 1 has added to the user's Up Next queue (e.g., indicating that the user is interested in viewing the item at a later time). For example, in some embodiments, the unified media browsing application recommends season 1, episode 5 of Item A because the user has previously watched up to season 1, episode 4 of Item A. In some embodiments, the unified media browsing application also recommends item B, item C and item D. In some embodiments, the unified media browsing application is able to determine that the user has entitlements to Provider 1, but does not have entitlements for Provider 2 and Provider 3, as shown by the play icon 1614-1 and 1614-2 (e.g., and lack of play icons on representations 1612-3 and 1612-4). In some embodiments, play icons 1614-1 and 1614-2 are indicators that indicate to the user that the user is entitled to watch the respective content item. In some embodiments, play icons 1614-1 and 1614-2 are not actually displayed and are merely shown to represent whether the user does or does not have entitlements. In some embodiments, representations 1612-1 and 1612-2 corresponding to Item A and Item B, to which the user is entitled to view, are selectable to cause playback of the respective content item. In some embodiments, representations 1612-3 and 1612-4 corresponding to Item C and Item D, to which the user is not entitled to view, are selectable to initiate a process for acquiring entitlement to view the respective content item (e.g., is not selectable to cause playback without first obtaining entitlement).

In FIGS. 16C-16D, the user navigates (on user interface 1600-1) the focus to representation 1604-2 corresponding to the arcade application and causes display of the arcade application (e.g., in response to the user input 1603 corresponding to a selection input while representation 1604-2 has a focus), as shown in FIG. 16E. In some embodiments, as described above with respect to FIG. 12V, the arcade application is an application for the arcade subscription service from which the user can browse for, download, and launch arcade games that are associated with the arcade subscription service. In some embodiments, if the user has a subscription the arcade subscription service, then the user is able to download and play games from the arcade application. In some embodiments, if the user does not have a subscription to the arcade subscription service, then the arcade application will provide the user with an option for subscribing to the subscription service.

In some embodiments, as shown in FIG. 16E, User 1 does not have a subscription to the arcade subscription service and thus, user interface 1604-2 displays subscription promotional banner 1616 including a selectable option for initiating a process for subscribing to the arcade subscription service. Thus, in some embodiments, the arcade application is able to determine that User 1 is the current active user and that User 1 does not have a subscription to the arcade subscription service and display the user interface that best reflects the user's entitlements. In some embodiments, representations 1618-1 to 1618-4 correspond to games that are included in the subscription service. In some embodiments, because the user does not have a subscription to the subscription service, the user is unable to play the displayed games. In some embodiments, representations 1618-1 to 1618-4 are selectable to cause display of a user interface for the respective games (e.g., a product page for the games). In some embodiments, the product page for the game displays a selectable option to acquire the game, which optionally is selectable to initiate a process for subscribing to the subscription service. It is understood that the user interface 1600-3 as shown illustrates that the arcade application is able to determine the user's subscription status and optionally reflects the determined subscription status on the user interface and should not be interpreted as limiting.

In FIGS. 16F-16G, the user navigates (on user interface 1600-1) the focus to representation 1604-3 corresponding to the photos application and causes display of the photo application (e.g., in response to the user input 1603 corresponding to a selection input while representation 1604-3 has a focus), as shown in FIG. 16H. In some embodiments, as described above with respect to FIG. 12DD, the photos application is an application from which the user can browse for and cause display of photos that are associated with the user's account. In some embodiments, the photos application does not have support the profile switching functionality such that the content available and/or viewable in the photos application does not update or reflect changes in the active profile of the device. Thus, in some embodiments, the photos application always displays content that is associated with one of the user profiles (e.g., User 1). In some embodiments, the primary user profile (e.g., the first user profile on the device or the user profile that has been set as the primary user profile) is the profile whose content is displayed in the photos application.

Thus, as shown in FIG. 16H, user interface 1600-4 corresponding to the "memories" user interface of the photos application displays one or more memories 1622-1 and 1622-2 corresponding to automatically generated collections based on the photos in User 1's account. In some embodiments, memories 1622-1 and 1622-2 are selectable to display the photos that are included in the respective memory. It is understood that the user interface 1600-4 as shown is illustrative to show that the photos application provides the user with access to content from User 1's account and should not be interpreted as limiting.

In FIGS. 16I-16K, the user navigates (on user interface 1600-1) the focus to representation 1604-4 corresponding to the podcast application and causes display of the podcast application (e.g., in response to the user input 1603 corresponding to a selection input while representation 1604-4 has a focus), as shown in FIG. 16K. In some embodiments, as described above with respect to FIG. 12OO, the podcast application is an application from which the user can browse for, subscribe to, and cause playback of podcasts.

In FIG. 16K, the podcast application is able to determine that the active profile is User 1 and that user 1 has subscribed to a plurality of podcasts (e.g., Podcast A, B, C, and D corresponding to representations 1626-1, 1626-2, 1626-3 and 1626-4, respectively). In some embodiments, podcast application is also able to determine User 1's playback history and indicates, in user interface 1600-5, that the user has 2 unplayed episodes of Podcast A, 1 unplayed episode of Podcast B, and 5 unplayed episodes of Podcast C. In some embodiments, representations 1626-1 to 1626-4 are selectable to begin playback of the respective podcast or to display a user interface specific to the respective podcast (e.g., a product page for the respective podcast, from which the user is able to select a respective episode to begin playback).

Thus, in some embodiments, the podcast application is able to determine that User 1 is the current active user, that User 1 has subscriptions to one or more podcasts, and that User 1 has previously played one or more podcasts. In some embodiments, the podcast application is able to update user interface 1600-5 that reflects the user's subscriptions and playback history. It is understood that the user interface 1600-5 as shown illustrates that the podcast application is able to determine the user's subscriptions and playback history and optionally reflects the determined subscriptions and playback history on the user interface and should not be interpreted as limiting.

In FIGS. 16L-16M, the user navigates (on user interface 1600-1) the focus to representation 1604-5 corresponding to the music application and causes display of the music application (e.g., in response to the user input 1603 corresponding to a selection input while representation 1604-5 has a focus), as shown in FIG. 16N. In some embodiments, as described above with respect to FIG. 12SS, the music application is an application from which the user can browse for and cause playback of music content (e.g., songs, playlists, music videos, etc.).

In FIG. 16N, device 500 is displaying user interface 1600-6 corresponding to the "For You" user interface of the music application. In some embodiments, user interface 1600-6 includes music that is recommended to the user based on the user's playback history (e.g., mix 1, mix 2, and mix 3). In some embodiments, user interface 1600-6 includes a list of recently played songs (e.g., song E, F, G, and H). In some embodiments, user interface 1600-6 is only displayed to the user if the user has a subscription to the music subscription service. Similarly to the arcade subscription service, if the user does not have a subscription to the subscription service, then user interface 1600-6 would, instead, optionally display a promotional that is selectable to initiate a process for subscribing to the subscription service, as will be described in further detail below with respect to FIG. 16PP. Thus, in some embodiments, the music application is able to determine that the active user is User 1 and that User 1 has a subscription to the music service and that the user has most recently listened to songs E, F, G, and H. In some embodiments, representations 1628-1, 1628-2, and 1628-3 are selectable to display the songs that are included in the respective mix (e.g., playlist) or is selectable to begin playback of the respective mix (e.g., playlist). In some embodiments, representations 1630-1 to 1630-4 are selectable to cause playback of the respective song.

In FIG. 16O, a user input 1603 corresponding to a leftward navigation is received. In some embodiments, in response to the user input, device displays user interface 1600-7 corresponding to the "Library" user interface of the music application, as shown in FIG. 16O. In some embodiments, user interface 1600-7 displays one or more representations of music content (e.g., songs, playlists, albums, etc.) that the user has purchased access to (e.g., optionally outside of the music subscription service, such as by purchasing a song or album). In some embodiments, representations 1632-1 to 1632-8, corresponding to songs that the user has purchased access to, are selectable to cause playback of the respective song. Thus, the music application is able to determine that the active user is User 1 and that User 1 has purchased access to one or more songs (e.g., songs 1-8) and displays user interface 1600-7 to reflect the user's entitlements to these songs.

It is understood that the user interfaces 1600-6 and 1600-7 as shown illustrates that the music application is able to determine the user's subscription status, entitlements, and playback history and optionally reflects the determined subscription status, entitlements, and playback history on the user interface and should not be interpreted as limiting.

In FIGS. 16Q-16S, the user navigates (on user interface 1600-1) the focus to representation 1606-5 corresponding to App 5 and causes display of App 5 (e.g., in response to the user input 1603 corresponding to a selection input while representation 1606-5 has a focus), as shown in FIG. 16T. In some embodiments, App 5 is an application for a content provider such that a user is able to browse for and cause playback of content items that are provided by the respective content provider.

For example, in FIG. 16T, device 500 displays user interface 1600-8 corresponding to an application for Provider 1. In some embodiments, the application for Provider 1 is able to determine that the active profile is User 1 and that User 1 has an entitlement to Provider 1 (e.g., all content provided by Provider 1). Thus, as shown in FIG. 16T, user interface 1600-8 displays a grid of a plurality of content items (e.g., content items A through H), all of which the user is entitled to view (e.g., as illustrated by the play icon) and are thus selectable to cause playback of the respective content item. It is understood that the user interface 1600-8 displayed in FIG. 16T is merely illustrative that a respective application for a respective application (e.g., Provider 1) is able to determine the active user's entitlements and optionally reflect the user's entitlements on the user interface (e.g., including the user's ability to select respective representations to cause playback of respective content).

In FIGS. 16U-16V, the user navigates (on user interface 1600-1) the focus to representation 1606-4 corresponding to App 4 and causes display of App 4 (e.g., in response to the user input 1603 corresponding to a selection input while representation 1606-4 has a focus), as shown in FIG. 16W. In some embodiments, App 5 is an application for a content provider such that a user is able to browse for and cause playback of content items that are provided by the respective content provider (e.g., Provider 2).

For example, in FIG. 16W, device 500 displays user interface 1600-9 corresponding to an application for Provider 2. In some embodiments, the application for Provider 2 is able to determine that the active profile is User 1 and that User 1 does not have an entitlement to Provider 1 (e.g., User 1 has not purchased access to all content provided by Provider 1), but has purchased entitlements to individual content items (e.g., item 1, item 4, item 6, and item 8, as illustrated by the play icon). Thus, as shown in FIG. 16T, user interface 1600-8 displays a grid of a plurality of content items (e.g., content items 1 through 8), of which only some the user is entitled to view (e.g., which are selectable to cause playback of the respective content item), and some of which the user is not entitled to view (e.g., which are not selectable to cause playback of the respective content item). It is understood that the user interface 1600-9 displayed in FIG. 16W is merely illustrative that a respective application for a respective application (e.g., Provider 2) is able to determine the active user's entitlements and optionally reflect the user's entitlements on the user interface (e.g., including the user's ability to select respective representations to cause playback of respective content).

In FIG. 16X, device 500 is displaying user interface 1600-1 corresponding to the home screen user interface. In FIG. 16Y, a contact 1603 corresponding to an actuation of the home button is received. In some embodiments, as shown in FIG. 16Z, contact 1603 on the home button is held for more than the predetermined time threshold. In some embodiments, the device considers contact 1603 to be a press-and-hold input. In some embodiments, in response to the user input, control panel 1640 is displayed, as shown in FIG. 16Z. In some embodiments, control panel 1640 is similar to control panel 1412 described with respect to FIGS. 14E-14T, the details of which will not be repeated for brevity. In some embodiments, control panel 1640 displays one or more selectable options 1644-1 to 1644-3 corresponding to one or more user profiles on the device. In some embodiments, selectable options 1644-1 to 1644-3 are selectable to cause device 500 to set the selected user profile as the active user profile of the device. In some embodiments, the first user profile displayed on control panel 1640 (e.g., selectable option 1644-1) is the currently active user profile of the device. In some embodiments, the currently active user profile is visually distinguished from the other user profiles to indicate that the active user profile is the user profile that is currently active (e.g., highlighted, displayed with an indicator or icon, etc.). In some embodiments, the row of user profiles is scrollable to reveal further user profiles to select from. In some embodiments, the row of user profiles is limited to a predetermined maximum number of user profiles (e.g., 10 user profiles, 11 user profiles, etc.). In some embodiments, the set of user profiles that are selectable to being set as the active user profile include user profiles in a family account. For example, a family account optionally includes a plurality of user accounts corresponding to different members of a family unit. In some embodiments, each of the plurality of user accounts in the family account are included in the set of user profiles that are selectable to being set as the active user profile. In some embodiments, the set of user profiles that are selectable to being set as the active user profile include user profiles in a smart home application. For example, a smart home application optionally includes a plurality of user accounts corresponding to different residents in the user's residence. In some embodiments, each of the plurality of user accounts in the smart home application are included in the set of user profiles that are selectable to being set as the active user profile.

In FIG. 16AA, user input 1603 corresponding to an upward swipe is received. In some embodiments, in response to the user input, focus is moved from selectable option 1646 to selectable option 1644-1 corresponding to User 1. In FIG. 16BB, a user input 1603 corresponding to a rightward swipe is received. In some embodiments, in response to the user input, focus is moved from selectable option 1644-1 corresponding to User 1 to selectable option 1644-2 corresponding to User 2, as shown in FIG. 16BB.

In FIG. 16CC, user input 1603 corresponding to a selection input is received when selectable option 1644-2 has a focus. In some embodiments, in response to the user input, device 500 sets User 2 as the active user profile of the device, as shown in FIG. 16DD. In some embodiments, a notification 1654 is displayed overlaid over the user interface to indicate that the active user profile has been switched to User 2 (e.g., optionally displayed for a predetermined amount of time such as 2 seconds, 4 seconds, 6 seconds). In some embodiments, device 500 navigates user interface 1600-1 back to the top of the user interface. In some embodiments, device 500 maintains the current display position of the user interface (e.g., does not navigate back to the top of the user interface). In some embodiments, device 500 dismisses display of control panel 1640. In some embodiments, device 500 maintains display of control panel 1640 (e.g., which is dismissable in response to the user selecting the "menu" or "back" button on remote control device 510). In some embodiments, when the active user profile is not the primary user profile (e.g., not User 1), then device 500 displays an icon or other indication on display 514 to indicate that the active user profile is a user other than the primary user. In some embodiments, in response to switching the active user profile to User 2, User 2 is displayed first in the row of user profiles on control panel 1640 (e.g., and User 1 is optionally displayed second).

In FIG. 16DD, a user input 1603 corresponding to a selection when representation 1604-1 has a focus. In some embodiments, in response to the user input, device 500 displays user interface 1600-2 corresponding to the unified media browsing application, as shown in FIG. 16EE. In FIG. 16EE, because the active profile is User 2, user interface 1600-2 corresponding to the unified media browsing application displays representations 1612-5 through 1612-8 that optionally correspond to items that the unified media browsing application recommends to User 2 (e.g., which optionally are the same set of items or a different set of items as what is recommended to User 1). In some embodiments, representations 1612-5 through 1612-5 correspond to items that User 2 has added to the user's Up Next queue (e.g., indicating that the user is interested in viewing the item at a later time). For example, in some embodiments, the unified media browsing application recommends season 2, episode 3 of Item A because the user has previously watched up to season 2, episode 2 of Item A. In some embodiments, the unified media browsing application also recommends item E, item F and item G. In some embodiments, the unified media browsing application is able to determine that the user has entitlements to Provider 2 and 3, but does not have entitlements for Provider 1, as shown by the play icon 1614-3 and 1614-4 (e.g., and lack of play icons on representations 1612-7 and 1612-8). In some embodiments, representations 1612-5 and 1612-6 corresponding to Item A and Item E, to which the user is entitled to view, are selectable to cause playback of the respective content item. In some embodiments, representations 1612-7 and 1612-8 corresponding to Item F and Item G, to which the user is not entitled to view, are selectable to initiate a process for acquiring entitlement to view the respective content item (e.g., not selectable to cause playback of the respective content item without first acquiring entitlement).

In FIGS. 16FF-16GG, the user navigates (on user interface 1600-1) the focus to representation 1604-2 corresponding to the arcade application and causes display of the arcade application (e.g., in response to the user input 1603 corresponding to a selection input while representation 1604-2 has a focus), as shown in FIG. 16HH. In some embodiments, as shown in FIG. 16HH, User 2 has a subscription to the arcade subscription service and thus, user interface 1604-2 does not display a subscription promotional banner (e.g., and is not presented with the option to initiate a process for subscribing to the subscription service) and instead displays a scrollable banner 1656 of featured games. In some embodiments, representations 1618-1 to 1618-4 correspond to games that are included in the subscription service. In some embodiments, because the user has a subscription to the subscription service, the user is able to play the displayed games. In some embodiments, representations 1618-1 to 1618-4 are selectable to cause display of a user interface for the respective games (e.g., a product page for the games). In some embodiments, the product page for the game displays a selectable option to acquire the game, which optionally is selectable to initiate a process to download the respective game and/or display the game. Thus, in some embodiments, the arcade application is able to determine that User 2 is the current active user and that User 2 has a subscription to the arcade subscription service and display the user interface that best reflects the user's entitlements.

In FIGS. 16II-16JJ, the user navigates (on user interface 1600-1) the focus to representation 1604-3 corresponding to the photos application and causes display of the photo application (e.g., in response to the user input 1603 corresponding to a selection input while representation 1604-3 has a focus), as shown in FIG. 16KK. In some embodiments, because the photos application does not support the profile switching functionality, as shown in FIG. 16KK, user interface 1600-4 corresponding to the "memories" user interface of the photos application displays one or more memories 1622-1 and 1622-2 corresponding to automatically generated collections based on the photos in User 1's account (e.g., as opposed to User 2's account). In some embodiments, memories 1622-1 and 1622-2 are selectable to display the photos that are included in the respective memory. Thus, in some embodiments, the photos application does not update or otherwise change the content that is available in the photos application to reflect any changes to the active user profiles.

In FIGS. 16LL-16MM, the user navigates (on user interface 1600-1) the focus to representation 1604-4 corresponding to the podcast application and causes display of the podcast application (e.g., in response to the user input 1603 corresponding to a selection input while representation 1604-4 has a focus), as shown in FIG. 16MM.

In FIG. 16NN, the podcast application is able to determine that the active profile is User 2 and that User 2 has subscribed to a plurality of podcasts (e.g., Podcast E, F, G, and H corresponding to representations 1626-5, 1626-6, 1626-7 and 1626-8, respectively), which are optionally the same set of podcasts that User 1 has subscribed to or a different set of podcasts that User 1 has subscribed to. In some embodiments, podcast application is also able to determine User 2's playback history and indicates, in user interface 1600-5, that the user has 4 unplayed episodes of Podcast E, 2 unplayed episode of Podcast F, and 1 unplayed episodes of Podcast G. In some embodiments, representations 1626-1 to 1626-4 are selectable to begin playback of the respective podcast or to display a user interface specific to the respective podcast (e.g., a product page for the respective podcast, from which the user is able to select a respective episode to begin playback).

In FIGS. 16OO-16PP, the user navigates (on user interface 1600-1) the focus to representation 1604-5 corresponding to the music application and causes display of the music application (e.g., in response to the user input 1603 corresponding to a selection input while representation 1604-5 has a focus), as shown in FIG. 16QQ. In FIG. 16QQ, the music application is able to determine that the active user is User 2 and that User 2 does not have a subscription to the music subscription service. Thus, user interface 1600-6 corresponding to the "For You" user interface of the music app does not display any recommended content items but, instead, displays promotional banner 1658. In some embodiments, promotional banner 1658 includes information about the music subscription service and a selectable option to initiate a process for subscribing to the music subscription service.

In FIG. 16RR, a user input 1603 corresponding to a leftward navigation is received. In some embodiments, in response to the user input, device displays user interface 1600-7 corresponding to the "Library" user interface of the music application, as shown in FIG. 16RR. In some embodiments, user interface 1600-7 displays one or more representations of music content (e.g., songs, playlists, albums, etc.) that the user has purchased access to (e.g., optionally outside of the music subscription service, such as by purchasing a song or album). For example, in FIG. 16RR, User 2 has purchased access to Songs 9-16 (e.g., corresponding to representations 1632-9 to 1632-16). In some embodiments, representations 1632-9 to 1632-16, corresponding to songs that the user has purchased access to, are selectable to cause playback of the respective song. Thus, the music application is able to determine that the active user is User 2 and that User 2 has purchased access to one or more songs (e.g., Songs 1-8) and displays user interface 1600-7 to reflect the user's entitlements to these songs.

In FIGS. 16SS-16VV, the user navigates to user interface 1600-1, moves the focus to representation 1606-5 corresponding to App 5 and causes display of App 5 (e.g., in response to the user input 1603 corresponding to a selection input while representation 1606-5 has a focus), as shown in FIG. 16WW. In FIG. 16WW, device 500 displays user interface 1600-8 corresponding to an application for Provider 1. In some embodiments, the application for Provider 1 is able to determine that the active profile is User 2 and that User 2 does not have entitlements to Provider 1 (e.g., any of the content provided by Provider 1). Thus, as shown in FIG. 16WW, user interface 1600-8 displays a grid of a plurality of content items (e.g., content items A through H), all of which the user is not entitled to view (e.g., as illustrated by the lack of the play icon) and which are not selectable to cause playback of the respective content item (e.g., optionally are selectable to initiate a process for acquiring entitlements to the content item or to Provider 1).

In FIGS. 16XX-16YY, the user navigates (on user interface 1600-1) the focus to representation 1606-4 corresponding to App 4 and causes display of App 4 (e.g., in response to the user input 1603 corresponding to a selection input while representation 1606-4 has a focus), as shown in FIG. 16ZZ. In FIG. 16ZZ, device 500 displays user interface 1600-9 corresponding to an application for Provider 2. In some embodiments, the application for Provider 2 is able to determine that the active profile is User 2 and that User 2 has an entitlement to Provider 2 (e.g., all content provided by Provider 2). Thus, as shown in FIG. 16ZZ, user interface 1600-9 displays a grid of a plurality of content items (e.g., Items 1 through 8), all of which the user has entitlement to (e.g., as shown by the play icon) which are selectable to cause playback of the respective content item.

As shown above, for example, in FIGS. 16R and 16UU, the applications that are installed on the device are not changed when the active user profile switches from User 1 to User 2. Thus, the device does not remove or install any applications when the active user profile is switched. In some embodiments, if a respective user has enabled a setting to sync the user's home screen user interface across multiple devices, switching user profiles will still not remove or install applications, but optionally will rearrange the order of applications on the home screen user interface (e.g., user interface 1600-1) match the order of applications on the respective user's other devices (e.g., extraneous applications are optionally moved to the end of).

Thus, as described above, some applications on device 500 support the profile switching functionalities (e.g., ability to determine the active profile and maintain and display separate sets of entitlements, recommendations, viewing history, etc.) and some applications on device 500 do not support the profile switching functionalities. It is understood that although certain applications are described above as having or not having the profile switching functionalities, this is illustrative of certain embodiments of the disclosure and should not be considered limiting. In some embodiments, any of the above-discussed applications can or cannot have the profile switching functionalities or can have a subset of the profile switching functionalities described above.

FIGS. 17A-17F are flow diagrams illustrating a method of switching the active user profile of the electronic device 500 in accordance with some embodiments of the disclosure. The method 1700 is optionally performed at an electronic device such as device 100, device 300, device 500, device 501, device 510, and device 511 as described above with reference to FIGS. 1A-1B, 2-3, 4A-4B and 5A-5C. Some operations in method 1700 are, optionally combined and/or order of some operations is, optionally, changed.

As described below, the method 1700 provides ways to switch the active user profile of the electronic device 500. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 16CC, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510 while displaying a user interface of the electronic device (e.g., a user interface of an operating system of the electronic device) that is not a user interface of a first content application or a second content application on the electronic device (e.g., a control panel or control center user interface), and while the electronic device is configured with a first user profile of a first user, which allows the first content application to provide a first set of content on the electronic device and the second content application to provide a second set of content on the electronic device (e.g., the electronic device has been set up with a plurality of user profiles), receives (1702), via the one or more input devices, an input corresponding to a request to configure the electronic device with a second user profile of a second user, such as in FIG. 16CC (e.g., receiving a request to switch the active profile of the electronic device from a first user profile to a second user profile).

In some embodiments, the settings and/or content of the electronic device are associated with one or more user accounts and/or user profiles. In some embodiments, one of the one or more user profiles is active at any one time on the electronic device. In some embodiments, the active profile determines the settings and/or available content on the electronic device. Thus, in some embodiments, if a first user profile is active, the various content applications on the electronic device are configured to provide content that the first user profile is entitled to access on the electronic device (but not content that the second user profile is entitled to access on the electronic device), and if a second user profile is active, the various content applications on the electronic device are configured to provide content that the second user profile is entitled to access on the electronic device (but not content that the first user profile is entitled to access on the electronic device). In some embodiments, the settings and/or content defined by the user profile include associations with cloud accounts, history of purchased content, viewing history, etc.

In some embodiments, the request comprises selecting the second user profile from the control center user interface as described above with reference to method 1500. In some embodiments, the request comprises selecting the second user profile from a settings application. In some embodiments, the request is received from another electronic device that is remotely controlling the electronic device.

In some embodiments, in response to receiving the input corresponding to the request to configure the electronic device with the second user profile of the second user, the electronic device configures (1704) the electronic device with the second user profile of the second user, which allows the first content application to provide a third set of content, different than the first set of content, on the electronic device and the second content application to provide a fourth set of content, different than the second set of content, on the electronic device, such as in FIG. 16DD (e.g., causing the second user profile to become the active profile on the electronic device).

In some embodiments, setting the second user profile as the active profile causes one or more of the applications on the electronic device to change from being associated with the first user profile to being associated with the second user profile. For example, the first content application logs out of the account associated with the first user profile and logs into the account associated with the second user profile. In some embodiments, the account associated with the second user profile has different content entitlements such that logging into the account associated with the second user profile gives the electronic device access to a different set of content. In some embodiments, not all applications have a separate and/or dedicated user account and optionally, instead, rely on and/or have access to the active user profile of the electronic device. In some embodiments, setting up a profile on the electronic device provides these applications with access to the profile (e.g., the applications use the user profile instead of a dedicated user account to uniquely identify users). In some embodiments, the data from these applications are able to be saved to and associated with the active user profile (e.g., settings, viewing history, etc.). In such examples, when the active profile is changed from the first user profile to the second user profile, these applications are updated to refer to the second user profile and the data that these applications access that are associated with the first user profile (e.g., settings, viewing history, etc.) are switched to the data that is associated with the second user. In some embodiments, the data associated with the first profile is removed and the data associated with the second profile is loaded (e.g., the data is saved on a server, the cloud, or a local repository), or the data is not removed and the application is updated to access a different set of data for the new user profile (e.g., the system stores one or more sets of data corresponding to the one or more user profiles). In some embodiments, not all applications and content are associated with a user profile or are capable of being switched (e.g., agnostic to user accounts or user profiles). In such examples, the applications and content that are not associated with a user profile or are not capable of being switched are not changed or updated to reflect the change in the active profile.

The above-described manner of changing user profiles allows the electronic device to provide the user with the ability to quickly update the settings and change the available content to another set of settings and content, which simplifies the interaction between the user and the electronic device and enhances the operability of the electronic device and makes the user-device interface more efficient (e.g., by providing a mechanism for the user to switch from a first user profile to a second user profile and automatically update applications to reflect the changed user profile without requiring the user to individually navigate to each application to log out of the account associated with the first user profile and log into the account associated with the second user profile or navigate to each setting to manually change each setting appropriately), which additionally reduces power usage and improves battery life of the electronic device by enabling the user to use the electronic device more quickly and efficiency, such as by streamlining the process of switching user profiles.

In some embodiments, the user profiles that are available with which to configured the electronic device are user profiles that are part of a family account that includes the first user profile and the second user profile (1706), such as in FIG. 16Z (e.g., the user profiles that are displayed in the control center user interface from which the user is able to select as the active profile are the user profiles included in a family account (e.g., a group account, membership in which allows members to share some or all of their content entitlements with other members, and that optionally shares a single purchase account (e.g., credit card, bank account, etc.) that is used for content purchases made by family member accounts)). In some embodiments, a family account includes one or more user profiles associated with different members of a family. In some embodiments, a user is able to configure the amount of user profiles in a family account and associate them with members of the user's family.

The above-described manner of changing user profiles (e.g., by selecting from the user profiles that are part of a family account) allows the electronic device to provide the user with the ability to select from user profiles of users that are likely to use the electronic device (e.g., the members of the family of the user), which simplifies the interaction between the user and the electronic device and enhances the operability of the electronic device and makes the user-device interface more efficient (e.g., by automatically displaying the user profiles of members of a family account without requiring the user to manually add each member of the user's family to the list of profiles that can be switched to), which additionally reduces power usage and improves battery life of the electronic device by enabling the user to use the electronic device more quickly and efficiency, such as by streamlining the process of switching user profiles.

In some embodiments, the user profiles that are available with which to configured the electronic device are user profiles added to a smart home application available to the electronic device (1708), such as in FIG. 16Z (e.g., the user profiles that are displayed in the control center user interface from which the user is able to select as the active profile are the user profiles that are included in a smart home application). In some embodiments, a user is able to configure one or more user profiles (corresponding to the one or more people living at the user's residence) in a smart home application (e.g., allow these user profiles to access the smart home application and control the corresponding smart home devices), such as to set the preferences and/or access restrictions of the one or more people living at the user's residence.

The above-described manner of changing user profiles (e.g., by selecting from the user profiles that are included in a smart home application) allows the electronic device to provide the user with the ability to select from user profiles of users that are likely to use the electronic device (e.g., the people who live in the same residence as the user), which simplifies the interaction between the user and the electronic device and enhances the operability of the electronic device and makes the user-device interface more efficient (e.g., by automatically displaying the user profiles of users who most likely live with the user without requiring the user to manually add each resident to the list of profiles that can be switched to), which additionally reduces power usage and improves battery life of the electronic device by enabling the user to use the electronic device more quickly and efficiency, such as by streamlining the process of switching user profiles.

In some embodiments, while the electronic device is configured with the first user profile of the first user, such as in FIG. 16A, the electronic device has access to (1710): the first set of content and the second set of content from the first content application and the second content application, respectively (1712), such as in FIGS. 16B and 16E (e.g., the first and second content applications are configured to use the first user profile as the active profile such that the first set of content and the second set of content (e.g., based on the entitlements and/or viewing history of the first user profile) are available), and a fifth set of content, associated with the first user profile of the first user, from a third application (1714), such as in FIG. 16H (e.g., the third application whose content is not able to be changed based on the active user profile). For example, a photo and video application is able to access photos and videos that are available on a respective user's account, but the photo and video application is not able to update the content or change its access such that a different set of photos and/or videos are available when a different user profile is selected as the active profile. In some embodiments, the photo and video application is associated with a user account from a user account service that is not compatible with switching active user profiles.

In some embodiments, while the electronic device is configured with the second user profile of the second user, such as in FIG. 16DD, the electronic device has access to (1716): the third set of content and the fourth set of content from the first content application and the second content application, respectively (1716), such as in FIGS. 16EE and 16HH (e.g., the first and second content applications are configured to use the second user profile as the active profile such that the third set of content and the fourth set of content (e.g., based on the entitlements and/or viewing history of the second user profile) are available); and the fifth set of content, associated with the first user profile of the first user, from the third application (1720), such as in FIG. 16KK (e.g., the third application whose content is not able to be changed based on the active user profile continues to provide access to the fifth set of content, rather than switching to provide access to another set of content). In some embodiments, the first and second content applications provide content based on a first type of user account (that changes from one to another when the user profile of the electronic device changes), and the third application provides content based on a second type of user account (that does not change from one to another when the user profile of the electronic device changes).

The above-described manner of changing user profiles (e.g., by selecting from the user profiles that are part of a family account) allows the electronic device to provide the user with the ability to select from user profiles of users that are likely to use the electronic device (e.g., the members of the family of the user), which simplifies the interaction between the user and the electronic device and enhances the operability of the electronic device and makes the user-device interface more efficient (e.g., by automatically displaying the user profiles of members of a family account without requiring the user to manually add each member of the user's family to the list of profiles that can be switched to), which additionally reduces power usage and improves battery life of the electronic device by enabling the user to use the electronic device more quickly and efficiency, such as by streamlining the process of switching user profiles.

In some embodiments, the third application is a photos application, and the fifth set of content is photos content associated with the first user profile of the first user (1722), such as in FIGS. 16H and 16KK (e.g., the photos application does not switch to a different set of content based on the change in the active profile). Thus, in some embodiments, the photos and/or videos of the first user that are accessible (e.g., viewable) via the photos application is also available for viewing when the active user profile switches from the first user profile to the second user profile.

The above-described manner of changing user profiles (e.g., by maintaining the content available via the photos application) allows the electronic device to provide the second user with the ability to view the first user's photos and/or videos that are available via the photos application, which simplifies the interaction between the user and the electronic device and enhances the operability of the electronic device and makes the user-device interface more efficient (e.g., without requiring the user to manually log out of the photos application and log into the photos application as the first user in order to view the first user's content while the second user profile is the active profile), which additionally reduces power usage and improves battery life of the electronic device by enabling the user to use the electronic device more quickly and efficiency, such as by streamlining the process of viewing photos and/or videos.

In some embodiments, while the electronic device is configured with the first user profile of the first user (1724), such as in FIG. 16A: viewing activity information in a respective content application is viewing activity for the first user (1726), such as in FIG. 16B (e.g., the viewing history of the first user profile is active when the active user is the first user profile. In some embodiments, the one or more applications of the electronic device have access to the first user profile's viewing history and is able to recommend content or displaying viewing history based on the first user profile's viewing history).

In some embodiments, while the electronic device is configured with the second user profile of the second user (1728), such as in FIG. 16DD: viewing activity information in the respective content application is viewing activity for the second user, different than the viewing activity for the first user (1730), such as in FIG. 16EE (e.g., the viewing history of the second user profile is active when the active user is the second user profile). In some embodiments, the one or more applications of the electronic device now have access to the second user profile's viewing history and is able to recommend content or display viewing history based on the second user profile's viewing history. Thus, switching the active profile from the first user profile to the second user profile switches the active viewing history of the device.

The above-described manner of changing user profiles (e.g., by changing the viewing history of a respective content from the viewing history associated with the first user profile to the viewing history associated with the second user profile) allows the electronic device to provide recommendations to the user that is most relevant to the active user profile (e.g., by setting the active viewing history as the viewing history of the active user profile such that a respective application that provides recommendations based on viewing history is able to provide the correct recommendations for the active user profile), which simplifies the interaction between the user and the electronic device and enhances the operability of the electronic device and makes the user-device interface more efficient (e.g., by automatically updating the active viewing history of the device without requiring the user to clear the viewing history on each application and import the viewing history associated with the new active profile to achieve the same functionality), which additionally reduces power usage and improves battery life of the electronic device by enabling the user to use the electronic device more quickly and efficiency, such as by streamlining the process of switching user profiles.

In some embodiments, while the electronic device is configured with the first user profile of the first user (1732), such as in FIG. 16A: content recommendations in a respective content application are content recommendations for the first user (1734), such as in FIG. 16B (e.g., the content that is recommended to the user by the one or more applications of the electronic device are based on the first user profile (e.g., optionally the first user profile's viewing history or selection history).

In some embodiments, while the electronic device is configured with the second user profile of the second user (1736), such as in FIG. 16DD: content recommendations in the respective content application are content recommendations for the second user, different than the content recommendations for the first user (1738), such as in FIG. 16EE (e.g., the content that is recommended to the user by the one or more applications of the electronic device are now based on the second user profile (e.g., optionally the second user profile's viewing history or selection history)). Thus, switching the active profile from the first user profile to the second user profile switches the recommendations provided by one or more applications of the device.

The above-described manner of changing user profiles (e.g., by changing the content recommendations of a respective content from the recommendations for the first user profile to the recommendations for the second user profile) allows the electronic device to provide recommendations to the user that is most relevant to the active user profile (e.g., by changing the recommendations provided by the application to the applications that are associated with the active user profile), which simplifies the interaction between the user and the electronic device and enhances the operability of the electronic device and makes the user-device interface more efficient (e.g., by automatically updating the content that is recommended by respective applications based on the active user history without requiring the user to clear the recommendations on each application and import new viewing history and/or recommendations to achieve the same functionality), which additionally reduces power usage and improves battery life of the electronic device by enabling the user to use the electronic device more quickly and efficiency, such as by streamlining the process of switching user profiles.

In some embodiments, while the electronic device is configured with the first user profile of the first user (1740), such as in FIG. 16A: content available for viewing in a unified media browsing application is a first respective set of content (1742), such as in FIG. 16B (e.g., the unified media browsing application is able to determine the entitlements of the user profile and display to the user what content the user is entitled to and what content the user is not entitled to), and viewing activity information in the unified media browsing application is viewing activity for the first user (1746), such as in FIG. 16B (e.g., the unified media browsing application is able to track the user's viewing activity information (e.g., to provide better suggestions or to display the user's viewing activity)).

In some embodiments, when the active profile is the first user profile, the unified media browsing application is able to determine the first user profile's entitlements and appropriately identify what content the user is entitled to (selection of which initiates a process for displaying the content) and what content the user is not entitled to (selection of which does not initiate a process for displaying the content. In some embodiments, when the active profile is the first user profile, the active viewing activity information is the viewing activity information of the first user profile.

In some embodiments, while the electronic device is configured with the second user profile of the second user (1748), such as in FIG. 16DD: content available for viewing in the unified media browsing application is a second respective set of content, different than the first respective set of content (1750), such as in FIG. 16EE (e.g., when the active profile is the second user profile, the unified media browsing application is able to determine the second user profile's entitlements and appropriately identify what content the user is entitled to (selection of which initiates a process for displaying the content) and what content the user is not entitled to (selection of which does not initiate a process for displaying the content)), and viewing activity information in the unified media browsing application is viewing activity for the second user, different than the viewing activity for the first user (1752), such as in FIG. 16EE (e.g., when the active profile is the second user profile, the active viewing activity information is the viewing activity information of the second user profile).

Thus, in some embodiments, switching the active profile from the first user profile to the second user profile causes the unified media browsing application to reflect any changes in entitlements between the first user profile and the second user profile. Thus, in some embodiments, switching the active profile from the first user profile to the second user profile causes the unified media browsing application to reflect the different consumption histories of the user profiles.

The above-described manner of changing user profiles (e.g., by switching the active viewing activity information and entitlements of the unified media browsing application from the first user profile to the second user profile) allows the electronic device to provide the second user with a customized experience that is customized for the second user, without artifacts from the first user's history, settings, and/or entitlements, which simplifies the interaction between the user and the electronic device and enhances the operability of the electronic device and makes the user-device interface more efficient (e.g., by automatically updating the entitlements and viewing history in the unified media browsing application without requiring the user to navigate to the unified media browsing application and log out of the first user's user profile and log into the second user's user profile to achieve the same functionality), which additionally reduces power usage and improves battery life of the electronic device by enabling the user to use the electronic device more quickly and efficiency, such as by streamlining the process of switching user profiles.

In some embodiments, while the electronic device is configured with the first user profile of the first user, an application that provides access to content based on a subscription to a subscription service provides content based on a subscription status of the first user with the subscription service (1754), such as in FIG. 16E (e.g., an application to which content is accessible via a subscription service will apply the subscription status of the first user profile when the active profile is the first user profile). For example, an application for browsing for and downloading subscription games is able to determine the subscription status of the active user profile. In some embodiments, if the active profile is the first user profile and the first user profile does not have a subscription to the game subscription service, then the application for browsing for and downloading subscription games will reflect that the user does not have a subscription (e.g., the user will be unable to acquire games and optionally will be provided with the option to subscribe to the game subscription service).

In some embodiments, while the electronic device is configured with the second user profile of the second user, the application that provides access to content based on a subscription to the subscription service provides content based on a subscription status of the second user with the subscription service (1756), such as in FIG. 16HH (e.g., applications to which content is accessible via a subscription service will apply the subscription status of the second user profile when the active profile is the second user profile). For example, if the active profile is the second user profile and the second user profile has a subscription to the game subscription service, then the application for browsing for and downloading subscription games will reflect that the user has a subscription (e.g., the user will be able to acquire games and will not be prompted to acquire a subscription to the game subscription service).

The above-described manner of changing user profiles (e.g., by changing the access to a set of content based on the subscription status of the second user profile instead of the first user profile) allows the electronic device to provide the proper content access entitlements based on the subscription status of the second user profile, which simplifies the interaction between the user and the electronic device and enhances the operability of the electronic device and makes the user-device interface more efficient (e.g., by automatically updating the content entitlement of the application based on the subscription status of the active user without requiring the user to manually log out of the application and log into the application with the second user profile), which additionally reduces power usage and improves battery life of the electronic device by enabling the user to use the electronic device more quickly and efficiency, such as by streamlining the process of switching user profiles.

In some embodiments, while the electronic device is configured with the first user profile of the first user (1758), such as in FIG. 16A: content available for consumption in a music application is a first respective set of content (1760), such as in FIGS. 16QQ-16RR (e.g., the music application is able to determine the entitlements of the user profile and display to the user what content the user is entitled to and what content the user is not entitled to), and content consumption activity information in the music application is content consumption activity for the first user (1762), such as in FIG. 16RR (e.g., the music application is able to track the user's playback activity (e.g., to provide better suggestions or to display the user's playback activity)).

In some embodiments, when the active profile is the first user profile, the music application is able to determine the first user profile's entitlements (e.g., items that the user has purchased access to, or items that the user has access to as a result of a subscription to a music subscription service) and appropriately identify what content the user is entitled to (selection of which initiates a process for playing the content) and what content the user is not entitled to (selection of which does not initiate a process for playing the content). In some embodiments, when the active profile is the first user profile, the active content consumption activity is the playback activity of the first user profile.

In some embodiments, while the electronic device is configured with the second user profile of the second user (1764), such as in FIG. 16DD: content available for consumption in the music application is a second respective set of content, different than the first respective set of content (1766), such as in FIGS. 16N-16O (e.g., when the active profile is the second user profile, the music application is able to determine the second user profile's entitlements (e.g., items that the user has purchased access to, or items that the user has access to as a result of a subscription to a music subscription service) and appropriately identify what content the user is entitled to (selection of which initiates a process for playing the content) and what content the user is not entitled to (selection of which does not initiate a process for playing the content)), and content consumption activity information in the music application is content consumption activity for the second user, different than the content consumption activity for the first user (1768), such as in FIG. 16N (e.g., when the active profile is the second user profile, the active content consumption information is the content consumption information of the second user profile).

Thus, in some embodiments, switching the active profile from the first user profile to the second user profile causes the music application to reflect any changes in entitlements between the first user profile and the second user profile. Thus, in some embodiments, switching the active profile from the first user profile to the second user profile causes the music application to reflect the different consumption histories of the user profiles.

The above-described manner of changing user profiles (e.g., by changing the access to a set of music based on the entitlements of the second user profile instead of the first user profile, and by changing the consumption history from the consumption history of the first user to the consumption history of the second user) allows the electronic device to provide the proper content access entitlements and viewing history based on the entitlements of the second user profile, which simplifies the interaction between the user and the electronic device and enhances the operability of the electronic device and makes the user-device interface more efficient (e.g., by automatically updating the content entitlement and viewing history of the application such that the user does not improperly attempt to access content to which the user does not have entitlements to access and without requiring the user to navigate to the music application to manually log out of the first user profile and log into the second user profile), which additionally reduces power usage and improves battery life of the electronic device by enabling the user to use the electronic device more quickly and efficiency, such as by streamlining the process of switching user profiles.

In some embodiments, while the electronic device is configured with the first user profile of the first user (1770), such as in FIG. 16A: content available for consumption in a podcast application is a first respective set of content (1772), such as in FIG. 16K (e.g., the podcast application is able to determine the entitlements of the user profile and display to the user what content the user is entitled to and what content the user is not entitled to), and content consumption activity information in the podcast application is content consumption activity for the first user (1774), such as in FIG. 16K (e.g., the podcast application is able to track the user's playback activity (e.g., to provide better suggestions or to display the user's playback activity))

In some embodiments, when the active profile is the first user profile, the podcast application is able to determine the first user profile's entitlements (e.g., the podcasts to which the user has subscribed) and appropriately identify what content the user is entitled to (selection of which initiates a process for playing the content) and what content the user is not entitled to (selection of which does not initiate a process for playing the content. In some embodiments, when the active profile is the first user profile, the active content consumption activity is the playback activity of the first user profile.

In some embodiments, while the electronic device is configured with the second user profile of the second user (1776), such as in FIG. 16DD: content available for consumption in the podcast application is a second respective set of content, different than the first respective set of content (1778), such as in FIG. 16NN (e.g., when the active profile is the second user profile, the podcast application is able to determine the second user profile's entitlements (e.g., the podcasts to which the user has subscribed) and appropriately identify what content the user is entitled to (selection of which initiates a process for playing the content) and what content the user is not entitled to (selection of which does not initiate a process for playing the content)), and content consumption activity information in the podcast application is content consumption activity for the second user, different than the content consumption activity for the first user (1780), such as in FIG. 16NN (e.g., when the active profile is the second user profile, the active content consumption information is the content consumption information of the second user profile).

Thus, in some embodiments, switching the active profile from the first user profile to the second user profile causes the podcast application to reflect any changes in entitlements between the first user profile and the second user profile. Thus, in some embodiments, switching the active profile from the first user profile to the second user profile causes the podcast application to reflect the different consumption histories of the user profiles.

The above-described manner of changing user profiles (e.g., by changing the access to a set of podcasts based on the entitlements of the second user profile instead of the first user profile, and by changing the consumption history from the consumption history of the first user to the consumption history of the second user) allows the electronic device to provide the proper content access entitlements and viewing history based on the entitlements of the second user profile, which simplifies the interaction between the user and the electronic device and enhances the operability of the electronic device and makes the user-device interface more efficient (e.g., by automatically updating the content entitlement and viewing history of the application such that the user does not improperly attempt to access content to which the user does not have entitlements to access and without requiring the user to navigate to the podcast application to manually log out of the first user profile and log into the second user profile), which additionally reduces power usage and improves battery life of the electronic device by enabling the user to use the electronic device more quickly and efficiency, such as by streamlining the process of switching user profiles.

In some embodiments, when the input corresponding to the request to configure the electronic device with the second user profile of the second user was received, a first set of applications, including the first content application and the second content application, were installed on the electronic device (1782), such as in FIG. 16X (e.g., the first set of applications are installed on the electronic device when the first user profile is the active profile).

In some embodiments, configuring the electronic device with the second user profile of the second user includes maintaining the first set of applications installed on the electronic device and not installing additional applications on the electronic device (1784), such as in FIG. 16YY (e.g., after switching the active profile to the second user profile, the electronic device maintains the same set of installed applications as when the active profile was the first user profile). Thus, in some embodiments, switching the active profile from the first user profile to the second user profile does not cause more or fewer applications to be installed on the device (e.g., applications are not installed or removed).

The above-described manner of changing user profiles (e.g., by maintaining the applications that are installed on the electronic device despite changing the active profile from the first user profile to the second user profile) allows the electronic device to provide a consistent experience to the first user and to the second user and without requiring the device to uninstall or reinstall applications every time the active user profile is changed, which simplifies the interaction between the user and the electronic device and enhances the operability of the electronic device and makes the user-device interface more efficient (e.g., by not changing the set of applications that are installed on the electronic device and without requiring the user to re-install applications that the user desired to remain installed on the device), which additionally reduces power usage and improves battery life of the electronic device by enabling the user to use the electronic device more quickly and efficiency, such as by streamlining the process of switching user profiles.

It should be understood that the particular order in which the operations in FIGS. 17A-17F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, and 1900) are also applicable in an analogous manner to method 1700 described above with respect to FIGS. 17A-17F. For example, the operation of the electronic device to switch the active user of the device with reference to method 1700 optionally has one or more of the characteristics of the presentation of presenting representations of content items, presenting options for accessing the content based on available means for accessing items of content, presenting representations of episodes of collections of episodic content, presenting an enhanced preview of an items of content, presenting a control panel, and entering into a picture-in-picture mode, etc., described herein with reference to other methods described herein (e.g., methods 700, 900, 1100, 1300, 1500, and 1900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIGS. 17A-17F are, optionally, implemented by components depicted in FIGS. 1A-1B. For example, displaying operations, receiving operations 1702, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Picture-In-Picture Mode

Users interact with electronic devices in many different manners, including using an electronic device to browse for and view items of content on the electronic device. In some embodiments, the user desires to concurrently view multiple content items or to view a content item while simultaneously browsing for content. The embodiments described below provide ways in which an electronic device displays a content item overlaid over another user interface from which the user is able to browse for and display other content items, thus enhancing users' interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 18A-18JJ illustrate exemplary ways in which an electronic device 500 displays a content item in picture-in-picture mode in accordance with some embodiments of the disclosure. The embodiments in these figures are used to illustrate the processes described below, including the processes described with reference to FIGS. 19A-19F.

Figure 18A:
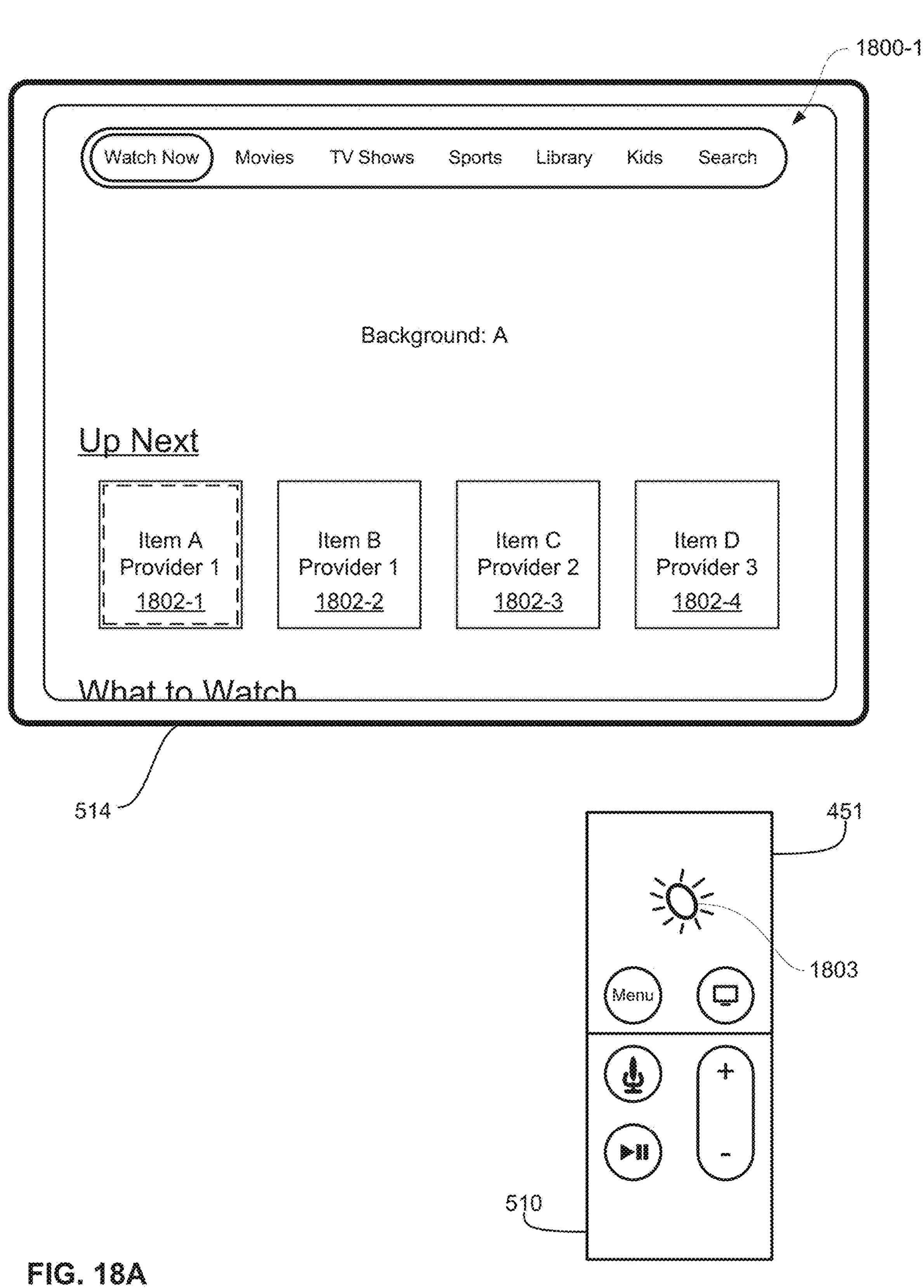

FIG. 18A illustrates an electronic device 500 displaying user interface 1800-1 on display 514. In some embodiments, user interface 1800-1 is a user interface for a unified media browsing application. In some embodiments, user interface 1800-1 includes one or more representations of content items (e.g., representations 1802-1 to 1802-4) that are selectable to cause playback of the respective content item.

In FIG. 18A, while representation 1802-1 has a current focus (e.g., as illustrated by the dotted box), user input 1803 corresponding to a selection input is received. In some embodiments, in response to the user input, device 500 replaces display of user interface 1800-1 with user interface 1800-2. In some embodiments, user interface 1800-2 is a content playback user interface. In some embodiments, user interface 1800-2 is playing back Item A (e.g., including the audio track of Item A, as shown).

Figure 18B:
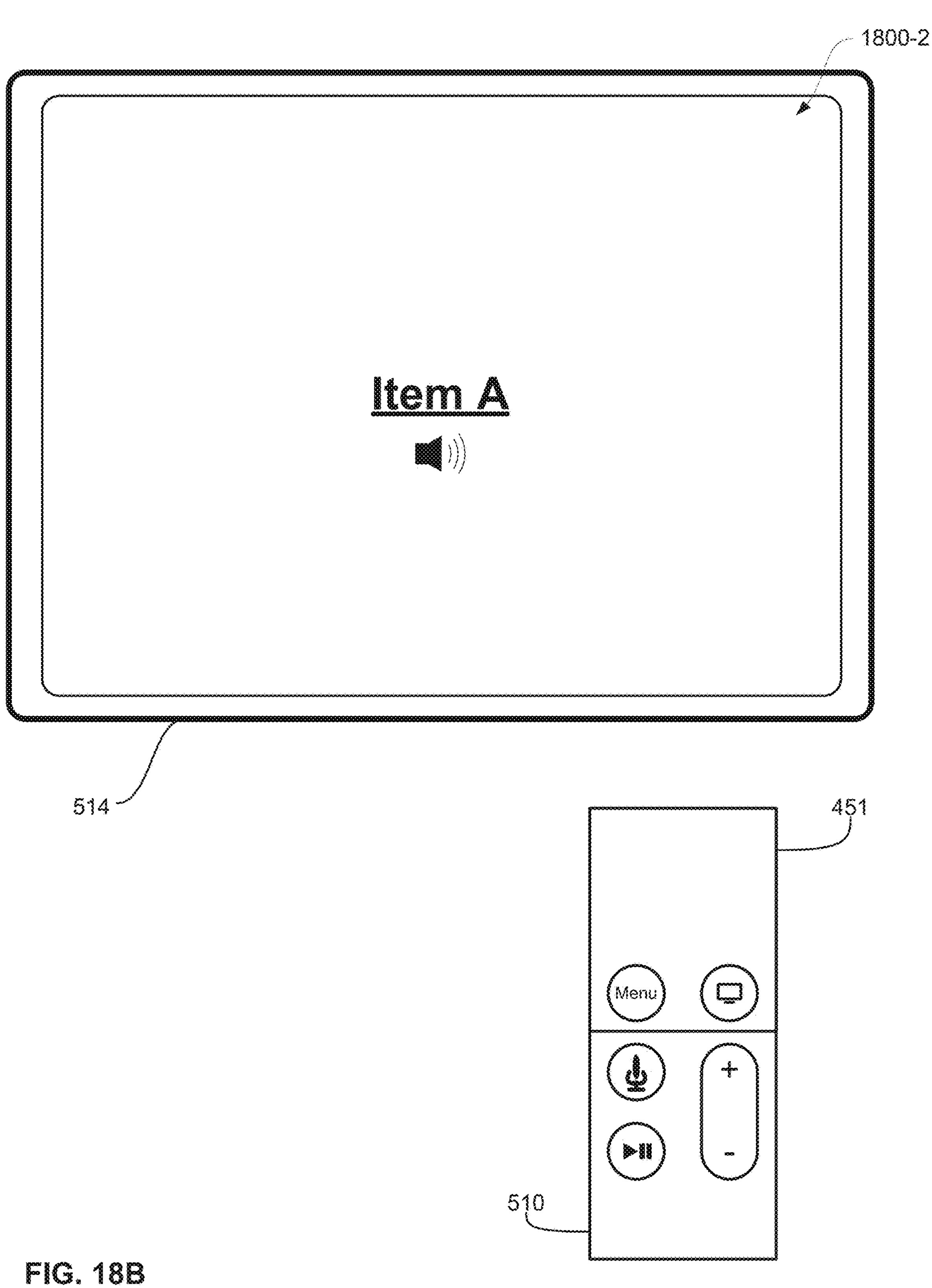
Figure 18C:
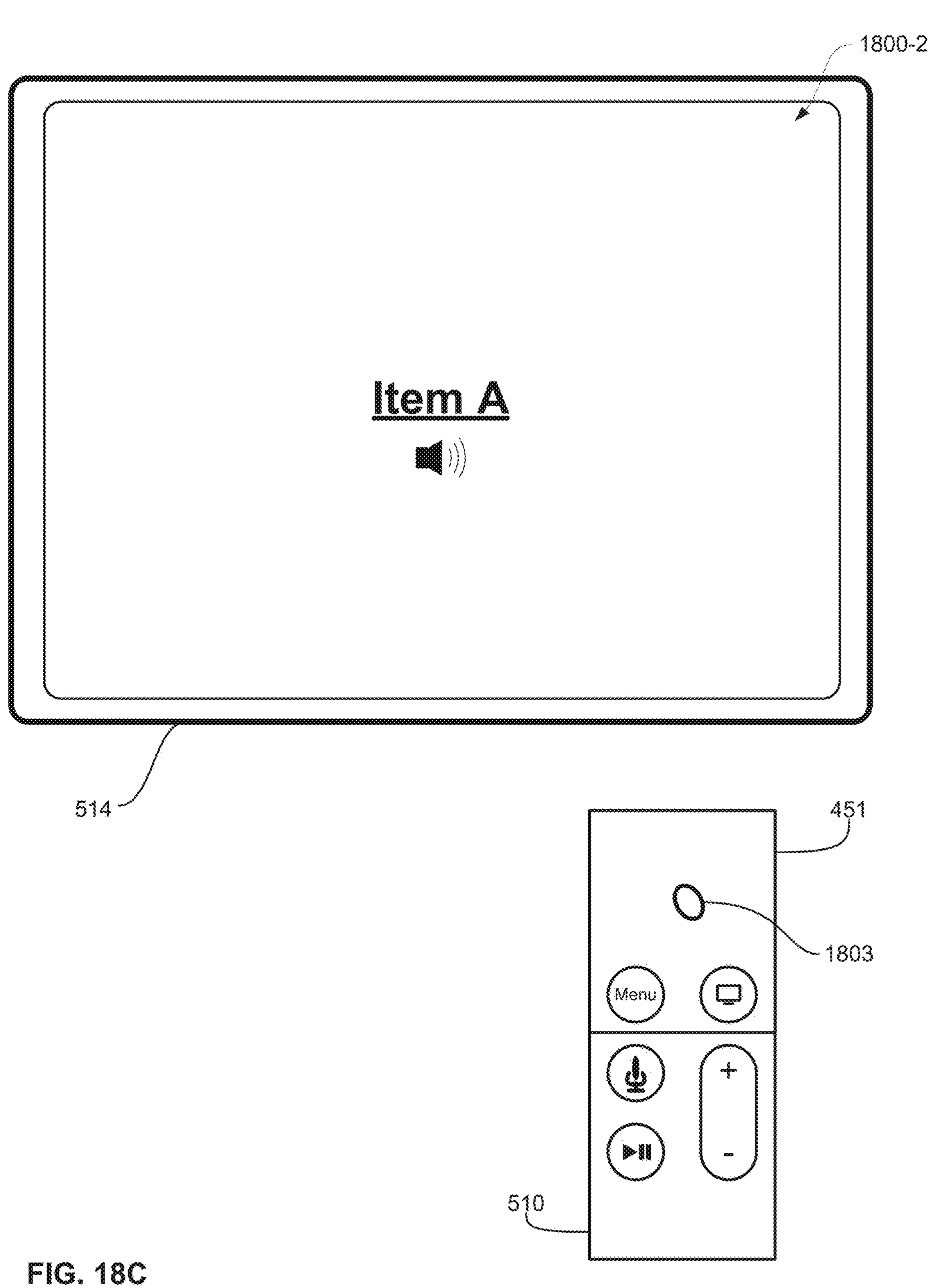
Figure 18D:
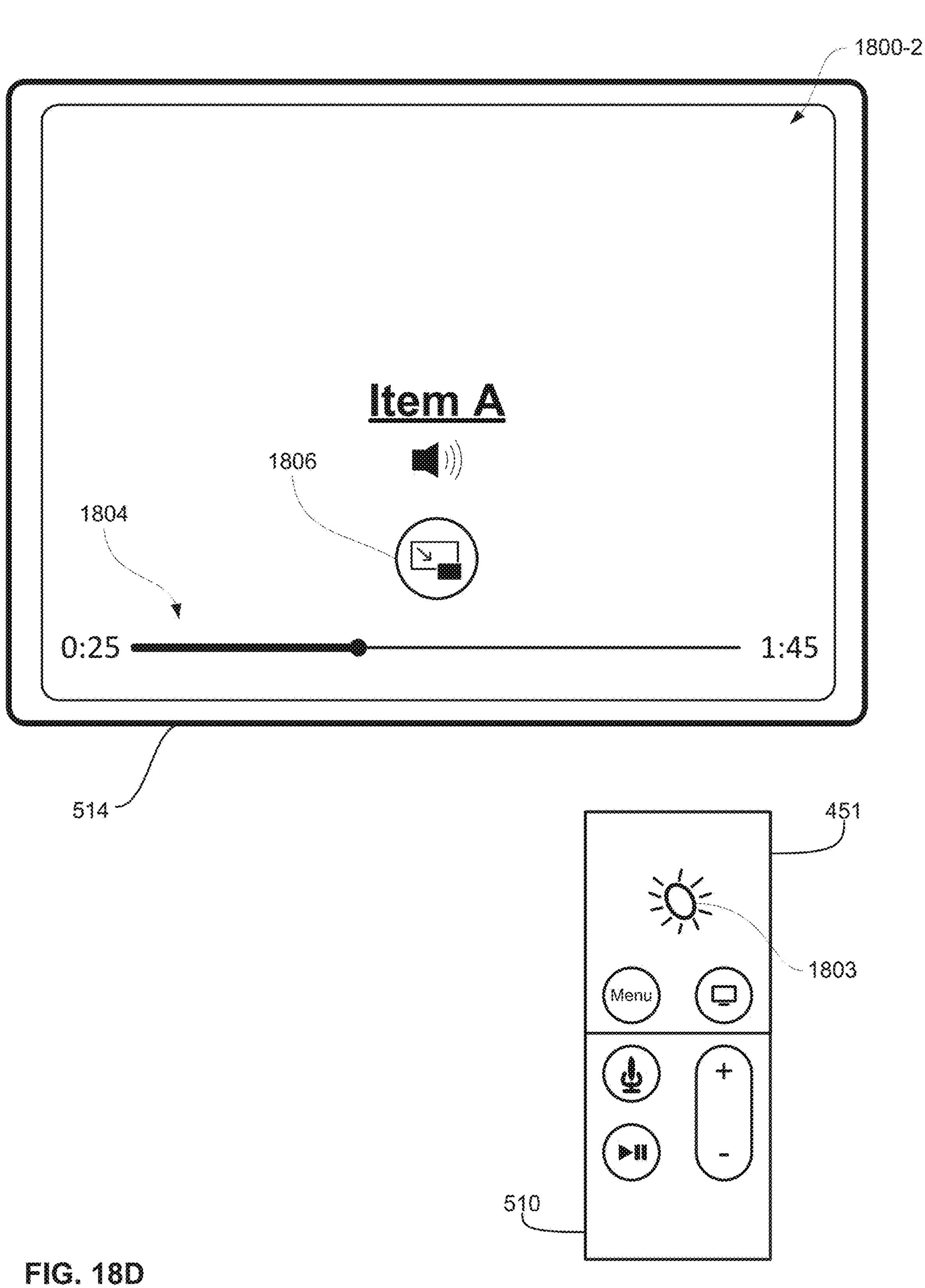

In FIG. 18C, contact 1803 is detected on the touch-sensitive surface 451 of remote control device 510. In some embodiments, contact 1803 is a continued touch-down on the touch-sensitive surface 451 less than a threshold intensity (e.g., a touch-and-hold without clicking on the touch-sensitive surface 451). In some embodiments, in response to the user input, device 500 displays scrubber bar 1804 and selectable option 1806 overlaid over the content currently being displayed on user interface 1800-2, as shown in FIG. 18D. In some embodiments, scrubber bar 1804 is displayed at or near the bottom of the display and selectable option 1806 is displayed just above scrubber bar 1804. In some embodiments, scrubber bar 1804 illustrates the current progression through the content item, how much time has elapsed (e.g., 25 minutes)) and how much time is remaining (e.g., 1 hour 45 minutes) (e.g., or optionally the total duration of the content). In some embodiments, selectable option 1806 is a picture-in-picture activation button and is selectable to cause device 500 to enter into picture-in-picture mode, as will be described in further detail below.

Figure 18E:
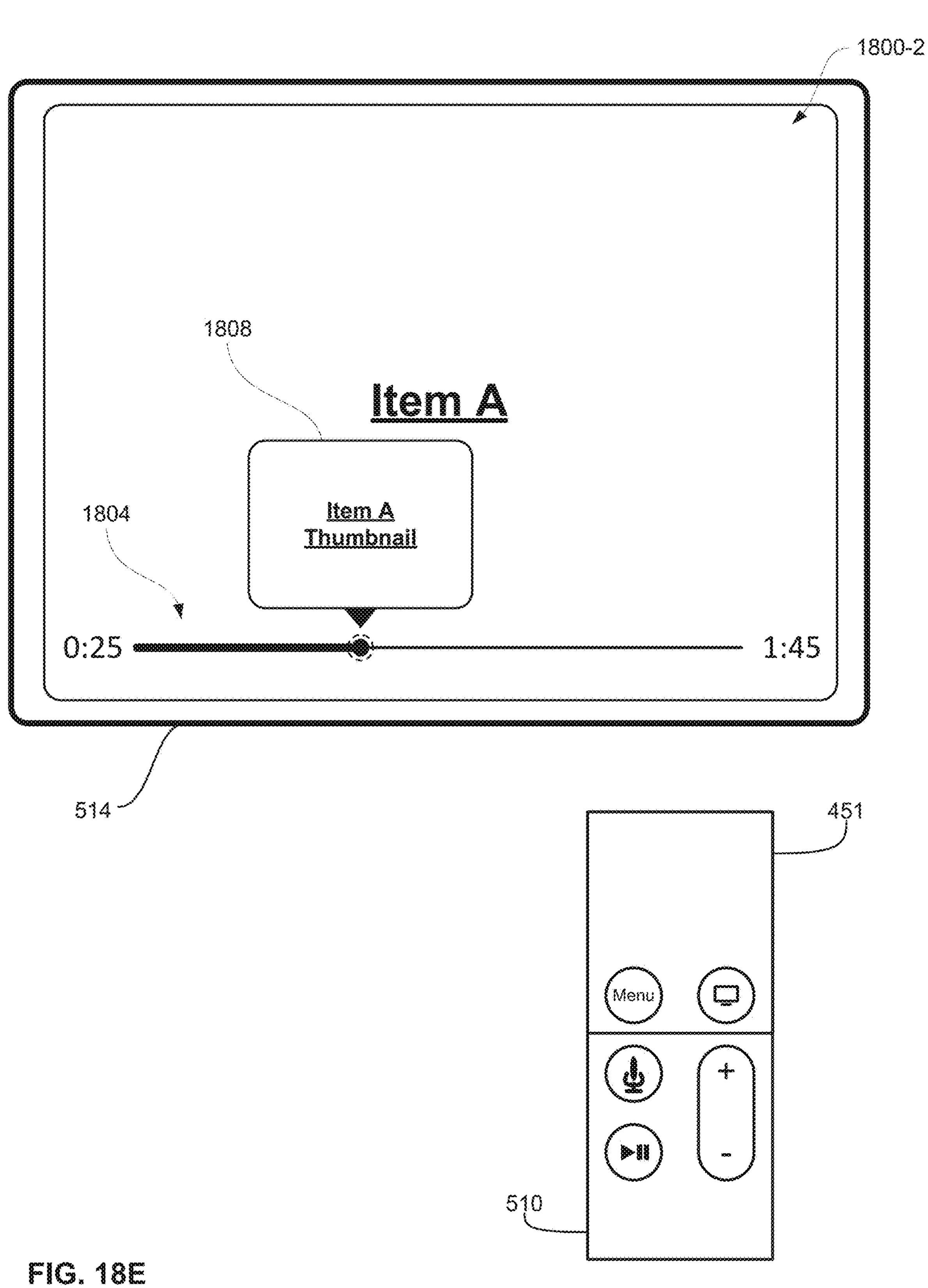

In FIG. 18D, user input 1803 corresponding to a selection input is received while user interface 1800-2 includes scrubber bar 1804 and selectable option 1806. In some embodiments, in response to the user input, device 500 enters into a content scrubbing mode, as shown in FIG. 18E. In some embodiments, while in content scrubbing mode, the user is able to scrub through the content (e.g., move playback of the content item forward or backwards). In some embodiments, a thumbnail of content item is shown at or near scrubber 1804 to provide a preview of the content item at the current scrubbing position of scrubber 1804. In some embodiments, in response to the user input, device 500 pauses playback of Item A. In some embodiments, in response to the user input, device 500 continues playback of Item A. In some embodiments, in response to the user input, selectable option 1806 is no longer displayed. In some embodiments, in response to the user input, selectable option 1806 is maintained on the user interface.

Figure 18F:
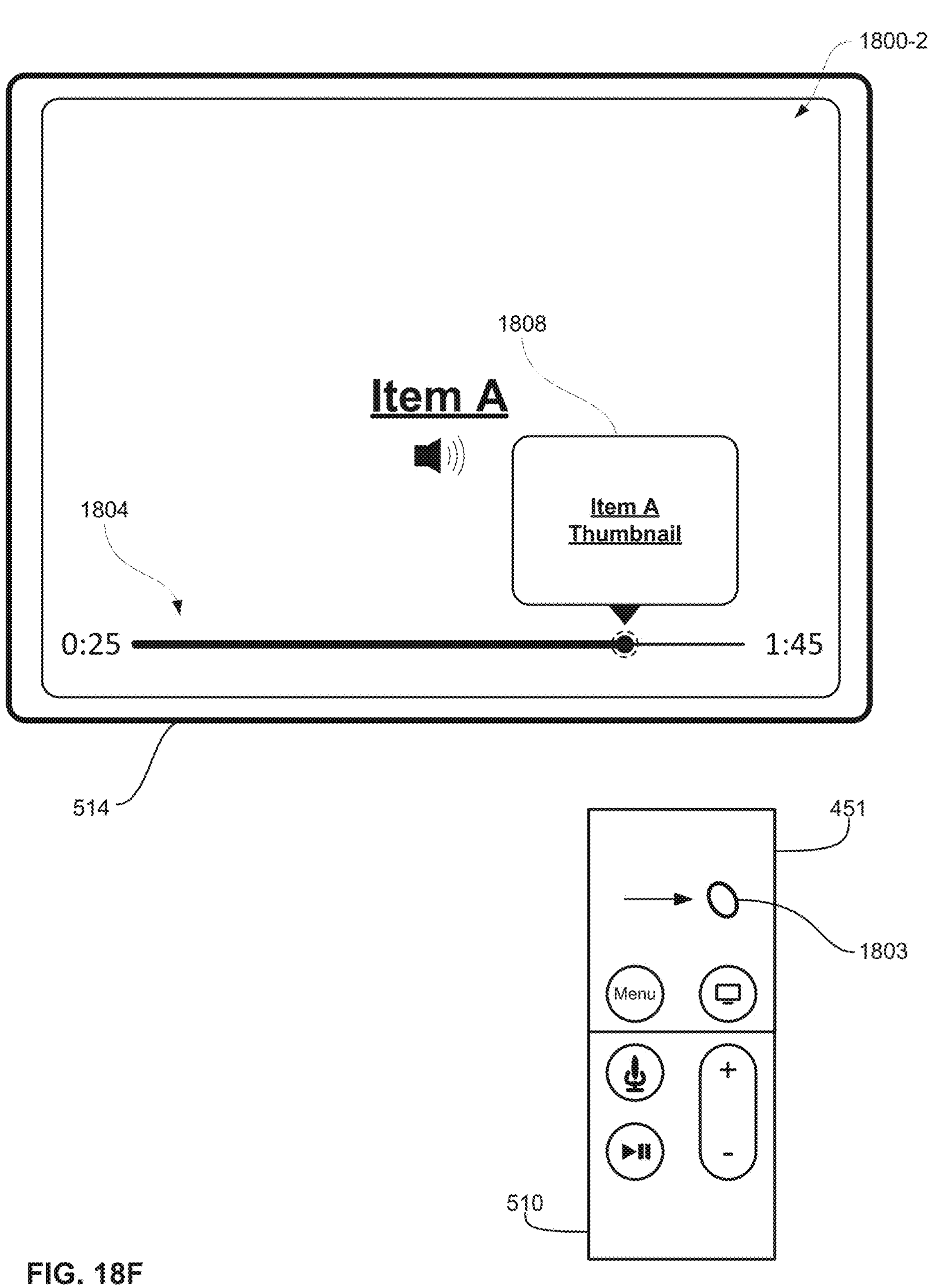
Figure 18G:
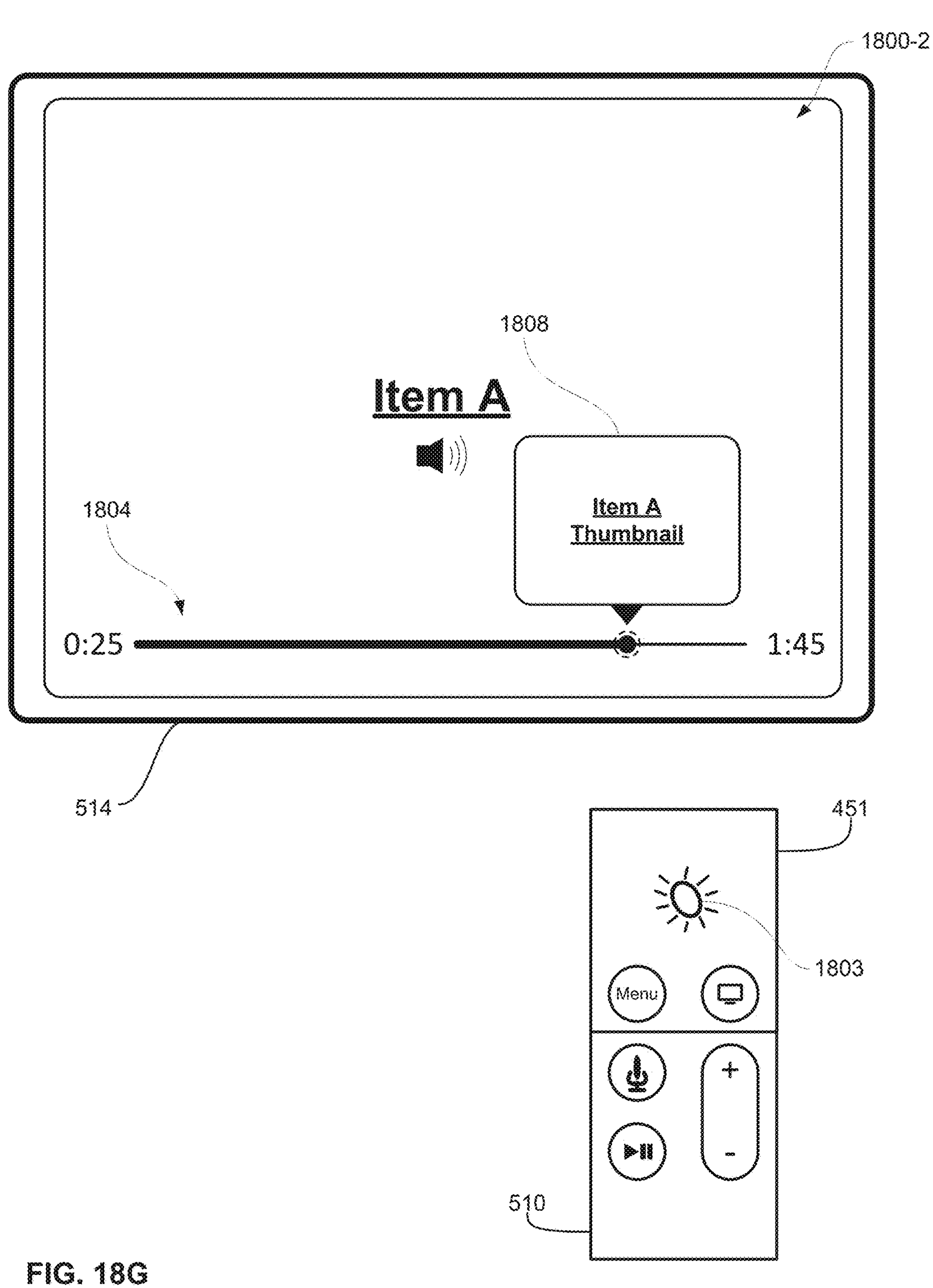
Figure 18H:
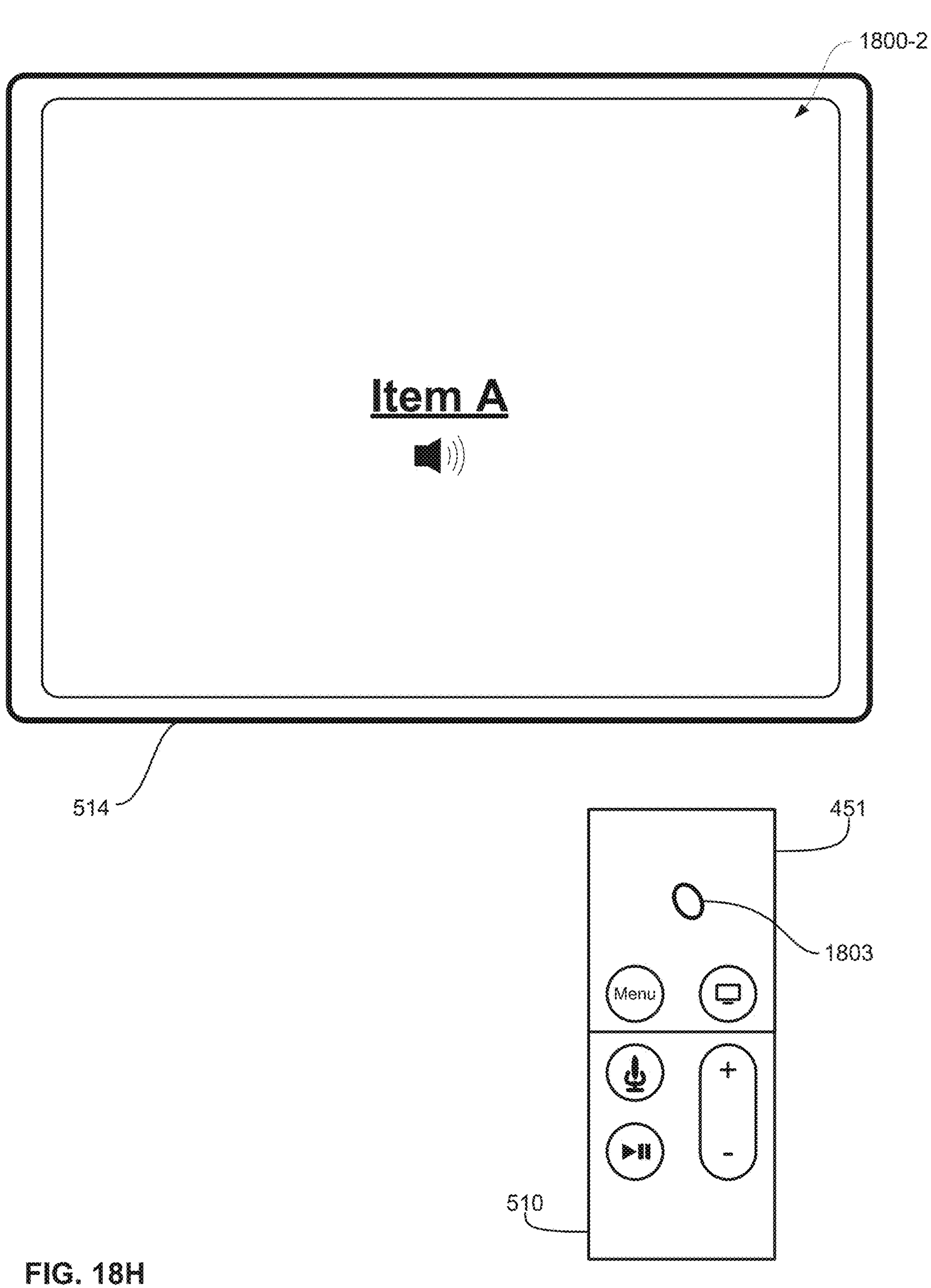

In FIG. 18F, a user input 1803 corresponding to a rightward navigation is received while device 500 is in scrubbing mode. In some embodiments, in response to the user input, scrubber bar 1804 indicates that the user has moved the scrubbing location forwards in the content item. In some embodiments, thumbnail 1808 is updated to move with the movement of the scrubber and displays a thumbnail of the current scrubbing position. In some embodiments, while the user is scrubbing (e.g., moving the scrubber bar "cursor", the playback of the content item is not moved forwards or backwards in accordance with the user's navigational inputs and is optionally paused or optionally continues playback at its original playback position. In FIG. 18G, a user input 1803 corresponding to a selection input is received while device 500 is in a scrubbing mode and the scrubbing position has moved forwards in the content item. In some embodiments, in response to the user input, playback of Item A is moved to the scrubbing position selected by the user (e.g., position 1:30 of Item A), as shown in FIG. 18H. In some embodiments, in response to the user input selecting the playback position, scrubber bar 1804 is dismissed and user interface 1800-2 returns to playback without any elements overlaid over the content.

Figure 18I:
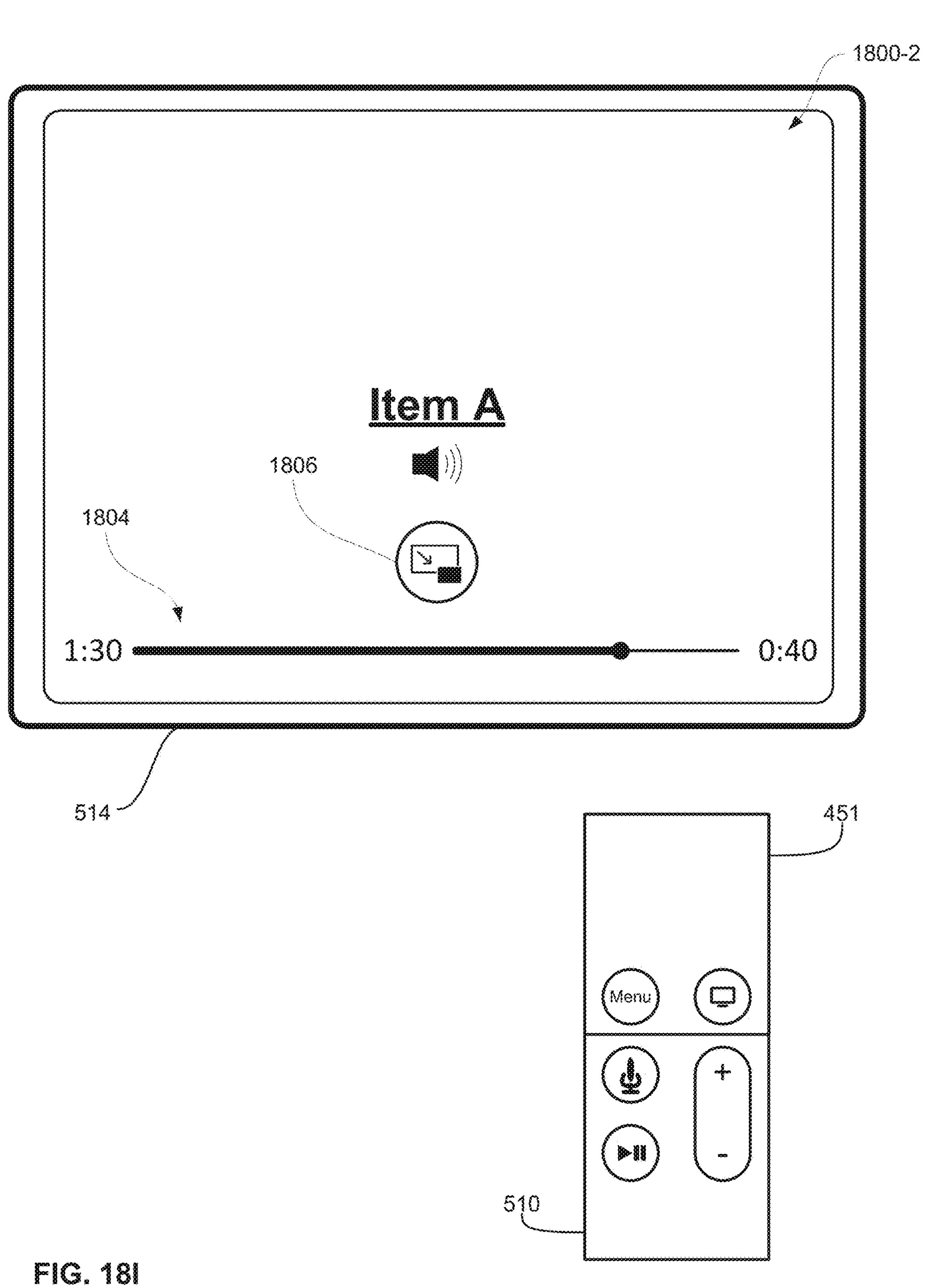

In FIG. 18H, contact 1803 is detected on the touch-sensitive surface 451 of remote control device 510. In some embodiments, contact 1803 is a continued touch-down on the touch-sensitive surface 451 less than a threshold intensity (e.g., a touch-and-hold without clicking on the touch-sensitive surface 451). In some embodiments, in response to the user input, device 500 displays scrubber bar 1804 and selectable option 1806 overlaid over the content currently being displayed on user interface 1800-2, as shown in FIG. 18I.

Figure 18J:
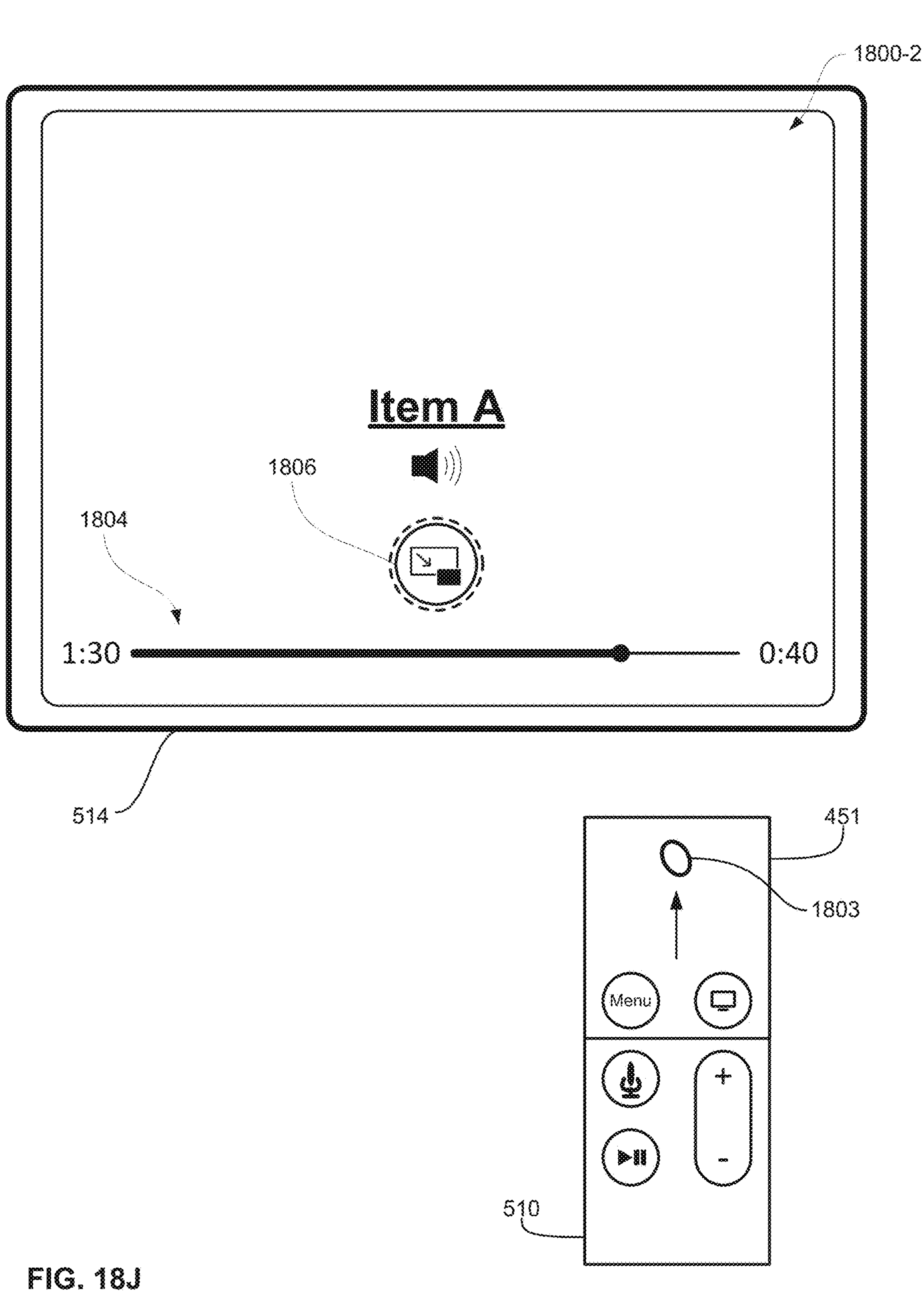
Figure 18K:
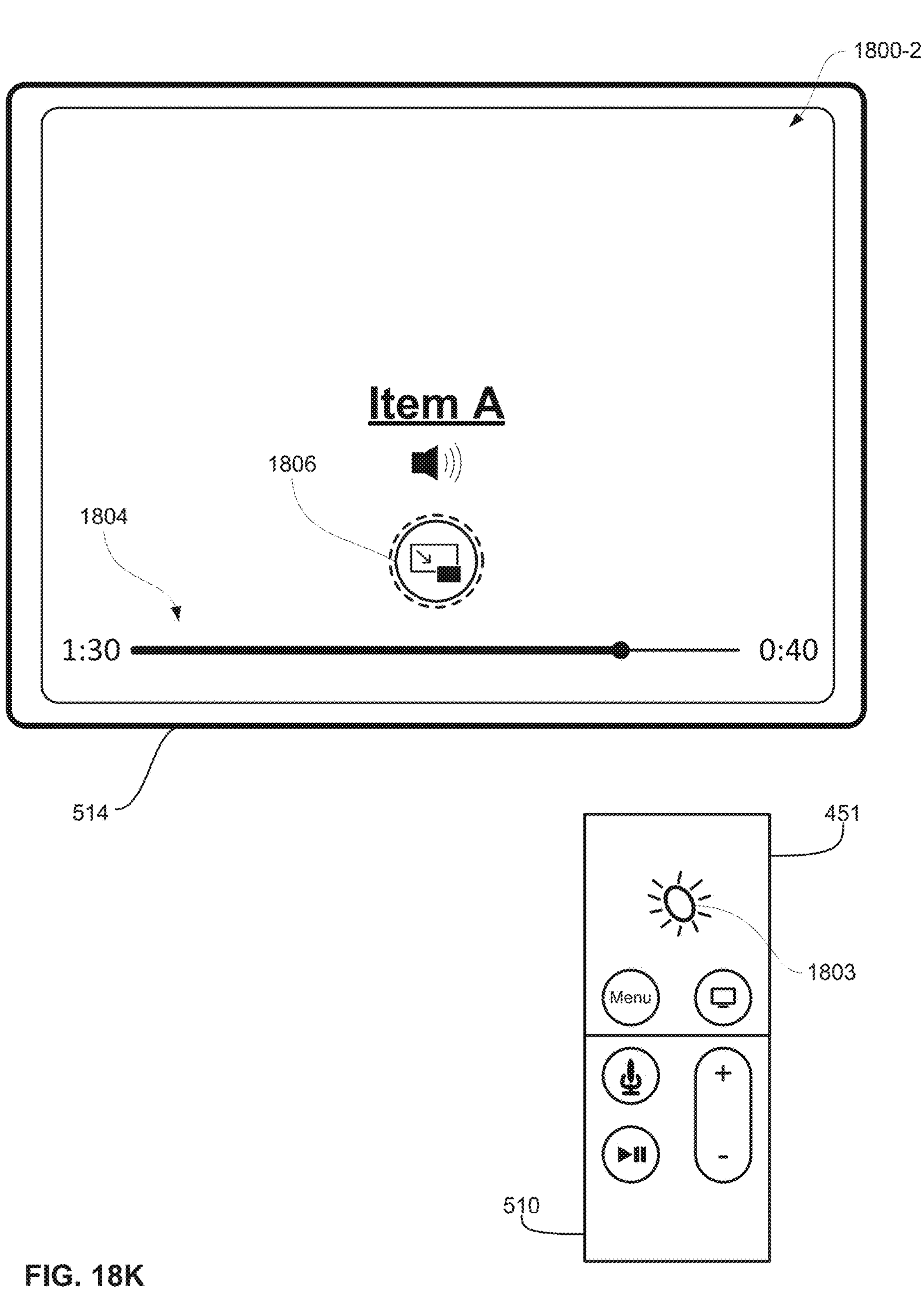
Figure 18L:
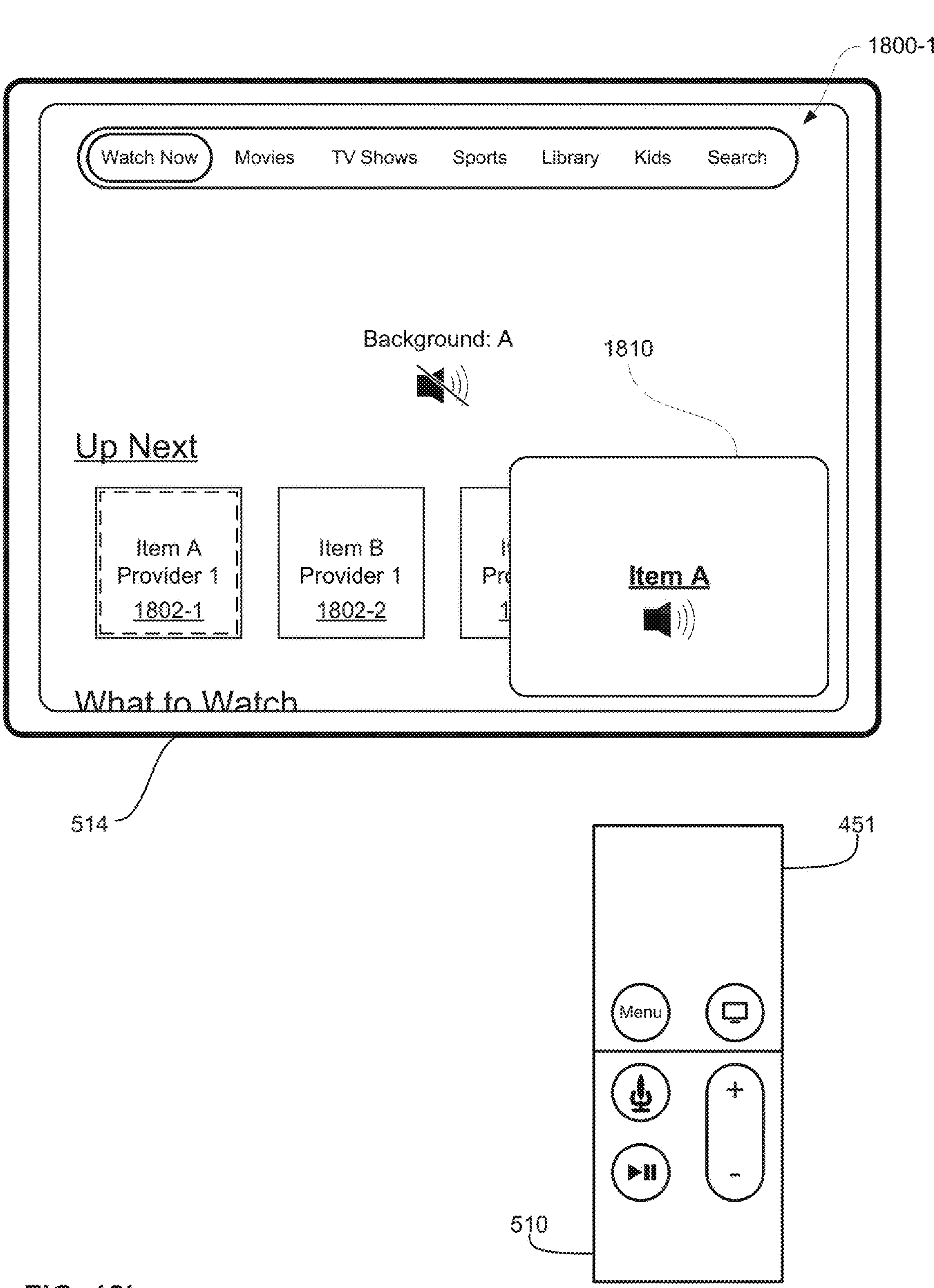

In FIG. 18J, while the device is not in scrubbing mode, user input 1803 corresponding to an upward swipe (e.g., upward navigation) is received. In some embodiments, in response to the user input, focus is moved to selectable option 1806. In FIG. 18K, user input 1803 corresponding to a selection input is received while selectable option 1806 has a focus. In some embodiments, in response to the user input, device 500 enters into picture-in-picture mode, as shown in FIG. 18L. In some embodiments, when device 500 enters into picture-in-picture mode, device 500 displays picture-in-picture overlay 1810 at a respective position on the display. In some embodiments, the position is the bottom-right corner, the top-right corner, the top-left corner, or the bottom-left corner. In some embodiments, the picture-in-picture overlay 1810 continues playback of Item A and Item A is scaled to the size of picture-in-picture overlay 1810. In some embodiments, device 500 replaces display of user interface 1800-2 with display of user interface 1800-1 corresponding to the user interface that was displayed before user interface 1800-2 was displayed (e.g., before content playback began). In some embodiments, device 500 displays a home screen user interface (e.g., as opposed to user interface 1800-1). In some embodiments, user interface 1800-1 is displayed below picture-in-picture overlay 1810 (e.g., picture-in-picture overlay 1810 is displayed over user interface 1800-1). For the sake of clarity, the user interface beneath the picture-in-picture overlay 1810 (e.g., the user interface that is not the picture-in-picture overlay 1810) will hereinafter also be referred to as the primary display and the picture-in-picture overlay 1810 will also be referred to as the PIP display.

Figure 18M:
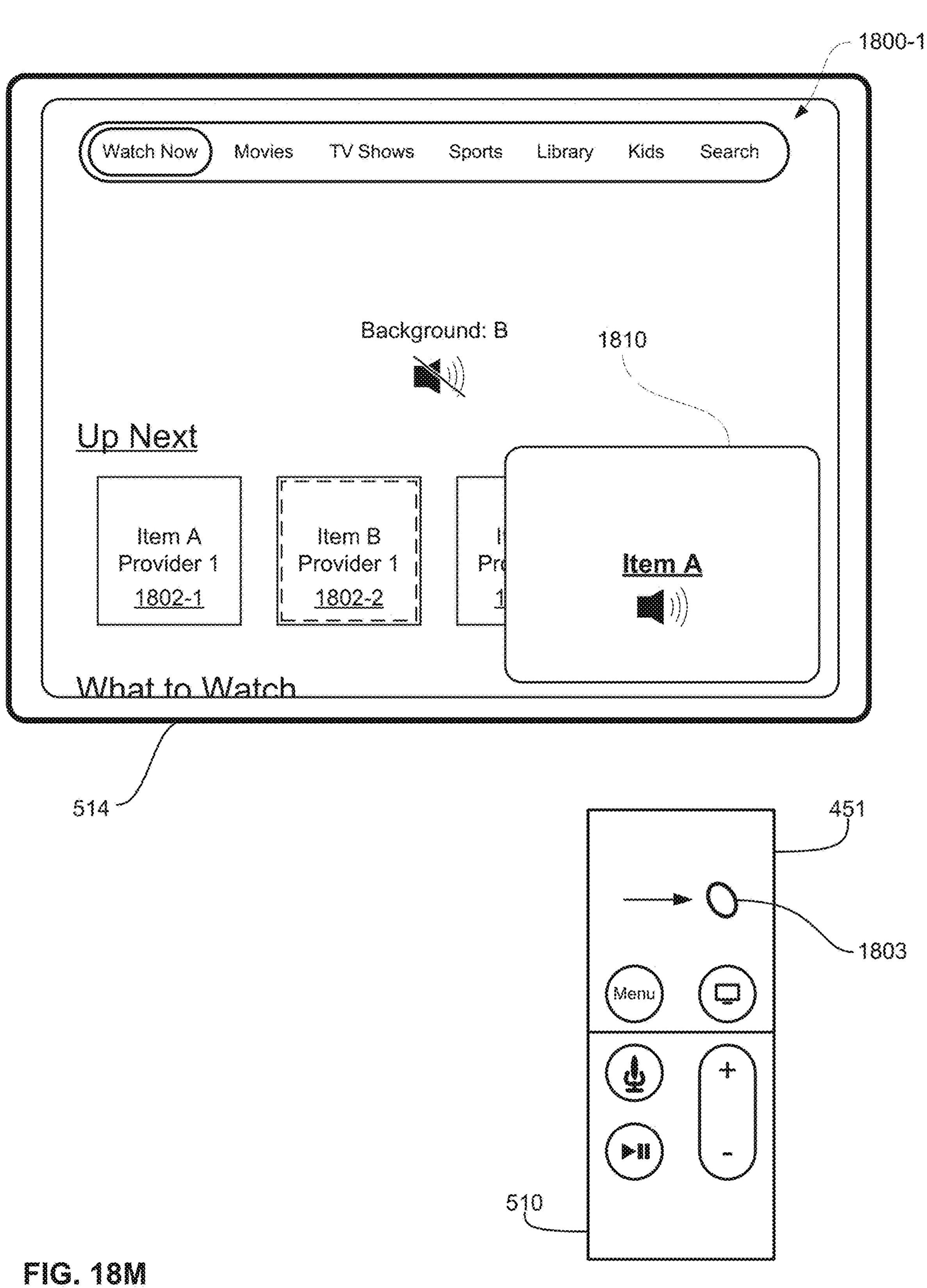

As shown in FIG. 18L, representation 1802-1 on the primary display has a current focus. Thus, the primary display (e.g., as opposed to the PIP display) has the focus such that user interactions with the device are interactions with items on the primary display and not with the PIP display. For example, in FIG. 18M, user input 1803 corresponding to a rightward navigation is received. In some embodiments, in response to the user input, focus is moved from representation 1802-1 to representation 1802-2 on the primary display. In some embodiments, no actions are performed with respect to the PIP display and the PIP display continues playback of Item A. In some embodiments, as shown in FIG. 18M, while the primary display is not currently playing any content and in particular, not playing any audio content, the audio output of the PIP display is outputted by device 500. Thus, in some embodiments, the user is able to view and hear the playback of Item A when the primary display is not also displaying content.

In FIG. 18, user input 1803 corresponding to a further rightward navigation is received. In some embodiments, in response to the user input, focus is moved from representation 1802-2 to representation 1802-3. In some embodiments, because representation 1802-3 is partially obscured by picture-in-picture overlay 1810, the picture-in-picture overlay 1810 is moved from its original position to a position that no longer obscures the item that has focus (e.g., representation 1802-3). In some embodiments, if the item that receives focus is partially obscured or within a threshold distance of picture-in-picture overlay 1810 (e.g., 50 pixels, 100 pixels, 200 pixels, 1/32 of the display, 1/16 of the display, etc.), then picture-in-picture overlay 1810 is moved to allow the user to better see the item receiving focus.

Figure 18N:
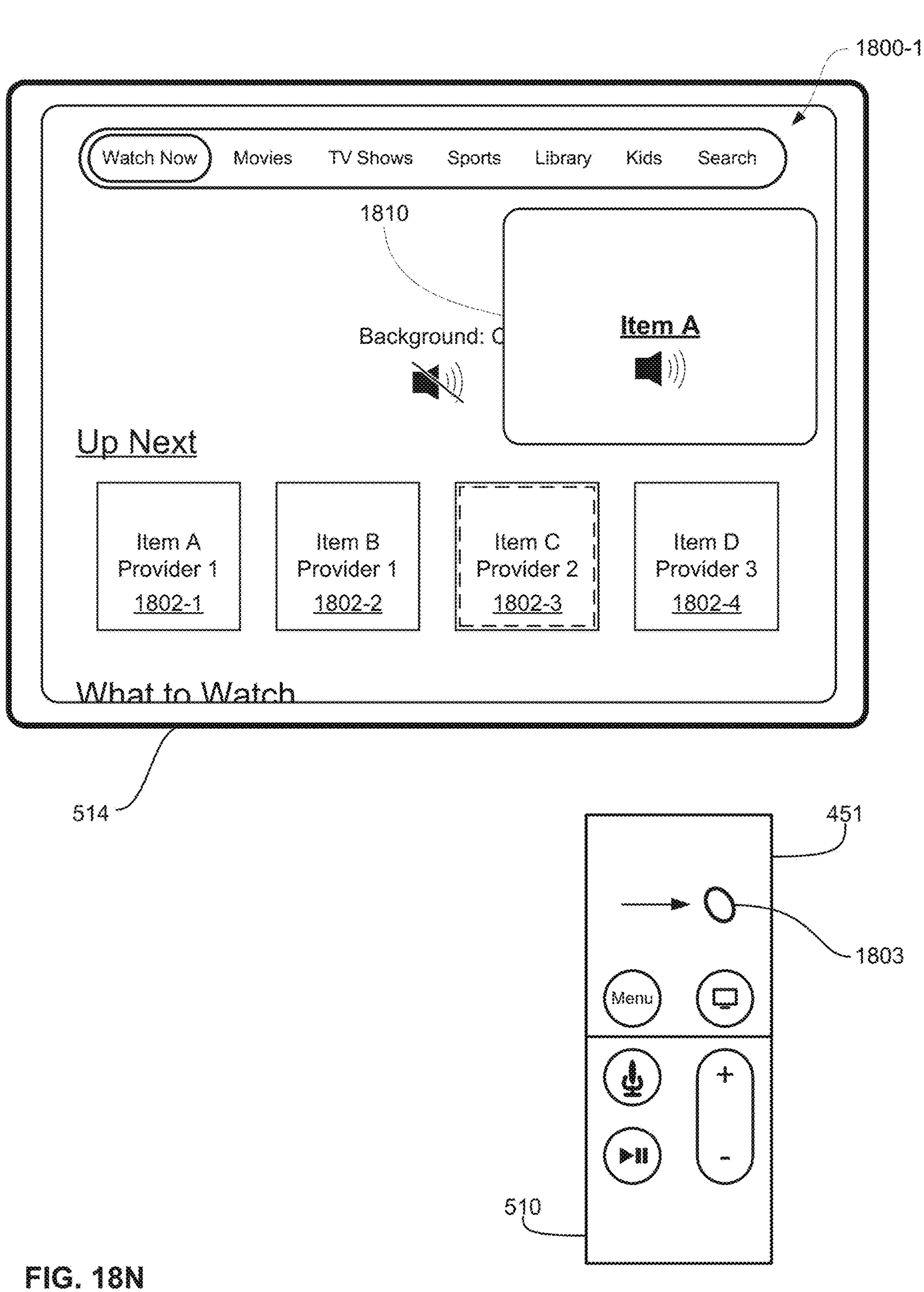
Figure 18O:
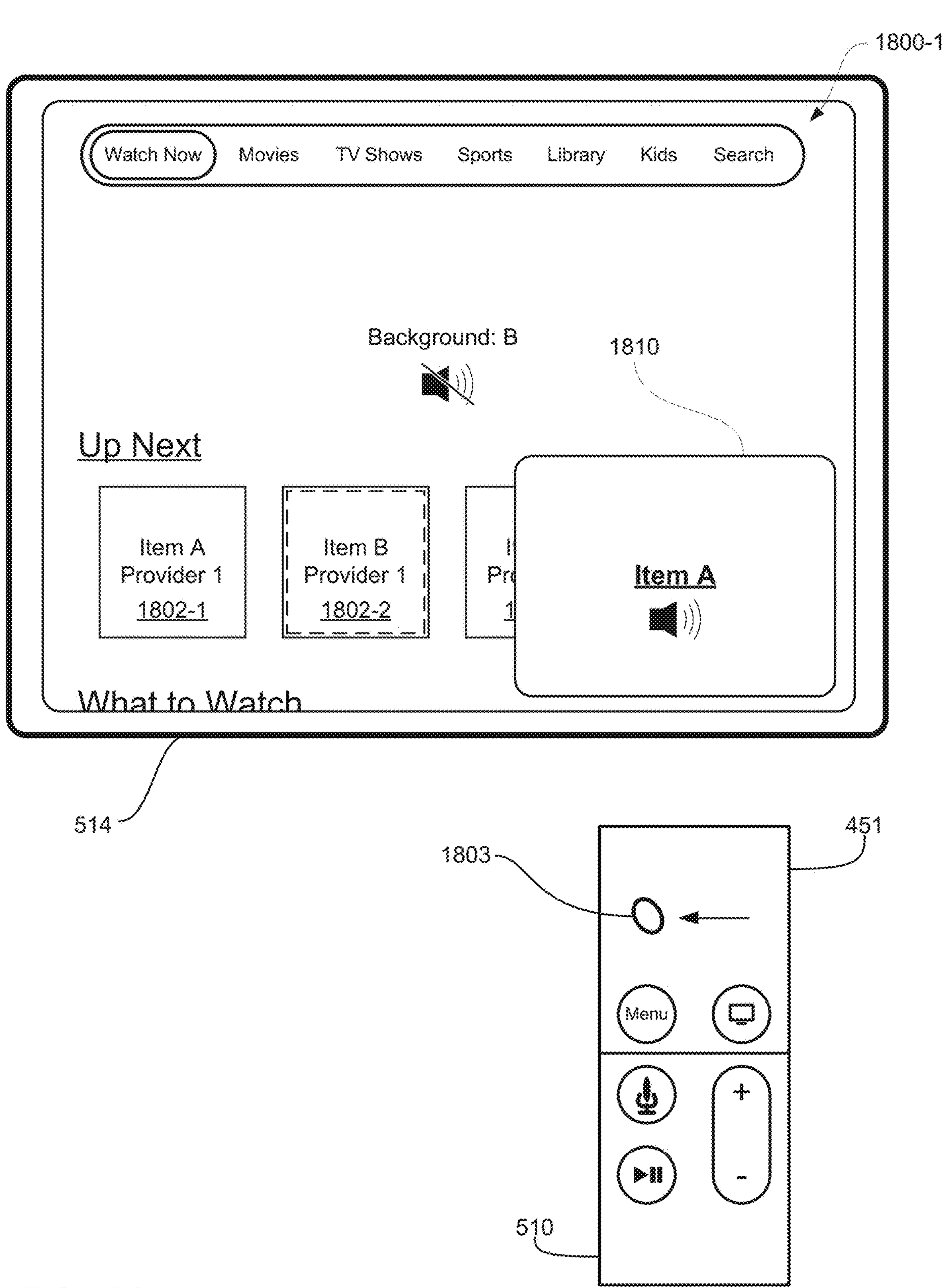

In FIG. 18O, user input 1803 corresponding to a leftward navigation is received. In some embodiments, in response to the user input, focus is moved from representation 1802-3 to representation 1802-2, as shown in FIG. 18O. In some embodiments, because the focus has moved to an item that is not obscured by (e.g., and optionally not within the threshold distance of) picture-in-picture overlay 1810, picture-in-picture overlay 1810 is automatically moved back to its original position, as shown in FIG. 18O.

Figure 18P:
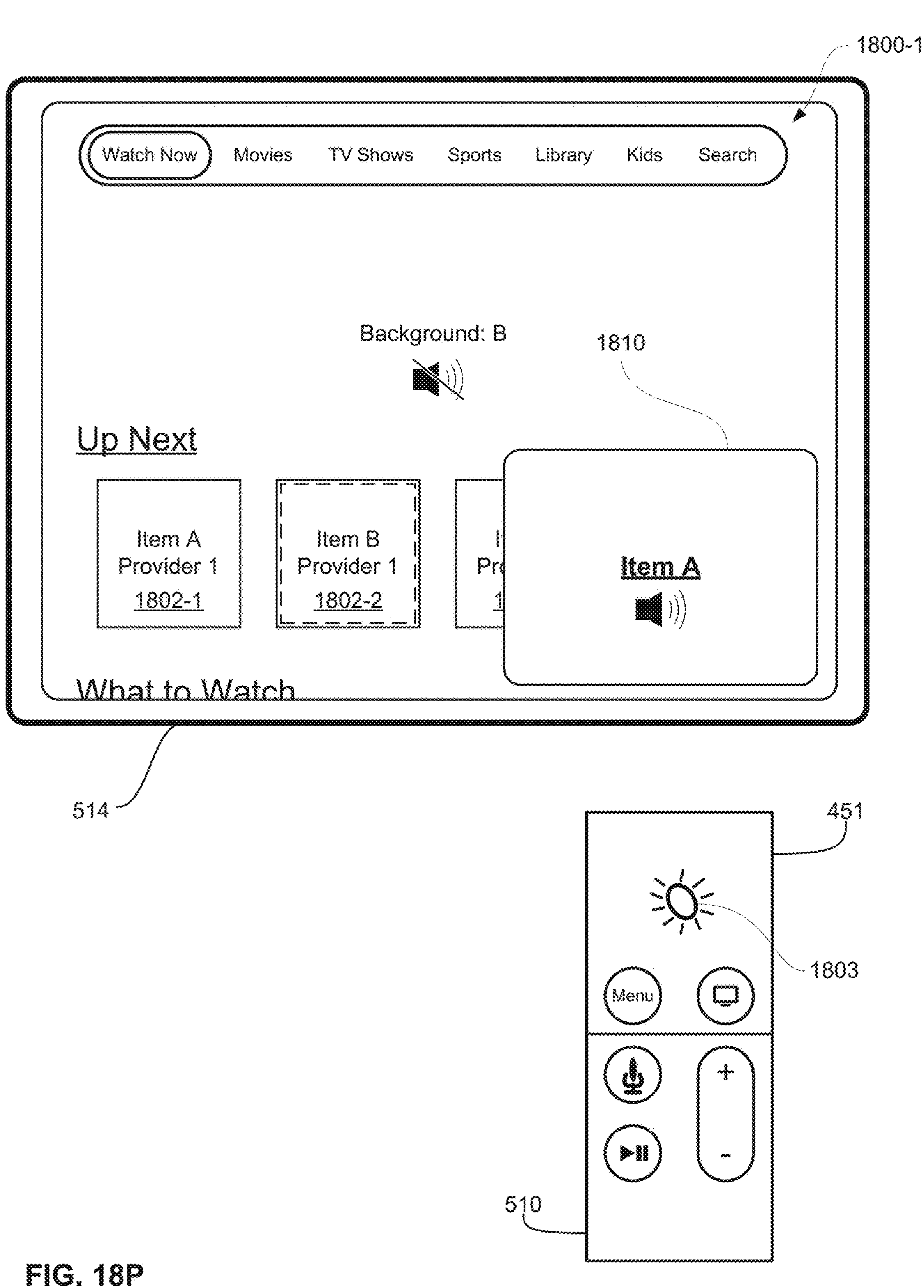
Figure 18Q:
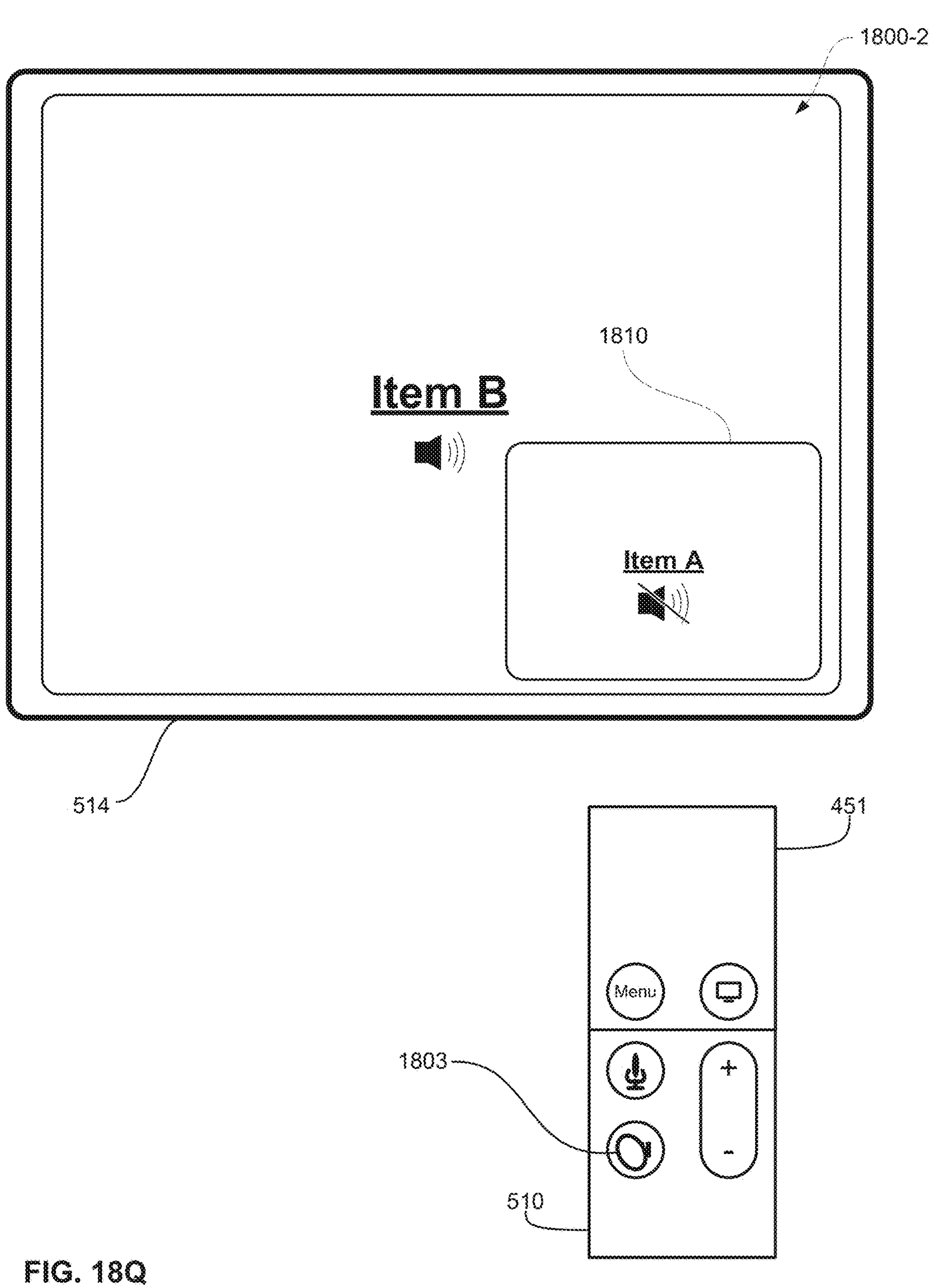

In FIG. 18P, user input 1803 corresponding to a selection input is received when representation 1802-2 corresponding to Item B has a focus. In some embodiments, in response to the user input, device 500 replaces display of user interface 1800-1 on the primary display with user interface 1800-2 corresponding to a content playback user interface, as shown in FIG. 18Q. In some embodiments, user interface 1800-2 is displaying (e.g., playing back) Item B. In some embodiments, as shown in FIG. 18Q, picture-in-picture overlay 1810 is maintained on the display and continues to be displayed overlaid over the primary display. In some embodiments, the audio from the primary display takes precedent over the audio from the PIP display. Thus, as shown in FIG. 18Q, because the primary display is displaying Item B and includes an audio component, device 500 outputs the audio from the primary display and mutes the audio from the PIP display.

However, in some embodiments, if the primary display is not displaying audio, then device 500 will output the audio from the PIP display. For example, in FIG. 18Q, a user input 1803 corresponding to a selection of the play/pause button is received. In response to the user input, playback of Item B on the primary display is paused (e.g., as opposed to the playback of Item A in the PIP display). In some embodiments, because the primary display is no longer outputting audio, device 500 un-mutes the PIP display and resumes outputting audio from the PIP display. In some embodiments, the PIP display is always muted and pausing the playback of the playback on the primary display does not cause device 500 to output the audio from the PIP display.

Figure 18R:
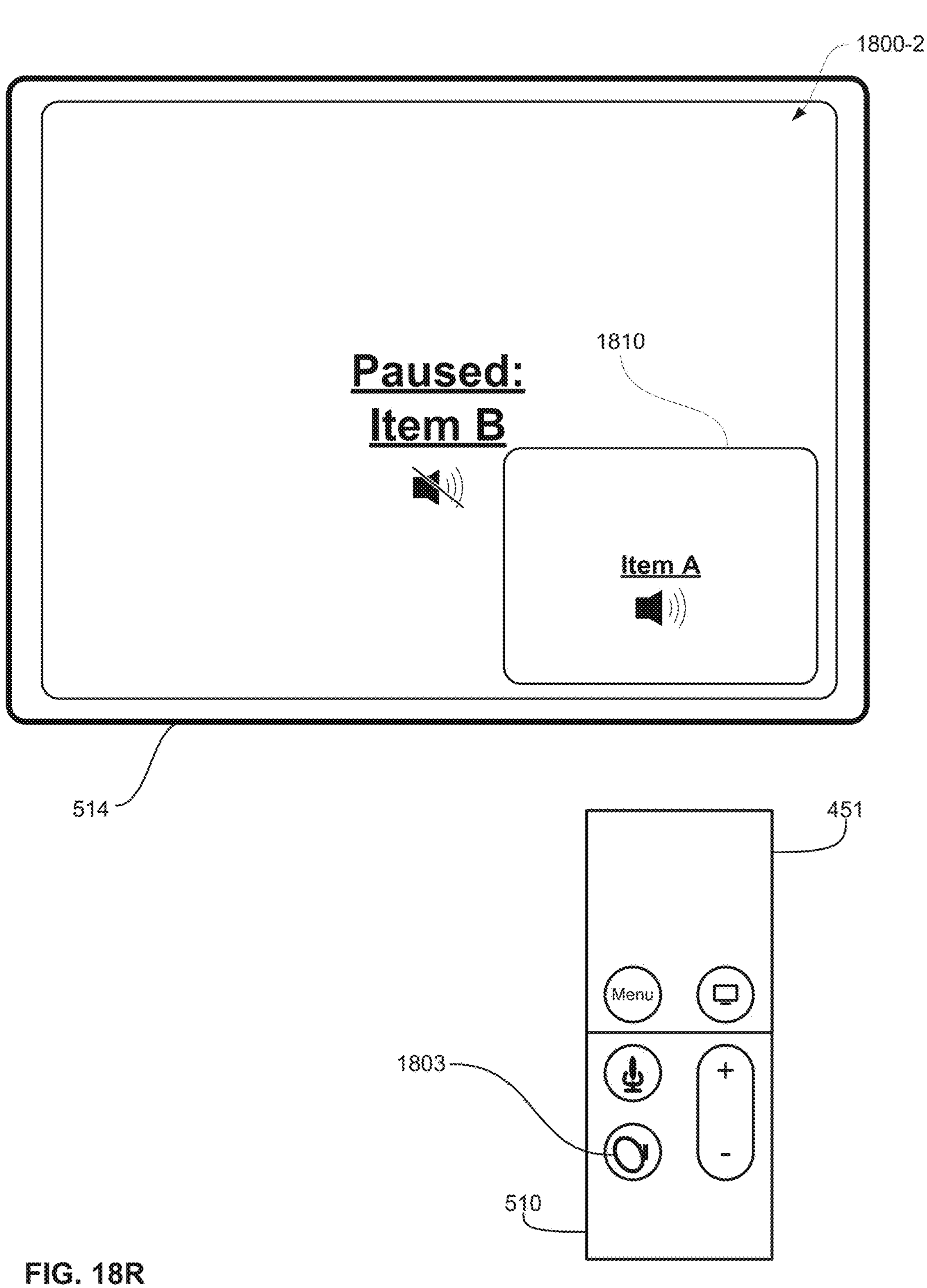
Figure 18S:
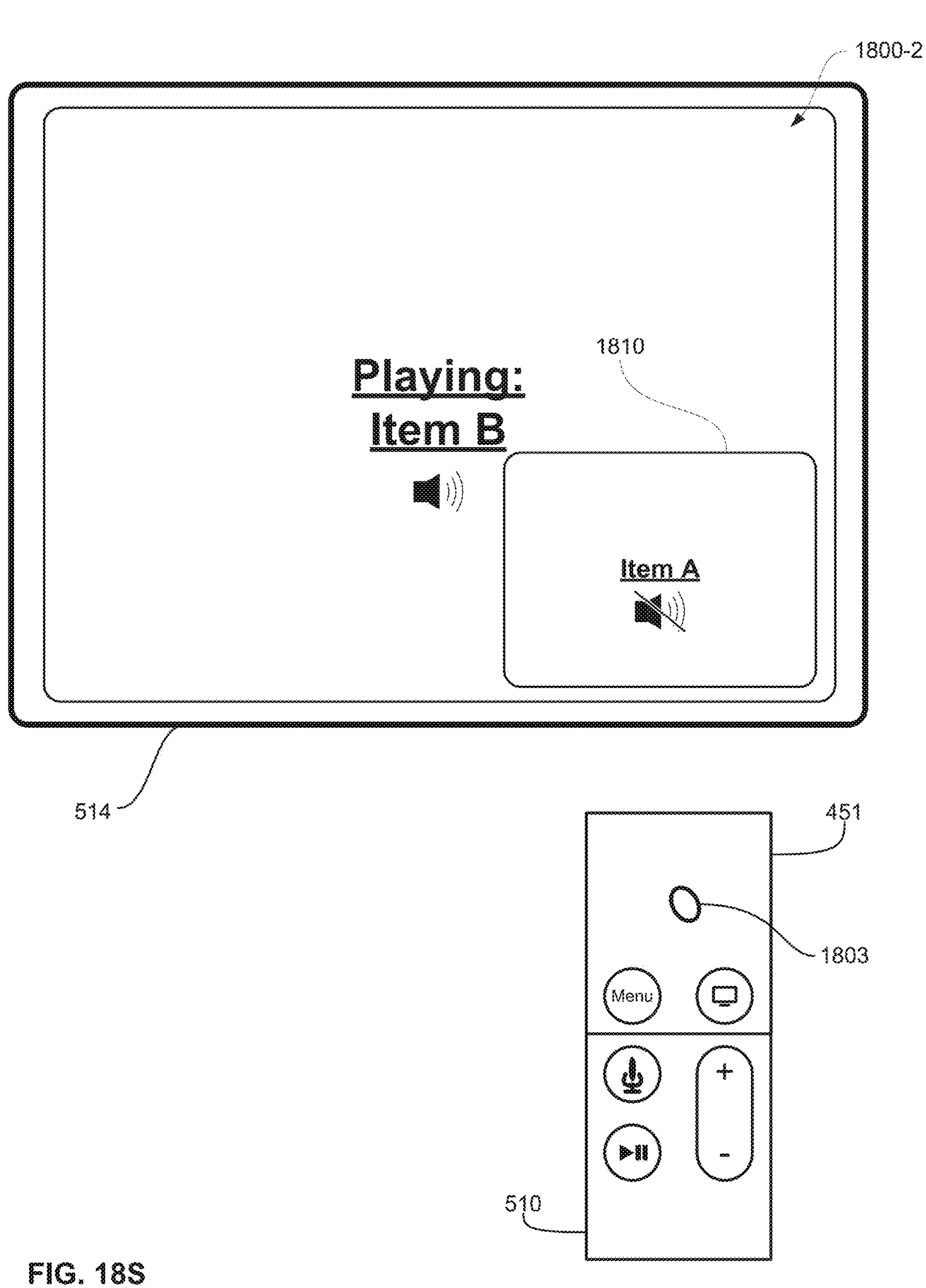

In FIG. 18R, user input 1803 corresponding to a further selection of the play/pause button is received. In response to the user input, device 500 resumes playback of Item B in the primary display and resumes output of audio from the primary display (e.g., and mutes the audio from the PIP display), as shown in FIG. 18S. Thus, in some embodiments, the user's inputs continue to interact with the primary display rather than the PIP display.

Figure 18T:
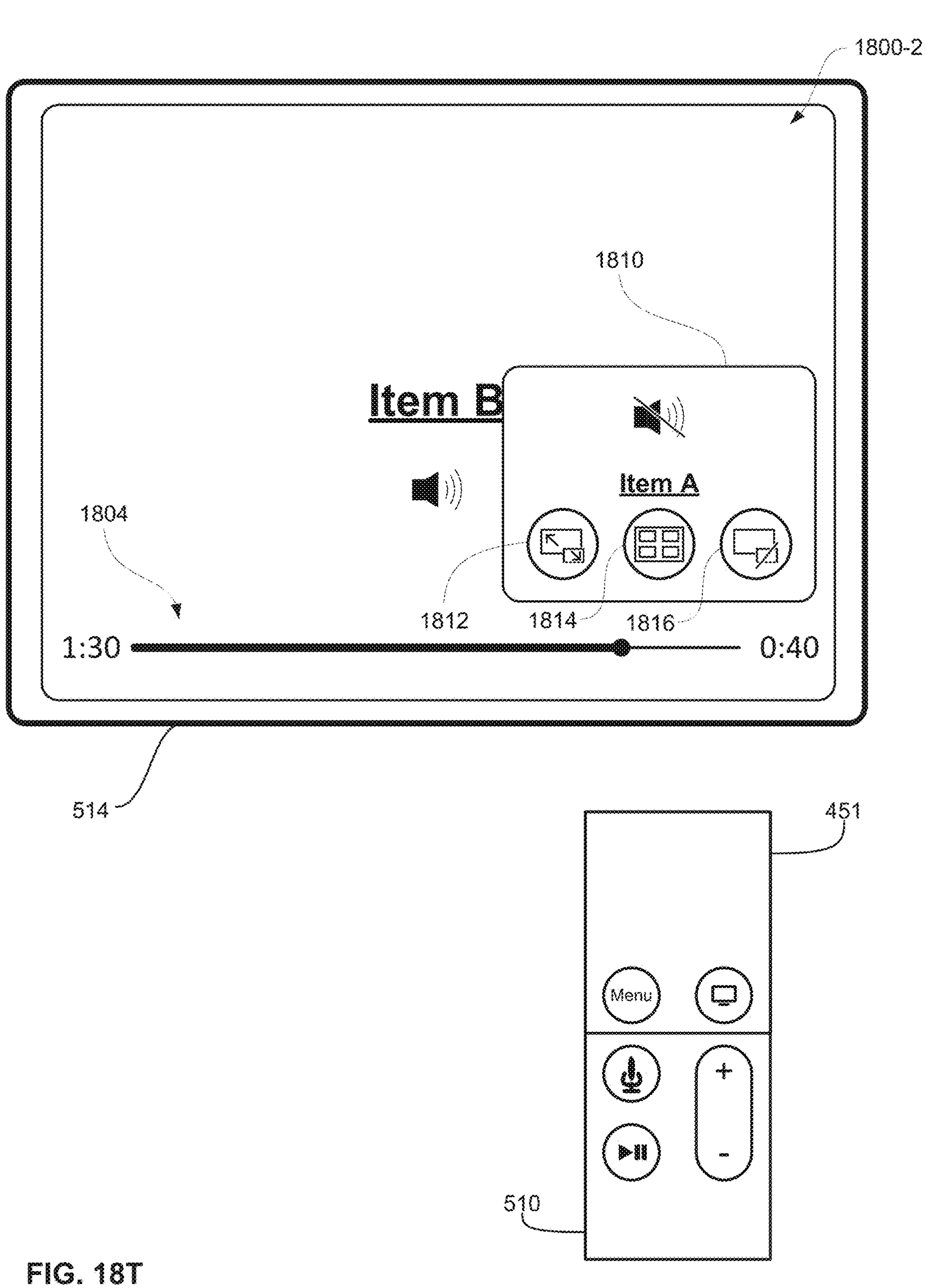

In FIG. 18S, contact 1803 is detected on the touch-sensitive surface 451 of remote control device 510. In some embodiments, contact 1803 is a continued touch-down on the touch-sensitive surface 451 less than a threshold intensity (e.g., a touch-and-hold without clicking on the touch-sensitive surface 451). In some embodiments, in response to the user input, device 500 displays scrubber bar 1804 overlaid over Item B on the primary display and selectable options 1812, 1814, and 1816 overlaid over the picture-in-picture overlay 1810, as shown in FIG. 18T. In some embodiments, picture-in-picture overlay 1810 is moved so as not to overlap with or otherwise obscure scrubber bar 1804. In some embodiments, device 500 does not display a selectable option for entering into picture-in-picture mode (e.g., because device 500 is already in picture-in-picture mode). In some embodiments, selectable options 1812, 1814, and 1816 are displayed overlaid over Item A in the picture-in-picture overlay 1810. In some embodiments, selectable options 1812, 1814, and 1816 are displayed outside of the picture-in-picture overlay 1810 (e.g., in the same or similar position as where selectable option 1806 was displayed). In some embodiments, selectable option 1812 is selectable to swap the display of content between the primary display and the PIP display (e.g., the PIP display now displays Item B and the primary display now displays Item A). In some embodiments, selectable option 1812 is selectable to move the picture-in-picture overlay 1810 (e.g., to another corner of the display in a counter-clockwise or clockwise direction). In some embodiments, selectable option 1816 is selectable to exit picture-in-picture mode and dismiss picture-in-picture overlay 1810.

In FIG. 18S, a user input 1803 corresponding to a rightward navigation is received while device 500 is not in scrubbing mode. In some embodiments, in response to the user input, selectable option 1812 receives a focus. In FIG. 18V, user input 1803 corresponding to a selection input is received while selectable option 1812 has a focus. In some embodiments, in response to the user input, playback of the content items in the primary display and the PIP display are swapped, as shown in FIG. 18W.

Figure 18U:
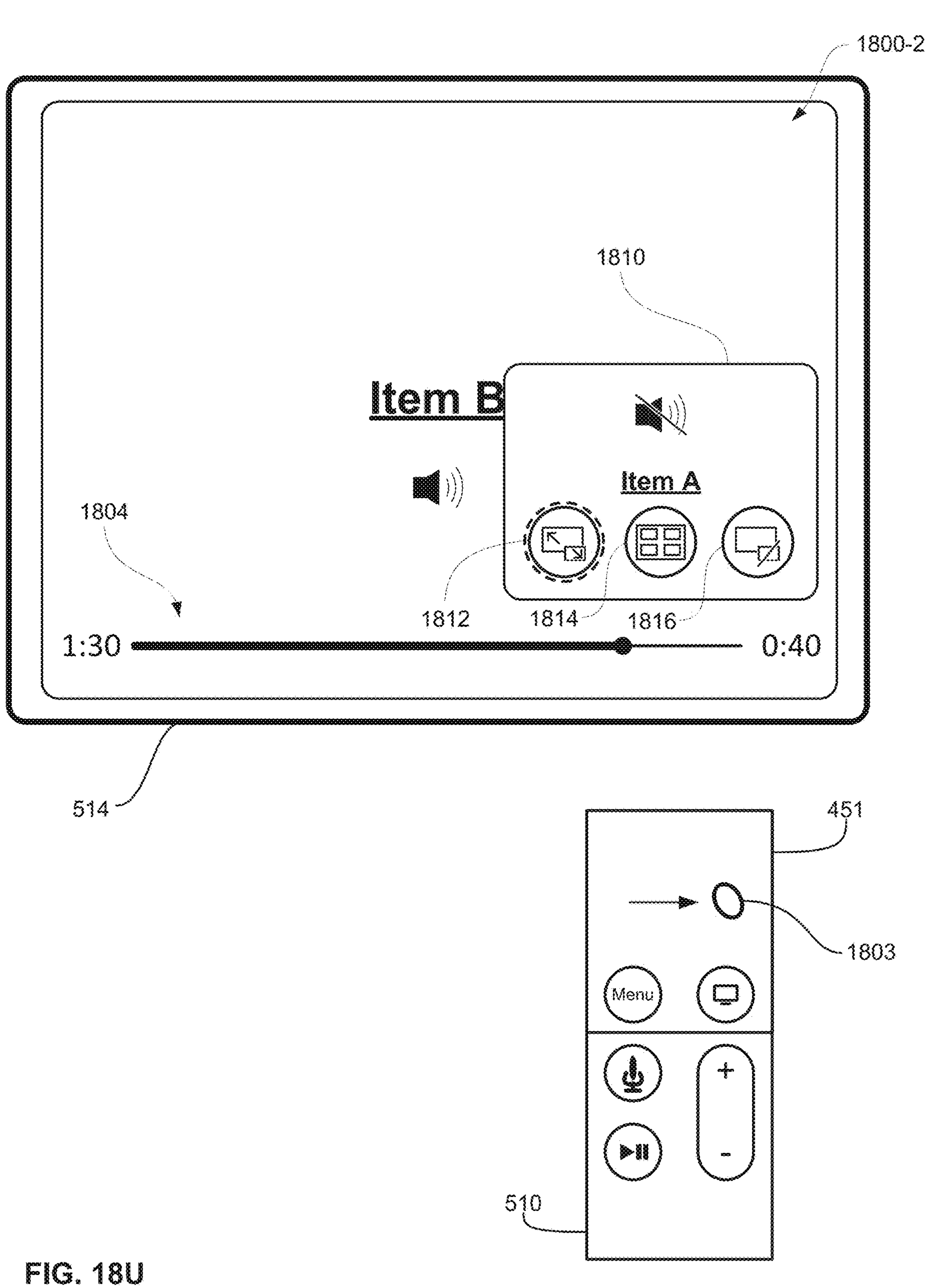
Figure 18V:
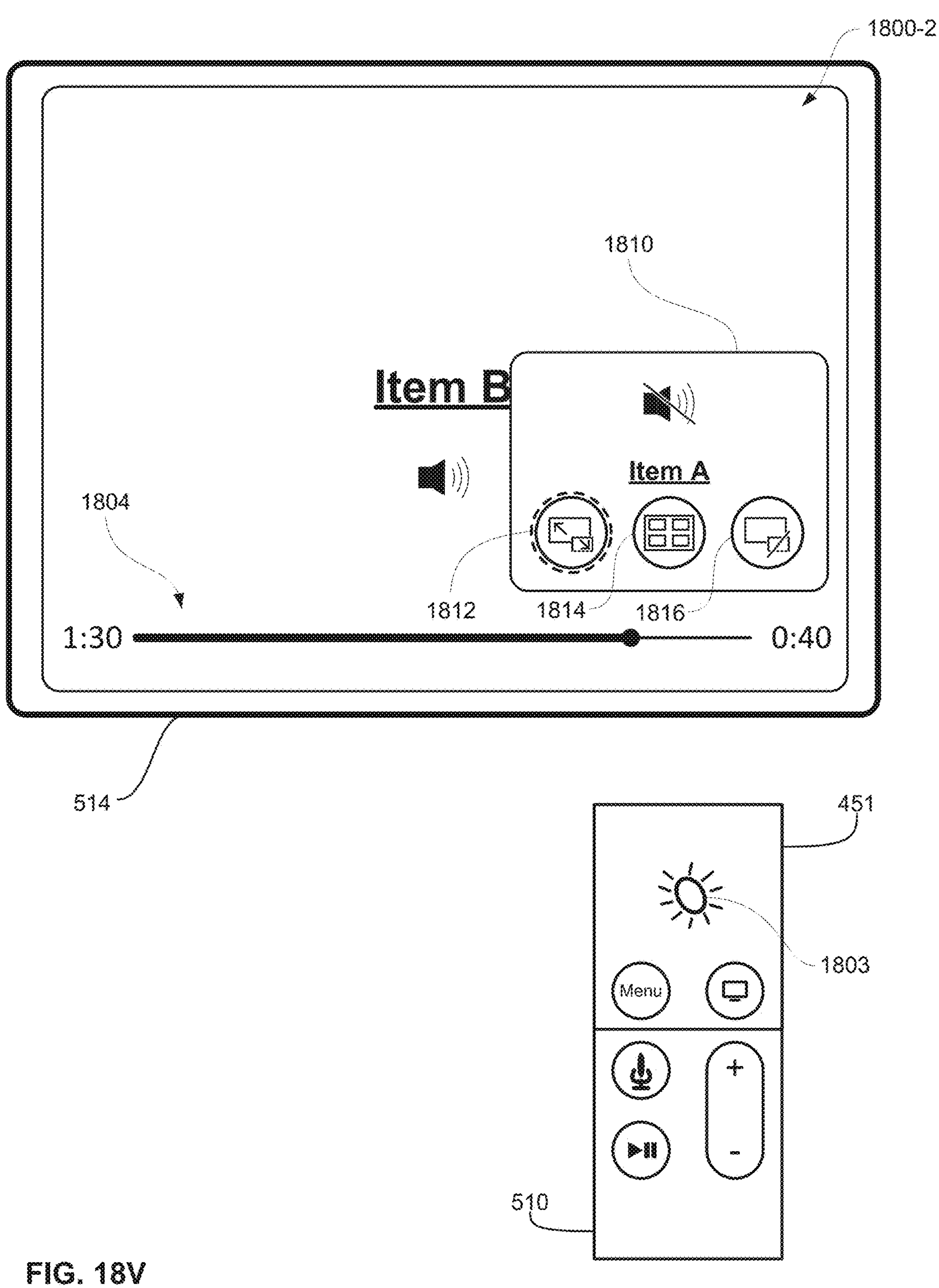
Figure 18W:
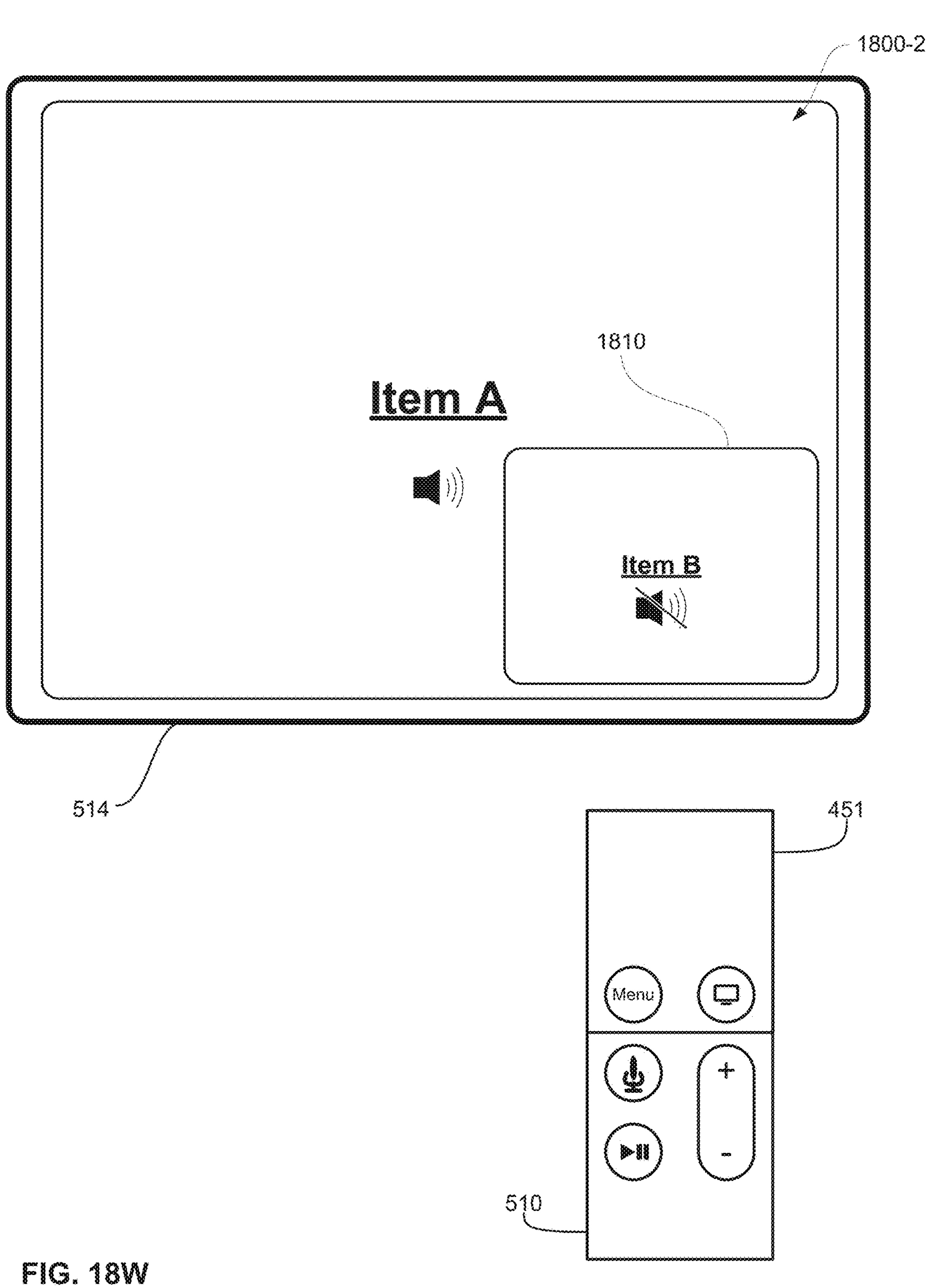
Figure 18X:
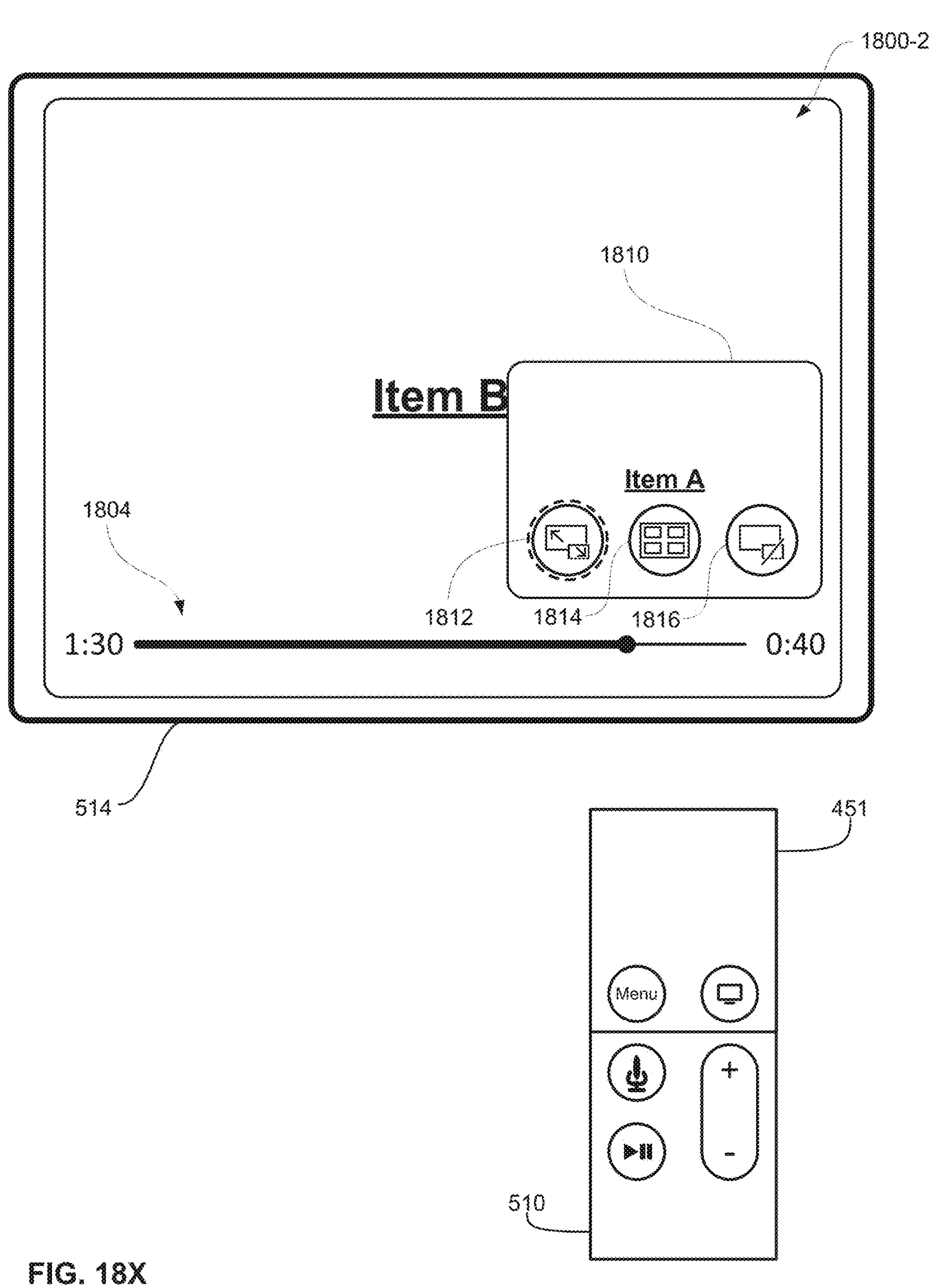
Figure 18Y:
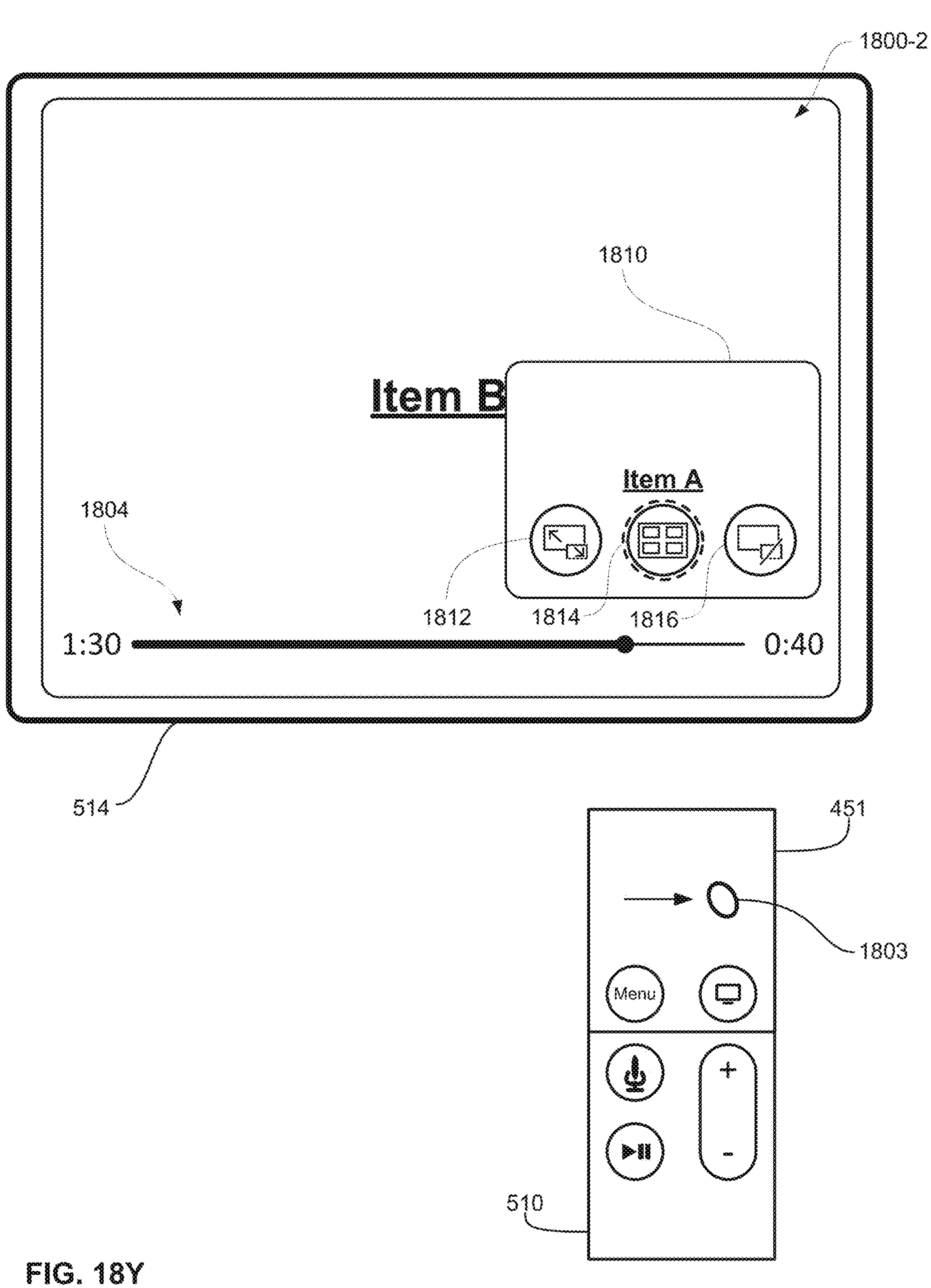

FIG. 18X displays an embodiment similar to FIG. 18V before playback of the content has swapped and while selectable options 1812, 1814, and 1816 are displayed and while selectable option 1812 has a focus. In FIG. 18Y, user input 1803 corresponding to a rightward navigation is received. In some embodiments, in response to the user input, the focus is moved from selectable option 1812 to selectable option 1814.

Figure 18Z:
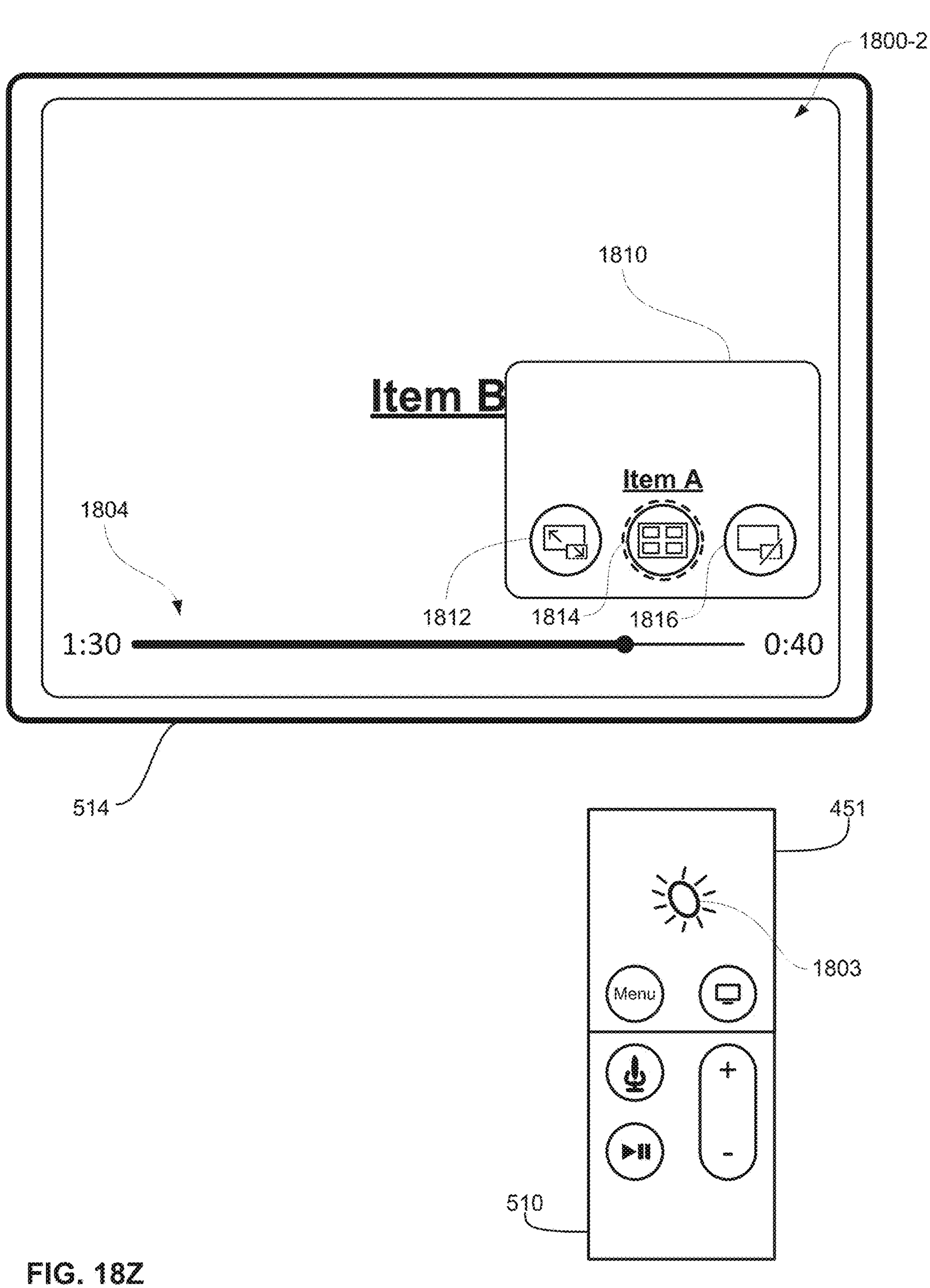
Figure 18A:
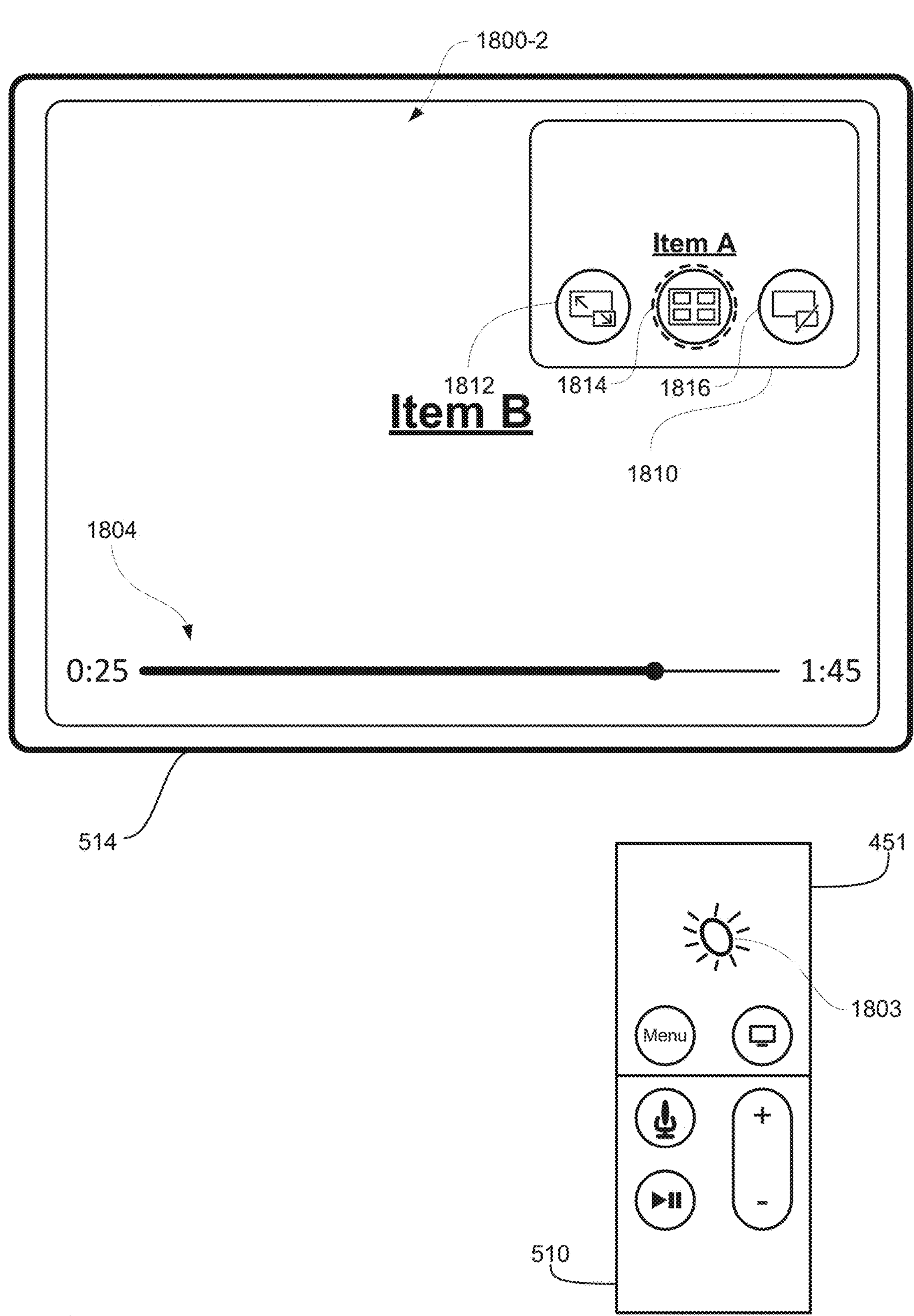
Figure 18B:
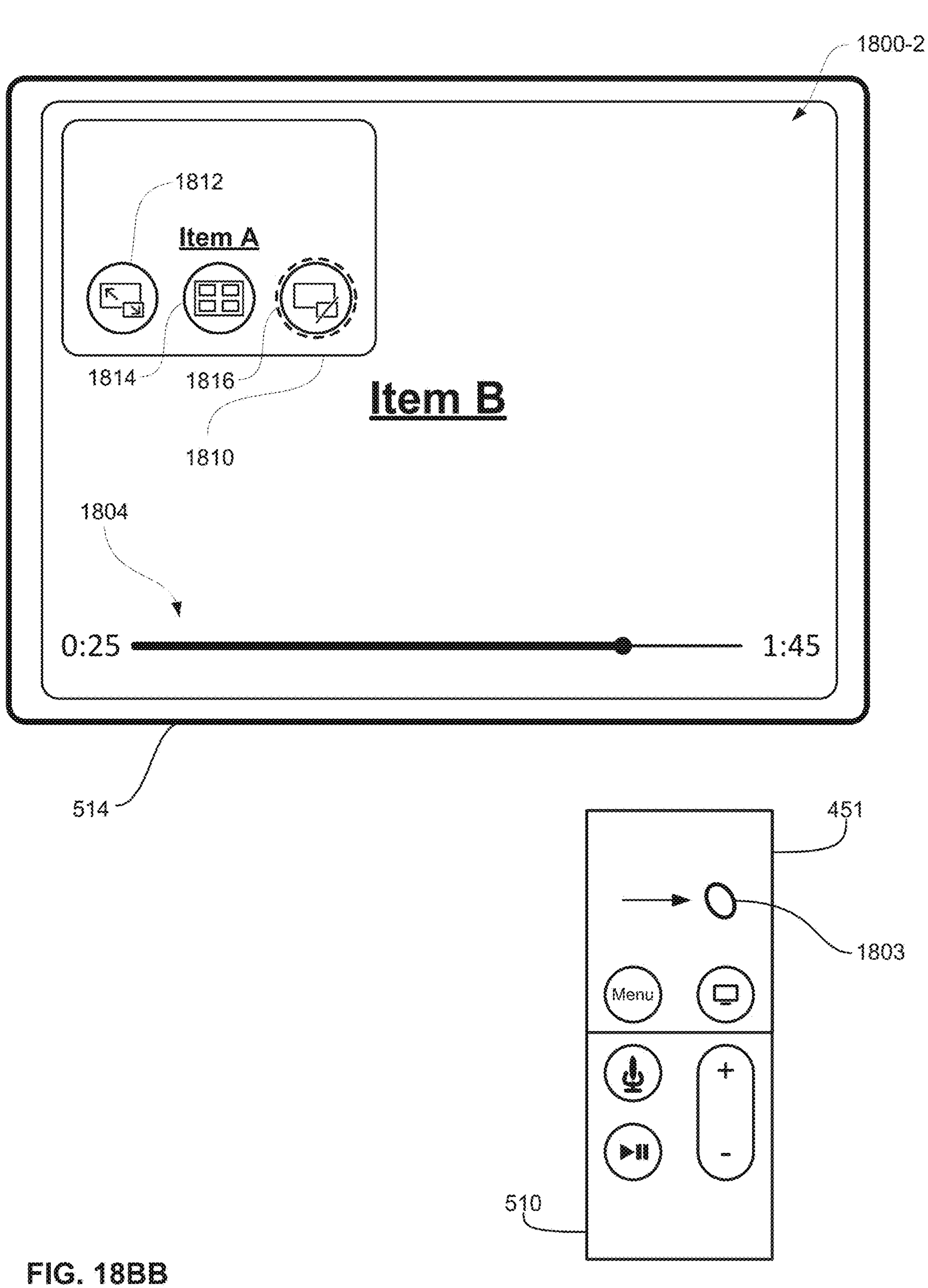
Figure 18C:
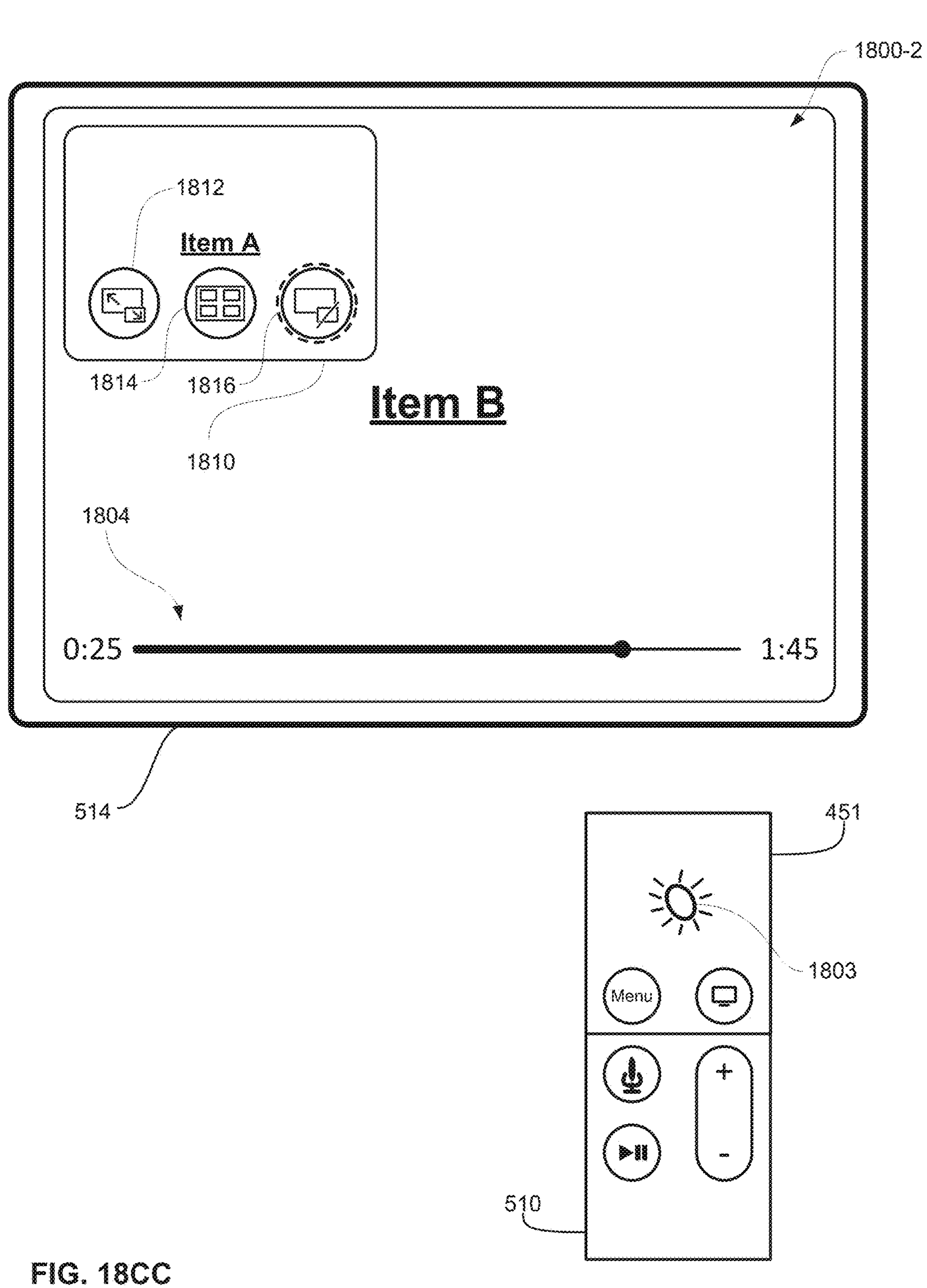
Figure 18D:
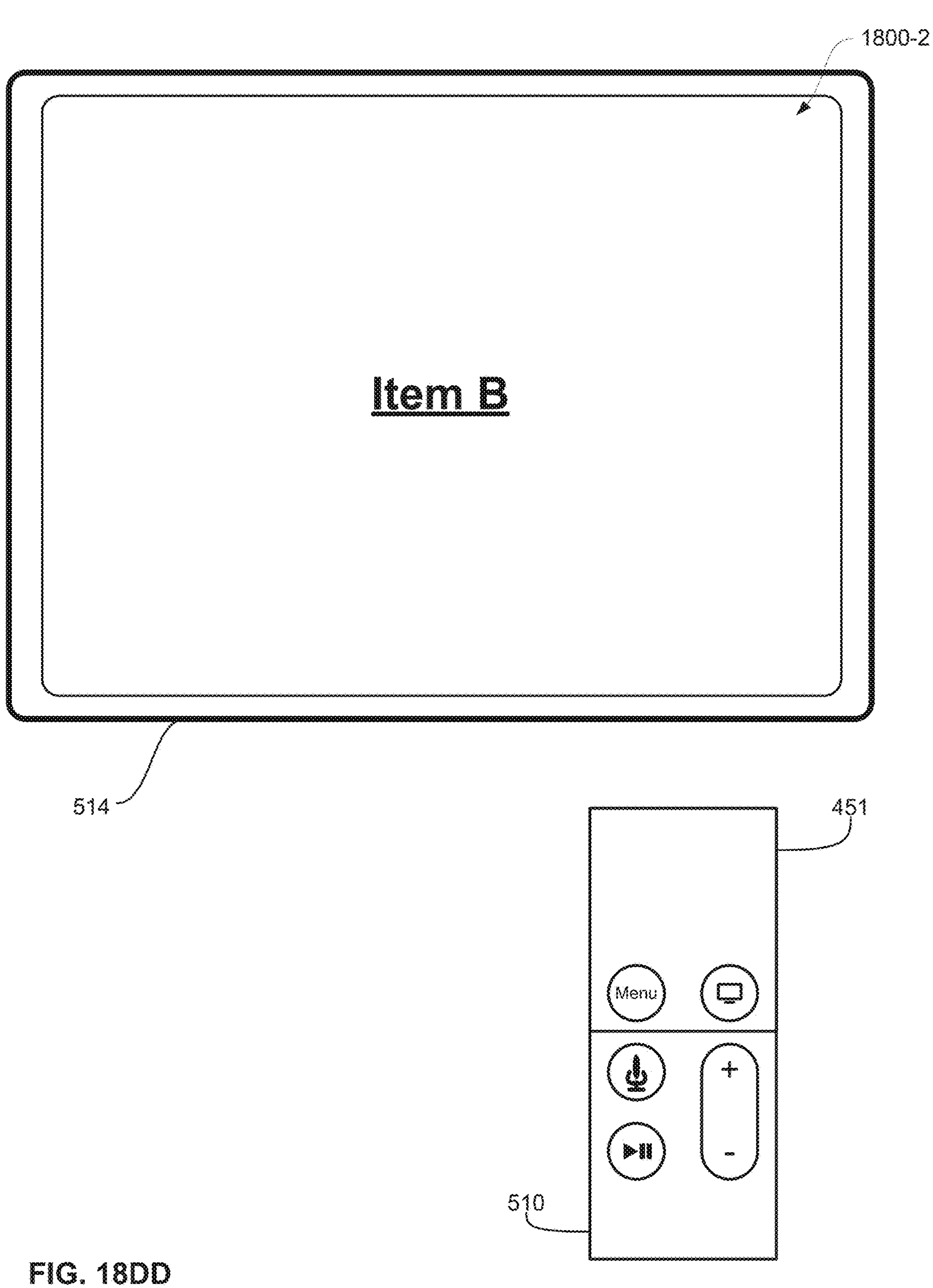
Figure 18E:
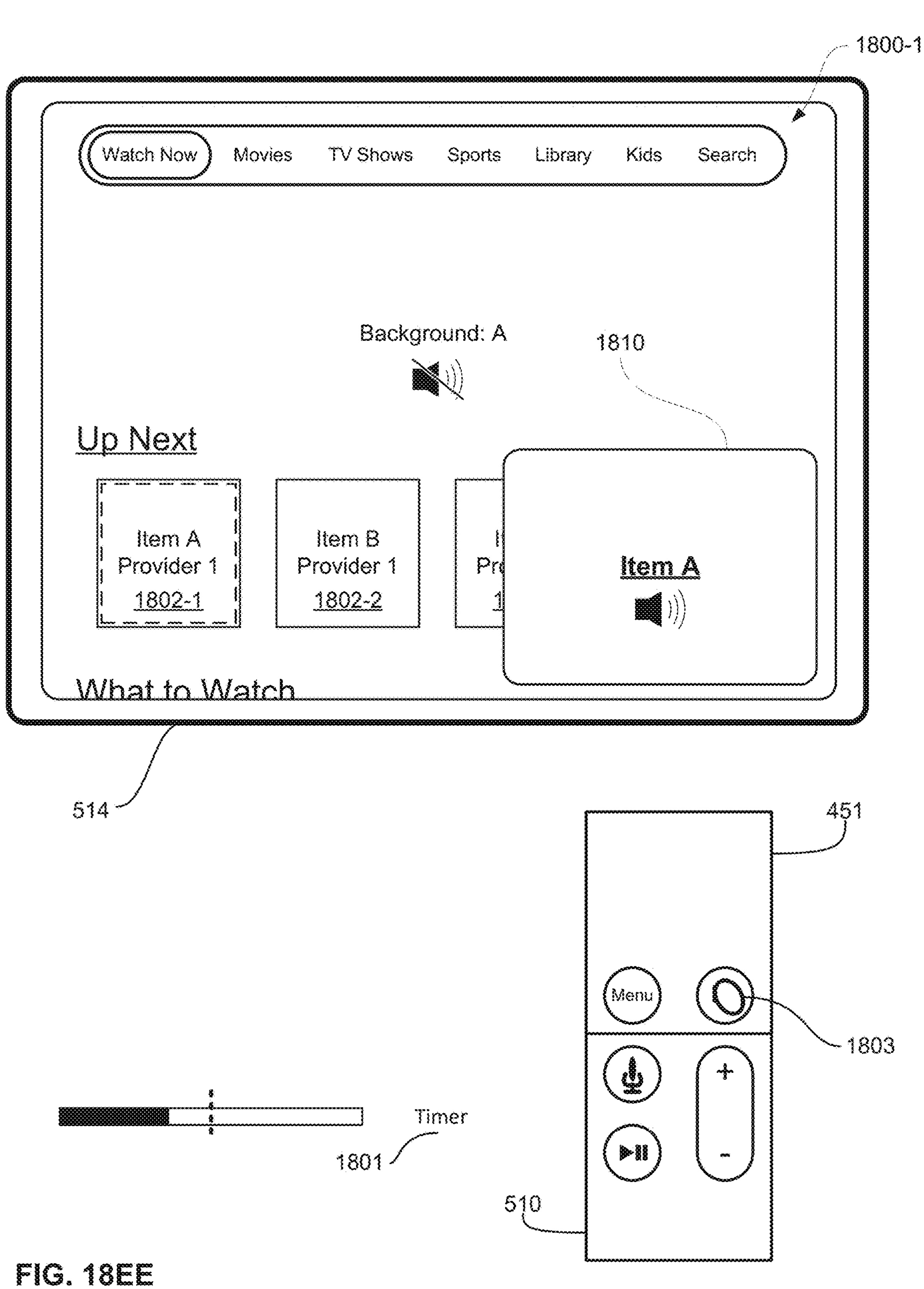
Figure 18F:
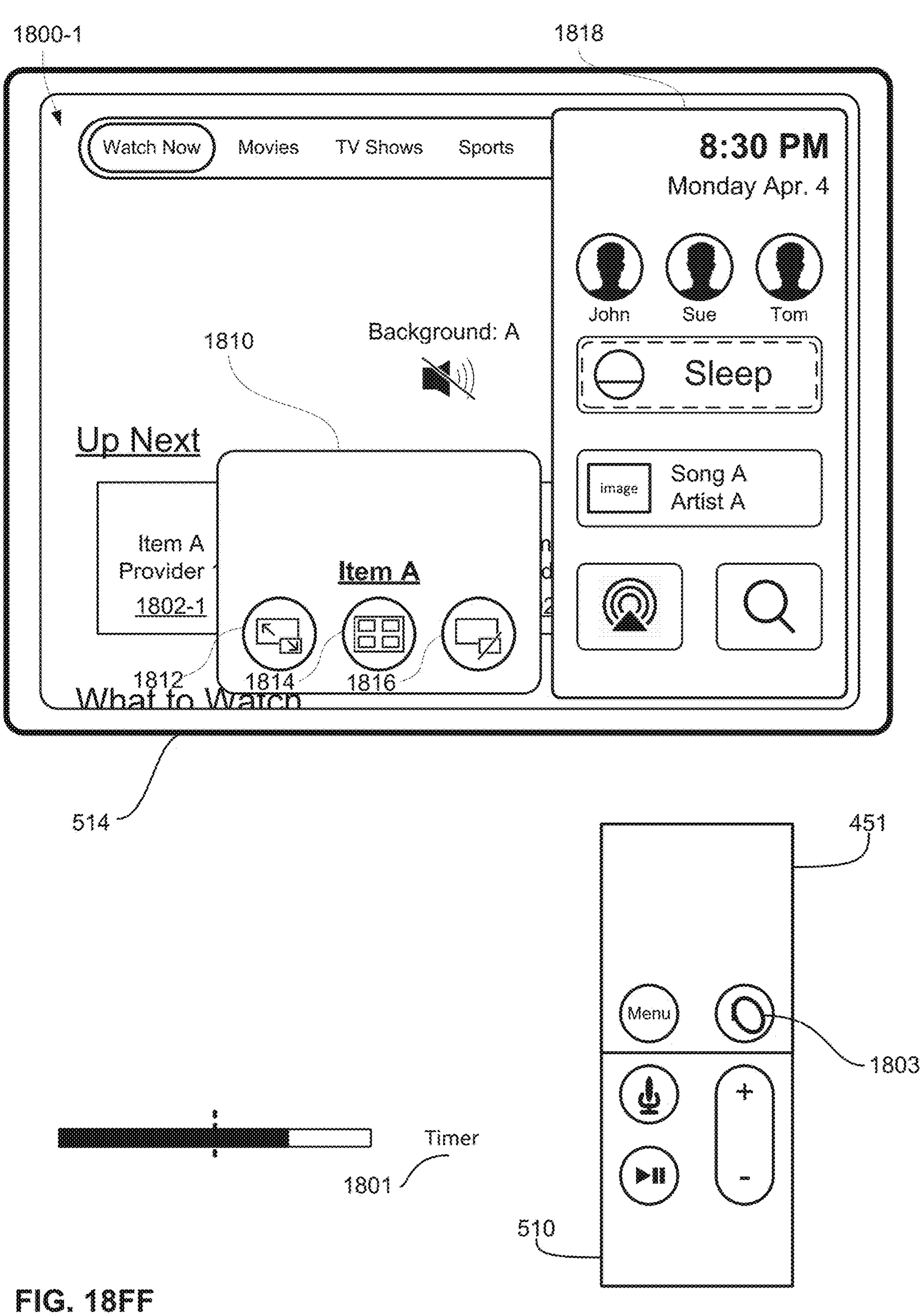
Figure 18G:
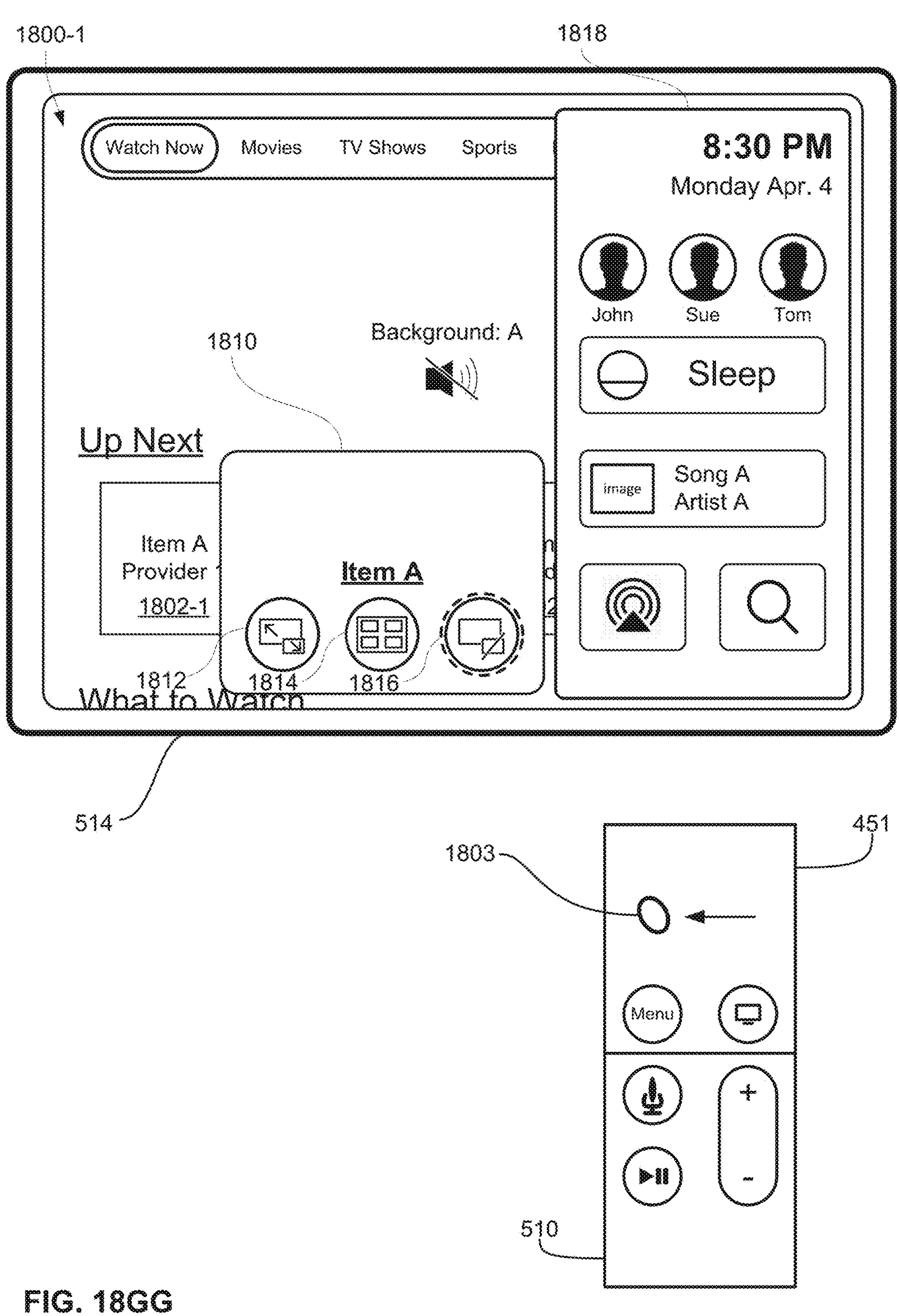
Figure 18H:
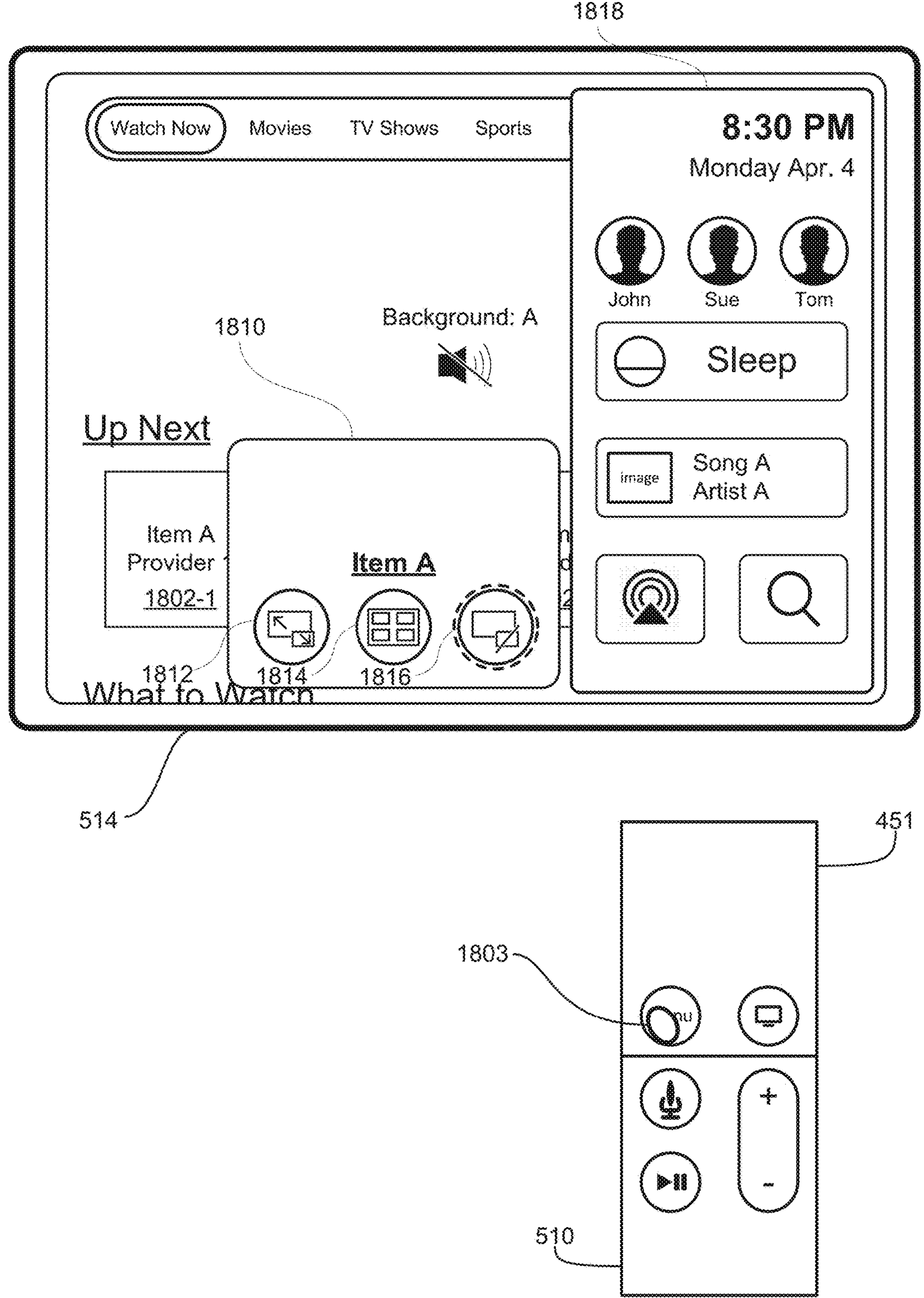
Figure 18I:
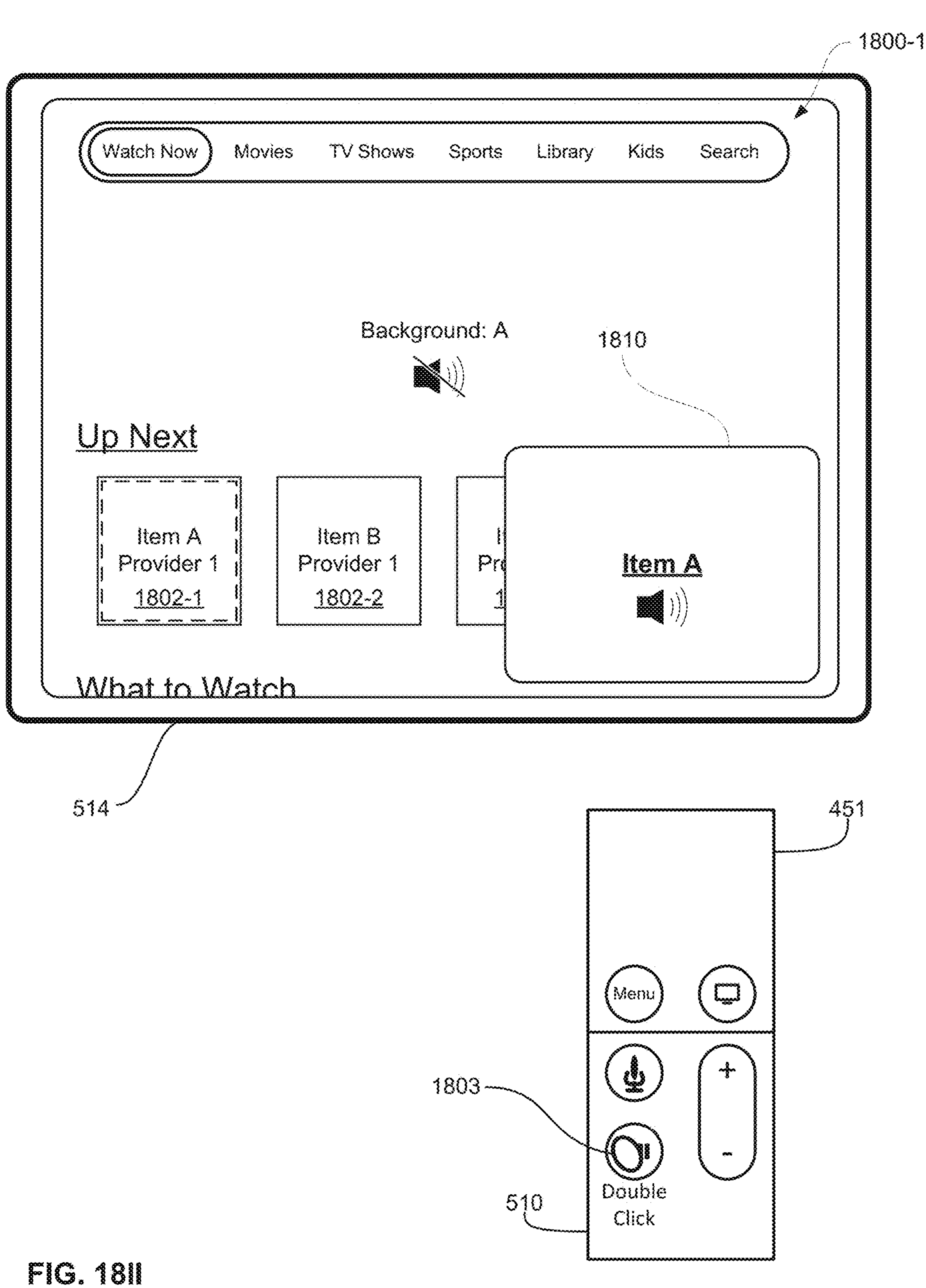
Figure 18J:
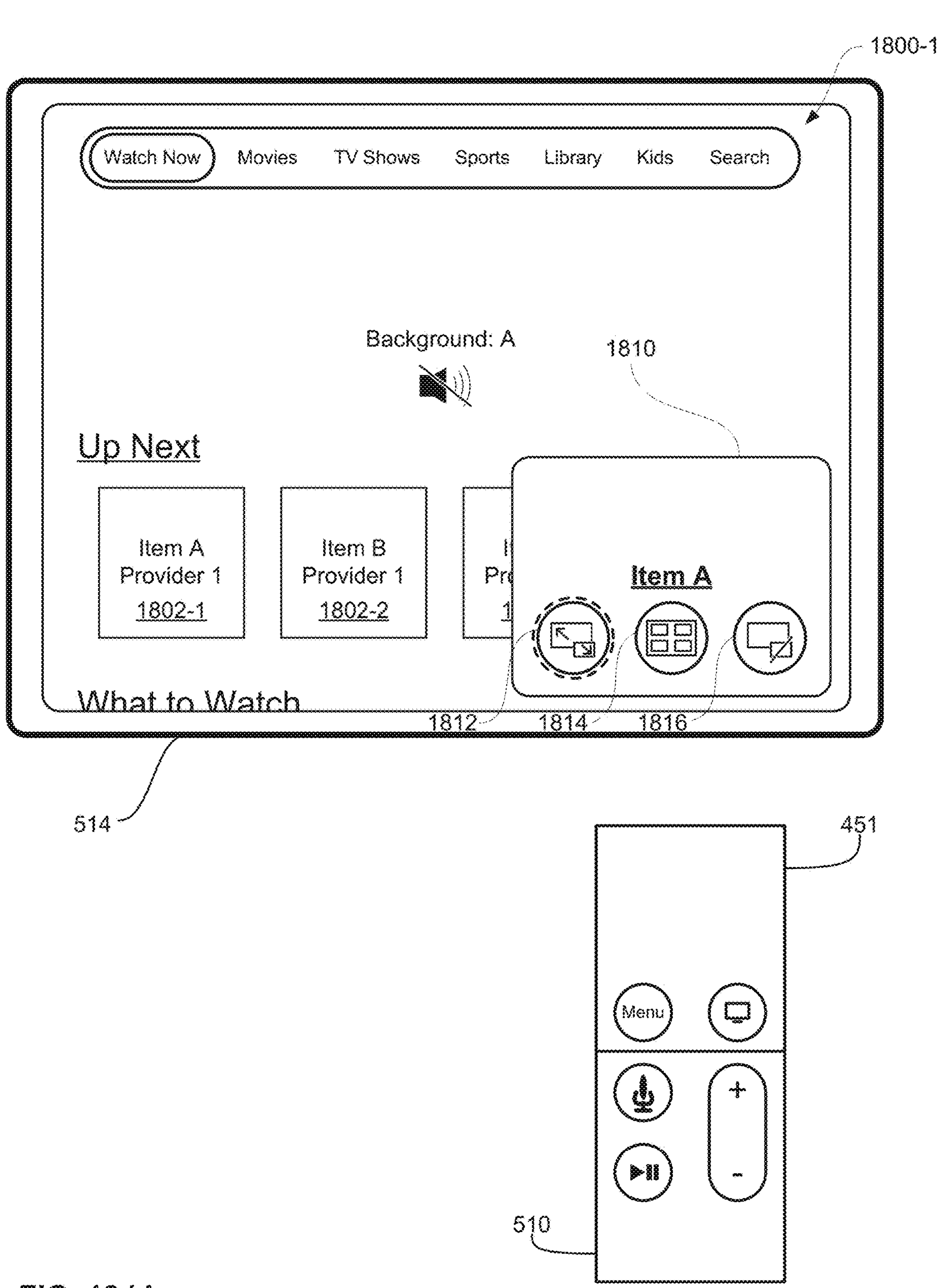
Figure 19A:
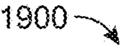
FIGS. 19A-19F are flow diagrams illustrating a method of displaying a content item in picture-in-picture mode in accordance with some embodiments of the disclosure.
Figure 19A:
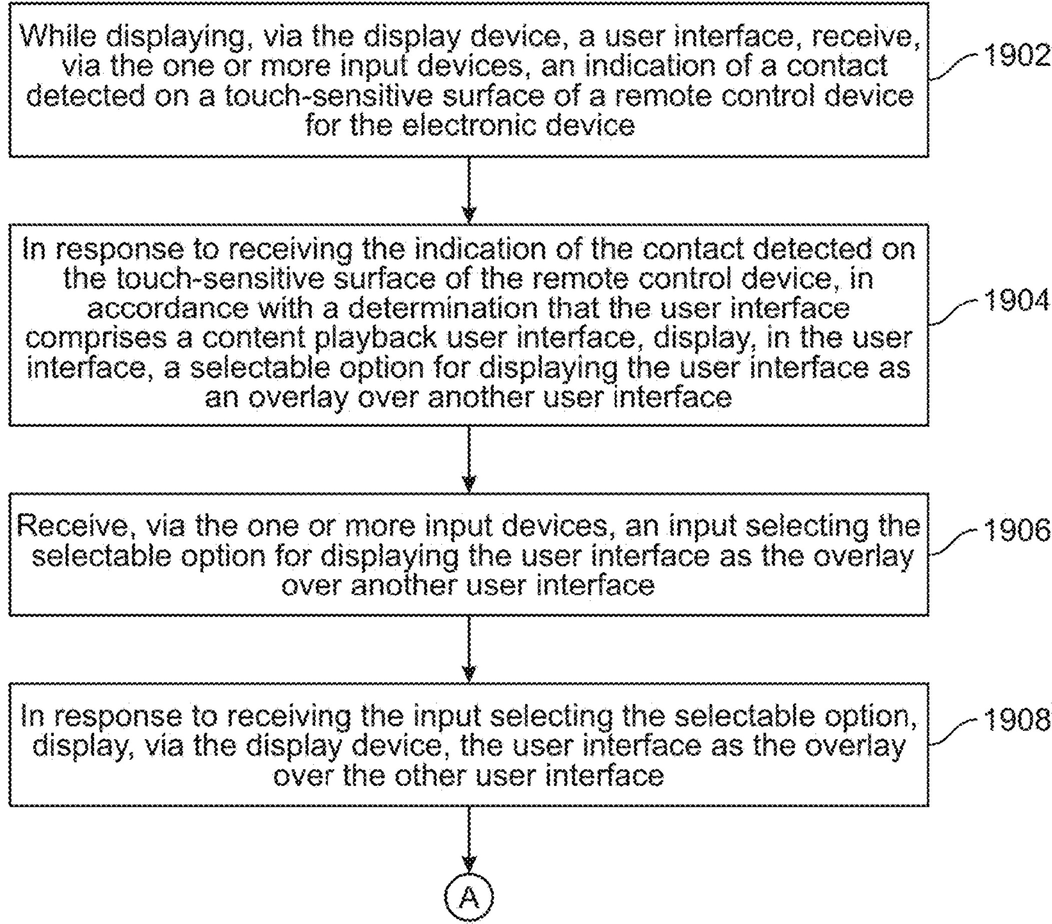
Figure 19B:
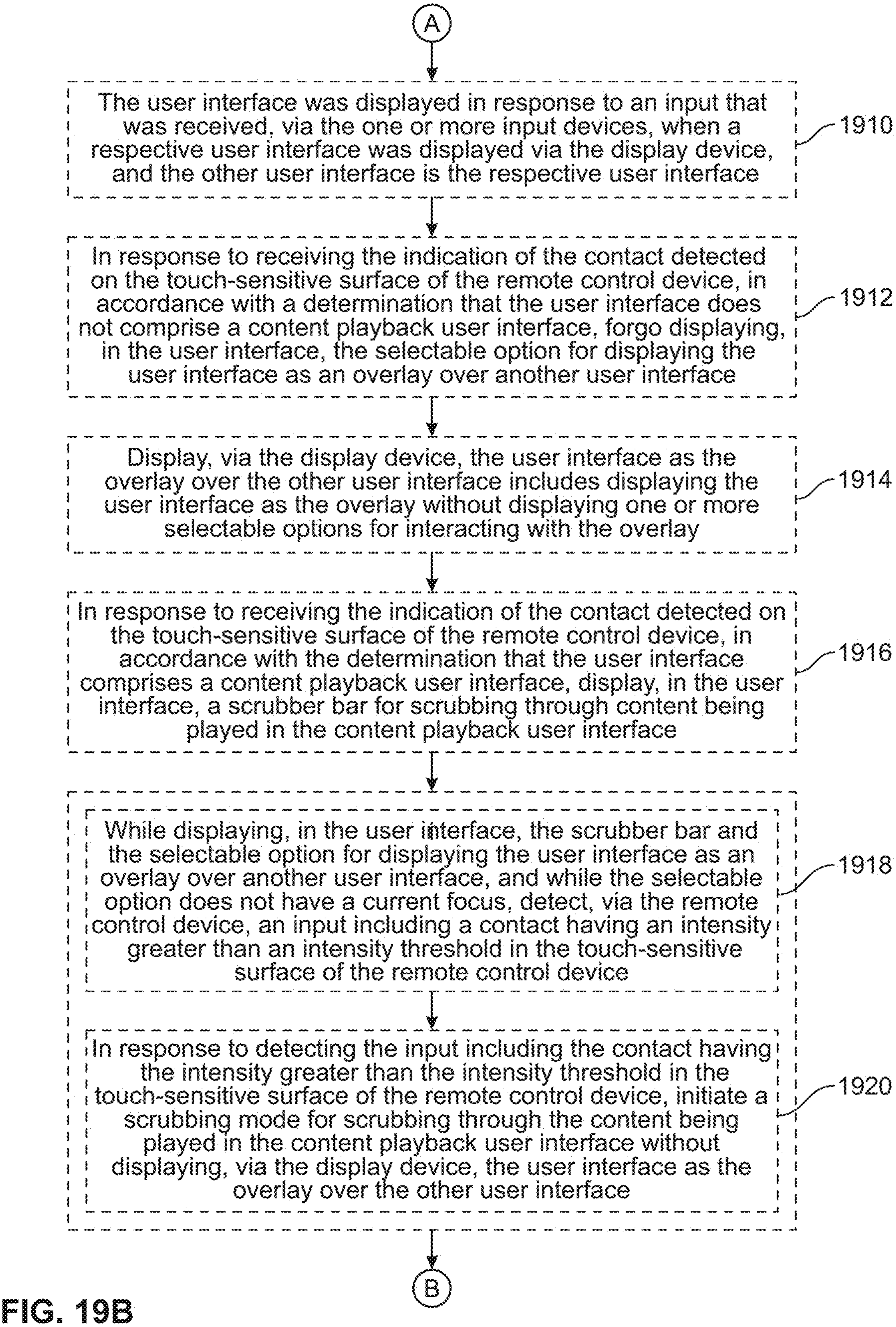
Figure 19C:
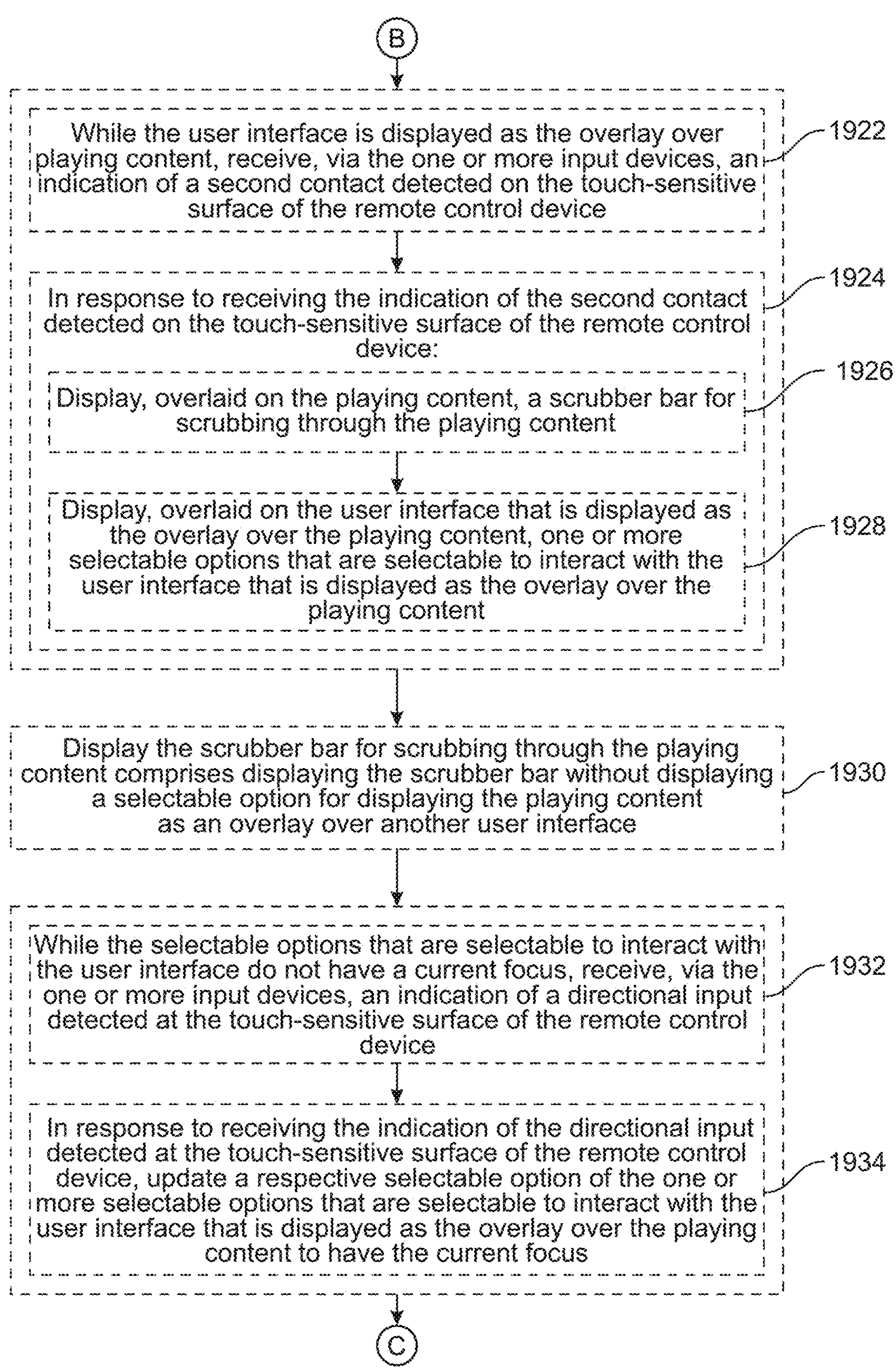
Figure 19D:
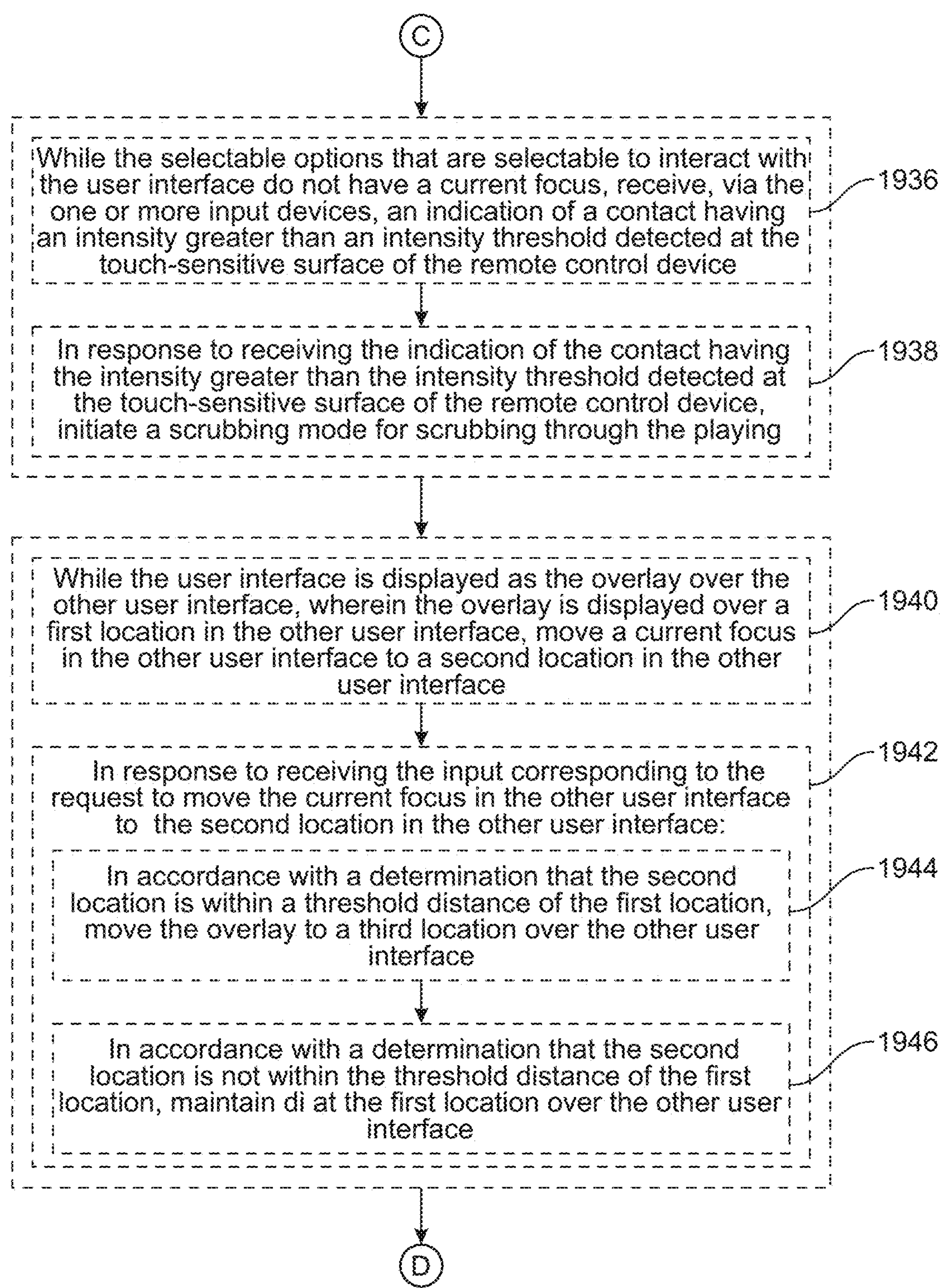
Figure 19E:
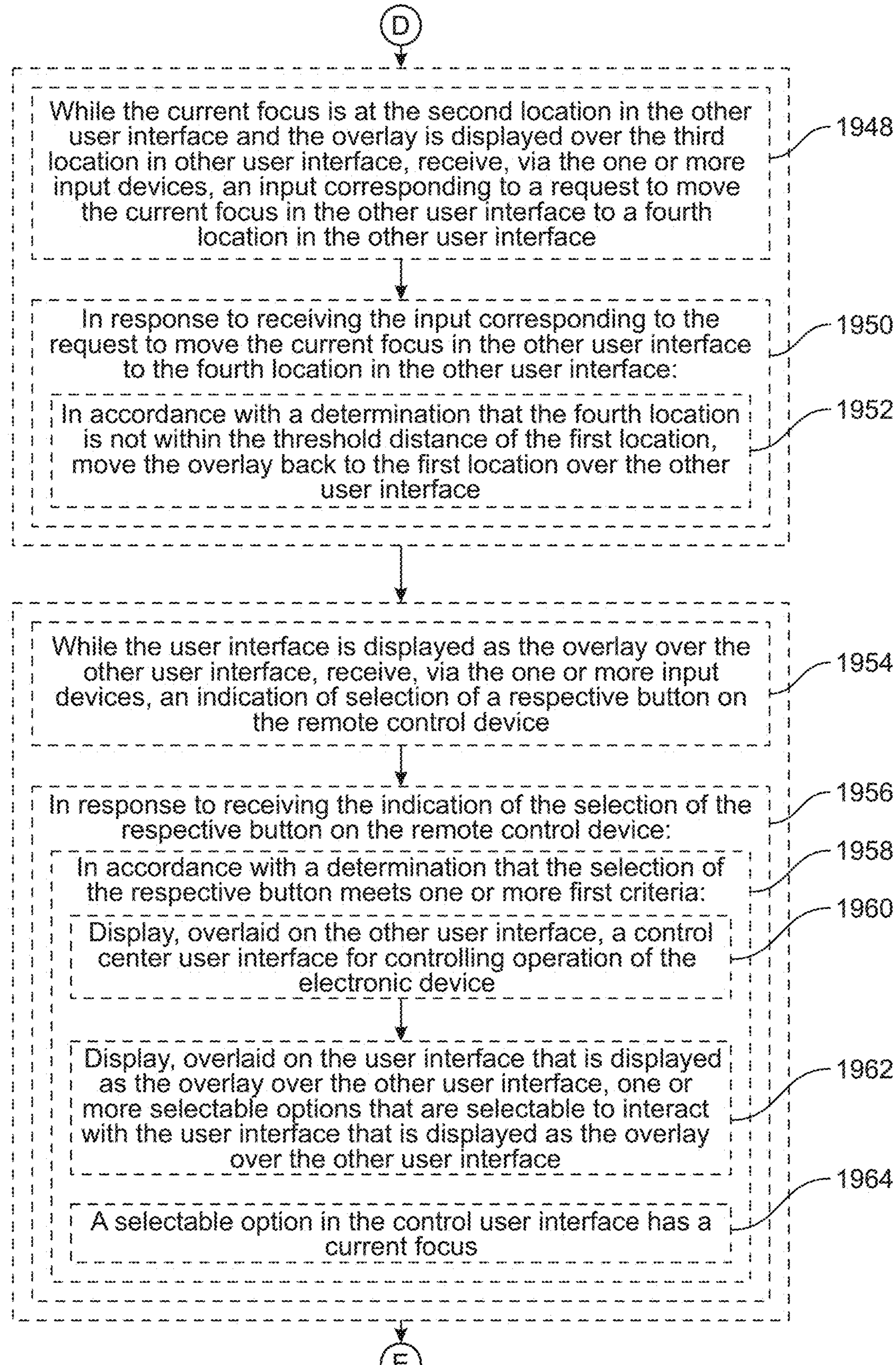
Figure 19F:
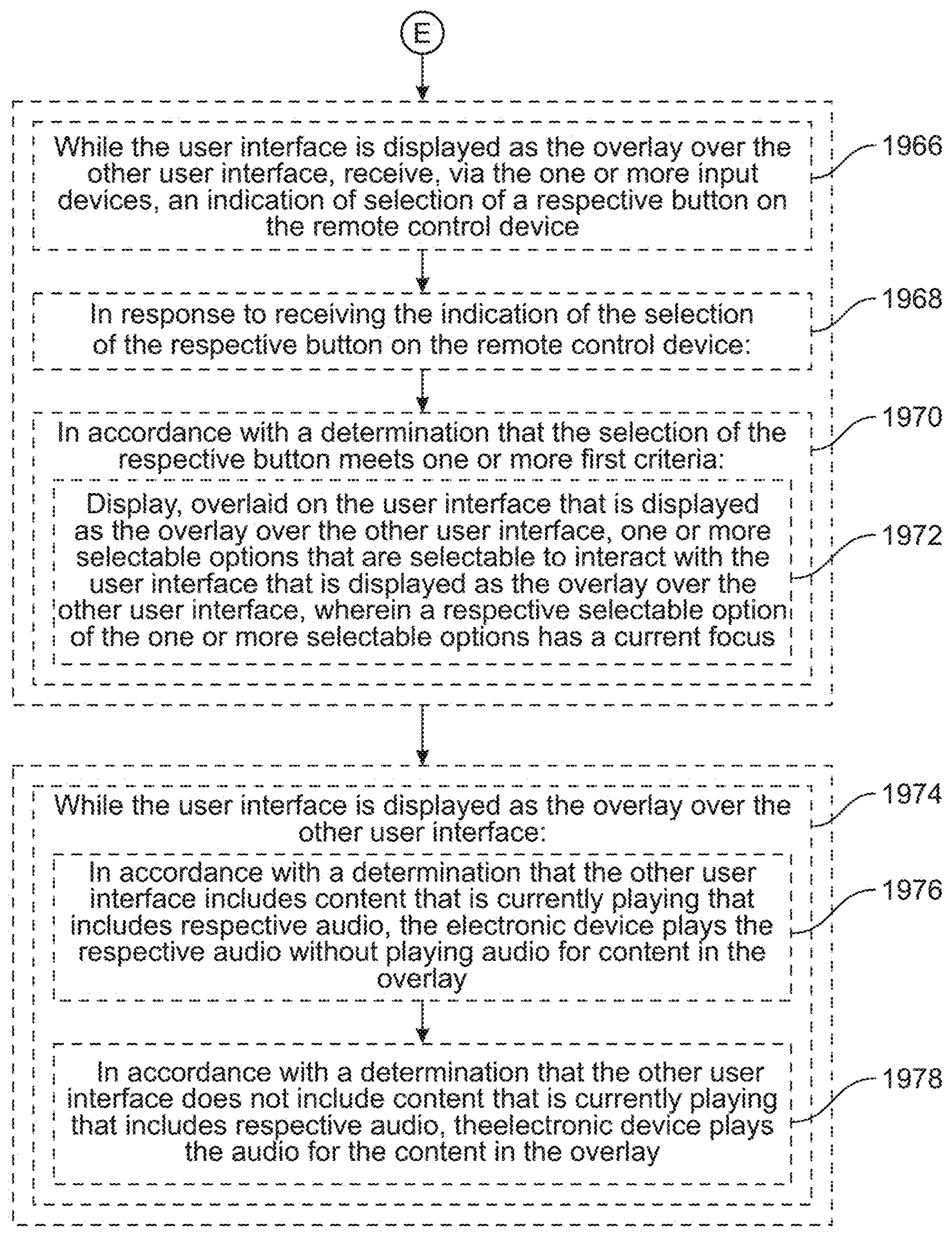

In FIG. 18Z, a user input 1803 corresponding to a selection input is received while selectable option 1814 has a focus. In some embodiments, in response to the user input, picture-in-picture overlay 1810 is moved from the bottom-right corner to the top-right corner, as shown in FIG. 18AA. In FIG. 18AA, a further user input 1803 is received selecting selectable option 1814. In some embodiments, in response to the user input, picture-in-picture overlay 1812 is moved from the top-right corner to the top-left corner of the display, as shown in FIG. 18BB. Thus, in some embodiments, upon selection of selectable option 1814, the picture-in-picture overlay moves in a counter-clockwise fashion to different corners of the display. In some embodiments, when picture-in-picture overlay 1810 is moved to a different location in response to the user's selection of selectable option 1814, the selectable options 1812, 1814, and 1816 are maintained on picture-in-picture overlay 1810. In some embodiments, when picture-in-picture overlay 1810 is moved to a different location in response to the user's selection of selectable option 1814, the selectable options 1812, 1814, and 1816 are removed from display from picture-in-picture overlay 1810.

In FIG. 18BB, user input 1803 corresponding to a rightward navigation is received while selectable option 1814 has a focus. In some embodiments, in response to the user input, focus is moved from selectable option 1814 to selectable option 1816, as shown in FIG. 18BB. In FIG. 18CC, user input 1803 corresponding to a selection input is received while selectable option 1816 has a focus. In some embodiments, in response to the user input, device 500 exits picture-in-picture mode and dismisses picture-in-picture overlay 1810, as shown in FIG. 18DD. In some embodiments, concurrently with dismissing picture-in-picture overlay 1810, scrubber bar 1804 is also removed from display.

FIGS. 18EE-18HH illustrate an exemplary embodiment of causing display of selectable options 1812, 1814, and 1816 (e.g., the selectable options for interacting with picture-in-picture overlay 1810). In FIG. 18EE-18FF, a contact 1403 corresponding to an actuation of the home button is received. In some embodiments, contact 1403 on the home button is held for more than a predetermined time threshold (e.g., 1 second, 2 seconds, 3 seconds). In some embodiments, the device considers contact 1403 to be a press-and-hold input. In some embodiments, in response to the user input, control panel 1818 (e.g., a control center user interface) is displayed, as shown in FIG. 18FF. In some embodiments, control panel 1818 is similar to control panel 1412 described above with respect to FIGS. 14E-14T, the details of which will not be repeated here for brevity. In some embodiments, the display of control panel 1818 causes picture-in-picture overlay 1810 to move such as to make space for control panel 1818 (e.g., optionally picture-in-picture overlay 1810 is displayed to the left of control panel 1818). In some embodiments, concurrent with display of control panel 1818, selectable options 1812, 1814, and 1816 are displayed overlaid on picture-in-picture overlay 1810. In some embodiments, when control panel 1818 and selectable options 1812, 1814, and 1816 are concurrently displayed, a selectable option on control panel 1818 receives initial focus (e.g., the selectable option for initiating a process for placing device 500 in a standby state).

In FIG. 18GG, a user input 1803 corresponding to a leftward navigation is received while a selectable option on control panel 1818 has a focus. In some embodiments, in response to the user input, focus is moved from a selectable option on control panel 1818 to selectable option 1816 (e.g., the selectable option on picture-in-picture overlay 1810 closest to control panel 1818), and options 1812, 1814 and 1816 can be interacted with as described above. In FIG. 18HH, a user input 1803 corresponding to a button press on the "home" or "menu" button is received corresponding to a request to dismiss the control panel 1818 and selectable options 1812, 1814, and 1816. In some embodiments, in response to the user input, control panel 1818 and selectable options 1812, 1814, and 1816 are removed from display (e.g., dismissed), as shown in FIG. 18II. In some embodiments, focus is returned to representation 1802-1 (e.g., the representation that had a focus before control panel 1818 was displayed).

FIGS. 18II-18JJ illustrate an exemplary embodiment of causing display of selectable options 1812, 1814, and 1816 (e.g., the selectable options for interacting with picture-in-picture overlay 1810). In FIG. 18II, a user input 1803 corresponding to a double-click of the play/pause button on remote control 510 is received while picture-in-picture overlay 1810 is displayed. In some embodiments, in response to the user input, selectable options 1812, 1814, and 1816 are displayed overlaid over the content on picture-in-picture overlay 1810. In some embodiments, the focus is moved from representation 1802-1 to selectable option 1812 (and options 1812, 1814 and 1816 can be interacted with as described above). In some embodiments, as described above with respect to FIG. 18HH, selectable options 1812, 1814, and 1816 are dismissed from display in response to a user input selecting the "home" or "menu" button on remote control device 510.

FIGS. 19A-19F are flow diagrams illustrating a method of displaying a content item in picture-in-picture mode in accordance with some embodiments of the disclosure. The method 1900 is optionally performed at an electronic device such as device 100, device 300, device 500, device 501, device 510, and device 511 as described above with reference to FIGS. 1A-1B, 2-3, 4A-4B and 5A-5C. Some operations in method 1900 are, optionally combined and/or order of some operations is, optionally, changed.

As described below, the method 1900 provides ways to display a content item in picture-in-picture mode. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 18C, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510 while displaying, via the display device, a user interface, receives (1900), via the one or more input devices, an indication of a contact detected on a touch-sensitive surface of a remote control device for the electronic device, such as in FIG. 18C (e.g., a finger resting on the touch-sensitive surface of the remote control device or in the touch-sensitive region of a remote control application of another electronic device).

In some embodiments, in response to receiving the indication of the contact detected on the touch-sensitive surface of the remote control device, in accordance with a determination that the user interface comprises a content playback user interface (e.g., a movie or TV show playback user interface in which a movie or TV show is currently playing or paused), the electronic device displays (1904), in the user interface, a selectable option for displaying the user interface as an overlay over another user interface, such as in FIG. 18D (e.g., displaying an icon overlaid on the content that is selectable to cause the electronic device to enter into a picture-in-picture mode).

In some embodiments, the electronic device receives (1906), via the one or more input devices, an input selecting the selectable option for displaying the user interface as the overlay over another user interface, such as in FIG. 18K (e.g., moving a current focus to the selectable option and detecting a click (e.g., a contact having an intensity greater than an intensity threshold) in the touch-sensitive surface of the remote control device).

In some embodiments, in response to receiving the input selecting the selectable option, the electronic device displays (1908), via the display device, the user interface as the overlay over the other user interface, such as in FIG. 18L (e.g., cause the electronic device to enter into a picture-in-picture mode and cause the content that is currently being played by the electronic device to be displayed in the picture-in-picture overlay window). In some embodiments, the overlay is displayed in a corner of the display (e.g., bottom right corner). In some embodiments, the overlay window encompasses a subset of the area of the display (e.g., 15%, 20%, 25%, 30% of the size of the display). In some embodiments, the overlay window is overlaid over a user interface that was displayed before the content began playback on the display. For example, if the content was displayed by selecting an icon from a content browsing user interface of a first application, then after picture-in-picture mode is activated, the content browsing user interface is displayed beneath the picture-in-picture overlay window. In some embodiments, the home screen user interface is displayed beneath the picture-in-picture overlay window. In some embodiments, in picture-in-picture mode, the user is able to cause playback of another content or otherwise interact with or browse through the electronic device while simultaneously watching the first content in the picture-in-picture overlay.

The above-described manner of activating a picture-in-picture mode allows the electronic device to provide the user with a method of activating picture-in-picture, which simplifies the interaction between the user and the electronic device and enhances the operability of the electronic device and makes the user-device interface more efficient (e.g., by providing a mechanism for the user to enter picture-in-picture without requiring the user to navigate to a separate user interface or perform additional inputs to enable picture-in-picture), which additionally reduces power usage and improves battery life of the electronic device by enabling the user to use the electronic device more quickly and efficiency, such as by streamlining the process of enabling picture-in-picture.

In some embodiments, the user interface was displayed in response to an input that was received, via the one or more input devices, when a respective user interface was displayed via the display device, and the other user interface is the respective user interface (1910), such as in FIG. 18L (e.g., when the device enters picture-in-picture mode, the picture-in-picture (e.g., the content playback user interface) is overlaid over the user interface that was displayed before content playback began). For example, if the user interface was displaying a media browsing user interface and the device began playback of content in the content playback user interface in response to the user selecting a content item on the media browsing user interface, then when the device enters picture-in-picture mode (e.g., when the user selects the selectable option for displaying the content playback user interface as an overlay), then the picture-in-picture is displayed over the media browsing user interface (e.g., the primary user interface redisplays the media browsing user interface).

The above-described manner of activating a picture-in-picture mode (e.g., by displaying the picture-in-picture content overlaid over the user interface that was displayed before content playback began) allows the electronic device to provide the user with the user interface that the user was previously browsing so that the user is able to continue browsing for other content when the device enters into picture-in-picture mode, which simplifies the interaction between the user and the electronic device and enhances the operability of the electronic device and makes the user-device interface more efficient (e.g., by automatically displaying the user interface that the user was browsing when the device enters picture-in-picture mode without requiring the user to navigate through multiple user interfaces to reach the same user interface that was displayed before content playback began), which additionally reduces power usage and improves battery life of the electronic device by enabling the user to use the electronic device more quickly and efficiency, such as by streamlining the process of enabling picture-in-picture mode.

In some embodiments, in response to receiving the indication of the contact detected on the touch-sensitive surface of the remote control device, in accordance with a determination that the user interface does not comprise a content playback user interface, the electronic device forgoes displaying (1912), in the user interface, the selectable option for displaying the user interface as an overlay over another user interface, such as in FIG. 18B (e.g., if the user input was received when the user interface is not a content playback user interface (e.g., is not currently playing back content), then do not display the selectable option to enter into picture-in-picture mode). Thus, in some embodiments, if the user interface is not displaying content, then do not provide the option to enter into picture-in-picture mode (e.g., because there is no content currently being played back to display in a picture-in-picture element).

The above-described manner of displaying a selectable option for entering a picture-in-picture mode (e.g., by displaying a selectable option to enter picture-in-picture mode when the user interface is a content playback user interface, but not displaying a selectable option to enter picture-in-picture mode when the user interface is not a content playback user interface) allows the electronic device to provide the user with the option to enter picture-in-picture mode only if the user is displaying content that can be displayed in a picture-in-picture overlay, which simplifies the interaction between the user and the electronic device and enhances the operability of the electronic device and makes the user-device interface more efficient (e.g., without requiring the user to determine whether picture-in-picture mode is actually available and without unnecessarily displaying an option to enter picture-in-picture mode when picture-in-picture mode is not actually available), which additionally reduces power usage and improves battery life of the electronic device by enabling the user to use the electronic device more quickly and efficiency, such as by streamlining the process of enabling picture-in-picture.

In some embodiments, displaying, via the display device, the user interface as the overlay over the other user interface includes displaying the user interface as the overlay without displaying one or more selectable options for interacting with the overlay (1914), such as in FIG. 18L (e.g., when the picture-in-picture overlay is instantiated, it is displayed without selectable options for interacting with the overlay).

The above-described manner of displaying a picture-in-picture overlay (e.g., by displaying the content in the picture-in-picture overlay without displaying selectable options on the overlay for interacting with the overlay) allows the electronic device to provide the user with a clean viewing experience of the picture-in-picture content and only displaying selects options when the user performs an input corresponding to a request to access the selectable options, which simplifies the interaction between the user and the electronic device and enhances the operability of the electronic device and makes the user-device interface more efficient (e.g., by not unnecessarily displaying options for interacting with the picture-in-picture overlay when the user has not shown a desire for them), which additionally reduces power usage and improves battery life of the electronic device by enabling the user to use the electronic device more quickly and efficiency, such as by streamlining the process of watching picture-in-picture content.

In some embodiments, in response to receiving the indication of the contact detected on the touch-sensitive surface of the remote control device, in accordance with the determination that the user interface comprises a content playback user interface, the electronic device displays (1916), in the user interface, a scrubber bar for scrubbing through content being played in the content playback user interface, such as in FIG. 18D (e.g., while the user interface is displaying content (e.g., while the user interface is a content playback user interface), in response to receiving a touch-down on a touch-sensitive surface of the remote control device (e.g., a continued touch-down that is not a tap or a click), then display a user interface element for scrubbing through the content (e.g., a progress bar, interaction of which causes navigation of the playback)). In some embodiments, if the device is not in picture-in-picture mode, then the selectable option for displaying the user interface as an overlay (e.g., the selectable option to enter picture-in-picture mode) is displayed concurrently with display of the scrubber bar. In some embodiments, if the device is in picture-in-picture mode (e.g., content is being displayed in a picture-in-picture overlay), then selectable options for interacting with the overlay (e.g., optionally overlaid over the content in the picture-in-picture overlay) is displayed concurrently with display of the scrubber bar.

The above-described manner of displaying a selectable option for entering a picture-in-picture mode (e.g., by displaying a selectable option to enter picture-in-picture mode concurrently with the display of a scrubber bar) allows the electronic device to provide the user, after a single gesture, with multiple options of how to interact with the content currently playing, which simplifies the interaction between the user and the electronic device and enhances the operability of the electronic device and makes the user-device interface more efficient (e.g., without requiring the user to determine whether picture-in-picture mode is available and without interrupting the user's playback to navigate through a series of menus to activate picture-in-picture mode), which additionally reduces power usage and improves battery life of the electronic device by enabling the user to use the electronic device more quickly and efficiency, such as by streamlining the process of enabling picture-in-picture.

In some embodiments, while displaying, in the user interface, the scrubber bar and the selectable option for displaying the user interface as an overlay over another user interface, and while the selectable option does not have a current focus, the electronic device detects (1918), via the remote control device, an input including a contact having an intensity greater than an intensity threshold in the touch-sensitive surface of the remote control device, such as in FIG. 18D (e.g., while the scrubber bar and the selectable option to enter into picture-in-picture mode is displayed, receiving a user input corresponding to a click on a touch-sensitive surface of a remote control device while the PIP selectable option does not have the current focus).

In some embodiments, in response to detecting the input including the contact having the intensity greater than the intensity threshold in the touch-sensitive surface of the remote control device, the electronic device initiates (1920) a scrubbing mode for scrubbing through the content being played in the content playback user interface without displaying, via the display device, the user interface as the overlay over the other user interface, such as in FIG. 18E (e.g., entering into scrubbing mode such that rightward or leftward navigation inputs received from the touch-sensitive surface of the remote control device cause navigation through the content being displayed in the content playback user interface (e.g., rewind or fast forward, respectively)). In some embodiments, concurrently with entering into scrubbing mode, the content being displayed in the content playback user interface is paused. In some embodiments, the scrubber bar is displayed below the selectable option for display the user interface as an overlay over another user interface.

The above-described manner of interacting with the content currently playing (e.g., by entering scrubbing mode in response to receiving a click input on the touch-sensitive surface of the remote control device) allows the electronic device to provide the user with the ability to scrub through the currently playing content while simultaneously displaying the option to enter into picture-in-picture mode, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, such as by streamlining the process of enabling picture-in-picture.

In some embodiments, while the user interface is displayed as the overlay over playing content, the electronic device receives (1922), via the one or more input devices, an indication of a second contact detected on the touch-sensitive surface of the remote control device, such as in FIG. 18S (e.g., while the user interface is displaying content (e.g., while the user interface is a content playback user interface), receiving a touch-down on a touch-sensitive surface of the remote control device (e.g., a continued touch-down that is not a tap or a click, or a tap without a click)).

In some embodiments, in response to receiving the indication of the second contact detected on the touch-sensitive surface of the remote control device (1924), such as in FIG. 18T: the electronic device displays (1926), overlaid on the playing content, a scrubber bar for scrubbing through the playing content, such as in FIG. 18T, and displays (1928), overlaid on the user interface that is displayed as the overlay over the playing content, one or more selectable options that are selectable to interact with the user interface that is displayed as the overlay over the playing content, such as in FIG. 18T (e.g., if the device is in picture-in-picture mode (e.g., content is being displayed in a picture-in-picture overlay), then selectable options for interacting with the overlay (e.g., optionally overlaid over the content in the picture-in-picture overlay) are displayed concurrently with display of the scrubber bar in response to the user input).

In some embodiments, the selectable options for interacting with the overlay include a selectable option that is selectable to exit picture-in-picture mode. In some embodiments, the selectable options for interacting with the overlay include a selectable option that is selectable to move the picture-in-picture overlay to another location on the user interface (e.g., move the picture-in-picture overlay to a different corner of the user interface). In some embodiments, the selectable options for interacting with the overlay include a selectable option that is selectable to swap the content that is displayed (e.g., swap the content being displayed in the picture-in-picture overlay with the content that is being displayed beneath the picture-in-picture overlay (e.g., in the primary user interface). In some embodiments, the selectable options for interacting with the overlay is displayed in the picture-in-picture overlay overlaid over the content being displayed in the picture-in-picture overlay. In some embodiments, the selectable options for interacting with the overlay are displayed at another location on the user interface (e.g., not overlaid over the picture-in-picture overlay).

The above-described manner of displaying selectable options for interacting with the picture-in-picture overlay (e.g., by displaying the selectable options for interacting with the picture-in-picture overlay in response to receiving a user contact on the touch sensitive surface) allows the electronic device to provide the user with selectable options for interacting with the picture-in-picture overlay only after the user requests display of the selectable options, which simplifies the interaction between the user and the electronic device and enhances the operability of the electronic device and makes the user-device interface more efficient (e.g., without always displaying the selectable options or without interrupting the user's playback to navigate through a series of menus to interact with the picture-in-picture overlay), which additionally reduces power usage and improves battery life of the electronic device by enabling the user to use the electronic device more quickly and efficiency.

In some embodiments, displaying the scrubber bar for scrubbing through the playing content comprises displaying the scrubber bar without displaying a selectable option for displaying the playing content as an overlay over another user interface (1930), such as in FIG. 18T (e.g., if the device is already in picture-in-picture mode, then do not display the selectable option for entering into picture-in-picture mode).

The above-described manner of displaying a selectable option for entering a picture-in-picture mode (e.g., by displaying a selectable option to enter picture-in-picture mode if the device is not already in picture-in-picture mode, but not displaying the selectable option if the device is already in picture-in-picture mode) allows the electronic device to only provide the user with the selectable option to enter into picture-in-picture mode if the device is not already in picture-in-picture mode, which simplifies the interaction between the user and the electronic device and enhances the operability of the electronic device and makes the user-device interface more efficient (e.g., by not displaying an unnecessary option to activate picture-in-picture mode and without requiring the user to separately determine whether picture-in-picture mode is actually available), which additionally reduces power usage and improves battery life of the electronic device by enabling the user to use the electronic device more quickly and efficiency, such as by streamlining the process of enabling picture-in-picture.

In some embodiments, while the selectable options that are selectable to interact with the user interface do not have a current focus, receiving, via the one or more input devices, an indication of a directional input detected at the touch-sensitive surface of the remote control device (1932), such as in FIG. 18U (e.g., while the scrubber bar and the options for interacting with the overlay are displayed and/or while the device is not currently in scrubbing mode, receiving a navigational input from the touch-sensitive surface of the remote control device (e.g., upward, leftward, or rightward swipe)).

In some embodiments, in response to receiving the indication of the directional input detected at the touch-sensitive surface of the remote control device, updating a respective selectable option of the one or more selectable options that are selectable to interact with the user interface that is displayed as the overlay over the playing content to have the current focus (1934), such as in FIG. 18U (e.g., moving the focus to the one or more selectable options for interacting with the overlay (e.g., as opposed to entering into scrubbing mode and/or without moving the focus to the scrubber bar)).

The above-described manner of displaying a accessing the selectable options for interacting with the picture-in-picture overlay (e.g., by moving a focus to the selectable options for interacting with the picture-in-picture overlay in response to receiving a directional input) allows the electronic device to provide the user with the ability to access the selectable options for interacting with the picture-in-picture overlay while simultaneously providing the user with access to the scrubber bar, which simplifies the interaction between the user and the electronic device and enhances the operability of the electronic device and makes the user-device interface more efficient (e.g., without requiring the user to perform additional inputs to access either the scrubber bar or the selectable options for interacting with the picture-in-picture or without requiring the user to interrupt playback to navigate through a series of menus to interact with the picture-in-picture overlay), which additionally reduces power usage and improves battery life of the electronic device by enabling the user to use the electronic device more quickly and efficiency.

In some embodiments, while the selectable options that are selectable to interact with the user interface do not have a current focus, the electronic device receives (1936), via the one or more input devices, an indication of a contact having an intensity greater than an intensity threshold detected at the touch-sensitive surface of the remote control device, such as in FIG. 18D (e.g., while the scrubber bar and the options for interacting with the overlay are displayed (but not having a focus), receiving a click or mechanical actuation of the touch-sensitive surface of the remote control device).

In some embodiments, in response to receiving the indication of the contact having the intensity greater than the intensity threshold detected at the touch-sensitive surface of the remote control device, initiating a scrubbing mode for scrubbing through the playing content (1938), such as in FIG. 18E (e.g., in response to the click input, entering into a scrubbing mode). In some embodiments, navigational inputs (e.g. rightward swipe or leftward swipe) causes scrubbing or navigation through the content being displayed in the primary user interface (e.g., rewind or fast forward navigation, respectively).

The above-described manner of interacting with the currently displayed content while in picture-in-picture mode (e.g., by displaying a selectable option to enter picture-in-picture mode concurrently with the display of a scrubber bar and entering scrubbing mode in response to receiving a click on the touch-sensitive surface of the remote control device) allows the electronic device to provide the user with the ability to access the selectable options for interacting with the picture-in-picture overlay while simultaneously providing the user with access to the scrubber bar, which simplifies the interaction between the user and the electronic device and enhances the operability of the electronic device and makes the user-device interface more efficient (e.g., without requiring the user to perform additional inputs to enter a scrubbing mode), which additionally reduces power usage and improves battery life of the electronic device by enabling the user to use the electronic device more quickly and efficiency.

In some embodiments, while the user interface is displayed as the overlay over the other user interface (e.g., while in picture-in-picture mode), wherein the overlay is displayed over a first location in the other user interface (e.g., in a respective corner of the user interface), the electronic device receives (1940), via the one or more input devices, an input corresponding to a request to move a current focus in the other user interface to a second location in the other user interface, such as in FIG. 18N (e.g., receiving a navigational input corresponding to a request to move a focus from one item to another item that is at a second location in the user interface).

In some embodiments, in response to receiving the input corresponding to the request to move the current focus in the other user interface to the second location in the other user interface (1942), such as in FIG. 18N: in accordance with a determination that the second location is within a threshold distance of the first location, moving the overlay to a third location over the other user interface (1944), such as in FIG. 18N (e.g., moving the picture-in-picture overlay so as not to obscure the item that is receiving the focus). In some embodiments, the threshold distance is the distance in which the picture-in-picture overlay would obscure some or all of the item that is receiving the focus. For example, if the second location is the same as the first location, then the picture-in-picture location is moved to another location. In some embodiments, if the second location is within a certain distance of the first location (e.g., within a buffer distance around the area of the item receiving the focus, such as 1 cm, 2 cm, 1 inch, 2 inches, etc.), then the picture-in-picture overlay is moved to another location. In some embodiments, the picture-in-picture overlay is displaced to a location that is far enough away to avoid obscuring the item that is receiving the focus (e.g., moved just far enough away to avoid conflicting with the item receiving the focus).

In some embodiments, in accordance with a determination that the second location is not within the threshold distance of the first location, maintaining display of the overlay at the first location over the other user interface (1946), such as in FIG. 18M (e.g., if the item receiving the focus is not obscured by the picture-in-picture overlay, then do not move the picture-in-picture overlay to another location).

The above-described manner of automatically moving the picture-in-picture overlay (e.g., by moving the picture-in-picture overlay when the user moves a focus to an item that is obscured by the overlay) allows the electronic device to provide the user with the ability to navigate to all items in the user interface without requiring the user to manually move the picture-in-picture overlay to a different location to access items that are displayed beneath the overlay, which simplifies the interaction between the user and the electronic device and enhances the operability of the electronic device and makes the user-device interface more efficient (e.g., by automatically moving the overlay if items that the user is interested in are obscured by the overlay), which additionally reduces power usage and improves battery life of the electronic device by enabling the user to use the electronic device more quickly and efficiency.

In some embodiments, while the current focus is at the second location in the other user interface and the overlay is displayed over the third location in other user interface, the electronic device receives (1948), via the one or more input devices, an input corresponding to a request to move the current focus in the other user interface to a fourth location in the other user interface, such as in FIG. 18O (e.g., after moving the focus to the item that would otherwise have been obscured by the picture-in-picture overlay, thus causing the picture-in-picture overlay to be moved, receiving a user input moving the focus to another item).

In some embodiments, in response to receiving the input corresponding to the request to move the current focus in the other user interface to the fourth location in the other user interface (1950), such as in FIG. 18O: in accordance with a determination that the fourth location is not within the threshold distance of the first location, the electronic device moves (1952) the overlay back to the first location over the other user interface, such as in FIG. 18O (e.g., if the other item that is receiving the focus would not be obscured by the picture-in-picture overlay when the picture-in-picture overlay was in its position before being moved by the previous item receiving a focus, then move the picture-in-picture overlay back to its original position). Thus, in some embodiments, the picture-in-picture overlay is displaced from its location only temporarily and is moved back to its original position if there is no risk of obscuring items that have focus.

The above-described manner of automatically moving the picture-in-picture overlay (e.g., by moving the picture-in-picture overlay when the user moves a focus to an item that is obscured by the overlay and moving the overlay back to its original position after the user moves the focus away from the item that would have been obscured by the overlay) allows the electronic device to provide the user with the ability to navigate to all items in the user interface while minimizing the disruption to the playback of the picture-in-picture content (e.g., by moving the overlay back to its original position after the user is done navigating to items that would have been obscured by the overlay)), which simplifies the interaction between the user and the electronic device and enhances the operability of the electronic device and makes the user-device interface more efficient (e.g., by automatically moving the overlay back to its original position that is familiar to the user to provide a consistent display and without requiring the user to manually move the overlay back to its original position), which additionally reduces power usage and improves battery life of the electronic device by enabling the user to use the electronic device more quickly and efficiency.

In some embodiments, while the user interface is displayed as the overlay over the other user interface, the electronic device receives (1954), via the one or more input devices, an indication of selection of a respective button on the remote control device, such as in FIG. 18EE (e.g., receiving a user input corresponding to an actuation of a button on a remote control device). In some embodiments, the user input is an actuation of a button corresponding to a unified media browsing application (e.g., such that actuation/regular click (short click) of the button causes display of the unified media browsing application).

In some embodiments, in response to receiving the indication of the selection of the respective button on the remote control device (1956), such as in FIG. 18EE: in accordance with a determination that the selection of the respective button meets one or more first criteria (1956), such as in FIG. 18FF (e.g., the user input is a depression of the respective button for longer than a time threshold (0.5 seconds, 1 second, 2 seconds), a double click of the respective button, etc.): the electronic device displays (1962)), overlaid on the other user interface, a control center user interface for controlling operation of the electronic device, such as in FIG. 18FF (e.g., displaying a control center user interface similarly to the control center user interface described above with respect to method 1500), and displays (1962), overlaid on the user interface that is displayed as the overlay over the other user interface, one or more selectable options that are selectable to interact with the user interface that is displayed as the overlay over the other user interface, such as in FIG. 18FF (e.g., concurrently with the display of the control center user interface, display the selectable options for interacting with the picture-in-picture overlay (e.g., the selectable options, discussed above, for swapping the content displayed in the overlay with the content displayed on the primary display, for moving the picture-in-picture overlay, and for exiting picture-in-picture mode) overlaid over the picture-in-picture overlay).

In some embodiments, if the selection of the respective button does not meet the first criteria (e.g., is not a depression for longer than the time threshold), then do not cause the display of the control center user interface or the display of the selectable options for interacting with the picture-in-picture overlay. In some embodiments, in response to the user input that does not meet the first criteria, the electronic device launches the unified media browsing application or performs another action corresponding to a short click or tap of the respective button (e.g., as opposed to a long-click or click-and-hold input). In some embodiments, a user input corresponding to a selection of the "home" or "menu" button corresponding to a request to cease display of the control center user interface causes the control center user interface and the selectable options for interacting with the picture-in-picture overlay to cease display and focus to move back to the item that had focus before the control center user interface was displayed.

In some embodiments, a selectable option in the control user interface has a current focus (1964), such as in FIG. 18FF (e.g., when the control center and the selectable options for interacting with the picture-in-picture overlay (e.g., the selectable options, discussed above, for swapping the content displayed in the overlay with the content displayed on the primary display, for moving the picture-in-picture overlay, and for exiting picture-in-picture mode) are concurrently displayed, the selectable options on the control center receive the focus (e.g., optionally the selectable option that is selectable to cause the device to enter into a standby mode)).

In some embodiments, focus is moved from the control center to the selectable options for interacting with the picture-in-picture overlay (e.g., the selectable options, discussed above, for swapping the content displayed in the overlay with the content displayed on the primary display, for moving the picture-in-picture overlay, and for exiting picture-in-picture mode) in response to a user input corresponding to a navigation toward the direction of the selectable options for interacting with the picture-in-picture overlay. For example, if the selectable options for interacting with the picture-in-picture overlay are displayed to the left of the control center (e.g., if the picture-in-picture overlay is displayed to the left of the control center), then a leftward navigation causes focus to move from a selectable option on the control center user interface to one of the selectable options for interacting with the picture-in-picture overlay (e.g., optionally the selectable option closes to the control center user interface, such as the selectable option for exiting picture-in-picture mode).

The above-described manner of displaying selectable options for interacting with the picture-in-picture overlay (e.g., by displaying the selectable options for interacting with the picture-in-picture overlay in response to the same user input that causes display of the control center user interface) allows the electronic device to provide the user with selectable options for interacting with the picture-in-picture overlay when the primary user interface is not playing content, which simplifies the interaction between the user and the electronic device and enhances the operability of the electronic device and makes the user-device interface more efficient (e.g., by still providing controls to the user even if content is not being played on the primary user interface, without requiring the user to playback content on the primary display, then display the selectable content, interact with the picture-in-picture overlay as desired, and then stop playback of the content on the primary display to achieve the same functionality), which additionally reduces power usage and improves battery life of the electronic device by enabling the user to use the electronic device more quickly and efficiency.

In some embodiments, while the user interface is displayed as the overlay over the other user interface (e.g., an while a current focus is in the other user interface, such as on a representation of a content item in the other user interface (e.g., a unified media browsing application user interface)), the electronic device receives (1966), via the one or more input devices, an indication of selection of a respective button on the remote control device, such as in FIG. 18II (e.g., receiving a user selection of a respective button on the remote control device such as the play/pause button).

In some embodiments, in response to receiving the indication of the selection of the respective button on the remote control device (1968), such as in FIG. 18JJ: in accordance with a determination that the selection of the respective button meets one or more first criteria (1970), such as in FIG. 18II (e.g., if the user input selecting the respective button matches a respective selection pattern other than a single selection (e.g., single button press)): the electronic device displays (1978), overlaid on the user interface that is displayed as the overlay over the other user interface, one or more selectable options that are selectable to interact with the user interface that is displayed as the overlay over the other user interface, wherein a respective selectable option of the one or more selectable options has a current focus, such as in FIG. 18JJ (e.g., display the selectable options for interacting with the picture-in-picture overlay).

For example, the first criteria is satisfied if the user input is a double-click on the respective button (e.g., a play/pause button). In some embodiments, other input patterns are possible to satisfy the first criteria (e.g., such as a long press, or a click followed quickly by a click-and-hold, etc.). In some embodiments, one of the selectable options of the selectable options for interacting with the picture-in-picture overlay has a focus. In some embodiments, if the user input does not meet the first criteria, then do not display the selectable options for interacting with the picture-in-picture overlay. In some embodiments, if the user input does not meet the first criteria, then the device performs a different action, such as the action corresponding to a single button press actuation of the respective button (e.g., in response to the user performing a single button press actuation of the respective button). In some embodiments, a user input corresponding to a selection of the "home" or "menu" button corresponding to a request to cease display of the selectable options for interacting with the picture-in-picture overlay causes the selectable options for interacting with the picture-in-picture overlay to cease display and focus to move back to the item that had focus before the selectable options were displayed (e.g., focus to move back to a representation of a content item in a unified media browsing application).

The above-described manner of displaying selectable options for interacting with the picture-in-picture overlay (e.g., by displaying the selectable options for interacting with the picture-in-picture overlay in response to receiving a double-click button actuation) allows the electronic device to provide the user with selectable options for interacting with the picture-in-picture overlay only after the user requests display of the selectable options even when the device is not currently playing content on the primary user interface, which simplifies the interaction between the user and the electronic device and enhances the operability of the electronic device and makes the user-device interface more efficient (e.g., without always displaying the selectable options or without interrupting the user's playback to navigate through a series of menus to interact with the picture-in-picture overlay and without requiring that content be played on the primary user interface), which additionally reduces power usage and improves battery life of the electronic device by enabling the user to use the electronic device more quickly and efficiency.

In some embodiments, while the user interface is displayed as the overlay over the other user interface (1974), such as in FIG. 18Q: in accordance with a determination that the other user interface includes content that is currently playing that includes respective audio, the electronic device plays (1976) the respective audio without playing audio for content in the overlay, such as in FIG. 18Q (e.g., if the device is in picture-in-picture mode and displaying content in the picture-in-picture overlay and the primary display (e.g., the user interface that is underneath the picture-in-picture overlay) is also displaying content, then if the content being displayed in the primary display is producing audio, then the content in the picture-in-picture overlay is muted). In some embodiments, only one of either the content in the picture-in-picture overlay or the content on the primary display is able to output audio at any one time.

In some embodiments, in accordance with a determination that the other user interface does not include content that is currently playing that includes respective audio, the electronic device plays (1978) the audio for the content in the overlay, such as in FIG. 18R (e.g., if the content displayed in the primary display is muted, does not include an audio track, or is otherwise not producing audio, then the device outputs the audio from the content being displayed in the picture-in-picture overlay). Thus, in some embodiments, the audio from the primary user interface has priority over the audio from the picture-in-picture overlay (e.g., the picture-in-picture overlay is muted in favor of the audio form the primary user interface), but if the primary user interface is not producing audio, then the system will allow the audio from the picture-in-picture overlay to be outputted.

The above-described manner of outputting audio from content being played by the device (e.g., by always outputting the audio from the playback of content on the primary user interface unless the playback of content on the primary user interface does not include audio or the audio is muted, then outputting the audio form the playback of content in the picture-in-picture overlay) allows the electronic device to provide the user with the ability to be fully immersed in the content being displayed on the primary user interface, but quickly hear the audio from the content on the picture-in-picture overlay if the user requests it (e.g., by muting the content on the primary user interface) which simplifies the interaction between the user and the electronic device and enhances the operability of the electronic device and makes the user-device interface more efficient (e.g., without requiring the user to swap the content being displayed on the primary user interface with the content on the picture-in-picture overlay to hear audio from the content that is in the picture-in-picture overlay, even for a short time frame), which additionally reduces power usage and improves battery life of the electronic device by enabling the user to use the electronic device more quickly and efficiency.

It should be understood that the particular order in which the operations in FIGS. 19A-19F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, and 1700) are also applicable in an analogous manner to method 1900 described above with respect to FIGS. 19A-19F. For example, the operation of the electronic device to present representations of items of content with reference to method 1900 optionally has one or more of the characteristics of the presentation of presenting representations of content items, presenting options for accessing the content based on available means for accessing items of content, presenting representations of episodes of collections of episodic content, presenting an enhanced preview of an items of content, presenting a control panel, and switching the active user of the device, etc., described herein with reference to other methods described herein (e.g., methods 700, 900, 1100, 1300, 1500, and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIGS. 19A-19F are, optionally, implemented by components depicted in FIGS. 1A-1B. For example, displaying operations 1904, 1908, 1912, 1914, 1916, 1926, 1928, 1930, 1960, 1962, and 1972, receiving operations 1902, 1906, 1922, 1932, 1936, 1948, 1954, and 1966, and initiating operations 1920, and 1938, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, viewing history data may be used to provide customized recommendations to users, or may be used to provide the user with the user's own past viewing history. Further, personal information such as personal preferences and settings can be used to quickly load and switch between respective users' preferences and settings.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In another example, users can select not to provide content taste data, for targeted content delivery services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display device and one or more input devices:

while displaying, via the display device, a user interface, receiving, via the one or more input devices, an indication of a contact detected on a touch-sensitive surface of a remote control device for the electronic device;

in response to receiving the indication of the contact detected on the touch-sensitive surface of the remote control device:

in accordance with a determination that the user interface comprises a content playback user interface, displaying, in the user interface, a selectable option for displaying the user interface as an overlay over another user interface and a scrubber bar for scrubbing through content being played in the content playback user interface; and in accordance with a determination that the user interface does not comprise the content playback user interface, forgoing display, in the user interface, of the selectable option for displaying the user interface as the overlay over the other user interface;

while displaying, in accordance with the determination that the user interface comprises the content playback user interface, the scrubber bar and the selectable option for displaying the user interface as the overlay over the other user interface, receiving, via the one or more input devices, an input selecting the selectable option for displaying the user interface as the overlay over another user interface;

in response to receiving the input selecting the selectable option, displaying, via the display device, the user interface as the overlay over the other user interface;

while displaying, in accordance with the determination that the user interface comprises the content playback user interface, the scrubber bar and the selectable option for displaying the user interface as the overlay over the other user interface, and while the selectable option does not have a current focus:

detecting, via the remote control device, an input including a contact having an intensity greater than an intensity threshold in the touch-sensitive surface of the remote control device; and in response to detecting the input including the contact having the intensity greater than the intensity threshold in the touch-sensitive surface of the remote control device, initiating a scrubbing mode for scrubbing through content being played in the content playback user interface without displaying, via the display device, the user interface as the overlay over the other user interface.

2. The method of claim 1, wherein the user interface was displayed in response to an input that was received, via the one or more input devices, when a respective user interface was displayed via the display device, and the other user interface is the respective user interface.

3. The method of claim 1, wherein displaying, via the display device, the user interface as the overlay over the other user interface includes displaying the user interface as the overlay without displaying one or more selectable options for interacting with the overlay.

4. The method of claim 1, further comprising:

while the user interface is displayed as the overlay over playing content, receiving, via the one or more input devices, an indication of a second contact detected on the touch-sensitive surface of the remote control device; and in response to receiving the indication of the second contact detected on the touch-sensitive surface of the remote control device:

displaying, overlaid on the playing content, a scrubber bar for scrubbing through the playing content; and displaying, overlaid on the user interface that is displayed as the overlay over the playing content, one or more selectable options that are selectable to interact with the user interface that is displayed as the overlay over the playing content.

5. The method of claim 4, wherein displaying the scrubber bar for scrubbing through the playing content comprises displaying the scrubber bar without displaying a selectable option for displaying the playing content as an overlay over the other user interface.

6. The method of claim 4, further comprising:

while the selectable options that are selectable to interact with the user interface do not have a current focus, receiving, via the one or more input devices, an indication of a directional input detected at the touch-sensitive surface of the remote control device; and in response to receiving the indication of the directional input detected at the touch-sensitive surface of the remote control device, updating a respective selectable option of the one or more selectable options that are selectable to interact with the user interface that is displayed as the overlay over the playing content to have the current focus.

7. The method of claim 4, further comprising:

while the selectable options that are selectable to interact with the user interface do not have a current focus, receiving, via the one or more input devices, an indication of a contact having an intensity greater than an intensity threshold detected at the touch-sensitive surface of the remote control device; and in response to receiving the indication of the contact having the intensity greater than the intensity threshold detected at the touch-sensitive surface of the remote control device, initiating a scrubbing mode for scrubbing through the playing content.

8. The method of claim 1, further comprising:

while the user interface is displayed as the overlay over the other user interface, wherein the overlay is displayed over a first location in the other user interface, receiving, via the one or more input devices, an input corresponding to a request to move a current focus in the other user interface to a second location in the other user interface; and in response to receiving the input corresponding to the request to move the current focus in the other user interface to the second location in the other user interface:

in accordance with a determination that the second location is within a threshold distance of the first location, moving the overlay to a third location over the other user interface; and in accordance with a determination that the second location is not within the threshold distance of the first location, maintaining display of the overlay at the first location over the other user interface.

9. The method of claim 8, further comprising:

while the current focus is at the second location in the other user interface and the overlay is displayed over the third location in other user interface, receiving, via the one or more input devices, an input corresponding to a request to move the current focus in the other user interface to a fourth location in the other user interface; and in response to receiving the input corresponding to the request to move the current focus in the other user interface to the fourth location in the other user interface:

in accordance with a determination that the fourth location is not within the threshold distance of the first location, moving the overlay back to the first location over the other user interface.

10. The method of claim 1, further comprising:

while the user interface is displayed as the overlay over the other user interface, receiving, via the one or more input devices, an indication of selection of a respective button on the remote control device; and in response to receiving the indication of the selection of the respective button on the remote control device:

in accordance with a determination that the selection of the respective button meets one or more first criteria:

displaying, overlaid on the other user interface, a control center user interface for controlling operation of the electronic device; and displaying, overlaid on the user interface that is displayed as the overlay over the other user interface, one or more selectable options that are selectable to interact with the user interface that is displayed as the overlay over the other user interface, wherein a selectable option in the control center user interface has a current focus.

11. The method of claim 1, further comprising:

while the user interface is displayed as the overlay over the other user interface, receiving, via the one or more input devices, an indication of selection of a respective button on the remote control device; and in response to receiving the indication of the selection of the respective button on the remote control device:

in accordance with a determination that the selection of the respective button meets one or more first criteria:

displaying, overlaid on the user interface that is displayed as the overlay over the other user interface, one or more selectable options that are selectable to interact with the user interface that is displayed as the overlay over the other user interface, wherein a respective selectable option of the one or more selectable options has a current focus.

12. The method of claim 1, further comprising:

while the user interface is displayed as the overlay over the other user interface:

in accordance with a determination that the other user interface includes content that is currently playing that includes respective audio, playing the respective audio without playing audio for content in the overlay; and in accordance with a determination that the other user interface does not include content that is currently playing that includes respective audio, playing the audio for the content in the overlay.

13. An electronic device, comprising:

one or more processors;

memory; and one or more programs, wherein the one or more programs are stored in the memory and configured to be executed by the one or more processors, the one or more programs including instructions for:

while displaying, via a display device, a user interface, receiving, via one or more input devices, an indication of a contact detected on a touch-sensitive surface of a remote control device for the electronic device;

in response to receiving the indication of the contact detected on the touch-sensitive surface of the remote control device:

in accordance with a determination that the user interface comprises a content playback user interface, displaying, in the user interface, a selectable option for displaying the user interface as an overlay over another user interface and a scrubber bar for scrubbing through content being played in the content playback user interface; and in accordance with a determination that the user interface does not comprise the content playback user interface, forgoing display, in the user interface, of the selectable option for displaying the user interface as the overlay over the other user interface;

while displaying, in accordance with the determination that the user interface comprises the content playback user interface, the scrubber bar and the selectable option for displaying the user interface as the overlay over the other user interface, receiving, via the one or more input devices, an input selecting the selectable option for displaying the user interface as the overlay over the other user interface;

in response to receiving the input selecting the selectable option, displaying, via the display device, the user interface as the overlay over the other user interface;

while displaying, in accordance with the determination that the user interface comprises the content playback user interface, the scrubber bar and the selectable option for displaying the user interface as the overlay over the other user interface, and while the selectable option does not have a current focus:

detecting, via the remote control device, an input including a contact having an intensity greater than an intensity threshold in the touch-sensitive surface of the remote control device; and in response to detecting the input including the contact having the intensity greater than the intensity threshold in the touch-sensitive surface of the remote control device, initiating a scrubbing mode for scrubbing through content being played in the content playback user interface without displaying, via the display device, the user interface as the overlay over the other user interface.

14. A non-transitory computer readable storage medium storing one or more programs, the one or more programs comprising instructions, which when executed by one or more processors of an electronic device, cause the electronic device to:

while displaying, via a display device, a user interface, receive, via one or more input devices, an indication of a contact detected on a touch-sensitive surface of a remote control device for the electronic device;

in response to receiving the indication of the contact detected on the touch-sensitive surface of the remote control device:

in accordance with a determination that the user interface comprises a content playback user interface, display, in the user interface, a selectable option for displaying the user interface as an overlay over another user interface and a scrubber bar for scrubbing through content being played in the content playback user interface; and in accordance with a determination that the user interface does not comprise the content playback user interface, forgo displaying, in the user interface, the selectable option for displaying the user interface as the overlay over the other user interface;

while displaying, in accordance with the determination that the user interface comprises the content playback user interface, the scrubber bar and the selectable option for displaying the user interface as the overlay over the other user interface, receive, via the one or more input devices, an input selecting the selectable option for displaying the user interface as the overlay over the other user interface;

in response to receiving the input selecting the selectable option, display, via the display device, the user interface as the overlay over the other user interface;

while displaying, in accordance with the determination that the user interface comprises the content playback user interface, the scrubber bar and the selectable option for displaying the user interface as the overlay over the other user interface, and while the selectable option does not have a current focus:

detect, via the remote control device, an input including a contact having an intensity greater than an intensity threshold in the touch-sensitive surface of the remote control device; and in response to detecting the input including the contact having the intensity greater than the intensity threshold in the touch-sensitive surface of the remote control device, initiate a scrubbing mode for scrubbing through content being played in the content playback user interface without displaying, via the display device, the user interface as the overlay over the other user interface.

15. The electronic device of claim 13, wherein the user interface was displayed in response to an input that was received, via the one or more input devices, when a respective user interface was displayed via the display device, and the other user interface is the respective user interface.

16. The electronic device of claim 13, wherein displaying, via the display device, the user interface as the overlay over the other user interface includes displaying the user interface as the overlay without displaying one or more selectable options for interacting with the overlay.

17. The electronic device of claim 13, the one or more programs further including instructions for:

while the user interface is displayed as the overlay over playing content, receiving, via the one or more input devices, an indication of a second contact detected on the touch-sensitive surface of the remote control device; and in response to receiving the indication of the second contact detected on the touch- sensitive surface of the remote control device:

displaying, overlaid on the playing content, a scrubber bar for scrubbing through the playing content; and displaying, overlaid on the user interface that is displayed as the overlay over the playing content, one or more selectable options that are selectable to interact with the user interface that is displayed as the overlay over the playing content.

18. The electronic device of claim 17, wherein displaying the scrubber bar for scrubbing through the playing content comprises displaying the scrubber bar without displaying a selectable option for displaying the playing content as an overlay over the other user interface.

19. The electronic device of claim 17, the one or more programs further including instructions for:

while the selectable options that are selectable to interact with the user interface do not have a current focus, receiving, via the one or more input devices, an indication of a directional input detected at the touch-sensitive surface of the remote control device; and in response to receiving the indication of the directional input detected at the touch- sensitive surface of the remote control device, updating a respective selectable option of the one or more selectable options that are selectable to interact with the user interface that is displayed as the overlay over the playing content to have the current focus.

20. The electronic device of claim 17, the one or more programs further including instructions for:

while the selectable options that are selectable to interact with the user interface do not have a current focus, receiving, via the one or more input devices, an indication of a contact having an intensity greater than an intensity threshold detected at the touch-sensitive surface of the remote control device; and in response to receiving the indication of the contact having the intensity greater than the intensity threshold detected at the touch-sensitive surface of the remote control device, initiating a scrubbing mode for scrubbing through the playing content.

21. The electronic device of claim 13, the one or more programs further including instructions for:

while the user interface is displayed as the overlay over the other user interface, wherein the overlay is displayed over a first location in the other user interface, receiving, via the one or more input devices, an input corresponding to a request to move a current focus in the other user interface to a second location in the other user interface; and in response to receiving the input corresponding to the request to move the current focus in the other user interface to the second location in the other user interface:

in accordance with a determination that the second location is within a threshold distance of the first location, moving the overlay to a third location over the other user interface; and in accordance with a determination that the second location is not within the threshold distance of the first location, maintaining display of the overlay at the first location over the other user interface.

22. The electronic device of claim 21, the one or more programs further including instructions for:

while the current focus is at the second location in the other user interface and the overlay is displayed over the third location in other user interface, receiving, via the one or more input devices, an input corresponding to a request to move the current focus in the other user interface to a fourth location in the other user interface; and in response to receiving the input corresponding to the request to move the current focus in the other user interface to the fourth location in the other user interface:

in accordance with a determination that the fourth location is not within the threshold distance of the first location, moving the overlay back to the first location over the other user interface.

23. The electronic device of claim 13, the one or more programs further including instructions for:

while the user interface is displayed as the overlay over the other user interface, receiving, via the one or more input devices, an indication of selection of a respective button on the remote control device; and in response to receiving the indication of the selection of the respective button on the remote control device:

in accordance with a determination that the selection of the respective button meets one or more first criteria:

displaying, overlaid on the other user interface, a control center user interface for controlling operation of the electronic device; and displaying, overlaid on the user interface that is displayed as the overlay over the other user interface, one or more selectable options that are selectable to interact with the user interface that is displayed as the overlay over the other user interface, wherein a selectable option in the control center user interface has a current focus.

24. The electronic device of claim 13, the one or more programs further including instructions for:

while the user interface is displayed as the overlay over the other user interface, receiving, via the one or more input devices, an indication of selection of a respective button on the remote control device; and in response to receiving the indication of the selection of the respective button on the remote control device:

in accordance with a determination that the selection of the respective button meets one or more first criteria: displaying, overlaid on the user interface that is displayed as the overlay over the other user interface, one or more selectable options that are selectable to interact with the user interface that is displayed as the overlay over the other user interface, wherein a respective selectable option of the one or more selectable options has a current focus.

25. The electronic device of claim 13, the one or more programs further including instructions for:

while the user interface is displayed as the overlay over the other user interface:

in accordance with a determination that the other user interface includes content that is currently playing that includes respective audio, playing the respective audio without playing audio for content in the overlay; and in accordance with a determination that the other user interface does not include content that is currently playing that includes respective audio, playing the audio for the content in the overlay.

26. The non-transitory computer readable storage medium of claim 14, wherein the user interface was displayed in response to an input that was received, via the one or more input devices, when a respective user interface was displayed via the display device, and the other user interface is the respective user interface.

27. The non-transitory computer readable storage medium of claim 14, wherein displaying, via the display device, the user interface as the overlay over the other user interface includes displaying the user interface as the overlay without displaying one or more selectable options for interacting with the overlay.

28. The non-transitory computer readable storage medium of claim 14, the one or more programs further causing the electronic device to:

while the user interface is displayed as the overlay over playing content, receive, via the one or more input devices, an indication of a second contact detected on the touch-sensitive surface of the remote control device; and in response to receiving the indication of the second contact detected on the touch- sensitive surface of the remote control device:

display, overlaid on the playing content, a scrubber bar for scrubbing through the playing content; and display, overlaid on the user interface that is displayed as the overlay over the playing content, one or more selectable options that are selectable to interact with the user interface that is displayed as the overlay over the playing content.

29. The non-transitory computer readable storage medium of claim 28, wherein displaying the scrubber bar for scrubbing through the playing content comprises displaying the scrubber bar without displaying a selectable option for displaying the playing content as an overlay over the other user interface.

30. The non-transitory computer readable storage medium of claim 28, the one or more programs further causing the electronic device to:

while the selectable options that are selectable to interact with the user interface do not have a current focus, receive, via the one or more input devices, an indication of a directional input detected at the touch-sensitive surface of the remote control device; and in response to receiving the indication of the directional input detected at the touch-sensitive surface of the remote control device, update a respective selectable option of the one or more selectable options that are selectable to interact with the user interface that is displayed as the overlay over the playing content to have the current focus.

31. The non-transitory computer readable storage medium of claim 28, the one or more programs further causing the electronic device to:

while the selectable options that are selectable to interact with the user interface do not have a current focus, receive, via the one or more input devices, an indication of a contact having an intensity greater than an intensity threshold detected at the touch-sensitive surface of the remote control device; and in response to receiving the indication of the contact having the intensity greater than the intensity threshold detected at the touch-sensitive surface of the remote control device, initiate a scrubbing mode for scrubbing through the playing content.

32. The non-transitory computer readable storage medium of claim 14, the one or more programs further causing the electronic device to:

while the user interface is displayed as the overlay over the other user interface, wherein the overlay is displayed over a first location in the other user interface, receive, via the one or more input devices, an input corresponding to a request to move a current focus in the other user interface to a second location in the other user interface; and in response to receiving the input corresponding to the request to move the current focus in the other user interface to the second location in the other user interface:

in accordance with a determination that the second location is within a threshold distance of the first location, move the overlay to a third location over the other user interface; and in accordance with a determination that the second location is not within the threshold distance of the first location, maintain display of the overlay at the first location over the other user interface.

33. The non-transitory computer readable storage medium of claim 32, the one or more programs further causing the electronic device to:

while the current focus is at the second location in the other user interface and the overlay is displayed over the third location in other user interface, receive, via the one or more input devices, an input corresponding to a request to move the current focus in the other user interface to a fourth location in the other user interface; and in response to receiving the input corresponding to the request to move the current focus in the other user interface to the fourth location in the other user interface:

in accordance with a determination that the fourth location is not within the threshold distance of the first location, move the overlay back to the first location over the other user interface.

34. The non-transitory computer readable storage medium of claim 14, the one or more programs further causing the electronic device to:

while the user interface is displayed as the overlay over the other user interface, receive, via the one or more input devices, an indication of selection of a respective button on the remote control device; and in response to receiving the indication of the selection of the respective button on the remote control device:

in accordance with a determination that the selection of the respective button meets one or more first criteria:

display, overlaid on the other user interface, a control center user interface for controlling operation of the electronic device; and display, overlaid on the user interface that is displayed as the overlay over the other user interface, one or more selectable options that are selectable to interact with the user interface that is displayed as the overlay over the other user interface, wherein a selectable option in the control center user interface has a current focus.

35. The non-transitory computer readable storage medium of claim 14, the one or more programs further causing the electronic device to:

while the user interface is displayed as the overlay over the other user interface, receive, via the one or more input devices, an indication of selection of a respective button on the remote control device; and in response to receiving the indication of the selection of the respective button on the remote control device:

in accordance with a determination that the selection of the respective button meets one or more first criteria:

display, overlaid on the user interface that is displayed as the overlay over the other user interface, one or more selectable options that are selectable to interact with the user interface that is displayed as the overlay over the other user interface, wherein a respective selectable option of the one or more selectable options has a current focus.

36. The non-transitory computer readable storage medium of claim 14, the one or more programs further causing the electronic device to:

while the user interface is displayed as the overlay over the other user interface:

in accordance with a determination that the other user interface includes content that is currently playing that includes respective audio, play the respective audio without playing audio for content in the overlay; and in accordance with a determination that the other user interface does not include content that is currently playing that includes respective audio, play the audio for the content in the overlay.

* * * * *